US005630212A

United States Patent [19]

Ben-Efraim

[11] Patent Number: 5,630,212

[45] Date of Patent: May 13, 1997

[54] MICROWAVE RADIO SYSTEM WITH SOFTWARE CONFIGURATION OF OPERATING PARAMETERS

[75] Inventor: Gideon Ben-Efraim, Cupertino, Calif.

[73] Assignee: P-Com, Inc., Santa Clara, Calif.

[21] Appl. No.: 561,228

[22] Filed: Nov. 20, 1995

Related U.S. Application Data

[63] Continuation of Ser. No. 219,684, Mar. 28, 1994, abandoned.

[51] Int. Cl.[6] .......... H04B 1/40

[52] U.S. Cl. .......... 455/127; 455/3.2; 455/3.3; 455/11.1; 455/69; 455/88

[58] Field of Search .......... 455/3.2, 3.3, 12.1, 455/11.1, 13.4, 126, 127, 115, 69, 70, 67.1, 68, 88, 343, 186.1

[56] References Cited

U.S. PATENT DOCUMENTS

| | | | |
|---|---|---|---|
| 3,925,782 | 12/1975 | Anderl et al. | 455/69 |
| 5,222,245 | 6/1993 | Ando et al. | 455/13.4 |
| 5,291,147 | 3/1994 | Muurinen | 455/126 |
| 5,457,814 | 10/1995 | Myrskog et al. | 455/89 |

FOREIGN PATENT DOCUMENTS

| | | | |
|---|---|---|---|
| 0094527 | 4/1991 | Japan | 455/115 |

OTHER PUBLICATIONS

Iino et al, "Development of Patching Repeater", Spring 1992 pp. 1–2 & 4–5.

Vavken, Werner G. and Jason Chang, "High-Performance Digital Radio Uses State-of-the-Art Thin-Film Technology," MSN & Communications Tech., vol. 17, No. 6, Jun., 1987, pp. 8–10, 14, 17, 19–20.

Innova Digital Microwave Telecommunications System, Brochure, Innova Corp., publication date unknown, 6 pages.

Innova XP3-38 Digital Radio System Operation and Maintenance Manual, Issue 4, Mar., 1993, pp. 1–82.

Innova Digital Microwave Telecommunications System, XP3 Distance Charts, publication date unknown, 27 pages.

*Primary Examiner*—Reinhard J. Eisenzopf
*Assistant Examiner*—Doris To
*Attorney, Agent, or Firm*—Skjerven, Morrill, MacPherson, Franklin & Friel; Alan H. MacPherson; David T. Millers

[57] ABSTRACT

Structure for controlling the output power from a microwave transmitter uses a digital value transmitted under control of software to an outdoor unit of a transmitter thereby to allow the power output of the transmitter to be changed under control of the software. The digital value is generated by an indoor unit of the transmitter or a remote transmitter across a link or elsewhere in a network. Other parameters of the transmitter can also be varied under control of the software. These parameters include the frequency and muting as well as the generation of test signals at the transmitter. In one embodiment, the outdoor unit contains a non-volatile memory in which the digital value is stored and a microprocessor which generates a control signal from the digital value to set the output power of the transmitter. Software executed by the microprocessor can correct the control signal for temperature so that the output power of the transmitter does not change when outdoor temperature changes.

11 Claims, 6 Drawing Sheets

Typical "Ram Output" power vs voltage control

Typical linearised presentation

MICROWAVE RADIO SYSTEM WITH SOFTWARE CONFIGURATION OF OPERATING PARAMETERS

This application is a continuation of application Ser. No. 08/219,684, filed Mar. 28, 1994, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to microwave radios and in particular to a microwave radio wherein the operating parameters of the radio are software controlled.

BACKGROUND OF THE INVENTION

Microwave radios are well known and are commonly used for line of sight communication systems. Microwave signals are typically transmitted from a transmitting antenna along a straight line to a receiving antenna optically visible from the transmitting antenna. Typically, the antenna is mounted on the top of a tower and is driven by what is called an "outdoor unit" which includes an IF processor and an outdoor control module. Should any of the operating parameters of the outdoor unit (which is often called the RF assembly and is located outdoors on top of the tower) be required, a technician must climb the tower and physically adjust the unit. This is sometimes difficult and often dangerous. Accordingly, there is a need for a better way of controlling the operating parameters of the RF assembly associated with the microwave transmission system.

SUMMARY OF THE INVENTION

In accordance with this invention, a software controlled radio system is provided which allows the RF assembly to be remotely controlled by software associated with the transmission system. For example, the transmit power associated with the transmission system is controlled by software as required to reflect allowed changes in channel capacity (i.e. bit rate) and/or availability. Availability is generally defined in the microwave art as the amount of time on average over a year that a link (made up of a transmitter and a receiver) will operate at this defined level of performance. Performance, in this context, is defined as an error rate such as $10^{-6}$ (i.e. one error in one million bits). As a measure of comparison, no noise is audible at an error rate of approximately $10^{-3}$.

In accordance with this invention, the RF assemblies in both the transmitter and the receiver associated with a transmission link can each be controlled in terms of output power (and other parameters) by use of telemetry data to change the software which controls the operations of the transmitter and the receiver.

This invention will be more fully understood in light of the following detailed description taken together with the drawings.

FIGS. *5a* and *5b* illustrate the relationship between the control voltage and the power output of the output amplifier of the outdoor equipment radio.

Figure 6:
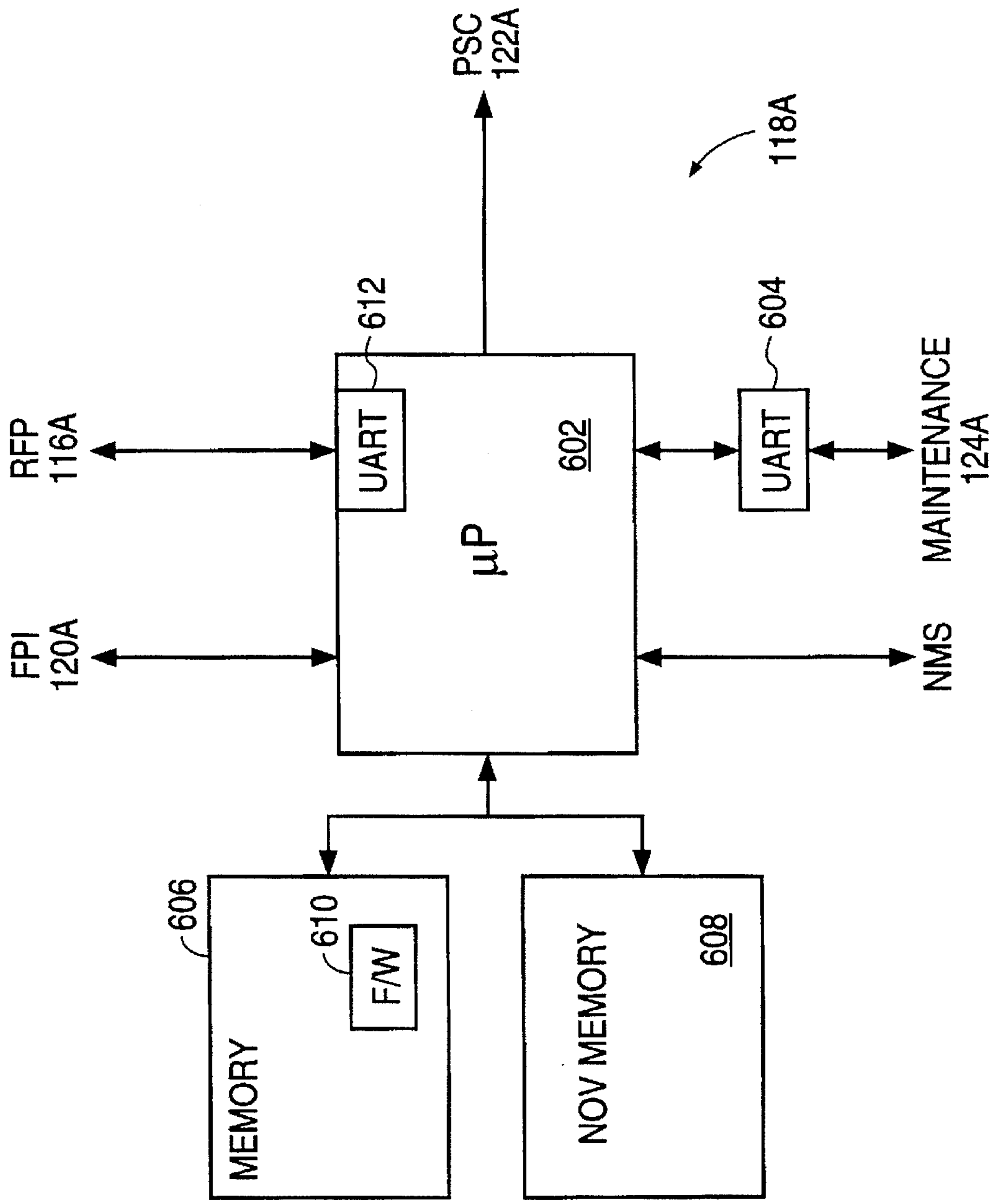

FIG. 6 illustrates the detail of the signal processing module.

DETAILED DESCRIPTION

The outdoor equipment which is the main RF portion of the radio (i.e. which transmits signals at the gigahertz frequencies commonly used in microwave systems) has in its output transmitting stage, an amplifier, the output power of which can be controlled using a DC control voltage. In accordance with this invention, this DC control voltage is derived from a digital value stored in memory within the microcomputer in the outdoor equipment and this digital value stored in memory is converted to an analog control voltage using a digital-to-analog (D to A) converter in the outdoor equipment. The digital value that is stored in that memory location in turn is based in part on a telemetry signal from the indoor equipment microprocessor which communicates to the outdoor equipment microprocessor via a telemetry link between the indoor and the outdoor equipment. The digital value is stored in nonvolatile memory to allow data recovery after a power loss. Thus equipment always powers up in the state in which it last operated before power down. In accordance with this invention, the digital value representing output power can be changed under the control of the software to reflect a new output power to be used by the transmitter. So by altering a parameter on the indoor equipment, that parameter is communicated to the outdoor equipment which in turn adjusts the output power. Furthermore, because each indoor equipment at either end of the link can communicate over the peer channel which is on the service channel which is multiplexed into the aggregate data stream, it is also possible to adjust the power at the remote end of the link from the local end of the link. This is a major advantage in field installations where, for example, a change in the availability is required dictating an increase in output power. A change in availability can therefore be done from either end of the link without having to recover the outdoor equipment. One advantage of this invention is that if a change in bit rate from, for example, 1 slot of 2 megabits through to 4 slots of 2 megabits is required, for a given availability this would require a 6 db change in output power. All of the radios on the market at present would require recovery (i.e. removal from site and return to an appropriate facility for adjustment) and manipulation to adjust the outdoor equipment directly to implement this change whereas in accordance with this invention, the adjustments can be configured using radio telemetry from either end of the link. A further advantage that comes from the use of telemetry to adjust the outdoor equipment parameters occurs when network management is provided. In accordance with this invention, all of the parameters in the radio are available and configurable using network management. It is also possible to adjust the power output and therefore the availability of the equipment by the network management system.

One particular implementation that is being used employs a linear voltage regulator type circuit which has been fabricated using discrete components and an operational amplifier. The setpoint value for the operational amplifier is derived from the D to A converter which in turn derives its output voltage from a code stored in a particular memory location.

In one embodiment an operational amplifier includes a pass transistor to provide the available power dissipation within the equipment. The output voltage from the operational amplifier is referenced closed-loop back to the input voltage to that operational amplifier. Typically zero (0) to five (5) volts are produced from the D to A converter. For a 38 gigahertz embodiment, the D to A converter output is scaled to 0 to 5.7 volts which corresponds to the range of values from the minimum output power to the maximum output power required to be available from the transmitter.

Figure 5A:
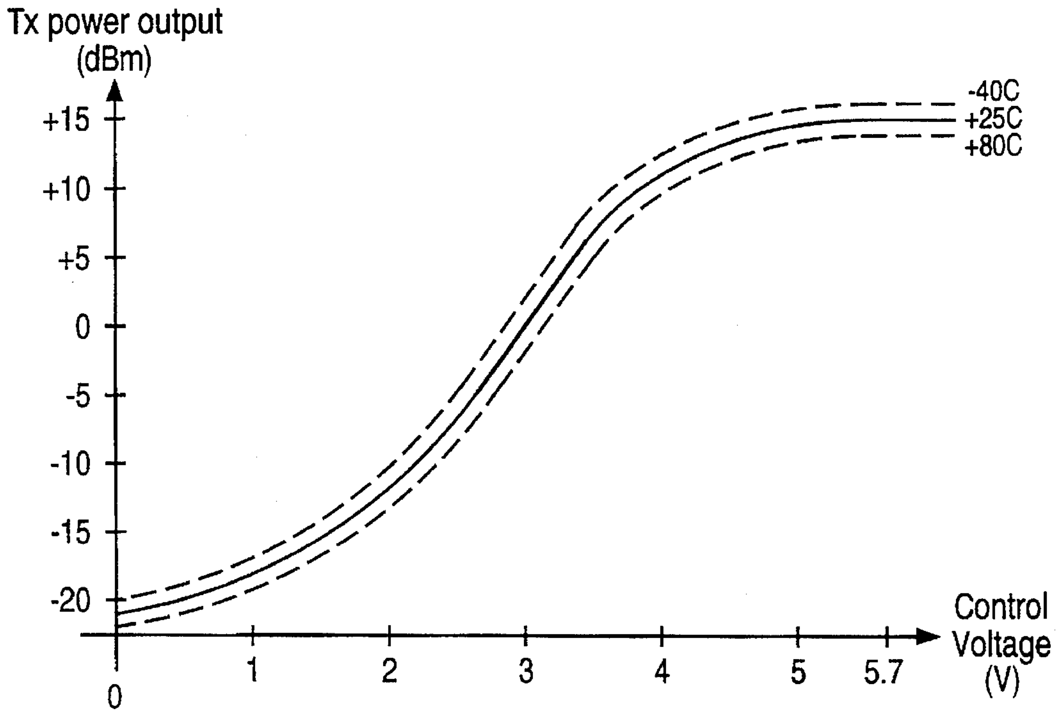
Figure 5B:
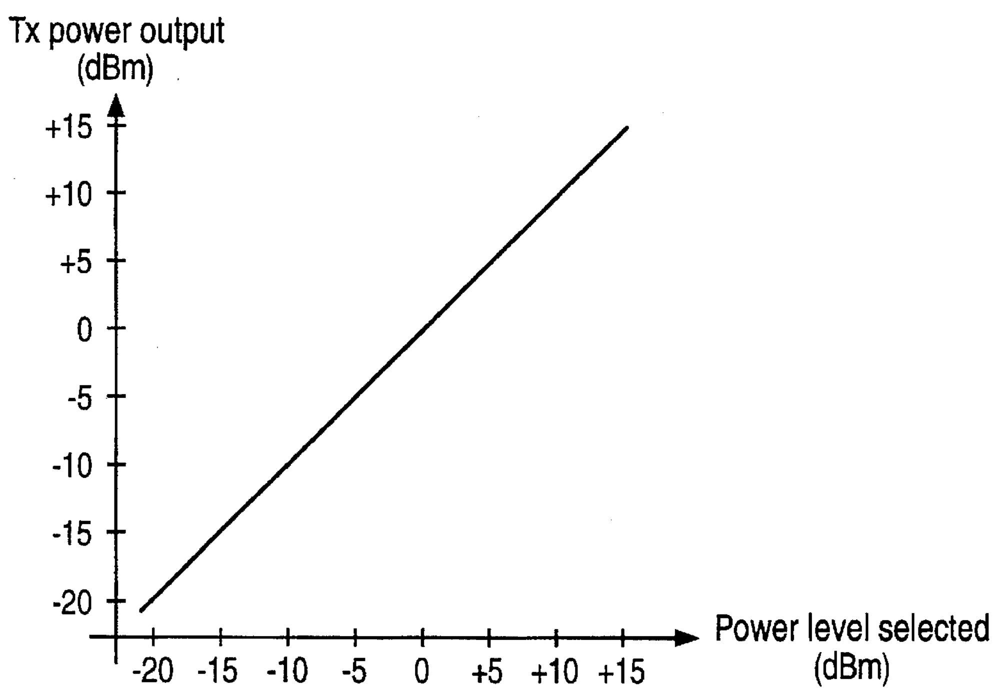

In one embodiment, the microprocessor in the outdoor equipment monitors a number of functions, such as, for example, temperature. In this embodiment the curve of output power versus bias voltage is corrected for temperature. As is shown in FIG. 5*a*, the relationship between output power and control voltage is nonlinear over the range of 0 to 5 volts. However, this nonlinear relationship has some temperature dependency, as is shown in FIG. 5*a*. Using the microprocessor, the actual value for the control voltage that is set onto the output stage is a function of the desired value plus some correction factor to take account the nonlinearity of the transfer characteristic of FIG. 5*a*. The outdoor equipment radios can actually have an interface in dbm; that is the output power of the radio can be set to a given value in dbm, such as to minus 20 dbm which in turn is turned into a voltage. That voltage is then curve corrected and temperature corrected to set the output power value on the output stage. As shown in FIG. 5*b*, this output power is linearly related to the selected input power.

In accordance with the present invention, two transceivers 100A and 100B (FIG. 1) exchange information over a wireless channel 110. Transceivers 100A and 100B are of identical construction. Therefore, the following description of transceiver 100A is applicable to transceiver 100B.

Transceiver 100A includes an indoor unit 102A and an outdoor unit 104A which are connected by a cable 106A. Outdoor unit 104A is typically placed outdoors in a position such that a parabolic antenna 108A is facing a parabolic antenna 108B of transceiver 100B. As such, outdoor unit 104A is generally not easily and comfortably accessed by technicians who periodically monitor and adjust operating parameters of outdoor unit 104A. In accordance with the present invention, outdoor unit 104A is controlled by indoor unit 102A through cable 106A which supports a telemetry channel as described in greater detail below.

Outdoor unit 104A includes an IF processor (IFP) 112A and an outdoor control module (OCM) 114A. Outdoor control module 114A controls the operation of outdoor unit 104A and is described in greater detail below. IF processor 112A processes information received from and transmits information to an (RFP) processor 116A of indoor unit 102A through cable 106A using conventional frequency division multiplex techniques. IF processor 112A and RF processor 116A transfer information using any one of a number of standard techniques. In one embodiment, the well-known BISYNC protocol is used.

In addition to RF processor 116A, indoor unit 102A includes a signal processing module (SPM) 118A, a front panel interface (FPI) 120A, and a power supply control module (PSC) 122A. Signal processing module 118A contains logic, which is described in greater detail below and which sends messages to and receives messages from outdoor control module 114A through RF processor 116A, cable 106A, and IF processor 112A. In response to messages received from signal processing module 118A, outdoor control module 114A controls the operation of outdoor unit 104A and sends messages to signal processing module 118A regarding the operation of outdoor unit 104A.

A technician has easy and comfortable access to indoor unit 102A because indoor unit 102A is typically placed indoors. A technician can control outdoor unit 104A through a front panel (not shown), which is connected through front panel interface 120A. In response to signals generated by the front control panel which are transmitted by front panel interface 120A to signal processing module 118A, signal processing module 118A forms a message indicating a change in transmit power and sends the message through RF processor 116A and cable 106A to outdoor unit 104A. Outdoor unit 104A responds to this message by amending a digital value stored in nonvolatile memory, which digital value controls the output power of the signal transmitted by outdoor unit 104.

Figure 2:
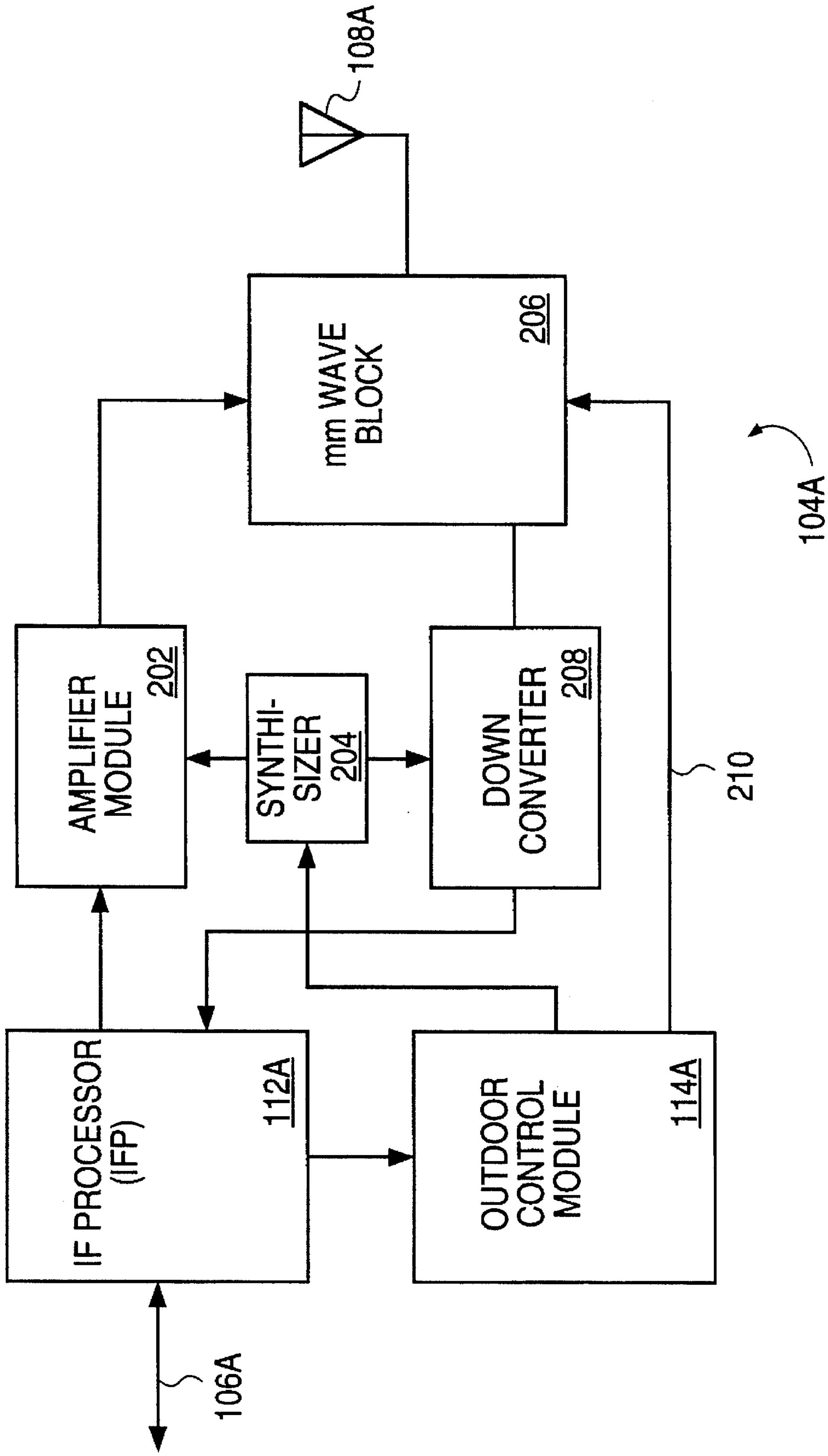
FIG. 2 illustrates the outdoor portion of a terminal which in turn is part of the complete radio system.

Outdoor unit 104A is shown in greater detail in FIG. 2. Cable 106A supports the following. DC power from indoor unit 102A, a receive IF carrier signal from outdoor unit 104A to indoor unit 102A, a transmit IF carrier signal from indoor unit 102A to outdoor unit 104A, a telemetry channel from indoor unit 102A to outdoor unit 104A, and a telemetry channel from outdoor unit 104A to indoor unit 102A. IF processor 112A transmits to an amplifier module 202 the transmit IF carrier signal. Amplifier module 202 amplifies and translates the frequency of the transmit IF carrier signal and transmits the IF carrier signal to a millimeter wave block 206. Millimeter wave block 206 then converts the transmit IF carrier signal to a microwave frequency (such as 23, 38 or 50 gigahertz) and transmits the microwave signal through antenna 108A. As described in more detail below, outdoor control module 114A controls the power of the microwave transmit carrier signal broadcast by millimeter wave block 206 through a voltage applied through a line 210.

Figure 1:
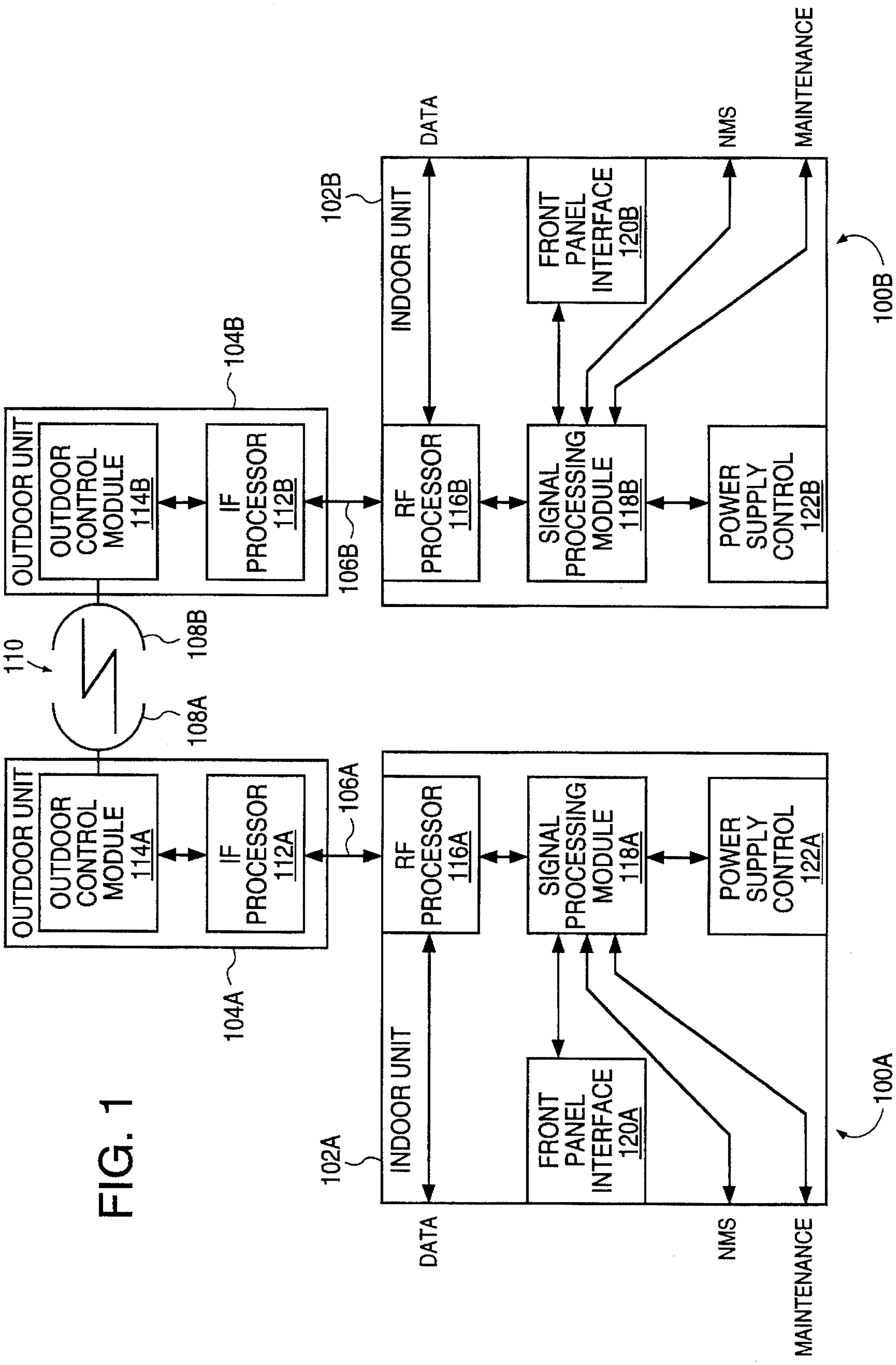
FIG. 1 illustrates in schematic block diagram form a radio link in accordance with this invention comprising two terminals, terminal 100A and terminal 100B.

A microwave frequency receive carrier signal is received through antenna 108A by millimeter wave block 206. Millimeter wave block 206 then transmits the signal to a down converter 208 which converts the microwave frequency receive signal to an intermediate frequency. The intermediate frequency is then transmitted to IF processor 112A which then transmits the IF receive carrier signal to indoor unit 102A (FIG. 1). Both amplifier module 202 (FIG. 2) and down converter 208 are controlled by a synthesizer 204. Synthesizer 204 controls, in a well known manner, the carrier signal transmitted from amplifier module 202 to millimeter wave block 206 and thus the frequency ultimately transmitted by millimeter wave block 206. Millimeter wave block 206 includes a frequency tripler 302 (FIG. 3) which triples the frequency of the carrier signal received from amplifier module 202 (FIG. 2). Naturally a frequency tripler is not essential to the invention. Rather, a doubler, a quadrupler or a straight amplifier could be used instead of a tripler, depending on the desired output frequency.

Similarly, down converter 208 translates the frequency of the received microwave carrier signal using synthesizer 204. Synthesizer 204 also converts the received microwave carrier signal, which has been reduced to an intermediate frequency by down converter 208, to be processed by an IF processor 112A.

IF processor 112A transmits to outdoor control module 114A the telemetry signal received from indoor unit 102A.

Figure 4:
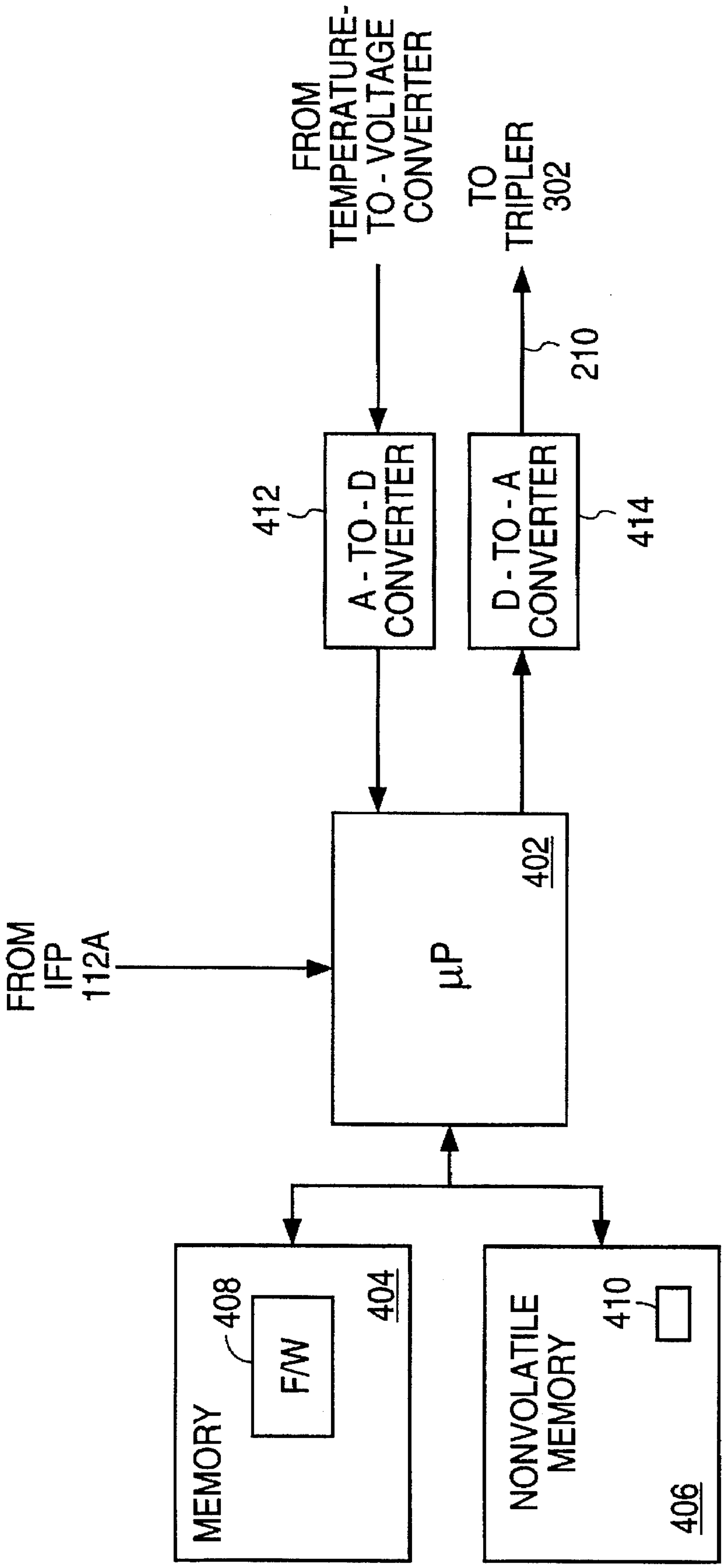
FIG. 4 illustrates a control portion of the outdoor equipment used for controlling the output power from the outdoor equipment radio in response to telemetry data signals from the indoor equipment.

Outdoor control module 114A is shown in greater detail in FIG. 4. Outdoor control module 114A includes a microprocessor 402 which receives signals from IF processor 112A (FIG. 2). Microprocessor 402 is connected through a bus to a memory 404 and a non-volatile memory 406. Memory 404 can be, for example, random accessible memory (RAM), read only memory (ROM), programmable read only memory (PROM), or flash memory. Memory 404 includes firmware 408 which is executed by microprocessor 402 using conventional techniques. One embodiment of firmware 408 is included as Appendix A which is incorporated herein by reference. Nonvolatile memory 406 includes a datum 410 which represents the power in dbm of the microwave frequency signal transmitted by millimeter wave block 206 (FIG. 2).

In a process described more completely below, firmware 408 retrieves from nonvolatile memory 406 datum 410 and supplies to microprocessor 402 digital data representing a voltage to be applied to tripler 302 (FIG. 3) to cause millimeter wave block 206 to transmit a microwave frequency carrier signal at the particular power represented by datum 410 (FIG. 4). Microprocessor 402 supplies that digital data to a digital-to-analog converter 414 which then applies to line 210 a control voltage specified by the digital data received by digital-to-analog converter 414.

Figure 3:
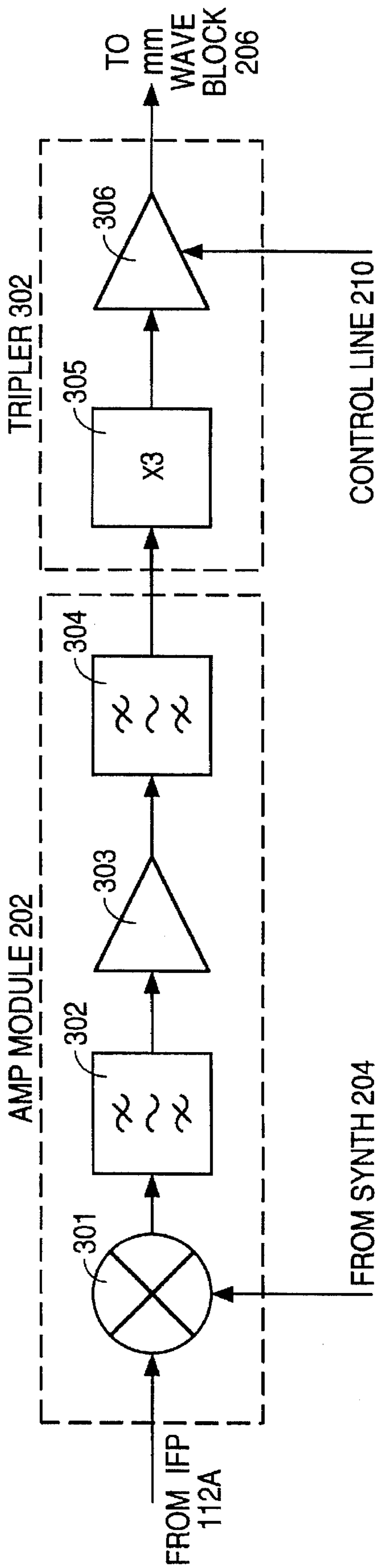
FIG. 3 illustrates in more detail the structure shown in schematic block diagram form in FIG. 2.

The voltage applied to line 210 by digital-to-analog converter 414 is supplied to tripler 302 (FIG. 3). In one embodiment, tripler 302 is available from Milliwave of Sacramento, Calif. The tripler produces a signal at a power level which is controlled by the voltage on line 210. Thus, firmware 408 (FIG. 4) uses datum 410 to control the power of microwave frequency carrier signals transmitted by millimeter wave block 206 (FIG. 2) through antenna 108A.

Datum for 410 represents the output power from the transmitter and that datum can be changed, in accordance with this invention, by a new datum sent over the telemetry channel to the outdoor equipment from the indoor equipment.

FIG. 5A illustrates the nonlinear relationship between the transmitted power output from the transmitter and the control voltage applied on line 210 (FIG. 4) to the triplet 302 (FIG. 3). As shown in FIG. 5A, the transmitted power output (in dbm) varies non-linearly with control voltage. As the control voltage varies over its expected range from 0 to 5.7 volts, the output power rises approximately linearly and then rises between approximately 1 to 3 volts at an ever increasing rate as the voltage increases until in the range from 3 to approximately 5 volts, the output power rises at decreasing rates until it becomes almost constant with increasing voltage in excess of approximately 5.2 volts. Note that the relationship between transmitted power output and the control voltage is temperature dependent. The lower the temperature, the higher the output power for a given control voltage. In accordance with one embodiment of this invention, datum 410, which can comprise a series of look up tables, allows the correct look up table to be selected corresponding to the relationship between transmitted power output as a function of control voltage.

FIG. 5B illustrates a linearized relationship between output power and dbm and the power level selected in dbm. As shown in FIG. 5B, this relationship is truly linear with the power level selected matching exactly the power output from the transmitter.

In an alternative embodiment, one look up table is provided showing the relationship between the desired transmitter power output and the control voltage and a correction factor is then generated based upon the measured ambient temperature. This correction factor then allows the particular datum 410 to be corrected to give the desired power output in accordance with the curve shown in FIG. 5a for the given temperature. This correction can be made as frequently as desired during the operation of the microwave system to take into account changes in ambient temperature.

As shown in FIG. 3, the output control voltage on line 210 is transmitted to provide the bias setting for amplifier 306. Amplifier 306 is part of tripler 302 which produces an output signal three times the frequency of the input signal. Tripler 302 includes tripling circuit 305, which can be anyone of a number of well known tripling circuits, which basically receives an input signal at a first frequency and produces an output signal at a frequency three times the frequency of the input signal. In one embodiment, tripler 305 is purchased from Milliwave Corporation in Sacramento, Calif. However, any other commercially available tripler could be used for this function. Input signal to tripler 305 is derived from amplifier module 202 (see FIG. 2). Amplifier module 202 includes a mixer 301 which mixes an input signal from IFP 112A (FIG. 2) with the signal from s synthesizer 204 (FIG. 2). Synthesizer 204 provides a frequency reference signal to be used in modulator 301 to translate the information bearing signal from IFP 112A up to the frequency of the input signal to be provided to tripler 302. The output signal from modulator 301 is transmitted through bandpass filter 302 having center frequency typical of 13 gigahertz in one embodiment. From bandpass filter 302 the 13 gigahertz signal is transmitted to amplifier 303 and then through another bandpass filter 304 having the same center frequency. Filter 304 is provided to limit noise. Output signal from filter 304 is then transmitted as the input signal to tripler 302. Within tripler 302 tripling element 305 triples the frequency of this signal to 39 gigahertz. The 39 gigahertz signal output from tripler 305 is passed through amplifier 306, the power level of which is controlled by the analog control signal on control line 210. The output signal from amplifier 306 is then transmitted through one or more bandpass filters and passed to an antenna corresponding, for example to antenna 108A in FIG. 1 for transmission.

While one embodiment of this invention has been described, other embodiments of this invention will be obvious in view of the above description. Parameters other than the output power can be controlled, for example, by telemetry data signals provided under the control of the software. Output frequency, muting of the transmitter, and testing can, for example, be implemented under control of the software.

The power of the signal transmitted by outdoor unit 104A through antenna 108A is controlled by signal processing module 118A of indoor unit 102A according to signals received through a maintenance port 124A. A personal computer or similar device (not shown) is connected to maintenance port 124A and transmits to signal processing module 118A a change power message. A change power message is a message according to the message format described more completely below which is a command to outdoor unit 104A to change the power at which signals are transmitted through antenna 108A.

Signal processing module 118A is shown in more detail in FIG. 6. Signal processing module 118A includes a microprocessor 602 which is connected through a bus to memory 606 and nonvolatile memory 608. Memory 606 includes firmware 610 which is executed by microprocessor 602. Microprocessor 602 is connected through a UART 604 to maintenance port 124A.

Microprocessor 602 retrieves from UART 604 characters which collectively form messages received by signal processing module 118A through maintenance port 124A. Messages are transferred through maintenance port 124A using conventional techniques.

Firmware 610 receives through maintenance port 124A and through UART 604 a change power message. Once a complete change power message is received, firmware 610 sends the change power message through a UART 612 to RF processor 116A (FIG. 1). In one embodiment, microprocessor 602 (FIG. 6) is the 80C196 microprocessor available from Intel Corporation of Santa Clara, Calif. and UART 612 is built into microprocessor 602.

In one embodiment, messages transferred between signal processing module 118A (FIG. 1) and outdoor control module 114A are of the following format. Messages begin with a synchronization byte which is followed by a single byte OP code. The single byte OP code identifies the operation to be performed in response to the message. Following the OP code is a single byte which defines the length of the message. The length of the message ranges from 0 to 255 bytes. Following the length byte are a number of data bytes equal to the value of the length byte. For example, if the length byte is 0, the length byte is followed by no data bytes. Similarly, if the length byte is equal to 10, the length byte is followed by 10 data bytes. Following the data bytes is a single checksum byte.

A change power message is a message whose OP code identifies the message as an instruction to change power. In a change power message, the length byte has a value of 2 and is followed by two data bytes. The first data byte identifies a subcommand and the second byte identifies a power setting value. Subcommands of a change power message include set, read, and store. The second byte is ignored unless the change power message has a subcommand of set.

The change power command is received by firmware 408 (FIG. 4) of outdoor control module 114A as described more completely above. Firmware 408 compares the OP code byte of the message to an OP code identifying a change power message to thereby determine that the received message is a change power message. Firmware 408 then determines which subcommand is identified by the first byte of the data field. If the subcommand is set, firmware 408 applies the value of the second byte of the data field to digital-to-analog converter 414. If the first byte of the data field of the change power message is a store subcommand, firmware 408 stores the value applied to digital-to-analog converter 414 as datum 410 and nonvolatile memory 406. If the first byte of the data field of the change power message is a read subcommand, firmware 408 builds a reply message with a single data byte whose value is the value that is applied to the input of digital-to-analog converter 414 and sends the message back to signal processing module 118A. Thus, the power of signals transmitted through antenna 108A by outdoor control module 114A is controlled in response to a message received from signal processing module 118A of indoor unit 102A.

In addition to receiving change power messages through maintenance port 124A, signal processing module 118A can receive change power messages from signal processing module 118B of indoor unit 102B of transceiver 100B. A pier channel is included in the IF carrier signal broadcast between RF processor 116B of indoor 102B and RF processor 116A of indoor unit 102A through outdoor units 104A and 104B and wireless channel 110. Transceiver 100B changes the power at which outdoor unit 104A of transceiver 100A transmits signals by building a change power message as described above. The change power message is transmitted to indoor unit 102A through the pier channel and received by RF processor 116A. RF processor 116A transmits the change power message to signal processing module 118A. Firmware 610 (FIG. 6) of signal processing module 118A receives the change power message and forwards the change power message to outdoor control module 114A (FIG. 1) in the manner described above. In the manner described more completely above, outdoor control module 114A changes the power with which signals are transmitted through antenna 108A in accordance with the received change power message. Thus, using the principles of the present invention, the power of signals transmitted by one transceiver is controlled by a second transceiver.

Appendices

One embodiment of firmware 408 (FIG. 4) of outdoor control module 114A is created by compiling the source code of Appendix A and linking the resulting object code using the C compiler and linker, respectively, available from Franklin Corporation of San Jose, Calif. for use with the 8552 microprocessor. In this same embodiment, microprocessor 402 of outdoor control module 114A is the 8552 microprocessor available from Franklin Corporation.

One embodiment of firmware 610 (FIG. 6) of signal processing module 118A is created by compiling the source code of Appendix B and linking the resulting object code using the C compiler and linker, respectively, available from Intel Corporation of Santa Clara, Calif. for use with the 80C196 microprocessor. In this same embodiment, microprocessor 602 of signal processing module 118A is the 80c196 microprocessor available from Intel Corporation.

A second embodiment of firmware 408 (FIG. 4) of outdoor control module 114A is created by compiling the source code of Appendix C and linking the resulting object code using the C compiler and linker, respectively, available from Franklin Corporation of San Jose, Calif. for use with the 8552 microprocessor.

A second embodiment of firmware 610 (FIG. 6) of signal processing module 118A is created by compiling the source code of Appendix D and linking the resulting object code using the C compiler and linker, respectively, available from Intel Corporation of Santa Clara, Calif. for use with the 80c196 microprocessor.

The embodiments described above are illustrative only and are not limiting. Instead, the scope of the present invention is limited only by the claims which follow.

MAIL ROOM
MAIL DATE CANCELLED
13 MAIL ROOM MAR 28 1994 PAT. & TRADEMARK OFF.

~~08/219,684~~
08/561-228

SOFTWARE CONFIGURABLE RADIO

Gideon Ben-Efraim

APPENDIX A

Attorney Docket M-2763 US

Copyright © P-COM, Inc., 1994

10891DEF.H

```
#define REV             0x08            /*this is the test rev upon release or updates bump
this equate*/

/* GENERAL PURPOSE DEFINES FOR MAIN PROGRAM */

#define TRUE                    1
#define FALSE                   0
#define NULL                    0X00
#define EOF                     0xffff
#define ON  0x01
#define UPDATE 0X01

#define LOCAL   0X00
#define REMOTE 0X01


/******CONSTANTS USED FOR IDs****************************/
#define TWO_MB          0x01
#define EIGHT_MB                0X02


/* external memory pointer*/
#define CONTROL_BYTE    (char xdata *) 0x8000
#define SYNTH_SWITCHES (char xdata *) 0x8000


/*time definitions and counts counts base on 1ms timer tick rate*/

#define ONE_MILLI_SECOND_TICK_HI        0XFC
#define ONE_MILLI_SECOND_TICK_LO        0XBF


#define SECONDS_10MS 0X000A
#define SECONDS_25MS    0X0019
#define SECONDS_50MS    0X0032
```

10891DEF.H

```
#define EIGTH_SECOND     0X007D
#define FIFTH_SECOND     0X00C8
#define FOURTH_SECOND    0X00fa
#define THIRD_SECOND     0X014A
#define HALF_SECOND      0X01F4
#define SECONDS_750MS    0X02EE
#define SECONDS_0        0X0000
#define SECONDS_1        0X03E8
#define SECONDS_2        0X07D0
#define SECONDS_3        0X0BB8
#define SECONDS_4        0X0FA0
#define SECONDS_5        0X1388
#define SECONDS_6        0x1770
#define SECONDS_7        0X1B58
#define SECONDS_8        0X1F40
#define SECONDS_9        0X2328
#define SECONDS_10       0X2710
#define SECONDS_15       0X3A98
#define SECONDS_20       0X4E20
#define SECONDS_30       0X7530
#define SECONDS_45       0XAFC8
#define SECONDS_60       0XEA60

#define MAX_NUMBER_OF_TIMERS 0X10

#define DOG_FOOD                 0X00
#define E2PROM_TMR       0X01
#define A2D_TIMER        0X02
#define ALARM_COMPILIER 0X03
#define ADJUST_OUTPUT_POWER 0X04
#define TELEMETRY_LINK_TIMER 0X05
#define SYNTH_DELAY              0X06
#define READ_SWITCH              0X07

/* CONSTATNTS USED FOR SYNTHESIZER AND PLO SHIFT REGISTERS*/
```

10891DEF.H

```
#define FREQ_CLOCK                          0X02
#define FREQ_DATA                           0X01
#define FREQ_ENABLE                         0x04
#define FREQ_F1_F2                          0X08

#define PLO_CLOCK                           0X20
#define PLO_DATA                                    0X10
#define PLO_ENABLE                          0X40

#define CS1                                         0X80


#define UP              0x01
#define DOWN    0x02

/* io_control_byte constants and masks*/
#define TELEMON 0X10
#define BWSELECT        0X08


/*ioport 1 constants and masks*/
#define TRANSMIT_MUTE_ON        0X04


/*      CONSTANTS USED BY FEED_DOG */

#define BONE                                        0x01
#define NO_BONE                             0x00

/* CONSTANTS USED FOR A2D CONVERTER*/

#define START_A2D                           0X08
#define A2D_CH3                             0X03
#define A2D_CH4                             0X04
#define TEMPERATURE_INDEX                           0X09
```

```
#define A2D_MUX_CTRL    0X07

#define NORMAL                        0X00
#define COLD                                  0X01
#define HOT                                   0x02
#define NEW_TEMP                              0X03

#define HOT_LO                        0x5A    /* HOT IS 140 DEGREES F*/
#define COLD_HI                       0x30    /* COLD IS -10 DEGREES F*/

#define A2D_READY              0X00
#define A2D_BUSY                      0X01
#define A2D_DONE                      0X02

#define AGC_INDEX              0x04
#define TEMP_INDEX             0X09

#define MAX_ODU_VOLTAGES       14
#define ANALOG_MUX_CONTROL_BITS 0X07


/*
** CONSTANTS USE IN READING SWITCHES AND PUSHBUTTONS
*/

#define READ_LOCAL_SWITCHES    0X08

/*
** Constanst definitions for serial interfaces
*/
#define IDLE           0X00
#define BUSY           0X01
#define READY          0X02
#define MAX_BUFFER     0X02
```

10891DEF.H

```
#define OVERHEAD          0X04

#define RX_INTERRUPT                0X01
#define TX_INTERRUPT                0X02


/* packet state definitons for the telemetry links*/
#define RECIEVE_SYNC                0X00
#define RECIEVE_OPCODE              0X01
#define RECIEVE_LENGTH              0X02
#define RECIEVE_DATA                0X03
#define CHECKSUM                                    0X04
#define SYNC                                        0X7E

/* TELEMETRY LINK OPCODE DEFINITIONS*/
#define ALARM_IMAGE                         0X01
#define A2D_IMAGE                           0X02
#define REVISION_IMAGE   0X50
#define READ_REV         0X00
#define SET_REV 0X03

#define POWER_OUT_CONTROL           0X06
#define A2D_TRIP_POINTS 0X05
#define POWER_CONTROL               0X06

/* SUB OPCODE DEFINITIONS*/
#define INCREASE_POWER   0X01
#define DECREASE_POWER   0X02
#define SET_POWER                   0X03
#define STORE_POWER                 0X04
#define READ_POWER                  0X05

#define POWER_CTRL_LEN   0X02
```

10891DEF.H

```
/* CONSTANT DEFINITIONS FOR SETTING LOCAL ALARM VARIABLE BITS**********/
#define TELEMETRY_ERROR 0X04
#define TRANSMIT_MUTE_ACTIVE     0X01
#define AFC_OUT_OF_RANGE         0X02
#define E2_FAIL 0x40
#define PILOT_BIT 0x80

#define PLO2_LOCKED              0X40
#define FS_LOCKED                0X04


/* E2 PROM DEFINES FOR STORING OFFSET AND AGC TABLES*/

#define NORMAL_MIN_INDEX         0X00
#define NORMAL_MAX_INDEX         0X0e
#define HOT_MIN_INDEX            0X1c
#define HOT_MAX_INDEX            0x2a
#define COLD_MIN_INDEX           0X38
#define COLD_MAX_INDEX           0X46
#define OFFSET_LENGTH            0X0e

#define NORMAL_AGC                       0X00
#define HOT_AGC                          0X52
#define COLD_AGC                                 0XA4

#define AGC_LENGTH                       0X52
#define MAX_AGC_TABLE            100
#define ALARM_LENGTH             0X04

#define PWR_CTRL                                 0X54
#define PWR_CTRL_LEN             0X02    /*PWR CTRL IS STORED AS TWO BYTES THE ACTUAL VALUE A
ND THE COMPLEMENT THERE OF*/

#define EEPROM_ADDR      0x00            /* the address of the eeprom is 0*/

#define REVISION_DATA            0XF0    /*ADDRESS IN PAGE TWO FOR REVISION DATA*/
```

10891DEF.H

```
#define PAGE_1  0X01
#define PAGE_2  0X02
typedef unsigned char uchar;
typedef unsigned int uint;
```

10891STR.H

```
};

struct a2d_manager{
        unsigned char   entry,
                                        current_temp_offset,
                                        next_ch,
                                        next_mux,
                                        complete;           /* 0 = A2D_READY,1
 = A2D_BUSY, & 2 = A2D_DONE*/
};

struct receive_level{
        unsigned char   rcvr_level,
                                        lower,
                                        higher,
                                        current_dbm;
};

struct config_str
{
        uchar   ser_num1,
                ser_num2,
                ser_num3,
                ser_num4,
                ser_num5,
                rev_num1,
                rev_num2,
                rev_num3;
};

struct data_base{

   unsigned char        alarm0,     /* bit0 - 13ghztx
                                       bit1 - 13ghztxlo
                                       bit2 - ref_lvl
```

10891STR.H

```
                         bit3 - txiflvl
                         bit4 - agc lvl
                         bit5 - plo2 alarm
                         bit6 - plo2 lock
                         bit7 - fs lvl */

        alarm1,       /* bit0 - tx x3 bias
                         bit1 - temp
                         bit2 - fs lock
                         bit3 - tx x3 power alarm
                         bit4 - mixer current
                         bit5 - plo lvl  alarm
                         bit6 -
                         bit7 - */

        alarm2,       /* bit0 - transmit_mute_active
                         bit1 - afc out of range
                         bit2 - telemetry error
                         bit3 -
                         bit4 -
                         bit5 -
                         bit6 - eeprom failure
                         bit7 - data valid bit*/
        sw_rev,
        plo_id,
        rcvr_level;
};

struct odu_ctrl_str
{
        unsigned char   synthesizer_setting,
                                idu_personality,
                                odu_tx_mute,
                                afc_compensation;
};
```

```
struct synth_sw
{
        unsigned char   new_sw,
                                              old_sw,
                                              times_read;
};

#ifdef MAINCODE
#define VARIABLE
#else
#define VARIABLE extern
#endif

VARIABLE xdata struct data_base idu, *idu_ptr;  /* local alarm image*/

VARIABLE xdata struct a2d_manager a2d_ctrl;

VARIABLE xdata struct config_str configuration;

VARIABLE xdata struct synth_manager synthesizer_control;

VARIABLE xdata struct plo2_manager plo2;

VARIABLE xdata struct channel rx,tx;

VARIABLE xdata struct receive_level rcvr_table;

VARIABLE        xdata struct odu_ctrl_str odu_control;

VARIABLE        xdata struct synth_sw synth_rd_sw;

VARIABLE xdata unsigned char a2d_voltages[MAX_ODU_VOLTAGES],
                                                  local_alarm,
                                                  milliwave_power_out,
                                                  synthesizer_switches,
```

10891STR.H

```
                                                  mute_transmitter,
                                                  temp_buff[0XFF],
                                                        plo2_not_programmed;

VARIABLE xdata unsigned int    value_2nd_plo,
                                                                      timers[MAX_N
UMBER_OF_TIMERS],
                                                                      agc_actual[0
x64];   /* this is revieve level from 0dbm to -100dbm*/

VARIABLE xdata signed char     a2d_min_offset[MAX_ODU_VOLTAGES],
                                             a2d_max_offset[MAX_ODU_VOLTAGES],
                                                  agc_correction[0x52],
                                                  offset_adjust[0x02],
                                                  pwr_ctrl_rd[0x02];


VARIABLE idata unsigned char   port1_image,
                                                                      port4_image,
                                                                      io_control_b
yte,
                                                                      temp_switch;
```

NOVRAM.H

```
/***************************************************************************/
/*                        HEADER FILE FOR E2PROM.C                         */
/***************************************************************************/

#define SET 1

#define CLR 0

#define E2DATA(x) ioport1 = (ioport1 & 0xfe) | (x)

#define E2CLK(x) ioport1 = (ioport1 & 0xfd) | (x)<<1

#define ACK ioport1 & 0x01
```

10891STR.H

```
struct que{
        unsigned char flag;
        unsigned char len;
        unsigned char route_info;
        unsigned char storage[0xff];  /*need to allow for i-field of 255 bytes and 4 bytes o
f overhead*/
};


struct channel{
        unsigned char busy;             /*indicates if already in the process of tx or rx*/
        unsigned char get;
        unsigned char put;
        unsigned char inservice;        /*indicates which buffer is currently being used*/
        unsigned char *char_ptr;        /*point into buffer in use*/
        unsigned char state;    /*indicates where we are in our attempt to sync on a packet*
/
        unsigned char checksum; /*used for calculating a checksum*/
        unsigned char packet_len; /*used for determining when we are done rcving the i-field
 of the packet*/
        struct que buffer[MAX_BUFFER];  /*there are x buffers in the buffer pool*/
};

struct synth_manager
{
        unsigned char   mode,
                                            configured;
        unsigned long   divider_control,
                                            reference;
};
struct plo2_manager
{
        unsigned long   a,
                                            m,
                                            reference;
```

PLO2.H

```
/**************************************************************
 *
 * Description: This header file contains the interface to
 *              the 2nd PLO module.
 *
 * $Header:   C:/firmware/ocm/arch/plo2.h_v   1.1   17 Nov 1993 17:03:14   mikee  $
 *
 * $Log:   C:/firmware/ocm/arch/plo2.h_v  $
 *
 *    Rev 1.1   17 Nov 1993 17:03:14   mikee
 * misc cleanup
 *
 *    Rev 1.0   01 Nov 1993 15:04:50   mikee
 * Initial revision.
 *
 **************************************************************/
#ifndef _PLO2_H
#define _PLO2_H

#include "global.h"

/*
    Function Prototypes:
*/
void PLO2_init(void);
void PLO2_timer_event(uchar timer);
void PLO2_adjust(uchar whichway);
uchar PLO2_A_value(void);

#endif _PLO2_H
```

REG552.H

```
/* (c) Copyright FRANKLIN SOFTWARE, INC.  1989, All rights reserved. */
/*  Register Declarations for 80252 Processor  */

/*  BYTE Register  */
sfr P0      = 0x80;
sfr P1      = 0x90;
sfr P2      = 0xA0;
sfr P3      = 0xB0;
sfr P4      = 0xC0;
sfr P5      = 0xC4;
sfr PSW     = 0xD0;
sfr ACC     = 0xE0;
sfr B       = 0xF0;
sfr SP      = 0x81;
sfr DPL     = 0x82;
sfr DPH     = 0x83;
sfr PCON    = 0x87;
sfr TCON    = 0x88;
sfr TMOD    = 0x89;
sfr TL0     = 0x8A;
sfr TL1     = 0x8B;
sfr TH0     = 0x8C;
sfr TH1     = 0x8D;
sfr IEN0    = 0xA8;
sfr IEN1    = 0xE8;
sfr IP0     = 0xB8;
sfr IP1     = 0xF8;
sfr S0CON   = 0x98;
sfr S0BUF   = 0x99;
sfr S1ADR   = 0xDB;
sfr S1DAT   = 0xDA;
sfr S1STA   = 0xD9;
sfr S1CON   = 0xD8;
sfr STE     = 0xEE;
sfr TMH2    = 0xED;
sfr TML2    = 0xEC;
```

```
sfr TM2CON = 0xEA;
sfr TM2IR  = 0xC8;
sfr T3     = 0xFF;
sfr PWMP   = 0xFE;
sfr PWM1   = 0xFD;
sfr PWM0   = 0xFC;
sfr RTE    = 0xEF;
sfr CTCON  = 0xEB;
sfr CTH3   = 0xCF;
sfr CTH2   = 0xCE;
sfr CTH1   = 0xCD;
sfr CTH0   = 0xCC;
sfr CMH2   = 0xCB;
sfr CMH1   = 0xCA;
sfr CMH0   = 0xC9;
sfr CTL3   = 0xAF;
sfr CTL2   = 0xAE;
sfr CTL1   = 0xAD;
sfr CTL0   = 0xAC;
sfr CML2   = 0xAB;
sfr CML1   = 0xAA;
sfr CML0   = 0xA9;
sfr ADCH   = 0xC6;
sfr ADCON  = 0xC5;


/*  80252 "Special Function Register"  */
/*
sfr SADDR  = 0xA9;
sfr SADEN  = 0xB9;
sfr T2CON  = 0xC8;
sfr T2MOD  = 0xC9;
sfr RCAP2L = 0xCA;
sfr RCAP2H = 0xCB;
sfr TL2    = 0xCC;
sfr TH2    = 0xCD;
```

```
sfr CCON   = 0xD8;
sfr CMOD   = 0xD9;
sfr CCAPM0 = 0xDA;
sfr CCAPM1 = 0xDB;
sfr CCAPM2 = 0xDC;
sfr CCAPM3 = 0xDD;
sfr CCAPM4 = 0xDE;
sfr CL     = 0xE9;
sfr CCAP0L = 0xEA;
sfr CCAP1L = 0xEB;
sfr CCAP2L = 0xEC;
sfr CCAP3L = 0xED;
sfr CCAP4L = 0xEE;
sfr CH     = 0xF9;
sfr CCAP0H = 0xFA;
sfr CCAP1H = 0xFB;
sfr CCAP2H = 0xFC;
sfr CCAP3H = 0xFD;
sfr CCAP4H = 0xFE;
*/

/*  BIT Register  */
/*  PSW  */
sbit CY     = 0xD7;
sbit AC     = 0xD6;
sbit F0     = 0xD5;
sbit RS1    = 0xD4;
sbit RS0    = 0xD3;
sbit OV     = 0xD2;
sbit P      = 0xD0;

/*  TCON  */
sbit TF1    = 0x8F;
sbit TR1    = 0x8E;
sbit TF0    = 0x8D;
sbit TR0    = 0x8C;
```

```
sbit IE1    = 0x8B;
sbit IT1    = 0x8A;
sbit IE0    = 0x89;
sbit IT0    = 0x88;

/*  IEN0  */
sbit EA     = 0xAF;
sbit ES1    = 0xAD;
sbit ES     = 0xAC;
sbit ET1    = 0xAB;
sbit EX1    = 0xAA;
sbit ET0    = 0xA9;
sbit EX0    = 0xA8;

/*  IP  */
sbit PC     = 0xBE;
sbit PT2    = 0xBD;
sbit PS     = 0xBC;
sbit PT1    = 0xBB;
sbit PX1    = 0xBA;
sbit PT0    = 0xB9;
sbit PX0    = 0xB8;

/*  P1  */
sbit SDA    = 0x97;
sbit SCL    = 0x96;
sbit RT2    = 0x95;
sbit T2     = 0x94;
sbit CT3I   = 0x93;
sbit CT2I   = 0x92;
sbit CT1I   = 0x91;
sbit CT0I   = 0x90;

/*  P3  */
sbit RD     = 0xB7;
sbit WR     = 0xB6;
```

REG552.H

```
sbit T1     = 0xB5;
sbit T0     = 0xB4;
sbit INT1   = 0xB3;
sbit INT0   = 0xB2;
sbit TXD    = 0xB1;
sbit RXD    = 0xB0;



/*  S0CON  */
sbit SM0    = 0x9F;
sbit SM1    = 0x9E;
sbit SM2    = 0x9D;
sbit REN    = 0x9C;
sbit TB8    = 0x9B;
sbit RB8    = 0x9A;
sbit TI     = 0x99;
sbit RI     = 0x98;

/*  T2CON  */
/*
sbit TF2    = 0xCF;
sbit T2IP   = 0xCE;
sbit T2IE   = 0xCD;
sbit T2RSEN = 0xCC;
sbit BGEN   = 0xCB;
sbit TR2    = 0xCA;
sbit C_T2   = 0xC9;
sbit CP_RL2 = 0xC8;
*/
/*  CCON  */
/*
sbit CF     = 0xDF;
sbit CR     = 0xDE;
sbit CCF4   = 0xDC;
```

```
sbit CCF3    = 0xDB;
sbit CCF2    = 0xDA;
sbit CCF1    = 0xD9;
sbit CCF0    = 0xD8;
*/
```

RF_DEF.H

```
#define REV              0                /*this is the test rev upon release or updates bump
this equate*/

/* GENERAL PURPOSE DEFINES FOR MAIN PROGRAM */

#define TRUE                      1
#define FALSE                     0
#define NULL                      0X00
#define EOF                       0xffff


#define IDLE             0X00
#define BUSY             0X01
#define READY            0X02
#define MAX_BUFFER       0X08

/*alarm bit definition equates*/

#define BB_ALARM         0X08
#define E2_FAIL 0X40

/*time definitions and counts counts base on 1ms timer tick rate*/

#define SECONDS_10MS 0X000A
#define SECONDS_25MS     0X0019
#define SECONDS_50MS     0X0032
#define EIGTH_SECOND     0X007D
#define FIFTH_SECOND     0X00C8
#define FOURTH_SECOND    0X00fa
#define THIRD_SECOND     0X014A
#define HALF_SECOND      0X01F4
#define SECONDS_750MS    0X02EE
#define SECONDS_0        0X0000
#define SECONDS_1        0X03E8
#define SECONDS_2        0X07D0
```

RF_DEF.H

```
#define SECONDS_3        0X0BB8
#define SECONDS_4        0X0FA0
#define SECONDS_5        0X1388
#define SECONDS_6        0x1770
#define SECONDS_7        0X1B58
#define SECONDS_8        0X1F40
#define SECONDS_9        0X2328
#define SECONDS_10       0X2710
#define SECONDS_15       0X3A98
#define SECONDS_20       0X4E20
#define SECONDS_30       0X7530
#define SECONDS_45       0XAFC8
#define SECONDS_60       0XEA60

/* TASK ID #'S FOR TIMER INDEXING*/

#define NUM_OF_TASK                     0X04
#define ALARM_COMPILIER 0X00
#define ALARM_UPDATE            0X01
#define A2D                                     0X02
#define FREQ_SWITCHES           0X03

/* CONSTANT DEFINITIONS FOR SERIAL COMMUNICATION */
#define STX                                             0X10
#define ALARM_DUMP                              0XF0
#define A2D_CH_REQ                              0XF1
#define MDM_CTRL_REQ                    0XF2
#define A2D_TRIP_POINTS         0XF3
#define READ_TABLE                              0XF4
#define DUMP_A2D_CHS                    0XF5
#define AGC_CALIBRATE                   0XF6
#define WRITE_AGC_TABLE         0XF7
#define WRITE_OFFSET_TABLE      0XF8
#define READ_AGC_STANDARD               0XF9
#define KEEP_ALIVE                              0XFA
#define PWR_CTRL_ADJUST         0XFB
```

RF_DEF.H

```
#define PWR_CTRL_SET                    0XFC
#define SET_TEST_MODE                   0XFD

#define PRBS                                            0X00
#define SIDE_BAND                               0X01
#define TWO_TONES                               0X02

#define AUX_DATA_LEN                    0X01
#define MDM_CTRL_LEN                    0X03

/* this is the rcv character states definitions*/
#define RCV_STX                                 0x00
#define RCV_OPCODE                              0x01
#define RCV_DATA                                        0x02
#define CHK_SUM                                 0x03

#define MIN_HOT_TBL                     0X04
#define MIN_COLD_TBL            0X02
#define MIN_NORM_TBL            0X00
#define MAX_HOT_TBL                     0X05
#define MAX_COLD_TBL            0X03
#define MAX_NORM_TBL            0X01
#define AGC_NORM_TBL            0X06
#define AGC_COLD_TBL            0X07
#define AGC_HOT_TBL                     0X08

#define OVERHEAD                                0X03
#define I_FIELD                         0X01
#define UPDATE                          0X01

#define PWR_READ                                0X00
#define INCREASE_PWR            0X01
#define DECREASE_PWR            0X02
#define STORE_PWR                       0X03
```

RF_DEF.H

```
/* CONSTANTS USED FOR A2D CONVERTER*/

#define NUM_OF_A2DS                       0X0d
#define START_A2D                         0X08
#define A2D_CH3                           0X03
#define A2D_CH4                           0X04
#define TEMP_INDEX                        0X08
#define RSSI_INDEX                        0X03
#define PIN_ATTN_INDEX            0X01
#define VOLTS_5                           0XFF

#define A2D_MUX_CTRL_RST          0X1F
#define A2D_MUX_CTRL_MASK         0XE3

#define A2D_ENTRIES                       0x0d

#define NORMAL                            0X00
#define COLD                                        0X01
#define HOT                                         0x02
#define NEW_TEMP                                    0X03

#define HOT_LO                            0x5A      /* HOT IS 140 DEGREES F*/
#define COLD_HI                           0x30      /* COLD IS -10 DEGREES F*/

#define A2D_READY                 0X00
#define A2D_BUSY                          0X01
#define A2D_DONE                          0X02

/* TRANSMITTER MUTE CONSTANTS */

#define XMT_MUTE_OFF      0xef
#define XMT_MUTE_ON               0x10

/* CONSTANTS USED FOR SYNTHESIZER CONTROL*/

#define NOT_INIT                                    0x00
```

RF_DEF.H

```
#define COLD_MIN_INDEX          0X38
#define COLD_MAX_INDEX          0X46
#define OFFSET_LENGTH           0X0e

#define NORMAL_AGC                      0X00
#define HOT_AGC                         0X52
#define COLD_AGC                                0XA4

#define AGC_LENGTH                      0X52
#define MAX_AGC_TABLE           100
#define ALARM_LENGTH            0X04

#define PWR_CTRL                                0X54
#define PWR_CTRL_LEN            0X02    /*PWR CTRL IS STORED AS TWO BYTES THE ACTUAL VALUE A
ND THE COMPLEMENT THERE OF*/
#define OFFSET_ADJUST           0XFE    /* E2PROM ADDRESS OF OFFSET ADJUST*/

typedef unsigned char uchar;
typedef unsigned int uint;
```

RF_DEF.H

```
#define INVALID                          0x01
#define CONFIGD                          0X02
#define INPROGRESS                       0X03
#define COMPLETE                                 0X00

#define L_BAND                           0X00
#define X_BAND                           0x01

/* CONSTANTS USED FOR  READING LOCAL HEX ROTARY SWITCHES FOR CONTROLLING SYNTHESIZERS*/

#define SW_ENABLE                                0x08    /* mask used for determining if on b
oard hex switches are to be used*/

#define CLR_SW_CTRLS                     0XD7
#define FREQ_SW_STRB                     0X30
#define FREQ_SW_DATA                     0X10
#define FREQ_SW_RISING_CLK       0X38
#define FREQ_SW_FALLING_CLK      0XF7

/*CONSTANTS USED FOR SHIFTING VALUES TO THE L BAND AND X BAND SYNTHESIZERS*/

#define FREQ_CLOCK                       0X01
#define FREQ_DATA                        0X02
#define FREQ_STROBE                      0x04

/*      CONSTANTS USED BY FEED_DOG */

#define BONE                                     0x01
#define NO_BONE                          0x00

/* CONSTANTS FOR E2PROM INTERFACING*/

#define NORMAL_MIN_INDEX         0X00
#define NORMAL_MAX_INDEX         0X0e
#define HOT_MIN_INDEX            0X1c
#define HOT_MAX_INDEX            0x2a
```

VOLTAGES.H

```
code uchar a2d_max_in[] =
{
        0xfc, 0xfc, 0xfc, 0xfc, 0xfc, 0xfc, 0x7f, 0xfc, 0xfc, 0xfc,
        0x7f, 0x99, 0xfc, 0xfc
};

code uchar a2d_min_in[] =
{
        0x19, 0x19, 0x19, 0x19, 0x19, 0x19, 0x70, 0x19, 0x19, 0x19,
        0x70, 0x1b, 0x19, 0x19
};

code uchar a2d_max_out[] =
{
        0xfa, 0xfa, 0xfa, 0xfa, 0xfa, 0xfa, 0xfa, 0xfa, 0xfa, 0xfa,
        0xfa, 0x9b, 0xfa, 0xfa
};

code uchar a2d_min_out[] =
{
        0x1b, 0x1b, 0x1b, 0x1b, 0x1b, 0x1b, 0x70, 0x1b, 0x1b, 0x1b,
        0x1b, 0x19, 0x1b, 0x1b
};

code uint agc_table[] =
{
          41,  42,  44,  46,  47,  49,  56,  63,  69,  76,
          83,  88,  93,  98, 103, 107, 111, 115, 119, 123,
         126, 130, 134, 138, 142, 145, 152, 158, 165, 171,
         178, 198, 218, 238, 258, 278, 281, 283, 286, 288,
         291, 292, 293, 293, 294, 295, 295, 296, 297, 297,
         298, 299, 299, 300, 301, 301, 302, 303, 304, 304,
         305, 306, 307, 308, 309, 310, 311, 312, 313, 315,
         316, 317, 318, 320, 321, 322, 324, 325, 327, 329,
         330
};
```

VOLTAGES.H

```
code uchar plo2_min = 120;
code uchar plo2_max = 168;
```

10891.C

```
#define MAINCODE
#include <reg552.h>
#include "10891def.h"
#include "10891str.h"
#include "voltages.h"


void initialize_system();
void kick_the_dog(uchar);
void handle_character(uchar,struct channel *);

extern void init_a2d_values();
extern void synthesizer();
extern void alarm_compilier();
extern void a2d();
extern void telemetry_link_handler();
extern uchar build_packet();
extern void milliwave_control();
extern void control_2nd_plo(uchar);
extern void init_serial();
extern uchar e2_write(uchar*, uchar, uchar, uchar,uchar);
extern uchar e2_read(uchar*, uchar, uchar, uchar, uchar);
extern void read_switches();


main()          using 0
{
        initialize_system();
        while(TRUE)
        {

                kick_the_dog(FALSE);

                telemetry_link_handler();
```

```
                kick_the_dog(FALSE);

                if(synthesizer_control.mode == UPDATE)synthesizer();

                kick_the_dog(FALSE);

                if(!timers[A2D_TIMER] && (a2d_ctrl.complete == A2D_READY))a2d();

                kick_the_dog(FALSE);

                if(!timers[ALARM_COMPILIER] && (a2d_ctrl.complete == A2D_DONE))alarm_compili
er();

                kick_the_dog(FALSE);

                if(!timers[ADJUST_OUTPUT_POWER])milliwave_control();

                kick_the_dog(FALSE);

                if((P3 & READ_LOCAL_SWITCHES) && !timers[READ_SWITCH])read_switches();
        }
}

/*
** The following routines are the interrupt service routines used By the OCM
*/

void int_ext()    interrupt 0 using 1
{

}

/*
```

10891.C

```
** FUNCTION:
**              int_serial:checks to see if a character has been recieved or if
**                                             there is another character to transmit
**
** Input Definitions:
**                                                      No parameters
**
**   Returned Values:
**                                     No values returned
**
*/
void int_serial()       interrupt 4 using 2
{

        unsigned char rx_char;
        struct channel *tx_ptr;


        if(SOCON & RX_INTERRUPT)
        {               /*this is a recieve interrupt*/

                rx_char = SOBUF;                /*read in the character recieved*/
                handle_character(rx_char,&rx); /*handle_character synchronizes on the define
d packet*/

                SOCON &= ~RX_INTERRUPT;         /*clear the recieve interrupt flag*/

        }/*end if RX_INTERRUPT*/

        if(SOCON & TX_INTERRUPT)
        {               /*this is a xmit interrupt*/

                tx_ptr = &tx;
                if(tx_ptr->busy)
                {
                        if(tx_ptr->packet_len)
```

10891.C

```
                {
                        S0BUF = *(tx_ptr->char_ptr++);
                        --tx_ptr->packet_len;

                }/*end if packet_len*/

                else
                {
                        tx_ptr->buffer[tx_ptr->get].flag = IDLE;
                        ++tx_ptr->get;
                        if(tx_ptr->get == MAX_BUFFER)tx_ptr->get = 0;
                        tx_ptr->busy = FALSE;

                        io_control_byte &= ~TELEMON;

                        port4_image &= ~CS1;
                        P4 = port4_image;

                        *CONTROL_BYTE = io_control_byte;

                        port4_image |= CS1;
                        P4 = port4_image;
                }

        }/*end if tx_ptr->busy*/

        S0CON &= ~TX_INTERRUPT;         /*clear the transmit interrupt flag*/

    }/*END IF TX_INTERRUPT*/

}/*close int_serial*/


/*
** FUNCTION:
**              int_timer:
```

10891.C

```
**                                              decrement all timers used in the program if
they are not equal
**                                              to zero already
**
** Input Definitions:
**                                                   No parameters
**
**   Returned Values:
**                                         No values returned
**
*/
void int_timer()         interrupt 1 using 1
{
        uchar timer_count;
        for (timer_count = 0;timer_count < MAX_NUMBER_OF_TIMERS;timer_count++)
        {
                if(timers[timer_count])--timers[timer_count];
        }

        TH0 = ONE_MILLI_SECOND_TICK_HI;
        TL0 = ONE_MILLI_SECOND_TICK_LO;

}

/*
** FUNCTION:
**              int_a2d: read the results of the last a2d conversion and start the
**                                              next converion if applicable.
**
** Input Definitions:
**                                                   No parameters
**
**   Returned Values:
**                                         No values returned
**
*/
```

```
void int_a2d()    interrupt 10 using 3
{
        ADCON = 0;

        if(a2d_ctrl.entry != MAX_ODU_VOLTAGES)
        {
                a2d_voltages[a2d_ctrl.entry] = ADCH;

                if(a2d_ctrl.entry < 0x07)
                {
                        EA = FALSE;
                        io_control_byte &= ~A2D_MUX_CTRL;        /*select the off board anal
og mux channel desired*/
                        io_control_byte |= a2d_ctrl.next_mux;

                        port4_image &= ~CS1;
                        P4 = port4_image;

                        *CONTROL_BYTE = io_control_byte;

                        port4_image |= CS1;
                        P4 = port4_image;

                        EA = TRUE;

                        ++a2d_ctrl.next_mux;    /* set up next off board analog mux channel
to read*/

                        ADCON = (a2d_ctrl.next_ch | START_A2D);
                }

                else
                {
                        ++a2d_ctrl.next_ch;     /*we are using the on board analog mux */

                        ADCON = (a2d_ctrl.next_ch | START_A2D);
```

```
                }

                ++a2d_ctrl.entry;
        }

        else a2d_ctrl.complete = A2D_DONE;

}

/*
** FUNCTION:
**              handle_character: takes rx_char and determines if it fits into the
**                                                              packet according to the recieve stat
e machine
**

** Input Definitions:
**                                                              rx_char:        is the character rec
ieved by the serial port
**                                                              ptr: is a pointer to the recieve buf
fer structure.
**
**   Returned Values:
**                                      No values returned
**
*/

void handle_character(rx_char,ptr)      using 2
uchar rx_char;
struct channel *ptr;
{
        switch(ptr->state)
        {

                case RECIEVE_SYNC:
```

```
        if(rx_char == SYNC)
        {
                ++ptr->state;
                ptr->checksum = SYNC;
        }
break;

case RECIEVE_OPCODE:    /*we are expecting one of several possible opcodes*/
        if(rx_char < 0x07)
        {
                ptr->inservice = ptr->put;
                ptr->buffer[ptr->inservice].flag = BUSY;
                ptr->char_ptr = &(ptr->buffer[ptr->inservice].storage[0]);
                *(ptr->char_ptr++) = rx_char;
                ptr->checksum += rx_char;

                ptr->state = RECIEVE_LENGTH;
        }
        else ptr->state = SYNC;

break;

case RECIEVE_LENGTH:
        if(rx_char > 0x10)
        {
                ptr->state = SYNC;
                return;
        }
        ptr->packet_len = rx_char;
        *(ptr->char_ptr++) = rx_char;
        ptr->checksum += rx_char;

        if(ptr->packet_len) ptr->state = RECIEVE_DATA;

        else ptr->state = CHECKSUM;
```

10891.C

```
                break;

                case RECIEVE_DATA:      /*we suck up the number of bytes specified in packet
_len when packet_len =0 bump state */

                        ptr->checksum += rx_char;
                        *(ptr->char_ptr++) = rx_char;

                        --ptr->packet_len;      /*decrement the i-field length indicator*/

                        if((ptr->packet_len) == 0)++ptr->state;

                 break;

                case CHECKSUM:
                                /*this byte should equal the checksum we've calculated*/
                                /*at this time we mark the buffer as use able or plac it bac
k on the que for use*/
                                /*if tag it as useable we must bump the put pointer for the
next available que*/

                        if (((rx_char + ptr->checksum )& 0x00ff) == 0x00)
                        {
                                *(ptr->char_ptr++) = rx_char;
                                ptr->buffer[ptr->inservice].flag = READY;       /*tag the bu
ffer ready for processing by the main loop*/
                                ++ptr->put;
                                if(ptr->put == MAX_BUFFER)ptr->put = 0; /*buffer pool has wr
apped around */

                                ptr->state = RECIEVE_SYNC;      /*put packet state back to l
ooking for stx byte*/
                        }
                        else
```

```
                        {         /*return the allocated buffer to the pool*/

                                ptr->buffer[ptr->inservice].flag = IDLE;
                                ptr->state = RECIEVE_SYNC;

                        }
                break;

                default:
                        ptr->state = RECIEVE_SYNC;      /*put packet state back to looking f
or stx byte*/
                break;
        }
}

/*
** FUNCTION:
**
**                                                      clear_memory: sets "x" bytes of memory to ze
ro.
** Input Definitions:
**                                                              clear_pointer = the starting address
 to set to zero
**                                                              locations = the number of bytes to s
et to zero
**
**   Returned Values:
**                                              No values returned
**
*/
void clear_memory(clear_pointer,locations)
void *clear_pointer;
uint locations;
{
        uchar *memroy_pointer;
```

10891.C

```
        uint cnt;

        memroy_pointer = clear_pointer;

        for(cnt = 0;cnt < locations;cnt++)*memroy_pointer++ = 0;
}


/*
** FUNCTION:
**
**                                    kick_the_dog: honors the watch dog to keep it from b
yting us in
**                                                                       the ass

** Input Definitions:
**                                                       No parameters
**
**   Returned Values:
**                                    No values returned
**
*/
void kick_the_dog(power_up)
uchar power_up;
{
        if(!timers[DOG_FOOD] || power_up)
        {
                PCON |= 0X10;   /*you have to do this to enable writting to the dog */

                T3 = 0X01;              /*This equates to about 600ms of timeout */

                timers[DOG_FOOD] = FOURTH_SECOND;
        }

}
```

10891.C

```
/*
** FUNCTION:
**              int_serial:checks to see if a character has been recieved or if
**                                     there is another character to transmit
**
** Input Definitions:
**                                              No parameters
**
**   Returned Values:
**                                    No values returned
**
*/
void initialize_system(){

        /*****************************************************
        ** configure all the internal registers first
        ******************************************************/
        port1_image = 0x00;
        port1_image &= ~TRANSMIT_MUTE_ON; /*before doing anything shut the transmitter off*/
        P1 = port1_image;

        port1_image = 0xff;
        port1_image &= ~TRANSMIT_MUTE_ON; /*before doing anything shut the transmitter off*/
        P1 = port1_image;


        port4_image = 0x00;     /*set the lines of P4 to a known state*/
        P4 = port4_image;

        port4_image = 0xff;     /*set the lines of P4 to a known state*/
        P4 = port4_image;


        kick_the_dog(TRUE);

        IEN0 = 0X52;    /* ENABLE EXT0,TIMER0,ON BOARD SERIAL PORT, AND A2D*/
```

```
IEN1 = 0;                    /* ENABLE NO INTERRUPT SOURCES FROM THIS REGISTER*/

IP0 = 0X10;      /*GIVE A2D AND SERIAL PORT and TIMER 0 HIGHEST PRIORITY */
IP1 = 0;

PCON = 0;        /* SET SMOD = 0 */

TMOD = 0X21;     /* CONFIGURE TIMERS*/

TH1 = 0Xea;                  /* AUTO RELOAD VALUE FOR GENERATING A 1200 BAUD SERIAL STREA
M*/

TH0 = ONE_MILLI_SECOND_TICK_HI;
TL0 = ONE_MILLI_SECOND_TICK_LO;

TCON = 0X50;     /*TURN ON TIMERS AND CONFIGURE EXTERNAL INTERRUPT SOURCES LEVEL TRIG
GER INTERRUPTS*/

S0CON = 0X50;    /* ENABLE ON BOARD SERIAL PORT*/

/* CLEAR ALL STRUCTURES OUT to START WITH */

kick_the_dog(TRUE);

clear_memory(&synth_rd_sw,(uint)sizeof(struct synth_sw));
synth_rd_sw.old_sw = 0XFF;        /*THIS GUARNTEES THE SWITCHES WONT MATCH THE FIRST T
IME*/

clear_memory(&idu,(uint)sizeof(struct data_base));
clear_memory(&a2d_ctrl,(uint)sizeof(struct a2d_manager));

clear_memory(&tx,(uint)sizeof(struct channel));
clear_memory(&rx,(uint)sizeof(struct channel));
clear_memory(&synthesizer_control,(uint)sizeof(struct synth_manager));
clear_memory(&rcvr_table,(uint)sizeof(struct receive_level));
```

10891.C

```
        clear_memory(&a2d_voltages[0],MAX_ODU_VOLTAGES);
        clear_memory(&timers[0],MAX_NUMBER_OF_TIMERS);

        e2_read(&configuration.ser_num1,REVISION_DATA,sizeof(struct config_str),PAGE_2,EEPRO
M_ADDR);

        value_2nd_plo =0;


        kick_the_dog(TRUE);

        init_serial();

        /* SET INITIAL TIMER VALUES */
        local_alarm = 0;

        timers[ALARM_COMPILIER] = FIFTH_SECOND;
        timers[A2D_TIMER] = EIGTH_SECOND;


/***************************testing*****************************/
        odu_control.idu_personality = TWO_MB;

        EA = TRUE;                /* ENABLE ALL INTERRUPTS AND AWAY WE GO */

        idu.plo_id = ((~(P1 & 0xf0)>>0x04) & 0x0f);

        PWM1 = 0x7f;

        PWM0 = 0x7f;

        ADCON = 0;

        control_2nd_plo(FALSE);

        init_a2d_values();
```

10891.C

```
#include <REG552.h>
#include "10891def.h"
#include "10891str.h"

extern void clear_memory(void *,uint), kick_the_dog(uchar);
extern uchar e2_write(uchar*, uchar, uchar, uchar,uchar);
extern uchar e2_read(uchar*, uchar, uchar, uchar, uchar);

extern void build_agc_curve();
extern uchar verify_checksum(void*,uchar);

extern code uchar a2d_max_in[],a2d_min_in[],a2d_max_out[],a2d_min_out[];

void alarm_compilier();
void freq_ctrl();
void a2d();
void ctrl_outputs();
void control_2nd_plo(uchar);
void synthesizer();
void determine_av_offset();
uchar agc_search(uint);
void read_switches();
/*
** FUNCTION:
**                        alarm_compilier: This task is woken up by the completion of a2d conv
ersions
**                                                                              the voltages are the
n compared to min and max values and
**                                                                              deemed in alarm or n
ot.
**

** Input Definitions:
**                                                            No parameters
**
```

```
**   Returned Values:
**                                     No values returned
**
*/
void alarm_compilier(){

        uint *ptr;
        /***************************************************************************
        ** before calculating analog voltages alarms determine if the correct analog
        ** voltages offset due to temprature is selected. do this by reading the
        ** current temprature and deciding which table should be read from the e2prom
        ** and stored into a2d_min_in & a2d_max_in offset
        ***************************************************************************/

        determine_av_offset();

        /************************************************************************
        ** calculate the analog voltages alarms for speed we will do this the
        ** brute force method, and compare the voltagess one at a time to the min
        ** and max values and or in the appropriate bit to the idu
        ************************************************************************/

        if((a2d_voltages[0]  >= (a2d_max_in[0] + a2d_max_offset[0])) ||
          (a2d_voltages[0] <= (a2d_min_in[0]  + a2d_min_offset[0])))idu.alarm0 |= 0x01;

        else if(((a2d_min_out[0]  + a2d_min_offset[0]) <= a2d_voltages[0]) &&
          (a2d_voltages[0] <= (a2d_max_out[0] + a2d_max_offset[0])))idu.alarm0 &= 0xfe; /*cl
ear */

        if((a2d_voltages[1]  >= (a2d_max_in[1] + a2d_max_offset[1])) ||
          (a2d_voltages[1]  <= (a2d_min_in[1]  + a2d_min_offset[1])))idu.alarm0 |= 0x02;

        else if(((a2d_min_out[1]  + a2d_min_offset[1]) <= a2d_voltages[1]) &&
          (a2d_voltages[1]      <= (a2d_max_out[1] + a2d_max_offset[1])))idu.alarm0 &= 0xfd;
        /*clear */
```

```
if((a2d_voltages[2]  >= (a2d_max_in[2] + a2d_max_offset[2])) ||
  (a2d_voltages[2] <= (a2d_min_in[2]  + a2d_min_offset[2])))idu.alarm0 |= 0x04;

else if(((a2d_min_out[2]  + a2d_min_offset[2]) <= a2d_voltages[2]) &&
  (a2d_voltages[2]       <= (a2d_max_out[2] + a2d_max_offset[2])))idu.alarm0 &= 0xfb;
/*clear */

if((a2d_voltages[3]  >= (a2d_max_in[3] + a2d_max_offset[3])) ||
  (a2d_voltages[3]  <= (a2d_min_in[3]  + a2d_min_offset[3])))idu.alarm0 |= 0x08;

else if(((a2d_min_out[3]  + a2d_min_offset[3]) <= a2d_voltages[3]) &&
  (a2d_voltages[3]       <= (a2d_max_out[3] + a2d_max_offset[3])))idu.alarm0 &= 0xf7;
/*clear */

if((a2d_voltages[4]  >= (a2d_max_in[4] + a2d_max_offset[4])) ||
  (a2d_voltages[4]  <= (a2d_min_in[4]  + a2d_min_offset[4])))idu.alarm0 |= 0x10;

else if(((a2d_min_out[4]  + a2d_min_offset[4]) <= a2d_voltages[4]) &&
        (a2d_voltages[4] <= (a2d_max_out[4] + a2d_max_offset[4])))idu.alarm0 &= 0xef
;       /*clear */

if(a2d_voltages[5] <= (a2d_min_out[5]  + a2d_min_offset[5]))idu.alarm0 |= 0x20; /*

else if(a2d_voltages[5]  >= (a2d_max_in[5] + a2d_max_offset[5]))idu.alarm0 &= 0xdf;

if(a2d_voltages[6] <= (a2d_min_out[6]  + a2d_min_offset[6]))idu.alarm0 |= 0x40;

else if(a2d_voltages[6]  >= (a2d_max_in[6] + a2d_max_offset[6]))idu.alarm0 &= 0xbf;

if((a2d_voltages[7]  >= (a2d_max_in[7] + a2d_max_offset[7])) ||
  (a2d_voltages[7]  <= (a2d_min_in[7]  + a2d_min_offset[7])))idu.alarm0 |= 0x80;

else if(((a2d_min_out[7]  + a2d_min_offset[7]) <= a2d_voltages[7]) &&
        (a2d_voltages[7] <= (a2d_max_out[7] + a2d_max_offset[7])))idu.alarm0 &= 0x7f
;       /*clear */
```

CONTROL.C

```
        if((a2d_voltages[8]  >= (a2d_max_in[8] + a2d_max_offset[8])) ||
          (a2d_voltages[8]  <= (a2d_min_in[8]  + a2d_min_offset[8])))idu.alarm1 |= 0x01;

        else if(((a2d_min_out[8]  + a2d_min_offset[8]) <= a2d_voltages[8]) &&
                (a2d_voltages[8] <= (a2d_max_out[8] + a2d_max_offset[8])))idu.alarm1 &= 0xfe
;       /*clear */

        if((a2d_voltages[9]  >= (a2d_max_in[9] + a2d_max_offset[9])) ||
          (a2d_voltages[9]  <= (a2d_min_in[9]  + a2d_min_offset[9])))idu.alarm1 |= 0x02;

        else if(((a2d_min_out[9]  + a2d_min_offset[9]) <= a2d_voltages[9]) &&
                (a2d_voltages[9] <= (a2d_max_out[9] + a2d_max_offset[9])))idu.alarm1 &= 0xfd
;       /*clear */

        if (a2d_voltages[10] <= (a2d_min_out[10] + a2d_min_offset[10]))idu.alarm1 |= 0x04;

        else if(a2d_voltages[10]  >= (a2d_max_in[10] + a2d_max_offset[10]))idu.alarm1 &= 0xf
b;

        /*
         * ??? This is a temp patch to not check for an alarm if
         * input power is less then 1.5 voltage
         */
        if (milliwave_power_out > 0x4c)
        {
                if((a2d_voltages[11]  >= (a2d_max_in[11] + a2d_max_offset[11])) ||
                  (a2d_voltages[11]  <= (a2d_min_in[11]  + a2d_min_offset[11])))idu.alarm1 |
= 0x08;

                else if(((a2d_min_out[11]  + a2d_min_offset[11]) <= a2d_voltages[11]) &&
                        (a2d_voltages[11] <= (a2d_max_out[11] + a2d_max_offset[11])))idu.ala
rm1 &= 0xf7;
        }
        else
            idu.alarm1 &= 0xf7;
/* no mixer current to measure
```

```
        if((a2d_voltages[12]  >= (a2d_max_in[12] + a2d_max_offset[12])) ||
          (a2d_voltages[12]  <= (a2d_min_in[12]  + a2d_min_offset[12])))idu.alarm1 |= 0x10;

        else if(((a2d_min_out[12]  + a2d_min_offset[12]) <= a2d_voltages[12]) &&
                (a2d_voltages[12] <= (a2d_max_out[12] + a2d_max_offset[12])))idu.alarm1 &= 0
xef;
*/
        if(a2d_voltages[13] <= (a2d_min_out[13]  + a2d_min_offset[13]))idu.alarm1 |= 0x20;
/*

        else if(a2d_voltages[13]  >= (a2d_max_in[13] + a2d_max_offset[13]))idu.alarm1 &= 0xd
f;

        idu.alarm2 |= (local_alarm & E2_FAIL); /* set e2prom failure if applicable*/

        ctrl_outputs();

        if(!(port1_image & TRANSMIT_MUTE_ON) || (idu.alarm0 & PLO2_LOCKED)
                || (idu.alarm1 & FS_LOCKED))idu.alarm2 |= TRANSMIT_MUTE_ACTIVE; /* set xmt m
ute active in bit map*/
        else idu.alarm2 &= ~TRANSMIT_MUTE_ACTIVE;                /*else clear bit*/

        if(plo2.a < 62 || plo2.a > 102)idu.alarm2 |= AFC_OUT_OF_RANGE;
        else idu.alarm2 &= ~AFC_OUT_OF_RANGE;

        if(local_alarm & TELEMETRY_ERROR)idu.alarm2 |= TELEMETRY_ERROR;
        else idu.alarm2 &= ~TELEMETRY_ERROR;

        idu.alarm2 |= PILOT_BIT;

        idu.sw_rev = REV;

        a2d_ctrl.complete = A2D_READY;
```

```
        timers[ALARM_COMPILIER] = FIFTH_SECOND;
}

/*
** FUNCTION:
**                              a2d:    This process sets up the analog mux and star
ting parameters and then
**                                              starts the a2d conversion under inte
rrupt control.
**
** Input Definitions:
**                                              No parameters
**
**   Returned Values:
**                              No values returned
**
*/
void a2d(){

        a2d_ctrl.entry = 0;             /* set for a to d converion to begin at first enty i
n table */

        a2d_ctrl.next_ch = 0;

        a2d_ctrl.next_mux = 0x01;       /*next value to write to off board analog mux*/

        a2d_ctrl.complete = A2D_BUSY;

        EA = FALSE;

        io_control_byte &= ~A2D_MUX_CTRL;

        port4_image &= ~CS1;
        P4 = port4_image;
```

```
        *CONTROL_BYTE = io_control_byte;

        port4_image |= CS1;
        P4 = port4_image;

        EA = TRUE;

        ADCON = (a2d_ctrl.next_ch | START_A2D); /*start a2d converion with interrupt*/

        timers[A2D_TIMER] = EIGTH_SECOND;

}


/*
** FUNCTION:
**                                    ctrl_outputs:
**                                                 After the alarm status has been dete
rmined of ODU then its time
**                                                 to control Milliwave,agc test point,
 and the transmit mute control line
**
** Input Definitions:
**                                                 No parameters
**
**   Returned Values:
**                                    No values returned
**
*/
void ctrl_outputs(){

        signed int      temp_voltages;
        signed int      temp_voltages1;
        uchar rcv_level;

        /*****************************************************************************
```

CONTROL.C

```
** mute the transmitter if the IDU says so
*************************************************************************/

if(mute_transmitter || (synthesizer_control.configured == FALSE))
        port1_image &= ~TRANSMIT_MUTE_ON;

else port1_image |= TRANSMIT_MUTE_ON;

P1 = port1_image;

/************************************************************************
** the following code converts the agc voltages read to an 8 bit number and
** updates the PWM  this is where the RSSI voltages and the PIN ATTN voltages
** will be evaluated and a table sort will be performed to determine the RCV]
** level and the appropriate value for the PWM to reperesent the RCV level
** will be out put
************************************************************************/


PWM0 = a2d_voltages[AGC_INDEX];

idu.rcvr_level = a2d_voltages[AGC_INDEX];

/** The following line is used if AGC volts is to be translated to Recieve signal level***/

        rcvr_table.rcvr_level = agc_search(a2d_voltages[AGC_INDEX]);
/*      PWM0 = (rcvr_table.rcvr_level);  output reciev dbm level to pwm test point in milli
volts WE USE TO ADD 1*/
/*      idu.rcvr_level = rcvr_table.rcvr_level; place the value in the alarm image*/

        PWM1 = milliwave_power_out;
}

/*
** FUNCTION:
**                              synthesizer:
```

```
**                                                          This routine is woken up by the tele
m_io routine when synthesizer switch
**                                                          settings have been recieved. Then ba
se on the IDU personality (2mb or 8mb)
**                                                          along with the PLO_ID (hi band or lo
 band) a divide by count for the Plessy
**                                                          8861 part is calculated and  written
 serially to the 8861
** Input Definitions:
**                                                          No parameters
**
**   Returned Values:
**                                       No values returned
**
*/
void synthesizer(){

        unsigned long divide_by, counter_m,counter_a,mask;
        uchar count,channel;


        kick_the_dog(TRUE);     /*UNCONDITIONALLY PET THE DOG THIS TAKES AWHILE*/

        synthesizer_control.reference = 0x33;

        synthesizer_control.divider_control = 0xe00002;

        if(idu.plo_id == 3 || idu.plo_id == 4)
                channel = ((80/odu_control.idu_personality) - odu_control.synthesizer_settin
g) + 1;

        else channel = odu_control.synthesizer_setting;

        divide_by = 1093 - ((channel - 1)*(odu_control.idu_personality*2) + (odu_control.idu
_personality -1));
```

CONTROL.C

```
counter_m = divide_by/16;

synthesizer_control.divider_control |= (counter_m << 0x06);

counter_a = divide_by - (counter_m * 16);

synthesizer_control.divider_control |= (counter_a << 0x02);

mask = 0x020000;

EA = FALSE;
port4_image |= FREQ_ENABLE;
port4_image &= ~FREQ_CLOCK;        /*SET FALLING EDGE OF CLOCK*/
port4_image &= ~FREQ_F1_F2;
P4 = port4_image ;
EA = TRUE;

timers[SYNTH_DELAY] = 2;
while(timers[SYNTH_DELAY]);

for(count = 0; count < 18; count++)
{
        EA = FALSE;
        if(synthesizer_control.reference & mask)port4_image |= FREQ_DATA;        /*
set or clear data bit accordingly*/
        else port4_image &= ~FREQ_DATA;
        P4 = port4_image;
        EA = TRUE;

        timers[SYNTH_DELAY] = 2;
        while(timers[SYNTH_DELAY]);

        EA = FALSE;
        port4_image |= FREQ_CLOCK;      /*SET RISING EDGE OF CLOCK*/
        P4 = port4_image;
        EA = TRUE;
```

```
                timers[SYNTH_DELAY] = 2;
                while(timers[SYNTH_DELAY]);

                mask = mask >> 0x01;

                EA = FALSE;
                port4_image &= ~FREQ_CLOCK;        /*SET FALLING EDGE OF CLOCK*/
                P4 = port4_image ;
                EA = TRUE;
        }

        EA = FALSE;
        port4_image &= ~FREQ_ENABLE;               /* LATCH THE SHIFTED VALUE*/
        P4 = port4_image ;
        EA = TRUE;

        EA = FALSE;
        port4_image |= FREQ_ENABLE;
        P4 = port4_image ;
        EA = TRUE;

        mask = 0x800000;

        for(count = 0; count < 24; count++)
        {
                EA = FALSE;
                if(synthesizer_control.divider_control & mask)port4_image |= FREQ_DATA;    /*
set or clear data bit accordingly*/
                else port4_image &= ~FREQ_DATA;
                P4 = port4_image;
                EA = TRUE;

                timers[SYNTH_DELAY] = 2;
                while(timers[SYNTH_DELAY]);
                EA = FALSE;
```

```
            port4_image |= FREQ_CLOCK;      /*SET RISING EDGE OF CLOCK*/
            P4 = port4_image;
            EA = TRUE;

            timers[SYNTH_DELAY] = 2;
            while(timers[SYNTH_DELAY]);

            mask = mask >> 0x01;

            EA = FALSE;
            port4_image &= ~FREQ_CLOCK;     /*SET FALLING EDGE OF CLOCK*/
            P4 = port4_image ;
            EA = TRUE;
        }

        EA = FALSE;
        port4_image &= ~FREQ_ENABLE;        /* LATCH THE SHIFTED VALUE*/
        P4 = port4_image ;
        EA = TRUE;

        synthesizer_control.mode = FALSE;
        synthesizer_control.configured = TRUE;
}


/*
** FUNCTION:
**
**                          determine_av_offset: Currently this routine is setup to dete
rmine the
**                                                                    current temperature
(hot,cold,or normal)and then download
**                                                                    from the eeprom the
```

```
analog voltage offset for determining                                   if the AVs are in al
**
arm.
** Input Definitions:
**                                                  No parameters
**
**   Returned Values:
**                                       No values returned
**
*/
void determine_av_offset(){

        uchar result,result1,result2;

        if(a2d_voltages[TEMP_INDEX] > HOT_LO){

                if(a2d_ctrl.current_temp_offset != HOT){

                        result = e2_read(&a2d_min_offset[0],HOT_MIN_INDEX,OFFSET_LENGTH,0,EE
PROM_ADDR);

                        if(result == FALSE || (!verify_checksum(&a2d_min_offset[0],OFFSET_LE
NGTH)))clear_memory(&a2d_min_offset[0],MAX_ODU_VOLTAGES);

                        result1 = e2_read(&a2d_max_offset[0],HOT_MAX_INDEX,OFFSET_LENGTH,0,E
EPROM_ADDR);

                        if(result1 == FALSE || (!verify_checksum(&a2d_max_offset[0],OFFSET_L
ENGTH)))clear_memory(&a2d_min_offset[0],MAX_ODU_VOLTAGES);

                        result2 = e2_read(&agc_correction[0],HOT_AGC,AGC_LENGTH,1,EEPROM_ADD
R);

                        if(result2 == FALSE || (!verify_checksum(&agc_correction[0],AGC_LENG
TH)))clear_memory(&a2d_min_offset[0],(AGC_LENGTH-1));
```

```
                        a2d_ctrl.current_temp_offset = HOT;

                        if(!result1 || !result || !result2)local_alarm |= E2_FAIL;       /*SE
T E2 FAILURE BIT IN BIT MAP*/

                        else local_alarm &= ~E2_FAIL;

                        build_agc_curve();
                }
        }

        else if(a2d_voltages[TEMP_INDEX] < COLD_HI){

                if(a2d_ctrl.current_temp_offset != COLD){

                        result = e2_read(&a2d_min_offset[0],COLD_MIN_INDEX,OFFSET_LENGTH,0,E
EPROM_ADDR);

                        if(result == FALSE || (!verify_checksum(&a2d_min_offset[0],OFFSET_LE
NGTH)))clear_memory(&a2d_min_offset[0],MAX_ODU_VOLTAGES);

                        result1 = e2_read(&a2d_max_offset[0],COLD_MAX_INDEX,OFFSET_LENGTH,0,
EEPROM_ADDR);

                        if(result1 == FALSE || (!verify_checksum(&a2d_max_offset[0],OFFSET_L
ENGTH)))clear_memory(&a2d_min_offset[0],MAX_ODU_VOLTAGES);

                        result2 = e2_read(&agc_correction[0],COLD_AGC,AGC_LENGTH,1,EEPROM_AD
DR);

                        if(result2 == FALSE || (!verify_checksum(&agc_correction[0],AGC_LENG
TH)))clear_memory(&a2d_min_offset[0],(AGC_LENGTH-1));

                        a2d_ctrl.current_temp_offset = COLD;

                        if(!result1 || !result || !result2)local_alarm |= E2_FAIL;       /*SE
```

CONTROL.C

```
T E2 FAILURE BIT IN BIT MAP*/
                        else local_alarm &= ~E2_FAIL;

                        build_agc_curve();
                }
        }
        else if(a2d_ctrl.current_temp_offset != NORMAL){

                result = e2_read(&a2d_min_offset[0],NORMAL_MIN_INDEX,OFFSET_LENGTH,0,EEPROM_
ADDR);

                if(result == FALSE || (!verify_checksum(&a2d_min_offset[0],OFFSET_LENGTH)))c
lear_memory(&a2d_min_offset[0],MAX_ODU_VOLTAGES);

                result1 = e2_read(&a2d_max_offset[0],NORMAL_MAX_INDEX,OFFSET_LENGTH,0,EEPROM
_ADDR);

                if(result1 == FALSE || (!verify_checksum(&a2d_max_offset[0],OFFSET_LENGTH)))
clear_memory(&a2d_min_offset[0],MAX_ODU_VOLTAGES);

                result2 = e2_read(&agc_correction[0],NORMAL_AGC,AGC_LENGTH,1,EEPROM_ADDR);

                if(result2 == FALSE || (!verify_checksum(&agc_correction[0],AGC_LENGTH)))cle
ar_memory(&a2d_min_offset[0],(AGC_LENGTH-1));

                a2d_ctrl.current_temp_offset = NORMAL;

                if(!result1 || !result || !result2)local_alarm |= E2_FAIL;        /*SET E2 FAI
LURE BIT IN BIT MAP*/

                else local_alarm &= ~E2_FAIL;

                build_agc_curve();
        }
```

```
}

/*
** FUNCTION:
**                                  agc_search:
**                                                      does a binary search through a table
 to determine the receive signal
**                                                      signal level
**
** Input Definitions:
**                                                      value is the agc analog voltage read
ing.
**
**   Returned Values:
**                                  a representation of the receive signal level at the
antenna in dBm
**
*/
uchar agc_search(value)
uint value;
{
        uchar search;
        uint delta_lo,delta_hi;

        search = TRUE;

        rcvr_table.higher = 0;
        rcvr_table.lower = 99;
        rcvr_table.current_dbm = 50;

        while(search){

                if(value == agc_actual[rcvr_table.current_dbm])search = FALSE;

                else if(value < agc_actual[rcvr_table.current_dbm]){
```

```
                        rcvr_table.lower = rcvr_table.current_dbm;

                        rcvr_table.current_dbm = ((rcvr_table.current_dbm - rcvr_table.highe
r)/2) + rcvr_table.higher;
                }

                else if(value > agc_actual[rcvr_table.current_dbm]){

                        rcvr_table.higher = rcvr_table.current_dbm;

                        rcvr_table.current_dbm += (rcvr_table.lower - rcvr_table.current_dbm
)/2;
                }

                [illegible]

                search = FALSE;

                delta_lo = agc_actual[rcvr_table.higher] - value;
                delta_hi = agc_actual[rcvr_table.lower] - value;

                if(delta_lo < (~delta_hi))rcvr_table.current_dbm = rcvr_table.lower;

                else rcvr_table.current_dbm = rcvr_table.higher;
                }
        }

        if(rcvr_table.current_dbm < 10)rcvr_table.current_dbm = 10;
        if(rcvr_table.current_dbm > 90)rcvr_table.current_dbm = 90;

        return(rcvr_table.current_dbm);
}

/*
** FUNCTION:
```

CONTROL.C

```
**                                    control_2nd_plo:
**                                            This routine handles the serial configuration of the
 2nd plo IC
**                                            When this routine is called a parameter is passed in
dicating wether
**                                            to advance or retard by 50 Khz.
** Input Definitions:
**                                                            No parameters
**
**   Returned Values:
**                                            No values returned
**
*/
void control_2nd_plo(uchar which_way)
{
        [illegible]
        uchar count;

        kick_the_dog(TRUE);      /*UNCONDITIONALLY PET THE DOG THIS TAKES AWHILE*/

        if(which_way == UP && (plo2.a < 102))plo2.a += 1; /*Dont let the plo drift 2 mega he
rtz*/

        else if(which_way == DOWN && (plo2.a > 62))plo2.a -= 1; /*Dont let the plo drift 2 m
ega hertz*/

        else if(which_way == FALSE)
        {
                plo2.a = 82;
                plo2.m = 189;
        }
        else return;

        value = 0x8001; /*8000 =128 prescaler , 280 = divide by value, 0x01 = reference regi
ster*/
```

CONTROL.C

```
value |= (369 <<0x01);

mask = 0x8000;

EA = FALSE;
port4_image &= ~PLO_ENABLE;
port4_image &= ~PLO_CLOCK;        /*SET FALLING EDGE OF CLOCK*/
P4 = port4_image ;
EA = TRUE;

timers[SYNTH_DELAY] = 2;
while(timers[SYNTH_DELAY]);

for(count = 0; count < 0x10; count++){
        EA = FALSE;
        [illegible]
cordingly*/
        else port4_image &= ~PLO_DATA;
        P4 = port4_image;
        EA = TRUE;

        timers[SYNTH_DELAY] = 2;
        while(timers[SYNTH_DELAY]);

        EA = FALSE;
        port4_image |= PLO_CLOCK;        /*SET RISING EDGE OF CLOCK*/
        P4 = port4_image;
        EA = TRUE;

        timers[SYNTH_DELAY] = 2;
        while(timers[SYNTH_DELAY]);

        mask = mask >> 0x01;

        EA = FALSE;
        port4_image &= ~PLO_CLOCK;       /*SET FALLING EDGE OF CLOCK*/
```

```
        P4 = port4_image;
        EA = TRUE;
    }

    EA = FALSE;
    port4_image |= PLO_ENABLE;              /* LATCH THE SHIFTED VALUE*/
    P4 = port4_image ;
    EA = TRUE;

    mask = 0x080000;

    value = plo2.m << 0x09;
    value |= plo2.a << 0x01;


    EA = FALSE;
    port4_image &= ~PLO_ENABLE;
    P4 = port4_image ;
    EA = TRUE;

    timers[SYNTH_DELAY] = 2;
    while(timers[SYNTH_DELAY]);

    for(count = 0; count < 20; count++){
        EA = FALSE;
        if(value & mask)port4_image |= PLO_DATA;          /*set or clear data bit ac
cordingly*/
        else port4_image &= ~PLO_DATA;
        P4 = port4_image;
        EA = TRUE;

        timers[SYNTH_DELAY] = 2;
        while(timers[SYNTH_DELAY]);

        EA = FALSE;
        port4_image |= PLO_CLOCK;       /*SET RISING EDGE OF CLOCK*/
```

```
                P4 = port4_image;
                EA = TRUE;

                timers[SYNTH_DELAY] = 2;
                while(timers[SYNTH_DELAY]);

                mask = mask >> 0x01;

                EA = FALSE;
                port4_image &= ~PLO_CLOCK;        /*SET FALLING EDGE OF CLOCK*/
                P4 = port4_image;
                EA = TRUE;
        }

        EA = FALSE;
        port4_image |= PLO_ENABLE;                /* LATCH THE SHIFTED VALUE*/
        P4 = port4_image ;
        EA = TRUE;

        plc2_not_programmed = FALSE;
}

/*
** FUNCTION:
**                              read_switches:
**                                      If the p3.3 is low this routine is c
alled to read the local
**                                      decimal switches used to set the des
ired synthesizer channel
**                                      the switches are read every second a
nd two consecutive values
**                                      must be read for the switches to be
considered valid.
**
** Input Definitions:
```

```
**                                                  No parameters
**
**    Returned Values:
**                                        No values returned
**
*/
void read_switches()
{
        uchar temp_msb,temp_lsb;

        EA = FALSE;

        port4_image &= ~CS1;

        P4 = port4_image;

        temp_switch = ~(*SYNTH_SWITCHES);

        port4_image |= CS1;

        P4 = port4_image;

        EA = TRUE;

        synth_rd_sw.new_sw = temp_switch;

        switch(synth_rd_sw.times_read)
        {
        case 0:
                if(synth_rd_sw.new_sw != synth_rd_sw.old_sw)
                {
                        ++synth_rd_sw.times_read;
                        synth_rd_sw.old_sw = synth_rd_sw.new_sw;

                        timers[READ_SWITCH] = SECONDS_1;
                }
```

CONTROL.C

```
            else
            {
                    timers[READ_SWITCH] = SECONDS_1;
            }
        break;

        case 1:
            if(synth_rd_sw.new_sw != synth_rd_sw.old_sw)
            {
                    synth_rd_sw.old_sw = synth_rd_sw.new_sw;

                    timers[READ_SWITCH] = SECONDS_1;
            }
            else
            {
                    synthesizer_control.msb = UPDATE;

                    synth_rd_sw.times_read = 0;

                    timers[READ_SWITCH] = SECONDS_1;

                    temp_msb = (synth_rd_sw.new_sw >> 0x04) * 10;

                    odu_control.synthesizer_setting = temp_msb + (synth_rd_sw.new_sw & 0
x0f);
            }

        break;

        }/*end switch(synth_rd_sw.times_read)*/
}
```

```
#include <REG552.h>
#include "10891def.h"
#include "10891str.h"

void milliwave_control();

void milliwave_control()
{

        timers[ADJUST_OUTPUT_POWER] = SECONDS_60;

}
```

NOVRAM.C

```
#include <REG552.h>
#include <novram.h>
#include <10891def.h>

extern void kick_the_dog(uchar);        /*
                                             ** It can take some time to read from the e2
prom (5ms)
                                             ** we may need to keep the dog happy
                                             */

/*
** NOTE: The e2prom is expected to be interfaced to the micro processor Port1
** There must be a global variable called port1_image that will be used to interface
** to the e2prom.
*/

uchar e2_write(uchar*, uchar, uchar, uchar,uchar);
uchar e2_read(uchar*, uchar, uchar, uchar, uchar);
void send_ack(void);
void send_byte(uchar);
uchar rcv_ack(void);
void e2clk(uchar);
void e2data(uchar);


extern idata unsigned char   port1_image;
extern xdata unsigned int               timers[];

/*
** FUNCTION: WRITE A VARIABLE NUMBER OF BYTES TO THE 24C04 EEPROM
**
** Input Definitions:
**           *source - pointer to start of data to transmit.
**           e2_addr - starting eeprom address to write to.
**           length - number of bytes to write to eeprom.
```

NOVRAM.C

```
**                   if dummy write, length must be >0.
**          sheet - 0 or 1. if dummy write then 2 or 3.
**          device_addr - 0 = ACM novram 1 = SPM

**    Returned Values:
**                                TRUE if successful
**                                FALSE otherwise
**
*/

uchar e2_write(source, e2_addr, length, sheet,device_addr)
uchar *source, e2_addr, length, sheet, device_addr;
{
        uchar command, index;
        uint x;

   e2data(SET);

        while(length)
        {

                command = (0xa0 | ((sheet<<1) & 0x02));

                /*
                ** First we poll eeprom to see if internal write cycle is in progress.
                ** If it is, wait until it's finished.  If the device is bad, the
                ** watchdog will eventually bite us.
                **
                */

                timers[E2PROM_TMR] = SECONDS_50MS;

                do{

        e2clk(SET);              /* Generate a start bit */
        e2data(CLR);
```

NOVRAM.C

```
   e2clk(CLR);
            send_byte(command);

            kick_the_dog(FALSE);

         }
         while(timers[E2PROM_TMR] && !rcv_ack());

         if(!timers[E2PROM_TMR])return(FALSE);

         /*
         ** Now we can initiate start of transmission
         */

         e2data(SET);         /* Generate a start bit */
e2clk(SET);
e2data(CLR);
e2clk(CLR);

         /*
         ** Send device identifier, device address,
         ** sheet, and write command byte
         */

         send_byte(command);

         if (!rcv_ack()) return(FALSE);

         /*
         ** send storage address
         */

send_byte(e2_addr);
         if (!rcv_ack()) return(FALSE);
```

NOVRAM.C

```
          if(sheet & 0x02) break;
          /*
          ** if bit one of sheet is set, this is a dummy write
          */

          /*
          ** Now the chip is set up so
          ** send 1 to 16 data bytes at a time
**
** Loop will stop if we reach 16 bytes,
**      or if we reach the end of a page
**      or if we run out of data
          */

          for(index=0; index<16; index++)
          {
                  send_byte(*(source++));
                  if (!rcv_ack()) return (FALSE);
                  e2_addr++;

   if(!--length)break;

   if ((e2_addr & 0x0f)==0) break ;
          }

          /*
          ** Now the data has been sent, so
          ** send the stop bit
          */

     e2data(CLR);
e2clk(SET);
```

NOVRAM.C

```
      e2data(SET);

                  if(sheet & 0x02) break;

         }
         return(TRUE);
}


/*
** FUNCTION: READ A VARIABLE NUMBER OF BYTES FROM 24C04 EEPROM
**
** ARGUMENTS:
**           *data - pointer to destination of bytes being read.
**           e2_addr - eeprom address to read from.
**                         length - number of bytes to read.
**                         sheet - 0 or 1.
**           device_addr - 0 = ACM novram 1 - SPM
**
**   RETURNS: TRUE if successful
**                          FALSE otherwise
**
*/

uchar e2_read(destination, e2_addr, length, sheet,device_addr)
uchar *destination, e2_addr, length, sheet,device_addr;
{

        uchar byte, command, port1;
        char tidbit;
```

```
        /*
        ** First, do a dummy write to get the eeprom's attention
        */

        sheet |= 0x02;
        if (e2_write(destination, e2_addr, 1, sheet,device_addr)==FALSE)
                return (FALSE);


        /*
        ** Issue a start bit
        */

e2data(SET);
e2clk(SET);
e2data(CLR);
e2clk(CLR);


        /*
        ** send device identifier, device address,
        ** sheet, and write command byte
        */

        command = (0xa1 | ((sheet<<1) & 0x02));

        send_byte(command);

        if (!rcv_ack()) return (FALSE);

        /*
        ** read the number of bytes
        ** requested in length
```

```
	*/

	while(length--) {

		byte = 0;
		for(tidbit=7; tidbit>=0; tidbit--) {
			e2data(SET);
			e2clk(SET);
			byte |= ((P1 & 0x01)<<tidbit);
			e2clk(CLR);
		}

		*(destination++) = byte;

		if(length) send_ack();

	}

	/*
	** send stop bit
	*/

	e2data(CLR);
	e2clk(SET);
	e2data(SET);
	return(TRUE);
}

/**********************************************************************/
/*         SUPPORT FUNCTIONS FOR E2_READ AND E2_WRITE                 */
/**********************************************************************/

void send_ack(void)
```

```
{
        e2data(CLR);
        e2clk(SET);
        e2clk(SET);
        e2clk(CLR);
}


void send_byte(fodder)
uchar fodder;
{
         uchar trmtbit;
        signed char tidbit;

        for(tidbit=7; tidbit>=0; tidbit--) {
                trmtbit = fodder>>tidbit;

                e2data(trmtbit & 0x01);
                e2clk(SET);
                e2clk(SET);
                e2clk(CLR);
        }
}


uchar rcv_ack(void)
{
uchar result ;
/*
** New version returns result
** Returns TRUE if ACK and FALSE otherwise
*/

   e2data(SET);
   e2clk(SET);
   e2clk(SET);
```

```
   result = (P1 & 0x01)^0x01   ;
   e2clk(CLR);
   return(result);
}

void e2clk(bit1)
uchar bit1;
{
   port1_image = (port1_image & 0xFD) | (bit1 << 1);
   P1 = port1_image;
}


void e2data(bit0)
uchar bit0;
{
   port1_image = (port1_image & 0xFE) | bit0;
   P1 = port1_image;
}
```

TBL_CTRL.C

```
#include <REG552.h>
#include "10891def.h"
#include "10891str.h"

extern code uint agc_table[];


extern void clear_memory(void *,uint), kick_the_dog(uchar);
extern uchar e2_read(uchar*, uchar, uchar, uchar,uchar);

uchar verify_checksum(uchar *,uchar);
void build_agc_curve();
init_a2d_values();

/*
** FUNCTION:                        build_agc_curve: take characterized curve and adds a
**
 correction value if needed
**
**
** Input Definitions:
**                                          No parameters
**
**   Returned Values:
**                                  No values returned
**
*/
init_a2d_values(){

        uchar result,result1,result2,result3,result4;

        /*READ THE DEFAULT ALARM OFFSET POINTS FOR THE A2D CONVERTER*/

        result = e2_read(&a2d_min_offset[0],NORMAL_MIN_INDEX,OFFSET_LENGTH,0,EEPROM_ADDR);
```

TBL_CTRL.C

```
if(result == FALSE || (!verify_checksum(&a2d_min_offset[0],OFFSET_LENGTH)))clear_mem
ory(&a2d_min_offset[0],(uint)MAX_ODU_VOLTAGES);

kick_the_dog(FALSE);

result1 = e2_read(&a2d_max_offset[0],NORMAL_MAX_INDEX,OFFSET_LENGTH,0,EEPROM_ADDR);

if(result1 == FALSE || (!verify_checksum(&a2d_max_offset[0],OFFSET_LENGTH)))clear_me
mory(&a2d_max_offset[0],(uint)MAX_ODU_VOLTAGES);

kick_the_dog(FALSE);

result2 = e2_read(&agc_correction[0],NORMAL_AGC,AGC_LENGTH,1,EEPROM_ADDR);

if(result2 == FALSE || (!verify_checksum(&agc_correction[0],AGC_LENGTH)))clear_memor
y(&agc_correction[0],(uint)(AGC_LENGTH-1));

kick_the_dog(FALSE);

result3 = e2_read(&offset_adjust[0],0xfe,2,1,EEPROM_ADDR);

if(result3 == FALSE || ((offset_adjust[0] ^ offset_adjust[1]) != 0xff))offset_adjust
[0] = 0;

result4 = e2_read(&pwr_ctrl_rd[0],PWR_CTRL,2,1,EEPROM_ADDR);

if(result4 == FALSE || ((pwr_ctrl_rd[0] ^ pwr_ctrl_rd[1]) != 0xff))milliwave_power_o
ut = 0xe5;        /* set power control to 4.5 volts*/
else milliwave_power_out = pwr_ctrl_rd[0];

if(!result || !result1 || !result2 || !result3 || !result4)local_alarm |= E2_FAIL;
/*SET E2 FAILURE BIT IN BIT MAP*/

else local_alarm &= ~E2_FAIL;

build_agc_curve();
```

```
}

/*
** FUNCTION:
**                            build_age_curve: take characterized curve and adds a
 correction value if needed
**
**
** Input Definitions:
**                                          No parameters
**
**   Returned Values:
**                            No values returned
**
*/
void build_agc_curve(){
        uchar i, j;

        for(i = 0; i < 0x0a; i++){

                agc_actual[i] = agc_table[0] - agc_correction[0];
  /* from 0 to -10 and -90 to -100 are the same*/
                agc_actual[i + 90] = agc_table[80] + agc_correction[80];
        }

        for(i = 10,j = 0; i < 90; i++,j++)
        {
                agc_actual[i] = agc_table[j] + agc_correction[j];
                kick_the_dog(FALSE);
        }
}

/*
** FUNCTION:
```

TBL_CTRL.C

```
**              verify checksum:
**
** Input Definitions:
**
**                                      buffer - pointer to data to verify
**                                      data_len - number of data bytes in b
uffer to compute checksum on
**
**   Returned Values:
**
**                              TRUE = buffer is valid
**                                      FALSE = buffer is not valid
*/
uchar verify_checksum(buffer,data_len)
uchar *buffer,data_len;
{
        uchar checksum;

        checksum = 0;

        --data_len; /*take one of the data length because the parameter passed include the c
hecksum*/

        for(;data_len !=0; --data_len)checksum ^= *buffer++;

        if((0 - checksum) == *buffer)return(TRUE);
        else return(FALSE);
}
```

TELEM_IO.C

```
#include <reg552.h>
#include "10891def.h"
#include "10891str.h"

extern void clear_memory(void *,uint), kick_the_dog(uchar);
extern uchar e2_write(uchar*, uchar, uchar, uchar,uchar);
extern uchar e2_read(uchar*, uchar, uchar, uchar,uchar);
extern uchar verify_checksum(void);
extern void control_2nd_plo(uchar);

extern code uchar a2d_max_in[],a2d_min_in[];
extern code uint agc_table[];

void telemetry_link handler();
void init_serial();
uchar build_packet(uchar *,uchar,uchar);

uchar comparison;

void telemetry_link handler()
{
        uchar *tmp_ptr;
        [illegible]
        uchar result,result1;
        uchar *src_ptr,*dst_ptr;
        struct channel *com_ptr;

        com_ptr = &tx;              /*manage the xmiter first*/
        if(!com_ptr->busy)
        {       /*if busy flag is set a transimission is already in progress. no action proc
eed to rcvr*/

                if(com_ptr->buffer[com_ptr->get].flag == READY)
                {                                                       /*THE GET BUFFER HAS
 DATA IN IT AND IS READY TO PROCESS*/
                        com_ptr->packet_len = com_ptr->buffer[com_ptr->get].len;
```

```
        com_ptr->char_ptr = &(com_ptr->buffer[com_ptr->get].storage[0]);
        --com_ptr->packet_len;


        EA = FALSE;                              /*disable interrupt while we manipul
ate telemon*/

        io_control_byte |= TELEMON;

        port4_image &= ~CS1;
        P4 = port4_image;

        *CONTROL_BYTE = io_control_byte;

        port4_image |= CS1;
        P4 = port4_image;

        EA = TRUE;

        com_ptr->ready = IDLE;
        SBUF = *(com_ptr->char_ptr++);
    }
}

com_ptr = &c1;  /*manage the rcv buffers*/
if(com_ptr->buffer[com_ptr->get].flag == READY)
{

    timers[TELEMETRY_LINK_TIMER] = SECONDS_45;

    src_ptr = &(com_ptr->buffer[com_ptr->get].storage[0]);  /*point of begining
of recieved packet*/

    if(*src_ptr & 0x80)
    {
        com_ptr->buffer[com_ptr->get].flag = IDLE;
        ++com_ptr->get;
```

TELEM_IO.C

```
                        if(com_ptr->get == MAX_BUFFER)com_ptr->get = 0; /*buffer pool has wr
apped around reset get pointer*/
                        return;
                }
                switch(*src_ptr++){

                        case ALARM_IMAGE:          /* THE ALARM IMAGE PACKET CONTAINS SYNTHESI
ZER CHANNEL SETTING,THE id OF IDU
                                                                        ** TRANSMITTTER MUTE
 CONTROL, AND ANY AFC COMPENSATION IF NECESASSRY
                                                                        */
                                ++src_ptr;                      /*get past length bytes*/

                                if(!(P3 & READ_LOCAL_SWITCHES))
                                {       /* if port3 bit 3 is not a 1 we use the local hex s
witches else use serial port*/

                                        synth_rd_sw.new_sw = *src_ptr;
                                        if(synth_rd_sw.new_sw != synth_rd_sw.old_sw)
                                        {
                                                odu_control.synthesizer_setting = *src_ptr;
                                                synthesizer_control.node = UPDATE;
                                                [illegible]
                                        }
                                        ++src_ptr;
                                }
                                else ++src_ptr; /*if we are reading local switches adjust po
inter for setting mdm ctrl*/

/********************** TESTING********************************/
                                odu_control.idu_personality = TWO_MB;
                                ++src_ptr;

                                mute_transmitter = *src_ptr++;
```

TELEM_IO.C

```
                     result = build_packet((uchar *) &idu,sizeof(struct data_base
),0x80 | ALARM_IMAGE);

                     if(*src_ptr)control_2nd_plo(*src_ptr); /*AFC byte 0 = no cha
nge 1 = advance 2 = retard*/
                 break;

                 case A2D IMAGE:

                     result = build_packet(&a2d_voltages[0],MAX_ODU_VOLTAGES,0x80
| A2D_IMAGE);
                 break;

                 case REVISION_IMAGE:
                     ++src_ptr;                             /*get past length byte*/

                     switch(*src_ptr++)
                     {
                          case READ_REV:
                               result = build_packet((uchar *) &configurati
on,sizeof(struct config_str),0x80 | REVISION_IMAGE);
                          break;
                          case SET_REV:
                               result1 = e2_write(src_ptr,REVISION_DATA,siz
eof(struct config_str),PAGE_2,EEPROM_ADDR);
                               result = build_packet(&result1,1,0x80 | REVI
SION_IMAGE);

                               result1 = e2_read(&configuration.ser_num1,RE
VISION_DATA,sizeof(struct config_str),PAGE_2,EEPROM_ADDR);
                          break;
                     }
                 break;

                 case A2D_TRIP_POINTS:
```

TELEM_IO.C

```
                tmp_ptr = &temp_buff[0];

                for(index = 0;index < MAX_ODU_VOLTAGES; index++)*tmp_ptr++ =
a2d_min_in[index];

                for(index = 0;index < MAX_ODU_VOLTAGES; index++)*tmp_ptr++ =
a2d_max_in[index];

                result = build_packet(&temp_buff[0],(MAX_ODU_VOLTAGES * 2),0
x80 | A2D_TRIP_POINTS);
        break;

        case POWER_CONTROL:
                ++src_ptr;                              /*get past length byte*/

                switch(*src_ptr++)
                {
                        case INCREASE_POWER:
                                result1 = TRUE;
                                ++milliwave_power_out;
                                result = build_packet(&result1,1,0x80 | POW
[illegible]

                        break;
                        case DECREASE_POWER:
                                result1 = TRUE;
                                --milliwave_power_out;
                                result = build_packet(&result1,1,0x80 | POWE
R_OUT_CONTROL);

                        break;
                        case SET_POWER:
                                result1 = TRUE;
                                milliwave_power_out = *src_ptr;
                                result = build_packet(&result1,1,0x80 | POWE
R_OUT_CONTROL);

                        break;
```

TELEM_IO.C

```
                    case STORE_POWER:
                            pwr_ctrl_rd[0] = milliwave_power_out;
                            pwr_ctrl_rd[1] = ~milliwave_power_out;
                            result1 = e2_write(&pwr_ctrl_rd[0],PWR_CTRL,
POWER_CTRL_LEN,1,EEPROM_ADDR);

                            result = build_packet(&result1,1,0x80 | POWE
R_OUT_CONTROL);
                    break;
                    case READ_POWER:
                            result1 = TRUE;
                            result = build_packet(&milliwave_power_out,1
,0x80 | POWER_OUT_CONTROL);
                    break;
                    default:
                            result = TRUE;
                    break;
                }/*end switch(src_ptr)*/
            break;

            default:
                result = TRUE; /* FOR NOW IF WE DON'T RECEIVE A VALID OPCODE
            break;
        }

        local_alarm &= ~TELEMETRY_ERROR; /*clear telem err flag*/

        com_ptr->buffer[com_ptr->get].flag = IDLE;
        ++com_ptr->get;
        if(com_ptr->get == MAX_BUFFER)com_ptr->get = 0; /*buffer pool has wrapped ar
ound reset get pointer*/

    }/*end if(buffer == READY)*/
```

```
        else if(timers[TELEMETRY_LINK_TIMER] == 0)
        {
                local_alarm |= TELEMETRY_ERROR; /* we haven't recieved a packet in 3 seconds
 so declare a telem err*/
                timers[TELEMETRY_LINK_TIMER] = SECONDS_45;

        }/*end else if*/

}/*close telemetry link handler*/


void init_serial()
{
        clear_memory(&tx,sizeof(struct channel));
        clear_memory(&rx,sizeof(struct channel));

}


uchar build_packet(dta_ptr,len,opcode)
uchar *dta ptr;
[illegible]
{
        uchar checksum,*dst_ptr,loop;
        struct  channel *tx_ptr;

        tx_ptr =&tx;
        checksum = 0;
        if(tx_ptr->buffer[tx_ptr->put].flag == IDLE){

                /*
                ** if put buffer is not available indicates all
                **      buffers are full - do not build new packet
                */
```

TELEM_IO.C

```
		dst_ptr = &tx_ptr->buffer[tx_ptr->put].storage[0];

		checksum += SYNC;
		*dst_ptr++ = SYNC;

		checksum += opcode;
		*dst_ptr++ = opcode;

		checksum += len;
		*dst_ptr++ = len;

		for(loop = 0;loop < len;++loop){
			checksum += *dta_ptr;
			*dst_ptr++ = *dta_ptr++;
		}
		*dst_ptr = (0 - checksum);

		tx_ptr->buffer[tx_ptr->put].tag = [illegible];
		tx_ptr->buffer[tx_ptr->put].len = (len + OVERHEAD);
		++tx_ptr->put;
		if(tx_ptr->put >= MAX_BUFFER) tx_ptr->put = 0;	/*buffer pool has wrapped around*/

		return(TRUE);	/*RETURN TRUE INDICATING REQUEST COMPLETE*/
	}
	else return(FALSE);	/*RETURN INDICATOR THAT NO BUFFER AVAILABLE*/
}
```

ALARM.C

©P-COM, Inc., 1994

```
{
    return(CABLE_OPEN());
}

/*************************************************************
 *
 * Name: chk_cable_short
 *
 * Description: Check if there is a cable short
 *
 *************************************************************/
uchar ALARM_chk_cable_short()

{
    return(CABLE_SHORT());
}
```

©P-COM, Inc., 1994

```
/**************************************************************
 *
 * Description: This file contains functions for handling the
 *              alarm objects (ALARM_OBJ and ALARMS_OBJ)
 *
 * $Id: alarm.c 2.2 1994/01/19 15:21:11 JEFFC Exp $
 *
 * $Log: alarm.c $
 * Revision 2.2  1994/01/19  15:21:11  JEFFC
 * Changed prototype of ALARM_init()
 *
 * Revision 2.1  1993/12/29  10:38:32  MIKEE
 * conversion
 *
 *    Rev 1.3   01 Nov 1993 11:40:36   mikee
 * new odu alarms and remote alarms
 *
 *    Rev 1.2   19 Oct 1993 14:57:42   mikee
 * led should blink when there is a cable alarm not go off
 *
 *    Rev 1.1   04 Oct 1993 16:35:26   mikee
 * final cleanup
 *
 *    Rev 1.0   18 Sep 1993 14:03:48   mikee
 * Initial revision.
 *************************************************************/

#include "sysdefs.h"
#include "object.h"
#include "message.h"
#include "sys_nov.h"
#include "spm_map.h"
#include "alarm.h"
#include "radio.h"
#include "line.h"
#include "link.h"
#include "fcp.h"
#include "a2d.h"
#include "spm.h"
#include "modem.h"
#include "remote.h"
#include "odu.h"

/*
 * External Functions
 */
extern void     UTIL_clr_mem();
extern uchar    ODU_chk_alarms();

/*
```

```
 * Internal Functions
 */
static uchar    alarm_init();
static void     check_alarms();
static void     updt_led();

/*
 * External Data
 */
extern const ALARM_CNFG Alarm_Cnfg[NUM_ALARMS];
extern const uchar      Alarm_NV_Attr[];

/*
 * Internal Data
 */
static uint     Alarm_Attr[MAX_ALARMS][NUM_ALARM_ATTRS];

/****************************************************************
 *
 * Name: ALARM_handler()
 *
 * Description: This routine handles the alarm object events
 *
 ***************************************************************/
uchar ALARM_handler(object, event, cdata_ptr)

uchar   object;
uchar   event;
uchar   *cdata_ptr;
{
    /*
     * switch on the event
     */
    switch(event)
    {
        case INIT_EVENT:
            return alarm_init(cdata_ptr);
            break;
        case SAVE_NV_EVENT:
            if (NOVRAM_save_attrs(object, (NV_ADR_BLK
*)cdata_ptr,
                        (uchar *)Alarm_NV_Attr,
                        (ATTR_CB)ALARM_process_attr_cmd, MAX_ALARMS)
== FALSE)
                return(FALSE);
            break;
        case TIMER_EVENT:
            check_alarms();
            break;
        case MSG_EVENT:
```

```
            MSG_process_attr_msg((ATTR_CB)ALARM_process_attr_cmd,
                (HEADER *)cdata_ptr);
            break;
    }
    return(TRUE);
}

/************************************************************
 *
 * Name: ALARM_process_attr_cmd
 *
 * Description: This function handles a command attribute pair
 *
 ************************************************************/
uchar ALARM_process_attr_cmd(opcode, attr_num, attr_val_adr,
inst)

uchar   opcode;
uchar   attr_num;
uint    *attr_val_adr;
uchar   inst;
{
    uchar   status;

    status = NO_ERR;

    /*
     * Attributes are divided into no special handling and
special handling
     * groups. If an error is found we stop processing
attributes.
     */
    if (attr_num >= SPECIAL_ATTRS)
    {
        switch(attr_num)
        {
            default:
                status = BAD_CMD_ATTR;
                break;
        }
    }
    else
    {
        /*
         * If GET_CMD then just load the information into the
buffer
         * otherwise have the general attribute function handle
it
         */
        if (opcode == GET_CMD)
```

```
            *attr_val_adr = Alarm_Attr[inst][attr_num];
        else if (opcode == SET_CMD)
           status = OBJ_process_attr(opcode, attr_val_adr,
                &Alarm_Attr[inst][attr_num]);
        else
            status = BAD_CMD_ATTR;
    }

    NOVRAM_chk_updt_needed(opcode, attr_num, status, (uchar
*)Alarm_NV_Attr);

    return(status);
}

/*************************************************************
 *
 * Name: alarm_init()
 *
 * Description: This routine sets up the alarm data base
 *
 ************************************************************/
uchar alarm_init(adr_ptr)

NV_ADR_BLK  *adr_ptr;
{
    uchar   i;

    /*
     * Clear all alarm information
     */
    UTIL_clr_mem(&Alarm_Attr[0][0],
        (NUM_ALARMS * NUM_ALARM_ATTRS * sizeof(uint)));

    for (i = 0; i < NUM_ALARMS; i++)
        Alarm_Attr[i][ALM_ABLE_ATTR] = TRUE;

    /*
     * Set the default alarm relays
     * The IDU alarm is done 1 by 1 because it execludes the BER
alarm
     */
    Alarm_Attr[LN_LOS_ALM][RELAY_ATTR] = RELAY2;
    Alarm_Attr[LN_AIS_ALM][RELAY_ATTR] = RELAY2;
    Alarm_Attr[A2D_ALM][RELAY_ATTR] = RELAY2;
    Alarm_Attr[SYNTH_ALM][RELAY_ATTR] = RELAY2;
    Alarm_Attr[EXT_INPUT_ALM][RELAY_ATTR] = RELAY2;
    Alarm_Attr[LOOPBACK_ALM][RELAY_ATTR] = RELAY2;
    Alarm_Attr[AIS_INJ_ALM][RELAY_ATTR] = RELAY2;
    Alarm_Attr[ODU_ALM][RELAY_ATTR] = RELAY3;
    Alarm_Attr[CABLE_ALM][RELAY_ATTR] = RELAY4;
```

ALARM.C ©P-COM, Inc., 1994

```
    Alarm_Attr[RMT_ALM][RELAY_ATTR] = RELAY5;

    /*
     * Now see if there is anything saved in novram
     */
    NOVRAM_restore_attrs(ALARM_OBJ, adr_ptr, (uchar
*)Alarm_NV_Attr,
            (ATTR_CB)ALARM_process_attr_cmd, MAX_ALARMS);
    return FALSE;
}

/*****************************************************************
 *
 * Name: check_alarms()
 *
 * Description: This routine checks for new alarms and cleared
 *              alarms.
 *
 *****************************************************************/
void check_alarms()
{
    uchar       i;
    ALARM_CNFG  *cnfg_ptr;
    uint        attr_val;

    /*
     * Check individual alarm conditions
     */
    cnfg_ptr = (ALARM_CNFG *)Alarm_Cnfg;
    for (i = 0; i < NUM_ALARMS; i++, cnfg_ptr++)
    {
        if (cnfg_ptr->alm_type != COLLECTIVE)
        {
            if (cnfg_ptr->chk_func() == TRUE)
                Alarm_Attr[i][STATE_ATTR] = ALARM_ON;
            else
                Alarm_Attr[i][STATE_ATTR] = NO_ALARM;
        }
    }

    /*
     * NOTE: do all check above this point
     *
     * clear all the collective alarms and disabled ones
     */
    for (i = 0; i < NUM_ALARMS; i++)
    {
        if ((Alarm_Cnfg[i].alm_type == COLLECTIVE) ||
                (Alarm_Attr[i][ALM_ABLE_ATTR] == FALSE))
            Alarm_Attr[i][STATE_ATTR] = NO_ALARM;
```

```
    }

    /*
     * Now feed all the individual alarms into the collective
alarms
     */
    cnfg_ptr = (ALARM_CNFG *)Alarm_Cnfg;
    for (i = 0; i < NUM_ALARMS; i++, cnfg_ptr++)
    {
        if ((cnfg_ptr->alm_type == INDIVIDUAL) &&
            (cnfg_ptr->alm_feeds != NULL_ALM) &&
            (Alarm_Attr[i][STATE_ATTR] != NO_ALARM))
        {
            if (Alarm_Attr[cnfg_ptr->alm_feeds][ALM_ABLE_ATTR])
            {
                if (cnfg_ptr->blink_flag == TRUE)
                    Alarm_Attr[cnfg_ptr->alm_feeds][STATE_ATTR]
|= ALM_BLINKING;
                else
                    Alarm_Attr[cnfg_ptr->alm_feeds][STATE_ATTR]
|= ALARM_ON;
            }
        }
    }

    /*
     * Check to see if the ODU led should be blink because of
either
     * an ODU and LINK loopback
     */
    if (ODU_chk_lpbk() == TRUE)
        Alarm_Attr[ODU_ALM][STATE_ATTR] |= ALM_BLINKING;

    /*
     * update alarm history (blinking state is not saved)
     */
    for (i = 0; i < NUM_ALARMS; i++)
    {
       if ((Alarm_Attr[i][STATE_ATTR] & ALARM_ON) != 0)
           Alarm_Attr[i][ALM_HIST_ATTR] = ALARM_ON;
    }

    /*
     * Update the states based on some special cases
     *     IDU - real alarm over-rides blinking alarms
     *     ODU - cable alarm nullifies it, real alarm overides
blink
     *     CABLE -
     *     REMOTE - Blinking if cable alarm, blinking overrides
alarms
```

```
     */
    if ((Alarm_Attr[IDU_ALM][STATE_ATTR] & ALARM_ON) != 0)
       Alarm_Attr[IDU_ALM][STATE_ATTR] = ALARM_ON;

    if (Alarm_Attr[CABLE_ALM][STATE_ATTR] != NO_ALARM)
       Alarm_Attr[ODU_ALM][STATE_ATTR] = NO_ALARM;
    if ((Alarm_Attr[ODU_ALM][STATE_ATTR] & ALARM_ON) != 0)
       Alarm_Attr[ODU_ALM][STATE_ATTR] = ALARM_ON;

    if (Alarm_Attr[CABLE_ALM][STATE_ATTR] != NO_ALARM)
       Alarm_Attr[RMT_ALM][STATE_ATTR] = ALM_BLINKING;


    /*
     * Update the front panel LEDs. If there is a cable alarm
then
     * the ODU LED should be off
     */
    updt_led(IDU_LED_ATTR, Alarm_Attr[IDU_ALM][STATE_ATTR]);
    updt_led(CABLE_LED_ATTR, Alarm_Attr[CABLE_ALM][STATE_ATTR]);
    updt_led(RMT_LED_ATTR, Alarm_Attr[RMT_ALM][STATE_ATTR]);

    if (Alarm_Attr[CABLE_ALM][STATE_ATTR] != NO_ALARM)
    {
        FCP_set_led(ODU_LED_ATTR, LED_OFF);
    }
    else
    {
        updt_led(ODU_LED_ATTR, Alarm_Attr[ODU_ALM][STATE_ATTR]);
    }

    ALARM_updt_relays();
}

/****************************************************************
 *
 * Name: updt_led
 *
 * Description: This routine updates the leds based on the
current
 *              alarm states.
 *
 ****************************************************************/
void updt_led(led_num, alarm_state)

uchar   led_num;
uchar   alarm_state;
{
    uchar   new_led;
```

```
    /*
     * Check the alarms that affect the leds and update them
     */
    if (alarm_state == NO_ALARM)
        new_led = GREEN_LED;
    else if (alarm_state == ALARM_ON)
        new_led = RED_LED;
    else
        new_led =  (RED_LED | BLINK_MASK);

    if (new_led != FCP_get_led(led_num))
        FCP_set_led(led_num, new_led);
}

/**************************************************************
 *
 * Name: ALARM_updt_relays
 *
 * Description: This routine updates the relays based on the
current
 *              alarm states and the user defined values.
 *
 **************************************************************/
void ALARM_updt_relays()
{
    uint    alm_relays;
    uchar   i;

    /*
     * Check the alarms that affect the relays and update them
     */
    alm_relays = 0;
    for (i = 0; i < NUM_ALARMS; i++)
    {
        if (Alarm_Attr[i][RELAY_ATTR] != FALSE)
            if (Alarm_Attr[i][STATE_ATTR])
                alm_relays |= Alarm_Attr[i][RELAY_ATTR];
    }

    RADIO_dsp_relays(alm_relays);
}

/**************************************************************
 *
 * Name: ALARM_chk_cable_open
 *
 * Description: Check if there is a cable open
 *
 **************************************************************/
uchar ALARM_chk_cable_open()
```

©P-COM, Inc., 1994

```
{
    return(CABLE_OPEN());
}

/***************************************************************
 *
 * Name: chk_cable_short
 *
 * Description: Check if there is a cable short
 *
 ***************************************************************/
uchar ALARM_chk_cable_short()

{
    return(CABLE_SHORT());
}
```

BITMAP.C

©P-COM, Inc., 1994

```
/***************************************************************
 *
 * Description: This file contains the functions used to support
 *              the map utility.
 *
 * $Id: bitmap.c 2.1 1993/12/29 10:38:45 MIKEE Exp $
 *
 * $Log: bitmap.c $
 * Revision 2.1  1993/12/29  10:38:45  MIKEE
 * covertion
 *
 *
 *    Rev 1.0   17 Nov 1993 10:18:14   mikee
 * Initial revision.
 *
 ***************************************************************/

#include <sysdefs.h>

/*
 * External Functions
 */

/*
 * Internal Functions
 */
static uchar *calc_bit_pos();

/*
 * External Data
 */

/*
 * Internal Data
 */

/***************************************************************
 *
 * Name: BITMAP_get
 *
 * Description: This function returns the current setting of the
 *              given bit position
 *
 ***************************************************************/
uchar BITMAP_get(map_ptr, bit_num)

uchar   *map_ptr;
uchar   bit_num;
{
    uchar   *byte_ptr;
```

©P-COM, Inc., 1994

```
    uchar   bit_pos;

    byte_ptr = calc_bit_pos(map_ptr, bit_num, &bit_pos);
    if ((*byte_ptr & Bit_Mask[bit_pos]) == 0)
        return(CLR);
    else
        return(SET);
}

/**************************************************************
 *
 * Name: BITMAP_set
 *
 * Description: This routine set the given bit position
 *
 **************************************************************/
void BITMAP_set(map_ptr, bit_num)

uchar   *map_ptr;
uchar   bit_num;
{
    uchar   *byte_ptr;
    uchar   bit_pos;

    byte_ptr = calc_bit_pos(map_ptr, bit_num, &bit_pos);
    *byte_ptr |= Bit_Mask[bit_pos];
}

/**************************************************************
 *
 * Name: BITMAP_set_val
 *
 * Description: This routine set the given bit position to the
 *              given value
 *
 **************************************************************/
void BITMAP_set_val(map_ptr, bit_num, value)

uchar   *map_ptr;
uchar   bit_num;
uchar   value;
{
    uchar   *byte_ptr;
    uchar   bit_pos;

    byte_ptr = calc_bit_pos(map_ptr, bit_num, &bit_pos);
    if (value == CLR)
        *byte_ptr &= ~(Bit_Mask[bit_pos]);
    else
        *byte_ptr |= Bit_Mask[bit_pos];
```

©P-COM, Inc., 1994

```
}

/*************************************************************
 *
 * Name: calc_bit_pos
 *
 * Description: This function returns a pointer to the byte in
 *              given bit map of the given bit position. It also
 *              calculates the bit position with in the returned
 *              byte of the given bit.
 *
 *************************************************************/
static uchar *calc_bit_pos(map_ptr, bit_num, byte_pos_adr)

uchar   *map_ptr;
uchar   bit_num;
uchar   *byte_pos_adr;
{
    /*
     * Calculate the byte that the bit is in
     */
    *byte_pos_adr = bit_num % 8;
    return(&map_ptr[bit_num / 8]);
}
```

```
/*****************************************************************
 *
 * Description: This file contains the functions that handle
 *              communication ports
 *
 * $Id: comm_pts.c 2.2 1994/03/14 11:46:46 JEFFC Exp $
 *
 * $Log: comm_pts.c $
 * Revision 2.2  1994/03/14  11:46:46  JEFFC
 * Changes for NMS message routing.
 *
 * Revision 2.1  1993/12/29  10:38:32  MIKEE
 * Conversion to MKS RCS
 *
 *    Rev 1.2   17 Nov 1993 09:55:26   mikee
 * interrupt drivers over haul
 *
 *    Rev 1.1   08 Nov 1993 13:29:18   mikee
 * fixed for false peer alarm (rel 1.3)
 *
 *    Rev 1.0   18 Sep 1993 14:03:48   mikee
 * Initial revision.
 ****************************************************************/

#include <sysdefs.h>
#include <80c196.h>
#include <spm_map.h>
#include <sys_msg.h>
#include <object.h>
#include <radio.h>
#include <spm.h>

/*
 * External Functions
 */
extern uchar PCOM_rxtx_msg(uchar, void *, void *);
extern uchar PCOM_tx_byte(uchar, void *, void *);
extern uchar PCOM_rx_byte(uchar, void *, void *);
extern uchar PCOM_bld_msg(uchar, void *, void *);
extern uchar PCOM_send_msg(uchar, void *, void *);
extern uchar KPAD_tx_msg(uchar, void *, void *);

/*
 * Internal Functions
 */
uchar null_drv(uchar, void *, void *);

/*
 * External Data
 */
```

©P-COM, Inc., 1994

```
/*
 * Internal Data
 */
static const uchar  rate_2691[] =
{
    SCC_BAUD_300,  SCC_BAUD_600,  SCC_BAUD_1200,
    SCC_BAUD_2400, SCC_BAUD_4800, SCC_BAUD_9600
};

static const uchar  rate_80196[6][2] =
{
    {INTEL_300_BAUD_LO,  INTEL_300_BAUD_HI},
    {INTEL_600_BAUD_LO,  INTEL_600_BAUD_HI},
    {INTEL_1200_BAUD_LO, INTEL_1200_BAUD_HI},
    {INTEL_2400_BAUD_LO, INTEL_2400_BAUD_HI},
    {INTEL_4800_BAUD_LO, INTEL_4800_BAUD_HI},
    {INTEL_9600_BAUD_LO, INTEL_9600_BAUD_HI},
};

const DRV_CB  Comm_Drivers[NUM_DRIVES][NUM_EVENTS] =
{
    {PCOM_rxtx_msg, PCOM_rxtx_msg,  PCOM_rx_byte,   PCOM_tx_byte,
                    PCOM_bld_msg,   PCOM_send_msg},
    {null_drv,      KPAD_tx_msg,    null_drv,       null_drv,
                    PCOM_bld_msg,   PCOM_send_msg},
};

/**************************************************************
 *
 * Name: COMM_init
 *
 * Description: This function sets up the communication links
 *
 **************************************************************/
void COMM_init()
{
    uint    enable;

    enable = FALSE;

    MSG_init_link(TELEMETRY_LINK,   NULL,
PCOM_DRV);
    MSG_init_link(PEER_LINK,        PEER_UART,
PCOM_DRV);
    MSG_init_link(MAINTENANCE_PORT, MAINTENANCE_UART,
PCOM_DRV);
    MSG_init_link(NMS_PORT1,        NMS1_UART,
PCOM_DRV);
    MSG_init_link(NMS_PORT2,        NMS2_UART,
PCOM_DRV);
```

```
    MSG_init_link(PROTECTION_LINK,  PROTECTION_UART,
PCOM_DRV);
    MSG_init_link(KEYPAD_PORT,      NULL,
KEYPAD_DRV);

    MSG_process_attr_cmd(SET_CMD, PORT_ABLE_ATTR, &enable,
NMS_PORT1);
    MSG_process_attr_cmd(SET_CMD, PORT_ABLE_ATTR, &enable,
NMS_PORT2);
    MSG_process_attr_cmd(SET_CMD, PORT_ABLE_ATTR, &enable,
PROTECTION_LINK);
}

/**************************************************************
 *
 * Name: COMM_send_char
 *
 * Description: This routine send the given character out on the
 *              given port
 *
 *************************************************************/
reentrant void COMM_send_char(link_ptr, tx_char)

MSG_LINK    *link_ptr;
uchar       tx_char;
{
    INTERRUPTS_OFF;
    link_ptr->tx_q.busy = TRUE;
    if (link_ptr->link_num != TELEMETRY_LINK)
    {
        *(link_ptr->uart + THR) = tx_char;
        *(link_ptr->uart + IMR) = 0x05;         /* set Tx AND Rx
mask */
    }
    else
    {
        sbuf = tx_char;
    }
    INTERRUPTS_ON;
}

/**************************************************************
 *
 * Name: COMM_setup_port
 *
 * Description: This function sets up the given UART. Most are
 *        2691's, one is built into the 80c196 (Telemtry).
 *
 *************************************************************/
reentrant void COMM_setup_port(lk_ptr)
```

COMM_PTS.C ©P-COM, Inc., 1994

```
MSG_LINK     *lk_ptr;
{
    if (lk_ptr->link_num == TELEMETRY_LINK)
    {
        /*
         * This is the on board (80c196) uart
         */
        if (lk_ptr->enabled == TRUE)
            sp_con = 0x09;      /* serial port mode 01, with rcv
enabled*/
        else
            sp_con = 0x01;      /* mode 1 receive disabled */
        /*
         * The baud rate register is programmed in two sequential
writes to the same
         * register. The sequence is lsb first then msb.
         */
        baud_rate = rate_80196[lk_ptr->baud_rate][LOW];

        baud_rate = rate_80196[lk_ptr->baud_rate][HIGH];
    }
    else if (lk_ptr->link_num != KEYPAD_PORT)
    {
        *(lk_ptr->uart + CR) = RESET_RECIEVER;
        *(lk_ptr->uart + CR) = RESET_TRANS;
        *(lk_ptr->uart + CR) = RESET_ERROR;
        *(lk_ptr->uart + CR) = 0x10;     /* point to MR1 */

        *(lk_ptr->uart + IMR) = 0x00;    /* mask out all
interrupts */
        *(lk_ptr->uart + MR1) = 0x13;    /* no parity, 8bits */
        *(lk_ptr->uart + MR2) = 0x08;    /* normal mode, 1.5 stop
bit */
        *(lk_ptr->uart + SR) = rate_2691[lk_ptr->baud_rate];
        *(lk_ptr->uart + ACR) = 0x0B;    /* ext clk */
        *(lk_ptr->uart + CTU) = 0x00;    /* counter timer value
*/
        *(lk_ptr->uart + CTL) = 0X00;
        if (lk_ptr->enabled == TRUE)
        {
            *(lk_ptr->uart + CR) = 0x05;    /* enable tx/rx */
            *(lk_ptr->uart + IMR) = 0x04;    /* set rx mask */
        }
        else
            *(lk_ptr->uart + CR) = 0x0A;    /* disable tx/rx */

    }

    lk_ptr->tx_q.busy = FALSE;
}
```

COMM_PTS.C ©P-COM, Inc., 1994

```
/****************************************************************
 *
 * Name: COMM_chk_int
 *
 * Description: This function check if a given interrupt is TRUE
 *
 ***************************************************************/
void COMM_chk_int(lk_ptr, rx_adr, tx_adr)

MSG_LINK    *lk_ptr;
uchar       *rx_adr;
uchar       *tx_adr;
{
    uchar   serial_status;

    *tx_adr = FALSE;
    *rx_adr = FALSE;

    if (lk_ptr->link_num != TELEMETRY_LINK)
    {
        if (*(lk_ptr->uart + SR) & TX_READY)
            *tx_adr = TRUE;
        if (*(lk_ptr->uart + SR) & RX_READY)
            *rx_adr = TRUE;
    }
    else
    {
     serial_status = sp_stat;

         if (serial_status & TX_INTERRUPT_MASK)
            *tx_adr = TRUE;
         if (serial_status & RX_INTERRUPT_MASK)
            *rx_adr = TRUE;
    }

    if (lk_ptr->enabled != TRUE)
    {
        /*
         * Should be off if not make sure
         */
        if (lk_ptr->link_num == TELEMETRY_LINK)
            sp_con = 0x01;      /* mode 1 receive disabled */
        else
        {
            *(lk_ptr->uart + CR) = 0x0A;     /* disable tx/rx */
            *(lk_ptr->uart + IMR) = 0x00;
        }
    }
}
```

COMM_PTS.C ©P-COM, Inc., 1994

```
/*************************************************************
 *
 * Name: COMM_send_cleanup
 *
 * Description: This routine cleans up after transmission
 *
 *************************************************************/
void COMM_send_cleanup(lk_ptr)

MSG_LINK    *lk_ptr;
{
    if (lk_ptr->link_num != TELEMETRY_LINK)
    {
        *(lk_ptr->uart + IMR) = 0x04; /* LEAVE RX ENABLED ONLY*/

    }

    lk_ptr->tx_q.busy = FALSE;
}

/*************************************************************
 *
 * Name: COMM_get_char
 *
 * Description: This function read a character from the port
 *
 *************************************************************/
uchar COMM_get_char(lk_ptr, char_adr)

MSG_LINK    *lk_ptr;
uchar       *char_adr;
{
    if (lk_ptr->link_num != TELEMETRY_LINK)
    {
        if ((*(lk_ptr->uart + SR) & RECIEVE_ERROR))
        {
            *(lk_ptr->uart + CR) = RESET_ERROR;
            *(lk_ptr->uart + CR) = RESET_RECIEVER;
            *(lk_ptr->uart + CR) = RESET_BREAK;
            *char_adr = *(lk_ptr->uart + RHR);
            *(lk_ptr->uart + CR) = 0x05;    /* tx and rx
interrupts */
            return(FALSE);

        }
        else
        {
            *char_adr = *(lk_ptr->uart + RHR);
        }
    }
```

©P-COM, Inc., 1994

```
    else
    {
          /*
           * read a character from
          * the serial recieve holding register
          */
         *char_adr = sbuf;
    }

    return(TRUE);
}

/************************************************************
 *
 * Name: COMM_calc_rsp_link
 *
 * Description: This function finds the link to send the response
 *
 ************************************************************/
uchar COMM_calc_rsp_link(nw_adr, link_adr)

uint     nw_adr;
uchar    link_adr;
{
    if (link_adr == R_IDU)
        return(PEER_LINK);
    else
    {
        if (nw_adr == 0)
            return(NMS_PORT1);
        else if (nw_adr == KEYPAD_ADR)
            return(KEYPAD_PORT);
        else
            return(MAINTENANCE_PORT);
    }
}

/************************************************************
 *
 * Name: COMM_calc_lk_adr
 *
 * Description: This function finds the link address from the
 *              link number
 *
 ************************************************************/
uchar COMM_calc_lk_adr(link_num)

uchar    link_num;
{
    if (link_num == PEER_LINK)
```

©P-COM, Inc., 1994

```
        return(R_IDU);
    else if (link_num == TELEMETRY_LINK)
        return(L_ODU);
    else
        return(L_IDU);
}

/****************************************************************
 *
 * Name: COMM_chk_route
 *
 * Description: This function determines what to do with the
 *              given message message
 *
 ****************************************************************/
uchar COMM_chk_route(in_link, head_ptr, out_link_adr)

uchar   in_link;
HEADER  *head_ptr;
uchar   *out_link_adr;
{
    uchar   link_num;

    /*
     * Handle request and response separately
     */
    if ((head_ptr->opcode & 0x80) == 0)     /* request = 0 */
    {
        switch((head_ptr->link_adr & 0x7f))
        {
            case COMM_LOOP:
                *out_link_adr = in_link;
                break;
            case L_IDU:
                return(PROCESS_IT);
            case L_ODU:
                /*
                 * Dump loop backed messages (hardware loops)
                 */
                if (in_link == TELEMETRY_LINK)
                    return(NO_ROUTE);
                *out_link_adr = TELEMETRY_LINK;
                break;
            case R_IDU:
                if (in_link == PEER_LINK)
                    return(PROCESS_IT);
                else
                    *out_link_adr = PEER_LINK;
                break;
            case R_ODU:
```

```
                if (in_link == PEER_LINK)
                    *out_link_adr = TELEMETRY_LINK;
                else
                    *out_link_adr = PEER_LINK;
                break;
            default:
                return(NO_ROUTE);
        }
    }
    else
    {
        /*
         * Route the response message coming from L_ODU, R_IDU,
         * and R_ODU.
         */
        if ((in_link == TELEMETRY_LINK) && (head_ptr->link_adr ==
R_ODU))
            *out_link_adr = PEER_LINK;
        else if (head_ptr->nw_adr == MAINT_ADR)
            *out_link_adr = MAINTENANCE_PORT;
        else if (head_ptr->nw_adr == KEYPAD_ADR)
            *out_link_adr = KEYPAD_PORT;
        else if(head_ptr->nw_adr == NMS_ADR)
            *out_link_adr = NMS_PORT1;
        else
            return(NO_ROUTE);
    }
    return(PASS_ON);
}

/**************************************************************
 *
 * Name: null_drv
 *
 * Description: This function should never be called. Its here
 *              just incase.
 *
 **************************************************************/
uchar null_drv(cmd, data_ptr, aux_ptr)

uchar   cmd;
void    *data_ptr;
void    *aux_ptr;
{
    return(FALSE);
}

/**************************************************************
 *
 * Name: COMM_tx_ready
```

COMM_PTS.C ©P-COM, Inc., 1994

```
 *
 * Description: This function check to see if port is ready to
transmit
 *
 ***************************************************************/
uchar COMM_tx_ready(lk_ptr)

MSG_LINK     *lk_ptr;
{
    uchar   ready;

    ready = FALSE;

    INTERRUPTS_OFF;

    if (lk_ptr->link_num == TELEMETRY_LINK)
    {
        /*
         * This is the on board (80c196) uart
         */
         if (sp_stat & TX_EMPTY_MASK)
             ready = TRUE;
    }
    else if (lk_ptr->link_num != KEYPAD_PORT)
    {
        if ((*(lk_ptr->uart + SR) & TX_READY))
            ready = TRUE;
    }
    INTERRUPTS_ON;

    return(ready);
}
```

©P-COM, Inc., 1994

```
/***************************************************************
 *
 * Description: This file contains the functions that handle
 *              diagnostic messages.
 *
 * $Id: diag.c 2.2 1994/01/19 15:26:53 JEFFC Exp $
 *
 * $Log: diag.c $
 * Revision 2.2  1994/01/19  15:26:53  JEFFC
 * Modified RAM test to be a little more robust.
 *
 * Revision 2.1  1993/12/29  10:38:33  MIKEE
 * Conversion
 *
 *    Rev 1.1   17 Nov 1993 09:59:00   mikee
 * part of driver over-haul
 *
 *    Rev 1.0   18 Sep 1993 14:03:50   mikee
 * Initial revision.
 ***************************************************************/

#include "sysdefs.h"
#include "80c196.h"
#include "radio.h"
#include "spm_map.h"
#include "object.h"
#include "message.h"
#include "sys_nov.h"
#include "diag.h"
#include "fcp.h"
#include "modem.h"

/*
 * External Functions
 */
extern void UTIL_clr_mem();
extern void UTIL_copy_mem();
extern void fatal_failure();
extern void KPAD_dsp_state_num();
extern void DIAG_state(uchar);
extern void Wdt_Tickle();
extern uchar PCOM_send_msg(uchar, void *, void *);

/*
 * Internal Functions
 */

/*
 * External Data
 */
```

```
extern uchar    Debug_Flag;

/*
 * Internal Data
 */
static register uchar   *test_ptr;
static register uchar   *test2_ptr;
register static uchar   State;
uchar                   Trace[TRACE_SIZE];
uint                    Trace_Cnt;
uchar                   Trace_Onoff;

/***************************************************************
 *
 * Name: DIAG_handler
 *
 * Description: This function sets up the message engine
 *
 ***************************************************************/
uchar DIAG_handler(object, event, head_ptr)

uchar  object;
uchar  event;
HEADER *head_ptr;
{
    unsigned int    mem_adr;
    uchar           msg_ptr;
    uchar   status;

    status = NO_ERR;

    /*
     * switch on the event
     */
    if ((event == MSG_EVENT) && (object == MEM_OBJ))
    {
        /*
         * Read or write memory
         */
        mem_adr = head_ptr->data_ptr[MEM_ADR1];
        mem_adr = ((mem_adr << 8) & 0xff00)
                | head_ptr->data_ptr[MEM_ADR2];
        if (head_ptr->opcode == SET_CMD)
        {
            /*
             * Set the address & value out of the message and
             * write it
             */
            UTIL_copy_mem(mem_adr, &head_ptr->data_ptr[MEM_VAL],
                head_ptr->data_ptr[MEM_LEN]);
```

```
            head_ptr->data_ptr = NULL;
            head_ptr->data_len = 0;
        }
        else
        {
            /*
             * Get the address out of the message and return the
byte
             */
            head_ptr->data_len = head_ptr->data_ptr[MEM_LEN];
            head_ptr->data_ptr = (uchar *)mem_adr;
        }

        PCOM_send_msg(SEND_RSP_MSG, head_ptr, &status);
    }
    return(TRUE);
}

/***************************************************************
 *
 * Name: DIAG_mem_test()
 *
 * Description: This routine test memory
 *
 ***************************************************************/
void DIAG_mem_test()
{
    register uchar saved_value;

    if (Debug_Flag == FALSE)
        return;

     DIAG_state(MEM_TEST);

    /*
     * Break ram into sections and test with 2 patterns 10101010
and
     * 01010101.
     */
    test_ptr = (uchar *)SRAM + (MEM_TST_STEP * 2);
    test2_ptr = (uchar *)(test_ptr + MEM_TST_STEP);

    while (test_ptr < (uchar *)SRAM_END)
    {
        while (test_ptr <= test2_ptr)
        {
            /*
                We treat this code as atomic, because if we read
the
                value of a location and an interrupt occurs which
```

```
                changes this location, we will incorrectly report
a
                fatal error.
            */
            asm di;                      /* disable all interrupts
*/

            saved_value = *test_ptr;
            *test_ptr = MEM_PATTERN1;
            if (*test_ptr != MEM_PATTERN1)
                fatal_failure();
            *test_ptr = MEM_PATTERN2;
            if (*test_ptr != MEM_PATTERN2)
                fatal_failure();
            *test_ptr = saved_value;

            asm ei;                      /* enable all interrupts
*/

            test_ptr++;
        }

        Wdt_Tickle();

        test2_ptr += MEM_TST_STEP;
        if (test2_ptr > (uchar *)SRAM_END)
            test2_ptr = (uchar *)SRAM_END;
    }
}

/**************************************************************
 *
 * Name: DIAG_dest_selftest()
 *
 * Description: This function runs the radio destructive selftest
 *
 **************************************************************/
uchar DIAG_dest_selftest()
{
    DIAG_state(MODEM_TEST);
    if (MODEM_test() == FALSE)
        return(MODEM_TEST);

    DIAG_state(EEPROM_TEST);
    if (NOVRAM_test(DESTRUCTIVE) == FALSE)
        return(EEPROM_TEST);

    return(0);
}
```

DIAG.C

©P-COM, Inc., 1994

```
/*************************************************************
 *
 * Name: DIAG_nondest_selftest()
 *
 * Description: This funct runs the radio's non-destructive
 *              selftests
 *
 *************************************************************/
uchar DIAG_nondest_selftest()
{
    if (MODEM_test() == FALSE)
        return(MODEM_TEST);

    if (NOVRAM_test(NON_DESTRUCTIVE) == FALSE)
        return(EEPROM_TEST);

    return(0);
}

/*************************************************************
 *
 * Name: DIAG_state
 *
 * Description: This routine sets or returns the current state
 *
 *************************************************************/
void DIAG_state(new_state)

uchar   new_state;
{
    State = new_state;
    KPAD_dsp_state_num(new_state);
}

/*************************************************************
 *
 * Name: DIAG_clr_trace
 *
 * Description: This routine inits the trace table
 *
 *************************************************************/
void DIAG_clr_trace()

{
    /*
     * Clear structures and set defualts
     */
    UTIL_clr_mem(Trace, TRACE_SIZE);
    Trace_Cnt = 0;
    Trace_Onoff = ON;
```

©P-COM, Inc., 1994

```
}

/************************************************************
 *
 * Name: DIAG_trace
 *
 * Description: This routine records a trace event
 *
 ************************************************************/
reentrant void DIAG_trace(event)

uchar   event;
{
    /*
     * If trace is on record it
     */
    if (Trace_Onoff == OFF)
        return;
    Trace[Trace_Cnt] = event;
    if (++Trace_Cnt >= TRACE_SIZE)
        Trace_Cnt = 0;
}

/************************************************************
 *
 * Name: DIAG_stop_trace
 *
 * Description: This routine stop the trace function
 *
 ************************************************************/
void DIAG_trace_onoff(flag)

uchar   flag;
{
    /*
     * Set on / off flag
     */
    Trace_Onoff = flag;
}
```

DTMF.C ©P-COM, Inc., 1994

```
/*
    !!! Need to add some sort of timeout (e.g. 5 seconds) to
reset
    !!! the receive buffer after a certain period of time.
*/

/**************************************************************
 *
 * Description: This module contains the interface to the
 *              Mitel MT8888CS Integrated DTMF Transceiver.
 *
 * $Header: P:/sw/spm/rcs/dtmf.c 2.2 1994/01/19 16:04:35 JEFFC
Exp $
 *
 * $Log: dtmf.c $
 * Revision 2.2  1994/01/19  16:04:35  JEFFC
 * Initial check-in (not necessarily debugged).
 *
 *
 *************************************************************/

#include "sysdefs.h"
#include "spm_map.h"
#include "dtmf.h"

#define DTMF_DATA   (*(uchar *)(EXP1_SEL+0))
#define DTMF_CRA    (*(uchar *)(EXP1_SEL+1))
#define DTMF_CRB    (*(uchar *)(EXP1_SEL+1))
#define DTMF_STATUS (*(uchar *)(EXP1_SEL+1))

/*
    Control Register A bit definitions:
*/
#define CRA_TOUT    0x01
#define CRA_CP_DTMF 0x02
#define CRA_IRQ     0x04
#define CRA_RSEL    0x08

/*
    Control Register B bit definitions:
*/
#define CRB_BURSTn  0x01
#define CRB_TEST    0x02
#define CRB_S_D     0x04
#define CRB_C_R     0x08

/*
    Status Register Bit Definitions:
*/
#define STAT_IRQ    0x01
```

DTMF.C ©P-COM, Inc., 1994

```
#define STAT_TX_RDY 0x02
#define STAT_RX_RDY 0x04
#define STAT_DSTEER 0x08

/*
    External Functions:
*/

/*
    Internal Functions:
*/

/*
    External Data:
*/

/*
    Internal Data:
*/
    /*
        The Rx_buffer and Tx_buffer variables hold the
        last digits sent and received. Since each NMS address can
        only be up to 4 digits, and each digit can be stored in
        4 bits, we can store an entire address in 16 bits.
    */
static uint Rx_buffer;
static uint Tx_buffer;
static uchar Rx_count, Tx_count;
static uchar Transmit_busy;

/*****************************************************************
 *
 * Name:         void DTMF_interrupt(void);
 *
 * Description: This function is called whenever there is a
 *              DTMF interrupt. This could be caused by either
 *              the completion of the transmission of a tone,
 *              or by the reception of a tone.
 *
 *****************************************************************/
void DTMF_interrupt(void)
{
    uchar status = DTMF_STATUS;

    /*
        Check if this is a receive interrupt.
    */
    if(status & STAT_RX_RDY)
        {
        Rx_buffer <<= 4;
```

©P-COM, Inc., 1994

```
        Rx_buffer |= (DTMF_DATA & 0x0f);
        Rx_count++;
        }

    /*
        Check if this is a transmit interrupt, and if there
        are more digits to send.
    */
    if(status & STAT_TX_RDY)
        {
        if(Tx_count)
            {
            DTMF_CRA = CRA_TOUT | CRA_CP_DTMF | CRA_RSEL;
            DTMF_CRB = 0x00;
            DTMF_DATA = Tx_buffer & 0x0f;
            Tx_buffer >>= 4;
            Tx_count--;
            }
        else Transmit_busy = 0;
        }
}

/****************************************************************
 *
 * Name:         void DTMF_init(void)
 *
 * Description: This function initializes the DTMF chip and
 *              our internal data structures.
 *
 ****************************************************************/
void DTMF_init(void)
{
    uchar dummy;

    Rx_count = Tx_count = 0;
    Transmit_busy = 0;

    /*
        The following is the initialization procedure as
documented
        in the MT8888CS data sheet.
    */
    dummy = DTMF_STATUS;
    DTMF_CRA = 0x00;
    DTMF_CRA = CRA_RSEL;
    DTMF_CRB = 0x00;
    DTMF_CRA = 0x00;
}

/****************************************************************
```

DTMF.C

©P-COM, Inc., 1994

```
 *
 * Name:         void DTMF_send(uint num)
 *
 * Description: This function takes a 16-bit argument which
 *               contains four 4-bit digits to transmit
 *               as DTMF tones. The first digit to transmit
 *               is in the most significant nibble, to make
 *               this easy for the client.
 *               The interrupt routine, however, expects the
 *               nibbles to be in the reverse order to
 *               reduce the number of shifts required to get
 *               the next digit.
 *
 ***********************************************************/
void DTMF_send(uint num)
{
    uint transposed = 0;
    uchar i;

    /*
        Transpose the four nibbles.
    */
    for(i = 0; i < 4; i++)
        {
        transposed <<= 4;
        transposed |= (num & 0x0f);
        num >>= 4;
        }

    INTERRUPTS_OFF;
    Tx_buffer = transposed;
#if 0
    if(Transmit_busy)
        {
        /*
            This should never happen, since we assume that we are
            always going to transmit a group of four digits, and
then
            wait and awhile before transmitting more. The way
this
            is currently written, and incoming group of digits
will
            overwrite a previous group of digits.
        */
        Tx_count = 4;
        }
    else
        {
#endif
        DTMF_CRA = CRA_TOUT | CRA_CP_DTMF | CRA_RSEL;
```

```
        DTMF_CRB = 0x00;
        DTMF_DATA = Tx_buffer & 0x0f;
        Tx_buffer >>= 4;
        Tx_count = 3;
        Transmit_busy = 1;
#if 0
        }
#endif
    INTERRUPTS_ON;
}

/*****************************************************************
 *
 * Name:        uchar DTMF_receive(uint *digits)
 *
 * Description: This function checks to see if an incoming
 *              4-digit DTMF code has been received. It returns
 *              TRUE if it has, and fills in the *digits value.
 *
 *****************************************************************/
uchar DTMF_receive(uint *digits)
{
#if 0
    if(Rx_count >= 4)
        {
        INTERRUPTS_OFF;
        Rx_count = 0;
        *digits = Rx_buffer;
        INTERRUPTS_ON;
        return TRUE;
        }
    else return FALSE;
#else
    /*
        DEBUG: Just return the last 4 digits.
    */
    INTERRUPTS_OFF;
    Rx_count = 0;
    *digits = Rx_buffer;
    INTERRUPTS_ON;
    return TRUE;
#endif
}
```

©P-COM, Inc., 1994

```
/*************************************************************
 *
 * Description: This file contains the defines for the Front
 *              Control Panel (FCP)
 *
 * $Id: fcp.h 2.2 1994/01/19 13:40:38 JEFFC Exp $
 *
 * $Log: fcp.h $
 * Revision 2.2  1994/01/19  13:40:38  JEFFC
 * Contrast changes
 *
 * Revision 2.1  1993/12/29  10:38:25  MIKEE
 * covertion
 *
 *
 *    Rev 1.1   01 Nov 1993 12:20:34   mikee
 * password, remote mode
 *
 *    Rev 1.0   18 Sep 1993 13:55:24   mikee
 * Initial revision.
 *************************************************************/

#ifndef _FCP_H
#define _FCP_H

/*
 * FCP attributes
 */
#define KEY_DROPS_ATTR      0
#define CALL_ATTR           1
#define PW_ENABLE_ATTR      2
#define PW_NUMBER_ATTR      3
#define USER_IN_ATTR        4
#define NUM_FCP_ATTRS       5


#define CONTRAST_ATTR    SPECIAL_ATTRS
#define ONLINE_LED_ATTR (SPECIAL_ATTRS+1)
#define IDU_LED_ATTR     SPECIAL_ATTRS+2
#define ODU_LED_ATTR     SPECIAL_ATTRS+3
#define CABLE_LED_ATTR   SPECIAL_ATTRS+4
#define RMT_LED_ATTR     SPECIAL_ATTRS+5
#define RMT_MODE_ATTR    SPECIAL_ATTRS+6


#define NUM_LINES           2
#define CHAR_PER_LINE       16
#define NUM_DSP_CHARS       (NUM_LINES * CHAR_PER_LINE)

#define NUM_LEDS        5
#define LED_OFF         0
#define RED_LED         2
```

```
/***************************************************************
 *
 * Description: This file contains the defines for the Front
 *              Control Panel (FCP)
 *
 * $Id: fcp.h 2.2 1994/01/19 13:40:38 JEFFC Exp $
 *
 * $Log: fcp.h $
 * Revision 2.2  1994/01/19  13:40:38  JEFFC
 * Contrast changes
 *
 * Revision 2.1  1993/12/29  10:38:25  MIKEE
 * covertion
 *
 *
 *    Rev 1.1   01 Nov 1993 12:20:34   mikee
 * password, remote mode
 *
 *    Rev 1.0   18 Sep 1993 13:55:24   mikee
 * Initial revision.
 ***************************************************************/

#ifndef _FCP_H
#define _FCP_H

/*
 * FCP attributes
 */
#define KEY_DROPS_ATTR      0
#define CALL_ATTR           1
#define PW_ENABLE_ATTR      2
#define PW_NUMBER_ATTR      3
#define USER_IN_ATTR        4
#define NUM_FCP_ATTRS       5


#define CONTRAST_ATTR   SPECIAL_ATTRS
#define ONLINE_LED_ATTR (SPECIAL_ATTRS+1)
#define IDU_LED_ATTR    SPECIAL_ATTRS+2
#define ODU_LED_ATTR    SPECIAL_ATTRS+3
#define CABLE_LED_ATTR  SPECIAL_ATTRS+4
#define RMT_LED_ATTR    SPECIAL_ATTRS+5
#define RMT_MODE_ATTR   SPECIAL_ATTRS+6


#define NUM_LINES           2
#define CHAR_PER_LINE       16
#define NUM_DSP_CHARS       (NUM_LINES * CHAR_PER_LINE)

#define NUM_LEDS        5
```

FCP.C

©P-COM, Inc., 1994

```
#define LED_OFF           0
#define RED_LED           2
#define YELLOW_LED        2
#define GREEN_LED         1
#define BLINK_MASK        0x80

/*
 * LCD Commands
 */
#define LCD_CLEAR_DSP     0x01
#define LCD_SETUP         0x38    /* 8-bits and 2 lines */
#define LCD_DSP_CNTL      0x08    /* control the display features
*/
#define LCD_DSP_ON        0x04    /*     display on bit */
#define LCD_DSP_OFF       0x00    /*     display off bit */
#define LCD_CURSOR_ON     0x02    /*     cursor on bit */
#define LCD_CURSOR_OFF    0x00    /*     cursor off bit */
#define LCD_BLINK_ON      0x01    /*     blink on bit */
#define LCD_BLINK_OFF     0x00    /*     blink off bit */
#define LCD_ENTRY_MODE    0x04    /* control the display on/off */
#define LCD_CURSOR_INC    0x02    /*     cursor increment bit */

#define LCD_CURSOR_DEC    0x00    /*     cursor decrement bit */

#define LCD_DSP_SHIFT     0x01    /*     display shift bit */
#define LCD_DSP_NOSHIFT   0x00    /*     display no shift bit */
#define LCD_LINE1         0x80    /* set DD Ram address line 1*/
#define LCD_LINE2         0xC0    /* set DD Ram address line 2*/

#define LCD_LINE1_END     (LCD_LINE1 + CHAR_PER_LINE)
#define LCD_LINE2_END     (LCD_LINE2 + CHAR_PER_LINE)

#define RMT_BLINK_CNT     3

typedef struct
{
    uchar   changed;
    char    dsp_char;
} DSP_BUFF;


extern uchar     FCP_handler();
extern uchar     FCP_init();
extern void      FCP_set_led();
extern uchar     FCP_get_led();
extern void      FCP_read_key();
extern void      FCP_reset_dsp();
extern void      FCP_set_dsp_cntl();
extern uchar     FCP_dsp_str();
extern void      FCP_updt_dsp();
```

©P-COM, Inc., 1994

```
extern void      FCP_move_cursor();
extern void      FCP_clr_to_eol();
extern uchar     FCP_process_attr_cmd();
extern void      FCP_flush_keys();
extern void      FCP_dsp_save();
extern void      FCP_dsp_restore();
extern void      FCP_user_out();
extern uchar     FCP_call_button();

#endif /* _FCP_H */
```

FCP.MAP.H

©P-COM, Inc., 1994

```
/*************************************************************
 *
 * Description: THIS FILE DEFINES THE MEMORY MAP FOR THE
 *              Front Control Panel
 *
 * $Id: fcp_map.h 2.1 1993/12/29 10:38:25 MIKEE Exp $
 *
 * $Log: fcp_map.h $
 * Revision 2.1  1993/12/29  10:38:25  MIKEE
 * covertion
 *
 *
 *    Rev 1.0   18 Sep 1993 13:55:24   mikee
 * Initial revision.
 *************************************************************/

#ifndef _FCP_MAP_H
#define _FCP_MAP_H

#include <spm_map.h>

#define LEDSEL0         FP0_SEL+0x00   /* Front panel LED control
*/
    typedef struct
    {
        unsigned on_line    :2;
        unsigned idu_led    :2;
        unsigned odu_led    :2;
        unsigned cable_led  :2;
    } LEDSEL0_OL;
#define   LEDSEL0_REG         ((uchar *)(LEDSEL0))

#define KEYSEL          FP0_SEL+0x00   /* read keypad */
    struct keysel
    {
        unsigned keycode    :4;
        unsigned spare2     :4;
    };
#define   KEYSEL_PTR          ((struct keysel *)(KEYSEL))

#define LEDSEL1         FP0_SEL+0x01   /* Front panel LED & LCD
control */
    typedef struct
    {
        unsigned rmt_line   :2;
        unsigned pot_csN    :1;
        unsigned pot_ud     :1;
        unsigned pot_incN   :1;
        unsigned lcdpowerN  :1;
        unsigned lcdrs      :1;
```

©P-COM, Inc., 1994

```
        unsigned lcdrw       :1;
    } LEDSEL1_OL;
#define   LEDSEL1_REG          ((uchar *)(LEDSEL1))

#define READ_STATUS      FP0_SEL+0x02   /* read front panel status
*/
    struct read_status
    {
        unsigned call        :1;
        unsigned standby     :1;
        unsigned spare1      :6;
    };
#define   READ_STATUS_PTR      ((struct read_status
*)(READ_STATUS))


#define LCD              FP0_SEL+0x03   /* write or read LCD */
#define   LCD_REG              ((uchar *)(LCD))


#endif /* FCP_MAP */
```

©P-COM, Inc., 1994

```
/************************************************************
 *
 * Description: This file contains the functions used to support
 *              the Line object
 *
 * $Id: line.c 2.4 1994/03/14 11:37:00 JEFFC Exp $
 *
 * $Log: line.c $
 * Revision 2.4  1994/03/14  11:37:00  JEFFC
 * Changes for pseudo-random test mode.
 *
 * Revision 2.3  1994/01/31  13:56:27  JEFFC
 * Made use of Line Enable Attr more consistent.
 *
 * Revision 2.2  1994/01/19  15:33:55  JEFFC
 * Added support for cross-connect, including NOVRAM translation.
 *
 * Revision 2.1  1993/12/29  10:38:37  MIKEE
 * Conversion
 *
 *    Rev 1.1   01 Nov 1993 11:37:42   mikee
 * cleaned up link loopback code
 *
 *    Rev 1.0   18 Sep 1993 14:03:52   mikee
 * Initial revision.
 ************************************************************/

#include "sysdefs.h"
#include "lca_map.h"
#include "message.h"
#include "object.h"
#include "sys_nov.h"
#include "radio.h"
#include "spm.h"
#include "line.h"
#include "link.h"

/*
 * External Functions
 */
extern void     UTIL_clr_mem();
extern uchar    restart();

/*
 * Internal Functions
 */
static uchar    line_init();

/*
 * External Data
```

```
 */
extern const    uchar   Line_NV_Attr[];
extern const    uchar   Line_NV_Attr26[];
extern register uchar   ln_wr_image[MAX_LINES];
extern LN_WR_OL         *const  ln_wr_ptr;

/*
 * Internal Data
 */
static uchar ReadingNovram;
static uchar NovramTranslated;
static uint  Line_Attr[MAX_LINES][NUM_LINE_ATTRS];
static uchar Link_Lpbk[MAX_LINES];

/**************************************************************
 *
 * Name: LINE_handler()
 *
 * Description: This routine handles the Line object's events
 *
 **************************************************************/
uchar LINE_handler(object, event, cdata_ptr)

uchar   object;
uchar   event;
uchar   *cdata_ptr;
{
    /*
     * switch on the event
     */
    switch(event)
    {
        case INIT_EVENT:
            return line_init(cdata_ptr);
        case SAVE_NV_EVENT:
            if (NOVRAM_save_attrs(object, (NV_ADR_BLK
*)cdata_ptr,
                    (uchar *)Line_NV_Attr,
                    (ATTR_CB)LINE_process_attr_cmd, MAX_LINES) ==
FALSE)
                return(FALSE);
            break;
        case MSG_EVENT:
            MSG_process_attr_msg((ATTR_CB)LINE_process_attr_cmd,
                (HEADER *)cdata_ptr);
            break;
    }
    return(TRUE);
}
```

LINE.C ©P-COM, Inc., 1994

```
/************************************************************
 *
 * Name: line_init()
 *
 * Description: This routine sets up the line data base
 *
 ************************************************************/
uchar line_init(adr_ptr)

NV_ADR_BLK  *adr_ptr;
{
    uchar   i;
    uint    num_lines, attr_val;
    uint    act_lines;
    uint old_release;

    /*
     * Check the hardware to see what is loaded
     */
    RADIO_process_attr_cmd(GET_CMD, HW_LINES_ATTR, &num_lines,
0);
    UTIL_clr_mem(Line_Attr, (MAX_LINES * NUM_LINE_ATTRS *
sizeof(uint)));

    /*
     * set everything to defaults
     */
    for (i = 0; i < num_lines; i++)
    {
        Line_Attr[i][LN_ENABLE_ATTR] = TRUE;

        ln_wr_ptr[i].ln_taos = CLR;
        ln_wr_ptr[i].ln_llp = CLR;
        ln_wr_ptr[i].ln_rlp = CLR;

        ln_wr_ptr[i].ln_frstn = SET;
        LN_WR_REG[i] = ln_wr_image[i];
        Link_Lpbk[i] = FALSE;
    }

    ReadingNovram = TRUE;
    NovramTranslated = FALSE;
    old_release = NOVRAM_get_version();
    /*
        For releases 2.5 and 2.6, there was an additional value
        stored in NOVRAM for each line for the cross-connect
option.
        Since this feature was removed from the MUX, it is no
longer
        needed.
```

```
    */
    if((old_release == FW_REL_25) || (old_release == FW_REL_26))
        {
        NOVRAM_restore_attrs(LINE_OBJ, adr_ptr, (uchar
*)Line_NV_Attr26,
            (ATTR_CB)LINE_process_attr_cmd, MAX_LINES);
        }
    else
        {
        NOVRAM_restore_attrs(LINE_OBJ, adr_ptr, (uchar
*)Line_NV_Attr,
            (ATTR_CB)LINE_process_attr_cmd, MAX_LINES);
        }
    ReadingNovram = FALSE;

    /*
     * Init the hardware. If cold start then do the things that
will not
     * affect traffic
     */
    RADIO_process_attr_cmd(GET_CMD, RATE_LINES_ATTR, &act_lines,
0);
    RADIO_process_attr_cmd(GET_CMD, LN_TYPE_ATTR, &attr_val, 0);
    for (i = 0; i < num_lines; i++)
    {
        if (i >= act_lines)
        {
            ln_wr_ptr[i].ln_taos = TRUE;
            Line_Attr[i][LN_ENABLE_ATTR] = FALSE;
        }

        ln_wr_ptr[i].ln_rcode = B8ZS_HDB3;
        if (attr_val == E1_LINE)
            ln_wr_ptr[i].ln_len = PCM_LN_LEN;
        else
            ln_wr_ptr[i].ln_len = LN_LEN_133;

        /*
         * Reset the fifo
         */
        LINE_reset(i);
    }

    /*
        If we had to translate the NOVRAM because it was
previously saved
        with an earlier release of firmware, let someone know so
we
        can resave it.
    */
```

```
    return NovramTranslated;
}

/************************************************************
 *
 * Name: LINE_process_attr_cmd
 *
 * Description: This function handles a command attribute pair
 *
 ************************************************************/
uchar LINE_process_attr_cmd(opcode, attr_num, attr_val_adr, inst)

uchar   opcode;
uchar   attr_num;
uint    *attr_val_adr;
uchar   inst;
{
    uchar   status;
    uint pr_channel;
    uchar   old_release;

    /*
        If we are reading values out of NOVRAM then we must check
to
        see if these values were saved with a previous release of
        software. If they were, then we must translate certain
values
        before allowing them to be set.
    */
    if(ReadingNovram)
        {
        old_release = NOVRAM_get_version();
        /*
            For releases 2.5 and 2.6, there was an additional
value
            stored in NOVRAM for each line for the cross-connect
option.
            Since this feature was removed from the MUX, it is no
longer
            needed. Because of this, if we are reading NOVRAM
saved by
            Release 2.5 or 2.6, there will be an extraneous value
coming
            in here.
        */
        if((old_release == FW_REL_25) || (old_release ==
FW_REL_26))
            {
            if(attr_num != LN_ENABLE_ATTR)
                {
```

©P-COM, Inc., 1994

```
                return NO_ERR;
                }
            NovramTranslated = TRUE;
            }
        }

    status = NO_ERR;

   /*
    * Attributes are divided into no special handling and special
handling
    * groups. If an error is found we stop processing attributes.
    */
   if (attr_num >= SPECIAL_ATTRS)
   {
        switch(attr_num)
        {
           case LN_RESET_ATTR:
                if (opcode == RESET_CMD)
                    LINE_reset(inst);
                else
                    status = BAD_CMD_ATTR;
               break;
           case LN_TAOS_ATTR:
               if (opcode == GET_CMD)
                   *attr_val_adr = ln_wr_ptr[inst].ln_taos;
               else if (opcode == SET_CMD)
               {
                   ln_wr_ptr[inst].ln_taos = *attr_val_adr;
                   LN_WR_REG[inst] = ln_wr_image[inst];
               }
               else
                   status = BAD_CMD_ATTR;
               break;
           case LN_LLP_ATTR:
               if (opcode == GET_CMD)
                   *attr_val_adr = ln_wr_ptr[inst].ln_llp;
               else if (opcode == SET_CMD)
               {
                    if(LINE_set_lpbk(inst, LN_LOCAL_LPBK,
*attr_val_adr))
                    {
                       ln_wr_ptr[inst].ln_llp = *attr_val_adr;
                       LN_WR_REG[inst] = ln_wr_image[inst];
                    }
                    else
                        status = CMD_FAILED;
               }
               else
                   status = BAD_CMD_ATTR;
```

```
                break;
            case LN_RLP_ATTR:
                if (opcode == GET_CMD)
                    *attr_val_adr = ln_wr_ptr[inst].ln_rlp;
                else if (opcode == SET_CMD)
                {
                     if (LINE_set_lpbk(inst, LN_RMT_LPBK,
*attr_val_adr))
                     {
                        ln_wr_ptr[inst].ln_rlp = *attr_val_adr;
                        LN_WR_REG[inst] = ln_wr_image[inst];
                     }
                     else
                         status = CMD_FAILED;
                }
                else
                    status = BAD_CMD_ATTR;
                break;
            case LN_LKLP_ATTR:
                 if (opcode == GET_CMD)
                 {
                     *attr_val_adr = Link_Lpbk[inst];
                     /*
                         If the loopback is on, then check to see
if
                         we are in pseudo-random test mode. If so,
                         reply that we really are not in loopback.
                     */
                     if(*attr_val_adr)
                     {
                         SPM_process_attr_cmd(GET_CMD,
PRND_LPBK_ATTR,
                             &pr_channel, 0);
                         if(pr_channel == (inst+1))
                             *attr_val_adr = FALSE;
                     }
                 }
                else if (opcode == SET_CMD)
                {
                     if (LINE_set_lpbk(inst, LN_LINK_LPBK,
*attr_val_adr))
                        Link_Lpbk[inst] = *attr_val_adr;
                     else
                         status = CMD_FAILED;
                }
                else
                    status = BAD_CMD_ATTR;
                break;
            case LN_FR_AIS_ATTR:
                 if (opcode == GET_CMD)
```

```
                    *attr_val_adr = SPM_ln_ais(opcode, inst,
*attr_val_adr);
                else if (opcode == SET_CMD)
                    SPM_ln_ais(opcode, inst, *attr_val_adr);
                else
                    status = BAD_CMD_ATTR;
                break;
            default:
                status = UNKNOWN_ATTR;
                break;
        }
    }
    else
    {
        /*
         * If GET_CMD then just load the information into the
buffer
         * otherwise have the general attribute function handle
it
         */
        if (opcode == GET_CMD)
           *attr_val_adr = Line_Attr[inst][attr_num];
        else if (opcode == SET_CMD)
           status = OBJ_process_attr(opcode, attr_val_adr,
               &Line_Attr[inst][attr_num]);
       else
           status = BAD_CMD_ATTR;
    }

    NOVRAM_chk_updt_needed(opcode, attr_num, status, (uchar
*)Line_NV_Attr);

    return(status);
}

/************************************************************
 *
 * Name: LINE_reset
 *
 * Description: This routine resets a lines fifo
 *
 ************************************************************/
void LINE_reset(line_num)

uchar   line_num;
{
    /*
     * Disable fifo in the lca first, then tickle the FIFO reset
     */
    SPM_ln_fifo_able(line_num, FALSE);
```

```
    ln_wr_ptr[line_num].ln_frstn = CLR;
    LN_WR_REG[line_num] = ln_wr_image[line_num];
    ln_wr_ptr[line_num].ln_frstn = SET;
    LN_WR_REG[line_num] = ln_wr_image[line_num];
    SPM_ln_fifo_able(line_num, TRUE);
}

/***************************************************************
 *
 * Name: LINE_chk_ais
 *
 * Description: This functions checks all lines for AIS detection
 *
 ***************************************************************/
uchar LINE_chk_ais()

{
    uchar   i;
    uchar   got_any;
    uint    num_lines;

    /*
     * check all configured lines
     */
    got_any = FALSE;
    RADIO_process_attr_cmd(GET_CMD, RATE_LINES_ATTR, &num_lines,
0);
    for (i = 0; i < num_lines; i++)
    {
        if ((Line_Attr[i][LN_AIS_ATTR] = LN_AIS(i)))
        {
            Line_Attr[i][LN_AIS_HIST_ATTR] = TRUE;
            if (Line_Attr[i][LN_ENABLE_ATTR])
                got_any = TRUE;
        }
    }

    return(got_any);
}

/***************************************************************
 *
 * Name: LINE_chk_los
 *
 * Description: This functions checks all lines for LOS detection
 *
 ***************************************************************/
uchar LINE_chk_los()

{
```

©P-COM, Inc., 1994

```
    uchar   i, ais;
    uchar   got_any;
    uint    num_lines;
    uint    pseudo_random;

    /*
     * Check each configured line
     */
    got_any = FALSE;
    RADIO_process_attr_cmd(GET_CMD, RATE_LINES_ATTR, &num_lines,
0);
    for (i = 0; i < num_lines; i++)
    {
        ais = FALSE;
        if ((Line_Attr[i][LN_LOS_ATTR] = LN_LOS(i)))
        {
            Line_Attr[i][LN_LOS_HIST_ATTR] = TRUE;
            if (Line_Attr[i][LN_ENABLE_ATTR])
                got_any = TRUE;

            /*
             * Check if we are in remote loopback (Local on
crystal), if
             * so then don't inject AIS
             */
            if (Line_Attr[i][LN_CUR_LPBK_ATTR] != LN_LOCAL_LPBK)
                ais = TRUE;

            /*
                If we are in pseudo-random loopback mode, then
force
                AIS OFF.
                This attribute returns 0 if all lines are off, or
the
                channel (1-4) of the channel is pseudo-random
loopback.
            */
            SPM_process_attr_cmd(GET_CMD, PRND_LPBK_ATTR,
&pseudo_random, 0);
            if(pseudo_random == (i + 1))
                ais = FALSE;
        }
        SPM_ln_ais(SET_CMD, i, ais);
    }

    return(got_any);
}

/*****************************************************************
 *
```

©P-COM, Inc., 1994

```
 * Name: LINE_read_stats
 *
 * Description: This functions checks all lines for status
 *
 ***************************************************************/
void LINE_read_stats()
{
    uchar   i;
    uint    num_lines;
    uchar   full, empty;

    /*
     * check all configured lines
     */
    RADIO_process_attr_cmd(GET_CMD, RATE_LINES_ATTR, &num_lines,
0);
    for (i = 0; i < num_lines; i++)
    {
        Line_Attr[i][LN_PCM_BPV_ATTR] += LN_BPV(i);

        /*
         * Should not get any fifo fulls or empties. If we do
         * reset the line
         */
        full = LN_FIFOFULL(i);
        empty = LN_FIFOEMPTY(i);

        if (full || empty)
        {
            LINE_reset(i);
            Line_Attr[i][LN_FIFO_FULL_ATTR] += full;
            Line_Attr[i][LN_FIFO_EMPTY_ATTR] += empty;
        }
    }
}

/***************************************************************
 *
 * Name: LINE_set_lpbk
 *
 * Description: This functions sets and clears loopbacks. This
 *              just documents the loopback it does not set it
 *              or clear it.
 *
 ***************************************************************/
uchar LINE_set_lpbk(ln_num, lp_type, onoff)

uchar   ln_num;
uchar   lp_type;
uchar   onoff;
```

©P-COM, Inc., 1994

```
{
    uint lpbk;

    if (onoff == ON)
    {
        /*
         * Make sure there is not a current loopback then set the
         * line loopback
         */
        LINK_process_attr_cmd(GET_CMD, CUR_LPBK_ATTR, &lpbk, 0);
        if ((Line_Attr[ln_num][LN_CUR_LPBK_ATTR] != LN_NO_LOOP)
||
            (lpbk != LK_NO_LOOP))
        {
            /*
             * Loop already set, OK if its the same as desired
one
             */
            if (Line_Attr[ln_num][LN_CUR_LPBK_ATTR] != lp_type)
                return(FALSE);
        }
        else
        {
            Line_Attr[ln_num][LN_CUR_LPBK_ATTR] = lp_type;
        }
    }
    else
    {
        if(Line_Attr[ln_num][LN_CUR_LPBK_ATTR] == lp_type)
            Line_Attr[ln_num][LN_CUR_LPBK_ATTR] = LN_NO_LOOP;
    }
    return(TRUE);
}

/***************************************************************
 *
 * Name: LINE_chk_lpbk
 *
 * Description: Check if there is a line loopback in progress
 *              It has two modes if lp_type flag is LN_NO_LOOP
 *              then it checks if any loopbacks are present.
 *              Otherwise it checks for any occurances of the
 *              given type.
 *
 ***************************************************************/
uchar LINE_chk_lpbk(lp_type)

uchar    lp_type;
{
    uchar   i;
```

```
    uint     num_lines;

    /*
     * Check all the lines for loopbacks
     */
    RADIO_process_attr_cmd(GET_CMD, RATE_LINES_ATTR, &num_lines,
0);

    for (i = 0; i < num_lines; i++)
    {
        if (lp_type == LN_NO_LOOP)
        {
            if (Line_Attr[i][LN_CUR_LPBK_ATTR] != LN_NO_LOOP)
                return(TRUE);
        }
        else
        {
            if (Line_Attr[i][LN_CUR_LPBK_ATTR] == lp_type)
                return(TRUE);
        }
    }
    return(FALSE);
}
```

LINK.C

©P-COM, Inc., 1994

```
/***************************************************************
 *
 * Description: This file contains the functions used to support
 *              the Link object
 *
 * $Id: link.c 2.3 1994/03/14 11:30:12 JEFFC Exp $
 *
 * $Log: link.c $
 * Revision 2.3  1994/03/14  11:30:12  JEFFC
 * Limit AIS injection to valid range.
 *
 * Revision 2.2  1994/01/19  15:36:08  JEFFC
 * BER/AIS code extensively modified.
 *
 * Revision 2.1  1993/12/29  10:38:37  MIKEE
 * Conversion
 *
 *    Rev 1.4   01 Nov 1993 11:41:14   mikee
 * AFC chnage for new ODU, and loopback bug fix
 *
 *    Rev 1.3   08 Oct 1993 11:05:32   mikee
 * transmitter is muted as default case
 *
 *    Rev 1.2   07 Oct 1993 06:26:04   mikee
 * modem status byte sense swap
 *
 *    Rev 1.1   04 Oct 1993 12:50:56   mikee
 * fixed bugs
 *
 *    Rev 1.0   18 Sep 1993 14:03:52   mikee
 * Initial revision.
 ***************************************************************/

#include "sysdefs.h"
#include "lca_map.h"
#include "sys_msg.h"
#include "sys_time.h"
#include "object.h"
#include "sys_nov.h"
#include "radio.h"
#include "spm.h"
#include "link.h"
#include "line.h"
#include "modem.h"
#include "odu.h"
#include "ocm.h"

/*
 * External Functions
 */
```

```
extern void UTIL_clr_mem();

/*
 * Internal Functions
 */
static uchar    link_init();
static void     afc_compensation();
static void     calc_G821();

/*
 * External Data
 */
extern const uchar  Link_NV_Attr[];
extern const uint   Ber_Tbl[LN_TYPES * NUM_RATES *
2][NUM_BER_GRPS+1];
extern const uint   Ber_Intervals[NUM_BER_GRPS+1];
extern const uint   Link_Ids[];
extern        ulong  Last_Time;

/*
 * Internal Data
 */
static uchar ReadingNovram;
static uchar NovramTranslated;
static  uint     Link_Attr[NUM_LINK_ATTRS];
static  uchar    Cur_Lpbk;
static  uchar    Avail_Cnt;
static  uchar    Sec_Cnt;
static  ulong    Ber_1min_cnt;
static  uint     Ber_1sec_cnt;
static  uchar    Ber_cur_index;
static  uint     Ber_cur_int;
static  uint     Link_Id;
static  uint     Ber_intv_cnts[NUM_BER_GRPS+1];

/*************************************************************
 *
 * Name: LINK_handler()
 *
 * Description: This routine handles the Link's object events
 *
 *************************************************************/
uchar LINK_handler(object, event, cdata_ptr)

uchar   object;
uchar   event;
uchar   *cdata_ptr;
{
    /*
     * switch on the event
```

```
     */
     switch(event)
     {
         case INIT_EVENT:
              return link_init(cdata_ptr);
              break;
         case SAVE_NV_EVENT:
              return(NOVRAM_save_attrs(object, (NV_ADR_BLK
*)cdata_ptr,
                   (uchar *)Link_NV_Attr,
                   (ATTR_CB)LINK_process_attr_cmd, 1));
              break;
         case TIMER_EVENT:
              if (AFC_TIMER == ((uint)cdata_ptr))
                   afc_compensation();
              else if (BER_TIMER == ((uint)cdata_ptr))
              {
                   Last_Time++;
                   calc_G821();
              }
              break;
         case MSG_EVENT:
              MSG_process_attr_msg((ATTR_CB)LINK_process_attr_cmd,
                   (HEADER *)cdata_ptr);
              break;
     }
     return(TRUE);
}

/*************************************************************
 *
 * Name: link_init()
 *
 * Description: This routine sets up the link data base
 *
 *************************************************************/
uchar link_init(adr_ptr)

NV_ADR_BLK  *adr_ptr;
{
    uchar novram_ok;

    UTIL_clr_mem(Link_Attr, (NUM_LINK_ATTRS * sizeof(uint)));
    UTIL_clr_mem(Ber_intv_cnts, ((NUM_BER_GRPS+1) *
sizeof(uint)));

    Link_Attr[AFC_ABLE_ATTR] = TRUE;
    Link_Attr[CHANNEL_ATTR] = DEFAULT_CHANNEL;
    Link_Attr[POWER_ATTR] = DEFAULT_POWER;  /* 4.5 volts default
*/
```

©P-COM, Inc., 1994

```
    Link_Attr[AIS_EXP_ATTR] = BER_10E3;
    Link_Attr[BER_ATTR] = BER_10E3;
    Link_Attr[TX_MUTE_ATTR] = TRUE;
    Avail_Cnt = 0;
    Sec_Cnt = 0;
    Ber_1min_cnt = 0;
    Link_Id = DEFAULT_LINK_ID;
    Ber_cur_index = 0;
    Ber_cur_int = 0;

    /*
     * Now see if there is anything saved in novram
     */
    ReadingNovram = TRUE;
    NovramTranslated = FALSE;
    novram_ok = NOVRAM_restore_attrs(LINK_OBJ, adr_ptr, (uchar
*)Link_NV_Attr,
        (ATTR_CB)LINK_process_attr_cmd, 1);
    ReadingNovram = FALSE;
    if( ! novram_ok)
    {
        LINK_set_id();
    }

    return NovramTranslated;
}

/****************************************************************
 *
 * Name: LINK_process_attr_cmd
 *
 * Description: This function handles a command attribute pair
 *
 ****************************************************************/
uchar LINK_process_attr_cmd(opcode, attr_num, attr_val_adr, inst)

uchar   opcode;
uchar   attr_num;
uint    *attr_val_adr;
uchar   inst;
{
    uchar   status;
    uchar   old_release;

    /*
        If we are reading values out of NOVRAM then we must check
to
        see if these values were saved with a previous release of
        software. If they were, then we must translate certain
values
```

```
        before allowing them to be set.
    */
    if(ReadingNovram)
        {
        old_release = NOVRAM_get_version();
        /*
            For releases prior to V2.5, the BER AIS injection
attribute
            was stored using different definitions. If restoring
from an
            old save, translate old values to new.
        */
        if(old_release < FW_REL_25)
            {
            if(attr_num == AIS_EXP_ATTR)
                {
                switch(*attr_val_adr)
                    {
                    case 3: *attr_val_adr = BER_10E4; break;
                    case 5: *attr_val_adr = BER_OFF; break;
                    default: *attr_val_adr = BER_10E3; break;
                    }
                NovramTranslated = TRUE;
                }
            }
        }

    status = NO_ERR;

    /*
     * Attributes are divided into no special handling and
special handling
     * groups. If an error is found we stop processing
attributes.
     */
    if (attr_num >= SPECIAL_ATTRS)
    {
        switch(attr_num)
        {
            case LINK_ID_ATTR:
                if (opcode == GET_CMD)
                    *attr_val_adr = Link_Id;
                else if (opcode == SET_CMD)
                {
                    if ((*attr_val_adr < MIN_LINK_ID) ||
                            (*attr_val_adr > MAX_LINK_ID))
                        status = VAL_OO_RANGE;
                    else
                    {
                        Link_Id = *attr_val_adr;
```

©P-COM, Inc., 1994

```
                    LINK_set_id();
                }
            }
            else
                status = BAD_CMD_ATTR;
            break;
        default:
            status = UNKNOWN_ATTR;
            break;
        }
    }
    else
    {
        /*
         * If GET_CMD then just load the information into the
buffer
         * otherwise have the general attribute function handle
it
         */
        if (opcode == GET_CMD)
            *attr_val_adr = Link_Attr[attr_num];
        else if (opcode == SET_CMD)
            {
            /*
                Must limit AIS_EXP_ATTR to OFF, 10E-3, and 10E-4.
            */
            if((attr_num == AIS_EXP_ATTR) && (*attr_val_adr >
BER_10E4))
                status = VAL_OO_RANGE;
            else
                status = OBJ_process_attr(opcode, attr_val_adr,
                &Link_Attr[attr_num]);
            }
        else
            status = BAD_CMD_ATTR;
    }

    NOVRAM_chk_updt_needed(opcode, attr_num, status, (uchar
*)Link_NV_Attr);

    return(status);
}


/***************************************************************
 *
 * Name: afc_compensation
 *
 * Description: This routine checks to seee if the frequence
needs
```

```
 *              to be adjusted.
 *
 ***************************************************************/
void afc_compensation()
{
    MD_STATUS   *stat_ptr;
    uchar       msg[4], *msg_ptr;
    uint        compensate;

    /*
     * If enabled then check to see if compensation is needed
     */
    compensate = FALSE;
    if (Link_Attr[AFC_ABLE_ATTR])
    {
        stat_ptr = MODEM_get_status();
        if (stat_ptr->afcon == SET)
        {
            if (stat_ptr->afcfreq == SET)
                compensate = DOWN;
            else
                compensate = UP;

            msg_ptr = msg;
            OBJ_load_attr(&msg_ptr, OCM_AFC_ATTR, compensate);
            MSG_bld_msg(TX,INTER_LK_ADR, TELEMETRY_LINK,
HERE_CMD, OCM_OBJ,
                msg, (msg_ptr - msg));
        }
    }
    Link_Attr[AFC_COMP_ATTR] = compensate;
}

/***************************************************************
 *
 * Name: LINK_read_stats
 *
 * Description: This functions checks all lines for status
 *
 ***************************************************************/
void LINK_read_stats()
{
    /*
     * Read stats from LCA registers
     */
    Link_Attr[RUN_LEN_VI_ATTR] += LCA1_TXSTAT1_PTR->runlendet;
    Link_Attr[FRAME_SLP_ATTR] += LCA1_FRMERRCNT_PTR->frmslip;
}

/***************************************************************
```

©P-COM, Inc., 1994

```
 *
 * Name: LINK_chk_ber
 *
 * Description: This checks for a BER alarm condition
 *
 ***********************************************************/
uchar LINK_chk_ber()
{
    if (Link_Attr[BER_ATTR] <= BER_10E6)
        return(TRUE);
    return(FALSE);
}

/***********************************************************
 *
 * Name: LINK_set_lpbk
 *
 * Description: This functions sets and clears loopbacks
 *
 ***********************************************************/
uchar LINK_set_lpbk(lp_type, onoff)

uchar   lp_type;
uchar   onoff;
{
    uint    rx_frame;

    if (onoff == ON)
    {
        /*
         * Make sure there is not a current loopback then set
other
         * then the one request to be set
         */
        if ((Link_Attr[CUR_LPBK_ATTR] != LK_NO_LOOP) ||
            (LINE_chk_lpbk(LN_NO_LOOP) == TRUE))
        {
            if (Link_Attr[CUR_LPBK_ATTR] != lp_type)
                return(FALSE);
        }
        else
        {
            Link_Attr[CUR_LPBK_ATTR] = lp_type;
        }
        rx_frame = OFF;
    }
    else
    {
        if (Link_Attr[CUR_LPBK_ATTR] != lp_type)
            return(FALSE);
```

©P-COM, Inc., 1994

```
        Link_Attr[CUR_LPBK_ATTR] = LK_NO_LOOP;
        rx_frame = ON;
    }

    /*
     * turn off the rx frame sync word invert bit before a
loopback
     * and back on after. Call directly to avoid re-entrent code
     */
    SPM_rxcmd0_funcs(SET_CMD, RX_FRMINVT_ATTR, &rx_frame);

    return(TRUE);
}

/************************************************************
 *
 * Name: calc_G821
 *
 * Description: This routine calculates the G.821 quality stats
 *
 ************************************************************/
void calc_G821()
{
    uint    attr_val;

    /*
     * Index is calculated once a second to save time
     */
    RADIO_process_attr_cmd(GET_CMD, LN_TYPE_ATTR, &attr_val, 0);
    Ber_cur_index = attr_val * NUM_RATES * 2;
    RADIO_process_attr_cmd(GET_CMD, FEC_ATTR, &attr_val, 0);
    Ber_cur_index += attr_val * NUM_RATES;
    RADIO_process_attr_cmd(GET_CMD, LN_RATE_ATTR, &attr_val, 0);
    Ber_cur_index += attr_val;

    /*
     * check for severely errored seconds (> 10-3) and also
monitor
     * system availability. Need 10 consecutive seconds of 10-3
to be
     * unavailable and then 10 consecutive seconds of < 10-3 to
be available
     */
    if (Link_Attr[BER_ATTR] <= BER_10E3)
    {
        Link_Attr[SESEC_ATTR]++;

        if (Link_Attr[UNAVAIL_ATTR])
            Avail_Cnt = UNAVAIL_TRIG;
        else
```

LINK.C

©P-COM, Inc., 1994

```
            if (++Avail_Cnt >= UNAVAIL_TRIG)
            {
                Link_Attr[UNAVAIL_ATTR] = TRUE;
            }
    }
    else
    {
        if (Link_Attr[UNAVAIL_ATTR])
        {
            if (--Avail_Cnt == 0)
                Link_Attr[UNAVAIL_ATTR] = FALSE;
        }
        else
            Avail_Cnt = 0;
    }

    if (Link_Attr[UNAVAIL_ATTR])
        Link_Attr[UNAVAIL_CNT_ATTR]++;

    /*
     * check for degraded minutes. 60 seconds (not counting
severely errored
     * and unavailable time) that exceeds 1x10-6 BER.
     */
    if ((Link_Attr[BER_ATTR] > BER_10E3) &&
(Link_Attr[UNAVAIL_ATTR] == FALSE))
    {
        Ber_1min_cnt += Ber_1sec_cnt;
        if (++Sec_Cnt >= SEC_PER_MIN)
        {
            if (Ber_1min_cnt >
(ulong)(Ber_Tbl[Ber_cur_index][BER_10E6]
                    * (SEC_PER_MIN/10)))
                Link_Attr[DMIN_ATTR]++;
            Ber_1min_cnt = 0;
            Sec_Cnt = 0;
        }
    }

    /*
     * Check error free seconds or add to running totals
     */
    if (Ber_1sec_cnt == 0)
        Link_Attr[EFSEC_ATTR]++;
    else
    {
        Link_Attr[SIG_READ_CNT_ATTR] += Ber_1sec_cnt;
        Link_Attr[ESEC_ATTR]++;
        Ber_1sec_cnt = 0;
    }
```

LINK.C

©P-COM, Inc., 1994

```
}

/************************************************************
 *
 * Name: LINK_chk_lpbk_alm
 *
 * Description: Check if there is a loopback in progress
 *
 ************************************************************/
uchar LINK_chk_lpbk_alm()

{

    if (Link_Attr[CUR_LPBK_ATTR] != LK_NO_LOOP)
        return(TRUE);

    /*
     * Check all the lines for loopbacks
     */
    return(LINE_chk_lpbk(LN_NO_LOOP));
}

/************************************************************
 *
 * Name: LINK_chk_ais_inj
 *
 * Description: Check if AIS is being injected
 *
 ************************************************************/
uchar LINK_chk_ais_inj()

{
    return(Link_Attr[AIS_INJECTED_ATTR]);
}

/************************************************************
 *
 * Name: LINK_calc_ber
 *
 * Description: This routine is called every 100ms with the
number
 *              of bit errors that have occured in the last
100ms.
 *              It checks BER is adjusted if the count and period
 *              indicate a change.
 *
 ************************************************************/
void LINK_calc_ber(ber_100ms_cnt)

uint    ber_100ms_cnt;
```

©P-COM, Inc., 1994

```
{
    uchar   i;
    uint    ais, attr_val;
    uchar   rate;

    Ber_cur_int++;
    Ber_1sec_cnt += ber_100ms_cnt;
    rate = 0xff;                        /* indicates no rate */

    /*
     * Check that there are enough errors and a long enough
interval
     * to qualify for a new BER
     */
    for (i = BER_10E7; i >= BER_10E3; i--)
    {
        Ber_intv_cnts[i] += ber_100ms_cnt;

        /*
         * Check if the current interval matches up with one of
the
         * BER test rates.
         */
        if ((Ber_cur_int % Ber_Intervals[i]) == 0)
        {
            /*
             * If the bit error count for the given interval is
             * larger than the limit, then we have determined the
rate.
             * Otherwise the rate is less than what we are
checking so
             * if the current rate is higher we should bring it
down
             * to this rate.
             */
            if (Ber_intv_cnts[i] >= Ber_Tbl[Ber_cur_index][i])
                rate = i;
            else if (Link_Attr[BER_ATTR] < i)
                rate = i;

            Ber_intv_cnts[i] = 0;
        }
    }

    /*
     * If we have gone past the max interval and have less errors
     * than needed for 10-7 just set it to 10-7 because the user
will
     * see 10-7 or better
     */
```

LINK.C

©P-COM, Inc., 1994

```
    if(Ber_cur_int > Ber_Intervals[BER_10E7])
        {
        if(Ber_intv_cnts[BER_10E7] <
Ber_Tbl[Ber_cur_index][BER_10E7])
            rate = BER_LT_10E7;
        else rate = BER_10E7;
        }

    /*
     * See if a new BER has been found
     */
    if (rate != 0xff)
    {
        /*
         * If this rate is greater than or equal to the current,
clear the
         * counters so we don't get any false triggers. If the
rate is less
         * then leave other counters so they can integrate over
the longer
         * intervals.
         */
        if (rate <= Link_Attr[BER_ATTR])
        {
            Ber_cur_int = 0;
            UTIL_clr_mem(Ber_intv_cnts, (NUM_BER_GRPS *
sizeof(uint)));
        }

        Link_Attr[BER_ATTR] = rate;

        /*
            Check if the BER is high enough to set AIS on the
lines.
            If not, check if it's low enough (1 decade below the
AIS
            injection threshold) to be removed. If it's not
either
            of these, just leave AIS where it is.
         */
        if(Link_Attr[AIS_EXP_ATTR] == BER_OFF)
            ais = FALSE;
        else if(rate <= Link_Attr[AIS_EXP_ATTR])
            ais = TRUE;
        else if(rate > (Link_Attr[AIS_EXP_ATTR] + 1))
            ais = FALSE;
        else ais = Link_Attr[AIS_INJECTED_ATTR];

        if (Link_Attr[AIS_INJECTED_ATTR] != ais)
        {
```

LINK.C

©P-COM, Inc., 1994

```
            RADIO_process_attr_cmd(GET_CMD, HW_LINES_ATTR,
&attr_val, 0);
            for (i = 0; i < attr_val; i++)
               LINE_process_attr_cmd(SET_CMD, LN_TAOS_ATTR, &ais,
i);
            Link_Attr[AIS_INJECTED_ATTR] = ais;
        }
    }
}

/**************************************************************
 *
 * Name: LINK_set_id
 *
 * Description: This routine sets the link id based on the users
 *              link id and the band we are in
 *
 **************************************************************/
void LINK_set_id()

{
    uint    band, link_id;

    ODU_process_attr_cmd(GET_CMD, PLO_ID_ATTR, &band, 0);

    link_id = Link_Ids[Link_Id - 1];

    /*
     * Band 1 talks with 3, 2 with 4 and 5 with 6
     */
    if ((band == 3) || (band == 4) || (band == 6))
          link_id = ~link_id;

    SPM_set_link_id(link_id);
}
```

MAIN.C

©P-COM, Inc., 1994

```
/*************************************************************
 *
 * Description: This is the main routine for the IDU firmware.
 *              It includes main and the interrupt handlers.
 *
 * $Id: main.c 2.3 1994/03/14 11:39:17 JEFFC Exp $
 *
 * $Log: main.c $
 * Revision 2.3  1994/03/14  11:39:17  JEFFC
 * Commented out support for DTMF until it is needed.
 *
 * Revision 2.2  1994/01/19  15:37:40  JEFFC
 * Added NOVRAM translation.
 *
 * Revision 2.1  1993/12/29  10:38:38  MIKEE
 * conversion
 *
 *    Rev 1.3   17 Nov 1993 09:57:48   mikee
 * part of interrupt driver over-haul
 *
 *    Rev 1.2   01 Nov 1993 11:38:20   mikee
 * added time since last restart
 *
 *    Rev 1.1   04 Oct 1993 12:50:34   mikee
 * fixed bugs
 *
 *    Rev 1.0   18 Sep 1993 14:03:54   mikee
 * Initial revision.
 *************************************************************/

/*
 * The chip configuration byte (ccb location 2018h) bit76- no
lock mode,
 * bit54-1 wait state, bit3- address valid strobe select, bit2
write strobe,
 * mode select, bit1- bus width select 8, bit0- reserved.
*/
#pragma   ccb(0xcc)

#define MAINCODE    1    /* THIS IS DONE SO ONLY THIS MODULE
DECLARES */
                         /* VARIABLES ALL OTHERS WILL DEFINE THEM
AS  */
                         /* EXTERNAL
  */

#include "sysdefs.h"
#include "80c196.h"
#include "spm_map.h"
#include "radio.h"
```

MAIN.C

©P-COM, Inc., 1994

```
#include "object.h"
#include "sys_msg.h"
#include "sys_time.h"
#include "spm.h"
#include "fcp.h"
#include "diag.h"
/* #include "dtmf.h" */
#include "novram.h"
#include "fact.h"

/*
 * External Functions
 */
extern void      UTIL_clr_mem();
extern uchar     NOVRAM_init();
extern void      KPAD_dsp_pcom();

/*
 * Internal Functions
 */
#pragma interrupt (external_interrupt = 7)
#pragma interrupt (serial_interrupt = 6)
#pragma interrupt (timer_interrupt = 5)
#pragma interrupt (HSI0_interrupt = 4)
#pragma interrupt (HSO_interrupt = 3)
#pragma interrupt (data_available_interrupt = 2)
#pragma interrupt (a2d_interrupt = 1)
#pragma interrupt (timer_ovflw_interrupt = 0)

void system_initialize();
void Wdt_Tickle();

/*
 * External Data
 */
extern TIMER    Timers[MAX_TIMERS];

/*
 * Internal Data
 */
register    uint     Sys_Timer;
register    uchar    Dog_Food;
register    uchar    Debug_Flag;
            ulong    Last_Time;
static      uchar    Restart;
static      uchar    Init_Done;

/**************************************************************
 *
 * Name: main
```

```
 *
 * Description: This is the main loop of the program. Each task
is
 * set up to run at a specific time at initialization.
 *
 ************************************************************/
void main()
{
     system_initialize();

     DIAG_state(RUNNING);
    KPAD_dsp_pcom();

     while(TRUE)
     {
        TIMER_checker();

        MSG_process_chars();

          MSG_process_msgs();

        WDT_TICKLE();

     }/*end while(TRUE)*/

}/*close main()*/

/*************************************************************
 *
 * Name: system_initialize()
 *
 * Description: This routine sets up the radio to be operational
 * before settling down into the main processing loop
 *
 ************************************************************/
void system_initialize()
{
    uchar novram_translated = 0;
    uchar value;

    /*
     * determine the restart reasons
     */
    if (WDT_RESTART)
    {
        Restart++;                      /* will count reboots */
    }
    else
    {
        Restart = POWER_ON_START;
```

```
    }

    Wdt_Tickle();

    if (Restart == POWER_ON_START)
    {
        DIAG_nondest_selftest();
        DIAG_mem_test();
    }

    Debug_Flag = FALSE;
    Init_Done = FALSE;
    Last_Time = 5;                  /* 5 seconds before 1st
timeout */

    NOVRAM_init();

    novram_translated = FCP_init();

    /*
     * Initialize the objects
     */
    novram_translated += OBJ_init();

    /*
        If any objects' novram had to be translated because it
        was last saved with an old software version, then rewrite
        all object's data with the new software version.
        When all objects are updated, write the new firmware
release.
        !!! Think about what we should do here if NOVRAM update
fails?
    */
    if(novram_translated)
        {
        OBJ_save_novram(NULL_OBJ);
        value = FW_RELEASE;
        NOVRAM_write(&value, NV_FW_REL_LOC, 1, PAGE_1);
        }

    /*
     * Start the timer interrupt, set it for five milli-second
timeouts
     */
    hso_command = START_SW_TIMER1;
    hso_time = timer1 + FIVE_MILLI_SECOND_TICK;
    Init_Done = TRUE;
}

/***************************************************************
```

MAIN.C

©P-COM, Inc., 1994

```
 *
 * Name: timer_interrupt
 *
 * Description: decrements all software timers used for time
 *              slicing,timeouts ...
 *
 *************************************************************/
void timer_interrupt()
{
     uchar ios1_status;
    register uchar i;
    register TIMER *time_ptr;

     ios1_status = ios1;          /* read the status register to
*/
                                /* determine which timer has
expired */
     if (ios1_status & 0x01)
     {
          hso_command = START_SW_TIMER1;
          hso_time = timer1 + FIVE_MILLI_SECOND_TICK;

        if (++Sys_Timer == 0)
            Sys_Timer++;

        for (i = 0, time_ptr = Timers; i < NUM_TIMERS; i++,
time_ptr++)
        {
            if (time_ptr->trigger_time == Sys_Timer)
                time_ptr->trigger_flag = TRUE;
        }
    }
}

/*************************************************************
 *
 * Name: a2d_interrupt
 *
 * Description: stub
 *
 *************************************************************/
void a2d_interrupt()
{

}

/*************************************************************
 *
 * Name: serial_interrupt
 *
```

©P-COM, Inc., 1994

```
 * Description: his handle transmission and reception of
characters
 *        of the on board uart of the micro-controller.
 *
 *************************************************************/
void serial_interrupt()
{

    MSG_process_interrupt(TELEMETRY_LINK);

}/*close interrupt handler*/

/*************************************************************
 *
 * Name: external_interrupt
 *
 * Description: This handle transmission and reception of
characters
 *        of the five 2691 UARTS.When a character is recieved
 *        it is determined if it fits into the expected packet
 *        format and buffered for processing by the programs
 *        main loop.
 *************************************************************/
void external_interrupt()
{
     register uchar   uart_interrupt_pins;

     uart_interrupt_pins = IN_RD0_PTR->scc_intn;
     while(uart_interrupt_pins != UART_INTERRUPT_MASK)
     {
          if(!(uart_interrupt_pins & PEER_INTERRUPT))
               MSG_process_interrupt(PEER_LINK);
          if(!(uart_interrupt_pins & MAINTENANCE_INTERRUPT))
               MSG_process_interrupt(MAINTENANCE_PORT);
          if(!(uart_interrupt_pins & NMS_PORT1_INTERRUPT))
               MSG_process_interrupt(NMS_PORT1);
          if(!(uart_interrupt_pins & NMS_PORT2_INTERRUPT))
               MSG_process_interrupt(NMS_PORT2);
          if(!(uart_interrupt_pins & PROTECTION_INTERRUPT))
               MSG_process_interrupt(PROTECTION_LINK);

          uart_interrupt_pins = IN_RD0_PTR->scc_intn;
     }
}

/*************************************************************
 *
 * Name: HSI0_interrupt
 *
 * Description: Handles the interrupt for the keypad and
```

©P-COM, Inc., 1994

```
orderwire
 *
 ***************************************************************/
void HSI0_interrupt()
{
    uchar status = hsi_status;

    /*
        This interrupt can be called for either the control panel
        interrupt (keypress) or the DTMF interrupt (DTMF tone
sent/
        received).
    */
    if(status & 0x01)
        FCP_read_key();

/* !!! DTMF
    if(status & 0x04)
        DTMF_interrupt();
*/
}

/***************************************************************
 *
 * Name: HSO_interrupt
 *
 * Description:
 *
 ***************************************************************/
void HSO_interrupt()
{
     /*interrupt stump*/
}

/***************************************************************
 *
 * Name: data_available_interrupt
 *
 * Description:
 *
 ***************************************************************/
void data_available_interrupt()
{
     /*interrupt stump*/
}

/***************************************************************
 *
 * Name: timer_ovflw_interrupt
 *
```

```
 * Description:
 *
 **************************************************************/
void timer_ovflw_interrupt()
{
     /*interrupt stump*/
}

/**************************************************************
 *
 * Name: Wdt_Tickle
 *
 * Description:
 *
 **************************************************************/
void Wdt_Tickle()
{
    WDT_TICKLE();
}

/**************************************************************
 *
 * Name: fatal_failure();
 *
 * Description: This is function handles a major failure
condition
 *              turn on the red IDU LED and loop forever
 *
 **************************************************************/
void fatal_failure()
{
    FCP_set_led(IDU_LED_ATTR, RED_LED);

     while(TRUE)
     {
        Wdt_Tickle();

     }/*end while(TRUE)*/
}

/**************************************************************
 *
 * Name: restart
 *
 * Description: restart reason
 *
 **************************************************************/
uchar restart()
{
    return(Restart);
```

©P-COM, Inc., 1994

```
}

/****************************************************************
 *
 * Name: init_done
 *
 * Description: initialization state
 *
 ***************************************************************/
uchar init_done()
{
    return(Init_Done);
}
```

MESSAGE.H ©P-COM, Inc., 1994

```
/***************************************************************
 *
 * Description: This file contains the defines for the message
engine
 *
 * $Id: message.h 2.2 1994/01/19 15:01:05 JEFFC Exp $
 *
 * $Log: message.h $
 * Revision 2.2  1994/01/19  15:01:05  JEFFC
 * Changed MAX_RADIO_ADR
 *
 * Revision 2.1  1993/12/29  10:38:30  MIKEE
 * conversion
 *
 *    Rev 1.0   17 Nov 1993 10:26:54   mikee
 * Initial revision.
 *
 *    Rev 1.1   04 Oct 1993 16:50:04   mikee
 * added new fail code
 *
 *    Rev 1.0   18 Sep 1993 14:12:18   mikee
 * Initial revision.
 ***************************************************************/

#ifndef _MESSAGE_H
#define _MESSAGE_H


/*
 * Message attributes
 */
#define PKTS_SENT_ATTR       0
#define PKTS_RCV_ATTR        1
#define BAD_PKTS_ATTR        2
#define BAD_CHARS_ATTR       3
#define Q_OVERFLW_ATTR       4
#define CONSEC_ERR_ATTR      5
#define DROP_CHAR_ATTR       6

#define NUM_MSG_ATTRS        7

#define BAUD_RATE_ATTR       SPECIAL_ATTRS
#define PORT_ABLE_ATTR       SPECIAL_ATTRS+1
#define RESET_LK_ATTR        SPECIAL_ATTRS+2


#define MAX_MSG_DATA         262          /* need to allow i-field
of 255*/
                                          /* + 7 bytes of overhead
*/
```

MESSAGE.H

©P-COM, Inc., 1994

```
#define MAX_COMM_ERRS        5          /* number of step up
errors    */
                                        /* before taking action
*/
#define FORCED_OFF           2          /* when bad, force off
for awhile */

/*
 * Message parsing states
 */
#define IDLE_STATE          0
#define SYNC_WAIT_STATE     1
#define NW1_WAIT_STATE      2
#define NW2_WAIT_STATE      3
#define LINK_WAIT_STATE     4
#define OPCD_WAIT_STATE     5
#define OBJ_WAIT_STATE      6
#define LEN_WAIT_STATE      7
#define DATA_WAIT_STATE     8
#define CSUM_WAIT_STATE     9
#define SEND_MSG_STATE      10
#define TX_DONE_STATE       11

#define NMS_ADR          0
#define MAINT_ADR        0x8000
#define INTER_LK_ADR     0x8002
#define KEYPAD_ADR       0x8003

#define L_IDU            0
#define L_ODU            1
#define R_IDU            2
#define R_ODU            3
#define SL_IDU           4
#define SL_ODU           5
#define SR_IDU           6
#define SR_ODU           7
#define COMM_LOOP        10
#define MAX_LINK_ADR     11

#define BAUD_300            0
#define BAUD_600            1
#define BAUD_1200           2
#define BAUD_2400           3
#define BAUD_4800           4
#define BAUD_9600           5

/*
 * Offsets into message string of various parts
 */
#define NW1_OFFSET          1
```

©P-COM, Inc., 1994

```
#define NW2_OFFSET          2
#define LINK_OFFSET         3
#define OPCODE_OFFSET       4
#define OBJ_OFFSET          5
#define LEN_OFFSET          6
#define DATA_OFFSET         7
#define HEADER_LEN          7

/*
 * Message return codes
 */
#define NO_ERR               0
#define BAD_LINK_ADR         1   /* invalid link address */
#define BAD_OPCODE           2   /* invalid operation code */
#define VAL_OO_RANGE         3   /* value was out of the valid
range */
#define BAD_CMD_ATTR         4   /* command not valid with this
attribute */
#define BAD_INST_NUM         5   /* Instance number not valid  */
#define UNKNOWN_ATTR         6   /* attribute not known to object
*/
#define CMD_FAILED           7   /* command failed during
execution */
#define UNKNOWN_OBJ          8   /* object not known */
#define NOV_UPDT_FAIL        9   /* novram updated failed */
#define OPT_NOT_INSTALLED    10  /* option is not installed */


/*
 * Queue state definitions
 */
#define EMPTY_QS      0
#define LOADING_QS    1
#define TX_READY_QS   2
#define RX_READY_QS   3

/*
 * Routing codes
 */
#define NO_ROUTE    0
#define PASS_ON     1
#define PROCESS_IT  2

/*
 * Constanst supported drivers
*/
#define RX_MSG              0
#define TX_MSG              1
#define RX_BYTE             2
#define TX_BYTE             3
```

MESSAGE.H

©P-COM, Inc., 1994

```
#define BLD_MSG              4
#define SEND_RSP_MSG         5
#define NUM_EVENTS           6

/*
 * Constanst supported drivers
 */
#define PCOM_DRV             0
#define KEYPAD_DRV           1
#define NUM_DRIVES           2


typedef struct
{
   uchar   q_state,
           link_num,
           len,
           msg[MAX_MSG_DATA];
} QUE;

typedef struct
{
    uchar   busy,             /* indicates already processing */
            *char_pointer,    /*point into buffer in use*/
            state,            /*indicates where we are in our
attempt to sync on a packet*/
            dle_flag,         /* indicate if last was DLE */
            chksum,           /*used for calculating a checksum*/
            packet_len;       /*used for determining when we are
done rcving the i-field of the packet*/
    QUE     *q_ptr;
    CBUFF   c_buff;
} CHANNEL;

typedef struct
{
    uchar       driver;
    uchar       enabled;          /* 0 - disable, 1 - enable, 2
forced off */
    uchar       baud_rate;        /*0 = 1200, 1= 2400 ....*/
    CHANNEL     rx_q;
    CHANNEL     tx_q;
    uchar       *uart;
    uchar       link_num;
} MSG_LINK;


extern uchar MSG_handler(uchar,uchar,uchar *);
extern void  MSG_process_msgs();
extern void  MSG_process_interrupt(uchar);
```

```
extern uchar *MSG_get_rsp_mem();
extern uchar MSG_bld_msg(uchar,uint,uchar,uchar,uchar,uchar
*,uchar);
extern reentrant uchar MSG_process_attr_cmd(uchar,uchar,uint
*,uchar);
extern void  MSG_init_link(uchar,uchar *, uchar);
extern void  MSG_chk_links();
extern void  MSG_put_on_tx_queue(uchar,uchar *, uchar);
extern reentrant QUE   *MSG_allocate_q(uchar);
extern reentrant void  MSG_deallocate_q(CHANNEL *);
extern void  MSG_process_attr_msg(ATTR_CB, void *);
extern void  MSG_process_chars();


#endif    /* _MESSAGE_H */
```

```
/*************************************************************
 *
 * Description: This file contains the defines for the RF
 *              Modem
 *
 * $Id: modem.h 2.1 1993/12/29 10:38:27 MIKEE Exp $
 *
 * $Log: modem.h $
 * Revision 2.1  1993/12/29  10:38:27  MIKEE
 * covertion
 *
 *
 *    Rev 1.0   18 Sep 1993 13:55:28   mikee
 * Initial revision.
 *************************************************************/

#ifndef _MODEM_H
#define _MODEM_H

#define SYNTH_15BIT          0
#define SYNTH_18BIT          1
#define SYNTH_15MSB_MASK     0x00010000
#define SYNTH_18MSB_MASK     0x00080000
#define MD_CMD_MSB_MASK      0x00000080
#define MD_CMD_LEN           8

#define MD_TEST_STR          0x0000A500
#define MD_TEST_VAL          0x5A
#define TEST_LATCH           0xFF
#define TEST_MSB_MASK        0x00008000

#define MAX_MODEM_AV_SEL     4

typedef struct
{
    unsigned iduloop    :1;
    unsigned idumute    :1;
    unsigned brsel      :2;
    unsigned av_select  :2;
    unsigned spare1     :1;
    unsigned spare2     :1;
} MD_CMD_OL;

typedef struct
{
    unsigned lock1      :1;
    unsigned afcon      :1;
    unsigned afcfreq    :1;
    unsigned spare1     :1;
    unsigned spare2     :1;
```

```
    unsigned spare3      :1;
    unsigned spare4      :1;
    unsigned spare5      :1;
} MD_STATUS;

extern uchar     MODEM_init();
extern uchar     MODEM_lpbk();
extern uchar     MODEM_mute();
extern uchar     MODEM_av_select();
extern void      MODEM_set_rate();
extern uchar     MODEM_test();
extern MD_STATUS *MODEM_get_status();
extern uchar     MODEM_synth_alm();


#endif /* _MODEM_H */
```

NOVRAM.H

©P-COM, Inc., 1994

```
/****************************************************************
 *
 * Description: This file contains the defines for novram
functions
 *
 * $Id: novram.h 2.2 1994/01/19 15:03:39 JEFFC Exp $
 *
 * $Log: novram.h $
 * Revision 2.2  1994/01/19  15:03:39  JEFFC
 * Added new function prototype
 *
 * Revision 2.1  1993/12/29  10:38:31  MIKEE
 * conversion
 *
 *    Rev 1.1   17 Nov 1993 10:20:34   mikee
 * moved from util dir for rel 2.1
 *
 *    Rev 1.1   01 Nov 1993 10:09:56   mikee
 * added factory object code
 *
 *    Rev 1.0   18 Sep 1993 14:12:20   mikee
 * Initial revision.
 ****************************************************************/

#ifndef _NOVRAM_H
#define _NOVRAM_H


/*
 * write states
 */
#define NOV_NOT_BUSY    0
#define NOV_INIT_WRITE  1
#define NOV_NOT_BUSY    0

/*
 * Flag values
 */
#define NV_NOT_VALID    0xff    /* used to invalidate the section
*/
#define NV_UPDT_IN_PROG 0xa5    /* section being updated */
#define NV_UP_TO_DATE   0x5a    /* section is up to date */
#define NV_INST_INIT    0xcc    /* install mem has been init-ed
*/
#define NV_INST_SIZE    0x08    /* number of bytes in the install
map */
#define NV_OPT_SIZE     0x08    /* number of bytes in the option
map */

/*
```

©P-COM, Inc., 1994

```
 * Number of bytes in a 2404
 */
#define DEVICE_SIZE     512
#define BYTES_PER_WRITE 16

#define   PAGE_2                    0X01
#define   PAGE_1                    0X00


#define   NV_TEST_LOC         0X00    /* ADDRESS in both pages */
#define   NV_FW_REL_LOC       0X01    /* ADDRESS in page 1 */
#define   NV_MASTER_LOC       0X02    /* ADDRESS in page 1 */
#define   NV_INST_FG_LOC      0X03    /* init-ed flag ADDRESS in
page 1 */
#define   NV_SERIAL_LOC       0X04    /* 3 byte serial number in
page 1 */
#define   NV_INSTALL_LOC      0X08    /* ADDRESS in page 1 */
#define   NV_OPTION_LOC       0X10    /* ADDRESS in page 1 */

extern uchar    NOVRAM_read(uchar *,uchar,uchar,uchar);
extern uchar    NOVRAM_write(uchar *,uchar,uchar,uchar);
extern uchar    NOVRAM_test(uchar);
extern uchar    NOVRAM_save_attrs(uchar,NV_ADR_BLK *,uchar
*,ATTR_CB,uchar);
extern uchar    NOVRAM_restore_attrs(uchar,NV_ADR_BLK *,uchar
*,ATTR_CB,uchar);
extern uchar    NOVRAM_init();
extern uchar    NOVRAM_get_rel_idx();
extern void     NOVRAM_opt_init(uchar,uchar);
extern uchar    NOVRAM_opt_write(uchar *, uchar);
extern uchar    NOVRAM_opt_flush();
extern uchar    NOVRAM_updt_needed(uchar);
extern void     NOVRAM_chk_updt_needed(uchar,uchar,uchar,uchar
*);
extern uchar    NOVRAM_get_version();

#endif /* _NOVRAM_H */
```

OBJECT.H

©P-COM, Inc., 1994

```
/*************************************************************
 *
 * Description: This file contains the defines for objects
 *
 * $Id: object.h 2.2 1994/01/19 15:05:32 JEFFC Exp $
 *
 * $Log: object.h $
 * Revision 2.2  1994/01/19  15:05:32  JEFFC
 * Change prototype for OBJ_init
 *
 * Revision 2.1  1993/12/29  10:38:31  MIKEE
 * conversion
 *
 *    Rev 1.0   17 Nov 1993 10:28:36   mikee
 * Initial revision.
 *
 *************************************************************/

#ifndef _OBJECT_H
#define _OBJECT_H

/*
 * Objects
 */
#define RADIO_OBJ       0
#define COMM_OBJ        1
#define SPM_OBJ         2
#define ALARM_OBJ       3
#define A2D_OBJ         4
#define LINK_OBJ        5
#define LINE_OBJ        6
#define FCP_OBJ         7
#define ODU_OBJ         8
#define REMOTE_OBJ      9
#define MEM_OBJ         10
#define TIME_OBJ        11
#define NUM_OBJECTS     12    /* NOTE: Keep up-to-date */

#define OCM_OBJ         12    /* ODU object */
#define IDU_OBJ         13    /* ODU object */

#define FACTORY_OBJ     0xf0
#define NULL_OBJ        0xff

/*
 * Object events
 */
#define INIT_EVENT      0
#define MSG_EVENT       1
#define TIMER_EVENT     2
```

```
#define SAVE_NV_EVENT   3

/*
 * commands
 */
#define GET_CMD         1
#define SET_CMD         2
#define INC_CMD         3
#define DEC_CMD         4
#define RESET_CMD       5
#define HERE_CMD        120

#define SPECIAL_ATTRS       200
#define TWO_BYTE_ATTR       0xfe    /* used as a novram flag */
#define NO_MORE_ATTR        0xff

#define DO_ALL_INST         0xff    /* operate an attribute of
all instances*/

typedef struct
{
    uchar   num;
    uint    val;
} ATTR_BLK;

/*
 * Object handlers have the following calling formats
 *    obj_handler(obj_num, event, client_data_ptr)
 *    uchar   obj_num;
 *    uchar   event;
 *    uchar   *client_data_ptr;
 */
typedef struct
{
    uchar   nv_start_adr;
    uchar   nv_start_pg;
} NV_ADR_BLK;

typedef struct
{
    OBJ_CB      cb_func;
    uchar       call_init;
    uchar       max_inst;                     /* zero if only
one */
    NV_ADR_BLK  rel_nv_start[NUM_SUPPORT_RELS];
} OBJECT_CNFG;


typedef struct
{
```

©P-COM, Inc., 1994

```
    uint          nw_adr;
    uchar         link_adr,
                  opcode,
                  object,
                  data_len,
                  *data_ptr;
} HEADER;

extern uchar      OBJ_init();
extern void       OBJ_call_handler(uchar,uchar,uchar *);
extern uchar      OBJ_process_attr(uchar, uint *, uint *);
extern uchar      OBJ_save_novram(uint);
extern NV_ADR_BLK    *OBJ_get_nv_adr(uchar);
extern uchar      OBJ_get_max_inst(uchar);
extern void       OBJ_clr_novram();

extern uchar      OBJ_read_nxt_attr(HEADER *,uint *);
extern void       OBJ_load_attr(uchar **,uchar,uint);
extern uchar      OBJ_chk_inst(HEADER *, uchar *);

#endif /* _OBJECT_H */
```

```
/*************************************************************
 *
 * Description: This file contains the functions used to support
 *              the ODU object
 *
 * $Id: odu.c 2.3 1994/03/14 11:47:17 JEFFC Exp $
 *
 * $Log: odu.c $
 * Revision 2.3  1994/03/14  11:47:17  JEFFC
 * Changed ODU alarm function to know about pseudo-random
loopback.
 *
 * Revision 2.2  1994/01/19  15:39:14  JEFFC
 * Changed prototype for ODU_init. Added Ext. Synth. Pre-Alarm.
 *
 * Revision 2.1  1993/12/29  10:38:39  MIKEE
 * Conversion
 *
 *    Rev 1.2   01 Nov 1993 11:41:56   mikee
 * update message changes and new odu alarms
 *
 *    Rev 1.1   04 Oct 1993 12:51:16   mikee
 * fixed bugs
 *
 *    Rev 1.0   18 Sep 1993 14:03:54   mikee
 * Initial revision.
 *************************************************************/

#include "sysdefs.h"
#include "80c196.h"
#include "sys_msg.h"
#include "sys_time.h"
#include "object.h"
#include "sys_nov.h"
#include "radio.h"
#include "odu.h"
#include "link.h"
#include "alarm.h"
#include "spm.h"
#include "ocm.h"
#include "line.h"

/*
 * External Functions
 */
extern void     UTIL_clr_mem();
extern uchar    BITMAP_get();

/*
 * Internal Functions
```

```
 */
static uchar    odu_init();
static void     store_odu_data();
static void     chk_telem_link();
static void     update_odu();

/*
 * External Data
 */
extern const uchar  Odu_NV_Attr[];

/*
 * Internal Data
 */
static uint     Odu_Attr[NUM_ODU_ATTRS];
static uchar    Heard_from_odu;

/****************************************************************
 *
 * Name: ODU_handler()
 *
 * Description: This routine handles the ODU's object events
 *
 ***************************************************************/
uchar ODU_handler(object, event, cdata_ptr)

uchar   object;
uchar   event;
uchar   *cdata_ptr;
{
    /*
     * switch on the event
     */
    switch(event)
    {
        case INIT_EVENT:
            return odu_init(cdata_ptr);
            break;
        case SAVE_NV_EVENT:
            return(NOVRAM_save_attrs(object, (NV_ADR_BLK
*)cdata_ptr,
                (uchar *)Odu_NV_Attr,
                (ATTR_CB)ODU_process_attr_cmd, 1));
            break;
        case TIMER_EVENT:
            if (((uint)cdata_ptr) == TELEM_TIMER)
                chk_telem_link();
            else
            {
                update_odu();
```

```
            }
            break;
        case MSG_EVENT:
            if (((HEADER *)cdata_ptr)->opcode == HERE_CMD)
            {
                store_odu_data(cdata_ptr);
            }
            else

MSG_process_attr_msg((ATTR_CB)ODU_process_attr_cmd,
                (HEADER *)cdata_ptr);
            break;
    }
    return(TRUE);
}

/***************************************************************
 *
 * Name: odu_init()
 *
 * Description: This routine sets up the ODU data base
 *
 ***************************************************************/
uchar odu_init(adr_ptr)

NV_ADR_BLK  *adr_ptr;
{
    UTIL_clr_mem(Odu_Attr, (NUM_ODU_ATTRS * sizeof(uint)));

    Heard_from_odu = FALSE;

    /*
     * Now see if there is anything saved in novram
     */
    NOVRAM_restore_attrs(ODU_OBJ, adr_ptr, (uchar *)Odu_NV_Attr,
        (ATTR_CB)ODU_process_attr_cmd, 1);
    return FALSE;
}

/***************************************************************
 *
 * Name: ODU_process_attr_cmd
 *
 * Description: This function handles a command attribute pair
 *
 ***************************************************************/
uchar ODU_process_attr_cmd(opcode, attr_num, attr_val_adr, inst)

uchar   opcode;
uchar   attr_num;
```

ODU.C ©P-COM, Inc., 1994

```
uint    *attr_val_adr;
uchar   inst;
{
    uchar   status;

    status = NO_ERR;

    /*
     * Attributes are divided into no special handling and
special handling
     * groups. If an error is found we stop processing
attributes.
     */
    if (attr_num >= SPECIAL_ATTRS)
    {
        if (attr_num == DUMP_ATTR)
        {
        }
        else
            status = BAD_CMD_ATTR;
    }
    else
    {
        /*
         * If GET_CMD then just load the information into the
buffer
         * otherwise have the general attribute function handle
it
         */
        if (opcode == GET_CMD)
            *attr_val_adr = Odu_Attr[attr_num];
        else if (opcode == SET_CMD)
            status = OBJ_process_attr(opcode, attr_val_adr,
                &Odu_Attr[attr_num]);
        else
            status = BAD_CMD_ATTR;
    }

    NOVRAM_chk_updt_needed(opcode, attr_num, status, (uchar
*)Odu_NV_Attr);

    return(status);
}

/***************************************************************
 *
 * Name: store_odu_data
 *
 * Description: Save the information send down from the ODU
 *
```

```
 ***********************************************************/
void store_odu_data(head_ptr)

HEADER  *head_ptr;
{
    uint    attr_val;
    uchar   attr_num, status;
    uchar   old_band;

    old_band = Odu_Attr[PLO_ID_ATTR];
    status = NO_ERR;

    while (((attr_num = OBJ_read_nxt_attr(head_ptr, &attr_val))
        != NO_MORE_ATTR) && (status == NO_ERR))
    {
        status = ODU_process_attr_cmd(SET_CMD, attr_num,
&attr_val, 0);
    }

    if (old_band != Odu_Attr[PLO_ID_ATTR])
    {
        LINK_set_id();
    }

    pwm_control = Odu_Attr[RCVR_LEVEL_ATTR];
    Heard_from_odu = TRUE;
}

/************************************************************
 *
 * Name: chk_telem_link
 *
 * Description: Checks that the link to the ODU is OK
 *
 ***********************************************************/
void chk_telem_link()

{
    /*
     * If we have not heard from the ODU then signal an error
     * else clear it
     */
    if (Heard_from_odu == FALSE)
    {
        Odu_Attr[TELEM_ALM_ATTR] = TRUE;
    }
    else
    {
        Odu_Attr[TELEM_ALM_ATTR] = FALSE;
        Heard_from_odu = FALSE;
```

```
    }
}

/***********************************************************
 *
 * Name: update_odu
 *
 * Description: Send a message to the ODU with it vital
information
 *
 ***********************************************************/
void update_odu()

{
    uchar   *msg_ptr, *cur_ptr;
    uint    attr_val;

    /*
     * Gather and send the information needed by the ODU.
     * send even if there is an alarm comm may be working one way
     */
    cur_ptr = msg_ptr = MSG_get_rsp_mem();
    LINK_process_attr_cmd(GET_CMD, TX_MUTE_ATTR, &attr_val, 0);
    OBJ_load_attr(&cur_ptr, OCM_MUTE_ATTR, attr_val);
    LINK_process_attr_cmd(GET_CMD, POWER_ATTR, &attr_val, 0);
    OBJ_load_attr(&cur_ptr, OCM_POWER_ATTR, attr_val);
    LINK_process_attr_cmd(GET_CMD, CHANNEL_ATTR, &attr_val, 0);
    OBJ_load_attr(&cur_ptr, OCM_CHAN_ATTR, attr_val);
    RADIO_process_attr_cmd(GET_CMD, LN_RATE_ATTR, &attr_val, 0);
    OBJ_load_attr(&cur_ptr, OCM_RATE_ATTR, attr_val);

    MSG_bld_msg(TX, INTER_LK_ADR, TELEMETRY_LINK, HERE_CMD,
OCM_OBJ,
        msg_ptr, (cur_ptr - msg_ptr));
}

/***********************************************************
 *
 * Name: ODU_chk_telem_alm
 *
 * Description: Check if there is a telemetry link alarm
 *
 ***********************************************************/
uchar ODU_chk_telem_alm()

{
    if ((Odu_Attr[TELEM_ALM_ATTR] == TRUE) ||
        (BITMAP_get(&Odu_Attr[MINOR_ALM_ATTR], BM_TELEM_ALM) ==
SET))
        return(TRUE);
```

```
    return(FALSE);
}

/*************************************************************
 *
 * Name: ODU_chk_mute_alm
 *
 * Description: Check if there is an ODU mute alarm
 *
 *************************************************************/
uchar ODU_chk_mute_alm()

{
    if (BITMAP_get(&Odu_Attr[MINOR_ALM_ATTR], BM_MUTE_ALM) ==
SET)
        return(TRUE);

    return(FALSE);
}

/*************************************************************
 *
 * Name: ODU_chk_synth_prealarm
 *
 * Description: Check if the ODU's synth is in pre-alarm.
 *
 *************************************************************/
uchar ODU_chk_synth_prealarm()

{
    if (BITMAP_get(&Odu_Attr[MINOR_ALM_ATTR], BM_SYNTH_PREALM) ==
SET)
        return(TRUE);

    return(FALSE);
}

/*************************************************************
 *
 * Name: ODU_chk_cnfg_alm
 *
 * Description: Check if there is an ODU configuration mismatch
 *              alarm
 *
 *************************************************************/
uchar ODU_chk_cnfg_alm()

{
    if (BITMAP_get(&Odu_Attr[MINOR_ALM_ATTR], BM_CNFG_ALM) ==
SET)
```

```
        return(TRUE);

    return(FALSE);
}

/*************************************************************
 *
 * Name: ODU_chk_tx_alm
 *
 * Description: Check if there is an ODU Tx alarm
 *
 *************************************************************/
uchar ODU_chk_tx_alm()

{
    if (BITMAP_get(&Odu_Attr[MAJOR_ALM_ATTR], BM_TX_ALM) == SET)
        return(TRUE);

    return(FALSE);
}

/*************************************************************
 *
 * Name: ODU_chk_rx_alm
 *
 * Description: Check if there is an ODU Rx alarm
 *
 *************************************************************/
uchar ODU_chk_rx_alm()

{
    if (BITMAP_get(&Odu_Attr[MAJOR_ALM_ATTR], BM_RX_ALM) == SET)
        return(TRUE);

    return(FALSE);
}

/*************************************************************
 *
 * Name: ODU_chk_synth_alm
 *
 * Description: Check if there is an ODU synthesizer alarm
 *
 *************************************************************/
uchar ODU_chk_synth_alm()

{
    if (BITMAP_get(&Odu_Attr[MAJOR_ALM_ATTR], BM_SYNTH_ALM) ==
SET)
        return(TRUE);
```

```
    return(FALSE);
}

/***************************************************************
 *
 * Name: ODU_chk_misc_alm
 *
 * Description: Check if there is an ODU Miscellaneous alarm
 *
 ***************************************************************/
uchar ODU_chk_misc_alm()

{
    if (BITMAP_get(&Odu_Attr[MAJOR_ALM_ATTR], BM_MISC_ALM) ==
SET)
        return(TRUE);

    return(FALSE);
}

/***************************************************************
 *
 * Name: ODU_chk_lpbk
 *
 * Description: Check if there is currently a loopback on or
 *              passes through the ODU
 *
 ***************************************************************/
uchar ODU_chk_lpbk()

{
    uint    attr_val;

    /*
     * Check for ODU loopback
     */
    LINK_process_attr_cmd(GET_CMD, CUR_LPBK_ATTR, &attr_val, 0);
    if (attr_val == LK_ODU_LPBK)
        return(TRUE);

    /*
     * Now, check for a Link loopback on any of the lines
     */
    if (LINE_chk_lpbk(LN_LINK_LPBK) ||
LINE_chk_lpbk(LN_LNTEST_LPBK))
        return(TRUE);
    return(LINE_chk_lpbk(LN_LOCAL_LPBK));
}
```

PCOM_DRV.C

©P-COM, Inc., 1994

```
/*****************************************************************
 *
 * Description: This file contains the functions that handle
 *              the PCOM protocol
 *
 * $Id: pcom_drv.c 2.3 1994/03/14 11:48:11 JEFFC Exp $
 *
 * $Log: pcom_drv.c $
 * Revision 2.3  1994/03/14  11:48:11  JEFFC
 * Changes for NMS message addresses.
 *
 * Revision 2.2  1994/01/19  15:57:13  JEFFC
 * Had to change a comparison for NMS address (off by 1).
 *
 * Revision 2.1  1993/12/29  10:38:44  MIKEE
 * Conversion
 *
 *    Rev 1.0   17 Nov 1993 10:10:00   mikee
 * Initial revision.
 *
 ****************************************************************/

#include "sysdefs.h"
#include "sys_msg.h"
#include "message.h"
#include "object.h"
#include "novram.h"
#include "radio.h"

/*
 * External Functions
 */
extern void       Wdt_Tickle();
extern uchar      COMM_chk_route(uchar, HEADER *, uchar *);
extern uchar      COMM_calc_rsp_link(uint,uchar);
extern uchar      COMM_calc_lk_adr(uchar);
extern reentrant void       COMM_send_char(MSG_LINK *,uchar);
extern reentrant uchar UTIL_add_cbuff(CBUFF *, uchar);
extern void       UTIL_clr_mem(void *,uint);
extern void       UTIL_copy_mem(uchar *, uchar *,uchar);

/*
 * Internal Functions
 */
uchar         PCOM_parse_header(QUE *, HEADER *);
uchar         send_char(MSG_LINK *, uchar);

/*
 * External Data
 */
```

```
/*
 * Internal Data
 */
static RAM uchar    tmp_str[MAX_MSG_DATA];

/***************************************************************
 *
 * Name: PCOM_rxtx_msg
 *
 * Description: This function handles the PCOM protocol. It is
 *              called to receive and send messages.
 *
 ***************************************************************/
uchar PCOM_rxtx_msg(cmd, data_ptr, aux_ptr)

uchar   cmd;
void    *data_ptr;
void    *aux_ptr;
{
    HEADER      header;
    uchar       out_link;
    MSG_LINK    *lk_ptr;
    CHANNEL     *chan_ptr;
    uint our_nms_addr;

    lk_ptr = (MSG_LINK *)data_ptr;
    switch(cmd)
    {
        case RX_MSG:
            /*
             * Handles a received message, parse it header and
see what to
             * do with it.
             */
            chan_ptr = &lk_ptr->rx_q;
            if (PCOM_parse_header(chan_ptr->q_ptr, &header) !=
FALSE)
            {
                /*
                    If there is an NMS address in the message,
but it
                    does not match our address, dump it.
                */
                if(lk_ptr->link_num == NMS_PORT1
                    && (header.nw_adr >= 0)
                    && (header.nw_adr <= MAX_RADIO_ADR))
                {
                    RADIO_process_attr_cmd(GET_CMD, NW_ID_ATTR,
                        &our_nms_addr, 0);
                    if(our_nms_addr == header.nw_adr)
```

```
                        {
                            chan_ptr->q_ptr->msg[NW1_OFFSET] =
NMS_ADR >> 8;
                            chan_ptr->q_ptr->msg[NW2_OFFSET] =
NMS_ADR & 0x00ff;
                        }
                        else return;
                    }

                    /*
                     * determine where to route this message for
processing
                     * Base on its type, where it came from and where
it is going
                     */
                    switch(COMM_chk_route(lk_ptr->link_num, &header,
&out_link))
                    {
                        case PASS_ON:
                            MSG_put_on_tx_queue(out_link,
chan_ptr->q_ptr->msg,
                                    chan_ptr->q_ptr->len);
                            break;
                        case PROCESS_IT:
                            OBJ_call_handler(header.object,
MSG_EVENT,
                                        (uchar *)&header);
                            break;
                        case NO_ROUTE:
                            MSG_process_attr_cmd(INC_CMD,
BAD_PKTS_ATTR, NULL,
                                    lk_ptr->link_num);
                            break;
                    }
                }
                else
                {
                    /*
                     * header failure detected, count it and reset
the
                     * message buffer
                     */
                    MSG_process_attr_cmd(INC_CMD, BAD_PKTS_ATTR,
NULL,
                        lk_ptr->link_num);
                }
                break;
            case TX_MSG:
                /*
                 * The given message is to be transitted out the port
```

```
using
             * the PCOM protocol. Setup and kickoff the message,
the rest
             * is handled by interrupts.
             */
            chan_ptr = &lk_ptr->tx_q;

            chan_ptr->dle_flag = CLR;
            chan_ptr->chksum = 0;
            chan_ptr->state = SEND_MSG_STATE;
            send_char(lk_ptr, DLE_CHAR);
            break;
      }
    return;
}

/************************************************************
 *
 * Name: PCOM_tx_byte
 *
 * Description: This function handles the PCOM protocol. It is
 *              called to handle the TX interrupts on ports
 *              its running on
 *
 ************************************************************/
uchar PCOM_tx_byte(cmd, data_ptr, aux_ptr)

uchar   cmd;
void    *data_ptr;
void    *aux_ptr;
{
    MSG_LINK    *lk_ptr;
    CHANNEL     *chan_ptr;

    lk_ptr = (MSG_LINK *)data_ptr;
    chan_ptr = &lk_ptr->tx_q;

    /*
     * If transmitting, send as many character as we have or will
fit
     * in the transmit buffer.
     */
    while (chan_ptr->state == SEND_MSG_STATE)
    {
        if (chan_ptr->packet_len)
        {
            /*
             * Handle the character stuffing. Put DLE in front of
             * DLE chars.
             */
```

```
            if (chan_ptr->dle_flag == SET)
            {
                chan_ptr->dle_flag = CLR;
            }
            else if (*(chan_ptr->char_pointer) == DLE_CHAR)
            {
                if (send_char(lk_ptr, DLE_CHAR) == FALSE)
                    return;

                chan_ptr->dle_flag = SET;
                continue;
            }

            if (send_char(lk_ptr, *(chan_ptr->char_pointer)) ==
FALSE)
                return;

            chan_ptr->chksum += *(chan_ptr->char_pointer++);
            --chan_ptr->packet_len;
        }
        else
        {
            /*
             * Send the checksum, don't forget to stuff
             */
            if ((chan_ptr->dle_flag != SET) &&
                (((uchar)(0 - chan_ptr->chksum)) == DLE_CHAR))
            {
                if (send_char(lk_ptr, DLE_CHAR) == FALSE)
                    return;

                chan_ptr->dle_flag = SET;
            }
            else
            {
                if (send_char(lk_ptr, (0 - chan_ptr->chksum)) ==
FALSE)
                    return;

                chan_ptr->state = TX_DONE_STATE;
            }
        }
    }

    if (chan_ptr->state == TX_DONE_STATE)
    {
        MSG_deallocate_q(chan_ptr);
        chan_ptr->state = IDLE_STATE;
        MSG_process_attr_cmd(INC_CMD, PKTS_SENT_ATTR, NULL,
            lk_ptr->link_num);
```

```
    }
}

/*************************************************************
 *
 * Name: PCOM_rx_byte
 *
 * Description: This function handles the PCOM protocol. It is
 *              called to handle the interrupts on ports its
 *              running on
 *
 ************************************************************/
uchar PCOM_rx_byte(cmd, data_ptr, aux_ptr)

uchar   cmd;
void    *data_ptr;
void    *aux_ptr;
{
    MSG_LINK    *lk_ptr;
    CHANNEL     *ch_ptr;
    uchar       rx_char;

    lk_ptr = (MSG_LINK *)data_ptr;
    ch_ptr = &lk_ptr->rx_q;
    rx_char = *((uchar *)aux_ptr);

    /*
     * Handle character stuffing
     */
    if (ch_ptr->dle_flag == CLR)
    {
        if (rx_char == DLE_CHAR)
        {
            ch_ptr->dle_flag = SET;
            return;
        }
    }
    else
    {
        ch_ptr->dle_flag = CLR;
        if (rx_char == SYNC_CHAR)
        {
            /*
             * Start of a new message, if not in idle state then
record error
             */
            if (ch_ptr->state != IDLE_STATE)
            {
                MSG_deallocate_q(ch_ptr);
                MSG_process_attr_cmd(INC_CMD, BAD_PKTS_ATTR,
```

```
NULL,
                                  lk_ptr->link_num);
            }

            if ((ch_ptr->q_ptr =
MSG_allocate_q(lk_ptr->link_num)) == NULL)
            {
                /*
                 * should never run out of buffers. log it and
return
                 */
                MSG_process_attr_cmd(INC_CMD, Q_OVERFLW_ATTR,
NULL,
                   lk_ptr->link_num);
                return;
            }

            ch_ptr->q_ptr->len = 0x01;    /*set the buffer
reception length = to 1*/
            ch_ptr->char_pointer = &(ch_ptr->q_ptr->msg[0]);
            *(ch_ptr->char_pointer++) = rx_char;
            ch_ptr->chksum = rx_char;

            ch_ptr->state = NW1_WAIT_STATE;
            return;

        }
        else if (rx_char != DLE_CHAR)
        {
            /*
             * Error, recored and reset
             */
            MSG_process_attr_cmd(INC_CMD, BAD_PKTS_ATTR, NULL,
               lk_ptr->link_num);
            MSG_deallocate_q(ch_ptr);
            ch_ptr->state = IDLE_STATE;
            return;
        }
    }

    /*
     * Now we can process the character, if we are not in IDLE
state
     */
    if (ch_ptr->state == IDLE_STATE)
        return;

    if (ch_ptr->state != CSUM_WAIT_STATE)
    {
        *(ch_ptr->char_pointer++) = rx_char;
```

```
        ch_ptr->q_ptr->len++;
        ch_ptr->chksum += rx_char;
    }

    switch(ch_ptr->state)
    {
        case NW1_WAIT_STATE:
           ch_ptr->state = NW2_WAIT_STATE;

           break;
        case NW2_WAIT_STATE:
           ch_ptr->state = LINK_WAIT_STATE;

           break;
        case LINK_WAIT_STATE:
           ch_ptr->state = OPCD_WAIT_STATE;
           break;

        case OPCD_WAIT_STATE:
           ch_ptr->state = OBJ_WAIT_STATE;
           break;

        case OBJ_WAIT_STATE:
           ch_ptr->state = LEN_WAIT_STATE;
           break;

        case LEN_WAIT_STATE:
            ch_ptr->packet_len = rx_char;

            if (ch_ptr->packet_len == 0)
               ch_ptr->state = CSUM_WAIT_STATE;
            else
               ch_ptr->state = DATA_WAIT_STATE;

        break;

        case DATA_WAIT_STATE:          /* suck up # of bytes
specified in */
                                    /* packet_len when packet_len
=0 bump state */
            --ch_ptr->packet_len;     /* decrement the i-field
length indicator*/

            if ((ch_ptr->packet_len) == 0)
               ch_ptr->state = CSUM_WAIT_STATE;
            break;

        case CSUM_WAIT_STATE:    /* this byte should = chksum
we've calc-ed*/
                                 /* at this time we mark the
```

```
buffer as use */
                                /* able or place it back on the
que for use*/
                                /* if tag it as useable we must
bump the */
                                /* put pointer for the next
available que*/
            if (((rx_char + ch_ptr->chksum) & 0x00ff) == 0x00)
            {
                ch_ptr->q_ptr->q_state = RX_READY_QS;    /* tag
the buffer*/
                                   /* ready for processing by the
msg handle */

                ch_ptr->state = IDLE_STATE;     /* look for next
msg*/
                ch_ptr->q_ptr = NULL;
                ch_ptr->dle_flag = CLR;
                MSG_process_attr_cmd(INC_CMD, PKTS_RCV_ATTR,
NULL,
                    lk_ptr->link_num);
            }
            else
            {
                /*
                 * return the allocated buffer to the pool
                 */
                MSG_deallocate_q(ch_ptr);
                ch_ptr->state = IDLE_STATE;
                MSG_process_attr_cmd(INC_CMD, BAD_PKTS_ATTR,
NULL,
                    lk_ptr->link_num);
            }

            break;

        default:
            MSG_deallocate_q(ch_ptr);
            ch_ptr->state = IDLE_STATE; /* look for next msg */
        break;

    }
}

/***************************************************************
 *
 * Name: PCOM_parse_header
 *
 * Description: This function parses a message's header
 *
```

PCOM_DRV.C ©P-COM, Inc., 1994

```
 ***********************************************************/
uchar PCOM_parse_header(que_ptr, head_ptr)

QUE      *que_ptr;
HEADER   *head_ptr;
{
    unsigned int   tmp_val;

    /*
     * Parse the network address out
     */
    tmp_val = que_ptr->msg[NW1_OFFSET];
    tmp_val = ((tmp_val << 8) & 0xff00) |
que_ptr->msg[NW2_OFFSET];
    head_ptr->nw_adr = tmp_val;

   /*
    * parse and check the link address
    */
   head_ptr->link_adr = que_ptr->msg[LINK_OFFSET];
   if ((head_ptr->link_adr & 0x7f) > MAX_LINK_ADR)
      return(FALSE);

   /*
    * parse and check the opcode
    */
   head_ptr->opcode = que_ptr->msg[OPCODE_OFFSET];
   head_ptr->object = que_ptr->msg[OBJ_OFFSET];
   head_ptr->data_len = que_ptr->msg[LEN_OFFSET];
   head_ptr->data_ptr = &que_ptr->msg[DATA_OFFSET];

   return(TRUE);
}

/***********************************************************
 *
 * Name: PCOM_send_msg
 *
 * Description: This function handles the PCOM protocol. It is
 *              called to send messages on ports its running on
 *
 ***********************************************************/
uchar PCOM_send_msg(cmd, data_ptr, aux_ptr)

uchar   cmd;
void    *data_ptr;
void    *aux_ptr;
{
   HEADER       header;
   uchar        out_link;
```

©P-COM, Inc., 1994

```
    MSG_LINK      *lk_ptr;
    CHANNEL       *chan_ptr;

    uint          i;
    uint          nw_adr;
    uchar         *msg_ptr;
    uchar         link_num;
    HEADER        *head_ptr;
    uchar         status;

    head_ptr = (HEADER *)data_ptr;
    status = *((uchar *)aux_ptr);
    tmp_str[0] = SYNC_CHAR;

    /*
     * Load the network address. If the response is to the NMS
then put
     * the NMS address in else use the current address
     */
    if ((head_ptr->nw_adr > 0) && (head_ptr->nw_adr <=
MAX_RADIO_ADR))
        nw_adr = NMS_ADR;
    else
        nw_adr = head_ptr->nw_adr;
    tmp_str[NW2_OFFSET] = (nw_adr & 0x00ff);
    tmp_str[NW1_OFFSET] = (nw_adr >> 8) & 0x00ff;

    tmp_str[LINK_OFFSET] = (head_ptr->link_adr & 0x7f);
    tmp_str[OPCODE_OFFSET] = (head_ptr->opcode | 0x80);
    tmp_str[OBJ_OFFSET] = head_ptr->object;
    tmp_str[LEN_OFFSET] = head_ptr->data_len + 1;    /* status */

    /*
     * Load the status byte and any data there may be
     */
    msg_ptr = &tmp_str[DATA_OFFSET];
    *msg_ptr++ = status;
    for (i = 0; i < head_ptr->data_len; i++)
        *msg_ptr++ = *head_ptr->data_ptr++;

    /*
     * Now route the message to the correct queue
     */
    link_num = COMM_calc_rsp_link(nw_adr, head_ptr->link_adr);
    MSG_put_on_tx_queue(link_num, tmp_str,
(uchar)(msg_ptr-tmp_str));
}

/*****************************************************************
 *
```

```
 * Name: PCOM_bld_msg
 *
 * Description: This function handles the PCOM protocol. It is
 *              called to build messages for ports its running on
 *
 ***************************************************************/
uchar PCOM_bld_msg(cmd, data_ptr, aux_ptr)

uchar   cmd;
void    *data_ptr;
void    *aux_ptr;
{
    uint        i;
    uchar       *msg_ptr;
    HEADER      *head_ptr;
    QUE         *q_ptr;

    head_ptr = (HEADER *)data_ptr;
    q_ptr = (QUE *)aux_ptr;
    msg_ptr = q_ptr->msg;

    /*
     * Load the header in to the message
     */
    *msg_ptr++ = SYNC_CHAR;
    *msg_ptr++ = (head_ptr->nw_adr >> 8) & 0x00ff;
    *msg_ptr++ = (head_ptr->nw_adr & 0x00ff);

    *msg_ptr++ = COMM_calc_lk_adr(q_ptr->link_num);

    *msg_ptr++ = head_ptr->opcode;
    *msg_ptr++ = head_ptr->object;
    *msg_ptr++ = head_ptr->data_len;

    /*
     * Load the data
     */
    for (i = 0; i < head_ptr->data_len; i++)
        *msg_ptr++ = *head_ptr->data_ptr++;

    q_ptr->len = HEADER_LEN + head_ptr->data_len;
}

/***************************************************************
 *
 * Name: send_char
 *
 * Description: This routine send the given character out on the
 *              given port if not busy else it places it on the
 *              queue for later transmittion
```

```
 *
 ****************************************************************/
uchar send_char(link_ptr, tx_char)

MSG_LINK     *link_ptr;
uchar        tx_char;
{
    CHANNEL      *chan_ptr;

    chan_ptr = &link_ptr->tx_q;

    if (chan_ptr->busy != TRUE)
    {
        COMM_send_char(link_ptr, tx_char);
        return(TRUE);
    }

    return(UTIL_add_cbuff(&chan_ptr->c_buff, tx_char));
}
```

©P-COM, Inc., 1994

```
/**************************************************************
 *
 * Description: This file contains the global radio defines
 *
 * $Id: radio.h 2.3 1994/01/31 14:02:51 JEFFC Exp $
 *
 * $Log: radio.h $
 * Revision 2.3  1994/01/31  14:02:51  JEFFC
 * Added new novram options for Link Manager.
 *
 * Revision 2.2  1994/01/19  14:18:32  JEFFC
 * TLP changes, orderwire changes
 *
 * Revision 2.1  1993/12/29  10:38:28  MIKEE
 * covertion
 *
 *
 *    Rev 1.2   01 Nov 1993 12:26:04   mikee
 * EOW, serial #
 *
 *    Rev 1.1   04 Oct 1993 16:46:50   mikee
 * added new state code
 *
 *    Rev 1.0   18 Sep 1993 13:55:30   mikee
 * Initial revision.
 *************************************************************/

#ifndef _RADIO_H
#define _RADIO_H

#define URELAYS_ATTR        0
#define LN_TYPE_ATTR        1
#define HW_LINES_ATTR       2
#define NW_ID_ATTR          3
#define FW_REL_ATTR         4
#define EXT_ALM_MAP_ATTR    5           /* ext inputs to alarm on
*/
#define EXT_ALM_SEN_ATTR    6           /* ext inputs alarm sense
*/
#define LINK_MGR1_ATTR      7           /* set if basic link mgr
enabled */
#define RATE_LINES_ATTR     8
#define RELAY1_CNFG_ATTR    9
#define RELAY2_CNFG_ATTR    10
#define RELAY3_CNFG_ATTR    11
#define RELAY4_CNFG_ATTR    12
#define RELAY5_CNFG_ATTR    13
#define LINK_MGR2_ATTR      14          /* set if maint. link mgr
enabled */
#define SERIAL_HI_ATTR      15
```

RADIO.H

©P-COM, Inc., 1994

```
#define SERIAL_LO_ATTR          16
#define NUM_RADIO_ATTRS         17


#define LN_RATE_ATTR            SPECIAL_ATTRS   /* user configurable
line rate */
                                                /* 0- 1 line, 1- 2
lines, */
                                                /* 2- 4 lines,
3-1x6/1x8  */
#define RELAYS_ATTR             SPECIAL_ATTRS+1
#define NOVRAM_ATTR             SPECIAL_ATTRS+2 /* save config */
#define WARM_REBOOT_ATTR        SPECIAL_ATTRS+3
#define ND_SELFTEST_ATTR        SPECIAL_ATTRS+4
#define EXT_INPUTS_ATTR         SPECIAL_ATTRS+5
#define TRACE_ONOFF_ATTR        SPECIAL_ATTRS+6
#define VOLUME_ATTR             (SPECIAL_ATTRS + 7)
#define HSET_CTRL_ATTR          (SPECIAL_ATTRS + 8)
#define EAST_IVOL_ATTR          (SPECIAL_ATTRS + 9)
#define WEST_IVOL_ATTR          (SPECIAL_ATTRS + 10)
#define EAST_OVOL_ATTR          (SPECIAL_ATTRS + 11)
#define WEST_OVOL_ATTR          (SPECIAL_ATTRS + 12)
#define LTIME_MSW_ATTR          (SPECIAL_ATTRS + 13)
#define LTIME_LSW_ATTR          (SPECIAL_ATTRS + 14)
#define FEC_ATTR                (SPECIAL_ATTRS + 15)
#define FEC_BYPASS_ATTR         (SPECIAL_ATTRS + 16)

#define DTMF_TEST_ATTR          (0xf0)  /* !!! remove this when done
testing */
#define TEMP_EAST_IVOL_ATTR (0xf1)  /* !!! remove this when done
testing */
#define TEMP_WEST_IVOL_ATTR (0xf2)  /* !!! remove this when done
testing */
#define TEMP_EAST_OVOL_ATTR (0xf3)  /* !!! remove this when done
testing */
#define TEMP_WEST_OVOL_ATTR (0xf4)  /* !!! remove this when done
testing */

#define MAX_RADIO_ADR   4095

/*
    Orderwire TLP defines
    These defines are the indices into the TLP_Input and
TLP_Output
    arrays which contain the value for 0 dBm.
*/
#define IN_TLP_0_INDEX  14
#define OUT_TLP_0_INDEX 11

#define NUM_TLP_ENTRIES 16
```

©P-COM, Inc., 1994

```
/*
 * Relay defines
 */
#define N_OPEN          OPEN
#define N_CLOSED        CLOSED
#define RLY_ALARM       0
#define RLY_USER        1
#define RLY_RMT_XI      2
#define RLY_EOW         3

/*
 * States, start at 20 because objects are the first ones
 */
#define PROG_LCA        20
#define MEM_TEST        21
#define EEPROM_TEST     22
#define MODEM_TEST      23
#define RUNNING         24
#define TEST_LCA        25

extern uchar    RADIO_handler(uchar,uchar,uchar *);
extern uchar    RADIO_process_attr_cmd();
extern uchar    RADIO_chk_ext_alms();
extern void     RADIO_dsp_relays(uint);
extern void     RADIO_eow_ring(uchar);

#endif /* _RADIO_H */
```

REMOTE.H ©P-COM, Inc., 1994

```
/***************************************************************
 *
 * Description: This file contains the defines for the Remote
 *              radio object
 *
 * $Id: remote.h 2.3 1994/01/31 14:01:52 JEFFC Exp $
 *
 * $Log: remote.h $
 * Revision 2.3  1994/01/31  14:01:52  JEFFC
 * Made attribute naming more consistent.
 *
 * Revision 2.2  1994/01/19  14:20:06  JEFFC
 * Added new attributes
 *
 * Revision 2.1  1993/12/29  10:38:28  MIKEE
 * covertion
 *
 *
 *    Rev 1.1   01 Nov 1993 12:26:26   mikee
 * new alarm attrs
 *
 *    Rev 1.0   18 Sep 1993 13:55:30   mikee
 * Initial revision.
 ***************************************************************/

#ifndef _REMOTE_H
#define _REMOTE_H

#define PEER_ALM_ATTR        0
#define RMT_ALM_ATTR         1
#define RMT_LPBK_ATTR        2    /* LINK LOOPBACK BIT MAP */
#define RMT_EXT_INPUTS_ATTR 3
#define RMT_FW_VERSION_ATTR 4
#define NUM_RMT_ATTRS        5

extern uchar    REMOTE_handler();
extern uchar    REMOTE_process_attr_cmd();
extern uchar    REMOTE_chk_peer_alm();

#endif /* _REMOTE_H */
```

```
/************************************************************
 *
 * Description: This file contains the defines for the SPM board
 *
 * $Id: spm.h 2.3 1994/01/23 22:36:59 JEFFC Exp $
 *
 * $Log: spm.h $
 * Revision 2.3  1994/01/23  22:36:59  JEFFC
 * Added prototype for EOW lead sense function.
 *
 * Revision 2.2  1994/01/19  14:21:11  JEFFC
 * Added new functions for orderwire, FEC, cross-connect, etc.
 *
 * Revision 2.1  1993/12/29  10:38:28  MIKEE
 * covertion
 *
 *
 *    Rev 1.2   01 Nov 1993 12:27:16   mikee
 * EOW
 *
 *    Rev 1.1   04 Oct 1993 17:01:40   mikee
 * added some EOW support
 *
 *    Rev 1.0   18 Sep 1993 13:55:30   mikee
 * Initial revision.
 ************************************************************/

#ifndef _SPM_H
#define _SPM_H


#define   SPM_CONTROL_MASK    0X00 /*INTENDED TO INVERT TX MUTE
CONTROL LINE*/
#define   TX_ON               0X20
#define MAX_EEPOT_STEP       100
#define FILT_STEP_VAL        1       /* amount to move EEPOT for
each inc/dec*/

#define ONE_LN_RATE          0x00
#define TWO_LN_RATE          0x01
#define FOUR_LN_RATE         0x02
#define SIX_LN_RATE          0x03
#define GET_LN_RATE          0x10

/*
 * This is a wait loop base on a 10Mhz clock rate. x must be less
then 750
 * anything more use the timer facility.
 *
 *              clrb  us_wait        3 states
```

```
 *     @0013:
 *             incb  us_wait         3 states
 *             cmpb  us_wait,#nnnH   4 states
 *             bnc   @0013           8 states if jumps 4 if not
 *
 * Each state is 200ns so each loop is 3us after setup so divide
the user
 * value by 3. The minimum delay is exactly 3us, and the
resolution after
 * that is also exactly 3us. So using this macro with a value of
0,1,2 or 3
 * is like a US_WAIT(3), and using it with a value of 4, 5, or 6
is
 * equivilent to US_WAIT(6), and so on.
 *
 *      ********* Note: Change if clock rate is changed
*********
 */
register static uchar   us_wait;
register static uchar   ms_wait;
#define US_WAIT(x)  us_wait = 0; asm nop; while(++us_wait <
(x/3))
#define MS_WAIT(x) for (ms_wait = 0; ms_wait < x;
ms_wait++){US_WAIT(500);US_WAIT(500);}

/*
 * SPM attributes
 */
#define TX_1FILT_ATTR   0
#define TX_2FILT_ATTR   1
#define TX_4FILT_ATTR   2
#define TX_8FILT_ATTR   3
#define RX_1FILT_ATTR   4
#define RX_2FILT_ATTR   5
#define RX_4FILT_ATTR   6
#define RX_8FILT_ATTR   7
#define MODEM_STAT_ATTR 8
#define LAST_START_ATTR 9
#define LCA1_REL_ATTR   10
#define PR_ERR_CNT_ATTR 11

#define NUM_SPM_ATTRS   12      /* keep this updated */


#define TX_FILT_ATTR    SPECIAL_ATTRS
#define RX_FILT_ATTR    (SPECIAL_ATTRS + 1)
#define BBAND_LPBK_ATTR (SPECIAL_ATTRS + 2)
#define CLK_LPBK_ATTR   (SPECIAL_ATTRS + 3)
#define ODU_PWRON_ATTR  (SPECIAL_ATTRS + 4)
#define RESET_LCAS_ATTR (SPECIAL_ATTRS + 5)
```

```
#define REPROG_LCA_ATTR (SPECIAL_ATTRS + 6)
#define RELOAD_LCA_ATTR (SPECIAL_ATTRS + 7)
#define RFIDU_LPBK_ATTR (SPECIAL_ATTRS + 8)
#define RFIDU_MUTE_ATTR (SPECIAL_ATTRS + 9)
#define D_SELFTEST_ATTR (SPECIAL_ATTRS + 10)
#define LCA_LPBK_ATTR   (SPECIAL_ATTRS + 11)
#define ODU_LPBK_ATTR   (SPECIAL_ATTRS + 12)
#define TX_RDATFIL_ATTR (SPECIAL_ATTRS + 13)
#define TX_DATINVT_ATTR (SPECIAL_ATTRS + 14)
#define TX_FRC_CW_ATTR  (SPECIAL_ATTRS + 15)
#define RX_ERR_INJ_ATTR (SPECIAL_ATTRS + 16)
#define RX_DATINVT_ATTR (SPECIAL_ATTRS + 17)
#define RX_FRMINVT_ATTR (SPECIAL_ATTRS + 18)
#define FRC_RX_MW_ATTR  (SPECIAL_ATTRS + 19)
#define PRND_LPBK_ATTR  (SPECIAL_ATTRS + 20)

#define POWER_ON_START  0
#define WDT_START       1       /* 1 or more, counts since last
power on */

/*
 * orderwire defines
 */
#define HSET_CTRL           0x10
#define HSET_VOL            0x00
#define HSET_STANDARD_A     0x0C
#define HSET_DATA_LEN       4
#define DEF_HSET_VOL        0x04
#define DEF_EW_VOL          55
#define E_LEAD              0
#define M_LEAD              1
#define MIN_HS_VOL          1
#define MAX_HS_VOL          8

extern void  SPM_avsel();
extern uint  SPM_ln_rate();
extern uchar SPM_get_relays();
extern void  SPM_set_relay();
extern void  SPM_modem_send();
extern uchar SPM_modem_read();
extern void  SPM_ln_fifo_able();
extern uint  SPM_ln_ais();
extern void  SPM_set_link_id(uint);
extern uchar SPM_process_attr_cmd();
extern void  SPM_rxcmd0_funcs();
extern void  SPM_em_lead_force(uchar,uchar);
extern uchar SPM_em_lead_sense(uchar);
extern void  SPM_buzzer(uchar);
extern void  SPM_prog_handset(uchar,uchar);
extern void SPM_set_tlp_abs(uchar,uchar);
```

©P-COM, Inc., 1994

```
extern void SPM_set_tlp_rel(uchar,uchar,uchar);
extern void SPM_orderwire_init();
void SPM_set_input_channel(uchar, uchar);
void SPM_fec_enable(uchar);
void SPM_fec_bypass(uchar);

/*
 * Given the SYS_ prefix because the caller is used in both IDU
and ODU
 */
extern void  SYS_e2clk(uchar);
extern void  SYS_e2data(uchar);
extern uchar SYS_e2rcv_ack();
extern uchar SYS_get_e2data();

#endif /* _SPM_H */
```

STRS.C ©P-COM, Inc., 1994

```
/**************************************************************
 *
 * Description: This file contains all strings used used by the
 *              IDU firmware. Because of overlapping ROM
 *              RAM constraints, this file has to be loaded in
 *              non-overlapped memory.
 *
 * $Id: strs.c 2.3 1994/01/23 22:38:26 JEFFC Exp $
 *
 * $Log: strs.c $
 * Revision 2.3  1994/01/23  22:38:26  JEFFC
 * Changed "Handset Vol" to "EOW Vol" because the former was too
long.
 *
 * Revision 2.2  1994/01/19  15:48:56  JEFFC
 * Added new strings for T/R Addr, Pseudo-Random Loopback, Clk
Recov alarm.
 *
 * Revision 2.1  1993/12/29  10:38:42  MIKEE
 * Conversion
 *
 *    Rev 1.2   01 Nov 1993 11:39:32   mikee
 * changes for release 2.0
 *
 *    Rev 1.1   04 Oct 1993 16:37:02   mikee
 * final clenaup before 1st ship
 *
 *    Rev 1.0   18 Sep 1993 14:03:58   mikee
 * Initial revision.
 *************************************************************/

#include "sysdefs.h"

/*
 * Constants for general uses
*************************************
 */
char *const Strings[] =
{
    {"P-Com, Inc."},          /* 0 */
    {"Channel"},              /* 1 */
    {"Link ID"},              /* 2 */
    {"AGC"},                  /* 3 */
    {"Xmt Power"},            /* 4 */
    {"OK"},                   /* 5 */
    {"FAIL"},                 /* 6 */
    {"Select a command"},     /* 7 */
    {"TRUE"},                 /* 8 */
    {"FALSE"},                /* 9 */
    {"Alarms"},               /* 10 */
```

```
{"Loopbacks"},          /* 11 */
{"Not Installed"},      /* 12 */
{"IDU"},                /* 13 */
{"ODU"},                /* 14 */
{"Cable"},              /* 15 */
{"BER"},                /* 16 */
{"Remote"},             /* 17 */
{"Line Loss"},          /* 18 */
{"Line AIS"},           /* 19 */
{"Cbl Open"},           /* 20 */
{"Cbl Short"},          /* 21 */
{"Password:"},          /* 22 */
{"EOW Vol"},            /* 23 */
{"Peer Chan"},          /* 24 */
{"Orderwire"},          /* 25 */
{"Ext Input"},          /* 26 */
{"LoopBack"},           /* 27 */
{"Logout"},             /* 28 */
{"Rcv Mute"},           /* 29 */
{"Link"},               /* 30 */
{"ON"},                 /* 31 */
{"OFF"},                /* 32 */
{"1E-"},                /* 33 */
{"Misc"},               /* 34 */
{"Telemetry"},          /* 35 */
{"Line"},               /* 36 */
{"General"},            /* 37 */
{"Alarm"},              /* 38 */
{"AIS"},                /* 39 */
{"LOS"},                /* 40 */
{"Enabled"},            /* 41 */
{"Transmit"},           /* 42 */
{"Force AIS"},          /* 43 */
{"Clear History"},      /* 44 */
{"History"},            /* 45 */
{"Remote Mode"},        /* 46 */
{"May disrupt live"},   /* 47 */
{"traffic, verify."},   /* 48 */
{"Xmt Mute"},           /* 49 */
{"Rmt Mode"},           /* 50 */
{"ODU Band"},           /* 51 */
{"E In TLP"},           /* 52 */
{"W In TLP"},           /* 53 */
{"E Out TLP"},          /* 54 */
{"W Out TLP"},          /* 55 */
{"Com-F"},              /* 56 */
{"Config"},             /* 57 */
{"Disabled on Rmt"},    /* 58 */
{"T/R Addr"},           /* 59 */
{"FEC"},                /* 60 */
```

STRS.C

©P-COM, Inc., 1994

```
     {"IDU Firmware"},          /* 61 */
     {"ODU Firmware"},          /* 62 */
     {"Clk Recov"},             /* 63 */
     {"Bypass"},                /* 64 */
     {"Test Line"},             /* 65 */
     {"Error Cnt:"},            /* 66 */
     {"Synth Warn"},            /* 67 */
};
```

SYS_MSG.H

©P-COM, Inc., 1994

```
/*****************************************************************
 *
 * Description: This file contains the defines for the message
engine
 *
 * $Id: sys_msg.h 2.1 1993/12/29 10:38:29 MIKEE Exp $
 *
 * $Log: sys_msg.h $
 * Revision 2.1  1993/12/29  10:38:29  MIKEE
 * covertion
 *
 *
 *    Rev 1.1   17 Nov 1993 10:19:12   mikee
 * part of driver revamp
 *
 *    Rev 1.0   18 Sep 1993 13:55:32   mikee
 * Initial revision.
 *****************************************************************/

#ifndef _SYS_MSG_H
#define _SYS_MSG_H

#include <message.h>

#define TELEMETRY_LINK      0X00
#define PEER_LINK           0X01
#define MAINTENANCE_PORT    0X02
#define NMS_PORT1           0X03
#define NMS_PORT2           0X04
#define PROTECTION_LINK     0X05
#define KEYPAD_PORT         0x06

 /*
 * Constanst definitions for serial interfaces
 */
#define IDLE        0X00
#define BUSY        0X01
#define READY       0X02

/*
 * Values found in 80c196 data book for serial port
 */
#define RX_INTERRUPT_MASK   0X40
#define TX_INTERRUPT_MASK   0X20
#define TX_EMPTY_MASK       0X08

/*
 * Values found in Signetics data book for SCC2691 UARTS
 */
#define RX_READY            0X01
```

SYS_MSG.H ©P-COM, Inc., 1994

```
#define TX_READY            0X04
#define RECIEVE_ERROR       0XF0
#define RESET_RECIEVER      0X20
#define RESET_TRANS         0X30
#define RESET_ERROR         0X40
#define RESET_BREAK         0X50
#define RX_ENABLE           0X01

/*
 * Values found in Signetics data book for SCC2691 UARTS
 */
#define SCC_BAUD_300        0X44
#define SCC_BAUD_600        0X55
#define SCC_BAUD_1200       0X66
#define SCC_BAUD_2400       0X88
#define SCC_BAUD_4800       0X99
#define SCC_BAUD_9600       0XBB

/*
 * The baud rate register value for the 80c196 is calculated as
follows
 * baud register value = (((crystal/(16 * baud_rate))-1) | 0x8000
(results
 * in 16 bit word) the baud rate register is programmed in two
sequential writes to the same
 * register. The sequence is lsb firt then msb.
 */
#define INTEL_300_BAUD_LO   0X22
#define INTEL_300_BAUD_HI   0X88
#define INTEL_600_BAUD_LO   0X10
#define INTEL_600_BAUD_HI   0X84
#define INTEL_1200_BAUD_LO  0X07
#define INTEL_1200_BAUD_HI  0X82
#define INTEL_2400_BAUD_LO  0X03
#define INTEL_2400_BAUD_HI  0X81
#define INTEL_4800_BAUD_LO  0X81
#define INTEL_4800_BAUD_HI  0X80
#define INTEL_9600_BAUD_LO  0X40
#define INTEL_9600_BAUD_HI  0X80


#endif    /* _SYS_MSG_H */
```

SYS_TIME.H ©P-COM, Inc., 1994

```
/***********************************************************
 *
 * Description: This file contains the IDU specific defines for
 *              the timer engine
 *
 * $Id: sys_time.h 2.3 1994/01/25 14:25:47 JEFFC Exp $
 *
 * $Log: sys_time.h $
 * Revision 2.3  1994/01/25  14:25:47  JEFFC
 * Added new timer for EOW call button.
 *
 * Revision 2.2  1994/01/19  14:40:25  JEFFC
 * Added new timers for pseudo-random loopback, synth lock
checking.
 *
 * Revision 2.1  1993/12/29  10:38:29  MIKEE
 * conversion
 *
 *    Rev 1.0   18 Sep 1993 13:55:34   mikee
 * Initial revision.
 ***********************************************************/

#ifndef _IDU_TIME_H
#define _IDU_TIME_H

#include <timer.h>

/*
 * Each timer
 */
#define WDT_TIMER                   0
#define READ_STATS                  1
#define A2D_TIMER                   2
#define BER_TIMER                   3
#define ALARM_TIMER                 4
#define BLINK_TIMER                 5
#define AFC_TIMER                   6
#define NOVRAM_TIMER                7
#define KEYPAD_TIMER                8
#define TELEM_TIMER                 9
#define UPDT_ODU_TIMER              10
#define UPDT_PEER_TIMER             11
#define CHK_PEER_TIMER              12
#define USER_LOGOUT                 13
#define RMT_REQ_TIMER               14
#define CHECK_SYNTH_LOCK_TIMER      15
#define EOW_BUZZER_TIMER            16
#define PR_LPBK_TIMER               17
#define CALL_BTN_TIMER              18
```

SYS_TIME.H ©P-COM, Inc., 1994

```
#define NUM_TIMERS      19    /* NOTE: Keep up-to-date */

#define   START_SW_TIMER1      0X18
#define   START_SW_TIMER2           0X19


/*
 * time definitions and counts counts base on 1ms timer tick rate
 * THIS IS CALCULATED BY
 * ((tick*crystal)/(8*scale)) where scale
 * is the internal divide by ratio ie 80196 = 2
 * 8097 = 3
 */
#define ONE_MILLI_SECOND_TICK 0X271
#define FIVE_MILLI_SECOND_TICK     (ONE_MILLI_SECOND_TICK * 5)
#define TEN_MILLI_SECOND_TICK (ONE_MILLI_SECOND_TICK * 10)

/*
 * These equates are based on the number of interrupt timeouts
are needed
 * to generate a given time
 */
#define SECONDS_5MS       1
#define SECONDS_10MS      2
#define SECONDS_25MS      (SECONDS_5MS * 5)
#define SECONDS_50MS      (SECONDS_5MS * 10)
#define SECONDS_100MS     (SECONDS_5MS * 20)
#define EIGTH_SECOND      (SECONDS_5MS * 25)
#define FIFTH_SECOND      (SECONDS_5MS * 40)
#define FOURTH_SECOND      (SECONDS_5MS * 50)
#define THIRD_SECOND      (SECONDS_5MS * 67)
#define HALF_SECOND       (SECONDS_5MS * 100)
#define SECONDS_750MS      (SECONDS_5MS * 150)
#define SECONDS_0         0X0000
#define SECONDS_1         (SECONDS_5MS * 200)
#define SECONDS_1_5       (SECONDS_1 + HALF_SECOND)
#define SECONDS_2         (SECONDS_1 * 2)
#define SECONDS_3         (SECONDS_1 * 3)
#define SECONDS_4         (SECONDS_1 * 4)
#define SECONDS_5         (SECONDS_1 * 5)
#define SECONDS_6         (SECONDS_1 * 6)
#define SECONDS_7         (SECONDS_1 * 7)
#define SECONDS_8         (SECONDS_1 * 8)
#define SECONDS_9         (SECONDS_1 * 9)
#define SECONDS_10        (SECONDS_1 * 10)
#define SECONDS_11        (SECONDS_1 * 11)
#define SECONDS_15        (SECONDS_1 * 15)
#define SECONDS_20        (SECONDS_1 * 20)
#define SECONDS_30        (SECONDS_1 * 30)
#define SECONDS_45        (SECONDS_1 * 45)
```

SYS_TIME.H

©P-COM, Inc., 1994

```
#define SECONDS_60        (SECONDS_1 * 60)
#define MINUTE_1          SECONDS_60
#define MINUTE_5          (MINUTE_1 * 5)

#endif     /* _IDU_TIME_H  */
```

TIMER.C

©P-COM, Inc., 1994

```
/****************************************************************
 *
 * Description: This file handles the timer engine function
 *
 * $Id: timer.c 2.2 1994/01/19 15:51:56 JEFFC Exp $
 *
 * $Log: timer.c $
 * Revision 2.2  1994/01/19  15:51:56  JEFFC
 * Changed function prototype for TIMER_init() function.
 *
 * Revision 2.1  1993/12/29  10:38:42  MIKEE
 * Conversion
 *
 *    Rev 1.1   08 Dec 1993 12:39:16   mikee
 * removed call to trace buffer (caused mem init bug)
 *
 *    Rev 1.0   17 Nov 1993 10:15:58   mikee
 * Initial revision.
 *
 ***************************************************************/

#include "sysdefs.h"
#include "timer.h"
#include "message.h"
#include "object.h"
#include "sys_time.h"

/*
 * External Functions
 */
extern void UTIL_clr_mem(void *, uint);
extern void Wdt_Tickle();

/*
 * Internal Functions
 */
static uchar    process_cmd_attr(uchar,uchar,uint *,uchar);

/*
 * External Data
 */
extern uint  Sys_Timer;
extern CONST TIMER_CNFG Timer_Cnfg[NUM_TIMERS];

/*
 * Internal Data
 */
REGISTER TIMER  Timers[MAX_TIMERS];
static RAM uint Timer_Attr[MAX_TIMERS][NUM_TIMER_ATTRS];
```

©P-COM, Inc., 1994

```
/****************************************************************
 *
 * Name: TIMER_handler
 *
 * Description: This routine handles timer object's events
 *
 ****************************************************************/
uchar TIMER_handler(object, event, cdata_ptr)

uchar   object;
uchar   event;
uchar   *cdata_ptr;
{
    /*
     * switch on the event
     */
    switch(event)
    {
        case INIT_EVENT:
            return TIMER_init();
            break;
        case MSG_EVENT:
            MSG_process_attr_msg(process_cmd_attr, cdata_ptr);
            break;
    }
    return(TRUE);
}

/****************************************************************
 *
 * Name: TIMER_init
 *
 * Description: This routine sets up the timer engine
 *
 ****************************************************************/
uchar TIMER_init()
{
   uchar   i;

    /*
     * Set the timers to there default times
     */
    for (i = 0; i < NUM_TIMERS; i++)
    {
        /*
         * Set attributes to there default values
         */
        Timer_Attr[i][INIT_TIME_ATTR] = Timer_Cnfg[i].init_tout;
        Timer_Attr[i][REPEAT_TIME_ATTR] =
Timer_Cnfg[i].repeat_tout;
```

```
        /*
         * If the value is zero then it is not a periodic timer
         */
        if (Timer_Attr[i][INIT_TIME_ATTR] == 0)
            Timers[i].trigger_time = 0;
        else
            if ((Timers[i].trigger_time = Sys_Timer
                    + Timer_Attr[i][INIT_TIME_ATTR]) == 0)
                Timers[i].trigger_time++;
        Timers[i].trigger_flag = FALSE;
    }
    return FALSE;
}

/**************************************************************
 *
 * Name: TIMER_checker
 *
 * Description: This routie handles any timeout that are pending
 *
 **************************************************************/
void TIMER_checker()
{
   uchar   i;

    /*
     * See if any timers have gone off
     */
    for (i = 0; i < NUM_TIMERS; i++)
    {
        if (Timers[i].trigger_flag == TRUE)
        {
            /*
             * Reset the timeout count to retain accracy and call
the handler
             */
            Wdt_Tickle();

            if (Timer_Attr[i][REPEAT_TIME_ATTR] == 0)
                Timers[i].trigger_time = 0;
             else
                if ((Timers[i].trigger_time = Sys_Timer
                        + Timer_Attr[i][REPEAT_TIME_ATTR]) == 0)
                    Timers[i].trigger_time++;
            Timers[i].trigger_flag = FALSE;
            OBJ_call_handler(Timer_Cnfg[i].object, TIMER_EVENT,
(uchar *)i);
        }
    }
}
```

```
/*************************************************************
 *
 * Name: process_cmd_attr
 *
 * Description: This function handles a command attribute pair
 *
 *************************************************************/
uchar process_cmd_attr(opcode, attr_num, attr_val_adr, inst)

uchar   opcode;
uchar   attr_num;
uint    *attr_val_adr;
uchar   inst;
{
    uchar       status;

    status = NO_ERR;

    /*
     * divided into no special handling and special handling
     * groups. If an error is found we stop processing
attributes.
     */
    if (attr_num >= SPECIAL_ATTRS)
    {
        switch(attr_num)
        {
            case CUR_TIME_ATTR:
             if (opcode == GET_CMD)
                 *attr_val_adr = Timers[inst].trigger_time;
             else
                 status = BAD_CMD_ATTR;
            break;
            case TRIG_FLAG_ATTR:
             if (opcode == GET_CMD)
                 *attr_val_adr = Timers[inst].trigger_flag;
             else
                 status = BAD_CMD_ATTR;
            break;
            default:
                status = UNKNOWN_ATTR;
                break;
        }
    }
    else
    {
        /*
         * If GET_CMD then just load the information into the
buffer
         * otherwise have the general attribute function handle
```

©P-COM, Inc., 1994

```
it
         */
        if (opcode == GET_CMD)
            *attr_val_adr = Timer_Attr[inst][attr_num];
        else if (opcode == SET_CMD)
            status = OBJ_process_attr(opcode, attr_val_adr,
                &Timer_Attr[inst][attr_num]);
        else
            status = BAD_CMD_ATTR;
    }

    return(status);
}

/***************************************************************
 *
 * Name: TIMER_set
 *
 * Description: This function sets a timer for the given time
 *
 ***************************************************************/
void TIMER_set(timer_num, time_val)

uchar   timer_num;
uint    time_val;
{
    /*
     * check the user data
     */
    if (timer_num > NUM_TIMERS)
        return;

    /*
     * Set the timer to the given value
     */
    if ((Timers[timer_num].trigger_time = Sys_Timer + time_val)
== 0)
        Timers[timer_num].trigger_time++;
    Timers[timer_num].trigger_flag = FALSE;
}

/***************************************************************
 *
 * Name: TIMER_expired
 *
 * Description: This function checks to see if a timer has
expired
 *
 ***************************************************************/
uchar TIMER_expired(timer_num)
```

©P-COM, Inc., 1994

```
uchar   timer_num;
{
    /*
     * check the user data
     */
    if (timer_num > NUM_TIMERS)
        return(TRUE);

    /*
     * return trigger flag
     */
    return(Timers[timer_num].trigger_flag);
}

/*************************************************************
 *
 * Name: TIMER_cancel
 *
 * Description: This function cancels a set a timer
 *
 *************************************************************/
void TIMER_cancel(timer_num)

uchar   timer_num;
{
    /*
     * check the user data
     */
    if (timer_num > NUM_TIMERS)
        return;

    /*
     * Clear the timer
     */
    Timers[timer_num].trigger_time = 0;
    Timers[timer_num].trigger_flag = FALSE;
}
```

```
/*************************************************************
 *
 * Description: This file contains utility functions
 *
 * $Id: util.c 2.1 1993/12/29 10:38:45 MIKEE Exp $
 *
 * $Log: util.c $
 * Revision 2.1  1993/12/29  10:38:45  MIKEE
 * covertion
 *
 *
 *    Rev 1.0   17 Nov 1993 10:11:24   mikee
 * Initial revision.
 *
 ************************************************************/

#include <sysdefs.h>

/*
 * External Functions
 */

/*
 * Internal Functions
 */
reentrant uchar *get_nx_cbuff_ptr(CBUFF *, uchar *);

/*
 * External Data
 */

/*
 * Internal Data
 */

/*************************************************************
 *
 * Name: UTIL_clr_mem
 *
 * Description: Set a string of bytes to zero
 *
 ************************************************************/
void UTIL_clr_mem(clr_ptr, locations)

void *clr_ptr;
uint locations;
{
     uchar *mem_ptr;
     uint cnt;
```

```
     mem_ptr = clr_ptr;

     for (cnt = 0; cnt < locations; cnt++)
       *mem_ptr++ = 0;
}

/*************************************************************
 *
 * Name: UTIL_copy_str
 *
 * Description: This routine copys one string to another
 *
 *************************************************************/
uchar UTIL_copy_str(dst_str, src_str)

char    *dst_str;
char    *src_str;
{
    uchar   len;

    len = 0;
    while (*src_str != '\0')
    {
        *dst_str++ = *src_str++;
        len++;
    }

    *dst_str = '\0';
    return(len);
}

/*************************************************************
 *
 * Name: UTIL_copy_mem
 *
 * Description: copy a string of bytes toa given address
 *
 *************************************************************/
void UTIL_copy_mem(dest_ptr, src_ptr, length)

uchar *dest_ptr, *src_ptr, length;
{
     while(length)
     {
          *dest_ptr++ = *src_ptr++;
          --length;
     }
}

/*************************************************************
```

©P-COM, Inc., 1994

```
 *
 * Name: UTIL_num_str
 *
 * Description: converts a number into a string
 *
 ***********************************************************/
uchar UTIL_num_str(str_ptr, num)

uchar   *str_ptr;
uint    num;
{
    uchar   i, str_cnt;
    uint    tens;

    tens = 10000;
    for (i = 0; i < 5; i++)
    {
        if ((num / tens) != 0)
            break;
        tens /= 10;
    }

    /*
     * Now move one tens place at a time and record the number
     */
    str_cnt = 0;
    if (i == 5)
    {
        str_ptr[str_cnt++] = '0';
    }
    else
    {
        for (; i < 5; i++)
        {
            str_ptr[str_cnt++] = 0x30 + (num / tens);
            num %= tens;
            tens /= 10;
        }
    }

    str_ptr[str_cnt] = '\0';
    return(str_cnt);
}

/***********************************************************
 *
 * Name: UTIL_volt_str
 *
 * Description: converts a voltage into a string
 *
```

```
 **************************************************************/
uchar UTIL_volt_str(str_ptr, volt)

uchar   *str_ptr;
uint    volt;
{
    uchar   len;

    /*
     * Find the highest number
     */
    len = UTIL_num_str(str_ptr, (volt / VOLT_FACTOR));

    str_ptr[len++] = '.';

    len += UTIL_num_str(&str_ptr[len],
        (((volt % VOLT_FACTOR) * 10) / VOLT_FACTOR));

    str_ptr[len] = '\0';

    return(len);
}

/**************************************************************
 *
 * Name: UTIL_cbuff_init
 *
 * Description: Initialize a circular buffer structure
 *
 **************************************************************/
void UTIL_cbuff_init(cbuff_ptr)

CBUFF  *cbuff_ptr;
{
    cbuff_ptr->in_ptr = cbuff_ptr->buff;
    cbuff_ptr->out_ptr = cbuff_ptr->buff;
}

/**************************************************************
 *
 * Name: UTIL_get_cbuff
 *
 * Description: This function reads a character from a circular
 *              buffer.
 *
 **************************************************************/
reentrant uchar UTIL_get_cbuff(cbuff_ptr, data_adr)

CBUFF  *cbuff_ptr;
uchar   *data_adr;
```

©P-COM, Inc., 1994

```
{
    uchar   key;

    /*
     * Check if there is anything in the buffer
     */
    if (cbuff_ptr->in_ptr != cbuff_ptr->out_ptr)
    {
        *data_adr = *cbuff_ptr->out_ptr;

        /*
         * move to next place in the key buffer
         */
        cbuff_ptr->out_ptr = get_nx_cbuff_ptr(cbuff_ptr,
cbuff_ptr->out_ptr);

        return(TRUE);
    }

    return(FALSE);
}

/****************************************************************
 *
 * Name: UTIL_add_cbuff
 *
 * Description: This routine adds a char in to a circular buffer
 *
 *
 ***************************************************************/
reentrant uchar UTIL_add_cbuff(cbuff_ptr, data)

CBUFF  *cbuff_ptr;
uchar   data;
{
    uchar    *next_in_ptr;

    /*
     * Get next buffer location
     */
    if ((next_in_ptr = get_nx_cbuff_ptr(cbuff_ptr,
cbuff_ptr->in_ptr)) !=
        cbuff_ptr->out_ptr)
    {
        *cbuff_ptr->in_ptr = data;
        cbuff_ptr->in_ptr = next_in_ptr;
        return(TRUE);
    }
    else
        return(FALSE);
```

UTIL.C

©P-COM, Inc., 1994

```
}

/*************************************************************
 *
 * Name: get_nx_buff_ptr
 *
 * Description: This function returns the next location in the
 *              Keypad buffer.
 *
 *************************************************************/
reentrant uchar *get_nx_cbuff_ptr(cbuff_ptr, cur_ptr)

CBUFF  *cbuff_ptr;
uchar   *cur_ptr;
{
    uchar   *next_ptr;

    /*
     * Add one to the pointer and see if it wraps
     */
    if ((next_ptr = ++cur_ptr) > &cbuff_ptr->buff[CIR_BUFF_SIZE -
1])
        next_ptr = cbuff_ptr->buff;

    return(next_ptr);
}
```

SOFTWARE CONFIGURABLE RADIO

Gideon Ben-Efraim

APPENDIX B

Attorney Docket M-2763 US

Copyright © P-COM, Inc., 1994

10893STR.H

```
struct que{
        unsigned char flag,
                                                  len,
                                                  storage[0x103];  /*need
to allow for i-field of 255 bytes and 4 bytes of overhead*/
};

struct channel{
        unsigned char busy,                                   /*indicate
s if already in the process of tx or rx*/
                                                      get,
                                                      put,
                                                      inservice,
/*indicates which buffer is currently being used*/
                                                      *char_pointer,  /*
point into buffer in use*/
                                                      state,
/*indicates where we are in our attempt to sync on a packet*/
                                                      chksum,
/*used for calculating a checksum*/
                                                      packet_len,     /*
used for determining when we are done rcving the i-field of the pa
cket*/
                                                      baud_rate;
/*0 = 1200, 1= 2400 ....*/
        struct que buffer[MAX_BUFFER];                /*there are X buff
ers in the buffer pool*/
};

struct link_stats
{
        unsigned long   bad_packets,
                                                      timeouts,
                                                      packets_sent,
                                                      packets_received,
                                                      own_packets_receiv
ed,
                                                      packets_sent_not_r
eceived,
                                                      fucked_up_characte
r,
                                                      answers;
};

struct a2d_manager{
        unsigned char   entry,
                                                      current_temp_offse
t,
                                                      channel,
                                                      next_mux_channel,
```

10893STR.H

```
                                                  not_complete;
  /* 0 = A2D_READY,1 = A2D_BUSY, & 2 = A2D_DONE*/
};

/*
** The following structures make up the "SYSTEM DATA BASE" for bot
h local and
** remote terminals this includes alarms,analog voltages, configur
ation information
** and performance data
*/

struct idu_str
{
        unsigned char   alarm0,          /* bit 0 = txclk_av

                 bit 1 = rxclk_av

                 bit 2 = modem_av

                 bit 3 = afc_freq

                 bit 4 = demod_av

                 bit 5 = rcv_av

                 bit 6 = rcv_eye_av

                 bit 7 = afc_on

         */
                                                  alarm1,          /
* bit 0 = MODEM ALARM

                 bit 1 =

                 bit 2 =

                 bit 3 =

                 bit 4 =

                 bit 5 =

                 bit 6 =

                 bit 7 =

         */
```

10893STR.H

```
                                                   alarm2,       /*
bit 0 = los ch1
            bit 1 = los ch2
            bit 2 = los ch3
            bit 3 = los ch4
            bit 4 = traffic out ch1
            bit 5 = traffic out ch2
            bit 6 = traffic out ch3
            bit 7 = traffic out ch4
      */
                                                   alarm3,       /*
bit 0 = telemetry error 1
            bit 1 = telemetry error 2
            bit 2 = telemetry error 3
            bit 3 = telemetry error 4
            bit 4 = telemetry error 5
            bit 5 = telemetry error 6
            bit 6 =
            bit 7 = illegal synthesizer setting
      */
                                                   alarm4,
/* bit 0 = LOFA
            bit 1 = pattern detect fail
            bit 2 = AIS tx
            bit 3 = AIS rx
            bit 4 = cable short
            bit 5 = cable open
```

10893STR.H

```
                bit 6 = BER lo flag
                bit 7 = BER hi flag
        */
                                              alarm5,         /*
bit 0 = RADIO CONFIGURATION CHANGED
                bit 1 =
                bit 2 =
                bit 3 =
                bit 4 =
                bit 5 =
                bit 6 =
                bit 7 =
        */
                                              alarm6,         /*
bit 0 =  configuration error
                bit 1 =
                bit 2 =
                bit 3 =
                bit 4 =
                bit 5 =
                bit 6 =
                bit 7 = pilot bit
        */
                                              personality,
                                              input_alarms_enabl
e,/* bit 0 = ch1 enable
                        bit 1 = ch2 enable
                        bit 2 = ch3 enable
```

10893STR.H

```
                                bit 3 = ch4 enable
                                bit 4 =
                                bit 5 =
                                bit 6 =
                                bit 7 =
                        */
                                                        option_switch1,
                                                        option_switch2,
                                                        sw_rev;
        unsigned int    oof_errors,
                                                        corrected_errors,
                                                        uncorrected_errors
,
                                                        hdb3_errors;
        unsigned char   recieve_signal,
                                                        external_user_alar
ms,
                                                        far_end_opcode_req
uest,
                                                        far_end_requesting
_task,
                                                        loopback_command,
                                                        loopback_channel;
};
struct odu_str
{
   unsigned char        alarm0,         /* bit0 - 13ghztx
                bit1 - 13ghztxlo
                bit2 - ref_lvl
                bit3 - txiflvl
                bit4 - agc lvl
                bit5 - plo2 lvl
                bit6 - plo2 lock
                bit7 - fs lvl */
                                                        alarm1,         /*
```

10893STR.H

```
 bit0 - tx x3 bias
                bit1 - temp
                bit2 - fs lock
                bit3 - lnc lvl
                bit4 - mixer current
                bit5 - plo lvl
                bit6 -
                bit7 - */
                                                    alarm2,          /*
        bit0 - transmit_mute_active
           bit1 - afc out of range
                bit2 - telemetry error
                bit3 -
                bit4 -
                bit5 -
                bit6 - eeprom failure
                bit7 - data valid bit*/
                                                    sw_rev,
                                                    plo_id,
                                                    agc_level;
};

struct data_base{
        struct idu_str  idu;
        struct odu_str odu;
};


struct terminal_a2d
{
         unsigned char idu_a2d[MAX_IDU_VOLTAGES],
                                                    odu_a2d[MAX_ODU_VO
LTAGES];
};
```

10893STR.H

```
struct switches_str
{
        unsigned char   option_switches,
                                                link_id,
                                                synthesizer_set,
                                                display_pushbutton
s,
                                                loopback_pushbutto
ns,
                                                loopback_options;
        unsigned int    nms_address;
};

struct display_str
{
        unsigned char   status_leds,
                        status_attribute,
                        loopback_leds,
                        loopback_attribute,
                        tributary_leds,
                        tributary_attribute,
                        relays,
                        relay_aco;
};

/*
**      The following structures are used to store manufacturing i
nfromation
*/

struct revision_str
{
        uchar   ser_num1,
                        ser_num2,
                        ser_num3,
                        ser_num4,
                        ser_num5,
                        rev_num1,
                        rev_num2,
                        rev_num3;
};

struct terminal_revisions
{
        struct revision_str acm_revs;

        uchar                           acm_software_revision;

        struct revision_str spm_revs;
```

10893STR.H

```
        uchar                               actel_txi_revision,
                                                    actel_txo_revision
,
                                                    actel_rxi_revision
,
                                                    actel_rxo_revision
;

        struct revision_str rf_revs;
        struct revision_str psm_revs;
        struct revision_str idu_revs;
        struct revision_str ocm_revs;

        uchar                               ocm_software_revision;
};

struct post_event_str
{
        unsigned char idu_alarm_compilier,
                                                    odu_alarm_compilie
r,
                                                    display,
                                                    nms_compilier;
};

struct internal_alarms
{
        unsigned char           serial_telemetry_errors;/*bit0 =
private link error

                                                      bit1 = telemetry
 link error

                                                      bit2 = nms port1
 error

                                                      bit3 = nms port2
 error

                                                      bit4 = maintenan
ce port error

                                                      bit5 = protectio
n port error

                                                      bit6 = not used

                                                      bit7 = RADIO CON
FIGURATION CHANGED

                                                    */
```

10893STR.H

```
        unsigned char           synthesizer;            /*indicate
s synthesizer is at an ivalid setting*/
        unsigned char           ber_flags,
                                                        db_configu
ration;
};

struct odu_ctrl_str
{
        unsigned char   synthesizer_setting,
                                                idu_personality,
                                                odu_tx_mute,
                                                afc_compensation;
};

struct loopback_manager_str
{
        unsigned char   inprogress,
                                                test_results,
                                                channel,
                                                test_desired,
                                                test_selected,
                                                internal_test_patt
ern;
};

struct system_parameters
{
        unsigned int    number_of_channels,
                                                channel_masks,
                                                ber_hi,
                                                hyst_hi,
                                                ber_lo,
                                                hyst_lo,
                                                ber_hi_time,
                                                hyst_hi_time,
                                                ber_lo_time,
                                                hyst_lo_time;
};

struct inter_process
{
        unsigned char   flag,
                                                message_length,
                                                buffer[0x10];
};

struct ber_str
{
        unsigned char   state,
```

10893STR.H

```
                                                 flags,
                                                 running,
                                                 dummy;
        unsigned int    hi_err_count,
                                                 lo_err_count,
                                                 timer_lo,
                                                 timer_hi;
};

struct dig_str
{
        unsigned char   txo,
                                                 txi,
                                                 rxo,
                                                 rxi;
};

struct display_manager_str
{
        unsigned char   state,
                                                 image_selected,
                                                 button_mask;
};

#ifdef MAINCODE
#define VARIABLE
#else
#define VARIABLE extern
#endif

VARIABLE        struct post_event_str wake_up;

VARIABLE        struct data_base local,remote,local_capture,remote
_capture;

VARIABLE        struct display_str local_display,remote_display,lo
cal_capture_display,remote_capture_display;

VARIABLE        struct terminal_a2d a2d_local,a2d_remote;

VARIABLE struct switches_str old_switches,new_switches;

VARIABLE        struct terminal_revisions local_revs, remote_revs;

VARIABLE struct a2d_manager a2d;

VARIABLE struct channel rx[0x06],tx[0x06];

VARIABLE        struct link_stats serial_port_stats[0x06];

VARIABLE struct internal_alarms alarms;
```

10893STR.H

```
VARIABLE struct odu_ctrl_str odu_control;
VARIABLE struct loopback_manager_str loopback;
VARIABLE         struct system_parameters system;
VARIABLE         struct inter_process maintenance_port_2_odu;
VARIABLE         struct ber_str  ber;
VARIABLE         struct dig_str digital_alarm;
VARIABLE         struct display_manager_str display_panel;
VARIABLE unsigned int delay_tmr,
                                                      timers[MA
X_NUMBER_OF_TIMERS];

VARIABLE unsigned char error_counters[0x05],
                                                             ti
ming_variable,
                                                             ee
prom_buffer[0xff];
VARIABLE unsigned char
                                                     spm_contro
ls,
                                                     port1_imag
e,
                                                     port4_imag
e,
                                                     tx_frame_b
yte,
                                                     rx_frame_b
yte,
                                                     blink_flag
,
                                                     dog_food,
                                                     fec_enable
d,
                                                     afc_enable
d,
                                                     controls_p
ower_up,
                                                     fpga_comma
nd_register[0x04];
VARIABLE unsigned int Blink_Time; /* ??? test */
▒
```

10893MAP.H

```
/* THIS FILE DEFINES THE MEMORY MAP FOR ALL READ/WRITE ADDRESSES I
N
** THE SYSTEM
*/

#define SCC_CS1 0XE000  /*ADDRESS SELECT FOR IDU2IDU LINK UART*/
#define SCC_CS2 0XE100  /*ADDRESS SELECT FOR NMS PORT1 UART*/
#define SCC_CS3 0XE200  /*ADDRESS SELECT FOR MAINTENANCE PORT UART
*/
#define SCC_CS4 0XE300  /*ADDRESS SELECT FOR PROTECTION PORT UART*
/
#define SCC_CS5 0XE400  /*ADDRESS SELECT FOR NMS PORT2 UART*/

#define IO_CS1  0XE500
#define IO_CS2  0XE600
#define IO_CS3  0XE700
#define IO_CS4  0XE800
#define IO_CS5  0XE900
#define IO_CS6  0XEA00

#define IO_SEL1 0XEB00  /*DIGITAL SECTION SELECT 1*/
#define IO_SEL2 0XEC00  /*DIGITAL SECTION SELECT 2*/


/*
**      THE FOLLOWING DEFINE THE REGISTER LOCATIONS FOR THE SCC269
1
*/

#define MR1                         0X00     /*MODE REGISTER 1*/
#define MR2                         0x00     /*Mode register 2*/
#define SR                                   0X01     /*CLOCK SELECLT &
STATUS REGISTER*/
#define CR                                   0X02     /*COMMAND REGISTER
*/
#define THR                         0X03     /*TRANSMITT HOLDING REGIST
ER*/
#define RHR                         0X03     /*RECIEVE HOLDING REGISTER
*/
#define ACR                         0X04     /*AUXILIARY CONTROL REGIST
ER*/
#define IMR                         0X05     /*INTERRUPT STATUS AND MAS
K REGISTER*/
#define CTU                         0X06     /*COUNTER TIMER UPPER*/
#define CTL                         0X07     /*COUNTER TIMER LOWER*/


/*
** THE FOLLOWING DEFINES THE REGISTER LOCATIONS FOR THE DIGITAL SE
CTION
** FPGAs
```

10893MAP.H

```
*/

#define FPGA1                    0X00
#define FPGA2                    0X08
#define FPGA3                    0X10
#define FPGA4                    0X18

#define TXI     0x00
#define TXO     0x01
#define RXI     0x02
#define RXO     0x03

/*FPGA REGISTER ASSIGNMENTS*/

#define COMMAND_REGISTER         0X00
#define CLEAR_STATUS             0X01
#define FRAME_BYTE_A             0X02
#define FRAME_BYTE_B             0X03
#define STATUS_REGISTER 0X04
#define VERSION                          0X05
#define FEC_ERRORS                       0X06
#define ERROR_COUNTS             0X07

/*SPM MEMORY MAP CONTROLS AND INPUTS*/

#define SPM_CS1          0X00
#define SPM_CS2          0X01
#define SPM_CS3          0X02


/*
** NOW LETS USE THE ABOVE DEFINES TO CREATE SOME CHARACTER POINTER
S
** TO MEMORY MAPPED DEVICES
*/

#define IDU2IDU_UART             (unsigned char *)(SCC_CS1)
#define NMS1_UART                        (unsigned char *)(SCC_CS2)
#define MAINTENANCE_UART         (unsigned char *)(SCC_CS3)
#define PROTECTION_UART (unsigned char *)(SCC_CS4)
#define NMS2_UART                        (unsigned char *)(SCC_CS5)

#define NMS_ADDRESS_LOW          (unsigned char *)(IO_CS1)
#define STATUS_LEDS                              (unsigned char *)(
IO_CS1)

#define NMS_ADDRESS_HIGH                 (unsigned char *)(IO_CS2)
#define LOOP_BACK_LEDS                   (unsigned char *)(IO_CS2)

#define SYNTHESIZER_SET          (unsigned char *)(IO_CS3)
#define LINK_ID_SET                              (unsigned char *)(
```

10893MAP.H

```
IO_CS4)
#define SYSTEM_OPTIONS                  (unsigned char *)(IO_CS5)
#define EXTERNAL_INPUTS         (unsigned char *)(IO_CS6)
#define RELAYS                                  (unsigned char *)(
IO_CS6)


#define TXI_CS                          (unsigned char *)(IO_SEL1
+ FPGA1)
#define TXO_CS                          (unsigned char *)(IO_SEL1
+ FPGA2)
#define RXI_CS                          (unsigned char *)(IO_SEL1
+ FPGA3)
#define RXO_CS                          (unsigned char *)(IO_SEL1
+ FPGA4)

#define TRIBUTARY_LEDS          (unsigned char *)(IO_SEL2 + SPM_CS
1)
#define SPM_CONTROLS            (unsigned char *)(IO_SEL2 + SPM_CS
2)
#define SPM_INPUTS                      (unsigned char *)(IO_SEL2
+ SPM_CS3)
▒
```

10893DEF.H

```
#define REV                12       /*this is the test rev upon releas
e or updates bump this equate*/

/* GENERAL PURPOSE DEFINES FOR MAIN PROGRAM */

#define TRUE                        1
#define FALSE                       0
#define NULL                        0X00
#define EOF                         0xffff
#define ON   0x01
#define OFF      0X00
#define UP                 0x01
#define DOWN     0x02



#define LOCAL    0X00
#define REMOTE 0X01

#define FRAME_BYTE_MSB 0xe8


/*time definitions and counts counts base on 1ms timer tick rate*/

#define ONE_MILLI_SECOND_TICK   0X271   /*THIS IS CALCULATED BY

                                ** ((tick*crystal)/(8*scale)) wher
e scale

                                ** is the internal divide by ratio
 ie 80196 = 2

                                ** 8097 = 3

                                */

#define TEN_MILLI_SECOND_TICK   0X186a
#define FIVE_MILLI_SECOND_TICK  0XC35

#define START_SW_TIMER1                 0X18
#define START_SW_TIMER2                 0X19

#define SECONDS_10MS 0X0002
#define SECONDS_25MS    0X0005
#define SECONDS_50MS    0X000a
#define EIGTH_SECOND    0X0019
#define FIFTH_SECOND    0X0028
#define FOURTH_SECOND   0X0032
#define THIRD_SECOND    0X042
#define HALF_SECOND     0X064
```

10893DEF.H

```
#define SECONDS_750MS   0X096
#define SECONDS_0       0X0000
#define SECONDS_1       0X0c8
#define SECONDS_2       0X0190
#define SECONDS_3       0X0258
#define SECONDS_4       0X0320
#define SECONDS_5       0X3e8
#define SECONDS_6       0x4b0
#define SECONDS_7       0X578
#define SECONDS_8       0X640
#define SECONDS_9       0X708
#define SECONDS_10      0X7d0
#define SECONDS_15      0Xbb8
#define SECONDS_20      0Xfa0
#define SECONDS_30      0X1770
#define SECONDS_45      0X2328
#define SECONDS_60      0X2ee0

#define MAX_NUMBER_OF_TIMERS 0X11

#define DOG_TIMER               0X00
#define READ_SWITCHES   0X01
#define ALARM_TIMER             0X02
#define DISPLAY_TIMER   0X03
#define BLINK_TIMER             0X04
#define A2D_TIME                0x05
#define E2PROM_TMR      0X06
#define PRIVATE_LINK_RECEIVE 0X07
#define TELEMETRY_LINK_RECEIVE 0X08
#define IDU2IDU_A2D_PACKET 0X09
#define TELEMETRY_POLL_TIME 0X0A
#define LOOPBACK_SWITCH_PRESSED_TIMER 0x0b
#define AFC_COMPENSATION_TIME   0X0C
#define ODU_REVISION_REQUEST    0X0D
#define BER_HOLD_OFF            0x0e
#define DISPLAY_TRANSITION      0X0F
#define TELEMETRY_A2D_PACKET 0X10

#define CLR_SW_CTRLS                    0XD7
#define FREQ_SW_STRB                    0X30
#define FREQ_SW_DATA                    0X10
#define FREQ_SW_RISING_CLK      0X38
#define FREQ_SW_FALLING_CLK     0XF7


#define FREQ_CLOCK                      0X01
#define FREQ_DATA                       0X02
#define FREQ_STROBE                     0x04

/*      CONSTANTS USED BY FEED_DOG */
```

10893DEF.H

```
#define BONE                                            0x80

/******CONSTANTS USED FOR IDs****************************/
#define TWO_MB          0x01
#define EIGHT_MB                0X02
/*
** CONSTANTS USE IN READING SWITCHES AND PUSHBUTTONS
*/

#define REMOTE_DISPLAY                                  0X80
#define ALARM_HISTORY                                   0X80
#define ALARM_HISTORY_DISPLAY   0X40

#define LOOPBACK_BUTTONS                                0X70
#define LOOPBACK_CHANNEL_BUTTON 0X10
#define LOOPBACK_TEST_BUTTON            0X20
#define LOOPBACK_ON_OFF_BUTTON  0X40

/*
** Constanst definitions for serial interfaces
*/
#define IDLE            0X00
#define BUSY            0X01
#define READY           0X02
#define MAX_BUFFER      0X02

#define UART_INTERRUPT_MASK             0xf8
#define IDU_INTERRUPT                                   0x08
#define MAINTENANCE_INTERRUPT   0x10
#define NMS_PORT1_INTERRUPT             0x20
#define NMS_PORT2_INTERRUPT             0x40
#define PROTECTION_INTERRUPT            0x80

#define RX_INTERRUPT            0X40
#define TX_INTERRUPT            0X20

#define RX_READY                                        0X01
#define TX_READY                                        0X04
#define RECIEVE_ERROR           0XF0
#define RESET_RECIEVER          0X20
#define RESET_ERROR                     0X40
#define RESET_BREAK                     0X50
#define RX_ENABLE                       0X01

#define MAX_PORTS                       0X06                    /*NUMBER O
F SERIAL PORTS IN THE SYSTEM*/
#define TELEMETRY_LINK          0X00
#define IDU2IDU_LINK            0X01
#define MAINTENANCE_PORT        0X02
#define NMS_PORT1                       0X03
```

10893DEF.H

```
#define NMS_PORT2                        0X04
#define PROTECTION_PORT 0X05

#define PRIVATE_ERROR            0X01
#define TELEMETRY_ERROR 0X02
#define NMS1_ERROR                       0X04
#define NMS2_ERROR                       0X08
#define MAINTENANCE_ERROR        0X10
#define PROTECTION_ERROR         0X20


#define BAUD_1200        0X66
#define BAUD_2400        0X88
#define BAUD_4800        0X99
#define BAUD_9600        0XBB
#define BAUD_19200       0XCC

#define INTEL_1200_BAUD_LO       0X07
#define INTEL_1200_BAUD_HI       0X82

/* packet state definitons for idu2idu,maintenance, and telemetry
links*/
#define RECIEVE_SYNC             0X00
#define RECIEVE_OPCODE           0X01
#define RECIEVE_LENGTH           0X02
#define RECIEVE_DATA             0X03
#define CHECKSUM                                 0X04
#define SYNC                                     0X7E

/* IDU2IDU OPCODE DEFINITIONS*/
#define ALARM_IMAGE                      0X01
#define A2D_IMAGE                        0X02
#define CONFIGURATION_IMAGE      0X03

#define ALARM_IMAGE_RESPONSE                             0X81
#define A2D_IMAGE_RESPONSE                               0X82
#define CONFIGURATION_IMAGE_RESPONSE     0X83

#define REVISION_RESPONSE                                        0X
D0


#define POWER_CONTROL_RESPONSE                   0X86 /* THIS IS MA
INTENANCE PORT TO TELELMETRY PORT*/


#define OVERHEAD                 0X04    /*THE # OF OVERHEAD BYTES
IN A PACKET SYNC,OPCODE,LEN,CHKSUM*/
/*constent definitions for nms character handler*/
#define NMS_SYNC                 0xff
```

10893DEF.H

```
/********* Maintenance port opcodes ********************/

#define POWER_CONTROL               0X06
#define AFC_CONTROL                         0X07
#define WARM_START          0X10
#define READ_ACM                    0X20
#define WRITE_ACM           0X21
#define READ_OCM                    0X22
#define WRITE_OCM                   0X23
#define WRITE_EEPROM        0X24
#define READ_EEPROM                 0x25
#define READ_LOCAL_A2DS             0X26
#define READ_REMOTE_A2DS                    0X27
#define READ_IOPORT                                 0x28
#define WRITE_IOPORT                        0x29

#define PSUEDO              0X2A
#define DATA_INVERT         0X2B
#define LINK_PERFORMANCE            0X2C
#define SERIAL_LINK_PERFORMANCE 0X2D
#define READ_ALARMS         0X2E

/*sub opcodes for reading alarm images*/
#define LOCAL_IMAGE                 0x00
#define LOCAL_CAPTURE       0x01
#define REMOTE_IMAGE        0x02
#define REMOTE_CAPTURE      0x03


#define LOOPBACK                    0X30
#define INJECT_ERRS         0X40
#define CW_MODE             0x41
#define INJECT_AIS          0x42
#define FEC_CORRECTION      0X43

#define MUTE_TRANSMITTER            0X44
/*SUB OPCODES FOR MUTE_TRANSMITTER*/
#define TRANSMIT_ON         0X00
#define MUTE_IDU                    0x01
#define MUTE_ODU                    0X02

#define REVISIONS           0X50
/* SUB OPCODES FOR REVISION MANIPULATION*/
#define READ_REVS           0X00
#define SET_ACM_REVS        0X01
#define SET_SPM_REVS        0x02
#define SET_OCM_REVS        0X03
#define SET_RFM_REVS        0X04
#define SET_PSM_REVS        0X05
#define SET_IDU_REVS        0X06
```

10893DEF.H

```
#define PSUEDO_ON        0X11
#define PSUEDO_OFF       0X10

#define AIS_ANTENNA_ON   0X01
#define AIS_ANTENNA_OFF 0X00
#define AIS_CUSTOMER_OFF        0X02
#define AIS_CUSTOMER_ON 0X03

#define TX_DATA_NONINVERTED     0X00
#define TX_DATA_INVERTED                0X01
#define RX_DATA_NONINVERTED     0X02
#define RX_DATA_INVERTED                0X03

#define CLEAR_SERIAL_LINK_PERFORMANCE   0X00
#define READ_SERIAL_LINK_PERFORMACNE    0X01


/* POWER CONTROL SUB OPCODE DEFINITIONS*/
#define INCREASE_POWER  0X01
#define DECREASE_POWER  0X02
#define SET_POWER               0X03
#define STORE_POWER             0X04
#define READ_POWER              0X05


/*
**              CONSTANTS FOR LEDS AND RELAYS    AND ALARMS
*/
#define LOCAL_DISPLAY   0X00
#define LOCAL_HISTORY   0X40
#define REMOTE_DISPLAY  0X80
#define REMOTE_HISTORY  0XC0

#define RADIO_CONFIGURATION_CHANGE      0X80

#define LEDS_ON                 0x00
#define LEDS_OFF                        0X01
#define DISPLAY_LEDS    0X02

#define LAMP_TEST                                       0XFF
#define LPBK_GREEN                                      0X54
#define LPBK_OFF                                                0X
7E

#define BILEDS_ON               0XAA    /*LITES THE GREEN LED*/
#define LAMP_TEST_3BILEDS               0X2A    /*LITES THE GREEN
LED*/
```

10893DEF.H

```
#define RELAY_MASK                                      0X01    /*INTENDED
 TO INVERT RELAY #1 */
#define SPM_CONTROL_MASK                        0X00    /*INTENDED TO INVE
RT TX MUTE CONTROL LINE*/
#define TX_ON                                                   0X20
#define IDU_LOOP_CONTROL                        0X10
#define IDU_TX_MUTE_CONTROL             0X08

#define MOD_ALARM                                       0X80
#define MOD_LEVEL                                       0x04

#define IF_AGC                                          0x10

#define CABLE_ALARMS                            0X30
#define CABLE_SHORT                                     0X10
#define CABLE_OPEN                                      0X20

#define LOS                                                     0X01
#define LOS_BIT                                         0X01
#define DPM                                                     0X08
#define DPM_BIT                                         0X10
#define LOFA                                                    0X01
#define PRFAIL                                          0X02
#define AISTX                                                   0X10
#define AISTX_BIT                                       0X04
#define AISRX                                                   0X08
#define AISRX_BIT                                       0X08

#define BER_BITS                                                0XC0
#define BER_HI                                          0X80
#define BER_LO                                          0X40

#define PILOT_BIT                                       0X80

#define FRAME_ERRS                              0X00
#define CORRECTED_ERRS                  0X01
#define UNCORRECTED_ERRS                0x02
#define HDB3_ERRS                               0X03
#define CONFIGURATION_ERROR             0X01


#define TELEMETRY_ERROR_BITS            0X3F
#define INVALID_SYNTHESIZER             0X80
#define TX_MUTE_ACTIVE                  0x01
/** The following are mask bytes used in computing summary LEDs an
d Relays**/

#define ODU_RX1                                 0xf2
#define ODU_RX2                                 0x3d
#define TX_LEVEL                                        0x01
#define IDU_TX1                                 0X05
```

10893DEF.H

```
#define IDU_TX2                              0X03
#define IDU_RX1                              0X32
#define IDU_RX2                              0X04
#define IDU_RX3                              0X10
#define IDU_RX4                              0X01

#define IDU_LED                              0X01
#define ODU_LED                              0X02
#define CABLE_LED                                    0X04
#define BER_LED                              0X08
#define MUTE_LED                                     0X10
#define REMOTE_LED                                   0X20
#define TEST_SET_LED                                 0X40
#define SYNTHESIZER_LED                              0X80

#define IDU_RED             0x08
#define IDU_GREEN           0x10
#define ODU_RED             0x20
#define ODU_GREEN           0x40
#define LINK_RED                    0x02
#define LINK_GREEN          0x04

#define CH1_YELLOW          0X02
#define CH1_GREEN           0X01
#define CH2_YELLOW          0X08
#define CH2_GREEN           0X04
#define CH3_YELLOW          0X20
#define CH3_GREEN           0X10
#define CH4_YELLOW          0X80
#define CH4_GREEN           0X40

#define CHANNEL_1           0X01
#define CHANNEL_2           0X02
#define CHANNEL_3           0X03
#define CHANNEL_4           0X04

/*** A2D ALARM GENERATION CONSTANTS****/

#define TXCLK_AV            0X01
#define RXCLK_AV 0X02
#define MOD_AV   0x04
#define AFC                 0x08
#define DEMOD_AV            0x10
#define RCV_AV   0x20
#define RCV_EYE  0x40
#define AFC_ON   0x80

/************ A2D DEFEINITIONS****************/

#define MAX_IDU_VOLTAGES            0X08
#define MAX_ODU_VOLTAGES            14
```

10893DEF.H

```
#define START_A2D_CONVERSION    0X08
#define ANALOG_MUX_CONTROL_BITS 0X07


/************* LOOPBACK DEFINITIONS********************/

#define LOOPBACK_ENABLED          0x01
#define NO_EXTERNAL_TEST_SET      0X02
#define FEC_DISABLED              0X80           /*this is system o
ption switch 8 */
#define BER_HI_104                0X20                   /*THIS IS
SYSTEM OPTION SWITCH 6*/
#define AIS_INJECT_DISABLED       0X40     /*THIS IS SYSTEM OPTION SW
ITCH 7*/

#define FAR_END_LOOPBACK_REQUEST 0x02
#define LOOPBACK_INPROGRESS                0x01
#define REMOTE_LOOPBACK_INPROGRESS         0X04
#define FAR_END_LOOPBACK_OFF               0X08


#define LOOPBACK_OFF              0X00
#define LINK_LOOP                          0X01
#define IDU_LOOP                                   0X02
#define ODU_LOOP                                   0x03
#define REMOTE_LINK_LOOP          0X04
#define HLOOP                                      0x05
#define RLOOP                                      0x06
#define LLOOP                                      0x07
#define DIGITAL_LOOP              0X08

#define LAST_VALID_LOOP           0X09
#define MAX_LPBK_TEST_BUTTON      0X03

#define INTERNAL_DIGITAL_LOOP     0X01
#define EXTERNAL_DIGITAL_LOOP     0X02
#define INTERNAL_IDU_LOOP         0X03
#define EXTERNAL_IDU_LOOP         0X04
#define INTERNAL_HDB3_LOOP        0X05
#define EXTERNAL_HDB3_LOOP        0X06
#define REMOTE_LOOP               0X07
#define LOCAL_LOOP                0X08
#define EXTERNAL_LINK LOOP        0X09
#define INTERNAL_LINK_LOOP        0X0A
#define INTERNAL_ODU_LOOP         0X0B
#define EXTERNAL_ODU_LOOP         0X0C


#define ILLEGAL_CH_TEST 0X10
#define ILLEGAL_CH                         0x11
#define ILLEGAL_TEST              0X12
```

10893DEF.H

```
#define LOOPBACK_NOT_ALLOWED     0X13

#define ERR_CTRL                 0x18

/*DEFINITIONS FOR E2 PROM DATA STORAGE*/
#define PAGE_2                          0X01
#define PAGE_1                          0X00

#define ACM_DEVICE                      0X00
#define SPM_DEVICE                      0X01

#define REVISION_DATA            0Xdf   /*ADDRESS IN PAGE TWO FOR
REVISION DATA*/
#define RFM_REV DATA             0xe7
#define PSM_REV_DATA             0Xef
#define IDU_REV_DATA             0xf7

#define        REVISION_BYTES           0X08


/****** constants used by the BER calculator********/

#define NO_BER  0x00
#define HI_BER  0x01
#define LO_BER  0x02
typedef unsigned char uchar;
typedef unsigned int uint;
```

80C196.H

```
/* 80C196.h
 * Copyright (c) 1990 Intel Corporation, ALL RIGHTS RESERVED.
 *
 * 80C196.h  - declarations for 80C196 SFRs (a superset of
 *             8096 registers) and 80C196-specific library
 *             function declarations
 */


#ifdef MAINCODE
#define VARIABLE
#else
#define VARIABLE extern
#endif


#ifndef _80c196h
#define _80c196h

extern volatile register unsigned short r0;          /* at 0x00: r
  */
extern volatile register unsigned char ad_command;  /* at 0x02:
w */
extern volatile register unsigned char ad_result_lo;/* at 0x02: r
  */
extern volatile register unsigned char ad_result_hi;/* at 0x03: r
  */
extern volatile register unsigned char hsi_mode;    /* at 0x03:
w */
extern volatile register unsigned short hso_time;   /* at 0x04:
w */
extern volatile register unsigned short hsi_time;   /* at 0x04: r
  */
extern volatile register unsigned char hso_command; /* at 0x06:
w */
extern volatile register unsigned char hsi_status;  /* at 0x06: r
  */
extern volatile register unsigned char sbuf;        /* at 0x07: r/
w */
extern volatile register unsigned char int_mask;    /* at 0x08: r/
w */
extern volatile register unsigned char int_pending; /* at 0x09: r/
w */
extern volatile register unsigned char watchdog;    /* at 0x0a:
w */
extern volatile register unsigned short timer1;     /* at 0x0a: r
  */
extern volatile register unsigned short timer2;     /* at 0x0c: r
  */
extern volatile register unsigned char baud_rate;   /* at 0x0e:
w */
```

80C196.H

```
extern volatile register unsigned char ioport0;     /* at 0x0e: r
  */
extern volatile register unsigned char ioport1;     /* at 0x0f: r/
w */
extern volatile register unsigned char ioport2;     /* at 0x10: r/
w */
extern volatile register unsigned char sp_con;      /* at 0x11:
w */
extern volatile register unsigned char sp_stat;     /* at 0x11: r
  */
extern volatile register unsigned char ioc0;        /* at 0x15:
w */
extern volatile register unsigned char ios0;        /* at 0x15: r
  */
extern volatile register unsigned char ioc1;        /* at 0x16:
w */
extern volatile register unsigned char ios1;        /* at 0x16: r
  */
extern volatile register unsigned char pwm_control; /* at 0x17:
w */

/*****************************************************************
***********/
/*
          */
/* Additional SFRs of the 80C196KB
          */
/*
          */
/*****************************************************************
***********/

extern volatile register unsigned char ioc2;        /* at 0x0b:
w */
extern volatile register unsigned char ipend1;      /* at 0x12: r/
w */
extern volatile register unsigned char imask1;      /* at 0x13: r/
w */
extern volatile register unsigned char wsr;         /* at 0x14: r/
w */
extern volatile register unsigned char ios2;        /* at 0x17: r
  */

/*****************************************************************
***********/
/*
          */
/* Additional C96.LIB functions supported by the 80C196 only
          */
/*
          */
```

80C196.H

```
/*****************************************************************
***********/

void enable(void);

void disable(void);

void power_down(void);
void idle(void);

void enable_pts(void);
void disable_pts(void);

#endif /* _80c196h */
```

MUXDMUX.H

```
#define ILP      0x08
#define PREN     0x02
#define ON               0x01
#define ENCB     0x04
#define OLP      0x02
#define DECB     0x02
#define LLP      0x10
#define RLP      0x20
#define ARSTX    0x40
#define ARSRX    0x10
#define HLP      0x08
#define CW               0x02
#define AISF     0X04
#define CORE     0X04

#define INVERT_TRAFFIC  0X20
```

NOVRAM.H

```
/********************************************************************
*********/
/*                    HEADER FILE FOR E2PROM.C
        */
/********************************************************************
*********/


#define SET 1

#define CLR 0

#define E2DATA(x) ioport1 = (ioport1 & 0xfe) | (x)

#define E2CLK(x) ioport1 = (ioport1 & 0xfd) | (x)<<1

#define ACK ioport1 & 0x01
```

AV_LIMIT.H

```
const uchar a2d_max_in[] =
{
        0xb2, 0xb2, 0xff, 0x70, 0xff, 0xff, 0xff, 0x70
};

const uchar a2d_min_in[] =
{
        0x4c, 0x4c, 0x00, 0x00, 0x00, 0x00, 0x00, 0x00
};

const uchar a2d_max_out[] =
{
        0xad, 0xad, 0xff, 0x7f, 0xff, 0xff, 0xff, 0x7f
};

const uchar a2d_min_out[] =
{
        0x51, 0x51, 0x00, 0x20, 0x00, 0x00, 0x00, 0x20
};


const signed char a2d_max_offset[] =
{
        0,0,0,0,0,0,0,0,0
};

const signed char a2d_min_offset[] =
{
        0,0,0,0,0,0,0,0,0
};
```

REG_196.H

```
/* 80C196.h
 * Copyright (c) 1990 Intel Corporation, ALL RIGHTS RESERVED.
 *
 * 80C196.h  - declarations for 80C196 SFRs (a superset of
 *             8096 registers) and 80C196-specific library
 *             function declarations
 */


volatile register unsigned short r0;          /* at 0x00: r   */
volatile register unsigned char ad_command;   /* at 0x02:   w */
volatile register unsigned char ad_result_lo;/* at 0x02: r   */
volatile register unsigned char ad_result_hi;/* at 0x03: r   */
volatile register unsigned char hsi_mode;     /* at 0x03:   w */
volatile register unsigned short hso_time;    /* at 0x04:   w */
volatile register unsigned short hsi_time;    /* at 0x04: r   */
volatile register unsigned char hso_command; /* at 0x06:   w */
volatile register unsigned char hsi_status;  /* at 0x06: r   */
volatile register unsigned char sbuf;         /* at 0x07: r/w */
volatile register unsigned char int_mask;     /* at 0x08: r/w */
volatile register unsigned char int_pending; /* at 0x09: r/w */
volatile register unsigned char watchdog;     /* at 0x0a:   w */
volatile register unsigned short timer1;      /* at 0x0a: r   */
volatile register unsigned short timer2;      /* at 0x0c: r   */
volatile register unsigned char baud_rate;    /* at 0x0e:   w */
volatile register unsigned char ioport0;      /* at 0x0e: r   */
volatile register unsigned char ioport1;      /* at 0x0f: r/w */
volatile register unsigned char ioport2;      /* at 0x10: r/w */
volatile register unsigned char sp_con;       /* at 0x11:   w */
volatile register unsigned char sp_stat;      /* at 0x11: r   */
volatile register unsigned char ioc0;         /* at 0x15:   w */
volatile register unsigned char ios0;         /* at 0x15: r   */
volatile register unsigned char ioc1;         /* at 0x16:   w */
volatile register unsigned char ios1;         /* at 0x16: r   */
volatile register unsigned char pwm_control; /* at 0x17:   w */

/*****************************************************************
***********/
/*
          */
/* Additional SFRs of the 80C196KB
          */
/*
          */
/*****************************************************************
***********/

volatile register unsigned char ioc2;         /* at 0x0b:   w */
volatile register unsigned char ipend1;       /* at 0x12: r/w */
volatile register unsigned char imask1;       /* at 0x13: r/w */
volatile register unsigned char wsr;          /* at 0x14: r/w */
```

REG_196.H

```
volatile register unsigned char ios2;        /* at 0x17: r   */
```

SYSTEMS.H

```
/*      the following list is the definition of what each byte in
the array
        UNIT_TYPE is....

        byte 1 = number_of_channels,
        byte 2 = channel_masks,
        byte 3 = 10^3,
        byte 4 = 10^4,
        byte 5 = 10^5,
        byte 6 = 10^6,
        byte 7 = 10^7,
        byte 8 = 10^8,
        byte 9 = 10^3 SAMPLE TIME,          SAMPLE TIMES ARE BASED O
N A 10 MILLISECOND TICK TIME
        byte 10 = 10^4 SAMPLE TIME,
        byte 11 = 10^5 SAMPLE TIME,
        byte 12 = 10^6 SAMPLE TIME,
        byte 13 = 10^7 SAMPLE TIME,
        byte 14 = 10^8 SAMPLE TIME,
*/

const uint UNIT_TYPE[16][14] =
{
        { 1,    0x01, 115,     12,     12,     3,      2,      2,
        26,     26,     252,    629,    4187,   41854}, /* 1x2 wit
h FEC*/
        { 2,    0x03,   0,      0,      0,      0,      0,      0,
        0,      0,      0,      0,      0,      0},     /* 2x2 wit
h FEC*/
        { 4,    0x0f,   0,      0,      0,      0,      0,      0,
        0,      0,      0,      0,      0,      0},     /* 4x2 wit
h FEC*/
        { 1,    0x01,   0,      0,      0,      0,      0,      0,
        0,      0,      0,      0,      0,      0},     /* 1x8 wit
h FEC*/
        { 1,    0x01, 0,        0,      0,      0,      0,      0,
        0,      0,      0,      0,      0,      0},
        { 2,    0x03,   0,      0,      0,      0,      0,      0,
        0,      0,      0,      0,      0,      0},
        { 4,    0x0f,   0,      0,      0,      0,      0,      0,
        0,      0,      0,      0,      0,      0},
        { 1,    0x01,   0,      0,      0,      0,      0,      0,
        0,      0,      0,      0,      0,      0},
        { 1,    0x01, 590,     60,     60,     15,     10,     10
,       26,     26,     252,    629,    4187,   41854}, /* 1x2 no
FEC*/
        { 2,    0x03,   0,      0,      0,      0,      0,      0,
        0,      0,      0,      0,      0,      0},     /* 2x2 no
FEC*/
        { 4,    0x0f,   0,      0,      0,      0,      0,      0,
        0,      0,      0,      0,      0,      0},     /* 4x2 no
```

SYSTEMS.H

```
FEC*/
            { 1,      0x01,    0,        0,        0,        0,        0,        0,
            0,        0,       0,        0,        0,        0},       /* 1x8 no
FEC*/
            { 1,      0x01, 0,           0,        0,        0,        0,        0,
            0,        0,       0,        0,        0,        0},
            { 2,      0x03,    0,        0,        0,        0,        0,        0,
            0,        0,       0,        0,        0,        0},
            { 4,      0x0f,    0,        0,        0,        0,        0,        0,
            0,        0,       0,        0,        0,        0},
            { 1,      0x01,    0,        0,        0,        0,        0,        0,
            0,        0,       0,        0,        0,        0}
};
```

10893.C

```
/*
** The chip configuration byte (ccb location 2018h) defines 1 wait
 state,ale,
** *wr and 8 bit bus operation
*/
#pragma ccb(0xcc)

#define MAINCODE        1       /*THIS IS DONE SO ONLY THIS MODULE
 DECLARES VARIABLES ALL OTHERS
                                                        ** WILL DE
FINE THEM AS EXTERNAL
                                                        */

#include <10893map.h>
#include <10893def.h>
#include <10893str.h>
#include <80c196.h>


#pragma interrupt (external_interrupt = 7)
#pragma interrupt (serial_interrupt = 6)
#pragma interrupt (timer_interrupt = 5)
#pragma interrupt (HSIO_interrupt = 4)
#pragma interrupt (HSO_interrupt = 3)
#pragma interrupt (data_available_interrupt = 2)
#pragma interrupt (a2d_interrupt = 1)
#pragma interrupt (timer_ovflw_interrupt = 0)

void kick_the_dog();

void clear_memory();

void handle_character();

extern void initialize_system();
extern void read_switches();
extern void alarm_handler();
extern void maintenance_handler();
extern void telemetry_handler();
extern void idu2idu_handler();
extern void display_drivers();
extern void     initialize_digital(),validate_digital_section();
extern void calculate_ber(),start_ber();


/*
** This is the main loop of the program. Each task is set up to ru
n at a specific
** time at initialization after that each time the task runs it mu
st set its own
** wake up timer. Other functions also require another task to set
```

10893.C

```
 a flag in order
** to run (post an event).
*/

void main()
{
        initialize_system();
/* ??? test */
Blink_Time = FOURTH_SECOND;

        while(TRUE)
        {
/*              if(!timers[DOG_TIMER])  kick_the_dog(FALSE);*/

                if(!timers[READ_SWITCHES]) read_switches();

                alarm_handler();

                display_drivers();

                idu2idu_handler();

                telemetry_handler();

                maintenance_handler();

                start_ber();

        }/*end while(TRUE)*/

}/*close main()*/




/*********** the following section contains interrupt handlers****
**/

/*
** FUNCTION:
**            TIMER_INTERRUPT:
**                                                decrements all software ti
mers used for time slicing,timeouts ...
**
*/
void timer_interrupt()
{
        unsigned char ios1_status,x;
```

10893.C

```
        ios1_status = ios1;                          /* read the status
 register to determine which timer has expired*/

        if(ios1_status &  0x01)
        {
                hso_command = START_SW_TIMER1;

                hso_time = timer1 + FIVE_MILLI_SECOND_TICK ;

                for(x = 0; x < MAX_NUMBER_OF_TIMERS; x++)
                {
                        if(timers[x])--timers[x];
                }

                if(!timers[BLINK_TIMER])
                {
                        blink_flag = ~blink_flag;
/* ????? test
                        timers[BLINK_TIMER] = FOURTH_SECOND;
*/
timers[BLINK_TIMER] = Blink_Time;
                }
        }

        if(ios1_status & 0x02)
        {

                hso_command = START_SW_TIMER2;
                hso_time = timer1 + TEN_MILLI_SECOND_TICK ;

                calculate_ber();
        }

}

/*
** FUNCTION:
**              a2sd_interrupt:
**
**                                                      start the next conversion
if necessary or post the event
**                                                      wake_up.alarm_compiler sig
nifing the end of a2d conversion and
**                                                      time to compare voltages t
o trip points.
*/
void a2d_interrupt()
{
        uchar x;
```

10893.C

```
        a2d_local.idu_a2d[a2d.next_mux_channel] = ad_result_hi;
                        /*read result*/

        if(a2d.next_mux_channel == ANALOG_MUX_CONTROL_BITS)
        {
                wake_up.idu_alarm_compilier = TRUE;
                a2d.not_complete = FALSE;
        }

        else
        {
                ++a2d.next_mux_channel;

                spm_controls = (spm_controls & (~ANALOG_MUX_CONTRO
L_BITS)) | a2d.next_mux_channel;

                *SPM_CONTROLS = spm_controls ^ SPM_CONTROL_MASK;

                for(x=0;x<0xa0;x++); /*this is a delay loop to all
ow sample and hold time to charge*/

                ad_command = (a2d.channel) | START_A2D_CONVERSION;
                 /*BUMP TO THE NEXT CHANNEL AND GO*/
        }
}

/*
** FUNCTION:
**              serial_interrupt: This handle transmission and re
ception of characters
**                              of the on board uart of the micro
controller.
*/


void serial_interrupt()
{
        unsigned char serial_status;
        unsigned char rx_char;
        struct channel *tx_pointer;

        serial_status = sp_stat;

        if(serial_status & RX_INTERRUPT)        /*this is a reciev
e interrupt*/
        {
                /*
                ** this is a recieve interrupt so read a character
 from the serial recieve
                ** holding register and determine where it goes in
 a telemetry packet
```

10893.C

```
                */

                rx_char = sbuf;
                handle_character(rx_char,&rx[TELEMETRY_LINK],&seri
al_port_stats[TELEMETRY_LINK]);

        }/*END IF OF RX INTERRRUPT*/


        if(serial_status & TX_INTERRUPT)/*this is a xmit interrupt
*/
        {
                /*
                ** This is a transmit interrupt. The busy flag is
checked to see if a packet
                ** transmission is still in progress. It needs to
be determined if this tx
                ** interrupt is for the last character in the pack
et or not. If it is the
                ** last character need to set up to look at the ne
xt buffer in the pool
                ** change the status of the serial port to idle in
case there is some one else
                ** in the que that needs to transmit
                */

                tx_pointer = &tx[TELEMETRY_LINK];
                if(tx_pointer->busy){
                        if(tx_pointer->packet_len)
                        {
                                sbuf = *(tx_pointer->char_pointer+
+);
                                --tx_pointer->packet_len;

                        }/*end if(packet_len)*/

                        else
                        {
                                tx_pointer->buffer[tx_pointer->get
].flag = IDLE;
                                ++tx_pointer->get;
                                if(tx_pointer->get == MAX_BUFFER)
                                {
                                        tx_pointer->get = 0;
                                }
                                tx_pointer->busy = FALSE;

                                spm_controls &= ~TX_ON;
                                *SPM_CONTROLS = spm_controls ^ SPM
_CONTROL_MASK;
```

10893.C

```
                                ++serial_port_stats[TELEMETRY_LINK
].packets_sent;

                        }/*end else of if(packet_len)*/

                }/*end if(busy)*/

        }/*END IF OF TX INTERRUPT*/

}/*close interrupt handler*/


/*
** FUNCTION:
**              external_interrupt: This handle transmission and
reception of characters
**                              of the five 2691 UARTS.When a char
acter is recieved it is determined if
**                              it fits into the expected packet f
ormat and buffered for processing by
**                              the programs main loop.
*/

void external_interrupt()
{
        unsigned char uart_interrupt_pins;
        unsigned char rx_char;
        struct channel *tx_pointer;

        uart_interrupt_pins = (ioport0) & UART_INTERRUPT_MASK;


        while(uart_interrupt_pins != UART_INTERRUPT_MASK)
        {
                if(!(uart_interrupt_pins & IDU_INTERRUPT))
                {
                        tx_pointer = &tx[IDU2IDU_LINK];

                        if (*(IDU2IDU_UART + SR) & TX_READY)
                        {
                                /*
                                ** This is a transmit interrupt. T
he busy flag is checked to see if a packet
                                ** transmission is still in progre
ss. It needs to be determined if this tx
                                ** interrupt is for the last chara
cter in the packet or not. If it is the
                                ** last character need to set up t
o look at the next buffer in the pool
                                ** change the status of the serial
```

10893.C

```
 port to idle incase there is some one else
                              ** in the que that needs to transm
it
                              */

                              tx_pointer = &tx[IDU2IDU_LINK];
                              if(tx_pointer->busy){
                                      if(tx_pointer->packet_len)
                                      {
                                              *(IDU2IDU_UART + T
HR) = *(tx_pointer->char_pointer++);
                                              --tx_pointer->pack
et_len;

                                      }/*end if(packet_len)*/

                                      else
                                      {
                                              tx_pointer->buffer
[tx_pointer->get].flag = IDLE;
                                              ++tx_pointer->get;
                                              if(tx_pointer->get
 == MAX_BUFFER)
                                              {
                                                      tx_pointer
->get = 0;
                                              }
                                              tx_pointer->busy =
 FALSE;

                                              *(IDU2IDU_UART + I
MR)  = 0x04; /* LEAVE RX ENABLED ONLY*/

                                              ++serial_port_stat
s[IDU2IDU_LINK].packets_sent;
                                      }/*end else of if(packet_l
en)*/

                              }/*end if(busy)*/

                      }

                      if (*(IDU2IDU_UART + SR) & RX_READY)
                      {
                              /*
                              ** This is the recieve interrupt f
irst we must check to see if the character
                              ** is corrupted. If it is do some
clean up and move on if not see if the
                              ** character fits into the packet
                              */
```

```
                                        if ((*(IDU2IDU_UART + SR) & RECIEV
E_ERROR))
                                        {
                                                *(IDU2IDU_UART + CR) = RES
ET_ERROR;
                                                *(IDU2IDU_UART + CR) = RES
ET_RECIEVER;
                                                *(IDU2IDU_UART + CR) = RES
ET_BREAK;
                                                *(IDU2IDU_UART + CR) = RX_
ENABLE;

                                                rx[IDU2IDU_LINK].state = R
ECIEVE_SYNC;
                                                ++serial_port_stats[IDU2ID
U_LINK].fucked_up_character;

                                        }/* end if(RECIEVE_ERROR)*/
                                        else
                                        {
                                                rx_char = *(IDU2IDU_UART +
 RHR);
                                                handle_character(rx_char,&
rx[IDU2IDU_LINK],&serial_port_stats[IDU2IDU_LINK]);

                                        }/*end else*/

                                }/*close RX_READY of IDU2IDU*/

                        }/*end if(IDU_INTERRUPT)*/

                        if(!(uart_interrupt_pins & MAINTENANCE_INTERRUPT))
                        {
                                tx_pointer = &tx[MAINTENANCE_PORT];

                                if (*(MAINTENANCE_UART + SR) & TX_READY)
                                {
                                        /*
                                        ** This is a transmit interrupt. T
he busy flag is checked to see if a packet
                                        ** transmission is still in progre
ss. It needs to be determined if this tx
                                        ** interrupt is for the last chara
cter in the packet or not. If it is the
                                        ** last character need to set up t
o look at the next buffer in the pool
                                        ** change the status of the serial
 port to idle incase there is some one else
                                        ** in the que that needs to transm
it
```

```
                              */
                              tx_pointer = &tx[MAINTENANCE_PORT]
;
                              if(tx_pointer->busy){
                                      if(tx_pointer->packet_len)
                                      {
                                              *(MAINTENANCE_UART
 + THR) = *(tx_pointer->char_pointer++);
                                              --tx_pointer->pack
et_len;

                                      }/*end if(packet_len)*/

                                      else
                                      {
                                              tx_pointer->buffer
[tx_pointer->get].flag = IDLE;
                                              ++tx_pointer->get;
                                              if(tx_pointer->get
 == MAX_BUFFER)
                                              {
                                                      tx_pointer
->get = 0;
                                              }
                                              tx_pointer->busy =
 FALSE;

                                              *(MAINTENANCE_UART
 + IMR)  = 0x04; /* LEAVE RX ENABLED ONLY*/

                                              ++serial_port_stat
s[MAINTENANCE_UART].packets_sent;

                                      }/*end else of if(packet_l
en)*/

                              }/*end if(busy)*/

                      }

                      if (*(MAINTENANCE_UART + SR) & RX_READY)
                      {
                              /*
                              ** This is the recieve interrupt f
irst we must check to see if the character
                              ** is corrupted. If it is do some
clean up and move on if not see if the
                              ** character fits into the packet
                              */
```

10893.C

```
                                        if ((*(MAINTENANCE_UART + SR) & RE
CIEVE_ERROR))
                                        {
                                                *(MAINTENANCE_UART + CR) =
 RESET_ERROR;
                                                *(MAINTENANCE_UART + CR) =
 RESET_RECIEVER;
                                                *(MAINTENANCE_UART + CR) =
 RESET_BREAK;
                                                *(MAINTENANCE_UART + CR) =
 RX_ENABLE;

                                                rx[MAINTENANCE_PORT].state
 = RECIEVE_SYNC;

                                                ++serial_port_stats[MAINTE
NANCE_PORT].fucked_up_character;

                                        }/* end if(RECIEVE_ERROR)*/
                                        else
                                        {
                                                rx_char = *(MAINTENANCE_UA
RT + RHR);
                                                handle_character(rx_char,&
rx[MAINTENANCE_PORT],&serial_port_stats[MAINTENANCE_PORT]);

                                        }/*end else*/

                                }/*close RX_READY of MAINTENANCE*/

                        }/*end if(MAINTENANCE_INTERRUPT)*/

                        if(!(uart_interrupt_pins & NMS_PORT1_INTERRUPT))
                        {
                                tx_pointer = &tx[NMS_PORT1];

                                if (*(NMS1_UART + SR) & TX_READY)
                                {
                                        /*
                                        ** This is a transmit interrupt. T
he busy flag is checked to see if a packet
                                        ** transmission is still in progre
ss. It needs to be determined if this tx
                                        ** interrupt is for the last chara
cter in the packet or not. If it is the
                                        ** last character need to set up t
o look at the next buffer in the pool
                                        ** change the status of the serial
 port to idle incase there is some one else
                                        ** in the que that needs to transm
```

10893.C

```
it
                                        */

                                        tx_pointer = &tx[NMS_PORT1];
                                        if(tx_pointer->busy){
                                                if(tx_pointer->packet_len)
                                                {
                                                        *(NMS1_UART + THR)
 = *(tx_pointer->char_pointer++);
                                                        --tx_pointer->pack
et_len;

                                                }/*end if(packet_len)*/

                                                else
                                                {
                                                        tx_pointer->buffer
[tx_pointer->get].flag = IDLE;
                                                        ++tx_pointer->get;
                                                        if(tx_pointer->get
 == MAX_BUFFER)
                                                        {
                                                                tx_pointer
->get = 0;
                                                        }
                                                        tx_pointer->busy =
 FALSE;

                                                        *(NMS1_UART + IMR)
  = 0x04; /* LEAVE RX ENABLED ONLY*/

                                                        ++serial_port_stat
s[NMS_PORT1].packets_sent;

                                                }/*end else of if(packet_l
en)*/

                                        }/*end if(busy)*/

                                }

                                if (*(NMS1_UART + SR) & RX_READY)
                                {
                                        /*
                                        ** This is the recieve interrupt f
irst we must check to see if the character
                                        ** is corrupted. If it is do some
clean up and move on if not see if the
                                        ** character fits into the packet
                                        */
```

10893.C

```
                                        if ((*(NMS1_UART + SR) & RECIEVE_E
RROR))
                                        {
                                                *(NMS1_UART + CR) = RESET_
ERROR;
                                                *(NMS1_UART + CR) = RESET_
RECIEVER;
                                                *(NMS1_UART + CR) = RESET_
BREAK;
                                                *(NMS1_UART + CR) = RX_ENA
BLE;

                                                rx[NMS_PORT1].state = RECI
EVE_SYNC;

                                                ++serial_port_stats[NMS_PO
RT1].fucked_up_character;

                                        }/* end if(RECIEVE_ERROR)*/
                                        else
                                        {
                                                rx_char = *(NMS1_UART + RH
R);

                                        }/*end else*/

                                }/*close RX_READY of NMS1_PORT1*/

                        }/*end if(NMS_PORT1_INTERRUPT)*/

                        if(!(uart_interrupt_pins & NMS_PORT2_INTERRUPT))
                        {
                                tx_pointer = &tx[NMS_PORT2];

                                if (*(NMS2_UART + SR) & TX_READY)
                                {
                                        /*
                                        ** This is a transmit interrupt. T
he busy flag is checked to see if a packet
                                        ** transmission is still in progre
ss. It needs to be determined if this tx
                                        ** interrupt is for the last chara
cter in the packet or not. If it is the
                                        ** last character need to set up t
o look at the next buffer in the pool
                                        ** change the status of the serial
 port to idle incase there is some one else
                                        ** in the que that needs to transm
it
                                        */
```

10893.C

```
                              tx_pointer = &tx[NMS_PORT2];
                              if(tx_pointer->busy){
                                      if(tx_pointer->packet_len)
                                      {
                                              *(NMS2_UART + THR)
 = *(tx_pointer->char_pointer++);
                                              --tx_pointer->pack
et_len;

                                      }/*end if(packet_len)*/

                                      else
                                      {
                                              tx_pointer->buffer
[tx_pointer->get].flag = IDLE;
                                              ++tx_pointer->get;
                                              if(tx_pointer->get
 == MAX_BUFFER)
                                              {
                                                      tx_pointer
->get = 0;
                                              }
                                              tx_pointer->busy =
 FALSE;

                                              *(NMS2_UART + IMR)
  = 0x04; /* LEAVE RX ENABLED ONLY*/
                                              ++serial_port_stat
s[NMS_PORT2].packets_sent;

                                      }/*end else of if(packet_l
en)*/

                              }/*end if(busy)*/

                      }

                      if (*(NMS2_UART + SR) & RX_READY)
                      {
                              /*
                              ** This is the recieve interrupt f
irst we must check to see if the character
                              ** is corrupted. If it is do some
clean up and move on if not see if the
                              ** character fits into the packet
                              */

                              if ((*(NMS2_UART + SR) & RECIEVE_E
RROR))
                              {
```

10893.C

```
                                        *(NMS2_UART + CR) = RESET_
ERROR;
                                        *(NMS2_UART + CR) = RESET_
RECIEVER;
                                        *(NMS2_UART + CR) = RESET_
BREAK;
                                        *(NMS2_UART + CR) = RX_ENA
BLE;

                                        rx[NMS_PORT2].state = RECI
EVE_SYNC;
                                        ++serial_port_stats[NMS_PO
RT2].fucked_up_character;

                                }/* end if(RECIEVE_ERROR)*/
                                else
                                {
                                        rx_char = *(NMS2_UART + RH
R);

                                }/*end else*/

                        }/*close RX_READY of NMS_PORT2*/

                }/*end if(NMS_PORT2_INTERRUPT)*/

                if(!(uart_interrupt_pins & PROTECTION_INTERRUPT))
                {
                        tx_pointer = &tx[PROTECTION_PORT];

                        if (*(PROTECTION_UART + SR) & TX_READY)
                        {
                                /*
                                ** This is a transmit interrupt. T
he busy flag is checked to see if a packet
                                ** transmission is still in progre
ss. It needs to be determined if this tx
                                ** interrupt is for the last chara
cter in the packet or not. If it is the
                                ** last character need to set up t
o look at the next buffer in the pool
                                ** change the status of the serial
 port to idle incase there is some one else
                                ** in the que that needs to transm
it
                                */

                                tx_pointer = &tx[PROTECTION_PORT];
                                if(tx_pointer->busy){
                                        if(tx_pointer->packet_len)
```

10893.C

```
                                        {
                                                *(PROTECTION_UART
+ THR) = *(tx_pointer->char_pointer++);
                                                --tx_pointer->pack
et_len;

                                        }/*end if(packet_len)*/

                                        else
                                        {
                                                tx_pointer->buffer
[tx_pointer->get].flag = IDLE;

                                                ++tx_pointer->get;
                                                if(tx_pointer->get
 == MAX_BUFFER)
                                                {
                                                        tx_pointer
->get = 0;
                                                }
                                                tx_pointer->busy =
 FALSE;

                                                *(PROTECTION_UART
+ IMR)  = 0x04; /* LEAVE RX ENABLED ONLY*/


                                                ++serial_port_stat
s[PROTECTION_PORT].packets_sent;

                                        }/*end else of if(packet_l
en)*/

                                }/*end if(busy)*/

                        }

                        if (*(PROTECTION_UART + SR) & RX_READY)
                        {
                                /*
                                ** This is the recieve interrupt f
irst we must check to see if the character
                                ** is corrupted. If it is do some
clean up and move on if not see if the
                                ** character fits into the packet
                                */

                                if ((*(PROTECTION_UART + SR) & REC
IEVE_ERROR))
                                {
                                        *(PROTECTION_UART + CR) =
RESET_ERROR;
```

10893.C

```
                                        *(PROTECTION_UART + CR) =
RESET_RECIEVER;
                                        *(PROTECTION_UART + CR) =
RESET_BREAK;
                                        *(PROTECTION_UART + CR) =
RX_ENABLE;

                                        rx[PROTECTION_PORT].state
= RECIEVE_SYNC;

                                        ++serial_port_stats[PROTEC
TION_UART].fucked_up_character;
                                }/* end if(RECIEVE_ERROR)*/
                                else
                                {
                                        rx_char = *(PROTECTION_UAR
T + RHR);
                                        handle_character(rx_char,&
rx[PROTECTION_PORT],&serial_port_stats[PROTECTION_PORT]);

                                }/*end else*/

                        }/*close RX_READY of PROTECTION PORT*/

                }/*end if(PROTECTION_INTERRUPT)*/

                uart_interrupt_pins = (ioport0) & UART_INTERRUPT_M
ASK;

        }/*end while(uart_interrupt_pins)*/

}/*close interrupt handler*/


/*the following are interrupt handler stumps just incase*/

void HSI0_interrupt()
{
        /*interrupt stump*/
}

void HSO_interrupt()
{
        /*interrupt stump*/
}

void data_available_interrupt()
{
        /*interrupt stump*/
}
```

10893.C

```
void timer_ovflw_interrupt()
{
        /*interrupt stump*/
}


/*
** FUNCTION: handle_character   -does the packet synchronization a
nd validation
**                                      for the private link,telem
etry link, and maintenance port
**
**

** Input Definitions:

**                                                      rx_char -
the character just recieved on the serial pipe
**
**   Returned Values:
**                                      No values returned
**
*/
void handle_character(rx_char,ptr,stat_ptr)
uchar rx_char;
struct channel *ptr;
struct link_stats *stat_ptr;
{

        switch(ptr->state){

                case RECIEVE_SYNC:

                        if(rx_char == SYNC){
                                ++ptr->state;
                                ptr->chksum = SYNC;
                        }

                break;

                case RECIEVE_OPCODE:    /*we are expecting one of
several possible opcodes*/

                        ptr->inservice = ptr->put;
                        ptr->buffer[ptr->inservice].flag = BUSY;
                        ptr->buffer[ptr->inservice].len = 0x01; /*
set the buffer reception length = to 1*/
                        ptr->char_pointer = &(ptr->buffer[ptr->ins
ervice].storage[0]);
                        *(ptr->char_pointer++) = rx_char;
```

10893.C

```
                ptr->chksum += rx_char;

                ++ptr->state;

            break;

            case RECIEVE_LENGTH:

                ptr->packet_len = rx_char;

                *(ptr->char_pointer++) = rx_char;
                ptr->chksum += rx_char;

                if(ptr->packet_len == 0)ptr->state = CHECK
SUM;

                else ptr->state = RECIEVE_DATA;

            break;

            case RECIEVE_DATA:       /*we suck up the number of
 bytes specified in packet_len when packet_len =0 bump state */

                ptr->chksum += rx_char;
                ++ptr->buffer[ptr->inservice].len;
                *(ptr->char_pointer++) = rx_char;
                --ptr->packet_len;       /*decrement the i-
field length indicator*/

                if((ptr->packet_len) == 0)++ptr->state;

            break;

            case CHECKSUM:  /*this byte should equal the chksu
m we've calculated*/
                            /*at this time we mark the buffer
as use able or plac it back on the que for use*/
                            /*if tag it as useable we must bum
p the put pointer for the next available que*/


                if (((rx_char + ptr->chksum )& 0x00ff) ==
0x00){
                        *(ptr->char_pointer++) = rx_char;
                        ++ptr->buffer[ptr->inservice].len;
                        ptr->buffer[ptr->inservice].flag =
 READY; /*tag the buffer ready for processing by the main loop*/
                        ++ptr->put;
                        if(ptr->put == MAX_BUFFER)ptr->put
 = 0;   /*buffer pool has wrapped around */
```

10893.C

```
                                        ptr->state = RECIEVE_SYNC;        /*
put packet state back to looking for stx byte*/
                                        ++stat_ptr->packets_received;
                                }
                                else{     /*return the allocated buffer to
 the pool*/

                                        ptr->buffer[ptr->inservice].flag =
 IDLE;
                                        ptr->buffer[ptr->inservice].len =
0;
                                        ++ptr->state;
                                        ++stat_ptr->bad_packets;
                                }

                        break;

                default:
                                ptr->state = RECIEVE_SYNC;        /*put pack
et state back to looking for stx byte*/
                        break;

        }/*close switch statement*/
}


void clear_memory(clr_ptr,locations)
void *clr_ptr;
uint locations;
{
        uchar *mem_ptr;
        uint cnt;

        mem_ptr = clr_ptr;

        for(cnt = 0;cnt < locations;cnt++)*mem_ptr++ = 0;
}

void kick_the_dog(intialization) /*this is temporary just to keep
the dog from growling*/
unsigned char intialization;
{
        if(intialization)
        {
                *LOOP_BACK_LEDS = 0X80;
                *LOOP_BACK_LEDS = 0X00;
                dog_food = 0;
        }
        else dog_food = ~dog_food;
}
```

```
        (a2d_local.idu_a2d[2] <= (a2d_max_out[2] + a2d_max_offse
t[2])))local.idu.alarm0 &= ~MOD_AV;      /*clear */

       if(a2d_local.idu_a2d[3]  >= (a2d_max_in[3] + a2d_max_offse
t[3]))local.idu.alarm0 |= AFC;

       else if(a2d_local.idu_a2d[3] <= (a2d_min_out[3]  + a2d_min
_offset[3]))local.idu.alarm0 &= ~AFC;   /*clear */

       if((a2d_local.idu_a2d[4]  >= (a2d_max_in[4] + a2d_max_offs
et[4])) ||
         (a2d_local.idu_a2d[4]  <= (a2d_min_in[4]  + a2d_min_offs
et[4])))local.idu.alarm0 |= DEMOD_AV;

       else if(((a2d_min_out[4]  + a2d_min_offset[4]) <= a2d_loca
l.idu_a2d[4]) &&
                (a2d_local.idu_a2d[4] <= (a2d_max_out[4] + a2d_max
_offset[4])))local.idu.alarm0 &= ~DEMOD_AV;       /*clear */

       if((a2d_local.idu_a2d[5]  >= (a2d_max_in[5] + a2d_max_offs
et[5])) ||
         (a2d_local.idu_a2d[5]  <= (a2d_min_in[5]  + a2d_min_offs
et[5])))local.idu.alarm0 |= RCV_AV;

       else if(((a2d_min_out[5]  + a2d_min_offset[5]) <= a2d_loca
l.idu_a2d[5]) &&
                (a2d_local.idu_a2d[5] <= (a2d_max_out[5] + a2d_max
_offset[5])))local.idu.alarm0 &= ~RCV_AV;         /*clear */

       if((a2d_local.idu_a2d[6]  >= (a2d_max_in[6] + a2d_max_offs
et[6])) ||
         (a2d_local.idu_a2d[6]  <= (a2d_min_in[6]  + a2d_min_offs
et[6])))local.idu.alarm0 |= RCV_EYE;

       else if(((a2d_min_out[6]  + a2d_min_offset[6]) <= a2d_loca
l.idu_a2d[6]) &&
                (a2d_local.idu_a2d[6] <= (a2d_max_out[6] + a2d_max
_offset[6])))local.idu.alarm0 &= ~RCV_EYE;        /*clear */

       if(a2d_local.idu_a2d[7]  >= (a2d_max_in[7] + a2d_max_offse
t[7]))local.idu.alarm0 |= AFC_ON;

       else if(a2d_local.idu_a2d[7] <= (a2d_min_out[7]  + a2d_min
_offset[7]))local.idu.alarm0 &= ~AFC_ON;          /*clear */

}
```

A2D_ALRM.C

```
#include <10893map.h>
#include <10893def.h>
#include <10893str.h>
#include <80c196.h>
#include        "av_limit.h"

void alarm_compilier();


void alarm_compilier(){

        /***********************************************************
**************
        ** calculate the analog voltages alarms for speed we will
do this the
        ** brute force method, and compare the voltagess one at a
time to the min
        ** and max values and or in the appropriate bit to the loc
al.idu alarm structure
        ***********************************************************
**************/

        if((a2d_local.idu_a2d[0]  >= (a2d_max_in[0] + a2d_max_offs
et[0])) ||
          (a2d_local.idu_a2d[0] <= (a2d_min_in[0]  + a2d_min_offse
t[0])))local.idu.alarm0 |= TXCLK_AV;

        else if(((a2d_min_out[0]  + a2d_min_offset[0]) <= a2d_loca
l.idu_a2d[0]) &&
          (a2d_local.idu_a2d[0] <= (a2d_max_out[0] + a2d_max_offse
t[0])))local.idu.alarm0 &= ~TXCLK_AV;   /*clear */

        if((a2d_local.idu_a2d[1]  >= (a2d_max_in[1] + a2d_max_offs
et[1])) ||
          (a2d_local.idu_a2d[1]  <= (a2d_min_in[1]  + a2d_min_offs
et[1])))local.idu.alarm0 |= RXCLK_AV;

        else if(((a2d_min_out[1]  + a2d_min_offset[1]) <= a2d_loca
l.idu_a2d[1]) &&
          (a2d_local.idu_a2d[1] <= (a2d_max_out[1] + a2d_max_offse
t[1])))local.idu.alarm0 &= ~RXCLK_AV;   /*clear */

        if((a2d_local.idu_a2d[2]  >= (a2d_max_in[2] + a2d_max_offs
et[2])) ||
          (a2d_local.idu_a2d[2] <= (a2d_min_in[2]  + a2d_min_offse
t[2])))local.idu.alarm0 |= MOD_AV;

        else if(((a2d_min_out[2]  + a2d_min_offset[2]) <= a2d_loca
l.idu_a2d[2]) &&
```

ALARMS.C

```
#include <10893map.h>
#include <10893def.h>
#include <10893str.h>
#include <80c196.h>
#include "muxdmux.h"


void alarm_handler();
void alarm_capture();

extern void alarm_compilier();
extern void afc_compensation();

/*
** FUNCTION: alarm_handler
**                sets up and starts the analog conversion of SPM mo
nitor points and
**                determines if any are in an alarm state, reads dis
crete alarm point and
**                        and external user input alarms then perfor
ms alarm capture. An a2d
**                        conversion is started ever 250mS.Once the
alarm data base been update
**                        a wake up is posted for the display_handle
r task.
**

** Input Definitions:

**                                                            No paramet
ers required

**   Returned Values:
**                                              No values returned
**
*/

void alarm_handler()
{
        unsigned char temp_value;

        if(!timers[A2D_TIME] && !a2d.not_complete)
        {
                a2d.not_complete = TRUE;

                a2d.next_mux_channel = 0;

                asm di;

                spm_controls &= ~(ANALOG_MUX_CONTROL_BITS);
```

ALARMS.C

```
                *SPM_CONTROLS = spm_controls ^ SPM_CONTROL_MASK;

                asm ei;

                for(temp_value=0;temp_value<0xa0;temp_value++);

                a2d.channel = 0;
                ad_command = a2d.channel | START_A2D_CONVERSION;
        }

        if(wake_up.idu_alarm_compilier)
        {

                alarm_compilier();

                local.idu.external_user_alarms = ~(*EXTERNAL_INPUT
S);

                local.idu.option_switch1 = new_switches.option_swi
tches;

                local.idu.option_switch2 = new_switches.loopback_o
ptions;

                local.idu.alarm1 = 0;           /*clear the alarm
before building a new image*/

                local.idu.alarm1 |= (*SPM_INPUTS) & MOD_ALARM;

                local.idu.alarm2 = 0;           /*clear the alarm
before building a new image*/

                if(digital_alarm.txi & LOS)local.idu.alarm2 |= LOS
_BIT;
                if(digital_alarm.txi & DPM)local.idu.alarm2 |= DPM
_BIT;

                loopback.test_results = 0;
                loopback.test_results = digital_alarm.txi & PRFAIL
;

                local.idu.alarm3 = alarms.serial_telemetry_errors
& TELEMETRY_ERROR_BITS;
                if(alarms.synthesizer)local.idu.alarm3 |= INVALID_
SYNTHESIZER;

                local.idu.alarm4 = 0;

                local.idu.alarm4 |= (*SPM_INPUTS) & CABLE_ALARMS;
```

ALARMS.C

```
                local.idu.alarm4 |= digital_alarm.rxi & LOFA;

                loopback.test_results |= digital_alarm.rxi & LOFA;

                if(digital_alarm.txi & PRFAIL)local.idu.alarm4 |=
PRFAIL;

                if(digital_alarm.txi & AISTX)local.idu.alarm4 |= A
ISTX_BIT;

                if(digital_alarm.rxo & AISRX)local.idu.alarm4 |= A
ISRX_BIT;

                local.idu.alarm4 |= ber.flags & BER_BITS;

                local.idu.alarm5 = 0;           /*spare byte clear
 it*/

                local.idu.alarm5 = alarms.serial_telemetry_errors
& RADIO_CONFIGURATION_CHANGE;

                local.idu.alarm6 |= PILOT_BIT;

                local.idu.sw_rev = REV;

                alarm_capture(&local,&local_capture);

                timers[A2D_TIME] = EIGTH_SECOND;

                wake_up.idu_alarm_compilier = FALSE;
                wake_up.display = TRUE;
                wake_up.nms_compilier = TRUE;
        }

        if((local.idu.alarm4 & BER_HI) && !(new_switches.option_sw
itches & AIS_INJECT_DISABLED))
        {
                fpga_command_register[RXO] |= AISF;
                *(RXO_CS + COMMAND_REGISTER) = fpga_command_regist
er[RXO];
        }

        else
        {
                fpga_command_register[RXO] &= ~AISF;
                *(RXO_CS + COMMAND_REGISTER) = fpga_command_regist
er[RXO];
        }

        afc_compensation();
```

ALARMS.C

```
}



void alarm_capture(source,destination)
uchar *source,*destination;
{
        uchar   reps;

        for(reps = 0;reps < sizeof(struct data_base); ++reps)
                *destination++ |= *source++;

}
```

BER.C

```
#include <10893map.h>
#include <10893def.h>
#include <10893str.h>
#include <80c196.h>


void initialize_ber_calculator();
void calculate_ber();
void start_ber();

extern void clear_memory();


void initialize_ber_calculator()
{
        clear_memory(&ber,sizeof(struct ber_str));

        ber.timer_hi = system.ber_hi_time;
        ber.timer_lo = system.ber_lo_time;

}


void calculate_ber()
{
        unsigned int errs,errs1;

        if(ber.timer_hi)--ber.timer_hi;
        if(ber.timer_lo)        --ber.timer_lo;

        digital_alarm.txo = *(TXO_CS + STATUS_REGISTER);
        digital_alarm.txi = *(TXI_CS + STATUS_REGISTER);
        digital_alarm.rxo = *(RXO_CS + STATUS_REGISTER);
        digital_alarm.rxi = *(RXI_CS + STATUS_REGISTER);

        errs = *(RXO_CS + ERROR_COUNTS);

        errs1 = *(RXO_CS + ERROR_COUNTS);

        *(NMS2_UART + THR) = *(RXO_CS + ERROR_COUNTS);

        *(TXO_CS + CLEAR_STATUS) = 0;
        *(TXI_CS + CLEAR_STATUS) = 0;
        *(RXO_CS + CLEAR_STATUS) = 0;
        *(RXI_CS + CLEAR_STATUS) = 0;

        if(errs == errs1)
        {
                ber.hi_err_count += errs;
                ber.lo_err_count += errs;
```

BER.C

```
        }

        switch(ber.state)
        {
                case    NO_BER:
                        if((ber.hi_err_count >= system.ber_hi) &&
ber.timer_hi)
                        {
                                ber.state = HI_BER;
                                ber.flags = BER_HI + BER_LO;

                                ber.timer_hi = system.hyst_hi_time
;
                                ber.timer_lo = system.hyst_lo_time
;

                                ber.hi_err_count = 0;
                                ber.lo_err_count = 0;
                        }
                        else if((ber.lo_err_count >= system.ber_lo
) && ber.timer_lo)
                        {
                                ber.state = LO_BER;
                                ber.flags = BER_LO;
                                ber.timer_lo = system.hyst_lo_time
;
                                ber.lo_err_count = 0;
                        }
                        else
                        {
                                if(!ber.timer_hi)
                                {
                                        ber.hi_err_count = 0;
                                        ber.timer_hi = system.ber_
hi_time;
                                }
                                if(!ber.timer_lo)
                                {
                                        ber.lo_err_count = 0;
                                        ber.timer_lo = system.ber_
lo_time;
                                }
                        }
                break;/*end case NO_BER*/

                case HI_BER:

                        if((!ber.timer_hi) && (ber.hi_err_count <=
 system.hyst_hi))
                        {
                                ber.state = LO_BER;
```

```
                                ber.flags &= ~BER_HI;
                                ber.hi_err_count = 0;
                                ber.timer_hi = system.ber_hi_time;
                        }
                        else if(!ber.timer_hi)
                        {
                                ber.hi_err_count = 0;
                                ber.timer_hi = system.hyst_hi_time
;
                                ber.lo_err_count = 0;
                                ber.timer_lo = system.hyst_lo_time
;
                        }
                break; /*end case HI_BER:*/

                case LO_BER:

                        if((ber.hi_err_count >= system.ber_hi) &&
ber.timer_hi)
                        {
                                ber.state = HI_BER;
                                ber.flags = BER_HI + BER_LO;

                                ber.timer_hi = system.hyst_hi_time
;
                                ber.timer_lo = system.hyst_lo_time
;

                                ber.hi_err_count = 0;
                                ber.lo_err_count = 0;
                        }
                        else if((!ber.timer_lo) && (ber.lo_err_cou
nt <= system.hyst_lo))
                        {
                                ber.flags &= ~BER_LO;
                                ber.state = NO_BER;

                                ber.lo_err_count = 0;
                                ber.timer_lo = system.ber_lo_time;
                        }
                        else if((ber.lo_err_count >= system.ber_lo
) && ber.timer_lo)
                        {
                                ber.state = LO_BER;
                                ber.flags = BER_LO;
                                ber.timer_lo = system.hyst_lo_time
;
                                ber.lo_err_count = 0;
                        }
                        else if(!ber.timer_lo)
                        {
```

BER.C

```
                                ber.lo_err_count = 0;
                                ber.timer_lo = system.hyst_lo_time
;
                        }
                        if(!ber.timer_hi)
                        {
                                ber.hi_err_count = 0;
                                ber.timer_hi = system.ber_hi_time;
                        }
                break;/*end case LO_BER: */

        }/*end switch(ber.state)*/

/******************** we will up date the error counters here*****
****/
/*              error_counters[HDB3_ERRS] += *(TXI + ERROR_COUNTS)
;
                error_counters[FRAME_ERRS] += *(RXI + ERROR_COUNTS
);
                error_counters[UNCORRECTED_ERRS] += *(RXO + ERROR_
COUNTS);
                error_counters[CORRECTED_ERRS] += *(RXO + FEC_ERRO
RS);*/
/*****************************************************************
******/

}

void start_ber()
{
        if(!timers[BER_HOLD_OFF] && !ber.running)
        {
                hso_command = START_SW_TIMER2;
                hso_time = timer1 + TEN_MILLI_SECOND_TICK ;
                ber.running = TRUE;
        }
        else if(!ber.running)
        {
                digital alarm.txo = *(TXO_CS + STATUS_REGISTER);
                digital_alarm.txi = *(TXI_CS + STATUS_REGISTER);
                digital_alarm.rxo = *(RXO_CS + STATUS_REGISTER);
                digital_alarm.rxi = *(RXI_CS + STATUS_REGISTER);

                *(TXO_CS + CLEAR_STATUS) = 0;
                *(TXI_CS + CLEAR_STATUS) = 0;
                *(RXO_CS + CLEAR_STATUS) = 0;
                *(RXI_CS + CLEAR_STATUS) = 0;

/*              timers[BER_HOLD_OFF] = SECONDS_1;*/
        }
}
```

CONTROLS.C

```
/*
** MODULE: Controls - responsible for monitoring thumbwheel, dip a
nd pushbutton
**                          switches and interperting them and perform
ing or posting and event
**                                  to the appropriate function.
*/

#include <10893map.h>
#include <10893def.h>
#include <10893str.h>
#include <muxdmux.h>
#include <80c196.h>

extern void clear_memory();

extern void status_display();

extern uchar engage_loopback();
extern void     system_parameters();

void loopback_front_panel();
void afc_compensation();
uchar convert_to_decimal(uchar);

void read_switches()
{
        /*
        ** Read all thumbwheels, dip switches and pushbuttons then
 figure out what
        ** to do with them
        */

        local.idu.input_alarms_enable = ((*SPM_INPUTS) & OXOF) ^ 0
XOF;

        new_switches.option_switches = ~(*SYSTEM_OPTIONS);

        new_switches.link_id = convert_to_decimal(~(*LINK_ID_SET))
;

        new_switches.synthesizer_set = convert_to_decimal(~(*SYNTH
ESIZER_SET));

        /*
        **      PROCESS THE DISPLAY PUSHBUTTONS
        */

        new_switches.display_pushbuttons =
```

CONTROLS.C

```
                (*NMS_ADDRESS_HIGH & REMOTE_DISPLAY) | ((ioport2 &
 ALARM_HISTORY)>>0X01) ;

        if((display_panel.button_mask = new_switches.display_pushb
uttons ^ old_switches.display_pushbuttons))
        {
                timers[DISPLAY_TRANSITION] = SECONDS_1;

                display_panel.state = LEDS_ON;
                display_panel.image_selected = new_switches.displa
y_pushbuttons;

                if((display_panel.button_mask & ALARM_HISTORY_DISP
LAY) && !(new_switches.display_pushbuttons & ALARM_HISTORY_DISPLAY
))
                {
                        if(new_switches.display_pushbuttons & REMO
TE_DISPLAY)clear_memory(&remote_capture,sizeof(struct data_base));
                        else clear_memory(&local_capture,sizeof(st
ruct data_base));
                }
                old_switches.display_pushbuttons = new_switches.di
splay_pushbuttons;
        }

        /*
        ** PROCESS LOOPBACK PUSHBUTTONS
        */
        new_switches.loopback_pushbuttons = *NMS_ADDRESS_HIGH & LO
OPBACK_BUTTONS;

        if(new_switches.loopback_pushbuttons != old_switches.loopb
ack_pushbuttons)
                loopback_front_panel();

        if(!timers[LOOPBACK_SWITCH_PRESSED_TIMER] && !loopback.inp
rogress)clear_memory(&loopback,sizeof(struct loopback_manager_str)
);

        new_switches.loopback_options = ~((ioport1 & 0x3c) >> 0x02
);


        /*
        ** PROCESS LINK ID THUMBWHEEL SWITCHES
        */

        if(((new_switches.link_id != old_switches.link_id) &&
                local.odu.plo_id != 0) || controls_power_up)
        {
                switch(local.odu.plo_id)
```

CONTROLS.C

```
{
case 1:
case 2:
case 5:
tx_frame_byte = (new_switches.link _id << 0x01) | 0x01;
*(TXO_CS + FRAME_BYTE_A) = tx_fram e_byte;
*(TXO_CS + FRAME_BYTE_B) = FRAME_B YTE_MSB;

rx_frame_byte = (new_switches.link _id << 0x01);
/*
*(RXI_CS + FRAME_BYTE_A) = rx_fram e_byte;    */
/***************testing ONLY*******************/
*(RXI_CS + FRAME_BYTE_A) = tx_fram e_byte;

*(RXI_CS + FRAME_BYTE_B) = FRAME_B YTE_MSB;

fpga_command_register[TXI] = ON;
if(fec_enabled == 0)
{
        fpga_command_register[TXO] = ENCB + ON;
        fpga_command_register[RXO] = DECB + ON;
        fpga_command_register[RXI] = ON;
}
else
{
        fpga_command_register[TXO] = ON;
        fpga_command_register[RXO] = ON;
        fpga_command_register[RXI] = CORE + ON;
}
*(TXI_CS + COMMAND_REGISTER) = fpg a_command_register[TXI];
*(TXO_CS + COMMAND_REGISTER) = fpg a_command_register[TXO];
*(RXO_CS + COMMAND_REGISTER) = fpg a_command_register[RXO];
```

CONTROLS.C

```
                                *(RXI_CS + COMMAND_REGISTER) = fpg
a_command_register[RXI];

                                *(TXI_CS + CLEAR_STATUS) = 0;
                                *(RXI_CS + CLEAR_STATUS) = 0;
                                *(TXO_CS + CLEAR_STATUS) = 0;
                                *(RXO_CS + CLEAR_STATUS) = 0;
                        break;

                        case 3:
                        case 4:
                        case 6:

                                tx_frame_byte = (new_switches.link
_id << 0x01);
                                *(TXO_CS + FRAME_BYTE_A) = tx_fram
e_byte;
                                *(TXO_CS + FRAME_BYTE_B) = 0XAA;

                           rx_frame_byte = (new_switches.link_id <
< 0x01) | 0x01;

/*                              *(RXI_CS + FRAME_BYTE_A) = rx_fram
e_byte;*/

/***************testing ONLY******************/
                                *(RXI_CS + FRAME_BYTE_A) = tx_fram
e_byte;

                                *(RXI_CS + FRAME_BYTE_B) = 0XAA;

                                fpga_command_register[TXI] = ON;

                                if(fec_enabled == 0)
                                {
                                        fpga_command_register[TXO]
 = ENCB + ON;
                                        fpga_command_register[RXO]
 = DECB + ON;
                                        fpga_command_register[RXI]
 = ON;

                                }
                                else
                                {
                                        fpga_command_register[TXO]
 = ON;
                                        fpga_command_register[RXO]
 = ON;
                                        fpga_command_register[RXI]
 = CORE + ON;
                                }
```

CONTROLS.C

```
                                *(TXI_CS + COMMAND_REGISTER) = fpg
a_command_register[TXI];
                                *(TXO_CS + COMMAND_REGISTER) = fpg
a_command_register[TXO];
                                *(RXO_CS + COMMAND_REGISTER) = fpg
a_command_register[RXO];
                                *(RXI_CS + COMMAND_REGISTER) = fpg
a_command_register[RXI];

                                *(TXI_CS + CLEAR_STATUS) = 0;
                                *(RXI_CS + CLEAR_STATUS) = 0;
                                *(TXO_CS + CLEAR_STATUS) = 0;
                                *(RXO_CS + CLEAR_STATUS) = 0;
                        break;

                }/*end switch odu.plo_id)*/

                old_switches.link_id = new_switches.link_id;

                timers[READ_SWITCHES] = EIGTH_SECOND;

        }/*end if(link_id switches)*/

        /*
        ** PROCESS SYNTHESIZER THUMBWHEEL SWITCHES
        */

        if((old_switches.synthesizer_set != new_switches.synthesiz
er_set))
        {
                if(controls_power_up)
                {
                        old_switches.synthesizer_set = new_switche
s.synthesizer_set;
                        odu_control.synthesizer_setting = new_swit
ches.synthesizer_set;
                }
                else alarms.synthesizer = TRUE;

        }

        /*
        ** PROCESS SYSTEM OPTION SWITCHES
        */
        if((old_switches.option_switches != new_switches.option_sw
itches))
        {
                old_switches.option_switches = new_switches.option
_switches;
                system_parameters();
```

CONTROLS.C

```
                fpga_command_register[TXO] &= ~(ENCB + ON); /*clea
r encb bit*/
                fpga_command_register[RXO] &= ~(DECB + ON);/*clear
 decb bit*/
                fpga_command_register[RXI] &= ~(CORE + ON); /*SAVE
 INJ0,INJ1, & CorE CLEARS INV BIT*/
                fpga_command_register[TXI] &= ~ON; /*SAVE INJ0,INJ
1, & CorE CLEARS INV BIT*/

                *(TXI_CS + COMMAND_REGISTER) = fpga_command_regist
er[TXI];
                *(TXO_CS + COMMAND_REGISTER) = fpga_command_regist
er[TXO];
                *(RXO_CS + COMMAND_REGISTER) = fpga_command_regist
er[RXO];
                *(RXI_CS + COMMAND_REGISTER) = fpga_command_regist
er[RXI];

                if(new_switches.option_switches & FEC_DISABLED)
                {
                        fpga_command_register[TXO] |= ENCB + ON;
                        fpga_command_register[RXO] |= DECB + ON;
                        fpga_command_register[RXI] |= ON;
                        fpga_command_register[TXI] |= ON;
                }
                else
                {
                        fpga_command_register[TXO] |= ON;
                        fpga_command_register[RXO] |= ON;
                        fpga_command_register[RXI] |= CORE + ON;
                        fpga_command_register[TXI] |= ON;
                }

                *(TXI_CS + COMMAND_REGISTER) = fpga_command_regist
er[TXI];
                *(TXO_CS + COMMAND_REGISTER) = fpga_command_regist
er[TXO];
                *(RXO_CS + COMMAND_REGISTER) = fpga_command_regist
er[RXO];
                *(RXI_CS + COMMAND_REGISTER) = fpga_command_regist
er[RXI];
        }

        controls_power_up = FALSE;
}


/*
**      FUNCTION: convert_to_decimal
**                                      Takes a the switches that
```

```
are read in as hexadecimal and converts them to a
**                                          decimal value. Example if
the link id switches are set to 66
**                                          the software would treat t
his as 66 hex this routine will take
**                                          the value and convert it t
o 41 hexadecimal which is actual 66 decimal
**
**              Input Definitions:
**                                          value_read = character val
ue to be converted to a decimal equivalent
**              Returned Values:
**                                          new_value = The decimal va
lue of the value read
*/
uchar convert_to_decimal(uchar value_read)
{
        uchar new_value;

        new_value = ((value_read >> 0x04) & 0x0f) * 10;

        new_value += (value_read & 0x0f);

        return(new_value);

}


/*
** FUNCTION: loopback_front_panel
**                                                  The loopback butto
ns have been detected to have transition. This
**                                                  routine determines
 which buttons has changed and wether it is being
**                                                  depressed or relea
sed. If it is being depressed the channel number
**                                                  or test selection
or on/off is updated.
**
** Input Definitions:

**                                                          No paramet
ers required

**   Returned Values:
**                                          No values returned
**
*/

void loopback_front_panel()
{
```

```
        switch(new switches.loopback_pushbuttons ^ old_switches.lo
opback_pushbuttons)
        {

                case LOOPBACK_CHANNEL_BUTTON:
                        if((!loopback.inprogress) && (new_switches
.loopback_pushbuttons & LOOPBACK_CHANNEL_BUTTON))
                        {
                                if(loopback.channel >=  system.num
ber_of_channels)loopback.channel = 0;
                                else ++loopback.channel;
                        }

                break;

                case LOOPBACK_TEST_BUTTON:
                        if((!loopback.inprogress) && (new_switches
.loopback_pushbuttons & LOOPBACK_TEST_BUTTON))
                        {
                                if(loopback.test_desired >= MAX_LP
BK_TEST_BUTTON)loopback.test_desired = 0;
                                else ++loopback.test_desired;
                        }

                break;

                case LOOPBACK_ON_OFF_BUTTON:
                        if((new_switches.loopback_pushbuttons & LO
OPBACK_ON_OFF_BUTTON))
                        {
                                if(!(new_switches.loopback_options
 & LOOPBACK_ENABLED))
                                {
                                        clear_memory(&loopback,siz
eof(struct loopback manager_str));
                                        loopback.test_desired = LO
OPBACK_NOT_ALLOWED;

                                }/*end if(!new_switches.loopback_o
ptions & LOOPBACK_ENABLED)*/

                                else if(loopback.inprogress)
                                {
                                        engage_loopback(OFF);

                                }/*END ELSE IF(LOOPBACK.INPROGRESS
)*/

                                else
                                {
```

```
                                        if((loopback.channel && lo
opback.test_desired) &&
                                             ((loopback.channel
 != ILLEGAL_CH) && (loopback.test_desired != ILLEGAL_TEST)))
                                        {
                                             loopback.inprogres
s = TRUE;
                                             engage_loopback(lo
opback.test_desired);

                                        }/*end if(loopback.channel
 && ..) */

                                        else if(!loopback.channel
&& !loopback.test_desired)
                                        {
                                             loopback.test_desi
red = ILLEGAL TEST;
                                             loopback.channel =
 ILLEGAL_CH;
                                        }

                                        else if(!loopback.channel)
loopback.channel = ILLEGAL_CH;

                                        else loopback.test_desired
 = ILLEGAL_TEST;

                                   }/*end else*/
                         }

               break;

        }/*END SWITCH(NEW.LOOPBACK_PUSHBUTTONS)*/

        status_display(&local,&local_display);

        old_switches.loopback_pushbuttons = new_switches.loopback_
pushbuttons;
        timers[LOOPBACK_SWITCH_PRESSED_TIMER] = SECONDS_5;

}/*END OF LOOPBACK_FRONT_PANEL*/


void afc_compensation()
{
        if(!afc_enabled)odu_control.afc_compensation = FALSE;

        else if((local.idu.alarm0 & AFC_ON) && !timers[AFC_COMPENS
ATION_TIME])
```

CONTROLS.C

```
        {
                if(local.idu.alarm0 & AFC)odu_control.afc_compensa
tion = UP;
                else odu_control.afc_compensation = DOWN;
                timers[AFC_COMPENSATION_TIME] = SECONDS_20;
        }
}
```

DISPLAYS.C

```
#include <10893map.h>
#include <10893def.h>
#include <10893str.h>
#include <80c196.h>

void display_drivers();
void led_display();
void relay_display();
void status_display();
void calculate_far_end_led();
void loopback_status_display();

void display_drivers()
{

        if(!timers[DISPLAY_TIMER])led_display();

        relay_display();

}



/*
** FUNCTION: led_display
**                                  this routine compiles the LED im
age for local,remote,local_capture,and
**                                        remote_capture each time i
t is invoked. At the end of the routine the
**                                decision is made which image to di
splay. The decision is based on the
**                                        far end and alarm history
push buttons. This routine is also responsible for
**                                        displaying the AGC voltage
 via PWM 1
**
** Input Definitions:

**                                                        No paramet
ers required

**   Returned Values:
**                                        No values returned
**
*/

void led_display()
{
        uchar image,image1,image2;

        struct display_str *led;
```

DISPLAYS.C

```
struct data_base        *image_pointer;

status_display(&local,&local_display);

status_display(&remote,&remote_display);

status_display(&local_capture,&local_capture_display);

status_display(&remote_capture,&remote_capture_display);

calculate_far_end_led();

loopback_status_display();

switch(display_panel.state)
{
        case LEDS_ON:
                image = LAMP_TEST;
                image1 = BILEDS_ON;
                image2 = LPBK_GREEN;

                dog_food = ~dog_food;
                if(dog_food)image2 |= BONE;
                else image2 &= ~BONE;

                *STATUS_LEDS = ~(image);
                *LOOP_BACK_LEDS = ~(image2);
                *TRIBUTARY_LEDS = (image1);

                if(!timers[DISPLAY_TRANSITION])
                {
                        timers[DISPLAY_TRANSITION] = SECON
DS_1;
                        ++display_panel.state;
                }

        break;

        case LEDS_OFF:

                image = ~LAMP_TEST;
                image1 = 0X00;
                image2 = LPBK_OFF;

                dog_food = ~dog_food;
                if(dog_food)image2 |= BONE;
                else image2 &= ~BONE;

                *STATUS_LEDS = ~(image);
                *LOOP_BACK_LEDS = ~(image2);
```

DISPLAYS.C

```
                    *TRIBUTARY_LEDS = (image1);

                    if(!timers[DISPLAY_TRANSITION])
                    {
                            timers[DISPLAY_TRANSITION] = SECON
DS_1;
                            ++display_panel.state;
                    }

            break;

            case DISPLAY_LEDS:

                    switch(display_panel.image_selected)
                    {
                            case    LOCAL_DISPLAY:

                                    led = &local_display;
                                    image_pointer = &local;

                            break;

                            case LOCAL_HISTORY:

                                    led = &local_capture_displ
ay;
                                    image_pointer = &local_cap
ture;

                            break;

                            case REMOTE_DISPLAY:

                                    led = &remote_display;
                                    image_pointer = &remote;

                            break;

                            case REMOTE_HISTORY:

                                    led = &remote_capture_disp
lay;
                                    image_pointer = &remote_ca
pture;

                            break;

                            default:

                                    led = &local_display;
                                    image_pointer = &local;
```

DISPLAYS.C

```
                                break;
                        }
                        led->loopback_leds &= ~BONE;/*clear the wa
tchdog bit first*/
                        dog_food = ~dog_food;
                        if(dog_food)led->loopback_leds |= BONE;
                        else led->loopback_leds &= ~BONE;
                        if(blink_flag)
                        {
                                *STATUS_LEDS = ~(led->status_leds
^ led->status_attribute);
                                *LOOP_BACK_LEDS = ~(led->loopback_
leds ^ led->loopback_attribute);
                                *TRIBUTARY_LEDS = (led->tributary_
leds ^ led->tributary_attribute);
                        }
                        else
                        {
                                *STATUS_LEDS = ~(led->status_leds)
;
                                *LOOP_BACK_LEDS = ~(led->loopback_
leds);
                                *TRIBUTARY_LEDS = (led->tributary_
leds);
                        }
                        pwm_control = image_pointer->odu.agc_level
;
                break;
        }/*end switch(display.state);*/
        timers[DISPLAY_TIMER] = FOURTH_SECOND;
}

/*
** FUNCTION: status_display
**                                      Computes the front panel s
tatus display LEDs IDU,ODU,CABLE,BER,
**                                      MUTE,REMOTE SITE,TEST SET
ENABLE, AND INVALID SYNTH SETTING based
**                                      on the algorithms specifie
```

DISPLAYS.C

```
d in document ?????
**
** Input Definitions:

**                                                              info - poi
nter to the data_base being used to compute LEDS
**                                                              display -
which display is being computed ie local,remote..

**   Returned Values:
**                                              No values returned
**
*/

void status_display(info,display)
struct data_base *info;
struct display_str *display;
{
        uchar value;

        display->status_leds = 0;
        display->status_attribute = 0;


        display->tributary_leds = 0x00;
        display->tributary_attribute = 0x00;

        /* IDU summary alarm*/

        if((info->idu.alarm0 & MOD_AV) || (info->idu.alarm1 & IDU_
TX2) ||
                ((info->idu.alarm0 & TXCLK_AV) && !(info->idu.alar
m2 & system.channel masks)))
                display->status_leds |= IDU_LED;

        else if(!(info->odu.alarm0 & IF_AGC) && !(info->idu.alarm4
 & CABLE_ALARMS)
                && ( (info->idu.alarm0 & IDU_RX1) || (info->idu.al
arm1 & IDU_RX2) ||
                (info->idu.alarm2 & IDU_RX3) || (info->idu.alarm4
& IDU_RX4) ) )

                display->status_leds |= IDU_LED;

        else if((info->idu.loopback_command & LOOPBACK_INPROGRESS)
 ||
                        (info->idu.alarm5 & RADIO_CONFIGURATION_CH
ANGE))
        {
                display->status_leds |= IDU_LED;
                display->status_attribute |= IDU_LED;
```

```
        }

        /* ODU summary alarm*/

        if((info->odu.alarm0 & ODU_RX1) || (info->odu.alarm1 & ODU
_RX2) ||
                ((info->odu.alarm0 & TX_LEVEL) && !((info->idu.ala
rm0 & MOD_LEVEL) ||
                (info->idu.alarm1 & MOD_ALARM))))

                display->status_leds |= ODU_LED;

        else if(info->idu.alarm3 & TELEMETRY_ERROR) /*THIS IS THE
BLINK STATE OF THE LED*/
        {
                display->status_leds |= ODU_LED;
                display->status_attribute |= ODU_LED;
        }

        /*CABLE ALARM LED*/

        if(info->idu.alarm4 & CABLE_ALARMS)
                display->status_leds |= CABLE_LED;

        /*BER LED*/

        if((info->idu.alarm4 & BER_HI) || (info->idu.alarm4 & LOFA
))

                display->status_leds |= BER_LED;

        else if(info->idu.alarm4 & BER_LO)
        {
                display->status_leds |= BER_LED;
                display->status_attribute |= BER_LED;
        }

        /*TRANSMIT MUTE ACTIVE LED*/

        if(info->odu.alarm2 & TX_MUTE_ACTIVE)
                display->status_leds |= MUTE_LED;

        /*EXTERNAL TEST SET ENABLED LED*/

        if(!(new_switches.loopback_options & NO_EXTERNAL_TEST_SET)
 && !loopback.internal_test_pattern)
                display->status_leds |= TEST_SET_LED;

        /*INVALID SYNTHESIZER SETTING SWITCH*/

        if(info->idu.alarm3 & INVALID_SYNTHESIZER)
                display->status_leds |= SYNTHESIZER_LED;
```

```
/* TRIBUTARY INPUT ALARM LEDs*/

value = info->idu.alarm2 ^ info->idu.input_alarms_enable;

/*Channel 1*/
if(!(value & 0x01))
{
        if(info->idu.alarm2 & 0x01)display->tributary_leds
|= CH1_YELLOW;
        else
        {
                display->tributary_leds |= CH1_YELLOW;
                display->tributary_attribute |= CH1_YELLOW
;
        }
}
/*Channel 2*/
if(!(value & 0x02))
{
        if(info->idu.alarm2 & 0x02)display->tributary_leds
|= CH2_YELLOW;
        else
        {
                display->tributary_leds |= CH2_YELLOW;
                display->tributary_attribute |= CH2_YELLOW
;
        }
}

/*Channel 3*/
if(!(value & 0x04))
{
        if(info->idu.alarm2 & 0x04)display->tributary_leds
|= CH3_YELLOW;
        else
        {
                display->tributary_leds |= CH3_YELLOW;
                display->tributary_attribute |= CH3_YELLOW
;
        }
}
/*Channel 4*/
if(!(value & 0x08))
{
        if(info->idu.alarm2 & 0x08)display->tributary_leds
|= CH4_YELLOW;
        else
        {
                display->tributary_leds |= CH4_YELLOW;
                display->tributary_attribute |= CH4_YELLOW
```

DISPLAYS.C

```
;
                        }
        }
}

void calculate_far_end_led()
{
        if((remote_display.status leds) & 0x9f)
                local_display.status_leds |= REMOTE_LED;

        if(local.idu.alarm3 & PRIVATE_ERROR)
        {
                local_display.status_leds |= REMOTE_LED;
                local_display.status_attribute |= REMOTE_LED;
        }

        if((remote_capture_display.status_leds) & 0x9f)
                local_capture_display.status_leds |= REMOTE_LED;

        if(local_capture.idu.alarm3 & PRIVATE_ERROR)
        {
                local_capture_display.status_leds |= REMOTE_LED;
                local_capture_display.status_attribute |= REMOTE_L
ED;
        }

        if((local_display.status leds) & 0x9f)
                remote_display.status_leds |= REMOTE_LED;

        if(remote.idu.alarm3 & PRIVATE_ERROR)
        {
                remote_display.status_leds |= REMOTE_LED;
                remote_display.status_attribute |= REMOTE_LED;
        }

        if((local_capture_display.status_leds) & 0x9f)
                remote_capture_display.status_leds |= REMOTE_LED;

        if(remote_capture.idu.alarm3 & PRIVATE_ERROR)
        {
                remote_capture_display.status_leds |= REMOTE_LED;
                remote_capture_display.status_attribute |= REMOTE_
LED;
        }

}

void loopback_status_display()
{
```

DISPLAYS.C

```
	local_display.loopback_leds = OFF;
	local_display.loopback_attribute = OFF;

	if(loopback.inprogress)
	{
		switch(loopback.channel)
		{
			case CHANNEL_1:
				local_display.tributary_leds &= ~(
CH1_YELLOW + CH1_GREEN);
				local_display.tributary_attribute
&= ~(CH1_YELLOW + CH1_GREEN);
				local_display.tributary_leds |= CH
1_GREEN;
			break;

			case CHANNEL_2:
				local_display.tributary_leds &= ~(
CH2_YELLOW + CH2_GREEN);
				local_display.tributary_attribute
&= ~(CH2_YELLOW + CH2_GREEN);
				local_display.tributary_leds |= CH
2_GREEN;
			break;

			case CHANNEL_3:
				local_display.tributary_leds &= ~(
CH3_YELLOW + CH3_GREEN);
				local_display.tributary_attribute
&= ~(CH3_YELLOW + CH3_GREEN);
				local_display.tributary_leds |= CH
3_GREEN;
			break;

			case CHANNEL_4:
				local_display.tributary_leds &= ~(
CH4_YELLOW + CH4_GREEN);
				local_display.tributary_attribute
&= ~(CH4_YELLOW + CH4_GREEN);
				local_display.tributary_leds |= CH
4_GREEN;
			break;

		}/* END switch(loopback.channel)*/

		switch(loopback.test_selected)
		{
			case LINK_LOOP:
				if(loopback.internal_test_pattern)
				{
					if(!loopback.test_results)
```

DISPLAYS.C

```
                                        {
                                                local_display.loop
back_leds = LINK_GREEN; /*solid green odu lamp*/
                                                local_display.loop
back_attribute = 0;
                                        }
                                        else
                                        {
                                                local_display.loop
back_leds = LINK_RED;   /*solid red odu lamp*/
                                                local_display.loop
back_attribute = 0x00;
                                        }

                                }/*end if(loopback.internal_test_p
attern)*/

                                else local_display.loopback_leds =
 LINK_GREEN;

                        break;/*end case LINK_LOOP*/

                        case    IDU_LOOP:

                                if(loopback.internal_test_pattern)
                                {
                                        if(!loopback.test_results)
                                        {
                                                local_display.loop
back_leds = IDU_GREEN;  /*solid green odu lamp*/
                                                local_display.loop
back_attribute = 0;
                                        }
                                        else
                                        {
                                                local_display.loop
back_leds = IDU_RED;    /*solid red odu lamp*/
                                                local_display.loop
back_attribute = 0x00;
                                        }

                                }/*end if(loopback.internal_test_p
attern)*/

                                else local_display.loopback_leds =
 IDU_GREEN;

                        break;

                        case    ODU_LOOP:
```

DISPLAYS.C

```
                        if(loopback.internal_test_pattern)
                        {
                                if(!loopback.test_results)
                                {
                                        local_display.loop
back_leds = ODU_GREEN;  /*solid green odu lamp*/
                                        local_display.loop
back_attribute = 0;
                                }
                                else
                                {
                                        local_display.loop
back_leds = ODU_RED;    /*solid red odu lamp*/
                                        local_display.loop
back_attribute = 0x00;
                                }

                        }/*end if(loopback.internal_test_p
attern)*/

                        else local_display.loopback_leds =
 ODU_GREEN;

                break;

                case    HLOOP:
                case    RLOOP:
                case    ILOOP:
                case    DIGITAL_LOOP:

                        if(loopback.internal_test_pattern)
                        {
                                if(!loopback.test_results)
                                {
                                        local_display.loop
back_leds = ODU_GREEN + IDU_GREEN + LINK_GREEN; /*solid green odu
lamp*/
                                        local_display.loop
back_attribute = 0;
                                }
                                else
                                {
                                        local_display.loop
back_leds = ODU_RED + IDU_RED + LINK_RED;       /*solid red odu la
mp*/
                                        local_display.loop
back_attribute = 0x00;
                                }

                        }/*end if(loopback.internal_test_p
attern)*/
```

DISPLAYS.C

```
                                        else local_display.loopback_leds =
 ODU_GREEN + IDU_GREEN + LINK_GREEN;

                              break;

                              case    REMOTE_LINK_LOOP:

                                        local_display.loopback_leds = LINK
_RED;    /*FLASH THE LINK lamp*/
                                        local_display.loopback_attribute =
 LINK_RED;

                              break;

                    }/*end switch(test_selected)*/

          }/*end if(loopback.inprogress)*/

          else
          {
                    if(loopback.test_desired)
                    {
                              switch(loopback.test_desired)
                              {
                                        case LINK_LOOP:
                                                  local_display.loopback_led
s = LINK_GREEN;

                                                  local_display.loopback_att
ribute = LINK_GREEN;

                                        break;

                                        case IDU_LOOP:
                                                  local_display.loopback_led
s = IDU_GREEN;

                                                  local_display.loopback_att
ribute = IDU_GREEN;

                                        break;

                                        case ODU_LOOP:
                                                  local_display.loopback_led
s = ODU_GREEN;

                                                  local_display.loopback_att
ribute = ODU_GREEN;

                                        break;

                                        case ILLEGAL_TEST:
```

DISPLAYS.C

```
                                                local_display.loopback_led
s = LINK_GREEN + IDU_GREEN + ODU_GREEN;
                                                local_display.loopback_att
ribute = LINK_GREEN + IDU_GREEN + ODU_GREEN;

                                        break;

                                        case LOOPBACK_NOT_ALLOWED:
                                                local_display.loopback_led
s = LINK_RED + IDU_RED + ODU_RED;
                                                local_display.loopback_att
ribute = LINK_RED + IDU_RED + ODU_RED;

                                        break;

                                }/*end switch(loopback.test_desired)*/
                        }/*end if(loopback.test_desired)*/

                        if(loopback.channel)
                        {
                                switch(loopback.channel)
                                {
                                        case CHANNEL_1:
                                                local_display.tributary_le
ds &= ~(CH1_YELLOW + CH1_GREEN);
                                                local_display.tributary_at
tribute &= ~(CH1_YELLOW + CH1_GREEN);
                                                local_display.tributary_le
ds |= CH1_GREEN;
                                                local_display.tributary_at
tribute |= CH1_GREEN;
                                        break;

                                        case CHANNEL_2:
                                                local_display.tributary_le
ds &= ~(CH2_YELLOW + CH2_GREEN);
                                                local_display.tributary_at
tribute &= ~(CH2_YELLOW + CH2_GREEN);
                                                local_display.tributary_le
ds |= CH2_GREEN;
                                                local_display.tributary_at
tribute |= CH2_GREEN;
                                        break;

                                        case CHANNEL_3:
                                                local_display.tributary_le
ds &= ~(CH3_YELLOW + CH3_GREEN);
                                                local_display.tributary_at
tribute &= ~(CH3_YELLOW + CH3_GREEN);
                                                local_display.tributary_le
ds |= CH3_GREEN;
```

DISPLAYS.C

```
                                        local_display.tributary_at
tribute |= CH3 GREEN;
                                break;

                                case CHANNEL_4:
                                        local_display.tributary_le
ds &= ~(CH4_YELLOW + CH4_GREEN);
                                        local_display.tributary_at
tribute &= ~(CH4 YELLOW + CH4_GREEN);
                                        local_display.tributary_le
ds |= CH4_GREEN;
                                        local_display.tributary_at
tribute |= CH4 GREEN;
                                break;

                                case ILLEGAL_CH:
                                        local_display.tributary_le
ds = CH1_GREEN + CH2_GREEN + CH3_GREEN + CH4_GREEN;
                                        local_display.tributary_at
tribute = CH1 GREEN + CH2 GREEN + CH3 GREEN + CH4_GREEN;
                                break;

                        }/* END switch(loopback.channel)*/

                }/*end if(loopback.channel)*/

        }/*end else*/

}


void relay_display()
{

}
```

IDU2IDU.C

```
#include "80c196.h"
#include "10893def.h"
#include "10893str.h"
#include "10893map.h"


extern void clear_memory(), pet_dog();
extern unsigned char build_packet();
extern void copy_memory();
extern void alarm_capture();
extern unsigned char engage_loopback();

void idu2idu_handler();
void initialize_idu2idu();
void idu2idu_receive();
void idu2idu_transmit();

/*
** FUNCTION: idu2idu handler is responsible for determining if it
is time
**                                   to start transmitting another pack
et. It is also responsible for
**                                   checking to see if a valid packet
has been recieved and parsing the message
**
**

** Input Definitions:

**                                                        No paramet
ers required

**   Returned Values:
**                                           No values returned
**
*/
void idu2idu_handler()
{
        unsigned char result;
        idu2idu_receive();

        if(!tx[IDU2IDU_LINK].busy)
        {
                if(!timers[IDU2IDU_A2D_PACKET])
                {
                        result = build_packet(&a2d_local,sizeof(st
ruct terminal_a2d),A2D_IMAGE,IDU2IDU_LINK);

                        if(result)timers[IDU2IDU_A2D_PACKET] = SEC
ONDS_2;
                }
```

IDU2IDU.C

```
                else
                {
                        result = build_packet(&local,sizeof(struct
 data_base),ALARM_IMAGE,IDU2IDU_LINK);
                        if(local.idu.loopback_command & FAR_END_LO
OPBACK_OFF)local.idu.loopback_command = FALSE;

                }
        }

        idu2idu_transmit();
}


/*
** FUNCTION: idu2idu_receive
**                      parse the received packet and reacts accor
dingly
**

** Input Definitions:

**                                                        No paramet
ers required

**   Returned Values:
**                                              No values returned
**
*/

void idu2idu_receive()
{
        unsigned char result;
        unsigned char rcvd_opcode;
        unsigned char   *source_pointer;
        struct channel *port_pointer;

        port_pointer = &rx[IDU2IDU_LINK];       /*manage the rcv b
uffers*/
        if(port_pointer->buffer[port_pointer->get].flag == READY)
        {

                source_pointer = &(port_pointer->buffer[port_point
er->get].storage[0]);   /*point of begining of recieved packet*/

                rcvd_opcode = *source_pointer++;

                switch(rcvd_opcode)
                {
                        case ALARM_IMAGE:
```

IDU2IDU.C

```
                        result = TRUE;
                        ++source_pointer;
                /*get past the length byte*/
                        copy_memory(source_pointer,&remote
,sizeof(struct data_base));

                        alarm_capture(&remote,&remote_capt
ure);

                        /*
                        ** The following code looks into t
he remote image and determines
                        ** if the far end is requesting lo
opback or not
                        */

                        if(remote.idu.loopback_command & F
AR_END_LOOPBACK_REQUEST)
                        {
                                engage_loopback(REMOTE_LIN
K_LOOP);
                        }
                        else if(remote.idu.loopback_comman
d & FAR_END_LOOPBACK_OFF)
                        {
                                engage_loopback(LOOPBACK_O
FF);
                        }

                break;

                case A2D_IMAGE:

                        result = TRUE;
                        ++source_pointer;
                /*get past the length byte*/
                        copy_memory(source_pointer,&a2d_re
mote,sizeof(struct terminal_a2d));

                break;

                case CONFIGURATION_IMAGE:

                        result = TRUE;
                        ++source_pointer;
                /*get past the length byte*/
                        copy_memory(source_pointer,&remote
_revs,sizeof(struct terminal_revisions));

                break;
```

```
                    default:
                            result = TRUE; /* FOR NOW IF WE DO
N'T RECEIVE A VALID OPCODE RETURN THE BUFFER AND MOVE ON*/
                    break;

            }/*end switch(opcode)*/

            if(result)
            {           /* IF BLD PACKET WAS SUCCESSFUL FREE BUFF
ER IF NOT LEAVE BUFFER TAGGED FOR PROCESSING*/
                    port_pointer->buffer[port_pointer->get].fl
ag = IDLE;
                    ++port pointer->get;
                    if(port_pointer->get == MAX_BUFFER)port_po
inter->get = 0; /*buffer pool has wrapped around reset get pointer
*/

            }/*end if(result)*/

            timers[PRIVATE LINK_RECEIVE] = SECONDS_5;

            alarms.serial_telemetry_errors &= ~(PRIVATE_ERROR)
;

        }/*end if(port_pointer == READY)*/

        else if(!timers[PRIVATE_LINK_RECEIVE])
        {
            if(local.idu.loopback_command & REMOTE_LOOPBACK_IN
PROGRESS)
            {
                    engage_loopback(LOOPBACK_OFF);
            }

            clear_memory(&remote,sizeof(struct data_base));

            clear_memory(&a2d_remote,sizeof(struct terminal_a2
d));
            clear_memory(&rx[IDU2IDU_LINK],sizeof(struct chann
el));

            timers[PRIVATE_LINK_RECEIVE] = SECONDS_5;

            alarms.serial_telemetry_errors |= PRIVATE_ERROR;

            ++serial_port_stats[IDU2IDU_LINK].timeouts;

        }/* end else of recieve packet time out need 1 good packet
 in 2 seconds*/

}
```

IDU2IDU.C

```
/*
** FUNCTION: idu2idu transmit
**                                          if there is something qued
 up ship it out if not go on
**

** Input Definitions:

**                                                            No paramet
ers required

**   Returned Values:
**                                          No values returned
**
*/

void idu2idu_transmit()
{

        unsigned char result;
        unsigned char rcvd_opcode;
        unsigned char   *src_ptr;
        struct channel *com_ptr;

        /*
        ** check if a transmission is already in progress if so no
 action if
        ** not check to see if there is a packet in the transmit q
ue to transmitt.
        ** this is done by interogating the get buffer in the tx s
tructure.
        */

        com_ptr = &tx[IDU2IDU_LINK];                /*manage the xmite
r first*/


        if(!com_ptr->busy)
        {
                if(com_ptr->buffer[com_ptr->get].flag == READY)
                {
                        com_ptr->packet_len = com_ptr->buffer[com_
ptr->get].len;
                        com_ptr->char_pointer = &(com_ptr->buffer[
com_ptr->get].storage[0]);

                        --com_ptr->packet_len;
                        com_ptr->busy = TRUE;
```

```
                         *(IDU2IDU_UART + THR) = *(com_ptr->char_po
inter++);
                         *(IDU2IDU_UART + IMR)  = 0x05;  /* set Tx
AND Rx mask */
                }/*end if(flag == READY)*/
        }/*end if(!com_ptr->busy)*/
}/*close function*/

/*
** FUNCTION:
**       initialize_idu2idu assures that all structures used by ma
int_io.c
**                                at a known starting state of 0
**
** Input Definitions:
**                                                        No paramet
ers required
**    Returned Values:
**                                        No values returned
**
*/
void initialize_idu2idu()
{
        clear_memory(&tx[IDU2IDU_LINK],(uint)sizeof(struct channel
));
        clear_memory(&rx[IDU2IDU_LINK],(uint)sizeof(struct channel
));
}
```

INIT_SYS.C

```
#pragma model(kb)

#include <10893map.h>
#include <10893def.h>
#include <10893str.h>
#include <80c196.h>
#include "systems.h"


void initialize_system();
void read_revisions();
void system_parameters();

void configure_2691s();

extern unsigned char e2_read();
extern void kick_the_dog();
extern void clear_memory();
extern void read_switches();
extern void     initialize_digital(),validate_digital_section();
extern void     initialize_ber_calculator();


void initialize_system()
{

        uchar x;

        kick_the_dog(TRUE);

        hsi_mode = 0xaa;                                              /*
 negative transition detection on all hsi inputs*/

        ioc0 = 0x00;                                                  /*
 disable all hsi inputs */

        ioc1 = 0x21;                                                  /*
 configure use of pwm, exteanl interrupt pin, TXD pin

                ** disable everything else

                */
        ioc2 = 0x00;

        sp_con = 0x09;                                                /*
 on board serial port mode 01, with reciever enabled*/

        /*
        ** The baud rate register value for the 80c196 is calculat
ed as follows
```

INIT_SYS.C

```
        **  baud register value = (((crystal/(16 * baud_rate))-1)
| 0x8000 (results
        ** in 16 bit word) the baud rate register is programmed in
 two sequential writes to the same
        ** register. The sequence is lsb firt then msb.
        */
        baud_rate = INTEL_1200_BAUD_LO;
        baud_rate = INTEL_1200_BAUD_HI;

        port1_image = 0xbf;
        ioport1 = port1_image;

        blink_flag = 0; /*set blink off state*/

        clear_memory(&alarms,sizeof(struct internal_alarms));
        clear_memory(&digital_alarm,sizeof(struct dig_str));

        clear_memory(&display_panel,sizeof(struct display_str));

        clear_memory(&a2d,sizeof(struct a2d_manager));

        clear_memory(&loopback,sizeof(struct loopback_manager_str)
);

        clear_memory(&old_switches,sizeof(struct switches_str));
        clear_memory(&new_switches,sizeof(struct switches_str));
        old_switches.synthesizer_set = 0xff;

        clear_memory(&local_display,sizeof(struct display_str));
        clear_memory(&remote_display,sizeof(struct display_str));
        clear_memory(&local_capture_display,sizeof(struct display_
str));
        clear_memory(&remote_capture_display,sizeof(struct display
_str));

        clear_memory(&local_revs,sizeof(struct terminal_revisions)
);

        clear_memory(&local_capture,sizeof(struct data_base));

        clear_memory(&remote_capture,sizeof(struct data_base));

        clear_memory(&local,sizeof(struct data_base));

        clear_memory(&remote,sizeof(struct data_base));


        clear_memory(&a2d_local,sizeof(struct terminal_a2d));

        clear_memory(&a2d_remote,sizeof(struct terminal_a2d));
```

INIT_SYS.C

```
        for(x = 0; x < MAX_PORTS; x++)
        {
                clear_memory(&tx[x],sizeof(struct channel));

                clear memory(&rx[x],sizeof(struct channel));

                clear memory(&serial port_stats[x],sizeof(struct l
ink_stats));
        }

        for(x = 0; x < MAX_NUMBER_OF_TIMERS; x++)
        {
                timers[x] = 0;
        }

        clear_memory(&odu_control,sizeof(struct odu_ctrl_str));

        timers[IDU2IDU A2D_PACKET] = SECONDS_2; /*WANT ALARM IMAGE
 SENT SO STUFF TIMER*/
        timers[TELEMETRY LINK_RECEIVE] = SECONDS_5;
        timers[PRIVATE LINK_RECEIVE] = SECONDS_5;
        timers[AFC COMPENSATION TIME] = SECONDS_30;/*don't allow a
ny AFC operations for 30 seconds*/
        timers[BER_HOLD_OFF] = SECONDS_30;/*don't allow BER calcul
ations for 30 seconds*/
        timers[DISPLAY TRANSITION] = SECONDS_1;

        spm_controls = 0x00;    /* default all control lines ot of
f state*/
        *SPM_CONTROLS = spm_controls ^ SPM_CONTROL_MASK;

        *RELAYS = 0;

        configure 2691s(IDU2IDU_UART);
        configure_2691s(NMS1_UART);
        configure 2691s(NMS2_UART);
        configure 2691s(MAINTENANCE_UART);
        configure 2691s(PROTECTION_UART);

        int_mask = 0xe2;                /*enable ext int,serial in
t,soft timers, and a2d int*/

        asm ei;

        /*
        ** Now that all the registers are configured and memory ha
s been cleared and timer
        **      initialized its time to run some house keeping rou
tines to set up before taking off
        ** and running. We need to read switches validate and init
ialize the digital section
```

```
        ** and determine what type of radio we are (1x2,2x2,4x2) t
hen start the timer running
        ** and away we go
        */

        /*************** testing purposes only set plo_id = 1*****
*********************/
        local.odu.plo_id = 1;

        fec_enabled = 0;

        afc_enabled = TRUE;

        controls.power_up = TRUE;           /*forces switches to be u
sed on power up*/
        read_switches();                                   /*read all
 switches before leaving*/

        validate_digital_section();

        initialize_digital();

        read_revisions();

        system_parameters();

        initialize_ber_calculator();

        hso_command = START_SW_TIMER1;
        hso_time = timer1 + FIVE_MILLI_SECOND_TICK ;

}


void read_revisions()
{
        unsigned char result1;

        result1 = e2_read(&local_revs.acm_revs,REVISION_DATA,sizeo
f(struct revision_str),PAGE_2,ACM_DEVICE);

        result1 = e2_read(&local_revs.spm_revs,REVISION_DATA,sizeo
f(struct revision_str),PAGE_2,SPM_DEVICE);

        local_revs.actel_txi_revision = (*(TXI_CS + VERSION) & 0x0
f);
        local_revs.actel_txo_revision = (*(TXO_CS + VERSION) & 0x0
f);
        local_revs.actel_rxi_revision = (*(RXI_CS + VERSION) & 0x0
f);
        local_revs.actel_rxo_revision = (*(RXO_CS + VERSION) & 0x0
```

```
f);

        result1 = e2_read(&local_revs.rf_revs,RFM_REV_DATA,sizeof(
struct revision_str),PAGE_2,SPM_DEVICE);


        result1 = e2_read(&local_revs.psm_revs,PSM_REV_DATA,sizeof
(struct revision_str),PAGE_2,SPM_DEVICE);

        result1 = e2_read(&local_revs.idu_revs,IDU_REV_DATA,sizeof
(struct revision_str),PAGE_2,SPM_DEVICE);

        local_revs.acm_software_revision = REV;

        local_revs.ocm_software_revision = local.odu.sw_rev;
}


void configure_2691s(pointer)
unsigned char *pointer;
{
        *(pointer + CR) = 0x20;          /* reset Rx/Tx and error s
tatus */
        *(pointer + CR) = 0x30;
        *(pointer + CR) = 0x40;
        *(pointer + CR) = 0x10;          /* point to MR1 */

        *(pointer + IMR)  = 0x00;        /* mask out all interrupts
 */
        *(pointer + MR1)  = 0x13;        /* no parity, 8bits */
        *(pointer + MR2)  = 0x08;        /* normal mode, 1.5 stop b
it */
        *(pointer + SR)   = BAUD_1200;
        *(pointer + ACR)  = 0x0B;        /* ext clk */
        *(pointer + CTU) = 0x00;                 /* counter timer v
alue */
        *(pointer + CTL) = 0X00;
        *(pointer + CR)   = 0x05;        /* enable tx/rx */
        *(pointer + IMR)  = 0x04;        /* set rx mask */

}


void systen_parameters()
{
        uchar temp_id, temp_index;

        /*check the fec disabled switch to change th index into th
e system.h look up
```

INIT_SYS.C

```
        ** table which set sample times, error counts .. for calcu
latin BER
        */

        if(new_switches.option_switches & FEC_DISABLED)temp_id = 0
x08;
        else temp_id = 0;

        if(new_switches.option_switches & BER_HI_104)temp_index =
0x03;
        else temp_index = 0x02;

        system.number_of_channels = UNIT_TYPE[local.idu.personalit
y + temp_id][0];
        system.channel_masks = UNIT_TYPE[local.idu.personality + t
emp_id][1];
        system.ber_hi = UNIT_TYPE[local.idu.personality + temp_id]
[temp_index];
        system.hyst_hi = UNIT_TYPE[local.idu.personality + temp_id
][temp_index + 1];
        system.ber_lo = UNIT_TYPE[local.idu.personality + temp_id]
[temp_index + 3];
        system.hyst_lo = UNIT_TYPE[local.idu.personality + temp_id
][temp_index + 4];
        system.ber_hi_time = UNIT_TYPE[local.idu.personality + tem
p_id][temp_index + 6];
        system.hyst_hi_time = UNIT_TYPE[local.idu.personality + te
mp_id][temp_index + 7];
        system.ber_lo_time = UNIT_TYPE[local.idu.personality + tem
p_id][temp_index + 9];
        system.hyst_lo_time = UNIT_TYPE[local.idu.personality + te
mp_id][temp_index + 10];

        if(local.idu.personality <=1)odu_control.idu_personality =
 TWO_MB; /*1x2 and 2x2 (ids 0 & 1) use 2mb channel plan */
        else odu_control.idu_personality = EIGHT_MB;    /* 4x2 and
 1x8 (ids 2 & 3) use 8mb channel plan*/
}
```

MAINT 10.C

```
#include "80c196.h"
#include "10893def.h"
#include "10893str.h"
#include "10893map.h"
#include "muxdmux.h"

extern void clear_memory(), pet_dog();
extern unsigned char engage_loopback();
extern void read_revisions();
extern void initialize system();

/*extern const unsigned char a2d_max_in[],a2d_min_in[];
extern const uint agc_table[];*/

extern uchar e2_write(uchar*, uchar, uchar, uchar, uchar);
extern uchar e2_read(uchar*, uchar, uchar, uchar, uchar);


void maintenance_handler();
void initialize_maintenance();
void copy_memory();
unsigned char build_packet();


/*
** FUNCTION: Maintenance handler is responsible for determining if
 it is time
**                          to start transmitting another pack
et. It is also responsible for
**                          checking to see if a valid packet
has been recieved and parsing the message
**
**

** Input Definitions:

**                                                       No paramet
ers required

**   Returned Values:
**                                          No values returned
**
*/

void maintenance_handler()
{
        unsigned int make_pointer;

        unsigned char result,result1,temp_length;
        unsigned char rcvd_opcode;
        unsigned char   *src_ptr;
```

MAINT_IO.C

```
        struct channel *com_ptr;

        com_ptr = &rx[MAINTENANCE_PORT];         /*manage the rcv b
uffers*/
        if(com_ptr->buffer[com_ptr->get].flag == READY)
        {

                src ptr = &(com ptr->buffer[com_ptr->get].storage[
0]);    /*point of begining of recieved packet*/

                rcvd_opcode = *src_ptr++;

                switch(rcvd_opcode)
                {
                        case POWER CONTROL:
                                maintenance_port_2_odu.flag = READ
Y;

                                maintenance_port_2_odu.message_len
gth = *src_ptr++;

                                copy_memory(src_ptr,&maintenance_p
ort_2_odu.buffer[0],maintenance_port_2_odu.message_length);/*add 2
 for opcode and length byte*/

                                result = TRUE;
                                break;

                        case AFC_CONTROL:

                                ++src_ptr; /*skip length byte*/
                                afc_enabled = *src_ptr;

                                result1 = TRUE;

                                result = build_packet(&result1,1,A
FC_CONTROL,MAINTENANCE_PORT);

                                alarms.serial_telemetry_errors |=
RADIO_CONFIGURATION_CHANGE;
                        break;

                        case WARM_START:
                                asm     di;

                                initialize_system();
                                result1 = TRUE;
                                result = build_packet(&result1,1,W
ARM_START,MAINTENANCE_PORT);
                                result = FALSE;
                        break;
```

MAINT_IO.C

```
case READ_ACM:
        *src_ptr ++;                                    /*skip length by
te*/
        make_pointer =*(src_ptr+1);
        make_pointer = (make_pointer <<0x0
8) & 0xff00;
        make_pointer |= *src_ptr;
        src_ptr += 0x02;
        /*adjust pointer*/
        result = build_packet(make_pointer
,*src_ptr,READ_ACM,MAINTENANCE_PORT);
    break;
    case WRITE_ACM:
        temp_length = (*src_ptr++) - 0x02;
                                                /*subtract 2 bec
aue the packet length byte*/
        /*include 2 bytes for the write ad
dress*/
        make_pointer =*(src_ptr+1);
        make_pointer = (make_pointer <<0x0
8) & 0xff00;
        make_pointer |= *src_ptr;
        src_ptr += 0x02;
        /*adjust pointer*/
        copy_memory(src_ptr,make_pointer,t
emp_length);
        result1 = TRUE;
        result = build_packet(&result1,1,W
RITE_ACM,MAINTENANCE_PORT);
        alarms.serial_telemetry_errors |=
RADIO_CONFIGURATION_CHANGE;
    break;
    case WRITE_EEPROM:
        *src_ptr ++;                                    /*skip length by
te*/
```

MAINT_IO.C

```
/* ??? Test
                                        result1 = e2_write((src_ptr+4),*sr
c_ptr,*(src_ptr+1),*(src_ptr+2),*(src_ptr+3));
*/
result = TRUE;
Blink_Time = *(src_ptr+4) * FOURTH_SECOND;
                                        result = build_packet(&result1,1,W
RITE_EEPROM,MAINTENANCE_PORT);

                                break;

                                case READ_EEPROM:
                                        *src_ptr ++;
                                                                /*skip length by
te*/

                                        result1 = e2_read(&eeprom_buffer[0
],*src_ptr,*(src_ptr+1),*(src_ptr+2),*(src_ptr+3));

                                        if(result1)
                                                result = build_packet(&eep
rom_buffer[0],*(src_ptr+1),READ_EEPROM,MAINTENANCE_PORT);

                                        else
                                        {
                                                clear_memory(&eeprom_buffe
r[0],0xff);

                                                result = build_packet(&eep
rom_buffer[0],*(src_ptr+1),0x80 | READ_EEPROM,MAINTENANCE_PORT);
                                        }
                                break;

                                case READ_LOCAL_A2DS:
                                        *src_ptr ++;
                                                                /*skip length by
te*/

                                        result = build_packet(&a2d_local,s
izeof(struct terminal_a2d),READ_LOCAL_A2DS,MAINTENANCE_PORT);

                                break;

                                case READ_REMOTE_A2DS:
                                        *src_ptr ++;
                                                                /*skip length by
te*/

                                        result = build_packet(&a2d_remote,
sizeof(struct terminal_a2d),READ_REMOTE_A2DS,MAINTENANCE_PORT);

                                break;
```

MAINT_IO.C

```
        case READ_IOPORT:
                *src_ptr ++;                    /*skip length byte*/

                switch(*src_ptr)
                {
                        case 0:
                                result1 = ioport0;
                        break;
                        case 1:
                                result1 = ioport1;
                        break;
                        case 2:
                                result1 = ioport2;
                        break;
                        default:
                                result1 = 0xff;
                        break;
                }

                result = build_packet(&result1,1,READ_IOPORT,MAINTENANCE_PORT);

        break;

        case WRITE_IOPORT:
                *src_ptr ++;                    /*skip length byte*/

                switch(*src_ptr++)
                {
                        case 1:
                                ioport1 = *src_ptr;

                                result1 = TRUE;
                        break;
                        case 2:
                                ioport2 = *src_ptr;

                                result1 = TRUE;
                        break;
                        case 5:
                                pwm_control = *src_ptr;

                                result1 = TRUE;
                        break;
                        default:
                                result1 = FALSE;
```

MAINT_IO.C

```
                        break;
                }
                alarms.serial_telemetry_errors |=
RADIO_CONFIGURATION_CHANGE;

                result = build_packet(&result1,1,W
RITE_IOPORT,MAINTENANCE_PORT);
        break;

        case LOOPBACK:
                ++src_ptr; /*skip length byte*/

                result1 = engage_loopback(*src_ptr
);
                result = build_packet(&result1,1,L
OOPBACK,MAINTENANCE_PORT);

        break;

        case PSUEDO:
                ++src_ptr; /*skip length byte*/

                if(*src_ptr)
                {
                        fpga_command_register[TXI]
 |= PREN;
                        loopback.internal_test_pat
tern = TRUE;

                }

                else
                {
                        fpga_command_register[TXI]
 &= ~PREN;
                        loopback.internal_test_pat
tern = FALSE;

                }

                *(TXI_CS + COMMAND_REGISTER) = fpg
a_command_register[TXI];

                result1 = TRUE;

                result = build_packet(&result1,1,P
SUEDO,MAINTENANCE_PORT);

                alarms.serial_telemetry_errors |=
RADIO_CONFIGURATION_CHANGE;
        break;
```

MAINT_IO.C

```
case DATA_INVERT:
        ++src_ptr; /*skip length byte*/
        if(!(*src_ptr & 0x01))
        {
                fpga_command_register[TXO]
 &= ~INVERT_TRAFFIC;
                *(TXO_CS + COMMAND_REGISTE
R) = fpga_command_register[TXO];
        }
        else
        {
                        fpga_command_regis
ter[TXO] |= INVERT_TRAFFIC;
                        *(TXO_CS + COMMAND
_REGISTER) = fpga_command_register[TXO];
        }
        if(!(*src_ptr & 0x02))
        {
                        fpga_command_regis
ter[RXI] &= ~INVERT_TRAFFIC;
                        *(RXI_CS + COMMAND
_REGISTER) = fpga_command_register[RXI];
        }
        else
        {
                        fpga_command_regis
ter[RXI] |= INVERT_TRAFFIC;
                        *(RXI_CS + COMMAND
_REGISTER) = fpga_command_register[RXI];
        }
        result1 = TRUE;
        result = build_packet(&result1,NUL
L,DATA_INVERT,MAINTENANCE_PORT);
        alarms.serial_telemetry_errors |=
RADIO_CONFIGURATION_CHANGE;
break;

case SERIAL_LINK_PERFORMANCE:
        ++src_ptr;      /*skip length byte
*/
        if(*src_ptr == CLEAR_SERIAL_LINK_P
ERFORMANCE)
        {
                ++src_ptr;      /*get past
 sub opcode (clear or read byte)*/
                clear_memory(&serial_port_
stats[*src_ptr],sizeof(struct link_stats));
                result = build_packet(TRUE
,NULL,SERIAL_LINK_PERFORMANCE,MAINTENANCE_PORT);
        }
```

```
                        else
                        {
                                ++src_ptr;      /*get past
sub opcode (clear or read byte)*/
                                result = build_packet(&ser
ial_port_stats[*src_ptr],sizeof(struct link_stats),SERIAL_LINK_PER
FORMANCE,MAINTENANCE_PORT);
                        }

                break;

                case READ_ALARMS:

                        ++src_ptr; /*skip length byte*/

                        switch(*src_ptr)
                        {
                                case LOCAL_IMAGE:
                                        result = build_pac
ket(&local,sizeof(struct data_base),READ_ALARMS,MAINTENANCE_PORT);
                                break;

                                case LOCAL_CAPTURE:
                                        result = build_pac
ket(&local_capture,sizeof(struct data_base),READ_ALARMS,MAINTENANC
E_PORT);
                                break;

                                case REMOTE_IMAGE:
                                        result = build_pac
ket(&remote,sizeof(struct data_base),READ_ALARMS,MAINTENANCE_PORT)
;
                                break;

                                case REMOTE_CAPTURE:
                                        result = build_pac
ket(&remote_capture,sizeof(struct data_base),READ_ALARMS,MAINTENAN
CE_PORT);
                                break;
                                }

                break;

                case INJECT_ERRS:
                        ++src_ptr; /*skip length byte*/

                        fpga_command_register[RXI] &= ~(ER
R_CTRL);        /*clear injection bits*/
                        fpga_command_register[RXI] |= (*sr
c_ptr << 0x03) & 0x18;
```

MAINT_IO.C

```
                *(RXI_CS + COMMAND_REGISTER) = fpga_command_register[RXI];

                result1 = TRUE;
                result = build_packet(&result1,1,INJECT_ERRS,MAINTENANCE_PORT);

                alarms.serial_telemetry_errors |= RADIO_CONFIGURATION_CHANGE;
            break;

            case CW_MODE:

                ++src_ptr; /*skip length byte*/
                if(!(*src_ptr))fpga_command_register[TXO] &= ~CW;

                else fpga_command_register[TXO] |= CW;

                *(TXO_CS + COMMAND_REGISTER) = fpga_command_register[TXO];

                result1 = TRUE;
                result = build_packet(&result1,1,CW_MODE,MAINTENANCE_PORT);

                alarms.serial_telemetry_errors |= RADIO_CONFIGURATION_CHANGE;
            break;

            case FEC_CORRECTION:

                ++src_ptr; /*skip length byte*/
                if(!(*src_ptr))
                {
                        fpga_command_register[RXI] &= ~CORE;

                        fpga_command_register[TXO] |= ENCB;

                        fpga_command_register[RXO] |= DECB;

                }

                else
                {
                        fpga_command_register[RXI] |= CORE;

                        fpga_command_register[TXO] &= ~ENCB;

                        fpga_command_register[RXO] &= ~DECB;

                }
```

MAINT_IO.C

```
                                *(RXI_CS + COMMAND_REGISTER) = fpg
a_command_register[RXI];
                                *(RXO_CS + COMMAND_REGISTER) = fpg
a_command_register[RXO];
                                *(TXO_CS + COMMAND_REGISTER) = fpg
a_command_register[TXO];

                                result1 = TRUE;
                                result = build_packet(&result1,1,F
EC_CORRECTION,MAINTENANCE_PORT);
                                alarms.serial_telemetry_errors |=
RADIO_CONFIGURATION_CHANGE;
                        break;

                        case MUTE TRANSMITTER:
                                ++src_ptr; /*skip length byte*/

                                switch(*src_ptr)
                                {
                                        case TRANSMIT_ON:
                                                odu_control.odu_tx
_mute = OFF;

                                                asm di;
                                                spm_controls &= ~I
DU_TX_MUTE_CONTROL;

                                                asm ei;

                                        break;
                                        case MUTE_IDU:
                                                asm di;
                                                spm_controls |= ID
U_TX_MUTE_CONTROL;

                                                asm ei;
                                        break;
                                        case MUTE_ODU:
                                                odu_control.odu_tx
_mute = ON;

                                        break;
                                }

                                result1 = TRUE;
                                result = build_packet(&result1,1,M
UTE_TRANSMITTER,MAINTENANCE_PORT);
                                alarms.serial_telemetry_errors |=
RADIO_CONFIGURATION_CHANGE;
                        break;

                        case INJECT_AIS:
                                ++src_ptr; /*skip length byte*/
```

MAINT_IO.C

```
                        switch(*src_ptr)
                        {
                                case AIS_ANTENNA_OFF:
                                        fpga_command_regis
ter[TXI] &= ~AISF;
                                        *(TXI_CS + COMMAND
_REGISTER) = fpga_command_register[TXI];
                                break;

                                case AIS_ANTENNA_ON:
                                        fpga_command_regis
ter[TXI] |= AISF;
                                        *(TXI_CS + COMMAND
_REGISTER) = fpga_command_register[TXI];
                                break;

                                case AIS_CUSTOMER_OFF:
                                        fpga_command_regis
ter[RXO] &= ~AISF;
                                        *(RXO_CS + COMMAND
_REGISTER) = fpga_command_register[RXO];
                                break;

                                case AIS_CUSTOMER_ON:
                                        fpga_command_regis
ter[RXO] |= AISF;
                                        *(RXO_CS + COMMAND
_REGISTER) = fpga_command_register[RXO];
                                break;
                        }

                        result1 = TRUE;
                        result = build_packet(&result1,1,I
NJECT_AIS,MAINTENANCE_PORT);
                        alarms.serial_telemetry_errors |=
RADIO_CONFIGURATION_CHANGE;
                break;

                case REVISIONS:
                        ++src_ptr; /*skip length byte*/

                        switch(*src_ptr++)
                        {
                                case READ_REVS:
                                        result = build_pac
ket(&local_revs,sizeof(struct terminal_revisions),REVISIONS,MAINTE
NANCE_PORT);
                                break;

                                case SET_ACM_REVS:
```

MAINT_IO.C

```
                                        result1 = e2_write
(src_ptr,REVISION_DATA,sizeof(struct revision_str),PAGE_2,ACM_DEVI
CE);
                                        result = build_pac
ket(&result1,1,REVISIONS,MAINTENANCE_PORT);

                                break;

                                case SET_SPM_REVS:

                                        result1 = e2_write
(src_ptr,REVISION_DATA,sizeof(struct revision_str),PAGE_2,SPM_DEVI
CE);
                                        result = build_pac
ket(&result1,1,REVISIONS,MAINTENANCE_PORT);

                                break;

                                case SET_OCM_REVS:
                                        maintenance_port_2
_odu.flag = READY;

                                        maintenance_port_2
_odu.message_length = 5; /*THERE ARE ALWAYS FIVE BYTES IN THIS MES
SAGE*/

                                        copy_memory((src_p
tr-2),&maintenance_port_2_odu.buffer[0],maintenance_port_2_odu.mes
sage_length);/*add 2 for opcode and length byte*/

                                        result = TRUE; /*R
ETURN THE BUFFER*/
                                break;
                                case SET_RFM_REVS:

                                        result1 = e2_write
(src_ptr,RFM_REV_DATA,sizeof(struct revision_str),PAGE_2,SPM_DEVIC
E);
                                        result = build_pac
ket(&result1,1,REVISIONS,MAINTENANCE_PORT);

                                break;

                                case SET_PSM_REVS:

                                        result1 = e2_write
(src_ptr,PSM_REV_DATA,sizeof(struct revision_str),PAGE_2,SPM_DEVIC
E);
                                        result = build_pac
ket(&result1,1,REVISIONS,MAINTENANCE_PORT);
```

MAINT_IO.C

```
                                        break;

                                        case SET_IDU_REVS:

                                                result1 = e2_write
(src_ptr,IDU_REV_DATA,sizeof(struct revision_str),PAGE_2,SPM_DEVIC
E);
                                                result = build_pac
ket(&result1,1,REVISIONS,MAINTENANCE_PORT);

                                        break;

                                }

                                read_revisions();

                        break;

                        default:
                                result = TRUE; /* FOR NOW IF WE DO
N'T RECEIVE A VALID OPCODE RETURN THE BUFFER AND MOVE ON*/
                        break;

                }/*end switch(opcode)*/


                if(result)
                {       /* IF BLD PACKET WAS SUCCESSFUL FREE BUFF
ER IF NOT LEAVE BUFFER TAGGED FOR PROCESSING*/
                        com_ptr->buffer[com_ptr->get].flag = IDLE;
                        ++com_ptr->get;
                        if(com_ptr->get == MAX_BUFFER)com_ptr->get
 = 0;   /*buffer pool has wrapped around reset get pointer*/

                }/*end if(result)*/

        }/*end if(com_ptr == READY)*/

        /*
        ** check if a transmission is already in progress if so no
 action if
        ** not check to see if there is a packet in the transmit q
ue to transmitt.
        ** this is done by interogating the get buffer in the tx s
tructure.
        */

        com_ptr = &tx[MAINTENANCE_PORT];                /*manage t
he xmiter first*/
```

```
        if(!com_ptr->busy)
        {
                if(com_ptr->buffer[com_ptr->get].flag == READY)
                {
                        com_ptr->packet_len = com_ptr->buffer[com_
ptr->get].len;
                        com_ptr->char_pointer = &(com_ptr->buffer[
com_ptr->get].storage[0]);

                        --com_ptr->packet_len;
                        com_ptr->busy = TRUE;

                        *(MAINTENANCE_UART + THR) = *(com_ptr->cha
r_pointer++);

                        *(MAINTENANCE_UART + IMR)  = 0x05;      /*
 set Tx AND Rx mask */

                }/*end if(flag == READY)*/

        }/*end if(!com_ptr->busy)*/

}/*close function*/


/*

** FUNCTION:
**      initialize_maintenance assures that all structures used b
y maint_io.c
**                              at a known starting state of 0
**

** Input Definitions:

**                                                    No paramet
ers required

**   Returned Values:
**                                      No values returned
**
*/
void initialize_maintenance()
{
        clear_memory(&tx[MAINTENANCE_PORT],(uint)sizeof(struct cha
nnel));
        clear_memory(&rx[MAINTENANCE_PORT],(uint)sizeof(struct cha
nnel));

}
```

MAINT_IO.C

```
/*
** FUNCTION: build packet
**                                         checks to see if there is
an available buffer in the transmitt que
**                                         and puts a "maintenance en
velope" around the data being pointed to
**                                         by data_ptr and tags the b
uffer ready for transmitting
**

** Input Definitions:

**                                         data_ptr = a character poi
nter to a buffer of data for transmission
**                                         len = the number of bytes
to be packetized
**                                         opcode = The opcode or mes
sage being sent
**   Returned Values:
**             TRUE = packet built and successfully qued for trans
mitting
**                                         FALSE = There was not a tr
ansmit buffer available so the packet
**                                                                 wa
s not built or qued
**
*/
unsigned char build_packet(dta_ptr,len,opcode,port)
unsigned char *dta_ptr,len,opcode,port;
{
        unsigned char checksum,*dst_ptr,loop;
        struct  channel *tx_ptr;

        tx_ptr =&tx[port];

        checksum = 0;
        if(tx_ptr->buffer[tx_ptr->put].flag == IDLE)
        {

                /*
                ** if put buffer is not available indicates all
                **      buffers are full - do not build new packet
                */

                dst_ptr = &tx_ptr->buffer[tx_ptr->put].storage[0];

                checksum += SYNC;
                *dst_ptr++ = SYNC;
```

MAINT_IO.C

```
                checksum += opcode;
                *dst_ptr++ = opcode;

                checksum += len;
                *dst_ptr++ = len;

                if(len != NULL)
                {

                        for(loop = 0;loop < len;++loop){
                                checksum += *dta_ptr;
                                *dst_ptr++ = *dta_ptr++;
                        }
                }
                *dst_ptr = (0 - checksum);

                tx_ptr->buffer[tx_ptr->put].flag = READY;
                tx_ptr->buffer[tx_ptr->put].len = (len + OVERHEAD)
;
                ++tx_ptr->put;
                if(tx_ptr->put == MAX_BUFFER)tx_ptr->put = 0;   /*
buffer pool has wrapped around*/


                return(TRUE);   /*RETURN TRUE INDICATING REQUEST C
OMPLETE*/

        }/*end if(flag == IDLE)*/

        else
        {
                return(FALSE);  /*RETURN INDICATOR THAT NO BUFFER
AVAILABLE*/

        }/*end else*/

}/*close function*/


void copy_memory(source,destination,length)
unsigned char *source,*destination,length;
{
        while(length)
        {
                *destination++ = *source++;
                --length;
        }
}
```

```
#include <10893map.h>
#include <10893def.h>
#include <10893str.h>
#include <80c196.h>
#include "muxdmux.h"

void initialize_digital();
uchar engage_loopback(uchar);

extern void clear_memory();

unsigned char engage_loopback(command)
unsigned char command;
{
        new_switches.loopback_options = ~((ioport1 & 0x3c) >> 0x02);

        if(command < LAST_VALID_LOOP && new_switches.loopback_options & LOOPBACK_ENABLED)
        {
                fpga_command_register[TX0] &= 0X27; /*SAVE THE STATUS OF CW BIT AND ENCB and
 SAVES INV*/
                fpga_command_register[RX0] &= 0X17;/*SAVE ARS,AISF and DECB BITS*/
                fpga_command_register[TX1] &= 0X45; /*SAVE ARS,AISF BITS*/
                fpga_command_register[RX1] &= 0X5d; /*SAVE INJ0,INJ1, & CorE CLEARS INV BIT*

                if(loopback.test_selected == IDU_LOOP)
                {

                        asm di;

                        spm_controls &= ~(IDU_LOOP_CONTROL + IDU_TX_MUTE_CONTROL);
                        *SPM_CONTROLS = spm_controls ^ SPM_CONTROL_MASK;

                        asm ei;
```

MUXDMUX.C

```
        }

        switch(command)
        {

                case LOOPBACK_OFF:
/*                      *(RXI_CS + FRAME_BYTE_A) = rx_frame_byte;*/

                        fpga_command_register[TXI] |= ON;
                        fpga_command_register[RXI] |= INVERT_TRAFFIC | ON;
                        fpga_command_register[TXO] |= ON;

                        if(loopback.test_selected == LINK_LOOP)
                        {
                                local.idu.loopback_command &= ~FAR_END_LOOPBACK_REQU
EST;
                                local.idu.loopback_command |= FAR_END_LOOPBACK_OFF;
                        }

                        else local.idu.loopback_command = FALSE;

                        clear_memory(&loopback,sizeof(struct loopback_manager_str));

                        asm di;

                        spm_controls &= ~(IDU_LOOP_CONTROL + IDU_TX_MUTE_CONTROL);
                        *SPM_CONTROLS = spm_controls ^ SPM_CONTROL_MASK;

                        asm ei;

                break;

                case LINK_LOOP:
                        *(RXI_CS + FRAME_BYTE_A) = tx_frame_byte;
```

MUXDMUX.C

```
        fpga_command_register[RXI] |= INVERT_TRAFFIC + ON;

        if(new_switches.loopback_options & NO_EXTERNAL_TEST_SET)
        {
                fpga_command_register[TXI] |= LLP + PREN + ON;
                loopback.internal_test_pattern = TRUE;
        }
        else
        {
                fpga_command_register[TXI] |= ON;
                loopback.internal_test_pattern = FALSE;
        }
        loopback.inprogress = TRUE;
        loopback.test_results = FALSE;
        loopback.test_selected = command;

        local.idu.loopback_command = FAR_END_LOOPBACK_REQUEST + LOOP
BACK_INPROGRESS;

    break;

    case IDU_LOOP:
        *(RXI_CS + FRAME_BYTE_A) = tx_frame_byte;

        fpga_command_register[RXI] |= ON;

        if(new_switches.loopback_options & NO_EXTERNAL_TEST_SET)
        {
                fpga_command_register[TXI] |= ILP + PREN + ON;
                loopback.internal_test_pattern = TRUE;
        }
        else
        {
                fpga_command_register[TXI] |= ON;
                loopback.internal_test_pattern = FALSE;
        }
```

```
        loopback.inprogress = TRUE;
        loopback.test_results = FALSE;
        loopback.test_selected = command;

        local.idu.loopback_command = LOOPBACK_INPROGRESS;

        asm di;

        spm_controls |= IDU_LOOP_CONTROL + IDU_TX_MUTE_CONTROL;
        *SPM_CONTROLS = spm_controls ^ SPM_CONTROL_MASK;

        asm ei;

break;

case ODU_LOOP:
        *(RXI_CS + FRAME_BYTE_A) = tx_frame_byte;

        fpga_command_register[RXI] |= ON;

        if(new_switches.loopback_options & NO_EXTERNAL_TEST_SET)
        {
                fpga_command_register[TXI] |= ILP + PREN + ON;
                loopback.internal_test_pattern = TRUE;
        }
        else
        {
                fpga_command_register[TXI] |= ON;
                loopback.internal_test_pattern = FALSE;
        }
        loopback.inprogress = TRUE;
        loopback.test_results = FALSE;
        loopback.test_selected = command;

        local.idu.loopback_command = LOOPBACK_INPROGRESS;
```

MUXDMUX.C

```
break;

case REMOTE_LINK_LOOP:
        fpga_command_register[RXI] |= INVERT_TRAFFIC + ON;

        fpga_command_register[TXI] |= LLP + ON;
        loopback.internal_test_pattern = TRUE;

        loopback.inprogress = TRUE;
        loopback.test_results = FALSE;

        loopback.test_selected = command;

        local.idu.loopback_command |= REMOTE_LOOPBACK_INPROGRESS;
break;

case HLOOP:
        *(RXI_CS + FRAME_BYTE_A) = tx_frame_byte;

        fpga_command_register[RXI] |= ON;
        fpga_command_register[RXO] |= HLP + ON;

        if(new_switches.loopback_options & NO_EXTERNAL_TEST_SET)
        {
                fpga_command_register[TXI] |= LLP - PREN + ON;
                loopback.internal_test_pattern = TRUE;
        }
        else
        {
                fpga_command_register[TXI] |= ON;
                loopback.internal_test_pattern = FALSE;
        }
        loopback.inprogress = TRUE;
        loopback.test_results = FALSE;
```

MUXDMUX.C

```
        loopback.test_selected = command;
        local.idu.loopback_command = LOOPBACK_INPROGRESS;
break;

case RLOOP:
        *(RXI_CS + FRAME_BYTE_A) = tx_frame_byte;

        fpga_command_register[RXI] |= ON;
        fpga_command_register[TXI] |= RLP + ON;

        loopback.inprogress = TRUE;
        loopback.test_results = FALSE;

        loopback.test_selected = command;

        loopback.internal_test_pattern = FALSE;

        local.idu.loopback_command = LOOPBACK_INPROGRESS;
break;

case LLOOP:
        *(RXI_CS + FRAME_BYTE_A) = tx_frame_byte;

        fpga_command_register[RXI] |= OLP + ON;

        fpga_command_register[TXI] |= LLP + FREN + ON;
        loopback.internal_test_pattern = TRUE;

        loopback.inprogress = TRUE;
        loopback.test_results = FALSE;

        loopback.test_selected = command;

        local.idu.loopback_command = LOOPBACK_INPROGRESS;
break;
```

```
case DIGITAL_LOOP:
        *(RXI_CS + FRAME_BYTE_A) = tx_frame_byte;

        fpga_command_register[RXI] |= OLP + ON;

        if(new_switches.loopback_options & NO_EXTERNAL_TEST_SET)
        {
                fpga_command_register[TXI] |= ILP + PREN + ON;
                loopback.internal_test_pattern = TRUE;
        }
        else
        {
                fpga_command_register[TXI] |= ON;
                loopback.internal_test_pattern = FALSE;
        }

        loopback.inprogress = TRUE;
        loopback.test_results = FALSE;

        loopback.test_selected = command;

        local.idu.loopback_command = LOOPBACK_INPROGRESS;
break;

case PSUEDO_ON:
        fpga_command_register[TXI] |= PREN;
break;

case PSUEDO_OFF:
        fpga_command_register[TXI] &= ~PREN;
break;

default:
        return(FALSE);
break;
```

```
        }/*end switch(for wich test*/

        *(TXI_CS + COMMAND_REGISTER) = fpga_command_register[TXI];
        *(TXO_CS + COMMAND_REGISTER) = fpga_command_register[TXO];
        *(RXO_CS + COMMAND_REGISTER) = fpga_command_register[RXO];
        *(RXI_CS + COMMAND_REGISTER) = fpga_command_register[RXI];

        *(TXI_CS + CLEAR_STATUS) = 0;
        *(RXI_CS + CLEAR_STATUS) = 0;
        *(TXO_CS + CLEAR_STATUS) = 0;
        *(RXO_CS + CLEAR_STATUS) = 0;

        return(TRUE);

    }/*end if(loopback enabled)*/

    else return(FALSE);

}

void initialize_digital()
{

    *(TXI_CS + COMMAND_REGISTER) = 0;
    *(TXO_CS + COMMAND_REGISTER) = 0;
    *(RXO_CS + COMMAND_REGISTER) = 0;
    *(RXI_CS + COMMAND_REGISTER) = 0;

    clear_memory(&fpga_command_register,0x04);

    tx_frame_byte = (new_switches.link_id << 0x01) | 0x01;
    *(TXO_CS + FRAME_BYTE_A) = tx_frame_byte;
    *(TXO_CS + FRAME_BYTE_B) = FRAME_BYTE_MSB;
    *(RXI_CS + FRAME_BYTE_A) = tx_frame_byte;
    *(RXI_CS + FRAME_BYTE_B) = FRAME_BYTE_MSB;
```

MUXDMUX.C

```
        if(new_switches.option_switches & FEC_DISABLED)
        {
                fpga_command_register[TXO] |= ENCB + ON;
                fpga_command_register[RXO] |= DECB + ARSRX + ON;
                fpga_command_register[RXI] |= INVERT_TRAFFIC + ON;
        }
        else
        {
                fpga_command_register[TXO] |= ON;
                fpga_command_register[RXO] |= ARSRX + ON;
                fpga_command_register[RXI] |= ON + INVERT_TRAFFIC + CORE;
        }

        fpga_command_register[TXI] |= ARSTX + ON;

        *(TXI_CS + COMMAND_REGISTER) = fpga_command_register[TXI];
        *(TXO_CS + COMMAND_REGISTER) = fpga_command_register[TXO];
        *(RXO_CS + COMMAND_REGISTER) = fpga_command_register[RXO];
        *(RX1_CS + COMMAND_REGISTER) = fpga_command_register[RXI];

}

/*
** FUNCTION: validate_digital_section
**                                  verifies that the proper actel chips are in the prop
er locations
**                                  and the actels are of all the same type i.e. 2 MB, a
nd base on the
**                                  type the struct system_parameters is initialized fro
m a predefined
**                                  SYSTEM_TABLE
**
** Input Definitions:
**                                              No parameters required
```

```
**   Returned Values:
**                                           No values returned
**
*/
void validate_digital_section()
{
        unsigned char chip1,chip2,chip3,chip4;

        chip1 = *(TXI_CS + VERSION);
        chip2 = *(TXO_CS + VERSION);
        chip3 = *(RXI_CS + VERSION);
        chip4 = *(RXO_CS + VERSION);

        if((chip1 & 0xc0) || ((chip2 & 0xc0) != 0x40) || ((chip3 & 0xc0) != 0x80) || ((chip4
 & 0xc0) != 0xc0))
                local.idu.alarm6 |= CONFIGURATION_ERROR;

        if((chip1 & 0x30) != (chip2 & 0x30) != (chip3 & 0x30) != (chip4 & 0x30))
                local.idu.alarm6 |= CONFIGURATION_ERROR;

        local.idu.personality = (chip1 & 0x30) >> 0x04;

}
```

NOVRAM.C

```
#include <80c196.h>
#include <novram.h>
#include <10893def.h>

extern void kick_the_dog();      /*
                                        ** It can take some time to read from the e2
prom (5ms)
                                        ** we may need to keep the dog happy
                                        */

/*
** NOTE: The e2prom is expected to be interfaced to the micro processor Port1
** There must be a global variable called port1_image that will be used to interface
** to the e2prom.
*/

uchar e2_write(uchar*, uchar, uchar, uchar,uchar);
uchar e2_read(uchar*, uchar, uchar, uchar,uchar);
void send_ack(void);
void send_byte(uchar);
uchar rcv_ack(void);
void e2clk();
void e2data();

#define DEVICE_SIZE 512
/*
** Number of bytes in a 2404
*/

extern unsigned char   port1_image;
extern unsigned int              timers[];

/*
** FUNCTION: WRITE A VARIABLE NUMBER OF BYTES TO THE 24C04 EEPROM
```

NOVRAM.C

```
**
** Input Definitions:
**          *source - pointer to start of data to transmit.
**          e2_addr - starting eeprom address to write to.
**          length - number of bytes to write to eeprom.
**                   if dummy write, length must be >0.
**          sheet - 0 or 1. if dummy write then 2 or 3.
**
**   Returned Values:
**                                  TRUE if successful
**                                  FALSE otherwise
**
*/

uchar e2_write(source, e2_addr, length, sheet,device_addr)
uchar *source, e2_addr, length, sheet, device_addr;
{
        uchar command, index;
        uint x;

   e2data(SET);

        while(length)
        {

                command = (0xa0 | ((sheet<<1) & 0x02));
                command |= (device_addr << 0x02) & 0x0c;
                /*
                ** First we poll eeprom to see if internal write cycle is in progress.
                ** If it is, wait until it's finished.  If the device is bad, the
                ** watchdog will eventually bite us.
                **
                */

                timers[E2PROM_TMR] = SECONDS_50MS;
```

NOVRAM.C

```
        do{

    e2clk(SET);             /* Generate a start bit */
    e2data(CLR);
    e2clk(CLR);

                send_byte(command);

                kick_the_dog();

        }
        while(timers[E2PROM_TMR] && !rcv_ack());

        if(!timers[E2PROM_TMR])return(FALSE);

        /*
        ** Now we can initiate start of transmission
        */

        e2data(SET);        /* Generate a start bit */
e2clk(SET);
e2data(CLR);
e2clk(CLR);

        /*
        ** Send device identifier, device address,
        ** sheet, and write command byte
        */

        send_byte(command);

        if (!rcv_ack()) return(FALSE);

        /*
        ** send storage address
```

```
          */

send_byte(e2_addr);
          if (!rcv_ack()) return(FALSE);

          if(sheet & 0x02) break;
          /*
          ** if bit one of sheet is set, this is a dummy write
          */


          /*
          ** Now the chip is set up so
          ** send 1 to 16 data bytes at a time
**
** Loop will stop if we reach 16 bytes,
**        or if we reach the end of a page
**        or if we run out of data
          */


          for(index=0; index<16; index++)
          {
                  send_byte(*(source++));
                  if (!rcv_ack()) return (FALSE);
                  e2_addr++;

   if(!--length)break;

   if ((e2_addr & 0x0f)==0) break ;
          }

          /*
          ** Now the data has been sent, so
          ** send the stop bit
          */
```

NOVRAM.C

```
            e2data(CLR);
        e2clk(SET);
        e2data(SET);

                if(sheet & 0x02) break;

        }
        return(TRUE);
}

/*
** FUNCTION: READ A VARIABLE NUMBER OF BYTES FROM 24C04 EEPROM
**
** ARGUMENTS:
**          *data - pointer to destination of bytes being read.
**          e2_addr - eeprom address to read from.
**                          length - number of bytes to read.
**                          sheet - 0 or 1.
**
**   RETURNS: TRUE if successful
**                           FALSE otherwise
**
*/

uchar e2_read(destination, e2_addr, length, sheet,device_addr)
uchar *destination, e2_addr, length, sheet, device_addr;
{

        uchar byte, command, port1;
```

```
char tidbit;

/*
** First, do a dummy write to get the eeprom's attention
*/

sheet |= 0x02;
if (e2_write(destination, e2_addr, 1, sheet,device_addr)==FALSE)
        return (FALSE);

/*
** Issue a start bit
*/

e2data(SET);
e2clk(SET);
e2data(CLR);
e2clk(CLR);

/*
** send device identifier, device address,
** sheet, and write command byte
*/

command = (0xa1 | ((sheet<<1) & 0x02));
command |= (device_addr << 0x02) & 0x0c;

send_byte(command);

if (!rcv_ack()) return (FALSE);
```

```
        /*
        ** read the number of bytes
        ** requested in length
        */

        while(length--) {

                byte = 0;
                for(tidbit=7; tidbit>=0; tidbit--) {
                        e2data(SET);
                        e2clk(SET);
                        byte |= ((ioport1 & 0x01)<<tidbit);
                        e2clk(CLR);
                }

                *destination++ = byte;

                if(length) send_ack();

        }

        /*
        ** send stop bit
        */

        e2data(CLR);
        e2clk(SET);
        e2data(SET);
        return(TRUE);
}

/***********************************************************************/
/*          SUPPORT FUNCTIONS FOR E2_READ AND E2_WRITE                 */
```

```
/*************************************************************************/

void send_ack(void)
{
        e2data(CLR);
        e2clk(SET);
        e2clk(SET);
        e2clk(CLR);
}

void send_byte(fodder)
uchar fodder;
{
         uchar trmtbit;
        signed char tidbit;

        for(tidbit=7; tidbit>=0; tidbit--) {
                trmtbit = fodder>>tidbit;

                e2data(trmtbit & 0x01);
                e2clk(SET);
                e2clk(SET);
                e2clk(CLR);
        }
}

uchar rcv_ack(void)
{
uchar result ;
/*
** New version returns result
** Returns TRUE if ACK and FALSE otherwise
*/
```

```
   e2data(SET);
   e2clk(SET);
   e2clk(SET);
   result = (ioport1 & 0x01)^0x01  ;
   e2clk(CLR);
   return(result);
}


void e2clk(bit1)
uchar bit1;
{
   port1_image = (port1_image & 0xFD) | (bit1 << 1);
   ioport1 = port1_image;
}


void e2data(bit0)
uchar bit0;
{
   port1_image = (port1_image & 0xFE) | bit0;
   ioport1 = port1_image;
}
```

TELEM_IO.C

```
#include "80c196.h"
#include "10893def.h"
#include "10893str.h"
#include "10893map.h"

extern void clear_memory(), pet_dog();
extern void copy_memory();

void telemetry_handler();
void telemetry_receive();
void telemetry_transmit();

void initialize_telemetry();
extern unsigned char build_packet();

extern void alarm_capture();


/*
** FUNCTION: telemetry handler is responsible for determining if it is time
**                                to start transmitting another packet. It is also responsible
 for
**                                checking to see if a valid packet has been recieved and pars
ing the message
**
**
** Input Definitions:
**                                                            No parameters required

**   Returned Values:
**                                                No values returned
**
*/
void telemetry_handler()
{
        unsigned char result;
```

TELEM_IO.C

```
        telemetry_receive();

        if(!tx[TELEMETRY_LINK].busy && timers[TELEMETRY_POLL_TIME] == 0)
        {
                if(!timers[TELEMETRY_A2D_PACKET])
                {
                        result = build_packet(NULL,NULL,A2D_IMAGE,TELEMETRY_LINK);

                        if(result)timers[TELEMETRY_A2D_PACKET] = SECONDS_3;
                }
                else if(maintenance_port_2_odu.flag == READY)
                {
                        result = build_packet(&maintenance_port_2_odu.buffer[0],maintenance_
port_2_odu.message_length,POWER_CONTROL,TELEMETRY_LINK);

                        maintenance_port_2_odu.flag = IDLE;
                }
/*              the following request for revision information has been removed
                else if(!timers[ODU_REVISION_REQUEST])
                {

                        result = build_packet(READ_REVS,1,REVISIONS,TELEMETRY_LINK);

                        if(result)timers[ODU_REVISION_REQUEST] = SECONDS_60;
                }
*/
                else
                {
                        result = build_packet(&odu_control,sizeof(struct odu_ctrl_str),ALARM
_IMAGE,TELEMETRY_LINK);
                        odu_control.afc_compensation = FALSE; /*only send the request once a
nd then wait*/
                }

                timers[TELEMETRY_POLL_TIME] = THIRD_SECOND;
```

```
        }

        telemetry_transmit();
}

/*
** FUNCTION: telemetry handler is responsible for determining if it is time
**                          to start transmitting another packet. It is also responsible
 for
**                          checking to see if a valid packet has been recieved and pars
ing the message
**
**
** Input Definitions:
**
                                                  No parameters required
**   Returned Values:
**
                                      No values returned
*/

void telemetry_receive()
{
        unsigned int make_pointer;

        unsigned char result,temp_length;
        unsigned char rcvd_opcode;
        unsigned char   *src_ptr;
        struct channel *com_ptr;

        com_ptr = &rx[TELEMETRY_LINK];  /*manage the rcv buffers*/
        if(com_ptr->buffer[com_ptr->get].flag == READY)
        {
                src_ptr = &(com_ptr->buffer[com_ptr->get].storage[0]);  /*point of begining
of recieved packet*/
```

```
        rcvd_opcode = *src_ptr++;

        /* IF THE MSB OF THE OPCODE RECIEVED IS NOT SET TO 1 THEN THIS IS THE
        ** THE MESSAGE THAT WE SENT SO RETURN THE BUFFER TO THE POOL AND GO ON
        */

        if(!(rcvd_opcode & 0x80))
        {
                com_ptr->buffer[com_ptr->get].flag = IDLE;
                ++com_ptr->get;
                if(com_ptr->get == MAX_BUFFER)com_ptr->get = 0; /*buffer pool has wr
apped around reset get pointer*/
                ++serial_port_stats[TELEMETRY_LINK].own_packets_received;
                return;
        }
        switch(rcvd_opcode)
        {
                case ALARM_IMAGE_RESPONSE:

                        result = TRUE;
                        ++src_ptr;                                              /*ge
t past the length byte*/
                        copy_memory(src_ptr,&local.odu,sizeof(struct odu_str));

                        alarm_capture(&local,&local_capture);

                break;

                case A2D_IMAGE_RESPONSE:

                        result = TRUE;
                        ++src_ptr;                                              /*ge
t past the length byte*/
                        copy_memory(src_ptr,&a2d_local.odu_a2d[0],MAX_ODU_VOLTAGES);
```

TELEM_IO.C

```
                break;

                case POWER_CONTROL_RESPONSE:

                        result = TRUE;
                        ++src_ptr;                                              /*ge
t past the length byte*/

                        result = build_packet(src_ptr,1,POWER_CONTROL,MAINTENANCE_PO
RT);

                break;

                case REVISION_RESPONSE:

                        result = TRUE;
                        ++src_ptr;                                              /*ge
t past the length byte*/

                        switch(*src_ptr++)
                        {
                                case    READ_REVS:
                                        copy_memory(src_ptr,&local_revs.ocm_revs,siz
eof(struct revision_str));

                                        result = TRUE;

                                break;

                                case    SET_OCM_REVS:
                                        result = build_packet(src_ptr,1,REVISIONS,MA
INTENANCE_PORT);

                                break;
                        }

                break;
```

TELEM_IO.C

```
                    default:
                            result = TRUE; /* FOR NOW IF WE DON'T RECEIVE A VALID OPCODE
RETURN THE BUFFER AND MOVE ON*/
                    break;

            }/*end switch(opcode)*/

            if(result)
            {       /* IF BLD PACKET WAS SUCCESSFUL FREE BUFFER IF NOT LEAVE BUFFER TAG
GED FOR PROCESSING*/
                    com_ptr->buffer[com_ptr->get].flag = IDLE;
                    ++com_ptr->get;
                    if(com_ptr->get == MAX_BUFFER)com_ptr->get = 0; /*buffer pool has wr
apped around reset get pointer*/

            }/*end if(result)*/

            timers[TELEMETRY_POLL_TIME] = 0;

            timers[TELEMETRY_LINK_RECEIVE] = SECONDS_5;

            alarms.serial_telemetry_errors &= ~(TELEMETRY_ERROR);

    }/*end if(com_ptr == READY)*/

    else if(!timers[TELEMETRY_LINK_RECEIVE])
    {
            timers[TELEMETRY_LINK_RECEIVE] = SECONDS_5;

            clear_memory(&local.odu, sizeof(struct odu_str));

            timers[TELEMETRY_POLL_TIME] = 0;

            alarms.serial_telemetry_errors |= TELEMETRY_ERROR;

            ++serial_port_stats[TELEMETRY_LINK].timeouts;
```

```
        }/* end else of recieve packet time out need 1 good packet in a second*/

        serial_port_stats[TELEMETRY_LINK].packets_sent_not_received =
                serial_port_stats[TELEMETRY_LINK].packets_sent - serial_port_stats[TELEMETRY
_LINK].own_packets_received;

        serial_port_stats[TELEMETRY_LINK].answers =
                serial_port_stats[TELEMETRY_LINK].packets_received - serial_port_stats[TELEM
ETRY_LINK].own_packets_received;

}/*close telemetry receive*/


/*
** FUNCTION: telemetry transmit
**                                  if there is something qued up ship it out if not go
on
**
** Input Definitions:
**                                            No parameters required

**   Returned Values:
**                                  No values returned
**
*/

void telemetry_transmit()
{

        unsigned char result,temp_length;
        unsigned char rcvd_opcode;
        unsigned char   *src_ptr;
        struct channel *com_ptr;

        /*
```

```
** check if a transmission is already in progress if so no action if
** not check to see if there is a packet in the transmit que to transmitt.
** this is done by interogating the get buffer in the tx structure.
*/

com_ptr = &tx[TELEMETRY_LINK];          /*manage the xmiter first*/


if(!com_ptr->busy)
{
        if(com_ptr->buffer[com_ptr->get].flag == READY)
        {
                com_ptr->packet_len = com_ptr->buffer[com_ptr->get].len;
                com_ptr->char_pointer = &(com_ptr->buffer[com_ptr->get].storage[0]);

                --com_ptr->packet_len;
                com_ptr->busy = TRUE;


                asm di;

                spm_controls |= TX_ON;
                *SPM_CONTROLS = spm_controls ^ SPM_CONTROL_MASK;
                asm ei;

                sbuf = *(com_ptr->char_pointer++);

        }/*end if(flag == READY)*/

}/*end if(!com_ptr->busy)*/

}/*close function*/


/*
** FUNCTION:
```

TELEM_IO.C

```
**       initialize_telemetry assures that all structures used by maint_io.c
**                          at a known starting state of 0
**
** Input Definitions:
**                                                No parameters required
**
**   Returned Values:
**                                      No values returned
**
*/
void initialize_telemetry()
{
        clear_memory(&tx[TELEMETRY_LINK],(uint)sizeof(struct channel));
        clear_memory(&rx[TELEMETRY_LINK],(uint)sizeof(struct channel));

}
```

SOFTWARE CONFIGURABLE RADIO

Gideon Ben-Efraim

APPENDIX C

Attorney Docket M-2763 US

Copyright © P-COM, Inc., 1994

Version.H

©P-COM, Inc. 1994

```
*****************************************************************
 *
 * Description: This file contains the version of the software.
 *
 * $Id: _version.h 2.1 1993/12/30 08:32:25 MIKEE Exp $
 *
 * $Log: _version.h $
 * Revision 2.1  1993/12/30  08:32:25  MIKEE
 * converion to MKS RCS
 *
 *
 *    Rev 1.1   18 Dec 1993 14:06:12   mikee
 * Power trip fix release 1.3
 *
 *    Rev 1.0   18 Nov 1993 10:00:56   mikee
 * Initial revision.
 *
 ****************************************************************/

#ifndef __VERSION_H
#define __VERSION_H

/*
    This is the current firmware revision. The MSB is the major
    revision level; the LSB is the minor revision level.
*/
#define VERSION 0x0130

#endif __VERSION_H
```

A2D.H

©P-COM, Inc., 1994

```
/************************************************************
 *
 * Description: This header file contains the interface to
 *              the A2D object, responsible for converting
 *              and reading the analog voltages.
 *
 * $Id: a2d.h 2.1 1993/12/30 08:32:18 MIKEE Exp $
 *
 * $Log: a2d.h $
 * Revision 2.1  1993/12/30  08:32:18  MIKEE
 * converion to MKS RCS
 *
 *
 *    Rev 1.1   17 Nov 1993 16:55:32   mikee
 * misc cleanup
 *
 *    Rev 1.0   01 Nov 1993 15:04:20   mikee
 * Initial revision.
 *
 ************************************************************/

#ifndef _A2D_H
#define _A2D_H

#include "global.h"
#include "pcom_msg.h"

/*
    Function Prototypes:
*/
void A2D_init(void);
void A2D_msg_event(HEADER xdata *msg, uchar xdata *response);
void A2D_timer_event(uchar timer);
uint A2D_check_alarms(void);
uchar A2D_get_agc(void);
uchar A2D_get_temp(void);
bit A2D_alarms_exist(void);

#endif _A2D_H
```

ALARM.H

©P-COM, Inc., 1994

```
/****************************************************************
 *
 * Description: This header file contains the interface to
 *              the alarm.c module.
 *
 * $Id: alarm.h 2.1 1993/12/30 08:32:18 MIKEE Exp $
 *
 * $Log: alarm.h $
 * Revision 2.1  1993/12/30  08:32:18  MIKEE
 * converion to MKS RCS
 *
 *
 *    Rev 1.1   17 Nov 1993 16:56:02   mikee
 * added defines for various alarm conditions
 *
 *    Rev 1.0   01 Nov 1993 15:04:22   mikee
 * Initial revision.
 *
 ****************************************************************/

#ifndef _ALARM_H
#define _ALARM_H

#include "global.h"
#include "pcom_msg.h"

/*
    Bit definitions for summary alarms:
*/
#define NO_ALARM    0x0000
#define TX_ALARM    0x0001
#define RX_ALARM    0x0002
#define SYNTH_ALARM 0x0004
#define MISC_ALARM  0x0008

/*
    Function Prototypes:
*/
void ALARM_init(void);
void ALARM_msg_event(HEADER xdata *msg, uchar xdata *response);
void ALARM_timer_event(uchar timer);

#endif _ALARM_H
```

COMM_OBJ.H

©P-COM, Inc., 1994

```
/*************************************************************
 *
 * Description: This header file contains definitions needed
 *              to use the COMM Object.
 *
 * $Id: comm_obj.h 2.1 1993/12/30 08:32:19 MIKEE Exp $
 *
 * $Log: comm_obj.h $
 * Revision 2.1  1993/12/30  08:32:19  MIKEE
 * converion to MKS RCS
 *
 *
 *    Rev 1.1   17 Nov 1993 16:56:38   mikee
 * misc cleanup
 *
 *    Rev 1.0   01 Nov 1993 15:04:24   mikee
 * Initial revision.
 *
 *************************************************************/

#ifndef _COMM_OBJ_H
#define _COMM_OBJ_H

#include "global.h"
#include "pcom_msg.h"

/*
    COMM Object Instances:
*/
enum
{
    COMM_IDU_INSTANCE,              // telemetry link to IDU
    COMM_EXT_INSTANCE,              // external uart for ext.
synthesizer

    NUM_COMM_INSTANCES              // total number of instances
};

/*
    COMM Attributes:
*/
enum
{
    COMM_MSGS_SENT,            // # messages sent on this link
    COMM_MSGS_RCVD,            // # messages received on this
link
    COMM_BAD_MSGS,             // # bad messages received on
this link
    COMM_BAD_CHARS,            // # bad characters received
    COMM_OUT_OF_BUFFS,         // # times ran out of message
```

©T-COM, Inc., 1994

```
buffers
    COMM_ERROR_CNTR,            // step up/down error counter

    COMM_NORMAL_ATTRS,          // number of normal attributes

    COMM_BAUDRATE = SPECIAL_ATTRIBS, // one of the baud rate
codes below
    COMM_TXRX_ENABLED,          // true if link is enabled
    COMM_RESET_COMMLINK,        // reset the comm link

    COMM_EXT_ATTRS              // number of extended attributes
};

/*
    Baud rate codes:
*/
enum
{
    COMM_300_BAUD, COMM_600_BAUD, COMM_1200_BAUD,
    COMM_2400_BAUD, COMM_4800_BAUD, COMM_9600_BAUD,

    COMM_NUM_BAUD_RATES
};

/*
    Function prototypes:
*/
void COMM_init(void);
void COMM_msg_event(HEADER xdata *msg, uchar xdata *resp);
void COMM_inc_attrib(uchar instance, uchar attrib);

#endif _COMM_OBJ_H
```

DIAG.H ™P-COM, Inc., 1994

```
/*****************************************************************
 *
 * Description: This file contains the defines for the diag
object
 *
 * $Id: diag.h 2.1 1993/12/30 08:32:19 MIKEE Exp $
 *
 * $Log: diag.h $
 * Revision 2.1  1993/12/30  08:32:19  MIKEE
 * converion to MKS RCS
 *
 *
 *    Rev 1.1   17 Nov 1993 16:57:10   mikee
 * misc cleanup
 *
 *    Rev 1.0   01 Nov 1993 15:04:26   mikee
 * Initial revision.
 *
 *    Rev 1.0   18 Sep 1993 13:51:40   mikee
 * Initial revision.
 ****************************************************************/

#ifndef _DIAG_H
#define _DIAG_H

#include "global.h"
#include "pcom_msg.h"

/*
    Function Prototypes:
*/
void DIAG_msg_event(HEADER xdata *msg, uchar xdata *resp);

#endif _DIAG_H
```

FACTORY.H

©P-COM, Inc., 1994

```
/****************************************************************
 *
 * Description: This file contains the definitions for the
 *              Factory Object.
 *
 * $Id: factory.h 2.1 1993/12/30 08:32:19 MIKEE Exp $
 *
 * $Log: factory.h $
 * Revision 2.1  1993/12/30  08:32:19  MIKEE
 * converion to MKS RCS
 *
 *
 *    Rev 1.1   17 Nov 1993 16:57:28   mikee
 * misc cleanup
 *
 *    Rev 1.0   01 Nov 1993 15:04:28   mikee
 * Initial revision.
 *
 ****************************************************************/

#ifndef _FACTORY_H
#define _FACTORY_H

#include "global.h"
#include "pcom_msg.h"

/*
    Function Prototypes:
*/
void FACT_msg_event(HEADER xdata *msg, uchar xdata *response);

#endif _FACTORY_H
```

IO PORTS.H

©P-COM, Inc.,1994

```
/***************************************************************
 *
 * Description:   This header file contains the definitions
 *                for the 80C552 ports.
 *
 * $Id: io_ports.h 2.1 1993/12/30 08:32:20 MIKEE Exp $
 *
 * $Log: io_ports.h $
 * Revision 2.1  1993/12/30  08:32:20  MIKEE
 * converion to MKS RCS
 *
 *
 *    Rev 1.0   01 Nov 1993 15:04:30   mikee
 * Initial revision.
 *
 ***************************************************************/

#ifndef _IO_PORTS_H
#define _IO_PORTS_H

/*
    I/O Port 1:
*/
sbit IO_PLOLOCK       = P1 ^ 0;
sbit IO_OSLOCK        = P1 ^ 1;
sbit IO_EXT_SYNTH_ALM = P1 ^ 2;
sbit IO_FSLOCK        = P1 ^ 3;
sbit IO_TX_CONV_ID    = P1 ^ 4;
sbit IO_TX_MUTE       = P1 ^ 5;
sbit IO_E2CLK         = P1 ^ 6;
sbit IO_E2DTA         = P1 ^ 7;

/*
    I/O Port 3:
*/
sbit IO_RDSW          = P3 ^ 3;

/*
    I/O Port 4:
*/
sbit IO_PLO_ENABLE    = P4 ^ 0;
sbit IO_PLO_CLOCK     = P4 ^ 1;
sbit IO_PLO_DATA      = P4 ^ 2;
sbit IO_FS_CLOCK      = P4 ^ 3;
sbit IO_FS_DATA       = P4 ^ 4;
sbit IO_FS_ENABLE     = P4 ^ 5;
sbit IO_FLASH_A16     = P4 ^ 6;
sbit IO_FLASH_A17     = P4 ^ 7;

#endif _IO_PORTS_H
```

©P-COM, Inc. 1994

```
/***************************************************************
 *
 * Description: This module contains the code responsible for
 *              communicating with Mizar synthesizer chip
 *              through the Signetics SCC2691 UART.
 *
 * $Id: mizar.c 2.1 1993/12/30 08:32:21 MIKEE Exp $
 *
 * $Log: mizar.c $
 * Revision 2.1  1993/12/30  08:32:21  MIKEE
 * converion to MKS RCS
 *
 *
 *    Rev 1.1   17 Nov 1993 16:39:54   mikee
 * rewritten to make it more robust and remove kludges
 *
 *    Rev 1.0   01 Nov 1993 15:04:34   mikee
 * Initial revision.
 *
 **************************************************************/
#include <reg552.h>

#include "global.h"
#include "scc2691.h"
#include "timer.h"
#include "pcom_msg.h"
#include "object.h"
#include "ocm_obj.h"
#include "comm_obj.h"
#include "synth.h"
#include "a2d.h"
#include "io_ports.h"

/*
    States for the state machine below.
*/
enum
{
    WAKING_UP,
    IDLE,
    SEND_WAKEUP_MSG,
    WAITING_FOR_SYNC,
    WAITING_FOR_LEN,
    WAITING_FOR_OPCODE,
    WAITING_FOR_DATA
};

/*
 * External Functions:
 */
```

```
void xdata *MIZAR_getdata(void);
uchar MIZAR_alarm_code(void);
void MIZAR_init(void);
void MIZAR_timer_event(uchar timer);
void MIZAR_set_frequency(uchar channel, uchar rate);
bit MIZAR_is_locked(void);

/*
 * Internal Functions:
 */
static void send_short_cmd(uchar cmd);
static void process_msg(void);
static void send_temp_cmd(void);
static void send_new_channel(uchar channel, uchar rate);
static void send_new_channel(uchar channel, uchar rate);
static uint channel2steps(uchar channel, uchar rate);

/*
 * External Data:
 */

/*
 * Internal Data:
 */
static uchar DataLength;
static uchar Opcode;
static uchar xdata *DataPtr;
static uchar State;
static uchar NewChannel;
static uchar NewRate;
static bit NeedToSendTemp;
static bit NeedToSendChannel;
static bit NeedToReadConfig;
static bit FrequencyLocked;

static struct Mizar_struct
{
    uint min_freq_MHz;                  // minimum frequency (MHz
portion)
    uint min_freq_kHz_10;               // minimum frequency (kHz/10
portion)
    uint freq_step;                     // frequency step (in kHz/10)
    uint max_freq;                      // maximum frequency (in
freq. steps)
    uint actual_freq;                   // actual frequency (in freq.
steps)
    uchar reserved1;                    // reserved by Mizar
    uint reserved2;                     // reserved by Mizar
    uint reserved3;                     // reserved by Mizar
    uchar alarmcode;                    // alarm code (0 means OK)
```

©P-COM, Inc. 1994

```
} xdata MizarData;

void xdata *MIZAR_getdata(void)
{
    return &MizarData;
}
uchar MIZAR_alarm_code(void)
{
    return MizarData.alarmcode;
}
/***************************************************************
 *
 * Name:        void MIZAR_init(void)
 *
 * Description: This function initializes the Mizar synthesizer
 *              interface.
 *
 ***************************************************************/
void MIZAR_init(void)
{
    my_memclr((uchar xdata *)&MizarData, sizeof(MizarData));
    FrequencyLocked = 0;
    NeedToSendTemp = NeedToSendChannel = 0;
    NeedToReadConfig = 1;

    /*
        This timer is used to wake us up to process whatever may
be
        happening, like sending and receiving messages.
    */
    TIMER_register(MIZAR_TIMER, OCM_OBJ, 500, 100);
    State = WAKING_UP;

    /*
        We need to update the Mizar with the outside temperature
every
        minute or so.
    */
    TIMER_register(MIZAR_TEMP_TIMER, OCM_OBJ, 15000, 60000);
}

/***************************************************************
 *
 * Name:        void MIZAR_timer_event(uchar timer)
 *
 * Description: This function processes the timer event for
 *              the Mizar synth. It is responsible for
 *              setting up transactions to interrogate the
 *              synthesizer as to its current configuration,
 *              reading back that configuration, setting the
```

```
 *              frequency and the temperature.
 *
 ***************************************************************/
void MIZAR_timer_event(uchar timer)
{
    uchar ch;

    /*
        We must update the Mizar with the current temperature
every
        so often. The temperature is in the same format we get
from
        reading the A2D temperature reading.
    */
    if(timer == MIZAR_TEMP_TIMER)
        NeedToSendTemp = 1;

    /*
        While in certain states, we can do things even if no
character
        has been received from the synthesizer. Check for those
states
        first.
    */
    switch(State)
        {
        case WAKING_UP:
            /*
                Initialize the external UART used to communicate
with the Mizar.
            */
            SCC2691_init();
            State = SEND_WAKEUP_MSG;
            return;

        case SEND_WAKEUP_MSG:
            /*
                We are starting or restarting the wakeup sequence
for the
                Mizar synthesizer.
            */
            send_short_cmd(0x00);
            return;

        case IDLE:
            /*
                Since we're not doing anything else, let's check
to
                see if we need to send the channel or the
temperature.
```

```
            */
            if(NeedToSendChannel)
                {
                send_new_channel(NewChannel, NewRate);
                NeedToSendChannel = 0;
                }
            else if(NeedToSendTemp)
                {
                send_temp_cmd();
                NeedToSendTemp = 0;
                }
            else if(NeedToReadConfig)
                {
                send_short_cmd(0x03);
                NeedToReadConfig = 0;
                }
            return;
        }

    /*
        We haven't received a character when we were expecting
one for
        a while. Try to wake up the synthesizer again.
    */
    if(TIMER_expired(MIZAR_TIMEOUT_TIMER))
        {
        MIZAR_init();
        return;
        }

    /*
        If we get this far, we must be waiting for a character to
be
        received before we can continue.
    */
    while(SCC_rcv_byte(&ch))
        {
        switch(State)
            {
            /*
                We are waiting for a response from the Mizar.
            */
            case WAITING_FOR_SYNC:
                if(ch == 0xAA)
                    State = WAITING_FOR_LEN;
                break;

            /*
                We are waiting for the length byte, which
specifies the
```

```
            length of the message, including the opcode byte
and this
            length byte itself. The actual number of data
bytes to
            follow is computed by subtracting two bytes (the
opcode
            and length bytes) from this value.
        */
        case WAITING_FOR_LEN:
            DataLength = ch-2;
            State = WAITING_FOR_OPCODE;
            break;

        /*
            We are waiting for the opcode byte, which tells
us what
            to expect from the rest of this message.
        */
        case WAITING_FOR_OPCODE:
            Opcode = ch;
            if(DataLength)
                {
                State = WAITING_FOR_DATA;
                DataPtr = (uchar xdata *)&MizarData;
                }
            else
                {
                process_msg();
                return;
                }
            break;

        /*
            We are waiting for all the data bytes to be
received.
            When all the data bytes are received, process the
            received message.
        */
        case WAITING_FOR_DATA:
            *DataPtr++ = ch;
            if(--DataLength == 0)
                {
                process_msg();
                return;
                }
            break;
        }
    }
}
```

```
/**************************************************************
 *
 * Name:        void process_msg(void)
 *
 * Description: This function is called when a full message
 *              is received from the external synthesizer.
 *
 **************************************************************/
static void process_msg(void)
{
    uint freq;
    uchar chan, rate;

    /*
        Increment the number of messages received on this link.
    */
    COMM_inc_attrib(COMM_EXT_INSTANCE, COMM_MSGS_RCVD);

    /*
        Mark that we are not currently busy.
    */
    State = IDLE;

    /*
        If we get Opcode==4, we have just received the
        external synthesizer's configuration. If we didn't
        get this, then we need to request the configuration
again.
        If the Alarm code is not 0, we are not locked yet.
    */
    if((Opcode != 4) || (MizarData.alarmcode != 0))
        {
        NeedToReadConfig = 1;
        return;
        }

    /*
        We just received the configuration, and we are locked.
    */
    FrequencyLocked = 1;

    switch(MizarData.min_freq_MHz)
        {
        case 13578: OCM_PLO_Id = 1; break;
        case 13765: OCM_PLO_Id = 2; break;
        case 11548: OCM_PLO_Id = 3; break;
        case 11735: OCM_PLO_Id = 4; break;
        default:    OCM_PLO_Id = 0xff; break;
        }
```

```
    /*
        Check to make sure the synthesizer is locked on the right
        frequency. If not, we'd better ask it to try again!
    */
    chan = OCM_get_channel();
    rate = OCM_get_rate();
    freq = channel2steps(chan, rate);
    if(freq != MizarData.actual_freq)
        MIZAR_set_frequency(chan, rate);
}

/**************************************************************
 *
 * Name:        uint channel2steps(uchar channel, uchar rate)
 *
 * Description: This function takes the channel and rate and
 *              copmutes the number of steps for the Mizar.
 *
 **************************************************************/
static uint channel2steps(uchar channel, uchar rate)
{
    /*
        The channel passed to us is 1-based. Subtract 1 to make
it 0-based.
    */
    channel--;

    /*
        The Mizar frequency is set as a number of steps. There
are
        14 steps per channel, unless we're in 4x2, where there
are 28.
    */
    if(rate == RATE_4x2)
        return ((uint)channel) * 28 + 7;
    else return ((uint)channel) * 14;
}

/**************************************************************
 *
 * Name:        void send_short_cmd(uchar cmd)
 *
 * Description: This function sends a short (3-byte) command
 *              to the external synthesizer. It also sets
 *              the State variable and the timeout timer for
 *              the state machine in the timer event.
 *
 **************************************************************/
static void send_short_cmd(uchar cmd)
{
```

```
    SCC_sendbyte(0xAA);                  // sync
    SCC_sendbyte(0x02);                  // only two bytes
    SCC_sendbyte(cmd);
    State = WAITING_FOR_SYNC;
    TIMER_set(MIZAR_TIMEOUT_TIMER, 5000);

    /*
        Increment the number of messages sent on this link.
    */
    COMM_inc_attrib(COMM_EXT_INSTANCE, COMM_MSGS_SENT);
}

/**************************************************************
 *
 * Name:        void send_temp_cmd(uchar cmd)
 *
 * Description: This function sends the "set temperature" command
 *              to the external synthesizer. It also sets
 *              the State variable and the timeout timer for
 *              the state machine in the timer event.
 *
 **************************************************************/
static void send_temp_cmd(void)
{
    SCC_sendbyte(0xAA);                  // sync
    SCC_sendbyte(0x03);                  // length
    SCC_sendbyte(0x06);                  // set temperature opcode
    SCC_sendbyte(A2D_get_temp());

    State = WAITING_FOR_SYNC;
    TIMER_set(MIZAR_TIMEOUT_TIMER, 5000);

    /*
        Increment the number of messages sent on this link.
    */
    COMM_inc_attrib(COMM_EXT_INSTANCE, COMM_MSGS_SENT);
}

/**************************************************************
 *
 * Name:        void MIZAR_set_frequency(uchar channel, uchar
rate)
 *
 * Description: This function is called when a new channel is
 *              to be set on the external synthesizer. All
 *              all we need to do here is set the appropriate
 *              flags and it will get updated the next time
 *              it gets a chance.
 *
 **************************************************************/
```

```
void MIZAR_set_frequency(uchar channel, uchar rate)
{
    NewChannel = channel;
    NewRate = rate;
    NeedToSendChannel = 1;
}

/**********************************************************
 *
 * Name:        void send_new_channel(uchar channel, uchar rate)
 *
 * Description: This function sets the frequency of the
 *              external synthesizer for a particular channel.
 *
 *              NOTE: This assumes that the Mizar is configured
 *              with channel 1 as its minimum frequency, and
 *              a step size of 0.16667 MHz.
 *
 **********************************************************/
static void send_new_channel(uchar channel, uchar rate)
{
    uint nsteps;

    /*
        Compute the number of steps.
    */
    nsteps = channel2steps(channel, rate);

    /*
        The Mizar dies if it gets a frequency step it can't
handle.
    */
    if(nsteps > MizarData.max_freq)
        return;

    /*
        Send the command to change the frequency.
    */
    SCC_sendbyte(0xAA);
    SCC_sendbyte(0x04);
    SCC_sendbyte(0x05);            // set frequency opcode
    SCC_sendbyte(nsteps >> 8);
    SCC_sendbyte(nsteps & 0xff);
    TIMER_set(MIZAR_TIMEOUT_TIMER, 5000);

    State = WAITING_FOR_SYNC;
    FrequencyLocked = 0;

    /*
        Increment the number of messages sent on this link.
```

©P-COM, Inc. 1994

```
    */
    COMM_inc_attrib(COMM_EXT_INSTANCE, COMM_MSGS_SENT);
}

/****************************************************************
 *
 * Name:          bit MIZAR_is_locked(void)
 *
 * Description: This function returns whether the Mizar has
 *                its frequency locked. It checks both the external
 *                output (which goes on too soon on early versions
 *                of the Mizar) and the last received software
alarmcode.
 *                The software code is always correct, and the
 *                external output is just a sanity check.
 *
 ***************************************************************/
bit MIZAR_is_locked(void)
{
    return (FrequencyLocked && IO_EXT_SYNTH_ALM);
}
```

Novram.C

©P-COM, Inc. 1994

```
/*****************************************************************
 *
 * Description: This file contains the functions that handle
 *              the novram
 *
 * $Id: novram.c 2.1 1993/12/30 08:32:16 MIKEE Exp $
 *
 * $Log: novram.c $
 * Revision 2.1  1993/12/30  08:32:16  MIKEE
 * converion to MKS RCS
 *
 *
 *    Rev 1.4   17 Nov 1993 16:40:44   mikee
 * misc cleanup
 *
 *    Rev 1.3   01 Nov 1993 15:04:36   mikee
 * Check in for release 1.0 (first production release)
 *****************************************************************/

#include <reg552.h>
#include "global.h"
#include "io_ports.h"
#include "timer.h"
#include "novram.h"
#include "pcom_msg.h"
#include "object.h"
#include "version.h"

/*
 * Flag values
 */
#define NV_NOT_VALID    0xff    /* used to invalidate the section
*/
#define NV_UPDT_IN_PROG 0xa5    /* section being updated */
#define NV_UP_TO_DATE   0x5a    /* section is up to date */

/*
 * Defines for a 2404
 */
#define BYTES_PER_WRITE 16

#define SET 1
#define CLR 0

/*
    Object Offsets:
*/
#define NV_ALARM_OFFSET      0x10     // page 1, offset 0x20
#define NV_COMM_OFFSET       0x20     // page 1, offset 0x40
#define NV_A2D_OFFSET        0x28     // page 1, offset 0x50
```

©P-COM, Inc. 1994

```
/*
 * External Functions
 */
uchar NOVRAM_init();
bit NOVRAM_write(uchar *source, uchar e2_addr, uchar length,
uchar sheet);
bit NOVRAM_read(uchar *destination, uchar e2_addr, uchar length,
uchar sheet);

/*
 * Internal Functions
 */
static void send_ack(void);
static void send_byte(uchar);
static bit NV_clr_novram(void);

/*
 * External Data
 */

/*
 * Internal Data
 */
static uchar Rel_Index;
static bit Good_Nov;
static uchar xdata NV_offset_table[16];
static uchar xdata NV_buffer[256];

/***************************************************************
 *
 * Name:        void NV_e2clk(bit x)
 *
 * Description: This function sets the e2clock bit to the
 *              specified state.
 *
 ***************************************************************/
static void NV_e2clk(bit x)
{
    IO_E2CLK = x;
}

/***************************************************************
 *
 * Name:        void NV_e2data(bit x)
 *
 * Description: This function sets the e2data bit to the
 *              specified state.
 *
 ***************************************************************/
static void NV_e2data(bit x)
```

```
{
    IO_E2DTA = x;
}

/*************************************************************
 *
 * Name:        bit NV_get_e2data(void)
 *
 * Description: This routine reads a single bit from EEPROM.
 *
 *************************************************************/
static bit NV_get_e2data(void)
{
   return(IO_E2DTA);
}

/*************************************************************
 *
 * Name:        bit NV_e2rcv_ack(void)
 *
 * Description: This function returns the EEPROM results field
 *
 *************************************************************/
static bit NV_e2rcv_ack(void)
{
    bit result;

    /*
     * Returns TRUE if ACK and FALSE otherwise
     */
    NV_e2data(SET);
    NV_e2clk(SET);
    NV_e2clk(SET);
    result = !IO_E2DTA;
    NV_e2clk(CLR);

    return(result);
}

/*************************************************************
 *
 * Name: NOVRAM_init()
 *
 * Description: Initializes novram functions
 *
 *************************************************************/
uchar NOVRAM_init(void)
{
    uchar mast_flag;
```

```
//  Rel_Index = NUM_SUPPORT_RELS - 1;
    Rel_Index = 0;

    /*
     * Read the Master novram flag and check if there is any good
data
     * in novram to read
     */
    Good_Nov = FALSE;
    if (NOVRAM_read(&mast_flag, NV_MASTER_LOC, 1, PAGE_1) !=
FALSE)
    {
        if ((mast_flag == NV_UP_TO_DATE) ||
            (mast_flag == NV_UPDT_IN_PROG))
            Good_Nov = TRUE;
        else
            NV_clr_novram();
    }

    if (Good_Nov == FALSE)
        return(0);

    /*
        Read the object offset table into RAM (we'll be referring
to it
        fairly often).
    */
    if( ! NOVRAM_read(NV_offset_table, NV_OBJECT_TABLE_LOC, 16,
PAGE_1))
        return 0;

    /*
     * Read the release of firmware used to save the novram then
     * find the index into the object's starting address table.
     */
//  if (NOVRAM_read(&fw_rel, NV_FW_REL_LOC, 1, PAGE_1) != FALSE)
//  {
//      for (i = 0; i < NUM_SUPPORT_RELS; i++)
//          if (fw_rel > Releases[i])
//              break;
//
//      if (i < NUM_SUPPORT_RELS)
//          Rel_Index = i;
//  }
//  else
//      return(0);

    return(1);
}
```

```
/****************************************************************
 *
 * Name:        bit NV_clr_novram(void)
 *
 * Description: This function is used to initialize and "format"
 *              the NOVRAM.
 *
 ***************************************************************/
bit NV_clr_novram(void)
{
    uchar xdata *ptr = NV_buffer;
    uchar page;
    uchar offset;
    uint version = Version();

    /*
        First write that we are updating.
    */
    NV_buffer[0] = NV_UPDT_IN_PROG;
    if( ! NOVRAM_write(NV_buffer, NV_MASTER_LOC, 1, PAGE_1))
        return FALSE;

    /*
        Next, fill in the object offset table. 0 means there is
        no data.
    */
    my_memclr(NV_buffer, 16);
    NV_buffer[ALARM_OBJ] = NV_ALARM_OFFSET;
    NV_buffer[COMM_OBJ] = NV_COMM_OFFSET;
    NV_buffer[A2D_OBJ] = NV_A2D_OFFSET;
    NOVRAM_write(NV_buffer, NV_OBJECT_TABLE_LOC, 16, PAGE_1);

    /*
        Now write 0 into the object's length fields, so there
        will be no valid data.
    */
    NV_buffer[0] = 0;
    offset = (NV_ALARM_OFFSET & 0x7f) << 1;
    page = (NV_ALARM_OFFSET & 0x80 ? PAGE_2 : PAGE_1);
    NOVRAM_write(NV_buffer, offset, 1, page);

    offset = (NV_COMM_OFFSET & 0x7f) << 1;
    page = (NV_COMM_OFFSET & 0x80 ? PAGE_2 : PAGE_1);
    NOVRAM_write(NV_buffer, offset, 1, page);

    offset = (NV_A2D_OFFSET & 0x7f) << 1;
    page = (NV_ALARM_OFFSET & 0x80 ? PAGE_2 : PAGE_1);
    NOVRAM_write(NV_buffer, offset, 1, page);

    /*
```

```
        Now, mark that we are done with the update.
    */
    ptr = NV_buffer;
    *ptr++ = NV_UP_TO_DATE;
    *ptr++ = version >> 8;
    *ptr++ = version & 0xff;
    NOVRAM_write(NV_buffer, NV_MASTER_LOC, 3, PAGE_1);

    return TRUE;
}

/****************************************************************
 *
 * Name:        NOVRAM_write
 *
 * Description: This function writes a string of bytes to a 24c04
 *              EEPROM. Returns TRUE or FALSE
 *
 ***************************************************************/

bit NOVRAM_write(source, e2_addr, length, sheet)

uchar *source;      /* pointer to start of data to transmit */
uchar e2_addr;      /* starting eeprom address to write to */
uchar length;       /* number of bytes to write to eeprom */
                    /* if dummy write, length must be >0 */
uchar sheet;        /* 0 or 1. if dummy write then 2 or 3 */
{
     uchar command, index;
     uint x;
    void update_watchdog(void);

    update_watchdog();

    NV_e2data(SET);

     while(length)
     {
          command = (0xa0 | ((sheet<<1) & 0x02));
        /*
          * First we poll eeprom to see if internal write cycle
is in progress.
          * If it is, wait until it's finished.  If the device
is bad, we
          * will detect no ACK and return.
          *
          */
        TIMER_set(NOVRAM_TIMER, 50);
          do
        {
```

```
      NV_e2clk(SET);          /* Generate a start bit */
      NV_e2data(CLR);
      NV_e2clk(CLR);

          send_byte(command);
    }
    while(!TIMER_expired(NOVRAM_TIMER) && !NV_e2rcv_ack());

    if (TIMER_expired(NOVRAM_TIMER))
      return(FALSE);

  /*
     * Now we can initiate start of transmission
     */
  NV_e2data(SET);     /* Generate a start bit */
  NV_e2clk(SET);
  NV_e2data(CLR);
  NV_e2clk(CLR);

    /*
     * Send device identifier, device address,
     * sheet, and write command byte
     */
    send_byte(command);
    if (!NV_e2rcv_ack())
      return(FALSE);

    /*
     * send storage address
     */
  send_byte(e2_addr);
    if (!NV_e2rcv_ack())
      return(FALSE);

    /*
     * if bit one of sheet is set, this is a dummy write
     */
    if (sheet & 0x02)
      break;

    /*
     * Now the chip is set up so
     * send 1 to 16 data bytes at a time
   *
   * Loop will stop if we reach 16 bytes,
   *      or if we reach the end of a page
   *      or if we run out of data
    */
   for (index = 0; index < 16; index++)
   {
```

```
                send_byte(*(source++));
                if (!NV_e2rcv_ack())
                 return (FALSE);
                e2_addr++;

            if (!--length)
                break;

            if ((e2_addr & 0x0f) == 0)
                break ;
          }

          /*
           * Now the data has been sent, so
           * send the stop bit
           */
        NV_e2data(CLR);
        NV_e2clk(SET);
        NV_e2data(SET);
     }
     return(TRUE);
}

/***************************************************************
 *
 * Name: NOVRAM_read
 *
 * Description: This function reads a variable number of bytes
 *              from a 24c04 EEPROM.
 *              Returns TRUE or FALSE
 *
 ***************************************************************/
bit NOVRAM_read(destination, e2_addr, length, sheet)

uchar *destination;      /* pointer to destination of bytes being
read */
uchar e2_addr;           /* eeprom address to read from */
uchar length;            /* number of bytes to read */
uchar sheet;             /* sheet 0 or 1 */
{
     uchar byte, command;
     char tidbit;
    void update_watchdog(void);

    update_watchdog();

    /*
      * First, do a dummy write to get the eeprom's attention
      */
     sheet |= 0x02;
```

©P-COM, Inc. 1994

```
    if (NOVRAM_write(destination, e2_addr, 1, sheet) == FALSE)
        return (FALSE);

    /*
     * Issue a start bit
     */
    NV_e2data(SET);
    NV_e2clk(SET);
    NV_e2data(CLR);
    NV_e2clk(CLR);

    /*
     * send device identifier, device address,
     * sheet, and write command byte
     */
    command = (0xa1 | ((sheet<<1) & 0x02));

    send_byte(command);
    if (!NV_e2rcv_ack())
       return(FALSE);

    /*
     * read the number of bytes
     * requested in length
     */
    while(length--)
       {
         byte = 0;
         for (tidbit = 7; tidbit >= 0; tidbit--)
       {
              NV_e2data(SET);
              NV_e2clk(SET);
              byte |= ((uchar)NV_get_e2data() << tidbit);
              NV_e2clk(CLR);
         }

         *(destination++) = byte;
         if (length)
           send_ack();
    }

    /*
     * send stop bit
     */
    NV_e2data(CLR);
    NV_e2clk(SET);
    NV_e2data(SET);
    return(TRUE);
}
```

Novram.C

©P-COM, Inc. 1994

```
/*************************************************************
 *
 * Name: send_ack
 *
 * Description: This routine sends an acknowledgement to the
24c04
 *
 *************************************************************/
static void send_ack()
{
     NV_e2data(CLR);
     NV_e2clk(SET);
     NV_e2clk(SET);
     NV_e2clk(CLR);
}

/*************************************************************
 *
 * Name:          void send_byte(uchar data_byte)
 *
 * Description: This routine send a byte to a 24c04 EEPROM
 *
 *************************************************************/
static void send_byte(uchar data_byte)
{
     uchar mask;

     mask = 0x80;
    do  {
          NV_e2data((data_byte & mask) ? 1 : 0);
          NV_e2clk(SET);
          NV_e2clk(SET);
          NV_e2clk(CLR);

        mask >>= 1;
        }
    while(mask);
}

/*************************************************************
 *
 * Name:          uchar NV_object_offset(uchar object)
 *
 * Description: This function returns the offset of an object's
 *              NOVRAM area, or 0 if this is not possible.
 *
 *************************************************************/
static uchar NV_object_offset(uchar object)
{
    if( ! Good_Nov)
```

```
        return 0;
    else return NV_offset_table[object];
}

/*************************************************************
 *
 * Name:        bit NV_read_all_attr()
 *
 * Description: This function reads all the saved attribute
 *              values for a given object.
 *
 *************************************************************/
#if 0               // this line is just so Brief can find this
function
NV_read_all_attr()
#endif
bit NV_read_all_attr(uchar object, uchar num_inst,
    uchar (*set_attrib)(uchar,uchar,uint))
{
    uchar offset;
    uchar page;
    uchar numvals;
    uchar xdata *ptr;
    uchar inst, attr;
    uchar entry_size;
    uint value;
    void fix_franklin_overlay_problem(void);

    fix_franklin_overlay_problem();

    entry_size = (num_inst > 1 ? 4 : 3);

    /*
        Read the object's offset from NOVRAM.
        The offset is stored with the MSbit as the page (0 or 1),
        with the remaining 7 bits as the even-aligned actual
offset.
        Restore this to a page and the actual offset.
        If we get back 0, there is nothing here for us.
    */
    offset = NV_object_offset(object);
    if( ! offset)
        return FALSE;
    if(offset & 0x80)
        page = 1;
    else page = 0;
    offset <<= 1;

    /*
        Read the number of entries we should be expecting.
```

```
    */
    if( ! NOVRAM_read(&numvals, offset, 1, page))
        return FALSE;

    /*
        Now pre-read all the values into an array. There could be
        either 3 bytes per value (if the object has only 1
instance)
        or 4 bytes per value (if we have to save instances too).
    */
    ptr = NV_buffer;
    if( ! NOVRAM_read(ptr, offset+1, entry_size * numvals, page))
        return FALSE;

    while(numvals--)
        {
        if(num_inst > 1)
            inst = *ptr++;
        attr = *ptr++;
        value = (*ptr++) << 8;
        value |= *ptr++;
        set_attrib(inst, attr, value);
        }
}

/****************************************************************
 *
 * Name:          bit NV_save_all_attr()
 *
 * Description: This function saves all the NOVRAM attribute
 *              values for a given object.
 *
 ****************************************************************/
#if 0              // this line is just so Brief can find this
function
NV_save_all_attr()
#endif
bit NV_save_all_attr(uchar object, uchar num_inst, uchar
attr_tab[],
    uchar (*get_attrib)(uchar,uchar,uint *))
{
    uchar offset;
    uchar page;
    uchar numvals;
    uchar xdata *ptr;
    uchar inst, attr;
    uchar attr_index;
    uchar entry_size;
    static uint value;
```

```
    void fix_franklin_overlay_problem(void);

    fix_franklin_overlay_problem();

    entry_size = (num_inst > 1 ? 4 : 3);
    /*
        Read the object's offset from NOVRAM.
        The offset is stored with the MSbit as the page (0 or 1),
        with the remaining 7 bits as the even-aligned actual
offset.
        Restore this to a page and the actual offset.
        If we get back 0, there is nothing here for us.
    */
    offset = NV_object_offset(object);
    if( ! offset)
        return FALSE;
    if(offset & 0x80)
        page = 1;
    else page = 0;
    offset <<= 1;

    numvals = 0;

    /*
        Now fill an array with all the values we need to write
        There could be either 3 bytes per value (if the object
has
        only 1 instance) or 4 bytes per value (if we have to save
        instances too).
    */
    ptr = NV_buffer+1;      // skip a byte for the number of
values

    for(inst = 0; inst < num_inst; inst++)
        {
        for(attr_index = 0; attr_tab[attr_index] != NO_MORE_ATTR;
attr_index++)
            {
            if(num_inst > 1)
                *ptr++ = inst;
            attr = attr_tab[attr_index];
            *ptr++ = attr;
            get_attrib(inst, attr, &value);
            *ptr++ = (uchar)(value >> 8);
            *ptr++ = value & 0xff;
            numvals++;
            }
        }

    NV_buffer[0] = numvals;
```

©P-COM, Inc. 1994

```
    return NOVRAM_write(NV_buffer, offset, entry_size * numvals +
1, page);
}
```

Object.C ©P-COM, Inc., 1994

```
/*************************************************************
 *
 * Description: This module contains code pertaining to
 *              the managed objects in the ODU.
 *
 * $Id: object.c 2.1 1993/12/30 08:32:21 MIKEE Exp $
 *
 * $Log: object.c $
 * Revision 2.1  1993/12/30  08:32:21  MIKEE
 * converion to MKS RCS
 *
 *
 *    Rev 1.1   17 Nov 1993 16:41:12   mikee
 * misc cleanup
 *
 *    Rev 1.0   01 Nov 1993 15:04:38   mikee
 * Initial revision.
 *
 ************************************************************/
#include "global.h"
#include "pcom_msg.h"
#include "object.h"
#include "diag.h"
#include "comm_obj.h"
#include "ocm_obj.h"
#include "timer.h"
#include "a2d.h"
#include "odu.h"
#include "alarm.h"
#include "factory.h"

/*
    Internal functions:
*/
static void OBJ_unknown_msg(HEADER xdata *msg, uchar xdata
*response);
static void OBJ_add_attrib(uchar xdata **pptr, uchar attr, uint
val);
static uchar OBJ_next_attr(HEADER *msg);

/*
    This is the object table definition.
    The init_obj function is called to initialize the object at
startup.
    The msg_event function is called when a message is received
for this
    object. The timer_event function is called when a timer
expires
    which is associated with this object.
    NOTE: This table must correspond to the enum list in
```

Object.C ©P-COM, Inc., 1994

```
OBJECT.H.
*/
static xdata struct
{
    void (code *init_obj)(void);
    void (code *msg_event)(HEADER xdata *, uchar xdata *);
    void (code *timer_event)(uchar timer);
} Objects[] =
{
    { NULL, NULL, NULL },                                       // Radio
Object
    { COMM_init, COMM_msg_event, NULL },                        // Comm
Object
    { NULL, NULL, NULL },                                       // SPM
Object
    { ALARM_init, ALARM_msg_event, ALARM_timer_event },         // Alarm
Object
    { A2D_init, A2D_msg_event, A2D_timer_event},                // A2D
Object
    { NULL, NULL, NULL },                                       // Link
Object
    { NULL, NULL, NULL },                                       // Line
Object
    { NULL, NULL, NULL },                                       // FCP
Object
    { ODU_init, ODU_msg_event, NULL },                          // ODU
Object
    { NULL, NULL, NULL },                                       // Remote
Object
    { NULL, DIAG_msg_event, NULL },                             // Memory
Object
    { NULL, TIMER_msg_event, NULL },                            // Timer
Object
    { OCM_init, OCM_msg_event, OCM_timer_event},                // OCM
Object
    { NULL, NULL, NULL }                                        // IDU
Object
};

/**************************************************************
 *
 * Name:        void OBJ_init(void)
 *
 * Description: This function calls each object's initialization
 *              callback function, if it has one.
 *
 **************************************************************/
void OBJ_init(void)
{
    int i;
```

Object.C ©P-COM, Inc., 1994

```
    void (code *init_fn)(void);
    bit franklin_bug = 0;

    if(franklin_bug)
        {
        A2D_init();
        ALARM_init();
        COMM_init();
        OCM_init();
        ODU_init();
        }
    /*
        Check all managed objects for initialization functions.
    */
    for(i = 0; i < NUM_OBJECTS; i++)
        if((init_fn = Objects[i].init_obj) != NULL)
            init_fn();
}

/**************************************************************
 *
 * Name:        OBJ_call_msg_event
 *
 * Description: This function is called whenever a valid message
 *              is received on the telemetry link. Given the
 *              object for which this message is supposedly
 *              destined, we try to pass it to this object via
 *              the object's message event callback function. If
 *              the object has no message event callback, then we
 *              reply to the message with an error response.
 *
 **************************************************************/
void OBJ_call_msg_event(uchar obj, HEADER xdata *msg, uchar xdata
*resp)
{
    void (*callback)(HEADER xdata *, uchar xdata *);
    bit franklin_bug = 0;

    if(franklin_bug)
        {
        COMM_msg_event(NULL, NULL);
        A2D_msg_event(NULL, NULL);
        ALARM_msg_event(NULL, NULL);
        ODU_msg_event(NULL, NULL);
        DIAG_msg_event(NULL, NULL);
        TIMER_msg_event(NULL, NULL);
        OCM_msg_event(NULL, NULL);
        }

    if(obj == FACTORY_OBJ)
```

```
        FACT_msg_event(msg, resp);
    else
        {
        callback = Objects[obj].msg_event;
        if( ! callback)
            callback = OBJ_unknown_msg;
        callback(msg, resp);
        }
}

/***************************************************************
 *
 * Name:        OBJ_call_timer_event
 *
 * Description: This function is called whenever a timer expires
 *              which has been registered to call an object's
 *              timer event callback function.
 *
 ***************************************************************/
void OBJ_call_timer_event(uchar obj, uchar timer)
{
    void (*callback)(uchar timer);
    bit franklin_bug = 0;

    if(franklin_bug)
        {
        A2D_timer_event(0);
        ALARM_timer_event(0);
        OCM_timer_event(0);
        }

    callback = Objects[obj].timer_event;
    if(callback)
        callback(timer);
}

/***************************************************************
 *
 * Name:        void OBJ_unknown_msg(HEADER *msg, uchar
*response)
 *
 * Description: This function is called if a message is received
 *              addressed to an object with no message handler
 *              callback function.
 *
 ***************************************************************/
static void OBJ_unknown_msg(HEADER xdata *msg, uchar xdata
*response)
{
    msg->data_length = 0;
```

Object.C ©P-COM, Inc., 1994

```
    PCOM_send_resp(msg, UNKNOWN_OBJECT);
}

/************************************************************
 *
 * Name:        void OBJ_add_attrib(uchar **ptr, uchar attr, uint
val)
 *
 * Description: This function adds an attribute and a value
 *              to a response string.
 *
 ************************************************************/
static void OBJ_add_attrib(uchar xdata **pptr, uchar attr, uint
val)
{
    uchar xdata *ptr = *pptr;

    if(attr != NO_MORE_ATTR)
        *ptr++ = attr;
    *ptr++ = (uchar)(val >> 8);
    *ptr++ = val & 0xff;
    *pptr = ptr;
}

/************************************************************
 *
 * Name:        uchar OBJ_next_attr(HEADER *msg)
 *
 * Description: This message figures out if there is a valid
 *              attribute number at the next point in the
 *              array pointed to by msg->data_ptr. If there
 *              is, the attribute number is returned; otherwise,
 *              NO_MORE_ATTR is returned.
 *
 ************************************************************/
static uchar OBJ_next_attr(HEADER *msg)
{
    uchar bytes_done = msg->data_ptr - msg->msgdata;

    if((bytes_done < msg->data_length) && (*msg->data_ptr !=
NO_MORE_ATTR))
        return *(msg->data_ptr)++;
    else return NO_MORE_ATTR;
}

/************************************************************
 *
 * Name:        OBJ_process_all_inst
 *
 * Description: This function is called to process a command
```

Object.C ©P-COM, Inc., 1994

```
 *              which is supposed to affect all instances
 *              of a given attribute.
 *
 ***********************************************************/
#if 0        // this line is just so Brief can find this function
OBJ_process_all_inst()
#endif
uchar OBJ_process_all_inst(HEADER xdata *msg, uchar xdata
**ptr_resp,
    uchar (*set_attrib)(uchar,uchar,uint),
    uchar (*get_attrib)(uchar,uchar,uint *),
    uchar num_inst)
{
    uchar xdata *rptr = *ptr_resp;
    uchar inst;
    uchar attrib;
    uint value;
    uchar status = NO_ERROR;

    attrib = *msg->data_ptr++;
    *rptr++ = attrib;
    for(inst = 0; (inst < num_inst) && (status == NO_ERROR);
inst++)
        {
        if(msg->opcode == GET_CMD)
            {
            if((status = get_attrib(inst, attrib, &value)) ==
NO_ERROR)
                OBJ_add_attrib(&rptr, NO_MORE_ATTR, value);
            }
        else if(msg->opcode == SET_CMD)
            {
            value = *(msg->data_ptr)++ << 8;
            value |= *(msg->data_ptr)++;
            status = set_attrib(inst, attrib, value);
            }
        else status = INVALID_OPCODE;
        }

    *ptr_resp = rptr;
    return status;
}

/************************************************************
 *
 * Name:        void fix_franklin_overlay_problem(void)
 *
 * Description:
 *      Since the 8051 doesn't have much stack space, function
parameters
```

Object.C

©P-COM, Inc., 1994

```
 *       are passed in fixed memory locations. Because memory is
limited,
 *       too, the Franklin compiler "overlays" this memory.
Actually, it
 *       reuses the same memory locations for different functions
if
 *       it thinks these functions cannot be executing at the same
time.
 *       Unfortunately, there is no provision for indirect
function calls.
 *       This is why we must do something stupid, like tricking
the compiler
 *       into thinking we might call all these functions directly,
so it
 *       won't reuse the same memory locations.
 *       Guess how we found this out?
 *
 ***********************************************************/
void fix_franklin_overlay_problem(void)
{
    extern uchar A2D_set_attrib(uchar inst, uchar attrib, uint
value);
    extern uchar A2D_get_attrib(uchar inst, uchar attrib, uint
*value);
    extern uchar ALARM_set_attrib(uchar inst, uchar attrib, uint
value);
    extern uchar ALARM_get_attrib(uchar inst, uchar attrib, uint
*value);
    extern uchar COMM_set_attrib(uchar inst, uchar attrib, uint
value);
    extern uchar COMM_get_attrib(uchar inst, uchar attrib, uint
*value);
    extern uchar OCM_set_attrib(uchar inst, uchar attrib, uint
value);
    extern uchar OCM_get_attrib(uchar inst, uchar attrib, uint
*value);
    extern uchar ODU_set_attrib(uchar inst, uchar attrib, uint
value);
    extern uchar ODU_get_attrib(uchar inst, uchar attrib, uint
*value);
    extern uchar TIMER_set_attrib(uchar inst, uchar attrib, uint
value);
    extern uchar TIMER_get_attrib(uchar inst, uchar attrib, uint
*value);
    bit franklin_overlay_problem = 1;

    if( ! franklin_overlay_problem)
        {
        A2D_set_attrib(0,0,0);
        A2D_get_attrib(0,0,NULL);
```

```
        ALARM_set_attrib(0,0,0);
        ALARM_get_attrib(0,0,NULL);
        COMM_set_attrib(0,0,0);
        COMM_get_attrib(0,0,NULL);
        OCM_set_attrib(0,0,0);
        OCM_get_attrib(0,0,NULL);
        ODU_set_attrib(0,0,0);
        ODU_get_attrib(0,0,NULL);
        }
}

/*****************************************************************
 *
 * Name:        OBJ_proc_attr_msg
 *
 * Description: This function is called to process a normal
 *              Get/Set attribute command.
 *
 ****************************************************************/
#if 0               // this line is just so Brief can find this
function
OBJ_proc_attr_msg()
#endif
void OBJ_proc_attr_msg(HEADER xdata *msg, uchar xdata *response,
    uchar (*set_attrib)(uchar,uchar,uint),
    uchar (*get_attrib)(uchar,uchar,uint *),
    uchar num_inst)
{
    uchar xdata *rptr = response;
    uchar inst = 0;
    uchar attrib;
    uint value;
    uchar status = NO_ERROR;

    fix_franklin_overlay_problem();

    /*
        Now, back to the real business at hand...
    */
    if(num_inst > 1)
        {
        /*
            The first byte is the instance number.
        */
        inst = *(msg->data_ptr)++;
        if(inst == ALL_INSTANCES)
            {
            status = OBJ_process_all_inst(msg, &rptr,
                set_attrib, get_attrib, num_inst);
            }
```

Object.C ©P-COM, Inc., 1994

```
        else if(inst >= num_inst)
            status = INVALID_INSTANCE;
        }

    if(inst != ALL_INSTANCES)
        {
        while(((attrib = OBJ_next_attr(msg)) != NO_MORE_ATTR)
            && (status == NO_ERROR))
            {
            switch(msg->opcode)
                {
                case SET_CMD:
                case HERE_CMD:
                    value = (*(msg->data_ptr)++) << 8;
                    value |= *(msg->data_ptr)++;
                    status = set_attrib(inst, attrib, value);
                    break;

                case GET_CMD:
                    if((status = get_attrib(inst, attrib,
&value)) == NO_ERROR)
                        OBJ_add_attrib(&rptr, attrib, value);
                    break;

                case INC_CMD:
                case DEC_CMD:
                    if((status = get_attrib(inst, attrib,
&value)) != NO_ERROR)
                        break;
                    if(msg->opcode == INC_CMD)
                        {
                        if(value != 0xffffU)
                            value++;
                        }
                    else
                        {
                        if(value != 0)
                            value--;
                        }
                    status = set_attrib(inst, attrib, value);
                    break;

                default:
                    status = INVALID_OPCODE;
                    break;
                }
            }
        }

    if(msg->opcode != HERE_CMD)
```

Object.C ©P-COM, Inc., 1994

```
        {
        msg->data_length = (uchar)(rptr - response);
        msg->data_ptr = response;
        PCOM_send_resp(msg, status);
        }
}
```

OCM_OBJ.C

©P-COM, Inc., 1994

```
/***************************************************************
 *
 * Description: This module contains the OCM object, which
 *              is sort of the catch-all object which has
 *              under it all responsibilities which do not
 *              fall into another object. These responsibilities
 *              include sending the periodic status message
 *              to the IDU, controlling the synthesizer and
 *              the 2nd PLO.
 *
 * $Id: ocm_obj.c 2.1 1993/12/30 08:32:22 MIKEE Exp $
 *
 * $Log: ocm_obj.c $
 * Revision 2.1  1993/12/30  08:32:22  MIKEE
 * converion to MKS RCS
 *
 *
 *    Rev 1.2   18 Dec 1993 14:09:06   mikee
 * changes for over-current trip fix
 *
 *    Rev 1.1   17 Nov 1993 16:41:50   mikee
 * misc cleanup and mizar changes
 *
 *    Rev 1.0   01 Nov 1993 15:04:42   mikee
 * Initial revision.
 *
 ***************************************************************/

#include <reg552.h>

#include "global.h"
#include "timer.h"
#include "pcom_msg.h"
#include "object.h"
#include "plo2.h"
#include "synth.h"
#include "io_ports.h"
#include "plessey.h"
#include "a2d.h"
#include "novram.h"
#include "version.h"
#include "mizar.h"

/*
    OCM Attributes:
*/
enum
{
    OCM_TXMUTE_ATTR,
    OCM_XMITPWR_ATTR,
```

©P-COM, Inc., 1994

```
    OCM_CHANNEL_ATTR,
    OCM_RATE_ATTR,
    OCM_AFC_ATTR,
    OCM_AGC_ATTR,
    OCM_SYNTH_ATTR,
    OCM_UPDATE_MSG_ATTR,
    OCM_AFC_VALUE_ATTR,

    OCM_NUM_ATTRS,

    OCM_CLEAR_NOVRAM = SPECIAL_ATTRIBS
};

/*
 * External Functions:
 */
void OCM_init(void);
void OCM_timer_event(uchar timer);

/*
 * Internal Functions:
 */
static void send_here_cmd(void);
static uint check_digital_alarms(void);

/*
 * External Data:
 */
uchar OCM_PLO_Id;                               // band (PLO id
number)

/*
 * Internal Data:
 */
static bit Idu_requests_mute;
static bit Update_msg_enabled;
static bit Xmit_Pwr_Disabled;

static uchar OCM_Rate;                          // 1x2, 2x2, 4x2,
etc.
static uchar OCM_Channel;                       // channel number
static uchar OCM_Xmit_power;

static bdata uint MinorAlarms;                  // bit map of active
alarms
static bdata uint MajorAlarms;                  // bit map of active
alarms

/*
   Alarm bits:
```

©P-COM, Inc., 1994

```
*/
//sbit ALARM_MUTE = MinorAlarms ^ 0;
//sbit ALARM_TELEMETRY = MinorAlarms ^ 1;
//sbit ALARM_CONFIG = MinorAlarms ^ 2;
#define ALARM_MUTE 0x01
#define ALARM_TELEMETRY 0x02
#define ALARM_CONFIG 0x04

#define ALARM_RX 0x0001
#define ALARM_TX 0x0002
#define ALARM_SYNTH 0x0004
#define ALARM_MISC 0x0008

//sbit ALARM_RX = MajorAlarms ^ 0;
//sbit ALARM_TX = MajorAlarms ^ 1;
//sbit ALARM_SYNTH = MajorAlarms ^ 2;
//sbit ALARM_MISC = MajorAlarms ^ 3;

/*************************************************************
 *
 * Name:         void OCM_init(void)
 *
 * Description: This function is called to initialize the OCM
 *               object.
 *
 *************************************************************/
void OCM_init(void)
{
    MinorAlarms = MajorAlarms = 0;
    Idu_requests_mute = 1;
    Update_msg_enabled = 1;
    Xmit_Pwr_Disabled = 0;
    OCM_Rate = RATE_1x2;
    OCM_Channel = 0;

    /*
        Configure a timer to check alarms every second.
    */
    TIMER_register(MAJOR_ALARM_TIMER, OCM_OBJ, 999, 1000);

    /*
        Configure a timer to wake us up every second for a
        status message to the IDU.
    */
    TIMER_register(OCM_TIMER, OCM_OBJ, 1000, 1000);

    /*
        Have a timer wake us up if we don't receive a HERE_CMD
from
        the IDU.
```

```
    */
    TIMER_1_shot(IDU_HERE_CMD_TIMER, OCM_OBJ, 3000);

    /*
        Initialize the 2nd PLO.
    */
    PLO2_init();
}

/**************************************************************
 *
 * Name:        uchar OCM_set_attrib(uchar inst, uchar attr, uint
value)
 *
 * Description: This procedure sets the given instance's
 *              attribute to the given value.
 *              It returns a message error status.
 *
 **************************************************************/
uchar OCM_set_attrib(uchar inst, uchar attrib, uint value)
{
    uchar status = NO_ERROR;
    uchar max_chan;

    switch(attrib)
        {
        case OCM_TXMUTE_ATTR:
            if(value)
                Idu_requests_mute = 1;
            else Idu_requests_mute = 0;
            break;
        case OCM_XMITPWR_ATTR:
            if( ! Xmit_Pwr_Disabled)
                {
                OCM_Xmit_power = value;
                PWM1 = OCM_Xmit_power;
                }
            break;
        case OCM_CHANNEL_ATTR:
            max_chan = (OCM_Rate == RATE_4x2 ? 40 : 80);
            if(value < 1 || value > max_chan)
                {
                MinorAlarms |= ALARM_CONFIG;
                return VALUE_OUT_OF_RANGE;
                }
            else MinorAlarms &= ~ALARM_CONFIG;

            if((uchar)value != OCM_Channel)
                {
                OCM_Channel = (uchar)value;
```

©P-COM, Inc., 1994

```
                SYNTH_set_frequency(OCM_Channel, OCM_Rate);
                }
            break;
        case OCM_RATE_ATTR:
            if(value > RATE_4x2)
                return VALUE_OUT_OF_RANGE;
            if((value == RATE_4x2) && (OCM_Channel > 40))
                return VALUE_OUT_OF_RANGE;  // !!! config alarm
            if((uchar)value != OCM_Rate)
                {
                OCM_Rate = (uchar)value;
                SYNTH_set_frequency(OCM_Channel, OCM_Rate);
                }
            break;
        case OCM_AFC_ATTR:
            PLO2_adjust((uchar)value);
            break;
        case OCM_UPDATE_MSG_ATTR:
            if(value)
                Update_msg_enabled = 1;
            else Update_msg_enabled = 0;
            break;
        default:
            return BAD_CMD_ATTRIBUTE;
            break;
        }
    return status;
}

/****************************************************************
 *
 * Name:        uchar OCM_get_attrib(uchar inst, uchar attr, uint
*value)
 *
 * Description: This procedure gets the current value of a
 *              given instance's attribute.
 *              It returns a message error status.
 *
 ***************************************************************/
uchar OCM_get_attrib(uchar inst, uchar attrib, uint *value)
{
    switch(attrib)
        {
        /*
            There may be multiple things which go into
determining if
            the transmitter is muted, but all of them should
cause
            the ALARM_MUTE bit to be set when we are muted.
        */
```

```
        case OCM_TXMUTE_ATTR:
            if(MinorAlarms & ALARM_MUTE)
                *value = 1;
            else *value = 0;
            break;
        case OCM_XMITPWR_ATTR:
            *value = (uint)OCM_Xmit_power;
            break;
        case OCM_CHANNEL_ATTR:
            *value = (uint)OCM_Channel;
            break;
        case OCM_RATE_ATTR:
            *value = (uint)OCM_Rate;
            break;
        case OCM_AGC_ATTR:
            *value = (uint)A2D_get_agc();
            break;
        case OCM_SYNTH_ATTR:
            *value = (uint)SYNTH_type();
            break;
        case OCM_UPDATE_MSG_ATTR:
            *value = (uint)Update_msg_enabled;
            break;
        case OCM_AFC_VALUE_ATTR:
            *value = (uint)PLO2_A_value();
            break;
        default:
            return BAD_CMD_ATTRIBUTE;
            break;
        }

    return NO_ERROR;
}

/****************************************************************
 *
 * Name:         void OCM_msg_event(HEADER *msg, uchar *response)
 *
 * Description: This function is called whenever a message is
 *               received by the OCM Object.
 *
 ****************************************************************/
void OCM_msg_event(HEADER xdata *msg, uchar xdata *response)
{
    /*
        If we don't receive the HERE_CMD from the IDU every so
often
        we are supposed to detect a Telemetry Alarm. Every time
we
        receive a HERE_CMD, reset the timer and clear the alarm
```

```
bit.
    */
    if(msg->opcode == HERE_CMD)
        {
        TIMER_1_shot(IDU_HERE_CMD_TIMER, OCM_OBJ, 3000);
        MinorAlarms &= ~ALARM_TELEMETRY;
        }

    /*
        If we get a RESET_CMD on the CLEAR_NOVRAM attribute, we,
        well, clear NOVRAM.
    */
    if(msg->opcode == RESET_CMD && (*msg->data_ptr ==
OCM_CLEAR_NOVRAM))
        {
        NV_clr_novram();
        msg->data_length = 0;
        PCOM_send_resp(msg, NO_ERROR);
        return;
        }

    /*
        Process the message
    */
    OBJ_proc_attr_msg(msg, response, OCM_set_attrib,
OCM_get_attrib, 1);
}

/**************************************************************
 *
 * Name:        void OCM_timer_event(uchar timer)
 *
 * Description: This function is called whenever a timer for
 *              the OCM Object expires.
 *
 **************************************************************/
void OCM_timer_event(uchar timer)
{
    switch(timer)
        {
        /*
            This timer used to detect Telemetry Alarms.
        */
        case IDU_HERE_CMD_TIMER:
            MinorAlarms |= ALARM_TELEMETRY;
            TIMER_1_shot(IDU_HERE_CMD_TIMER, OCM_OBJ, 3000);
            break;

        /*
            This timer is used to check for Major Alarms.
```

OCM_OBJ.C

©P-COM, Inc., 1994

```
        */
        case MAJOR_ALARM_TIMER:
            MajorAlarms = A2D_check_alarms();
            MajorAlarms |= check_digital_alarms();
            break;

        /*
            This timer is called to build and send a HERE_CMD
status
            message to the IDU (the telemetry link).
        */
        case OCM_TIMER:
            if(Update_msg_enabled)
                send_here_cmd();
            break;

        /*
            This timer is used to check for an unlocked 2nd PLO.
        */
        case PLO2_LOCK_TIMER:
            PLO2_timer_event(timer);
            break;

        /*
            These timers are used by whichever synthesizer is in
use.
        */
        case MIZAR_TIMER:
        case MIZAR_TEMP_TIMER:
            MIZAR_timer_event(timer);
            break;
        }
}

/****************************************************************
 *
 * Name:        void send_here_cmd(void)
 *
 * Description: This function sends a HERE_CMD status message
 *              to the IDU.
 *
 ****************************************************************/
static void send_here_cmd(void)
{
    uint version = Version();

    /*
        All messages begin with a DLE character followed by a
SYNC
        character to help the receiver sync.
```

©P-COM, Inc., 1994

```
    */
    PCOM_startmsg();

    /*
        Send each field in the message structure.
    */
    PCOM_sendbyte(0x80);                    // NMS address high
    PCOM_sendbyte(0x00);                    // NMS address low
    PCOM_sendbyte(0x00);                    // link address
    PCOM_sendbyte(HERE_CMD);                // opcode
    PCOM_sendbyte(ODU_OBJ);                 // object

    PCOM_sendbyte(18);                      // 18 data bytes follow:

    PCOM_sendbyte(0x00);                    // Attribute 0 (Firmware
Release)
    PCOM_sendbyte(version >> 8);
    PCOM_sendbyte(version & 0xff);

    PCOM_sendbyte(0x01);                    // Attribute 1 (band/PLO
ID)
    PCOM_sendbyte(0x00);
    PCOM_sendbyte(OCM_PLO_Id);

    PCOM_sendbyte(0x02);                    // Attribute 2 (Receiver
level)
    PCOM_sendbyte(0x00);
    PCOM_sendbyte(A2D_get_agc());

    PCOM_sendbyte(0x03);                    // Attribute 3
(Temperature)
    PCOM_sendbyte(0x00);
    PCOM_sendbyte(A2D_get_temp());

    PCOM_sendbyte(0x04);                    // Attribute 4 (Minor
Alarms)
    PCOM_sendbyte(MinorAlarms >> 8);
    PCOM_sendbyte(MinorAlarms & 0x00ff);

    PCOM_sendbyte(0x05);                    // Attribute 5 (Major
Alarms)
    PCOM_sendbyte(MajorAlarms >> 8);
    PCOM_sendbyte(MajorAlarms & 0x00ff);

    /*
        Send the checksum to terminate the message.
    */
    PCOM_endmsg();
}
```

©P-COM, Inc., 1994

```
/*************************************************************
 *
 * Name:        void OCM_set_mute(bit on_or_off)
 *
 * Description: This function mutes (ON) or unmutes (OFF)
 *              the transmitter. It sets the I/O bit to the
 *              correct state, and also sets the mute alarm
 *              bit accordingly.
 *              Note that the IO_TX_MUTE line is pulled low (0)
 *              to mute and high (1) to unmute.
 *
 *************************************************************/
void OCM_set_mute(bit on_or_off)
{
    if(on_or_off)
        {
        IO_TX_MUTE = 0;
        MinorAlarms |= ALARM_MUTE;
        }
    else
        {
        IO_TX_MUTE = 1;
        MinorAlarms &= ~ALARM_MUTE;
        }
}

/*************************************************************
 *
 * Name:        void check_ch_sw(void)
 *
 * Description: This procedure checks the channel select switches
 *              and updates the channel accordingly.
 *
 *************************************************************/
static void check_ch_sw(void)
{
    uchar ch;
    uchar sw = *((uchar xdata *)0x6000);
    uchar digit;

    digit = 0xf0 - (sw & 0xf0);
    ch = (digit >> 4) * 10;
    digit = 0x0f - (sw & 0x0f);
    ch += digit;
    if(ch >= 1 && ch <= 80)
        {
        OCM_Channel = ch;
        SYNTH_set_frequency(OCM_Channel, OCM_Rate);
        }
}
```

©P-COM, Inc., 1994

```
/*************************************************************
 *
 * Name:        void OCM_mute_check(void)
 *
 * Description: This function checks for conditions which
 *              would make us want to mute or unmute the
 *              transmitter. These conditions include the
 *              IDU requesting mute and various hardware alarms.
 *
 *************************************************************/
void OCM_mute_check(void)
{
    if( ! IO_RDSW)
        {
        OCM_set_mute(0);
        check_ch_sw();
        return;
        }
    if(Idu_requests_mute || ( ! SYNTH_is_locked()))
        OCM_set_mute(1);
    else OCM_set_mute(0);
}

/*************************************************************
 *
 * Name:        uchar OCM_get_transmit_power(void)
 *
 * Description: This function returns the current transmit power.
 *
 *************************************************************/
uchar OCM_get_transmit_power(void)
{
    return OCM_Xmit_power;
}

/*************************************************************
 *
 * Name:        uint OCM_get_MinorAlarms(void)
 *
 * Description: This function returns the current minor alarm
 *              bitmap.
 *
 *************************************************************/
uint OCM_get_MinorAlarms(void)
{
    return MinorAlarms;
}

/*************************************************************
 *
```

OCM_OBJ.C

©P-COM, Inc., 1994

```
 * Name:         uint OCM_get_MajorAlarms(void)
 *
 * Description: This function returns the current major alarm
 *              bitmap.
 *
 ************************************************************/
uint OCM_get_MajorAlarms(void)
{
    return MajorAlarms;
}

/************************************************************
 *
 * Name:         uchar OCM_get_channel(void)
 *
 * Description: This function returns the current channel.
 *
 ************************************************************/
uchar OCM_get_channel(void)
{
    return OCM_Channel;
}

/************************************************************
 *
 * Name:         uchar OCM_get_rate(void)
 *
 * Description: This function returns the current rate.
 *
 ************************************************************/
uchar OCM_get_rate(void)
{
    return OCM_Rate;
}

/************************************************************
 *
 * Name:         void OCM_disable_xmit_pwr(void)
 *
 * Description: This function sets the PWM controlling the
 *              transmit power to zero and disallows setting
 *              it again.
 *
 ************************************************************/
uchar OCM_disable_xmit_pwr(void)
{
    OCM_Xmit_power = 0;
    PWM1 = 0;
    Xmit_Pwr_Disabled = 1;
}
```

©P-COM, Inc., 1994

```
/*************************************************************
 *
 * Name:        uint check_digital_alarms(void)
 *
 * Description: This command checks for the digital alarm
 *              conditions and returns a mask of active Major
 *              Alarms.
 *
 *************************************************************/
static uint check_digital_alarms(void)
{
    uint mask = 0;

    if( ! IO_PLOLOCK)
        mask |= ALARM_RX;
    if( ! IO_OSLOCK)
        mask |= ALARM_SYNTH;
    if( ! IO_EXT_SYNTH_ALM)
        mask |= ALARM_SYNTH;
    if( ! IO_FSLOCK)
        mask |= ALARM_SYNTH;

    return mask;
}
```

```
    INVALID_OPCODE,            // invalid opcode
    VALUE_OUT_OF_RANGE,        // data value out of range
    BAD_CMD_ATTRIBUTE,         // operation not valid on given
attribute
    INVALID_INSTANCE,          // instance number is not valid
    INVALID_ATTRIBUTE,         // attribute unknown to this object
    COMMAND_FAILED,            // command failed during execution
    UNKNOWN_OBJECT,            // unknown object number received
    NOVRAM_UPDATE_FAILED       // attempt to update NOVRAM failed
};

/*
    These are the valid opcodes for a message.
*/
#define GET_CMD         1
#define SET_CMD         2
#define INC_CMD         3
#define DEC_CMD         4
#define RESET_CMD       5
#define HERE_CMD        120

/*
    Function Prototypes:
*/
void PCOM_init(void);
void PCOM_receive(void);
void PCOM_send_resp(HEADER xdata *msg, uchar status);
void PCOM_startmsg(void);
void PCOM_sendbyte(uchar byte);
void PCOM_endmsg(void);

#endif _PCOM_MSG_H
```

```
/************************************************************
 *
 * Description: This module is simply a test module to
 *              test the OCM board. It will probably be
 *              removed in the production version.
 *
 * $Id: odu.c 2.1 1993/12/30 08:32:16 MIKEE Exp $
 *
 * $Log: odu.c $
 * Revision 2.1  1993/12/30  08:32:16  MIKEE
 * converion to MKS RCS
 *
 *
 *    Rev 1.2   17 Nov 1993 16:33:42   mikee
 * Misc internal cleanup
 *
 *    Rev 1.1   01 Nov 1993 15:04:44   mikee
 * Check in for release 1.0 (first production release)
 *
 ************************************************************/

#include <reg552.h>

#include "global.h"
#include "odu.h"
#include "pcom_msg.h"
#include "io_ports.h"
#include "ocm_obj.h"
#include "mizar.h"
#include "a2d.h"
#include "object.h"
#include "novram.h"
#include "synth.h"
#include "timer.h"
#include "version.h"

enum
{
    ODU_RELEASE_ATTR,
    ODU_PLO_ID_ATTR,
    ODU_RECVR_LVL_ATTR,
    ODU_TEMP_ATTR,
    ODU_MINOR_ALARMS_ATTR,
    ODU_MAJOR_ALARMS_ATTR,

    /*
        The following attributes are for debugging purposes, and
may be
        changed or deleted at any time. They are not officially
documented.
```

©P-COM, Inc., 1994

```
    */
    ODU_MIN_LOOP_TIME = 0xe0,
    ODU_AVG_LOOP_TIME,
    ODU_MAX_LOOP_TIME,

    ODU_WRITE_P1=0xf0,
    ODU_READ_P3,
    ODU_WRITE_P4,
    ODU_WRITE_PWM0,
    ODU_WRITE_PWM1,
    ODU_READ_P1,
    ODU_WRITE_TXMUTE,
    ODU_READ_MIZAR,
    ODU_SET_CHANNEL,
    ODU_READ_BAND,
    ODU_TEST_NOVRAM,
    ODU_TEST_FLASH,
    ODU_READ_FLASH_ID,
    ODU_ERASE_FLASH
};

/*
 * External Functions:
 */

/*
 * Internal Functions:
 */
uchar novram_read_test(uchar xdata *ptr, uchar xdata **p_rptr);
uchar novram_write_test(uchar xdata *ptr);
uchar flash_read_test(uchar xdata *ptr, uchar xdata **p_rptr);
uchar flash_write_test(uchar xdata *ptr);
uchar ODU_get_attrib(uchar inst, uchar attrib, uint *value);
uchar ODU_set_attrib(uchar inst, uchar attrib, uint value);
static uint read_flash_id(void);
static void flash_erase(void);

/*
 * External Data:
 */

/*
 * Internal Data:
 */
static uint Min_Loop, Max_Loop, Avg_Loop;

/**************************************************************
 *
 * Name:          void ODU_init(void)
 *
```

```
 * Description: This function is called at startup to intialize
 *              the ODU object.
 *
 ***********************************************************/
void ODU_init(void)
{
    Min_Loop = 0xffff;
    Max_Loop = 0x0000;
}

/***********************************************************
 *
 * Name:        uchar ODU_set_attrib(uchar inst, uchar attr, uint
value)
 *
 * Description: This procedure sets the given instance's
 *              attribute to the given value.
 *              It returns a message error status.
 *
 ***********************************************************/
uchar ODU_set_attrib(uchar inst, uchar attrib, uint value)
{
    uchar status = NO_ERROR;

    switch(attrib)
        {
        case ODU_WRITE_P1:
            P1 = value;
            break;
        case ODU_WRITE_P4:
            P4 = value;
            break;
        case ODU_WRITE_PWM0:
            PWM0 = value;
            break;
        case ODU_WRITE_PWM1:
            PWM1 = value;
            break;
        case ODU_WRITE_TXMUTE:
            if(value)
                IO_TX_MUTE = 0;
            else IO_TX_MUTE = 1;
            break;
        case ODU_SET_CHANNEL:
            MIZAR_set_frequency(value, RATE_1x2);
            break;
        default:
            status = BAD_CMD_ATTRIBUTE;
        }
    return status;
```

©P-COM, Inc., 1994

```
}

/*************************************************************
 *
 * Name:         uchar ODU_get_attrib(uchar inst, uchar attr, uint
*value)
 *
 * Description: This procedure gets the current value of a
 *               given instance's attribute.
 *               It returns a message error status.
 *
 *************************************************************/
uchar ODU_get_attrib(uchar inst, uchar attrib, uint *value)
{
    uchar status = NO_ERROR;

    switch(attrib)
        {
        case ODU_RELEASE_ATTR:
            *value = Version();
            break;
        case ODU_PLO_ID_ATTR:
            *value = (uint)OCM_PLO_Id;
            break;
        case ODU_RECVR_LVL_ATTR:
            *value = (uint)A2D_get_agc();
            break;
        case ODU_TEMP_ATTR:
            *value = (uint)A2D_get_temp();
            break;
        case ODU_MINOR_ALARMS_ATTR:
            *value = OCM_get_MinorAlarms();
            break;
        case ODU_MAJOR_ALARMS_ATTR:
            *value = OCM_get_MajorAlarms();
            break;

        case ODU_MIN_LOOP_TIME:
            *value = Min_Loop;
            break;
        case ODU_AVG_LOOP_TIME:
            *value = Avg_Loop;
            break;
        case ODU_MAX_LOOP_TIME:
            *value = Max_Loop;
            break;
        case ODU_READ_P3:
            *value = (uint)P3;
            break;
        case ODU_READ_P1:
```

```
            *value = (uint)P1;
            break;
        case ODU_READ_BAND:
            *value = (uint)OCM_PLO_Id;
            break;
        case ODU_READ_FLASH_ID:
            *value = read_flash_id();
            break;
        default:
            status = BAD_CMD_ATTRIBUTE;
        }
    return status;
}

/**************************************************************
 *
 * Name:         void ODU_msg_event(HEADER *msg, uchar *response)
 *
 * Description: This function is called whenever a message is
 *               received by the ODU Object.
 *
 **************************************************************/
void ODU_msg_event(HEADER xdata *msg, uchar xdata *response)
{
    uchar xdata *rptr;
    uchar status;

    if(*msg->data_ptr == ODU_TEST_NOVRAM)
        {
        rptr = response;
        if(msg->opcode == SET_CMD)
            status = novram_write_test(msg->data_ptr+1);
        else status = novram_read_test(msg->data_ptr+1, &rptr);

        msg->data_length = (uchar)(rptr - response);
        msg->data_ptr = response;
        PCOM_send_resp(msg, status);
        }
    else if(*msg->data_ptr == ODU_TEST_FLASH)
        {
        rptr = response;
        if(msg->opcode == SET_CMD)
            status = flash_write_test(msg->data_ptr+1);
        else status = flash_read_test(msg->data_ptr+1, &rptr);

        msg->data_length = (uchar)(rptr - response);
        msg->data_ptr = response;
        PCOM_send_resp(msg, status);
        }
    else if(*msg->data_ptr == ODU_ERASE_FLASH)
```

```
        {
        flash_erase();
        msg->data_length = 0;
        PCOM_send_resp(msg, NO_ERROR);
        }
    else if(*msg->data_ptr == ODU_READ_MIZAR)
        {
        my_memcpy(response, MIZAR_getdata(), 16);
        msg->data_ptr = response;
        msg->data_length = 16;
        PCOM_send_resp(msg, status);
        }
    else OBJ_proc_attr_msg(msg, response, ODU_set_attrib,
ODU_get_attrib, 1);
}

/************************************************************
 *
 * Name:        void ODU_loop_time(void)
 *
 * Description: This function is called after each main loop
 *              to keep statistics on loop times.
 *
 ************************************************************/
void ODU_loop_time(void)
{
    uint elapsed = 0xffff - TIMER_get(LOOP_TIMER);
    static uint counter = 0;

    if(elapsed < Min_Loop)
        Min_Loop = elapsed;
    if(elapsed > Max_Loop)
        Max_Loop = elapsed;
    if(++counter >= 1000)
        {
        Avg_Loop = (0xffff - TIMER_get(AVG_LOOP_TIMER)) / 1000;
        counter = 0;
        TIMER_set(AVG_LOOP_TIMER, 0xffff);
        }
    TIMER_set(LOOP_TIMER, 0xffff);
}

/************************************************************
 *
 * Name:        novram_read_test
 *
 * Description: Read bytes from novram.
 *              The data portion of the incoming message should
be:
 *              Byte    Value
```

```
 *               ----    -----
 *                 0     number of bytes to read (0-255)
 *                 1     Offset in EEPROM (starting address)
 *                 2     Page in EEPROM (0 or 1)
 *
 *************************************************************/
uchar novram_read_test(uchar xdata *ptr, uchar xdata **p_rptr)
{
    uchar xdata *rptr = *p_rptr;
    uchar e2_addr;
    uchar length;
    uchar page;

    length = *ptr++;
    e2_addr = *ptr++;
    page = *ptr++;
    *p_rptr = rptr + length;
    return (NOVRAM_read(rptr, e2_addr, length, page)
        ? NO_ERROR : COMMAND_FAILED);
}

/*************************************************************
 *
 * Name:         novram_write_test
 *
 * Description: Write bytes from novram.
 *               The data portion of the incoming message should
be:
 *               Byte    Value
 *               ----    -----
 *                 0     number of bytes to write (0-255)
 *                 1     Offset in EEPROM (starting address)
 *                 2     Page in EEPROM (0 or 1)
 *                 3-n   Data to write
 *
 *************************************************************/
static uchar novram_write_test(uchar xdata *ptr)
{
    uchar e2_addr;
    uchar length;
    uchar page;

    length = *ptr++;
    e2_addr = *ptr++;
    page = *ptr++;
    return (NOVRAM_write(ptr, e2_addr, length, page)
        ? NO_ERROR : COMMAND_FAILED);
}

/*************************************************************
```

```
 *
 * Name:          flash_read_test
 *
 * Description: Read bytes from Flash.
 *                The data portion of the incoming message should
be:
 *                Byte    Value
 *                ----    -----
 *                  0     number of bytes to read (0-128)
 *                  1     Offset in Flash (starting address MSB)
 *                  2     Offset in Flash (starting address LSB)
 *
 ***********************************************************/
static uchar flash_read_test(uchar xdata *ptr, uchar xdata
**p_rptr)
{
    uchar xdata *rptr = *p_rptr;
    uchar length;
    uchar xdata *flashptr;
    uint addr;

    length = *ptr++;
    addr = (uint)*ptr++ << 8;
    addr |= *ptr++;
    flashptr = (uchar xdata *)addr;
    *p_rptr = rptr + length;
    IO_FLASH_A16 = IO_FLASH_A17 = 0;
    my_memcpy(rptr, flashptr, length);

    return NO_ERROR;
}

/************************************************************
 *
 * Name:          flash_write_test
 *
 * Description: Write bytes to Flash.
 *                The data portion of the incoming message should
be:
 *                Byte    Value
 *                ----    -----
 *                  0     number of bytes to read (0-128)
 *                  1     Offset in Flash (starting address MSB)
 *                  2     Offset in Flash (starting address LSB)
 *                  3-n   Data to write
 *
 ***********************************************************/
static uchar flash_write_test(uchar xdata *ptr)
{
    uchar length;
```

©P-COM, Inc., 1994

```
    uchar xdata *flashptr;
    uint addr;

    length = *ptr++;
    addr = (uint)*ptr++ << 8;
    addr |= *ptr++;
    flashptr = (uchar xdata *)addr;
    IO_FLASH_A16 = IO_FLASH_A17 = 0;
    my_memcpy(flashptr, ptr, length);

    return NO_ERROR;
}

static uint read_flash_id(void)
{
    uchar xdata *flashptr = 0x8000;
    uchar mancode, devcode;

    IO_FLASH_A16 = IO_FLASH_A17 = 0;
    *(flashptr + 0x5555) = 0xAA;
    *(flashptr + 0x2aaa) = 0x55;
    *(flashptr + 0x5555) = 0x90;
    TIMER_set(PLO2_TIMER, 15);
    while( ! TIMER_expired(PLO2_TIMER))
        ;

    mancode = *(flashptr+0x400);
    devcode = *(flashptr+0x401);

    /*
        Exit Product ID mode
    */
    *(flashptr + 0x5555) = 0xAA;
    *(flashptr + 0x2aaa) = 0x55;
    *(flashptr + 0x5555) = 0xF0;

    TIMER_set(PLO2_TIMER, 15);
    while( ! TIMER_expired(PLO2_TIMER))
        ;

    return (mancode << 8) | devcode;
}

static void flash_erase(void)
{
    uchar xdata *flashptr = 0x8000;
    uchar i;

    IO_FLASH_A16 = IO_FLASH_A17 = 0;
```

©P-COM, Inc., 1994

```
    EA = 0;
    for(i = 0; i < 128; i++)
        *flashptr++ = i;
    EA = 1;
}
```

©P-COM, Inc., 1994

```
/*************************************************************
 *
 * Description: This module contains the code to receive
 *              complete messages and send them on to the object
 *              for which the message is intended, and then to
 *              send the response.
 *
 * $Id: pcom_msg.c 2.1 1993/12/30 08:32:22 MIKEE Exp $
 *
 * $Log: pcom_msg.c $
 * Revision 2.1  1993/12/30  08:32:22  MIKEE
 * converion to MKS RCS
 *
 *
 *    Rev 1.1   17 Nov 1993 16:42:24   mikee
 * misc cleanup
 *
 *    Rev 1.0   01 Nov 1993 15:04:46   mikee
 * Initial revision.
 *
 *************************************************************/

#include "global.h"
#include "uart.h"
#include "pcom_msg.h"
#include "object.h"
#include "comm_obj.h"

/*
    These are the states for the state machine below which reads
    in messages.
*/
enum
{
    STATE_WAITING_FOR_SYNC,
    STATE_WAITING_FOR_NMS_MSB,
    STATE_WAITING_FOR_NMS_LSB,
    STATE_WAITING_FOR_LINK_ADDR,
    STATE_WAITING_FOR_OPCODE,
    STATE_WAITING_FOR_OBJECT,
    STATE_WAITING_FOR_DATA_LENGTH,
    STATE_RECEIVING_DATA,
    STATE_WAITING_FOR_CHECKSUM
};

/*
    DLE and SYNC characters are used as part of the message
protocol.
*/
#define DLE  (0x10)
```

```
#define SYNC (0x16)

/*
 * External Functions:
 */
void PCOM_init(void);
void PCOM_receive(void);
void PCOM_send_resp(HEADER xdata *msg, uchar status);
void PCOM_startmsg(void);
void PCOM_sendbyte(uchar byte);
void PCOM_endmsg(void);

/*
 * Internal Functions:
 */

/*
 * External Data:
 */

/*
 * Internal Data:
 */
static uchar State;
static xdata HEADER Msgbuff;          // current message
information
static xdata char ResponseData[256]; // used for building
response data area
static uchar Xmit_chksum;            // accumulated transmit
checksum
static bit Prev_char_was_DLE;

/****************************************************************
 *
 * Name:        void PCOM_init(void)
 *
 * Description: This function initializes this module.
 *
 ****************************************************************/
void PCOM_init(void)
{
    State = STATE_WAITING_FOR_SYNC;
    Prev_char_was_DLE = 0;
}

/****************************************************************
 *
 * Name:        PCOM_receive()
 *
 * Description: This function is called periodically to check
```

```
 *              for incoming bytes from the IDU. Here we
 *              process each byte until we detect that we
 *              have received a complete message, which we pass
 *              to the object specified in the message.
 *
 ***************************************************************/
void PCOM_receive(void)
{
    static uchar remaining_data;
    static uchar rcv_chksum;    // running checksum on the
current message
    uchar ch;                   // character just received

    if( ! UART_rcv_byte(&ch))   // no characters coming in
        return;

    /*
        If we receive a DLE character followed by a SYNC
character, we
        are receiving the beginning of a message. If we receive a
DLE
        character followed by another DLE character, we should
actually
        inject a DLE into the message.
    */
    if(Prev_char_was_DLE)
        {
        if(ch == SYNC)
            {
            if(State != STATE_WAITING_FOR_SYNC)
                COMM_inc_attrib(COMM_IDU_INSTANCE,
COMM_BAD_MSGS);
            State = STATE_WAITING_FOR_NMS_MSB;
            rcv_chksum = ch;
            return;
            }
        else Prev_char_was_DLE = 0;
        }
    else if(ch == DLE)
        {
        Prev_char_was_DLE = 1;
        return;
        }

    /*
        We must keep a running checksum of the incoming message
to compare
        against the transmitted checksum at the end of the
message. The
        checksum covers from the SYNC byte to the last byte of
```

```
the
        message before the checksum.
    */
    if(State != STATE_WAITING_FOR_CHECKSUM && State !=
STATE_WAITING_FOR_SYNC)
        rcv_chksum += ch;

    /*
        This is the state sequence for receiving a message.
    */
    switch(State)
        {
        case STATE_WAITING_FOR_SYNC:
            if(ch == SYNC)
                {
                State = STATE_WAITING_FOR_NMS_MSB;
                rcv_chksum = ch;
                }
            break;

        case STATE_WAITING_FOR_NMS_MSB:
            Msgbuff.nms_address = (ch << 8);
            State = STATE_WAITING_FOR_NMS_LSB;
            break;

        case STATE_WAITING_FOR_NMS_LSB:
            Msgbuff.nms_address |= (ch & 0x00ff);
            State = STATE_WAITING_FOR_LINK_ADDR;
            break;

        case STATE_WAITING_FOR_LINK_ADDR:
            Msgbuff.link_address = ch;
            State = STATE_WAITING_FOR_OPCODE;
            break;

        case STATE_WAITING_FOR_OPCODE:
            Msgbuff.opcode = ch;
            State = STATE_WAITING_FOR_OBJECT;
            break;

        case STATE_WAITING_FOR_OBJECT:
            Msgbuff.object = ch;
            State = STATE_WAITING_FOR_DATA_LENGTH;
            break;

        case STATE_WAITING_FOR_DATA_LENGTH:
            Msgbuff.data_length = ch;
            if(ch == 0)                     // no data following
                State = STATE_WAITING_FOR_CHECKSUM;
            else State = STATE_RECEIVING_DATA;
```

```
            Msgbuff.data_ptr = Msgbuff.msgdata;
            remaining_data = ch;
            break;

        case STATE_RECEIVING_DATA:
            *(Msgbuff.data_ptr)++ = ch;
            if(--remaining_data == 0)
                State = STATE_WAITING_FOR_CHECKSUM;
            break;

        case STATE_WAITING_FOR_CHECKSUM:
            rcv_chksum = 0 - rcv_chksum;    // checksum is
inverted at the end
            if(ch == rcv_chksum)      // these had better match!
                {
                Msgbuff.data_ptr = Msgbuff.msgdata;
                COMM_inc_attrib(COMM_IDU_INSTANCE,
COMM_MSGS_RCVD);
                OBJ_call_msg_event(Msgbuff.object, &Msgbuff,
ResponseData);
                }
            else COMM_inc_attrib(COMM_IDU_INSTANCE,
COMM_BAD_MSGS);
            State = STATE_WAITING_FOR_SYNC;
            break;

        default:
            break;
        }
}

/***************************************************************
 *
 * Name:         void PCOM_send(HEADER xdata *msg)
 *
 * Description: This function is called to send a message to
 *              the IDU.
 *
 ***************************************************************/
void PCOM_send_resp(HEADER xdata *msg, uchar status)
{
    uchar i;

    /*
        All messages begin with a DLE character followed by a
SYNC
        character to help the receiver sync.
    */
    PCOM_startmsg();
```

```
    /*
        Send each field in the message structure.
    */
    PCOM_sendbyte(msg->nms_address >> 8);
    PCOM_sendbyte(msg->nms_address & 0x00ff);
    PCOM_sendbyte(msg->link_address);
    PCOM_sendbyte(msg->opcode | 0x80);      // MSBit indicates a
reply
    PCOM_sendbyte(msg->object);
    PCOM_sendbyte(msg->data_length + 1);
    PCOM_sendbyte(status);
    for(i = 0; i < msg->data_length; i++)
        PCOM_sendbyte(*msg->data_ptr++);

    /*
        Send the checksum to terminate the message.
    */
    PCOM_endmsg();
}

/**************************************************************
 *
 * Name:          PCOM_startmsg(void)
 *
 * Description: This function is called at the start of the
 *                transmission of each message. It clears the
 *                accumulated checksum and sends the SYNC
 *                chararacter to mark the beginning of a message.
 *
 **************************************************************/
void PCOM_startmsg(void)
{
    UART_sendbyte(DLE);
    UART_sendbyte(SYNC);
    Xmit_chksum = SYNC;
}

/**************************************************************
 *
 * Name:          PCOM_sendbyte(uchar byte)
 *
 * Description: This function is called to send a byte in a
 *                message. The byte is added to the transmit
 *                checksum. A check is also done to see if the
 *                byte happens to have the same ASCII value as
 *                a DLE character, in which case it must be
 *                "escaped" by sending 2 DLE characters.
 *                NOTE: When this occurs, only one DLE character
 *                ends up in the checksum.
 *
```

©P-COM, Inc., 1994

```
 *************************************************************/
void PCOM_sendbyte(uchar byte)
{
    Xmit_chksum += byte;
    UART_sendbyte(byte);
    if(byte == DLE)
        UART_sendbyte(byte);
}

/**************************************************************
 *
 * Name:         PCOM_endmsg(void)
 *
 * Description: This function is called at the end of the
 *              transmission of each message. It sends the
 *              accumulated checksum.
 *
 *************************************************************/
void PCOM_endmsg(void)
{
    Xmit_chksum = 0 - Xmit_chksum;
    if(Xmit_chksum == DLE)
        UART_sendbyte(DLE);
    UART_sendbyte(Xmit_chksum);
    /*
        Increment the number of messages sent on this link.
    */
    COMM_inc_attrib(COMM_IDU_INSTANCE, COMM_MSGS_SENT);
}
```

©P-COM, Inc., 1994

```
/****************************************************************
 *
 * Description: This module contains the code for programming
 *              the Plessey Synthesizer.
 *
 * $Id: plessey.c 2.1 1993/12/30 08:32:23 MIKEE Exp $
 *
 * $Log: plessey.c $
 * Revision 2.1  1993/12/30  08:32:23  MIKEE
 * converion to MKS RCS
 *
 *
 *    Rev 1.1   17 Nov 1993 16:43:26   mikee
 * debug the pcom synth
 *
 *    Rev 1.0   01 Nov 1993 15:04:48   mikee
 * Initial revision.
 *
 ****************************************************************/

#include <reg552.h>

#include "global.h"
#include "plessey.h"
#include "io_ports.h"
#include "timer.h"
#include "pcom_msg.h"
#include "object.h"
#include "ocm_obj.h"
#include "synth.h"

/*
 * External Functions:
 */
void PLESSEY_init(void);
void PLESSEY_set_frequency(uchar channel, uchar rate);

/*
 * Internal Functions:
 */

/*
 * External Data:
 */

/*
 * Internal Data:
 */

/****************************************************************
```

```
 *
 * Name:        void PLESSEY_init(void)
 *
 * Description: This function initializes this module.
 *
 *************************************************************/
void PLESSEY_init(void)
{
    IO_FS_ENABLE = 0;
    IO_FS_CLOCK = 0;
}

/**************************************************************
 *
 * Name:        void send_plessey(ulong mask, ulong value)
 *
 * Description: This function clocks a value into the Plessey
 *              synthesizer chip. The mask should be set to
 *              only have a 1 in the highest bit to be sent.
 *              Each data bit is put out on the IO_FS_DATA pin;
 *              then the IO_FS_CLOCK pin is toggled high, then
 *              low to transmit the data bit. When all the bits
 *              have been transmitted, set the IO_FS_ENABLE
 *              pin high to latch the value.
 *
 *************************************************************/
static void send_plessey(ulong mask, ulong value)
{
    IO_FS_ENABLE = 1;
    IO_FS_CLOCK = 0;
    delay_ms(1);

    while(mask)
        {
        if(value & mask)            // set up data bit
            IO_FS_DATA = 1;
        else IO_FS_DATA = 0;

        delay_ms(1);
        IO_FS_CLOCK = 1;           // set rising edge of clock
        delay_ms(1);

        mask >>= 1;

        IO_FS_CLOCK = 0;           // set falling edge of clock
        delay_ms(1);
        }

    IO_FS_ENABLE = 0;              // latch the shifted value
    delay_ms(1);
```

©P-COM, Inc., 1994

```
}

/***************************************************************
 *
 * Name:        void PLESSEY_set_frequency(uchar channel, uchar
rate)
 *
 * Description: This function sets the frequency of the
 *              Plessey synthesizer for a particular channel and
 *              rate.
 *
 ***************************************************************/
void PLESSEY_set_frequency(uchar channel, uchar rate)
{
    uint ntot;
    uint n;
    uchar a;
    ulong value_mask;

    /*
        Band 1  2x2 Ntot = 2*channel + 117
                4x2 Ntot = 2*channel + 116
        Band 2  2x2 Ntot = 2*channel + 277
                4x2 Ntot = 2*channel + 276
        Band 3  2x2 Ntot = 2*channel + 297
                4x2 Ntot = 2*channel + 296
        Band 4  2x2 Ntot = 2*channel + 457
                4x2 Ntot = 2*channel + 456
    */
    ntot = (uint)(channel << 1);
    switch(OCM_PLO_Id)
        {
        case 1:
            ntot += 117;
            if(ntot < 171)
                value_mask = 0x800002;
            else value_mask = 0xc00002;
            break;
        case 2:
            ntot += 277;
            value_mask = 0xa00002;
            break;
        case 3:
            ntot += 297;
            value_mask = 0xa00002;
            break;
        case 4:
            ntot += 457;
            value_mask = 0xe00002;
            break;
```

```
        default: return;
        }
    if(rate == RATE_4x2)
        ntot--;

    /*
        Because of device limitations, Band 1 is broken up into
        3 different sections, with 3 different sets of
programming
        information.
        If Ntot is between 119 and 170, use Band 1a.
        If Ntot is between 171 and 240, use Band 1b.
        If Ntot is between 241 and 277, use Band 1c.

        Bands 1a and 1b are programmed with the 8/9 prescalar,
while
        all others are programmed with the 16/17 prescalar.
        Send the reference word.
    */
    if(ntot < 241)
        {
        send_plessey(0x00020000L, 0x00008033L);
        n = ntot >> 3;
        a = ntot & 0x07;
        }
    else
        {
        send_plessey(0x00020000L, 0x00000033L);
        n = ntot >> 4;
        a = ntot & 0x0f;
        }

    /*
        Now we need to compute and send the frequency control
word.
    */
    value_mask |= (ulong)(n << 6);
    value_mask |= (ulong)(a << 2);
    send_plessey(0x00800000L, value_mask);
}
```

PLO2.C ©P-COM, Inc., 1994

```
/***************************************************************
 *
 * Description: This module contains the code for programming
 *              the 2nd PLO.
 *
 * $Id: plo2.c 2.1 1993/12/30 08:32:23 MIKEE Exp $
 *
 * $Log: plo2.c $
 * Revision 2.1  1993/12/30  08:32:23  MIKEE
 * converion to MKS RCS
 *
 *
 *    Rev 1.1   17 Nov 1993 16:44:44   mikee
 * misc cleanup
 *
 *    Rev 1.0   01 Nov 1993 15:04:50   mikee
 * Initial revision.
 *
 ***************************************************************/

#include <reg552.h>

#include "global.h"
#include "plo2.h"
#include "io_ports.h"
#include "timer.h"
#include "pcom_msg.h"
#include "object.h"

/*
    The following three defines are passed to the PLO2_adjust
function
    used for AFC compensation.
*/
#define PLO2_INIT 0x00
#define UP        0x01
#define DOWN      0x02

/*
    These defines are min, max, and default values for the
synthesizer's
    "A" parameter, a 7-bit counter.
    The reason for the shift by 1 is that the 7-bit counter is
internally
    stored shifted by one, because it is always used that way.
*/
#define PLO2_A_MIN      (unsigned)(41 << 1)
#define PLO2_A_DEFAULT  (unsigned)(51 << 1)
#define PLO2_A_MAX      (unsigned)(61 << 1)
```

©P-COM, Inc., 1994

```
/*
    This the synthesizer's "N" parameter, an 11-bit counter. This
value
    was given by the radio people. No one knows where it came
from.
*/
#define PLO2_N 199U

/*
    The divide ratio 'R' is the 14-bit programmable reference
    divide ratio for the MB1501.
*/
#define DIVIDE_RATIO 369U

/*
 * External Functions:
 */
void PLO2_init(void);
void PLO2_timer_event(uchar timer);
void PLO2_adjust(uchar whichway);
uchar PLO2_A_value(void);

/*
 * Internal Functions:
 */
static void send_2nd_plo(ulong mask, ulong value);
static void plo2_delay(void);

/*
 * External Data:
 */

/*
 * Internal Data:
 */
static uchar plo2_A_x2;          // synthesizer A parameter
shifted left 1
static bit PLO2_just_programmed;
static bit Initialized;

/****************************************************************
 *
 * Name:        void PLO2_init(void)
 *
 * Description: This function initializes this module.
 *
 ****************************************************************/
void PLO2_init(void)
{
    TIMER_1_shot(PLO2_LOCK_TIMER, OCM_OBJ, 500);
```

```
    Initialized = 0;
}

/**************************************************************
 *
 * Name:        void continue_initialization(void)
 *
 * Description: This function continues with the initialization
 *              of the 2nd PLO.
 *
 **************************************************************/
void continue_initialization(void)
{
    /*
        First we send down the 14-bit divide ratio "R". 16 bits
are
        actually sent, because the first bit is the divide ratio
        prescalar setting (H=64, L=128), and the last bit is a
        control bit (which should be high).
    */
    send_2nd_plo(0x8000, 0x8001 ¦ (DIVIDE_RATIO << 1));

    /*
        Now we can write the 19-bit programmable divider, which
consists
        of an 11-bit programmable counter ratio ("N"), and a
7-bit
        swallow counter ("A"). The last bit of the 19 is the
control
        bit (which must be LOW).
    */
    PLO2_adjust(PLO2_INIT);

    /*
        Set up a timer to check for an unlocked signal and retry
to lock.
    */
    TIMER_register(PLO2_LOCK_TIMER, OCM_OBJ, 2000, 2000);
}

/**************************************************************
 *
 * Name:        void PLO2_adjust(uchar which_way)
 *
 * Description: This function updates the frequency for the
 *              2nd PLO. It takes an argument which tells
 *              whether to increase or decrease the frequency
 *              in units of 200 kHz. A value of 0 for the
 *              parameter will set the values back to defaults.
 *
```

```
 ************************************************************/
void PLO2_adjust(uchar which_way)
{
    /*
        The 'which_way' parameter can be UP (increment the A
value
        within a limit), DOWN (decrement the A value within a
limit),
        or PLO2_INIT, which initializes the A value to its
default.
        Note that since the A value (the one we're adjusting) is
        internally stored shifted by 1, we actually have to add
or
        subtract 2 to "increment" or "decrement" the real value.
    */
    if (which_way == UP && (plo2_A_x2 < PLO2_A_MAX))
        plo2_A_x2 += 2;
    else if (which_way == DOWN && (plo2_A_x2 > PLO2_A_MIN))
        plo2_A_x2 -= 2;
    else if (which_way == PLO2_INIT)
        plo2_A_x2 = PLO2_A_DEFAULT;
    else return;

    /*
        Now we need to rewrite the 19-bit programmable divider.
        See the init function above for a description of what
this is.
    */
    send_2nd_plo(0x040000, (PLO2_N << 8) | plo2_A_x2);
    PLO2_just_programmed = 1;
}

/************************************************************
 *
 * Name:         void send_2nd_plo(ulong mask, ulong value)
 *
 * Description: This function clocks a value into the 2nd PLO
 *               synthesizer chip. The mask should be set to
 *               only have a 1 in the highest bit to be sent.
 *               Each data bit is put out on the IO_PLO_DATA pin;
 *               then the IO_PLO_CLOCK pin is toggled high, then
 *               low to transmit the data bit. When all the bits
 *               have been transmitted, set the IO_PLO_ENABLE
 *               pin high to latch the value.
 *               Note that there are slow devices between the
 *               processor and the 2nd PLO; this is the reason
 *               for the long delays between bits. No one really
 *               knows how long these need to be.
 *
 ************************************************************/
```

```
static void send_2nd_plo(ulong mask, ulong value)
{
    IO_PLO_ENABLE = 0;
    IO_PLO_CLOCK = 0;               // set falling edge of clock

    while(mask)
        {
        if(value & mask)            // set up data bit
            IO_PLO_DATA = 1;
        else IO_PLO_DATA = 0;

        delay_ms(2);

        IO_PLO_CLOCK = 1;           // set rising edge of clock

        delay_ms(2);

        mask >>= 1;

        IO_PLO_CLOCK = 0;           // set falling edge of clock
        }

    IO_PLO_ENABLE = 1;              // latch the shifted value
    delay_ms(2);
    IO_PLO_ENABLE = 0;
}

/****************************************************************
 *
 * Name:        void PLO2_timer_event(uchar timer)
 *
 * Description: This function is called for 2nd PLO timer events.
 *
 ***************************************************************/
void PLO2_timer_event(uchar timer)
{
    if( ! Initialized)
        {
        continue_initialization();
        Initialized = 1;
        return;
        }

    /*
        If we just got programmed, don't try to check for
unlocked
        condition.
    */
    if(PLO2_just_programmed)
        {
```

©P-COM, Inc., 1994

```
        PLO2_just_programmed = 0;
        return;
        }

    /*
        Check for an unlocked condition. If the signal is
unlocked,
        try to re-program it.
    */
    if( ! IO_PLOLOCK)
        {
        /*
            Drop all the lines low to the 2nd PLO, to make sure
it's
            not in some strange state. (The radio guys told me to
            do this.)
        */
        IO_PLO_DATA = 0;
        IO_PLO_ENABLE = 0;
        IO_PLO_CLOCK = 0;
        delay_ms(2);

        /*
            First we send down the 14-bit divide ratio "R". 16
bits are
            actually sent, because the first bit is the divide
ratio
            prescalar setting (H=64, L=128), and the last bit is
a
            control bit (which should be high).
        */
        send_2nd_plo(0x8000, 0x8001 | (DIVIDE_RATIO << 1));

        /*
            Now we need to rewrite the 19-bit programmable
divider.
            See the init function above for a description of what
this is.
        */
        send_2nd_plo(0x040000, (PLO2_N << 8) | plo2_A_x2);
        }
}

/*************************************************************
 *
 * Name:         uchar PLO2_A_value(void)
 *
 * Description: This function returns the current adjusted
 *               2nd PLO parameter. Note that the value is stored
 *               internally shifted left by one bit, because
```

```
 *              that is how it is always used. This is why we
 *              shift it right before we return it.
 *
 ***************************************************************/
uchar PLO2_A_value(void)
{
    return (plo2_A_x2 >> 1);
}
```

SCC2691.C

©P-COM, Inc., 1994

```
/***************************************************************
 *
 * Description: This module handles sending and receiving data
 *              from the external SCC2691 UART.
 *
 * $Id: scc2691.c 2.1 1993/12/30 08:32:24 MIKEE Exp $
 *
 * $Log: scc2691.c $
 * Revision 2.1  1993/12/30  08:32:24  MIKEE
 * converion to MKS RCS
 *
 *
 *    Rev 1.1   17 Nov 1993 16:45:22   mikee
 * continues to send null char to the mizar at power up til it
wakes up
 * and stops generating a break
 *
 *    Rev 1.0   01 Nov 1993 15:04:52   mikee
 * Initial revision.
 *
 **************************************************************/

#include <reg552.h>
#include "global.h"
#include "scc2691.h"

/*
    Memory-mapped base of the SCC2691 UART:
*/
#define UARTBASE ((uchar xdata *)0x4000)

#define RCV_BUFFER_SIZE 32          // shouldn't need more than
18
#define XMIT_BUFFER_SIZE 8          // shouldn't need more than 5

 /*
 * Constant definitions for serial interfaces
 */
#define RX_READY        0x01
#define TX_READY        0x04
#define RECEIVE_ERROR   0xF0
#define RESET_RECEIVER  0x20
#define RESET_TRANS     0x30
#define RESET_ERROR     0x40
#define RESET_BREAK     0x50

/*
 * Baudrate found in Signetics data book for the SCC2691 UART
 */
#define SCC_1200_BAUD       0x66
```

```
/*
 *  Register Offsets for the SCC2691:
 */
#define MR1 0x00     // mode register 1
#define MR2 0x00     // mode register 2
#define SR  0x01     // clock select & status register
#define CR  0x02     // command register
#define THR 0x03     // transmit holding register
#define RHR 0x03     // receive holding register
#define ACR 0x04     // auxiliary control register
#define IMR 0x05     // interrupt status and mask register
#define CTU 0x06     // counter timer upper
#define CTL 0x07     // counter timer lower

typedef struct
    {
    uchar buffer[RCV_BUFFER_SIZE];  // the actual data being
received
    uchar in_index, out_index;      // indexes into buffer to put
or get data
    uchar num_bytes;                // number of bytes in the
buffer
    } rcv_buffer_struct;

typedef struct
    {
    uchar buffer[XMIT_BUFFER_SIZE]; // the actual data being sent
    uchar in_index, out_index;      // indexes into buffer to put
or get data
    uchar num_bytes;                // number of bytes in the
buffer
    } xmit_buffer_struct;

/*
 * External Functions:
 */
void SCC2691_init(void);                        // initialize the
UART
void SCC2691_sendbyte(uchar byte);              // send a single
byte
bit SCC2691_rcv_byte(uchar data *byte);         // returns 1 if
byte rcvd

/*
 * Internal Functions:
 */
static void SCC2691_interrupt_handler(void);

/*
 * External Data:
```

```
 */

/*
 * Internal Data:
 */
static xdata rcv_buffer_struct rcv;      // incoming buffer info
static xdata xmit_buffer_struct xmit;    // outgoing buffer info
static bit xmit_busy;                    // a transmission is
going on now

/***************************************************************
 *
 * Name:         void SCC2691_interrupt_handler(void)
 *
 * Description: This function processes the SCC2691 interrupt.
 *
 ***************************************************************/
void SCC2691_interrupt_handler(void) interrupt 0 using 1
{
    /*
        Check for a transmit interrupt.
    */
    if (*(UARTBASE + SR) & TX_READY)
        {
        if( ! xmit.num_bytes)
            {
            *(UARTBASE + IMR) = 0x04; /* LEAVE RX ENABLED ONLY*/
            xmit_busy = 0;
            }
        else
            {
            xmit.num_bytes--;
            *(UARTBASE + THR) = xmit.buffer[ xmit.out_index++ ];
            if(xmit.out_index >= XMIT_BUFFER_SIZE)
                xmit.out_index = 0;
            *(UARTBASE + IMR) = 0x05;       /* set Tx AND Rx mask
*/
            }
        }

    /*
        Check for a receive interrupt.
    */
    if (*(UARTBASE + SR) & RX_READY)
        {
        if ((*(UARTBASE + SR) & RECEIVE_ERROR))
            {
            *(UARTBASE + CR) = RESET_ERROR;
            *(UARTBASE + CR) = RESET_RECEIVER;
            *(UARTBASE + CR) = RESET_BREAK;
```

```
            }

        // if the buffer overflows, we drop this character
        if(rcv.num_bytes < RCV_BUFFER_SIZE)
            {
            rcv.num_bytes++;
            rcv.buffer[ rcv.in_index++ ] = *(UARTBASE + RHR);
            if(rcv.in_index >= RCV_BUFFER_SIZE)
                rcv.in_index = 0;
            }
        *(UARTBASE + CR) = 0x05;   /* tx and rx interrupts */
        }
}

/***************************************************************
 *
 * Name:        void SCC2691_init(void)
 *
 * Description: This function initializes this module. It is
 *              called at power-up.
 *
 ***************************************************************/
void SCC2691_init(void)
{
    uchar junk;

    rcv.num_bytes = xmit.num_bytes = 0;
    rcv.in_index = rcv.out_index = 0;
    xmit.in_index = xmit.out_index = 0;
    xmit_busy = 0;

    *(UARTBASE + CR) = RESET_RECEIVER;
    *(UARTBASE + CR) = RESET_TRANS;
    *(UARTBASE + CR) = RESET_ERROR;
    *(UARTBASE + CR) = 0x10;            /* point to MR1 */

    *(UARTBASE + IMR) = 0x00;           /* mask out all interrupts
*/
    *(UARTBASE + MR1) = 0x13;           /* no parity, 8bits */
    *(UARTBASE + MR2) = 0x07;           /* normal mode, 1 stop bit
*/
    *(UARTBASE + SR) = SCC_1200_BAUD;
    *(UARTBASE + ACR) = 0x0B;           /* ext clk */
    *(UARTBASE + CTU) = 0x00;           /* counter timer value */
    *(UARTBASE + CTL) = 0x00;
    *(UARTBASE + CR) = 0x05;            /* enable tx/rx */

    /*
        The Mizar holds its transmit interrupt line low until it
receives
```

SCC2691.C

©P-COM, Inc., 1994

```
        a null character. Try to send it nulls until it wakes up.
    */
    do  {
        *(UARTBASE + THR) = 0x00;       // send a NUL
        junk = *(UARTBASE + RHR);       // read any incoming
character
        *(UARTBASE + IMR) = 0x05;       // set Tx AND Rx mask
        delay_ms(50);                   // wait a while
        }
    while(*(UARTBASE + SR) & RX_READY);

    /*
        Enable the processor's external interrupt 0, which is
where
        this UART is connected.
    */
    EX0 = 1;
}

/*************************************************************
 *
 * Name:         void SCC_sendbyte(uchar byte)
 *
 * Description: This function is used to queue up a single
 *              character to be sent to the IDU.
 *
 ************************************************************/
void SCC_sendbyte(uchar byte)
{
    /*
        Disable the external UART interrupt. If the last
character
        being transmitted completes and generates an interrupt
after
        we check 'xmit_busy' but before we finish putting it in
the
        buffer, this new character could be lost.
    */
    EX0 = 0;

    /*
        If we weren't transmitting before, start the message
going.
    */
    if( ! xmit_busy)
        {
        xmit_busy = 1;
        *(UARTBASE + THR) = byte;
        *(UARTBASE + IMR) = 0x05;     /* set Tx AND Rx mask */
        }
```

```
    /*
        Otherwise, put it in the buffer
    */
    else if(xmit.num_bytes < XMIT_BUFFER_SIZE)
        {
        xmit.buffer[ xmit.in_index++ ] = byte;
        if(xmit.in_index >= XMIT_BUFFER_SIZE)
            xmit.in_index = 0;
        xmit.num_bytes++;
        }

    /*
        Reenable the UART interrupt.
    */
    EX0 = 1;
}

/**************************************************************
 *
 * Name:        bit SCC_rcv_byte(uchar data *byte)
 *
 * Description: This function returns TRUE if there is a byte
 *              which has been received (FALSE otherwise).
 *              If a byte has been received, it is written
 *              into the address pointed to by *byte.
 *
 **************************************************************/
bit SCC_rcv_byte(uchar data *byte)
{
    bit result;

    EX0 = 0;
    if(rcv.num_bytes)
        {
        rcv.num_bytes--;
        *byte = rcv.buffer[ rcv.out_index++ ];
        if(rcv.out_index >= RCV_BUFFER_SIZE)
            rcv.out_index = 0;
        result = 1;
        }
    else result = 0;
    EX0 = 1;

    return result;
}
```

SYNTH.C

©P-COM, Inc., 1994

```
/****************************************************************
 *
 * Description: This module contains code which is common to
 *              both the P-Com and the Mizar synthesizers.
 *
 * $Id: synth.c 2.1 1993/12/30 08:32:24 MIKEE Exp $
 *
 * $Log: synth.c $
 * Revision 2.1  1993/12/30  08:32:24  MIKEE
 * converion to MKS RCS
 *
 *
 *    Rev 1.1   17 Nov 1993 16:46:44   mikee
 * update for mizar cleanup
 *
 *    Rev 1.0   01 Nov 1993 15:04:54   mikee
 * Initial revision.
 *
 ****************************************************************/

#include <reg552.h>
#include "global.h"
#include "synth.h"
#include "mizar.h"
#include "plessey.h"
#include "io_ports.h"
#include "timer.h"
#include "object.h"

/*
 * External Functions:
 */

/*
 * Internal Functions:
 */

/*
 * External Data:
 */

/*
 * Internal Data:
 */
static bit Synth_Type_flag;

/****************************************************************
 *
 * Name:        void SYNTH_init(bit type)
 *
 * Description: This function initializes the synthesizer. It
 *              is passed an argument to tell it if we have a
```

©P-COM, Inc., 1994

```
 *              P-Com or Mizar synthesizer.
 *
 ***************************************************************/
void SYNTH_init(bit type)
{
    Synth_Type_flag = type;

    if(Synth_Type_flag == EXT_SYNTH_TYPE)
        MIZAR_init();
    else PLESSEY_init();
}

/***************************************************************
 *
 * Name:         void SYNTH_set_frequency(uchar channel, uchar
rate)
 *
 * Description: This function sets the synthesizer to the
 *              proper frequency for the specified channel
 *              and rate.
 *
 ***************************************************************/
void SYNTH_set_frequency(uchar channel, uchar rate)
{
    if(Synth_Type_flag == EXT_SYNTH_TYPE)
        MIZAR_set_frequency(channel, rate);
    else
        PLESSEY_set_frequency(channel, rate);
}

/***************************************************************
 *
 * Name:         bit SYNTH_type(void)
 *
 * Description: This function returns a 0 if we are equipped
 *              with a Plessey (P-Com) synthesizer, or a 1 if
 *              we are equipped with a Mizar (external) synth.
 *
 ***************************************************************/
bit SYNTH_type(void)
{
    return Synth_Type_flag;
}

/***************************************************************
 *
 * Name:         bit SYNTH_is_locked(void)
 *
 * Description: This function returns TRUE if the synthesizer
 *              is stable enough to allow us to unmute the
 *              transmitter.
 *              The Plessey (P-Com) synthesizer has an input
```

©P-COM, Inc., 1994

```
 *              bit which we can read to see if it has locked.
 *              The Mizar does too, but it can't be trusted,
 *              so we have to look at the software alarm code
 *              before we decide it is safe to unmute.
 *
 *************************************************************/
bit SYNTH_is_locked(void)
{
    if(Synth_Type_flag == PCOM_SYNTH_TYPE)
        return IO_FSLOCK;
    else return MIZAR_is_locked();
}
```

©P-COM, Inc., 1994

```
/*****************************************************************
 *
 * Description: This module contains the routines to implement
 *              the count-down timer package.
 *
 * $Id: timer.c 2.1 1993/12/30 08:32:17 MIKEE Exp $
 *
 * $Log: timer.c $
 * Revision 2.1  1993/12/30  08:32:17  MIKEE
 * converion to MKS RCS
 *
 *
 *    Rev 1.2   17 Nov 1993 16:47:14   mikee
 * rewrote timer interrupt code to be more efficent
 *
 *    Rev 1.1   01 Nov 1993 15:11:36   mikee
 * Check in for release 1.0 (first production release)
 *
 *****************************************************************/

#include <reg552.h>
#include "global.h"
#include "timer.h"
#include "object.h"

/*
    TH0 and TL0 are the high and low bytes of the 16-bit timer 0.
    These values determine the frequency of the timer interrupt.
    We want to set the timer up for a 1ms interrupt. An interrupt
    is generated when this 16-bit counter rolls over from all 1's
    to all 0's. And the counter is incremented every machine
cycle
    (which is every 12 oscillator periods). Therefore, the reload
    values for TH0 and TL0 are calculated as
            0 - (Osc Freq / 12) * (desired tick)
            where Osc Freq = 10MHz and 'desired tick' is 0.001
(1ms)
            which yields 0-0x341 = 0xFCBF.
*/
#define ONE_MILLISECOND_TICK_HI (0xFC)
#define ONE_MILLISECOND_TICK_LO (0xBF)

/*
    Timer Attributes:
*/
enum
{
    INIT_TIME_ATTR,
    REPEAT_TIME_ATTR,

    NUM_TIMER_ATTRS,
```

©P-COM, Inc., 1994

```
    CUR_TIME_ATTR = SPECIAL_ATTRIBS,
    TRIG_FLAG_ATTR,

    NUM_SPECIAL_ATTRS
};

/*
    This structure contains all information pertaining to a
timer.
*/
typedef struct
{
    uint trigger_time;       // when timer will expire
    uchar object;            // the object this timer is
associated with
    uint reload_value;       // value to reload into timer after
each event
    uchar trigger_flag;      // true if timer has expired
} timer_struct;

/*
 * External Functions:
 */
void TIMER_init(void);
void TIMER_set(uchar timer, uint ms);
uint TIMER_get(uchar timer);
bit TIMER_expired(uchar timer);
void TIMER_check_for_timeouts(void);
void TIMER_register(uchar timer, uchar object, uint initial, uint
interval);
void TIMER_1_shot(uchar timer, uchar object, uint interval);

/*
 * Internal Functions:
 */

/*
 * External Data:
 */

/*
 * Internal Data:
 */
static xdata timer_struct Timers[NUM_TIMERS];
static uint Sys_Timer;

/**************************************************************
 *
 * Name:        timer_interrupt
 *
 * Description: Timer interrupt handler. Check all timers in
 *              the program to determine if they have expired.
```

```
 *
 ***************************************************************/
static void timer_interrupt(void) interrupt 1 using 1
{
    uchar i;

     TH0 = ONE_MILLISECOND_TICK_HI;
     TL0 = ONE_MILLISECOND_TICK_LO;

    if(++Sys_Timer == 0)
        Sys_Timer++;

    for(i = 0; i < NUM_TIMERS; i++)
        if(Timers[i].trigger_time == Sys_Timer)
            Timers[i].trigger_flag = TRUE;
}

/***************************************************************
 *
 * Name:    TIMER_init()
 *
 * Description: This function initializes this module.  It is
 *              called at power-up.
 *              NOTE: Even though this module controls the
 *              Timer Object, this initialization function
 *              is called as a part of the processor
 *              initialization sequence, NOT the Object
 *              initialization sequence. This is because many
 *              of the objects request timer services, so this
 *              needs to be set up before any of the other
 *              objects' initialization.
 *
 ***************************************************************/
void TIMER_init(void)
{
    uchar t;
    timer_struct xdata *t_ptr;

    Sys_Timer = 0;
     TH0 = ONE_MILLISECOND_TICK_HI;
     TL0 = ONE_MILLISECOND_TICK_LO;

    my_memclr((uchar xdata *)Timers, sizeof(Timers));
    for(t = 0, t_ptr = Timers; t < NUM_TIMERS; t++, t_ptr++)
        t_ptr->object = NULL_OBJ;
}

/***************************************************************
 *
 * Name:    TIMER_set()
 *
 * Description: This function sets a count-down timer to the
```

©P-COM, Inc., 1994

```
 *               specified value in milliseconds. Note that
 *               this function must be atomic, since a timer
 *               interrupt could occur between writing the
 *               first byte and the second byte.
 *
 ***************************************************************/
void TIMER_set(uchar timer, uint ms)
{
    timer_struct xdata *t_ptr;
    uint temp;

    t_ptr = &Timers[timer];

    ET0 = 0;                          // disable timer interrupt
    t_ptr->trigger_flag = 0;
    temp = ms + Sys_Timer;
    if(temp == 0)
        temp++;
    t_ptr->trigger_time = temp;
    ET0 = 1;                          // re-enable timer interrupt
}

/***************************************************************
 *
 * Name:     TIMER_get()
 *
 * Description: This function returns the current value of
 *              the specified count-down timer in milliseconds.
 *              Note that this function must be atomic, since a
 *              timer interrupt could occur between reading the
 *              first byte and the second byte. If wrap-around
 *              occurs, we could get a drastically wrong value.
 *
 ***************************************************************/
uint TIMER_get(uchar timer)
{
    uint ret;
    timer_struct xdata *t_ptr = &Timers[timer];

    ET0 = 0;                          // disable timer interrupt
    if(t_ptr->trigger_flag)
        ret = 0;
    else ret = Timers[timer].trigger_time - Sys_Timer;
    ET0 = 1;                          // re-enable timer interrupt
    return ret;
}

/***************************************************************
 *
 * Name:        bit TIMER_expired(uchar timer)
 *
 * Description: This function returns TRUE if the specified
```

```
 *              timer has run down to 0; otherwise, returns
 *              FALSE.
 *
 ***********************************************************/
bit TIMER_expired(uchar timer)
{
    return (Timers[timer].trigger_flag ? 1 : 0);
}

/************************************************************
 *
 * Name:        void TIMER_check_for_timeouts(void)
 *
 * Description: This function is called periodically from the
 *              main loop to check to see if any of the
 *              timers assigned to a managed object have timed
 *              out.
 *
 ***********************************************************/
void TIMER_check_for_timeouts(void)
{
    uchar t;

    for(t = 0; t < NUM_TIMERS; t++)
        {
        if(TIMER_expired(t) && (Timers[t].object != NULL_OBJ))
            {
            if(Timers[t].reload_value)
                TIMER_set(t, Timers[t].reload_value);
            else Timers[t].trigger_flag = 0;
            OBJ_call_timer_event(Timers[t].object, t);
            }
        }
}

/************************************************************
 *
 * Name:        void TIMER_register(uchar timer, uchar object,
 *                                  uint initial, uint interval)
 *
 * Description: This function allows a managed object to register
 *              for periodic timer events. After this function
 *              call, the object will receive a callback of its
 *              timer_event function after the 'initial' number
 *              of milliseconds have passed, and then again
 *              every interval (in ms).
 *
 ***********************************************************/
void TIMER_register(uchar timer, uchar object, uint initial, uint
interval)
{
    Timers[timer].object = object;
```

©P-COM, Inc., 1994

```
    Timers[timer].reload_value = interval;
    TIMER_set(timer, initial);
}

/**************************************************************
 *
 * Name:        void TIMER_1_shot(uchar timer, uchar object,
 *                               uint interval)
 *
 * Description: This function sets up a timer for a 1-shot
 *              event; i.e. the timer will count down to zero,
 *              the object will receive a timer event call,
 *              the timer will not be automatically reloaded.
 *
 **************************************************************/
void TIMER_1_shot(uchar timer, uchar object, uint interval)
{
    Timers[timer].object = object;
    Timers[timer].reload_value = 0;
    TIMER_set(timer, interval);
}

/**************************************************************
 *
 * Name:        void TIMER_unregister(uchar timer)
 *
 * Description: This function cancels a scheduled timer event.
 *              After this call, no more timer events will be
 *              scheduled until another TIMER_register or
 *              TIMER_1_shot call.
 *
 **************************************************************/
#if 0
// This function is not used right now!
void TIMER_unregister(uchar timer)
{
    Timers[timer].object = NULL_OBJ;
    Timers[timer].reload_value = 0;
    TIMER_set(timer, 0);
}
#endif

/**************************************************************
 *
 * Name:        uchar TIMER_set_attrib(uchar inst, uchar attr,
uint value)
 *
 * Description: This procedure sets the given instance's
 *              attribute to the given value.
 *              It returns a message error status.
 *
 **************************************************************/
```

TIMER. C

©P-COM, Inc., 1994

```
uchar TIMER_set_attrib(uchar inst, uchar attrib, uint value)
{
    uchar status = NO_ERROR;

    switch(attrib)
        {
        /*
            This attribute is the initial time. Since by the time
we
            receive this message the initial time has probably
already
            passed, this is not implemented yet.
        */
        case INIT_TIME_ATTR:
            break;

        /*
            This is the repeat time attribute, which is the time
that
            is reloaded after each event.
        */
        case REPEAT_TIME_ATTR:
            Timers[inst].reload_value = value;
            break;

        /*
            This is the current time attribute (the actual timer
value now).
        */
        case CUR_TIME_ATTR:
            TIMER_set(inst, value);
            break;

        /*
            This sets whether the timer has "triggered"
(expired).
        */
        case TRIG_FLAG_ATTR:
            Timers[inst].trigger_flag = (uchar)value;
            break;

        default:
            status = BAD_CMD_ATTRIBUTE;
            break;
        }

    return status;
}

/***************************************************************
 *
 * Name:        uchar TIMER_get_attrib(uchar inst, uchar attr,
```

```
uint *value)
 *
 * Description: This procedure gets the current value of a
 *              given instance's attribute.
 *              It returns a message error status.
 *
 *************************************************************/
uchar TIMER_get_attrib(uchar inst, uchar attrib, uint *value)
{
    uchar status = NO_ERROR;

    switch(attrib)
        {
        /*
            This attribute is the initial time. Since by the time
we
            receive this message the initial time has probably
already
            passed, this is not implemented yet.
        */
        case INIT_TIME_ATTR:
            *value = 0;
            break;

        /*
            This is the repeat time attribute, which is the time
that
            is reloaded after each event.
        */
        case REPEAT_TIME_ATTR:
            *value = Timers[inst].reload_value;
            break;

        /*
            This is the current time attribute (the actual timer
value now).
        */
        case CUR_TIME_ATTR:
            *value = TIMER_get(inst);
            break;

        /*
            This sets whether the timer has "triggered"
(expired).
        */
        case TRIG_FLAG_ATTR:
            *value = TIMER_expired(inst);
            break;

        default:
            status = BAD_CMD_ATTRIBUTE;
            break;
```

```
        }

    return status;
}

/****************************************************************
 *
 * Name:         void TIMER_msg_event(HEADER *msg, uchar
*response)
 *
 * Description: This function is called when a message is
 *              received directed towards the Timer Object.
 *
 ****************************************************************/
void TIMER_msg_event(HEADER xdata *msg, uchar xdata *response)
{
    OBJ_proc_attr_msg(msg, response, TIMER_set_attrib,
TIMER_get_attrib,
        NUM_TIMERS);
}
```

```
/*
 * Internal Functions:
 */
static void uart_interrupt_handler(void);  // handles xmit and
rcv interrupts

/*
 * External Data:
 */

/*
 * Internal Data:
 */
static xdata rcv_buffer_struct rcv;      // incoming buffer info
static xdata xmit_buffer_struct xmit;    // outgoing buffer info
static bit xmit_busy;                    // a transmission is
going on now

/*
    TH1 is the auto-reload value for timer 1 (the baudrate
generator).
    This value is computed by:
        TH1 = 256 - (Osc Freq. / (384*baudrate))   [Osc
Freq.=10MHz]
    We must support 300, 600, 1200, 2400, 4800, and 9600 baud
rates.
*/
static uchar xdata uart_baud_values[] = {0xA9, 0xD4, 0xEA, 0xF5,
0xFA, 0xFD};

/***************************************************************
 *
 * Name:        void uart_interrupt_handler(void)
 *
 * Description: This function processes the UART interrupt.
 *
 ***************************************************************/
void uart_interrupt_handler(void) interrupt 4 using 2
{
    /*
        Check for a receive interrupt
    */
     if(RI)
        {
        /*
            if the buffer overflows, we drop this character
        */
        if(rcv.num_bytes < RCV_BUFFER_SIZE)
            {
            rcv.num_bytes++;
            rcv.buffer[ rcv.in_index++ ] = S0BUF;
            if(rcv.in_index >= RCV_BUFFER_SIZE)
```

```
                rcv.in_index = 0;
            }

        /*
            Clear the receive interrupt flag.
        */
          RI = 0;
      }

    /*
        Check for a transmit interrupt
    */
     if(TI)
     {
        /*
            Are there more bytes to transmit?
        */
        if(xmit.num_bytes)
            {
            xmit.num_bytes--;
            S0BUF = xmit.buffer[ xmit.out_index++ ];
            if(xmit.out_index >= XMIT_BUFFER_SIZE)
                xmit.out_index = 0;
            }
        else xmit_busy = 0;
        /*
            Clear the transmit interrupt flag.
        */
        TI = 0;
        }
}

/***************************************************************
 *
 * Name:          void UART_init(void)
 *
 * Description: This function initializes this module. It is
 *                called at power-up.
 *
 ***************************************************************/
void UART_init(uchar baudrate)
{
    rcv.num_bytes = xmit.num_bytes = 0;
    rcv.in_index = rcv.out_index = 0;
    xmit.in_index = xmit.out_index = 0;
    xmit_busy = 0;

    /*
        TH1 is the auto-reload value for timer 1 (the baudrate
generator).
        This value is computed by:
            TH1 = 256 - (Osc Freq. / (384*baudrate))    [Osc
```

```
Freq.=10MHz]
    */
    TH1 = uart_baud_values[baudrate];

    /*
        S0CON is the Serial Port Control Register for the on-chip
        UART (channel 0).
        We need to configure it as an 8-bit UART and enable
reception.
    */
     S0CON = 0x50;
}

/***************************************************************
 *
 * Name:         void UART_sendbyte(uchar byte)
 *
 * Description: This function is used to send a single character
 *              out of the internal UART. If there is currently
 *              no character being transmitted, we can simply
 *              write it to the UART; otherwise, queue it up
 *              to be processed at the next transmit interrupt.
 *
 **************************************************************/
void UART_sendbyte(uchar byte)
{
    /*
        Disable the internal UART interrupt. If the last
character
        being transmitted completes and generates an interrupt
after
        we check 'xmit_busy' but before we finish putting it in
the
        buffer, this new character could be lost.
    */
    ES0 = 0;

    /*
        If we weren't transmitting before, start the message
going.
    */
    if( ! xmit_busy)
        {
        xmit_busy = 1;
        S0BUF = byte;
        }
    /*
        Otherwise, put the character in the send buffer (if it
fits).
    */
    else if(xmit.num_bytes < XMIT_BUFFER_SIZE)
        {
```

```
        xmit.buffer[ xmit.in_index++ ] = byte;
        if(xmit.in_index >= XMIT_BUFFER_SIZE)
            xmit.in_index = 0;
        xmit.num_bytes++;
        }

    /*
        Reenable the internal UART interrupt.
    */
    ES0 = 1;
}

/***************************************************************
 *
 * Name:        bit UART_rcv_byte(uchar data *byte)
 *
 * Description: This function returns TRUE if there is a byte
 *              which has been received from the IDU (FALSE
 *              otherwise). If a byte has been received, it
 *              is written into the address pointed to by
 *              *byte.
 *
 ***************************************************************/
bit UART_rcv_byte(uchar data *byte)
{
    bit result;

    ES0 = 0;
    if(rcv.num_bytes)
        {
        rcv.num_bytes--;
        *byte = rcv.buffer[ rcv.out_index++ ];
        if(rcv.out_index >= RCV_BUFFER_SIZE)
            rcv.out_index = 0;
        result = 1;
        }
    else result = 0;
    ES0 = 1;

    return result;
}
```

VERSION.C P-COM. Inc., 1994

```
/**************************************************************
 *
 * Description: This file contains the function that returns
 *              the current version of the OCM control program.
 *
 * $Id: version.c 2.1 1993/12/30 08:32:25 MIKEE Exp $
 *
 * $Log: version.c $
 * Revision 2.1  1993/12/30  08:32:25  MIKEE
 * converion to MKS RCS
 *
 *
 *    Rev 1.0   18 Nov 1993 10:00:08   mikee
 * Initial revision.
 *
 *************************************************************/

#include "global.h"
#include "version.h"
#include "_version.h"

/**************************************************************
 *
 * Name:        uint Version(void)
 *
 * Description: This function returns the current version.
 *
 *************************************************************/
uint Version(void)
{
    return VERSION;
}
#if 0
bdata unsigned int x;
sbit x0 = x ^ 0;
sbit x7 = x ^ 7;
sbit x8 = x ^ 8;
sbit x15 = x ^ 15;

void tmp()
{
    x0 = 1;
    x7 = 0;
    x8 = 1;
    x15 = 0;
}
#endif
```

©P-COM, Inc., 1994

```
/**************************************************************
 *
 * Description: This module contains the A2D object, which
 *              is responsible for converting and reading
 *              various analog voltages, as well as responding
 *              to messages for requests to get or set
 *              information pertaining to the A2D's.
 *
 * $Id: a2d.c 2.1 1993/12/30 08:32:18 MIKEE Exp $
 *
 * $Log: a2d.c $
 * Revision 2.1  1993/12/30  08:32:18  MIKEE
 * converion to MKS RCS
 *
 *
 *    Rev 1.2   18 Dec 1993 14:07:24   mikee
 * over-current trip fix changes
 *
 *    Rev 1.1   17 Nov 1993 16:34:46   mikee
 * support pcom synth and misc cleanup
 *
 *    Rev 1.0   01 Nov 1993 15:03:54   mikee
 * Initial revision.
 *
 *************************************************************/

#include <reg552.h>

#include "global.h"
#include "pcom_msg.h"
#include "timer.h"
#include "object.h"
#include "synth.h"
#include "ocm_obj.h"
#include "novram.h"
#include "alarm.h"

/*
    A2D Object Instances:
*/
enum
{
    A2D_FSTUNE,
    A2D_LOOP_ID,
    A2D_RF_ID,
    A2D_13GHZ_ALC,
    A2D_TXIF_LVL,
    A2D_AGCLVL,
    A2D_PLOLVL,
    A2D_MON12V,
```

©P-COM, Inc., 1994

```
    A2D_TEMP_AV,
    A2D_DNCONALM,
    A2D_OSTUNE,
    A2D_TXX3BIAS,
    A2D_X3PWRBIAS,
    A2D_TXIF_DCT,

    NUM_A2D_INSTANCES
};

/*
    A2D Attributes:
*/
enum
{
    A2D_CURRENT_READING,
    A2D_ALARM_STATE,
    A2D_HIGH_ALARM,
    A2D_LOW_ALARM,
    A2D_CLEAR_OFFSET,
    A2D_ALM_HIST,
    A2D_LAST_ALM_VALUE,

    NUM_A2D_ATTRIBS
};

/*
    Voltage defines:
    Note that these are all based on a 5V scale from 0x00-0xFF.
*/
#define VOLTS_0_49  0x19
#define VOLTS_1_15  0x3a
#define VOLTS_1_50  0x4C
#define VOLTS_3_00  0x99
#define VOLTS_3_50  0xB2
#define VOLTS_4_00  0xCC
#define VOLTS_4_90  0xFA

/*
    Memory mapped address of the MUX selector (low 3 bits):
*/
#define Mux_Select ((uchar xdata *)0x6000)

/*
    ADCON bits (the processors A-to-D converter control byte):
*/
#define START_ADC       (0x08)      // bit in ADCON which starts
ADC
#define ADC_COMPLETE    (0x10)      // bit in ADCON which shows
when done
```

©P-COM, Inc., 1994

```
/*
 * External Functions:
 */
void A2D_init(void);
void A2D_msg_event(HEADER xdata *msg, uchar xdata *response);
void A2D_timer_event(uchar timer);
uint A2D_check_alarms(void);
uchar A2D_get_agc(void);
uchar A2D_get_temp(void);
bit A2D_alarms_exist(void);

/*
 * Internal Functions:
 */
static void check_loop_id(void);
uchar A2D_get_attrib(uchar inst, uchar attrib, uint *value);
uchar A2D_set_attrib(uchar inst, uchar attrib, uint value);

/*
 * External Data:
 */

/*
 * Internal Data:
 */
static xdata uint
A2D_Attribs[NUM_A2D_INSTANCES][NUM_A2D_ATTRIBS];
static uchar A2d_index;
static bit Alarms_exist;
static bit Novram_update_needed;
static bit OverCurrentAlarm;
static uchar OverCurrentCounter;

/*
    Types of alarms:
*/
static xdata uchar Alarm_mask[NUM_A2D_INSTANCES] =
{
    SYNTH_ALARM,            // A2D_FSTUNE
    SYNTH_ALARM,            // A2D_LOOP_ID
    MISC_ALARM,             // A2D_RF_ID
    TX_ALARM,               // A2D_13GHZ_ALC
    TX_ALARM,               // A2D_TXIF_LVL
    RX_ALARM,               // A2D_AGCLVL
    MISC_ALARM,             // A2D_PLOLVL
    MISC_ALARM,             // A2D_MON12V
    MISC_ALARM,             // A2D_TEMP_AV
    RX_ALARM,               // A2D_DNCONALM
    SYNTH_ALARM,            // A2D_OSTUNE
    TX_ALARM,               // A2D_TXX3BIAS
```

```
    TX_ALARM,                 // A2D_X3PWRBIAS
    TX_ALARM                  // A2D_TXIF_DCT
};

/*
    NOVRAM attributes:
    This table lists which attributes are saved in NOVRAM.
*/
static uchar xdata A2D_nv_table[] =
{
    A2D_HIGH_ALARM,
    A2D_LOW_ALARM,
    A2D_CLEAR_OFFSET,

    NO_MORE_ATTR
};

/***************************************************************
 *
 * Name:        void A2D_init(void)
 *
 * Description: This function is called to initialize the A2D
 *              object.
 *
 ***************************************************************/
void A2D_init(void)
{
    uchar i;

    /*
        Before doing the rest of the setup, we need to read one
        particular A-to-D value: the LOOP_ID. This value tells us
        what type of synthesizer we have.
        If we start this going now, we can check on it in a
        little bit...
    */
    *Mux_Select = A2D_LOOP_ID;
    ADCON = START_ADC;

    /*
        Clear out attribute table and initialize any non-zero
        values to defaults.
    */
    my_memclr((uchar xdata *)A2D_Attribs, sizeof(A2D_Attribs));
    Alarms_exist = 0;
    OverCurrentAlarm = 0;
    OverCurrentCounter = 0;
    Novram_update_needed = 0;
    for(i = 0; i < NUM_A2D_INSTANCES; i++)
        {
```

```
        A2D_Attribs[i][A2D_HIGH_ALARM] = 0xff;
        A2D_Attribs[i][A2D_CLEAR_OFFSET] = 2;
        }
    A2D_Attribs[A2D_TXIF_LVL][A2D_HIGH_ALARM] = VOLTS_4_00;
    A2D_Attribs[A2D_TXIF_DCT][A2D_LOW_ALARM] = VOLTS_1_15;
    A2D_Attribs[A2D_TXX3BIAS][A2D_LOW_ALARM] = VOLTS_0_49;
    A2D_Attribs[A2D_TXX3BIAS][A2D_HIGH_ALARM] = VOLTS_4_90;
    A2D_Attribs[A2D_X3PWRBIAS][A2D_LOW_ALARM] = VOLTS_0_49;
    A2D_Attribs[A2D_X3PWRBIAS][A2D_HIGH_ALARM] = VOLTS_3_00;

    /*
        Try to read any values saved in NOVRAM.
    */
    NV_read_all_attr(A2D_OBJ, NUM_A2D_INSTANCES, A2D_set_attrib);

    /*
        By now, the RF_ID conversion is probably complete. Check
on it...
    */
    check_loop_id();

    /*
        Start the A-to-D conversions going, and register for
timer
        events periodically to read the values.
    */
    TIMER_register(ADC_TIMER, A2D_OBJ, 20, 20);
    A2d_index = 0;
    *Mux_Select = 0;
    ADCON = START_ADC;              // start the ADC on input 0
}

/**************************************************************
 *
 * Name:        void check_loop_id(void)
 *
 * Description: This function checks the LOOP_ID A2D value to
 *              to determine which synthesizer we are using.
 *
 **************************************************************/
static void check_loop_id(void)
{
    bit type;

    /*
        The conversion has already been started. Wait until the
        conversion is complete.
    */
    while( ! (ADCON & ADC_COMPLETE))
        ;
```

©P-COM, Inc., 1994

```
    /*
        If the value is 0 then we are using a P-Com (Plessey
synth).
        If the value is $FF, then we are using the external
(Mizar) synth.
    */
    if(ADCH < 128)
        {
        type = PCOM_SYNTH_TYPE;
        /*
            Now we need to read the RF_ID. This value tells us
            which band we need to be.
        */
        *Mux_Select = A2D_RF_ID;
        ADCON = START_ADC;
        while( ! (ADCON & ADC_COMPLETE))
            ;

        if(ADCH < 64)
            OCM_PLO_Id = 1;
        else if(ADCH < 96)
            OCM_PLO_Id = 2;
        else if(ADCH < 127)
            OCM_PLO_Id = 3;
        else if(ADCH < 160)
            OCM_PLO_Id = 4;
        else if(ADCH < 192)
            OCM_PLO_Id = 5;
        else OCM_PLO_Id = 6;
        }
    else
        {
        type = EXT_SYNTH_TYPE;
        OCM_PLO_Id = 0;
        }
    ADCON = 0;

    /*
        Now that we have determined the type of synthesizer, call
        the synth initialization function with this information.
    */
    SYNTH_init(type);
}

/***************************************************************
 *
 * Name:         uint A2D_check_alarms(void)
 *
 * Description: This function checks all the A2D instances
 *              for current alarms and returns a mask for
```

```
 *              the MajorAlarms.
 *
 *************************************************************/
uint A2D_check_alarms(void)
{
    uchar inst;
    uint result = 0;

    for(inst = 0; inst < NUM_A2D_INSTANCES; inst++)
        if(A2D_Attribs[inst][A2D_ALARM_STATE])
            {
            result |= Alarm_mask[inst];
            Alarms_exist = 1;
            }

    return result;
}

/*************************************************************
 *
 * Name:        uchar A2D_set_attrib(uchar inst, uchar attr, uint
value)
 *
 * Description: This procedure sets the given instance's
 *              attribute to the given value.
 *              It returns a message error status.
 *
 *************************************************************/
uchar A2D_set_attrib(uchar inst, uchar attrib, uint value)
{
    uchar status = NO_ERROR;

    switch(attrib)
        {
        case A2D_HIGH_ALARM:
        case A2D_LOW_ALARM:
        case A2D_CLEAR_OFFSET:
            Novram_update_needed = 1;
            // This is SUPPOSED to fall through!

        case A2D_ALM_HIST:
            A2D_Attribs[inst][attrib] = value;
            break;
        default:
            status = BAD_CMD_ATTRIBUTE;
            break;
        }
    return status;
}
```

```
/*************************************************************
 *
 * Name:        uchar A2D_get_attrib(uchar inst, uchar attr, uint
*value)
 *
 * Description: This procedure gets the current value of a
 *              given instance's attribute.
 *              It returns a message error status.
 *
 *************************************************************/
uchar A2D_get_attrib(uchar inst, uchar attrib, uint *value)
{
    if(attrib >= NUM_A2D_ATTRIBS)
        return INVALID_ATTRIBUTE;
    else *value = A2D_Attribs[inst][attrib];
    return NO_ERROR;
}

/*************************************************************
 *
 * Name:        void A2D_msg_event(HEADER *msg, uchar *response)
 *
 * Description: This function is called whenever a message is
 *              received by the A2D Object.
 *
 *************************************************************/
void A2D_msg_event(HEADER xdata *msg, uchar xdata *response)
{
    OBJ_proc_attr_msg(msg, response, A2D_set_attrib,
A2D_get_attrib,
        NUM_A2D_INSTANCES);

    /*
        If we've just received new data, update NOVRAM.
    */
    if(Novram_update_needed)
        {
        NV_save_all_attr(A2D_OBJ, NUM_A2D_INSTANCES,
A2D_nv_table,
            A2D_get_attrib);
        Novram_update_needed = 0;
        }
}

/*************************************************************
 *
 * Name:        void A2D_timer_event(uchar timer)
 *
 * Description: This function is called off of a timer event
 *              to read the results of the previous A-to-D
```

©P-COM, Inc., 1994

```
 *              conversion, and to set up the next one.
 *              There are 8 ADC channels on the chip, but
 *              we need more. Therefore, the 1st ADC channel
 *              is multiplexed to 8 other ADC channels. The
 *              low 3 bits of memory location $6000 are used
 *              to select which muxed channel is input to the
 *              on-chip channel 0.
 *              Note that we could read up to 10 bits of
 *              precision, but for our purposes, 8 bits of
 *              precision is enough.
 *
 *************************************************************/
void A2D_timer_event(uchar timer)
{
    uchar hi, lo, clear;

    /*
        First, read the value of the previous conversion which
was
        started a long time ago, and should be done by now.
    */
    A2D_Attribs[A2d_index][A2D_CURRENT_READING] = ADCH;

    /*
        If the voltage we just read was the AGC voltage, we need
to
        output that voltage to the PWM.
    */
    if(A2d_index == A2D_AGCLVL)
        PWM0 = ADCH;

    /*
        Now we should check for alarm conditions. If we were
alarming
        before, but now we are back in range (the "clear offset"
within
        the limits), then clear the alarm. Otherwise, see if we
have
        detected a new alarm.
    */
    hi = (uchar)A2D_Attribs[A2d_index][A2D_HIGH_ALARM];
    lo = (uchar)A2D_Attribs[A2d_index][A2D_LOW_ALARM];
    clear = (uchar)A2D_Attribs[A2d_index][A2D_CLEAR_OFFSET];

    /*
        If the X3PWRBIAS voltage has been over 3.5V for
        one second (4 consecutive samples), we assume the
        TX Converter is shorted, and the OCM is about to
        melt (really!). This "over current alarm" causes
        the transmit power to be set to zero and can't exit
```

```
        this state until power-down.
    */
    if(A2d_index == A2D_X3PWRBIAS)
        {
        if(ADCH > VOLTS_3_50)
            {
            if(++OverCurrentCounter > 12)
                {
                OCM_disable_xmit_pwr();
                OverCurrentAlarm = 1;
                A2D_Attribs[A2D_X3PWRBIAS][A2D_ALARM_STATE] = 1;
                A2D_Attribs[A2D_X3PWRBIAS][A2D_ALM_HIST] = 1;
                A2D_Attribs[A2D_X3PWRBIAS][A2D_LAST_ALM_VALUE] =
ADCH;
                }
            }
        else OverCurrentCounter = 0;
        }

    if(A2D_Attribs[A2d_index][A2D_ALARM_STATE])
        {
        if((ADCH <= (hi - clear)) && (ADCH >= (lo + clear)))
            A2D_Attribs[A2d_index][A2D_ALARM_STATE] = 0;
        }
    else if((ADCH > hi) || (ADCH < lo))
        {
        if((A2d_index != A2D_X3PWRBIAS)
            || OCM_get_transmit_power() > VOLTS_1_50)
            {
            A2D_Attribs[A2d_index][A2D_ALARM_STATE] = 1;
            A2D_Attribs[A2d_index][A2D_ALM_HIST] = 1;
            A2D_Attribs[A2d_index][A2D_LAST_ALM_VALUE] = ADCH;
            }
        }

    /*
        Latch this alarm if the over current alarm is detected.
    */
    if((A2d_index == A2D_X3PWRBIAS) && OverCurrentAlarm)
        A2D_Attribs[A2D_X3PWRBIAS][A2D_ALARM_STATE] = 1;

    /*
        Pick the next voltage to read.
    */
    if(++A2d_index >= NUM_A2D_INSTANCES)
        A2d_index = 0;

    /*
        NOTE: The ADCON=0 MUST be there, even though we write a
new value
```

```
        in right away; otherwise, it won't work! (The ADCI bit
must be
        cleared before anything else is written.)
    */
    ADCON = 0;                      // don't delete this line!

    /*
        Internally, we number the muxed ADC channels 0-7, with
        the non-muxed ones numbered from 8-13 (on-chip channels
1-6).
        The Mux_Select is a memory-mapped I/O location which
selects
        which of the muxed A-to-D voltages to apply to ADC0 for
us to
        read. The selection should be available very quickly
(much less
        than a machine cycle), so no delays are necessary before
beginning
        the next conversion.
    */
    if(A2d_index < 8)
        {
        *Mux_Select = A2d_index;
        ADCON = START_ADC;
        }
    else ADCON = ((A2d_index+1) & 0x7) | START_ADC;
}

/**************************************************************
 *
 * Name:         uchar A2D_get_agc(void)
 *
 * Description: This function returns the last read AGC level.
 *
 **************************************************************/
uchar A2D_get_agc(void)
{
    return A2D_Attribs[A2D_AGCLVL][A2D_CURRENT_READING];
}

/**************************************************************
 *
 * Name:         uchar A2D_get_temp(void)
 *
 * Description: This function returns the last read temperature.
 *
 **************************************************************/
uchar A2D_get_temp(void)
{
    return A2D_Attribs[A2D_TEMP_AV][A2D_CURRENT_READING];
```

```
}

/****************************************************************
 *
 * Name:        bit A2D_alarms_exist(void)
 *
 * Description: This function returns true if an A2D alarm
 *              is active (or has been active since the
 *              last time this function was called).
 *
 ***************************************************************/
bit A2D_alarms_exist(void)
{
    bit result;

    result = Alarms_exist;
    Alarms_exist = 0;
    return result;
}
```

```
/****************************************************************
 *
 * Description: This module contains the A2D object, which
 *              is responsible for converting and reading
 *              various analog voltages, as well as responding
 *              to messages for requests to get or set
 *              information pertaining to the A2D's.
 *
 * $Id: a2d.c 2.1 1993/12/30 08:32:18 MIKEE Exp $
 *
 * $Log: a2d.c $
 * Revision 2.1  1993/12/30  08:32:18  MIKEE
 * converion to MKS RCS
 *
 *
 *    Rev 1.2   18 Dec 1993 14:07:24   mikee
 * over-current trip fix changes
 *
 *    Rev 1.1   17 Nov 1993 16:34:46   mikee
 * support pcom synth and misc cleanup
 *
 *    Rev 1.0   01 Nov 1993 15:03:54   mikee
 * Initial revision.
 *
 ****************************************************************/

#include <reg552.h>

#include "global.h"
#include "pcom_msg.h"
#include "timer.h"
#include "object.h"
#include "synth.h"
#include "ocm_obj.h"
#include "novram.h"
#include "alarm.h"

/*
    A2D Object Instances:
*/
enum
{
    A2D_FSTUNE,
    A2D_LOOP_ID,
    A2D_RF_ID,
    A2D_13GHZ_ALC,
    A2D_TXIF_LVL,
    A2D_AGCLVL,
    A2D_PLOLVL,
    A2D_MON12V,
```

```
    A2D_TEMP_AV,
    A2D_DNCONALM,
    A2D_OSTUNE,
    A2D_TXX3BIAS,
    A2D_X3PWRBIAS,
    A2D_TXIF_DCT,

    NUM_A2D_INSTANCES
};

/*
    A2D Attributes:
*/
enum
{
    A2D_CURRENT_READING,
    A2D_ALARM_STATE,
    A2D_HIGH_ALARM,
    A2D_LOW_ALARM,
    A2D_CLEAR_OFFSET,
    A2D_ALM_HIST,
    A2D_LAST_ALM_VALUE,

    NUM_A2D_ATTRIBS
};

/*
    Voltage defines:
    Note that these are all based on a 5V scale from 0x00-0xFF.
*/
#define VOLTS_0_49  0x19
#define VOLTS_1_15  0x3a
#define VOLTS_1_50  0x4C
#define VOLTS_3_00  0x99
#define VOLTS_3_50  0xB2
#define VOLTS_4_00  0xCC
#define VOLTS_4_90  0xFA

/*
    Memory mapped address of the MUX selector (low 3 bits):
*/
#define Mux_Select ((uchar xdata *)0x6000)

/*
    ADCON bits (the processors A-to-D converter control byte):
*/
#define START_ADC       (0x08)      // bit in ADCON which starts
ADC
#define ADC_COMPLETE    (0x10)      // bit in ADCON which shows
when done
```

```
/*
 * External Functions:
 */
void A2D_init(void);
void A2D_msg_event(HEADER xdata *msg, uchar xdata *response);
void A2D_timer_event(uchar timer);
uint A2D_check_alarms(void);
uchar A2D_get_agc(void);
uchar A2D_get_temp(void);
bit A2D_alarms_exist(void);

/*
 * Internal Functions:
 */
static void check_loop_id(void);
uchar A2D_get_attrib(uchar inst, uchar attrib, uint *value);
uchar A2D_set_attrib(uchar inst, uchar attrib, uint value);

/*
 * External Data:
 */

/*
 * Internal Data:
 */
static xdata uint
A2D_Attribs[NUM_A2D_INSTANCES][NUM_A2D_ATTRIBS];
static uchar A2d_index;
static bit Alarms_exist;
static bit Novram_update_needed;
static bit OverCurrentAlarm;
static uchar OverCurrentCounter;

/*
    Types of alarms:
*/
static xdata uchar Alarm_mask[NUM_A2D_INSTANCES] =
{
    SYNTH_ALARM,            // A2D_FSTUNE
    SYNTH_ALARM,            // A2D_LOOP_ID
    MISC_ALARM,             // A2D_RF_ID
    TX_ALARM,               // A2D_13GHZ_ALC
    TX_ALARM,               // A2D_TXIF_LVL
    RX_ALARM,               // A2D_AGCLVL
    MISC_ALARM,             // A2D_PLOLVL
    MISC_ALARM,             // A2D_MON12V
    MISC_ALARM,             // A2D_TEMP_AV
    RX_ALARM,               // A2D_DNCONALM
    SYNTH_ALARM,            // A2D_OSTUNE
    TX_ALARM,               // A2D_TXX3BIAS
```

```
    TX_ALARM,                   // A2D_X3PWRBIAS
    TX_ALARM                    // A2D_TXIF_DCT
};

/*
    NOVRAM attributes:
    This table lists which attributes are saved in NOVRAM.
*/
static uchar xdata A2D_nv_table[] =
{
    A2D_HIGH_ALARM,
    A2D_LOW_ALARM,
    A2D_CLEAR_OFFSET,

    NO_MORE_ATTR
};

/***************************************************************
 *
 * Name:         void A2D_init(void)
 *
 * Description: This function is called to initialize the A2D
 *              object.
 *
 ***************************************************************/
void A2D_init(void)
{
    uchar i;

    /*
        Before doing the rest of the setup, we need to read one
        particular A-to-D value: the LOOP_ID. This value tells us
        what type of synthesizer we have.
        If we start this going now, we can check on it in a
        little bit...
    */
    *Mux_Select = A2D_LOOP_ID;
    ADCON = START_ADC;

    /*
        Clear out attribute table and initialize any non-zero
        values to defaults.
    */
    my_memclr((uchar xdata *)A2D_Attribs, sizeof(A2D_Attribs));
    Alarms_exist = 0;
    OverCurrentAlarm = 0;
    OverCurrentCounter = 0;
    Novram_update_needed = 0;
    for(i = 0; i < NUM_A2D_INSTANCES; i++)
        {
```

```
        A2D_Attribs[i][A2D_HIGH_ALARM] = 0xff;
        A2D_Attribs[i][A2D_CLEAR_OFFSET] = 2;
        }
    A2D_Attribs[A2D_TXIF_LVL][A2D_HIGH_ALARM] = VOLTS_4_00;
    A2D_Attribs[A2D_TXIF_DCT][A2D_LOW_ALARM] = VOLTS_1_15;
    A2D_Attribs[A2D_TXX3BIAS][A2D_LOW_ALARM] = VOLTS_0_49;
    A2D_Attribs[A2D_TXX3BIAS][A2D_HIGH_ALARM] = VOLTS_4_90;
    A2D_Attribs[A2D_X3PWRBIAS][A2D_LOW_ALARM] = VOLTS_0_49;
    A2D_Attribs[A2D_X3PWRBIAS][A2D_HIGH_ALARM] = VOLTS_3_00;

    /*
        Try to read any values saved in NOVRAM.
    */
    NV_read_all_attr(A2D_OBJ, NUM_A2D_INSTANCES, A2D_set_attrib);

    /*
        By now, the RF_ID conversion is probably complete. Check
on it...
    */
    check_loop_id();

    /*
        Start the A-to-D conversions going, and register for
timer
        events periodically to read the values.
    */
    TIMER_register(ADC_TIMER, A2D_OBJ, 20, 20);
    A2d_index = 0;
    *Mux_Select = 0;
    ADCON = START_ADC;              // start the ADC on input 0
}

/****************************************************************
 *
 * Name:        void check_loop_id(void)
 *
 * Description: This function checks the LOOP_ID A2D value to
 *              to determine which synthesizer we are using.
 *
 ****************************************************************/
static void check_loop_id(void)
{
    bit type;

    /*
        The conversion has already been started. Wait until the
        conversion is complete.
    */
    while( ! (ADCON & ADC_COMPLETE))
        ;
```

©P-COM, Inc., 1994

```
    /*
        If the value is 0 then we are using a P-Com (Plessey
synth).
        If the value is $FF, then we are using the external
(Mizar) synth.
    */
    if(ADCH < 128)
        {
        type = PCOM_SYNTH_TYPE;
        /*
            Now we need to read the RF_ID. This value tells us
            which band we need to be.
        */
        *Mux_Select = A2D_RF_ID;
        ADCON = START_ADC;
        while( ! (ADCON & ADC_COMPLETE))
            ;

        if(ADCH < 64)
            OCM_PLO_Id = 1;
        else if(ADCH < 96)
            OCM_PLO_Id = 2;
        else if(ADCH < 127)
            OCM_PLO_Id = 3;
        else if(ADCH < 160)
            OCM_PLO_Id = 4;
        else if(ADCH < 192)
            OCM_PLO_Id = 5;
        else OCM_PLO_Id = 6;
        }
    else
        {
        type = EXT_SYNTH_TYPE;
        OCM_PLO_Id = 0;
        }
    ADCON = 0;

    /*
        Now that we have determined the type of synthesizer, call
        the synth initialization function with this information.
    */
    SYNTH_init(type);
}

/****************************************************************
 *
 * Name:         uint A2D_check_alarms(void)
 *
 * Description: This function checks all the A2D instances
 *              for current alarms and returns a mask for
```

```
 *               the MajorAlarms.
 *
 ************************************************************/
uint A2D_check_alarms(void)
{
    uchar inst;
    uint result = 0;

    for(inst = 0; inst < NUM_A2D_INSTANCES; inst++)
        if(A2D_Attribs[inst][A2D_ALARM_STATE])
            {
            result |= Alarm_mask[inst];
            Alarms_exist = 1;
            }

    return result;
}

/************************************************************
 *
 * Name:        uchar A2D_set_attrib(uchar inst, uchar attr, uint
value)
 *
 * Description: This procedure sets the given instance's
 *              attribute to the given value.
 *              It returns a message error status.
 *
 ************************************************************/
uchar A2D_set_attrib(uchar inst, uchar attrib, uint value)
{
    uchar status = NO_ERROR;

    switch(attrib)
        {
        case A2D_HIGH_ALARM:
        case A2D_LOW_ALARM:
        case A2D_CLEAR_OFFSET:
            Novram_update_needed = 1;
            // This is SUPPOSED to fall through!

        case A2D_ALM_HIST:
            A2D_Attribs[inst][attrib] = value;
            break;
        default:
            status = BAD_CMD_ATTRIBUTE;
            break;
        }
    return status;
}
```

```
/***************************************************************
 *
 * Name:        uchar A2D_get_attrib(uchar inst, uchar attr, uint
*value)
 *
 * Description: This procedure gets the current value of a
 *              given instance's attribute.
 *              It returns a message error status.
 *
 **************************************************************/
uchar A2D_get_attrib(uchar inst, uchar attrib, uint *value)
{
    if(attrib >= NUM_A2D_ATTRIBS)
        return INVALID_ATTRIBUTE;
    else *value = A2D_Attribs[inst][attrib];
    return NO_ERROR;
}

/***************************************************************
 *
 * Name:        void A2D_msg_event(HEADER *msg, uchar *response)
 *
 * Description: This function is called whenever a message is
 *              received by the A2D Object.
 *
 **************************************************************/
void A2D_msg_event(HEADER xdata *msg, uchar xdata *response)
{
    OBJ_proc_attr_msg(msg, response, A2D_set_attrib,
A2D_get_attrib,
        NUM_A2D_INSTANCES);

    /*
        If we've just received new data, update NOVRAM.
    */
    if(Novram_update_needed)
        {
        NV_save_all_attr(A2D_OBJ, NUM_A2D_INSTANCES,
A2D_nv_table,
            A2D_get_attrib);
        Novram_update_needed = 0;
        }
}

/***************************************************************
 *
 * Name:        void A2D_timer_event(uchar timer)
 *
 * Description: This function is called off of a timer event
 *              to read the results of the previous A-to-D
```

```
 *              conversion, and to set up the next one.
 *              There are 8 ADC channels on the chip, but
 *              we need more. Therefore, the 1st ADC channel
 *              is multiplexed to 8 other ADC channels. The
 *              low 3 bits of memory location $6000 are used
 *              to select which muxed channel is input to the
 *              on-chip channel 0.
 *              Note that we could read up to 10 bits of
 *              precision, but for our purposes, 8 bits of
 *              precision is enough.
 *
 ************************************************************/
void A2D_timer_event(uchar timer)
{
    uchar hi, lo, clear;

    /*
        First, read the value of the previous conversion which
was
        started a long time ago, and should be done by now.
    */
    A2D_Attribs[A2d_index][A2D_CURRENT_READING] = ADCH;

    /*
        If the voltage we just read was the AGC voltage, we need
to
        output that voltage to the PWM.
    */
    if(A2d_index == A2D_AGCLVL)
        PWM0 = ADCH;

    /*
        Now we should check for alarm conditions. If we were
alarming
        before, but now we are back in range (the "clear offset"
within
        the limits), then clear the alarm. Otherwise, see if we
have
        detected a new alarm.
    */
    hi = (uchar)A2D_Attribs[A2d_index][A2D_HIGH_ALARM];
    lo = (uchar)A2D_Attribs[A2d_index][A2D_LOW_ALARM];
    clear = (uchar)A2D_Attribs[A2d_index][A2D_CLEAR_OFFSET];

    /*
        If the X3PWRBIAS voltage has been over 3.5V for
        one second (4 consecutive samples), we assume the
        TX Converter is shorted, and the OCM is about to
        melt (really!). This "over current alarm" causes
        the transmit power to be set to zero and can't exit
```

```
        this state until power-down.
    */
    if(A2d_index == A2D_X3PWRBIAS)
        {
        if(ADCH > VOLTS_3_50)
            {
            if(++OverCurrentCounter > 12)
                {
                OCM_disable_xmit_pwr();
                OverCurrentAlarm = 1;
                A2D_Attribs[A2D_X3PWRBIAS][A2D_ALARM_STATE] = 1;
                A2D_Attribs[A2D_X3PWRBIAS][A2D_ALM_HIST] = 1;
                A2D_Attribs[A2D_X3PWRBIAS][A2D_LAST_ALM_VALUE] =
ADCH;
                }
            }
        else OverCurrentCounter = 0;
        }

    if(A2D_Attribs[A2d_index][A2D_ALARM_STATE])
        {
        if((ADCH <= (hi - clear)) && (ADCH >= (lo + clear)))
            A2D_Attribs[A2d_index][A2D_ALARM_STATE] = 0;
        }
    else if((ADCH > hi) || (ADCH < lo))
        {
        if((A2d_index != A2D_X3PWRBIAS)
            || OCM_get_transmit_power() > VOLTS_1_50)
            {
            A2D_Attribs[A2d_index][A2D_ALARM_STATE] = 1;
            A2D_Attribs[A2d_index][A2D_ALM_HIST] = 1;
            A2D_Attribs[A2d_index][A2D_LAST_ALM_VALUE] = ADCH;
            }
        }

    /*
        Latch this alarm if the over current alarm is detected.
    */
    if((A2d_index == A2D_X3PWRBIAS) && OverCurrentAlarm)
        A2D_Attribs[A2D_X3PWRBIAS][A2D_ALARM_STATE] = 1;

    /*
        Pick the next voltage to read.
    */
    if(++A2d_index >= NUM_A2D_INSTANCES)
        A2d_index = 0;

    /*
        NOTE: The ADCON=0 MUST be there, even though we write a
new value
```

```
        in right away; otherwise, it won't work! (The ADCI bit
must be
        cleared before anything else is written.)
    */
    ADCON = 0;                          // don't delete this line!

    /*
        Internally, we number the muxed ADC channels 0-7, with
        the non-muxed ones numbered from 8-13 (on-chip channels
1-6).
        The Mux_Select is a memory-mapped I/O location which
selects
        which of the muxed A-to-D voltages to apply to ADC0 for
us to
        read. The selection should be available very quickly
(much less
        than a machine cycle), so no delays are necessary before
beginning
        the next conversion.
    */
    if(A2d_index < 8)
        {
        *Mux_Select = A2d_index;
        ADCON = START_ADC;
        }
    else ADCON = ((A2d_index+1) & 0x7) | START_ADC;
}

/**************************************************************
 *
 * Name:         uchar A2D_get_agc(void)
 *
 * Description: This function returns the last read AGC level.
 *
 **************************************************************/
uchar A2D_get_agc(void)
{
    return A2D_Attribs[A2D_AGCLVL][A2D_CURRENT_READING];
}

/**************************************************************
 *
 * Name:         uchar A2D_get_temp(void)
 *
 * Description: This function returns the last read temperature.
 *
 **************************************************************/
uchar A2D_get_temp(void)
{
    return A2D_Attribs[A2D_TEMP_AV][A2D_CURRENT_READING];
```

```
}

/************************************************************
 *
 * Name:        bit A2D_alarms_exist(void)
 *
 * Description: This function returns true if an A2D alarm
 *              is active (or has been active since the
 *              last time this function was called).
 *
 ************************************************************/
bit A2D_alarms_exist(void)
{
    bit result;

    result = Alarms_exist;
    Alarms_exist = 0;
    return result;
}
```

ALARM.C

©P-COM, Inc., 1994

```
/**************************************************************
 *
 * Description: This module contains the Alarm object, which
 *              is responsible for detecting and keeping track of
 *              various alarms.
 *
 * $Id: alarm.c 2.1 1993/12/30 08:32:18 MIKEE Exp $
 *
 * $Log: alarm.c $
 * Revision 2.1  1993/12/30  08:32:18  MIKEE
 * converion to MKS RCS
 *
 *
 *    Rev 1.1   17 Nov 1993 16:36:40   mikee
 * misc cleanup
 *
 *    Rev 1.0   01 Nov 1993 15:04:22   mikee
 * Initial revision.
 *
 **************************************************************/

#include <reg552.h>

#include "global.h"
#include "pcom_msg.h"
#include "object.h"
#include "novram.h"
#include "timer.h"
#include "io_ports.h"
#include "a2d.h"
#include "mizar.h"
#include "alarm.h"

/*
    Alarm Object Instances:
*/
enum
{
    ALARM_PLO2LOCK,
    ALARM_OSLOCK,
    ALARM_MIZAR,
    ALARM_FSLOCK,
    ALARM_MIZAR_SW_CODE,
    ALARM_A2D,

    NUM_ALARM_INSTANCES
};

/*
    Alarm Attributes:
```

```
*/
enum
{
    ALARM_CURRENT_STATE,
    ALARM_ENABLE,
    ALARM_HISTORY,

    NUM_ALARM_ATTRIBS
};

/*
 * External Functions:
 */
void ALARM_init(void);
void ALARM_msg_event(HEADER xdata *msg, uchar xdata *response);
void ALARM_timer_event(uchar timer);

/*
 * Internal Functions:
 */
uchar ALARM_get_attrib(uchar inst, uchar attrib, uint *value);
uchar ALARM_set_attrib(uchar inst, uchar attrib, uint value);
static void check_alarm_condition(uchar condition, uchar inst);

/*
 * External Data:
 */

/*
 * Internal Data:
 */
static uint xdata
Alarm_Attribs[NUM_ALARM_INSTANCES][NUM_ALARM_ATTRIBS];
static bit Alarm_nv_update_needed;

/*
    NOVRAM attributes:
*/
static uchar xdata ALARM_nv_table[] =
{
    ALARM_ENABLE,

    NO_MORE_ATTR
};

/***************************************************************
 *
 * Name:         void ALARM_init(void)
 *
 * Description: This function is called to initialize the Alarm
```

```
 *              object.
 *
 *************************************************************/
void ALARM_init(void)
{
    uchar i;

    for(i = 0; i < NUM_ALARM_INSTANCES; i++)
        {
        Alarm_Attribs[i][ALARM_CURRENT_STATE] = 0;
        Alarm_Attribs[i][ALARM_ENABLE] = 1;
        Alarm_Attribs[i][ALARM_HISTORY] = 0;
        }

    /*
        Try to read any values saved in NOVRAM.
    */
    NV_read_all_attr(ALARM_OBJ, NUM_ALARM_INSTANCES,
ALARM_set_attrib);
    Alarm_nv_update_needed = 0;

    /*
        Register for timer callbacks.
    */
    TIMER_register(ALARM_TIMER, ALARM_OBJ, 1000, 1000);
}

/*************************************************************
 *
 * Name:        uchar ALARM_set_attrib(uchar inst, uchar attr,
uint value)
 *
 * Description: This procedure sets the given instance's
 *              attribute to the given value.
 *              It returns a message error status.
 *
 *************************************************************/
uchar ALARM_set_attrib(uchar inst, uchar attrib, uint value)
{
    uchar status = NO_ERROR;

    switch(attrib)
        {
        case ALARM_CURRENT_STATE:
            Alarm_Attribs[inst][attrib] = value;
            if(value)
                Alarm_Attribs[inst][ALARM_HISTORY] = 1;
            break;

        case ALARM_ENABLE:
```

```
            Alarm_Attribs[inst][attrib] = value;
            Alarm_nv_update_needed = 1;
            break;

        case ALARM_HISTORY:
            Alarm_Attribs[inst][attrib] = value;
            break;
        default:
            status = BAD_CMD_ATTRIBUTE;
            break;
        }
    return status;
}

/*************************************************************
 *
 * Name:        uchar ALARM_get_attrib(uchar inst, uchar attr,
uint *value)
 *
 * Description: This procedure gets the current value of a
 *              given instance's attribute.
 *              It returns a message error status.
 *
 *************************************************************/
uchar ALARM_get_attrib(uchar inst, uchar attrib, uint *value)
{
    if(attrib >= NUM_ALARM_ATTRIBS)
        return INVALID_ATTRIBUTE;
    else
        {
        *value = Alarm_Attribs[inst][attrib];
        /*
            After the alarm state is read, the condition is
cleared
            so that is must re-alarm to stay active.
        */
        if(attrib == ALARM_CURRENT_STATE)
            Alarm_Attribs[inst][ALARM_CURRENT_STATE] = 0;
        }
    return NO_ERROR;
}

/*************************************************************
 *
 * Name:        void ALARM_msg_event(HEADER *msg, uchar
*response)
 *
 * Description: This function is called whenever a message is
 *              received by the Alarm Object.
 *
```

```
 **************************************************************/
void ALARM_msg_event(HEADER xdata *msg, uchar xdata *response)
{
    OBJ_proc_attr_msg(msg, response, ALARM_set_attrib,
ALARM_get_attrib,
        NUM_ALARM_INSTANCES);

    /*
        If we've just received new data, update NOVRAM.
    */
    if(Alarm_nv_update_needed)
        {
        NV_save_all_attr(ALARM_OBJ, NUM_ALARM_INSTANCES,
ALARM_nv_table,
            ALARM_get_attrib);
        Alarm_nv_update_needed = 0;
        }
}

/**************************************************************
 *
 * Name:        void check_alarm_condition(uchar condition, uchar
inst)
 *
 * Description: This function checks for an alarm condition
 *              to be true. If 'condition' is true and the
 *              alarm is enabled, then the alarm is set.
 *
 **************************************************************/
static void check_alarm_condition(uchar condition, uchar inst)
{
    if(Alarm_Attribs[inst][ALARM_ENABLE])
        {
        if(condition)
            {
            Alarm_Attribs[inst][ALARM_CURRENT_STATE] = 1;
            Alarm_Attribs[inst][ALARM_HISTORY] = 1;
            }
        }
}

/**************************************************************
 *
 * Name:        void ALARM_timer_event(uchar timer)
 *
 * Description: This function is called off of a timer event
 *              to compile a list of alarms.
 *
 **************************************************************/
void ALARM_timer_event(uchar timer)
```

©P-COM, Inc., 1994

```
{
    uchar tmp;

    check_alarm_condition( ! IO_PLOLOCK, ALARM_PLO2LOCK);
    check_alarm_condition( ! IO_OSLOCK, ALARM_OSLOCK);
    check_alarm_condition( ! IO_EXT_SYNTH_ALM, ALARM_MIZAR);
    check_alarm_condition( ! IO_FSLOCK, ALARM_FSLOCK);
    check_alarm_condition(A2D_alarms_exist(), ALARM_A2D);

    tmp = MIZAR_alarm_code();
    Alarm_Attribs[ALARM_MIZAR_SW_CODE][ALARM_CURRENT_STATE] =
tmp;
    if(tmp != 0)
        Alarm_Attribs[ALARM_MIZAR_SW_CODE][ALARM_HISTORY] = 1;
}
```

©P-COM, Inc., 1994

```
/***************************************************************
 *
 * Description: This module contains functions which pertain
 *              to the COMM Object.
 *
 * $Id: comm_obj.c 2.1 1993/12/30 08:32:19 MIKEE Exp $
 *
 * $Log: comm_obj.c $
 * Revision 2.1  1993/12/30  08:32:19  MIKEE
 * converion to MKS RCS
 *
 *
 *    Rev 1.1   17 Nov 1993 16:37:34   mikee
 * misc cleanup
 *
 *    Rev 1.0   01 Nov 1993 15:04:24   mikee
 * Initial revision.
 *
 ***************************************************************/

#include <string.h>

#include "global.h"
#include "pcom_msg.h"
#include "object.h"
#include "comm_obj.h"
#include "uart.h"
#include "scc2691.h"
#include "novram.h"

/*
 * External Functions:
 */
void COMM_init(void);
void COMM_msg_event(HEADER xdata *msg, uchar xdata *resp);
void COMM_inc_attrib(uchar instance, uchar attrib);

/*
 * Internal Functions:
 */
uchar COMM_set_attrib(uchar inst, uchar attrib, uint value);
uchar COMM_get_attrib(uchar inst, uchar attrib, uint *value);

/*
 * External Data:
 */

/*
 * Internal Data:
 */
```

```
static uint xdata Comm_attributes[ NUM_COMM_INSTANCES ][
COMM_NORMAL_ATTRS ];
static uint xdata Baudrate_code[ NUM_COMM_INSTANCES ];
static bit Nv_update_needed;

/*
    NOVRAM attributes:
*/
static uchar xdata COMM_nv_table[] =
{
    COMM_BAUDRATE,

    NO_MORE_ATTR
};

/*************************************************************
 *
 * Name:         void COMM_init(void)
 *
 * Description: This function initializes the COMM object
 *              internally. There are two instances: the
 *              telemetry link (internal UART) and the
 *              SCC2691 Uart to the Mizar synthesizer.
 *
 *************************************************************/
void COMM_init(void)
{
    /*
        Clear out the attributes array. Set up any non-zero
        attributes.
    */
    my_memclr((uchar xdata *)Comm_attributes,
sizeof(Comm_attributes));
    Baudrate_code[0] = Baudrate_code[1] = COMM_1200_BAUD;
    Nv_update_needed = 0;

    /*
        Try to read any values saved in NOVRAM.
    */
    NV_read_all_attr(COMM_OBJ, NUM_COMM_INSTANCES,
COMM_set_attrib);

    /*
        Initialize the UART hardware.
    */
    UART_init(Baudrate_code[0]);
}

/*************************************************************
 *
```

```
 * Name:         uchar COMM_set_attrib(uchar inst, uchar attr,
uint value)
 *
 * Description: This procedure sets the given instance's
 *              attribute to the given value.
 *              It returns a message error status.
 *
 ************************************************************/
uchar COMM_set_attrib(uchar inst, uchar attrib, uint value)
{
    uchar status = NO_ERROR;

    if(attrib < COMM_NORMAL_ATTRS)
        Comm_attributes[inst][attrib] = value;
    else switch(attrib)
        {
        /*
            This attribute sets the baudrate. We do not support
            changing baud rates on the external UART, because the
            external synthesizer only supports one baud rate
(1200).
        */
        case COMM_BAUDRATE:
            if(value < COMM_NUM_BAUD_RATES)
                {
                if(inst == COMM_IDU_INSTANCE)
                    {
                    UART_init(value);
                    Baudrate_code[inst] = value;
                    Nv_update_needed = 1;
                    }
                else status = INVALID_INSTANCE;
                }
            else status = VALUE_OUT_OF_RANGE;
            break;

        /*
            This attribute specifies whether the comm link is
enabled
            or disabled.
            We don't support this yet.!!!
        */
        case COMM_TXRX_ENABLED:
            status = BAD_CMD_ATTRIBUTE;
            break;

        /*
            This attribute resets the comm link.
        */
        case COMM_RESET_COMMLINK:
```

```
            if(inst == COMM_IDU_INSTANCE)
                UART_init(Baudrate_code[inst]);
            else SCC2691_init();
            break;

        default:
            status = BAD_CMD_ATTRIBUTE;
            break;
        }
    return status;
}

/************************************************************
 *
 * Name:        uchar COMM_get_attrib(uchar inst, uchar attr,
uint *value)
 *
 * Description: This procedure gets the current value of a
 *              given instance's attribute.
 *              It returns a message error status.
 *
 ************************************************************/
uchar COMM_get_attrib(uchar inst, uchar attrib, uint *value)
{
    uchar status = NO_ERROR;

    /*
        If the attribute in question is a normal attribute
(doesn't
        require any special type of processing), just call the
generic
        attribute processing function.
    */
    if(attrib < COMM_NORMAL_ATTRS)
        *value = Comm_attributes[inst][attrib];
    else switch(attrib)
        {
        /*
            This attribute gets the baudrate.
        */
        case COMM_BAUDRATE:
            *value = Baudrate_code[inst];
            break;

        /*
            This attribute specifies whether the comm link is
enabled
            or disabled.
        */
        case COMM_TXRX_ENABLED:
```

```
            *value = 1;             //!!! hardcode to ON (not
supported)
            break;

        default:
            status = INVALID_ATTRIBUTE;
            break;
        }

    return status;
}

/**************************************************************
 *
 * Name:        void COMM_msg_event(HEADER *msg, uchar *response)
 *
 * Description: This function is called to process an incoming
 *              message for the COMM Object.
 *
 *************************************************************/
void COMM_msg_event(HEADER xdata *msg, uchar xdata *response)
{
    OBJ_proc_attr_msg(msg, response, COMM_set_attrib,
COMM_get_attrib,
        NUM_COMM_INSTANCES);

    /*
        If we've just received new data, update NOVRAM.
    */
    if(Nv_update_needed)
        {
        NV_save_all_attr(COMM_OBJ, NUM_COMM_INSTANCES,
COMM_nv_table,
            COMM_get_attrib);
        Nv_update_needed = 0;
        }
}

/**************************************************************
 *
 * Name:        void COMM_inc_attrib(uchar inst, uchar attrib)
 *
 * Description: This function increments an attribute for one
 *              one of the COMM channels. It is used mostly
 *              to provide a way for the UART drivers to count
 *              errors.
 *
 *************************************************************/
void COMM_inc_attrib(uchar instance, uchar attrib)
{
```

©P-COM, Inc., 1994

```
    if(instance < NUM_COMM_INSTANCES && (attrib <
COMM_NORMAL_ATTRS))
        Comm_attributes[instance][attrib]++;
}
```

DIAG.C

©P-COM, Inc., 1994

```
/****************************************************************
 *
 * Description: This file contains the functions that handle
 *              diagnostic messages.
 *
 * $Id: diag.c 2.1 1993/12/30 08:32:17 MIKEE Exp $
 *
 * $Log: diag.c $
 * Revision 2.1  1993/12/30  08:32:17  MIKEE
 * converion to MKS RCS
 *
 *
 *    Rev 1.2   17 Nov 1993 16:38:24   mikee
 * misc cleanup
 *
 *    Rev 1.1   01 Nov 1993 15:04:26   mikee
 * Check in for release 1.0 (first production release)
 *
 ****************************************************************/

#include "global.h"
#include "pcom_msg.h"
#include "object.h"
#include "diag.h"

/*
 * Offsets into messages
 */
#define MEM_ADR1        0
#define MEM_ADR2        1
#define MEM_LEN         2
#define MEM_VAL         3

/*
 * External Functions
 */
void DIAG_msg_event(HEADER xdata *msg, uchar xdata *respdata);

/*
 * Internal Functions
 */
static void set_internal(uchar idata *iptr, uchar xdata *xptr,
uchar len);
static void get_internal(uchar idata *iptr, uchar xdata *xptr,
uchar len);

/*
 * External Data
 */
```

©P-COM, Inc., 1994

```
/*
 * Internal Data
 */

/**************************************************************
 *
 * Name:          void DIAG_msg_event(HEADER xdata *msg, uchar
*resp)
 *
 * Description: This function is called when a message has been
 *                received for this object.
 *                Possible operations include getting and setting
 *                a range of memory.
 *                If the MSB of the address is $FF, use the LSB
 *                as an 8-bit internal memory pointer.
 *
 *************************************************************/
void DIAG_msg_event(HEADER xdata *msg, uchar xdata *response)
{
    uint mem_adr;
    uchar msb;
    uchar status = NO_ERROR;
    bit internal_mem;

    if((msb = (msg->data_ptr[MEM_ADR1])) == 0xff)
        {
        internal_mem = 1;
        mem_adr = (uint)(msg->data_ptr[MEM_ADR2]);
        }
    else
        {
        internal_mem = 0;
        mem_adr = msb << 8;
        mem_adr |= (uint)(msg->data_ptr[MEM_ADR2]);
        }

    if(msg->opcode == SET_CMD)
        {
        /*
            Set the address & value out of the message and
            write it
        */
        if(internal_mem)
            {
            set_internal((uchar idata *)(mem_adr & 0xff),
                &msg->data_ptr[MEM_VAL], msg->data_ptr[MEM_LEN]);
            }
        else
            {
            my_memcpy((uchar xdata *)mem_adr,
```

```
&msg->data_ptr[MEM_VAL],
                msg->data_ptr[MEM_LEN]);
            }
        msg->data_length = 0;
        }
    else if(msg->opcode == GET_CMD)
        {
        /*
            Get the address out of the message and return the
bytes
        */
        if(internal_mem)
            {
            get_internal((uchar idata *)(mem_adr & 0xff),
response,
                msg->data_ptr[MEM_LEN]);
            }
        else msg->data_ptr = (uchar *)mem_adr;

        msg->data_length = msg->data_ptr[MEM_LEN];
        }
    else
        {
        status = INVALID_OPCODE;
        msg->data_length = 0;
        }
    PCOM_send_resp(msg, status);
}

/**************************************************************
 *
 * Name:         void set_internal(uchar idata *, uchar xdata *,
uchar len)
 *
 * Description: This function sets a range of internal memory.
 *
 **************************************************************/
static void set_internal(uchar idata *iptr, uchar xdata *xptr,
uchar len)
{
    while(len--)
        *iptr++ = *xptr++;
}

/**************************************************************
 *
 * Name:         void get_internal(uchar idata *, uchar xdata *,
uchar len)
 *
 * Description: This function gets a range of internal memory.
```

DIAG.C

©P-COM, Inc., 1994

```
 *
 *************************************************************/
static void get_internal(uchar idata *iptr, uchar xdata *xptr,
uchar len)
{
    while(len--)
        *xptr++ = *iptr++;
}
```

FACTORY.C

©P-COM, Inc., 1994

```
/****************************************************************
 *
 * Description: This file contains the functions that handle
 *              Factory settable options.
 *
 * $Id: factory.c 2.1 1993/12/30 08:32:19 MIKEE Exp $
 *
 * $Log: factory.c $
 * Revision 2.1  1993/12/30  08:32:19  MIKEE
 * converion to MKS RCS
 *
 *
 *    Rev 1.1   17 Nov 1993 16:39:02   mikee
 * misc cleanup
 *
 *    Rev 1.0   01 Nov 1993 15:04:28   mikee
 * Initial revision.
 *
 ****************************************************************/

#include "global.h"
#include "pcom_msg.h"
#include "object.h"
#include "factory.h"
#include "novram.h"

/*
    Attributes:
*/
enum
{
    OPTION_CODES_ATTR = SPECIAL_ATTRIBS,
    INSTALL_CODES_ATTR,
    SERIAL_NUM_ATTR,
    OPTION_ABLE_ATTR
};

/*
 * External Functions
 */
void FACT_msg_event(HEADER xdata *msg, uchar xdata *respdata);

/*
 * Internal Functions
 */

/*
 * External Data
 */
```

```
/*
 * Internal Data
 */

/****************************************************************
 *
 * Name:        void FACT_msg_event(HEADER xdata *msg, uchar
*resp)
 *
 * Description: This function is called when a message has been
 *              received for this object.
 *
 ****************************************************************/
void FACT_msg_event(HEADER xdata *msg, uchar xdata *response)
{
    uchar status = NO_ERROR;
    uchar xdata *ptr = msg->data_ptr;
    uchar xdata *rptr = response;
    uchar attr;

    attr = *ptr++;
    switch(attr)
        {
        case SERIAL_NUM_ATTR:
            if(msg->opcode == SET_CMD)
                NOVRAM_write(ptr, NV_SERIAL1_LOC, 3, PAGE_1);
            else
                {
                NOVRAM_read(rptr, NV_SERIAL1_LOC, 3, PAGE_1);
                rptr += 3;
                }
            break;

        default:
            status = INVALID_ATTRIBUTE;
            break;
        }

    msg->data_length = (uchar)(rptr - response);
    msg->data_ptr = response;
    PCOM_send_resp(msg, status);
}
```

GLOBAL.H ©P-COM, Inc., 1994

```
/***************************************************************
 *
 * Description: This header file contains definitions which
 *              are useful to many modules, but not specific
 *              to any one.
 *
 * $Id: global.h 2.1 1993/12/30 08:32:19 MIKEE Exp $
 *
 * $Log: global.h $
 * Revision 2.1  1993/12/30  08:32:19  MIKEE
 * converion to MKS RCS
 *
 *
 *    Rev 1.2   17 Nov 1993 16:59:10   mikee
 * misc cleanup
 *
 *    Rev 1.1   13 Nov 1993 11:40:48   mikee
 * new release 1.1
 *
 *    Rev 1.0   01 Nov 1993 15:04:30   mikee
 * Initial revision.
 *
 ***************************************************************/

#ifndef _GLOBAL_H
#define _GLOBAL_H

/*
    This should be defined as 1 if this is being compiled as a
Flash
    downloadable target program, or 0 if it is an EPROM target
version.
*/
#define FLASH_TARGET 0

typedef unsigned char uchar;
typedef unsigned int uint;
typedef unsigned long ulong;

#ifndef TRUE
 #define TRUE 1
#endif

#ifndef FALSE
 #define FALSE 0
#endif

#ifndef NULL
 #define NULL (void *)(0)
#endif
```

GLOBAL.H ©P-COM, Inc., 1994

```
/*
    The memory move functions in the standard library don't seem
to work,
    so we have some home-grown ones for everyone to use.
*/
void my_memcpy(uchar xdata *dst, uchar xdata *src, uchar len);
void my_memclr(uchar xdata *dst, uchar len);

/*
    This function provides a way to delay for a short period of
time.
*/
void delay_ms(uchar ms);

/*
    To prevent global variables from being defined more than
once,
    we "#define MAIN" in main.c before including this file. If
MAIN
    is defined, we actually declare the variables; if not, we
provide
    extern declarations for others to use.
*/
#ifdef MAIN
 #define EXTERN
#else
 #define EXTERN extern
#endif

// No globals!

#undef EXTERN
#endif _GLOBAL_H
```

```
/*************************************************************
 *
 * Description:   This module is the main loop for the ODU
 *                firmware.
 *
 * $Id: main.c 2.1 1993/12/30 08:32:20 MIKEE Exp $
 *
 * $Log: main.c $
 * Revision 2.1  1993/12/30  08:32:20  MIKEE
 * converion to MKS RCS
 *
 *
 *    Rev 1.1   17 Nov 1993 16:39:32   mikee
 * misc cleanup
 *
 *    Rev 1.0   01 Nov 1993 15:04:32   mikee
 * Initial revision.
 *
 *************************************************************/

#define MAIN
#include <reg552.h>
#include "global.h"
#include "io_ports.h"
#include "pcom_msg.h"
#include "object.h"
#include "timer.h"
#include "uart.h"
#include "diag.h"
#include "novram.h"
#include "ocm_obj.h"
#include "odu.h"

/*
 * External Functions:
 */
void my_memcpy(uchar xdata *dst, uchar xdata *src, uchar len);
void my_memclr(uchar xdata *dst, uchar len);

/*
 * Internal Functions:
 */
static void init_system(void);
static void update_watchdog(void);

/*
 * External Data:
 */

/*
```

```
 * Internal Data:
 */

/*************************************************************
 *
 * Name: main()
 *
 * Description:   This is the startup function of the program.
 *                It makes sure all the hardware gets
initialized,
 *                and then loops forever, doing its thing.
 *
 *************************************************************/
#if 0              // this line is just so Brief can find this
function
main()
#endif
void main(void) using 0
{
    init_system();      // init the processor and other hardware

    /*
        Now that all the hardware is initialized, it should be
safe
        to enable interrupts...
    */
    EA = 1;

    NOVRAM_init();      // init the NOVRAM module
    OBJ_init();         // init the various managed objects
    PCOM_init();        // init the P-Com protocol module

    /*
        Initialize our loop timers.
    */
    TIMER_set(LOOP_TIMER, 0xffff);
    TIMER_set(AVG_LOOP_TIMER, 0xffff);

    /*
        This is the main forever loop...
    */
    for(;;)
        {
        /*
            Check to see if we have an incoming character on the
            telemetry link.
        */
        PCOM_receive();

        /*
```

```
            Check timers to see if it is time to send a timer
            event to any of the managed objects.
        */
        TIMER_check_for_timeouts();

        /*
            Check for conditions that cause us to mute or unmute.
        */
        OCM_mute_check();

        /*
            Loop time checking for debug purposes.
        */
        ODU_loop_time();

        /*
            Reset the watchdog timer after every loop.
        */
        update_watchdog();
        }
}

/**************************************************************
 *
 * Name: init_system()
 *
 * Description:
 *      This routine initializes the Phillips 80C552
 *      microprocessor, as well as the other hardware
 *      for the ODU.
 *
 **************************************************************/
static void init_system(void)
{
    /*
        All port bits which are to be used as inputs must have
1's
        written to them to be read properly.
    */
    P1 = 0x1f;
    P4 = 0;
    IO_RDSW = 1;
    IO_TX_MUTE = 0;          // ensure the transmitter is muted

    /*
        TMOD is the Timer/Counter Mode Control Register. Here we
are
        configuring Timer 1 (the baud rate generator) as an 8-bit
        auto-reload timer, and Timer 0 as a 16-bit timer.
    */
```

MAIN.C

©P-COM, Inc., 1994

```
    TMOD = 0x21;

    /*
        TH0 and TL0 (the timer 0 tick values) are computed
        and stored in timer.c (the TIMER_init() function).
    */
    TIMER_init();

    /*
        TCON is the Timer/Counter Control Register. This is used
to
        enable timer 0 and timer 1 so that they may run.
    */
    TCON = 0x50;

    /*
        Enable interrupts in IEN0:
        bit     use
        ---     -----
         7      Global interrupt enable/disable
         6      ADC interrupt
         5      SIO1 interrupt
         4      SIO0 interrupt (UART)
         3      Timer 1 interrupt (baud rate generator)
         2      External interrupt 1
         1      Timer 0 interrupt
         0      External interrupt 0

        We enable the UART (0x10), and TIMER0 (0x02).
        We do NOT enable the global interrupt enable/disable yet,
though!
    */
    IEN0 = 0x12;

    /*
        IEN1 enables timer T2 capture and comparator interrupts.
We
        don't use any of these, so set all bits to 0.
    */
    IEN1 = 0x00;

    /*
        The table above is also used for the IP0 (interrupt
        priority register), with the exception of bit 7, which
        is unused in the IP0 register.
        We give the UART high priority because we don't want
        to drop any characters.
        IP1 is associated with IEN1 above, so it is unused.
    */
    IP0 = 0x10;
```

MAIN.C

©P-COM, Inc., 1994

```
    IP1 = 0x00;

    /*
        Set the PWM's to 2.5V to start with (a good safe
default).
    */
     PWM1 = 0x7f;
     PWM0 = 0x7f;
    PCON = 0x00;
}

/*************************************************************
 *
 * Name: update_watchdog
 *
 * Description:
 *      This routine resets the watchdog timer to prevent
 *      it from reseting the processor.
 *      The Phillips 80C552 has a built-in watchdog timer (T3).
 *      It is an 8-bit count-up timer; when the count exceeds
0xFF,
 *      the processor is reset. By setting it to zero we get
about
 *      610ms before it goes off.
 *************************************************************/
void update_watchdog(void)
{
    PCON |= 0x10;          // this bit must be set to load T3
    T3 = 0;                // this is the 8-bit watchdog counter
}

/*************************************************************
 *
 * Name:        void my_memcpy(uchar *dst, uchar *src, uchar len)
 *
 * Description: This function copies 'len' bytes from 'src' to
 *              'dst'. There is no check for overlapping
 *              regions. This is using because the C51 memcpy()
 *              function does not seem to work.
 *
 *************************************************************/
void my_memcpy(uchar xdata *dst, uchar xdata *src, uchar len)
{
    while(len--)
        *dst++ = *src++;
}

/*************************************************************
 *
 * Name:        void my_memclr(uchar *dst, uchar len)
```

©P-COM, Inc., 1994

```
 *
 * Description: This function zeroes 'len' bytes starting at
 *              'dst'.
 *
 *************************************************************/
void my_memclr(uchar xdata *dst, uchar len)
{
    while(len--)
        *dst++ = 0;
}

/*************************************************************
 *
 * Name:        void delay_ms(uchar ms)
 *
 * Description: This function provides a short delay in
 *              milliseconds before returning.
 *
 *************************************************************/
void delay_ms(uchar ms)
{
    TIMER_set(DELAY_TIMER, (uint)ms);
    while( ! TIMER_expired(DELAY_TIMER))
        ;
}
```

MIZAR.H

©P-COM, Inc., 1994

```
/***************************************************************
 *
 * Description: This header file contains the public interface
 *              to the Mizar synthesizer control module.
 *
 * $Id: mizar.h 2.1 1993/12/30 08:32:21 MIKEE Exp $
 *
 * $Log: mizar.h $
 * Revision 2.1  1993/12/30  08:32:21  MIKEE
 * converion to MKS RCS
 *
 *
 *    Rev 1.1   17 Nov 1993 16:59:40   mikee
 * part of mizar cleanup
 *
 *    Rev 1.0   01 Nov 1993 15:04:36   mikee
 * Initial revision.
 *
 ***************************************************************/

#ifndef _MIZAR_H
#define _MIZAR_H

#include "global.h"

/*
    Function Prototypes:
*/
void MIZAR_init(void);
void MIZAR_timer_event(uchar timer);
void MIZAR_set_frequency(uchar channel, uchar rate);
bit MIZAR_ready(void);
bit MIZAR_is_locked(void);
void xdata *MIZAR_getdata(void);
uchar MIZAR_alarm_code(void);

#endif _MIZAR_H
```

©P-COM, Inc., 1994

```
/************************************************************
 *
 * Description: This header file contains definitions required
 *              the use the NOVRAM read/write routines
 *              contained in NOVRAM.C.
 *
 * $Id: novram.h 2.1 1993/12/30 08:17:01 MIKEE Exp $
 *
 * $Log: novram.h $
 * Revision 2.1  1993/12/30  08:17:01  MIKEE
 * converion to MKS RCS
 *
 *
 *    Rev 1.3   17 Nov 1993 17:00:28   mikee
 * misc cleanup
 *
 *    Rev 1.2   01 Nov 1993 15:04:38   mikee
 * Check in for release 1.0 (first production release)
 *
 ************************************************************/

#ifndef _NOVRAM_H
#define _NOVRAM_H

#include "global.h"

#define   PAGE_1                    0x00
#define   PAGE_2                    0x01

#define   NV_TEST_LOC          0x00    /* ADDRESS in both pages */
#define   NV_MASTER_LOC        0x01    /* ADDRESS in page 1 */
#define   NV_FW_REL_MSB_LOC    0x02    /* ADDRESS in page 1 */
#define   NV_FW_REL_LSB_LOC    0x03    /* ADDRESS in page 1 */
#define NV_SERIAL1_LOC       0x04
#define NV_SERIAL2_LOC       0x05
#define NV_SERIAL3_LOC       0x06
#define NV_OBJECT_TABLE_LOC 0x10    /* ADDRESS in page 1 */

/*
    Function Prototypes:
*/
uchar NOVRAM_init(void);
bit NOVRAM_write(uchar *source, uchar e2_addr, uchar length,
uchar sheet);
bit NOVRAM_read(uchar *destination, uchar e2_addr, uchar length,
uchar sheet);
bit NV_clr_novram(void);
bit NV_read_all_attr(uchar object, uchar num_inst,
    uchar (*set_attrib)(uchar,uchar,uint));
bit NV_save_all_attr(uchar object, uchar num_inst, uchar
```

©P-COM, Inc., 1994

```
*attr_tab,
    uchar (*get_attrib)(uchar,uchar,uint));

#endif _NOVRAM_H
```

©P-COM, Inc., 1994

```
/*************************************************************
 *
 * Description: This header file contains definitions for
 *              working with the managed objects in the ODU.
 *
 * $Id: object.h 2.1 1993/12/30 08:30:57 MIKEE Exp $
 *
 * $Log: object.h $
 * Revision 2.1  1993/12/30  08:30:57  MIKEE
 * converion to MKS RCS
 *
 *
 *    Rev 1.5   17 Nov 1993 17:01:08   mikee
 * misc cleanup
 *
 *    Rev 1.4   01 Nov 1993 15:04:40   mikee
 * Check in for release 1.0 (first production release)
 *
 ************************************************************/

#ifndef OBJECT_H
#define OBJECT_H 1

#include "global.h"
#include "pcom_msg.h"

/*
 * Objects:
 * NOTE: If you change these you must also change the table in
OBJECT.C!
 */
enum
{
    RADIO_OBJ,
    COMM_OBJ,
    SPM_OBJ,
    ALARM_OBJ,
    A2D_OBJ,
    LINK_OBJ,
    LINE_OBJ,
    FCP_OBJ,
    ODU_OBJ,
    REMOTE_OBJ,
    MEM_OBJ,
    TIME_OBJ,
    OCM_OBJ,

    NUM_OBJECTS,

    FACTORY_OBJ = 0xF0,
```

OBJECT.H

©P-COM, Inc., 1994

```
    NULL_OBJ = 0xff
};

#define SPECIAL_ATTRIBS 0xc8            // start of special
attributes
#define NO_MORE_ATTR    0xff            // no more attributes to
process

#define ALL_INSTANCES   0xff            // all instances of a
given object

/*
    Function Prototypes:
*/
void OBJ_init(void);
uchar OBJ_process_attr(uchar opcode, uint xdata **msg_at, uint
xdata *obj_at);
void OBJ_call_msg_event(uchar obj, HEADER xdata *msg, uchar xdata
*resp);
void OBJ_call_timer_event(uchar obj, uchar timer);

void OBJ_proc_attr_msg(HEADER xdata *msg, uchar xdata *response,
    uchar (*set_attrib)(uchar,uchar,uint),
    uchar (*get_attrib)(uchar,uchar,uint *),
    uchar max_inst);

#endif
```

©P-COM, Inc., 1994

```
/***********************************************************
 *
 * Description: This header file contains definitions for
 *              working with the managed objects in the ODU.
 *
 * $Id: object.h 2.1 1993/12/30 08:30:57 MIKEE Exp $
 *
 * $Log: object.h $
 * Revision 2.1  1993/12/30  08:30:57  MIKEE
 * converion to MKS RCS
 *
 *
 *    Rev 1.5   17 Nov 1993 17:01:08   mikee
 * misc cleanup
 *
 *    Rev 1.4   01 Nov 1993 15:04:40   mikee
 * Check in for release 1.0 (first production release)
 *
 ***********************************************************/

#ifndef OBJECT_H
#define OBJECT_H 1

#include "global.h"
#include "pcom_msg.h"

/*
 * Objects:
 * NOTE: If you change these you must also change the table in
OBJECT.C!
 */
enum
{
    RADIO_OBJ,
    COMM_OBJ,
    SPM_OBJ,
    ALARM_OBJ,
    A2D_OBJ,
    LINK_OBJ,
    LINE_OBJ,
    FCP_OBJ,
    ODU_OBJ,
    REMOTE_OBJ,
    MEM_OBJ,
    TIME_OBJ,
    OCM_OBJ,

    NUM_OBJECTS,

    FACTORY_OBJ = 0xF0,
```

©P-COM, Inc., 1994

```
    NULL_OBJ = 0xff
};

#define SPECIAL_ATTRIBS 0xc8              // start of special
attributes
#define NO_MORE_ATTR    0xff              // no more attributes to
process

#define ALL_INSTANCES   0xff              // all instances of a
given object

/*
    Function Prototypes:
*/
void OBJ_init(void);
uchar OBJ_process_attr(uchar opcode, uint xdata **msg_at, uint
xdata *obj_at);
void OBJ_call_msg_event(uchar obj, HEADER xdata *msg, uchar xdata
*resp);
void OBJ_call_timer_event(uchar obj, uchar timer);

void OBJ_proc_attr_msg(HEADER xdata *msg, uchar xdata *response,
    uchar (*set_attrib)(uchar,uchar,uint),
    uchar (*get_attrib)(uchar,uchar,uint *),
    uchar max_inst);

#endif
```

```
/***********************************************************
 *
 * Description: This header file contains prototypes for
 *              functions contained in ocm_obj.c, the OCM
 *              Object which sends the HERE_CMD to the IDU.
 *
 * $Id: ocm_obj.h 2.1 1993/12/30 08:32:22 MIKEE Exp $
 *
 * $Log: ocm_obj.h $
 * Revision 2.1  1993/12/30  08:32:22  MIKEE
 * converion to MKS RCS
 *
 *
 *    Rev 1.2   18 Dec 1993 14:09:38   mikee
 * changes for over-current trip fix
 *
 *    Rev 1.1   17 Nov 1993 17:01:40   mikee
 * misc cleanup
 *
 *    Rev 1.0   01 Nov 1993 15:04:42   mikee
 * Initial revision.
 *
 ***********************************************************/

#ifndef _OCM_OBJ_H
#define _OCM_OBJ_H

#include "global.h"
#include "pcom_msg.h"

/*
    Global variables:
*/
extern uchar OCM_PLO_Id; //!!! this should not be a global

/*
    Function Prototypes:
*/
void OCM_init(void);
void OCM_msg_event(HEADER xdata *msg, uchar xdata *response);
void OCM_timer_event(uchar timer);
void OCM_mute_check(void);
uchar OCM_get_transmit_power(void);
uint OCM_get_MinorAlarms(void);
uint OCM_get_MajorAlarms(void);
uchar OCM_get_channel(void);
uchar OCM_get_rate(void);
uchar OCM_disable_xmit_pwr(void);

#endif _OCM_OBJ_H
```

```
/***************************************************************
 *
 * Description: This module is simply a test module to
 *              test the OCM board. It will probably be
 *              removed in the production version.
 *
 * $Id: odu.c 2.1 1993/12/30 08:32:16 MIKEE Exp $
 *
 * $Log: odu.c $
 * Revision 2.1  1993/12/30  08:32:16  MIKEE
 * converion to MKS RCS
 *
 *
 *    Rev 1.2   17 Nov 1993 16:33:42   mikee
 * Misc internal cleanup
 *
 *    Rev 1.1   01 Nov 1993 15:04:44   mikee
 * Check in for release 1.0 (first production release)
 *
 ***************************************************************/

#include <reg552.h>

#include "global.h"
#include "odu.h"
#include "pcom_msg.h"
#include "io_ports.h"
#include "ocm_obj.h"
#include "mizar.h"
#include "a2d.h"
#include "object.h"
#include "novram.h"
#include "synth.h"
#include "timer.h"
#include "version.h"

enum
{
    ODU_RELEASE_ATTR,
    ODU_PLO_ID_ATTR,
    ODU_RECVR_LVL_ATTR,
    ODU_TEMP_ATTR,
    ODU_MINOR_ALARMS_ATTR,
    ODU_MAJOR_ALARMS_ATTR,

    /*
        The following attributes are for debugging purposes, and
may be
        changed or deleted at any time. They are not officially
documented.
```

©P-COM, Inc., 1994

```
    */
    ODU_MIN_LOOP_TIME = 0xe0,
    ODU_AVG_LOOP_TIME,
    ODU_MAX_LOOP_TIME,

    ODU_WRITE_P1=0xf0,
    ODU_READ_P3,
    ODU_WRITE_P4,
    ODU_WRITE_PWM0,
    ODU_WRITE_PWM1,
    ODU_READ_P1,
    ODU_WRITE_TXMUTE,
    ODU_READ_MIZAR,
    ODU_SET_CHANNEL,
    ODU_READ_BAND,
    ODU_TEST_NOVRAM,
    ODU_TEST_FLASH,
    ODU_READ_FLASH_ID,
    ODU_ERASE_FLASH
};

/*
 * External Functions:
 */

/*
 * Internal Functions:
 */
uchar novram_read_test(uchar xdata *ptr, uchar xdata **p_rptr);
uchar novram_write_test(uchar xdata *ptr);
uchar flash_read_test(uchar xdata *ptr, uchar xdata **p_rptr);
uchar flash_write_test(uchar xdata *ptr);
uchar ODU_get_attrib(uchar inst, uchar attrib, uint *value);
uchar ODU_set_attrib(uchar inst, uchar attrib, uint value);
static uint read_flash_id(void);
static void flash_erase(void);

/*
 * External Data:
 */

/*
 * Internal Data:
 */
static uint Min_Loop, Max_Loop, Avg_Loop;

/****************************************************************
 *
 * Name:        void ODU_init(void)
 *
```

```
 * Description: This function is called at startup to intialize
 *              the ODU object.
 *
 ***********************************************************/
void ODU_init(void)
{
    Min_Loop = 0xffff;
    Max_Loop = 0x0000;
}

/************************************************************
 *
 * Name:        uchar ODU_set_attrib(uchar inst, uchar attr, uint
value)
 *
 * Description: This procedure sets the given instance's
 *              attribute to the given value.
 *              It returns a message error status.
 *
 ***********************************************************/
uchar ODU_set_attrib(uchar inst, uchar attrib, uint value)
{
    uchar status = NO_ERROR;

    switch(attrib)
        {
        case ODU_WRITE_P1:
            P1 = value;
            break;
        case ODU_WRITE_P4:
            P4 = value;
            break;
        case ODU_WRITE_PWM0:
            PWM0 = value;
            break;
        case ODU_WRITE_PWM1:
            PWM1 = value;
            break;
        case ODU_WRITE_TXMUTE:
            if(value)
                IO_TX_MUTE = 0;
            else IO_TX_MUTE = 1;
            break;
        case ODU_SET_CHANNEL:
            MIZAR_set_frequency(value, RATE_1x2);
            break;
        default:
            status = BAD_CMD_ATTRIBUTE;
        }
    return status;
```

```
}

/************************************************************
 *
 * Name:        uchar ODU_get_attrib(uchar inst, uchar attr, uint
*value)
 *
 * Description: This procedure gets the current value of a
 *              given instance's attribute.
 *              It returns a message error status.
 *
 ************************************************************/
uchar ODU_get_attrib(uchar inst, uchar attrib, uint *value)
{
    uchar status = NO_ERROR;

    switch(attrib)
        {
        case ODU_RELEASE_ATTR:
            *value = Version();
            break;
        case ODU_PLO_ID_ATTR:
            *value = (uint)OCM_PLO_Id;
            break;
        case ODU_RECVR_LVL_ATTR:
            *value = (uint)A2D_get_agc();
            break;
        case ODU_TEMP_ATTR:
            *value = (uint)A2D_get_temp();
            break;
        case ODU_MINOR_ALARMS_ATTR:
            *value = OCM_get_MinorAlarms();
            break;
        case ODU_MAJOR_ALARMS_ATTR:
            *value = OCM_get_MajorAlarms();
            break;

        case ODU_MIN_LOOP_TIME:
            *value = Min_Loop;
            break;
        case ODU_AVG_LOOP_TIME:
            *value = Avg_Loop;
            break;
        case ODU_MAX_LOOP_TIME:
            *value = Max_Loop;
            break;
        case ODU_READ_P3:
            *value = (uint)P3;
            break;
        case ODU_READ_P1:
```

```
            *value = (uint)P1;
            break;
        case ODU_READ_BAND:
            *value = (uint)OCM_PLO_Id;
            break;
        case ODU_READ_FLASH_ID:
            *value = read_flash_id();
            break;
        default:
            status = BAD_CMD_ATTRIBUTE;
        }
    return status;
}

/***************************************************************
 *
 * Name:          void ODU_msg_event(HEADER *msg, uchar *response)
 *
 * Description: This function is called whenever a message is
 *              received by the ODU Object.
 *
 ***************************************************************/
void ODU_msg_event(HEADER xdata *msg, uchar xdata *response)
{
    uchar xdata *rptr;
    uchar status;

    if(*msg->data_ptr == ODU_TEST_NOVRAM)
        {
        rptr = response;
        if(msg->opcode == SET_CMD)
            status = novram_write_test(msg->data_ptr+1);
        else status = novram_read_test(msg->data_ptr+1, &rptr);

        msg->data_length = (uchar)(rptr - response);
        msg->data_ptr = response;
        PCOM_send_resp(msg, status);
        }
    else if(*msg->data_ptr == ODU_TEST_FLASH)
        {
        rptr = response;
        if(msg->opcode == SET_CMD)
            status = flash_write_test(msg->data_ptr+1);
        else status = flash_read_test(msg->data_ptr+1, &rptr);

        msg->data_length = (uchar)(rptr - response);
        msg->data_ptr = response;
        PCOM_send_resp(msg, status);
        }
    else if(*msg->data_ptr == ODU_ERASE_FLASH)
```

```
        {
        flash_erase();
        msg->data_length = 0;
        PCOM_send_resp(msg, NO_ERROR);
        }
    else if(*msg->data_ptr == ODU_READ_MIZAR)
        {
        my_memcpy(response, MIZAR_getdata(), 16);
        msg->data_ptr = response;
        msg->data_length = 16;
        PCOM_send_resp(msg, status);
        }
    else OBJ_proc_attr_msg(msg, response, ODU_set_attrib,
ODU_get_attrib, 1);
}

/************************************************************
 *
 * Name:        void ODU_loop_time(void)
 *
 * Description: This function is called after each main loop
 *              to keep statistics on loop times.
 *
 ************************************************************/
void ODU_loop_time(void)
{
    uint elapsed = 0xffff - TIMER_get(LOOP_TIMER);
    static uint counter = 0;

    if(elapsed < Min_Loop)
        Min_Loop = elapsed;
    if(elapsed > Max_Loop)
        Max_Loop = elapsed;
    if(++counter >= 1000)
        {
        Avg_Loop = (0xffff - TIMER_get(AVG_LOOP_TIMER)) / 1000;
        counter = 0;
        TIMER_set(AVG_LOOP_TIMER, 0xffff);
        }
    TIMER_set(LOOP_TIMER, 0xffff);
}

/************************************************************
 *
 * Name:        novram_read_test
 *
 * Description: Read bytes from novram.
 *              The data portion of the incoming message should
be:
 *              Byte    Value
```

```
 *                 ----    -----
 *                   0     number of bytes to read (0-255)
 *                   1     Offset in EEPROM (starting address)
 *                   2     Page in EEPROM (0 or 1)
 *
 ***************************************************************/
uchar novram_read_test(uchar xdata *ptr, uchar xdata **p_rptr)
{
    uchar xdata *rptr = *p_rptr;
    uchar e2_addr;
    uchar length;
    uchar page;

    length = *ptr++;
    e2_addr = *ptr++;
    page = *ptr++;
    *p_rptr = rptr + length;
    return (NOVRAM_read(rptr, e2_addr, length, page)
        ? NO_ERROR : COMMAND_FAILED);
}

/***************************************************************
 *
 * Name:        novram_write_test
 *
 * Description: Write bytes from novram.
 *              The data portion of the incoming message should
be:
 *              Byte    Value
 *              ----    -----
 *                0     number of bytes to write (0-255)
 *                1     Offset in EEPROM (starting address)
 *                2     Page in EEPROM (0 or 1)
 *                3-n   Data to write
 *
 ***************************************************************/
static uchar novram_write_test(uchar xdata *ptr)
{
    uchar e2_addr;
    uchar length;
    uchar page;

    length = *ptr++;
    e2_addr = *ptr++;
    page = *ptr++;
    return (NOVRAM_write(ptr, e2_addr, length, page)
        ? NO_ERROR : COMMAND_FAILED);
}

/***************************************************************
```

```
 *
 * Name:        flash_read_test
 *
 * Description: Read bytes from Flash.
 *              The data portion of the incoming message should
be:
 *              Byte    Value
 *              ----    -----
 *                0     number of bytes to read (0-128)
 *                1     Offset in Flash (starting address MSB)
 *                2     Offset in Flash (starting address LSB)
 *
 ***************************************************************/
static uchar flash_read_test(uchar xdata *ptr, uchar xdata
**p_rptr)
{
    uchar xdata *rptr = *p_rptr;
    uchar length;
    uchar xdata *flashptr;
    uint addr;

    length = *ptr++;
    addr = (uint)*ptr++ << 8;
    addr |= *ptr++;
    flashptr = (uchar xdata *)addr;
    *p_rptr = rptr + length;
    IO_FLASH_A16 = IO_FLASH_A17 = 0;
    my_memcpy(rptr, flashptr, length);

    return NO_ERROR;
}

/***************************************************************
 *
 * Name:        flash_write_test
 *
 * Description: Write bytes to Flash.
 *              The data portion of the incoming message should
be:
 *              Byte    Value
 *              ----    -----
 *                0     number of bytes to read (0-128)
 *                1     Offset in Flash (starting address MSB)
 *                2     Offset in Flash (starting address LSB)
 *                3-n   Data to write
 *
 ***************************************************************/
static uchar flash_write_test(uchar xdata *ptr)
{
    uchar length;
```

©P-COM, Inc., 1994

```
    uchar xdata *flashptr;
    uint addr;

    length = *ptr++;
    addr = (uint)*ptr++ << 8;
    addr |= *ptr++;
    flashptr = (uchar xdata *)addr;
    IO_FLASH_A16 = IO_FLASH_A17 = 0;
    my_memcpy(flashptr, ptr, length);

    return NO_ERROR;
}

static uint read_flash_id(void)
{
    uchar xdata *flashptr = 0x8000;
    uchar mancode, devcode;

    IO_FLASH_A16 = IO_FLASH_A17 = 0;
    *(flashptr + 0x5555) = 0xAA;
    *(flashptr + 0x2aaa) = 0x55;
    *(flashptr + 0x5555) = 0x90;
    TIMER_set(PLO2_TIMER, 15);
    while( ! TIMER_expired(PLO2_TIMER))
        ;

    mancode = *(flashptr+0x400);
    devcode = *(flashptr+0x401);

    /*
        Exit Product ID mode
    */
    *(flashptr + 0x5555) = 0xAA;
    *(flashptr + 0x2aaa) = 0x55;
    *(flashptr + 0x5555) = 0xF0;

    TIMER_set(PLO2_TIMER, 15);
    while( ! TIMER_expired(PLO2_TIMER))
        ;

    return (mancode << 8) | devcode;
}

static void flash_erase(void)
{
    uchar xdata *flashptr = 0x8000;
    uchar i;

    IO_FLASH_A16 = IO_FLASH_A17 = 0;
```

©P-COM, Inc., 1994

```
    EA = 0;
    for(i = 0; i < 128; i++)
        *flashptr++ = i;
    EA = 1;
}
```

PCOM_MSG.H ©P-COM, Inc., 1994

```
/**************************************************************
 *
 * Description: This header file contains the structure for
 *              the P-Com message protocol.
 *
 * $Id: pcom_msg.h 2.1 1993/12/30 08:32:23 MIKEE Exp $
 *
 * $Log: pcom_msg.h $
 * Revision 2.1  1993/12/30  08:32:23  MIKEE
 * converion to MKS RCS
 *
 *
 *    Rev 1.1   17 Nov 1993 17:02:54   mikee
 * misc cleanup
 *
 *    Rev 1.0   01 Nov 1993 15:04:46   mikee
 * Initial revision.
 *
 *************************************************************/
#ifndef _PCOM_MSG_H
#define _PCOM_MSG_H

#include "global.h"

/*
    This structure stores an incoming message in the P-Com
protocol.
*/
typedef struct
{
    uint nms_address;               // MSB first, LSB last.
    uchar link_address;             // used for internal routing
    uchar opcode;                   // defines message operation
    uchar object;                   // internal object to which
msg applies
    uchar data_length;              // # bytes of data that
follow
    uchar msgdata[256];             // any data associated with
this msg
    uchar xdata *data_ptr;          // current index into the
data array
} HEADER;

/*
    These are the possible response values to a received message.
*/
enum
{
    NO_ERROR,               // everything went fine
    BAD_LINK_ADDRESS,       // bad link address
```

PLESSEY.H

©P-COM, Inc., 1994

```
/***************************************************************
 *
 * Description: This header file contains the definitions
 *              and prototypes to use the functions in
 *              plessey.c, which control the programming of
 *              the Plessey (P-Com) synthesizer.
 *
 * $Id: plessey.h 2.1 1993/12/30 08:32:23 MIKEE Exp $
 *
 * $Log: plessey.h $
 * Revision 2.1  1993/12/30  08:32:23  MIKEE
 * converion to MKS RCS
 *
 *
 *    Rev 1.1   17 Nov 1993 17:04:12   mikee
 * misc cleanup
 *
 *    Rev 1.0   01 Nov 1993 15:04:48   mikee
 * Initial revision.
 *
 **************************************************************/

#ifndef _PLESSEY_H
#define _PLESSEY_H

#include "global.h"

/*
    Function Prototypes:
*/
void PLESSEY_init(void);
void PLESSEY_set_frequency(uchar channel, uchar rate);

#endif _PLESSEY_H
```

PLO2.H

©P-COM, Inc., 1994

```
/*****************************************************************
 *
 * Description: This header file contains the interface to
 *              the 2nd PLO module.
 *
 * $Id: plo2.h 2.1 1993/12/30 08:56:39 MIKEE Exp $
 *
 * $Log: plo2.h $
 * Revision 2.1  1993/12/30  08:56:39  MIKEE
 * convertion to MKS RCS
 *
 *
 *    Rev 1.1   17 Nov 1993 17:03:14   mikee
 * misc cleanup
 *
 *    Rev 1.0   01 Nov 1993 15:04:50   mikee
 * Initial revision.
 *
 *****************************************************************/
#ifndef _PLO2_H
#define _PLO2_H

#include "global.h"

/*
    Function Prototypes:
*/
void PLO2_init(void);
void PLO2_timer_event(uchar timer);
void PLO2_adjust(uchar whichway);
uchar PLO2_A_value(void);

#endif _PLO2_H
```

```
/*************************************************************
 *
 * Description: This header file contains the interface to
 *              the 2nd PLO module.
 *
 * $Id: plo2.h 2.1 1993/12/30 08:56:39 MIKEE Exp $
 *
 * $Log: plo2.h $
 * Revision 2.1  1993/12/30  08:56:39  MIKEE
 * convertion to MKS RCS
 *
 *
 *    Rev 1.1   17 Nov 1993 17:03:14   mikee
 * misc cleanup
 *
 *    Rev 1.0   01 Nov 1993 15:04:50   mikee
 * Initial revision.
 *
 *************************************************************/
#ifndef _PLO2_H
#define _PLO2_H

#include "global.h"

/*
    Function Prototypes:
*/
void PLO2_init(void);
void PLO2_timer_event(uchar timer);
void PLO2_adjust(uchar whichway);
uchar PLO2_A_value(void);

#endif _PLO2_H
```

PLO2.H

©P-COM, Inc., 1994

```
/****************************************************************
 *
 * Description: This header file contains the interface to
 *              the 2nd PLO module.
 *
 * $Id: plo2.h 2.1 1993/12/30 08:56:39 MIKEE Exp $
 *
 * $Log: plo2.h $
 * Revision 2.1  1993/12/30  08:56:39  MIKEE
 * convertion to MKS RCS
 *
 *
 *    Rev 1.1   17 Nov 1993 17:03:14   mikee
 * misc cleanup
 *
 *    Rev 1.0   01 Nov 1993 15:04:50   mikee
 * Initial revision.
 *
 ****************************************************************/
#ifndef _PLO2_H
#define _PLO2_H

#include "global.h"

/*
    Function Prototypes:
*/
void PLO2_init(void);
void PLO2_timer_event(uchar timer);
void PLO2_adjust(uchar whichway);
uchar PLO2_A_value(void);

#endif _PLO2_H
```

©P-COM, Inc., 1994

```
/*************************************************************
 *
 * Description: This header file contains the definitions for
 *              the interface to the SCC2691 UART.
 *
 * $Id: scc2691.h 2.1 1993/12/30 08:32:24 MIKEE Exp $
 *
 * $Log: scc2691.h $
 * Revision 2.1  1993/12/30  08:32:24  MIKEE
 * converion to MKS RCS
 *
 *
 *    Rev 1.1   17 Nov 1993 17:03:42   mikee
 * misc cleanup
 *
 *    Rev 1.0   01 Nov 1993 15:04:52   mikee
 * Initial revision.
 *
 *************************************************************/

#ifndef _SCC2691_H
#define _SCC2691_H

#include "global.h"

/*
    Function Prototypes:
*/
void SCC2691_init(void);
void SCC_sendbyte(uchar byte);
bit SCC_rcv_byte(uchar data *byte);

#endif _SCC2691_H
```

SYNTH.H

©P-COM, Inc., 1994

```
/****************************************************************
 *
 * Description: This header file contains the definitions for
 *              the synthesizer.
 *
 * $Id: synth.h 2.1 1993/12/30 08:32:24 MIKEE Exp $
 *
 * $Log: synth.h $
 * Revision 2.1  1993/12/30  08:32:24  MIKEE
 * converion to MKS RCS
 *
 *
 *    Rev 1.1   17 Nov 1993 17:04:32   mikee
 * updated for mizar cleanup
 *
 *    Rev 1.0   01 Nov 1993 15:04:54   mikee
 * Initial revision.
 *
 ****************************************************************/

#ifndef _SYNTH_H
#define _SYNTH_H

#include "global.h"

/*
    Defines for the various supported rates.
*/
enum
{
    RATE_1x2, RATE_2x2, RATE_4x2
};

/*
    Return values from SYNTH_type()
*/
#define PCOM_SYNTH_TYPE 0
#define EXT_SYNTH_TYPE  1

/*
    Function Prototypes:
*/
void SYNTH_init(bit type);
void SYNTH_set_frequency(uchar channel, uchar rate);
bit SYNTH_is_locked(void);
bit SYNTH_type(void);

#endif _SYNTH_H
```

SYNTH.H

©P-COM, Inc., 1994

```
/***************************************************************
 *
 * Description: This header file contains the definitions for
 *              the synthesizer.
 *
 * $Id: synth.h 2.1 1993/12/30 08:32:24 MIKEE Exp $
 *
 * $Log: synth.h $
 * Revision 2.1  1993/12/30  08:32:24  MIKEE
 * converion to MKS RCS
 *
 *
 *    Rev 1.1   17 Nov 1993 17:04:32   mikee
 * updated for mizar cleanup
 *
 *    Rev 1.0   01 Nov 1993 15:04:54   mikee
 * Initial revision.
 *
 **************************************************************/

#ifndef _SYNTH_H
#define _SYNTH_H

#include "global.h"

/*
    Defines for the various supported rates.
*/
enum
{
    RATE_1x2, RATE_2x2, RATE_4x2
};

/*
    Return values from SYNTH_type()
*/
#define PCOM_SYNTH_TYPE 0
#define EXT_SYNTH_TYPE  1

/*
    Function Prototypes:
*/
void SYNTH_init(bit type);
void SYNTH_set_frequency(uchar channel, uchar rate);
bit SYNTH_is_locked(void);
bit SYNTH_type(void);

#endif _SYNTH_H
```

```
/***************************************************************
 *
 * Description: This header file contains definitions for
 *              the timer module.
 *
 * $Id: timer.h 2.1 1993/12/30 08:32:17 MIKEE Exp $
 *
 * $Log: timer.h $
 * Revision 2.1  1993/12/30  08:32:17  MIKEE
 * converion to MKS RCS
 *
 *
 *    Rev 1.2   17 Nov 1993 17:04:56   mikee
 * new timers for various parts of the program
 *
 *    Rev 1.1   01 Nov 1993 15:11:34   mikee
 * Check in for release 1.0 (first production release)
 *
 ***************************************************************/

#ifndef _TIMER_H
#define _TIMER_H

#include "global.h"
#include "pcom_msg.h"

enum
    {
    PLO2_TIMER,
    OCM_TIMER,
    ADC_TIMER,
    NOVRAM_TIMER,
    IDU_HERE_CMD_TIMER,
    MIZAR_TIMER,
    MIZAR_TEMP_TIMER,
    MIZAR_TIMEOUT_TIMER,
    MAJOR_ALARM_TIMER,
    PLO2_LOCK_TIMER,
    ALARM_TIMER,
    LOOP_TIMER,
    AVG_LOOP_TIMER,
    DELAY_TIMER,
    FLASH_PROGRAM_TIMER,

    NUM_TIMERS
    };

/*
    Function Prototypes:
*/
```

™P-COM, Inc., 1994

```
void TIMER_init(void);
void TIMER_set(uchar timer, uint ms);
uint TIMER_get(uchar timer);
bit TIMER_expired(uchar timer);
void TIMER_check_for_timeouts(void);
void TIMER_register(uchar timer, uchar object, uint initial, uint
interval);
void TIMER_1_shot(uchar timer, uchar object, uint interval);
void TIMER_unregister(uchar timer);
void TIMER_msg_event(HEADER xdata *msg, uchar xdata *response);

#endif _TIMER_H
```

UART.H

```
/**************************************************************
 *
 * Description:   This header file contains the definitions
 *      and function prototypes needed to use the UART functions.
 *
 * $Id: uart.h 2.1 1993/12/30 08:32:25 MIKEE Exp $
 *
 * $Log: uart.h $
 * Revision 2.1  1993/12/30  08:32:25  MIKEE
 * converion to MKS RCS
 *
 *
 *    Rev 1.0   01 Nov 1993 15:04:58   mikee
 * Initial revision.
 *
 *************************************************************/

#ifndef _UART_H
#define _UART_H

#include "global.h"

/*
    Function Prototypes:
*/
void UART_init(uchar baudrate);             // initialize the
UART module
void UART_sendbyte(uchar byte);             // send a single byte
bit UART_rcv_byte(uchar data *byte);        // returns 1 if byte
rcvd

#endif _UART_H
```

VERSION.H ©P-COM, Inc., 1994

```
/***************************************************************
 *
 * Description: This file contains the interface to version.c.
 *
 * $Id: version.h 2.1 1993/12/30 08:32:25 MIKEE Exp $
 *
 * $Log: version.h $
 * Revision 2.1  1993/12/30  08:32:25  MIKEE
 * converion to MKS RCS
 *
 *
 *    Rev 1.0   17 Nov 1993 17:14:22   mikee
 * Initial revision.
 *
 ***************************************************************/

#ifndef _VERSION_H
#define _VERSION_H

/*
    Function Prototypes:
*/
uint Version(void);

#endif _VERSION_H
```

SOFTWARE CONFIGURABLE RADIO

Gideon Ben-Efraim

APPENDIX D

Attorney Docket M-2763 US

Copyright © P-COM, Inc., 1994

```
/*****************************************************   *******
 *
 * Description: Copyright (c) 1990 Intel Corporation,
 *              ALL RIGHTS RESERVED.
 *
 * 80C196.h  - declarations for 80C196 SFRs (a superset of
 *             8096 registers) and 80C196-specific library
 *             function declarations
 *
 * $Id: 80c196.h 2.1 1993/12/29 10:38:23 MIKEE Exp $
 *
 * $Log: 80c196.h $
 * Revision 2.1  1993/12/29  10:38:23  MIKEE
 * covertion
 *
 *
 *    Rev 1.1   18 Sep 1993 14:55:08   mikee
 * initial production release IDU firmware
 ************************************************************/

#ifdef MAINCODE
#define VARIABLE
#else
#define VARIABLE extern
#endif


#ifndef _80c196h
#define _80c196h

/*
 * Interrupt mask bits
 */
#define EXT_INT          0x80
#define SER_PORT_INT     0x40
#define SOFT_TIME_INT    0x20
#define HSIO_PIN_INT     0x10
#define HSI_DATA_INT     0x04

#define WDT_HIGH         0x60
#define WDT_LOW          0x40


extern volatile register unsigned short r0;        /* at 0x00: r
 */
extern volatile register unsigned char ad_command;  /* at 0x02:
w */
extern volatile register unsigned char ad_result_lo;/* at 0x02: r
 */
extern volatile register unsigned char ad_result_hi;/* at 0x03: r
```

```
 */
extern volatile register unsigned char hsi_mode;     /* at 0x03:
w */
extern volatile register unsigned short hso_time;    /* at 0x04:
w */
extern volatile register unsigned short hsi_time;    /* at 0x04: r
 */
extern volatile register unsigned char hso_command; /* at 0x06:
w */
extern volatile register unsigned char hsi_status;   /* at 0x06: r
 */
extern volatile register unsigned char sbuf;         /* at 0x07:
r/w */
extern volatile register unsigned char int_mask;     /* at 0x08:
r/w */
extern volatile register unsigned char int_pending; /* at 0x09:
r/w */
extern volatile register unsigned char watchdog;     /* at 0x0a:
w */
extern volatile register unsigned short timer1;      /* at 0x0a: r
 */
extern volatile register unsigned short timer2;      /* at 0x0c: r
 */
extern volatile register unsigned char baud_rate;    /* at 0x0e:
w */
extern volatile register unsigned char ioport0;      /* at 0x0e: r
 */
extern volatile register unsigned char ioport1;      /* at 0x0f:
r/w */
extern volatile register unsigned char ioport2;      /* at 0x10:
r/w */
extern volatile register unsigned char sp_con;       /* at 0x11:
w */
extern volatile register unsigned char sp_stat;      /* at 0x11: r
 */
extern volatile register unsigned char ioc0;         /* at 0x15:
w */
extern volatile register unsigned char ios0;         /* at 0x15: r
 */
extern volatile register unsigned char ioc1;         /* at 0x16:
w */
extern volatile register unsigned char ios1;         /* at 0x16: r
 */
extern volatile register unsigned char pwm_control; /* at 0x17:
w */

/*****************************************************************
************/
/*
         */
```

80C196.H ©P-COM, Inc., 1994

```
/* Additional SFRs of the 80C196KB
         */
/*
         */
/*****************************************************************
************/

extern volatile register unsigned char ioc2;        /* at 0x0b:
w */
extern volatile register unsigned char ipend1;      /* at 0x12:
r/w */
extern volatile register unsigned char imask1;      /* at 0x13:
r/w */
extern volatile register unsigned char wsr;         /* at 0x14:
r/w */
extern volatile register unsigned char ios2;        /* at 0x17: r
 */

/*****************************************************************
************/
/*
         */
/* Additional C96.LIB functions supported by the 80C196 only
         */
/*
         */
/*****************************************************************
************/

void enable(void);

void disable(void);

void power_down(void);
void idle(void);

void enable_pts(void);
void disable_pts(void);

#define IDLE_ON    if (PERF_DBG == ON) pwm_control = 1;
#define IDLE_OFF   if (PERF_DBG == ON) pwm_control = 0;

/*
 * Over-lay for port 0
 */
typedef struct
{
    unsigned avmux      :5;
    unsigned spare1     :1;
    unsigned spare2     :1;
```

©P-COM, Inc., 1994

```
    unsigned sdo        :1;
} PORT0_OL;

/*
 * Over-lay for port 1
 */
typedef struct
{
    unsigned bank       :3;
    unsigned mapmode    :1;
    unsigned e2_dta     :1;
    unsigned regle1     :1;
    unsigned regle2     :1;
    unsigned regle3     :1;
} PORT1_OL;
#define EE_RESULTS()    ((ioport1 & 0x10) ^ 0x10)
#define EE_DATA_BIT()   ((ioport1 >> 4) & 0x01)
#define MD_LATCH1       0xdf
#define MD_LATCH2       0xbf
#define MD_LATCH3       0x7f

/*
 * Over-lay for port 2
 */
typedef struct
{
    unsigned odu_txd    :1;
    unsigned odu_rxd    :1;
    unsigned sccints    :1;
    unsigned spare1     :1;
    unsigned spare2     :1;
    unsigned agc        :1;
    unsigned e2_ud_sdi  :1;
    unsigned e2_s_clk   :1;
} PORT2_OL;

/*
 * Over-lay for hsi
 */
typedef struct
{
    unsigned fpint      :1;
    unsigned expint     :1;
    unsigned spare3     :1;
    unsigned spare4     :1;
} HSI_OL;

typedef struct
{
    unsigned a2d_chan   :3;
```

©P-COM, Inc., 1994

```
    unsigned status     :1;
    unsigned spare2     :2;
    unsigned a2d_lsb    :2;
} A2D_RSLT_LOW;
#define A2D_DONE()  ((ad_result_lo & 0x08) == 0)

#endif /* _80c196h */
```

```
/**************************************************************
 *
 * Description: This file contains the defines for the a2d
functions
 *
 * $Id: a2d.h 2.2 1994/01/19 11:21:35 JEFFC Exp $
 *
 * $Log: a2d.h $
 * Revision 2.2  1994/01/19  11:21:35  JEFFC
 * Added prototype for new clk recovery alarm function
 *
 * Revision 2.1  1993/12/29  10:31:04  MIKEE
 * log
 *
 *
 *    Rev 1.5   19 Nov 1993 06:28:56   mikee
 * new cable agcmon index equate
 *
 *    Rev 1.4   17 Nov 1993 10:25:08   mikee
 * added new voltage value
 *
 *    Rev 1.3   01 Nov 1993 11:47:30   mikee
 * new volt defines, 1 offset instead of 2 ranges for clearing
change
 *
 *    Rev 1.2   19 Oct 1993 15:07:02   mikee
 * added new volt defines for TxBBand
 *
 *    Rev 1.1   04 Oct 1993 12:43:34   mikee
 * fixed bug
 *
 *    Rev 1.0   18 Sep 1993 13:48:00   mikee
 * initial production IDU firmware project checkin
 *************************************************************/

#ifndef _A2D_H
#define _A2D_H

/*
 * A2D object attribute defines
 */
#define A2D_READING_ATTR      0
#define A2D_ALARM_ATTR        1
#define A2D_HI_ALM_ATTR       2
#define A2D_LO_ALM_ATTR       3
#define A2D_CLR_OFFSET_ATTR   4
#define A2D_ALM_HIST_ATTR     5
#define A2D_VAL_HIST_ATTR     6

#define NUM_A2D_ATTRS         7
```

A2D.H ©P-COM, Inc., 1994

```
/*
 * Voltage defines
 */
#define AVMUX0          0
#define      TXCLK_AV       0
#define      RXCLK_AV       1
#define      RXEYE_AV       2
#define      TXBBAND_AV     3
#define      RXBBAND_AV     4
#define      RHO_AV         5
#define      TXODW_AV       6
#define      RXODW_AV       7
#define AVMUX1          1
#define      MOD_AV         0
#define      RCV_AV         1
#define      SPARE1_AV      2
#define      SPARE2_AV      3
#define      SPARE3_AV      4
#define      AGC_AV         5
#define      TEMP1_AV       6
#define      TEMP2_AV       7
#define AVMUX2          2
#define      LN1VTRING      0
#define      LN1VTTIP       1
#define      LN2VTRING      2
#define      LN2VTTIP       3
#define      LN3VTRING      4
#define      LN3VTTIP       5
#define      LN4VTRING      6
#define      LN4VTTIP       7
#define AVMUX3          3           /* power supply voltages */
#define AVMUX4          4           /* RF modem vlotages */
#define      AGCMON         0
#define      MODEAV         1

#define NUM_A2D_MUXS    5
#define A2D_PER_MUX     8

#define NUM_A2D_VALUES      (NUM_A2D_MUXS * A2D_PER_MUX)
#define LINE_A2D_VALUES     (AVMUX2 * A2D_PER_MUX)
#define REMAIN_A2D_VALUES   (AVMUX3 * A2D_PER_MUX)
#define AGCMON_INDEX        (AVMUX4 * A2D_PER_MUX)

#define   START_A2D_CONVERSION     0X08


/*
 * Defines calculated with (voltage * 51) then converted to hex
 */
```

A2D.H

©P-COM, Inc., 1994

```
#define VOLT_0_25        0x0c
#define VOLT_0_5         0x19
#define VOLT_0_6         0x1e
#define VOLT_0_75        0x26
#define VOLT_1_0         0x33
#define VOLT_1_2         0x3d
#define VOLT_1_25        0x3f
#define VOLT_1_5         0x4c
#define VOLT_2_5         0x7f
#define VOLT_3_0         0x99
#define VOLT_3_5         0xb2
#define VOLT_4_0         0xcc
#define VOLT_4_5         0xe5
#define VOLT_5_0         0xff

typedef struct
{
    uchar   a2d_chk_alm;    /* if set an alarm is generated if
out of range*/
    uchar   a2d_lo_alm;     /* default trigger value on low end
*/
    uchar   a2d_hi_alm;     /* default trigger value on high end
*/
    uchar   a2d_clr_offset; /* default clear offset value */
} A2D_CNFG;

extern uchar A2D_handler(uchar,uchar,uchar *);
extern uchar A2D_chk_alm();
extern uchar A2D_process_attr_cmd();
extern uchar A2D_chk_clk_recov_alm(void);

#endif /* _A2D_H */
```

ALARM.H ©P-COM, Inc., 1994

```
/****************************************************************
 *
 * Description: This file contains the defines for the alarms
 *
 * $Id: alarm.h 2.2 1994/01/19 11:27:53 JEFFC Exp $
 *
 * $Log: alarm.h $
 * Revision 2.2  1994/01/19  11:27:53  JEFFC
 * Added Clock recovery alarm
 *
 * Revision 2.1  1993/12/29  10:38:24  MIKEE
 * covertion
 *
 *
 *    Rev 1.1   01 Nov 1993 11:48:22   mikee
 * new ODU alarms, removed remote attrs
 *
 *    Rev 1.0   18 Sep 1993 13:48:48   mikee
 * initial production IDU firmware project checkin
 ****************************************************************/

#ifndef _ALARM_H
#define _ALARM_H

/*
 * Alarm object instance defines
 */
#define IDU_ALM         0
#define ODU_ALM         1
#define CABLE_ALM       2
#define BER_ALM         3
#define RMT_ALM         4
#define LN_LOS_ALM      5
#define LN_AIS_ALM      6
#define CBL_OPEN_ALM    7
#define CBL_SHORT_ALM   8
#define A2D_ALM         9
#define SYNTH_ALM       10
#define PEER_ALM        11
#define EXT_INPUT_ALM   12
#define RMT_REPORT_ALM  13
#define LOOPBACK_ALM    14
#define TELEM_ALM       15
#define AIS_INJ_ALM     16
#define ODU_MUTE_ALM    17
#define ODU_CNFG_ALM    18
#define ODU_TX_ALM      19
#define ODU_RX_ALM      20
#define ODU_SYNTH_ALM   21
#define ODU_MISC_ALM    22
```

ALARM.H

©P-COM, Inc., 1994

```
#define CLK_RECOV_ALM    23

#define NUM_ALARMS       24    /* *** Keep updated */

#define MAX_ALARMS       25    /* used for fixed novram space */

#define NULL_ALM         0xff

/*
 * Alarm attributes
 */
#define STATE_ATTR       0
#define ALM_ABLE_ATTR    1
#define ALM_HIST_ATTR    2
#define RELAY_ATTR       3
#define NUM_ALARM_ATTRS 4

/*
 * Alarm types
 */
#define INDIVIDUAL       0
#define COLLECTIVE       1

/*
 * Alarm states
 */
#define NO_ALARM         0x00
#define ALARM_ON         0x01
#define ALM_BLINKING     0x02


typedef struct
{
    uchar   alm_type;       /* Individual or collective */
    uchar   alm_feeds;      /* this is feeds into this collective
alarm */
    uchar   blink_flag;
    BOOL_CB chk_func;       /* function to call to check alarm
condition */
} ALARM_CNFG;

extern void     ALARM_updt_relays();
extern uchar    ALARM_process_attr_cmd();
extern void     ALARM_set_attr();
extern uchar    ALARM_chk_cable_short();
extern uchar    ALARM_chk_cable_open();


#endif /* _ALARM_H */
```

ALARM.H

©P-COM, Inc., 1994

```
/****************************************************************
 *
 * Description: This file contains the defines for the alarms
 *
 * $Id: alarm.h 2.2 1994/01/19 11:27:53 JEFFC Exp $
 *
 * $Log: alarm.h $
 * Revision 2.2  1994/01/19  11:27:53  JEFFC
 * Added Clock recovery alarm
 *
 * Revision 2.1  1993/12/29  10:38:24  MIKEE
 * covertion
 *
 *
 *    Rev 1.1   01 Nov 1993 11:48:22   mikee
 * new ODU alarms, removed remote attrs
 *
 *    Rev 1.0   18 Sep 1993 13:48:48   mikee
 * initial production IDU firmware project checkin
 ***************************************************************/

#ifndef _ALARM_H
#define _ALARM_H

/*
 * Alarm object instance defines
 */
#define IDU_ALM         0
#define ODU_ALM         1
#define CABLE_ALM       2
#define BER_ALM         3
#define RMT_ALM         4
#define LN_LOS_ALM      5
#define LN_AIS_ALM      6
#define CBL_OPEN_ALM    7
#define CBL_SHORT_ALM   8
#define A2D_ALM         9
#define SYNTH_ALM       10
#define PEER_ALM        11
#define EXT_INPUT_ALM   12
#define RMT_REPORT_ALM  13
#define LOOPBACK_ALM    14
#define TELEM_ALM       15
#define AIS_INJ_ALM     16
#define ODU_MUTE_ALM    17
#define ODU_CNFG_ALM    18
#define ODU_TX_ALM      19
#define ODU_RX_ALM      20
#define ODU_SYNTH_ALM   21
#define ODU_MISC_ALM    22
```

ALARM.H

©P-COM, Inc., 1994

```
#define CLK_RECOV_ALM    23

#define NUM_ALARMS       24    /* *** Keep updated */

#define MAX_ALARMS       25    /* used for fixed novram space */

#define NULL_ALM         0xff

/*
 * Alarm attributes
 */
#define STATE_ATTR       0
#define ALM_ABLE_ATTR    1
#define ALM_HIST_ATTR    2
#define RELAY_ATTR       3
#define NUM_ALARM_ATTRS  4

/*
 * Alarm types
 */
#define INDIVIDUAL       0
#define COLLECTIVE       1

/*
 * Alarm states
 */
#define NO_ALARM         0x00
#define ALARM_ON         0x01
#define ALM_BLINKING     0x02


typedef struct
{
    uchar   alm_type;       /* Individual or collective */
    uchar   alm_feeds;      /* this is feeds into this collective
alarm */
    uchar   blink_flag;
    BOOL_CB chk_func;       /* function to call to check alarm
condition */
} ALARM_CNFG;

extern void     ALARM_updt_relays();
extern uchar    ALARM_process_attr_cmd();
extern void     ALARM_set_attr();
extern uchar    ALARM_chk_cable_short();
extern uchar    ALARM_chk_cable_open();


#endif /* _ALARM_H */
```

©P-COM, Inc., 1994

```
/***************************************************************
 *
 * Description: This file contains the defines for the
 *              bitmap handling routines.
 *
 * $Id: bitmap.h 1.1 1994/03/14 11:48:42 JEFFC Exp $
 *
 * $Log: bitmap.h $
 * Revision 1.1  1994/03/14  11:48:42  JEFFC
 * Initial revision
 *
 *
 ***************************************************************/

#ifndef _BITMAP_H
#define _BITMAP_H

extern uchar BITMAP_get(uchar *, uchar);
extern void BITMAP_set(uchar *, uchar);
extern void BITMAP_set_val(uchar *, uchar, uchar);

#endif /* _BITMAP_H */
```

D_CONST.C ©P-COM, Inc., 1994

```
/****************************************************************
 *
 * Description: This file contains all constants used by the
 *              IDU firmware. This is because of overlapping ROM
 *              RAM constraints. This file has to be loaded in
 *              non-overlapped memory.
 *
 * $Id: d_const.c 2.5 1994/03/14 11:32:02 JEFFC Exp $
 *
 * $Log: d_const.c $
 * Revision 2.5  1994/03/14  11:32:02  JEFFC
 * Changed TLP values. Made Synth Alarm a hard alarm instead of
blinking.
 *
 * Revision 2.4  1994/01/31  13:59:12  JEFFC
 * Put Relay config in novram, and added tables to translate
 * between old-style (pre-2.5) and new style BER.
 *
 * Revision 2.3  1994/01/25  14:25:10  JEFFC
 * Added new timer for EOW call button.
 *
 * Revision 2.2  1994/01/19  15:23:50  JEFFC
 * Changed Radio NV attributes, added timers, added alarm,
changed BER/AIS
 * tables, added TLP tables.
 *
 * Revision 2.1  1993/12/29  10:38:33  MIKEE
 * Conversion
 *
 *    Rev 1.5   19 Nov 1993 09:25:48   mikee
 * removed cable agcmon as an alarm source
 *
 *    Rev 1.4   17 Nov 1993 09:40:08   mikee
 * changed AGC mon test range
 *
 *    Rev 1.3   01 Nov 1993 11:39:54   mikee
 * new ODU alarms, remote alarm bug fix
 *
 *    Rev 1.2   05 Oct 1993 15:23:18   mikee
 * re-order objects
 *
 *    Rev 1.1   04 Oct 1993 16:34:52   mikee
 * cleanup before first ship
 *
 *    Rev 1.0   18 Sep 1993 14:03:48   mikee
 * Initial revision.
 ***************************************************************/

#include "sysdefs.h"
```

D_CONST.C ©P-COM, Inc., 1994

```
#include "sys_time.h"
#include "message.h"
#include "object.h"
#include "sys_nov.h"
#include "alarm.h"
#include "radio.h"
#include "link.h"
#include "odu.h"
#include "spm.h"
#include "a2d.h"
#include "line.h"

/*
 * External Functions
 */
extern uchar DIAG_handler(uchar,uchar,uchar *);
extern uchar SPM_handler(uchar,uchar,uchar *);
extern uchar ALARM_handler(uchar,uchar,uchar *);
extern uchar FCP_handler(uchar,uchar,uchar *);
extern uchar REMOTE_handler(uchar,uchar,uchar *);
extern uchar REMOTE_chk_peer_alm();
extern uchar REMOTE_chk_alm();
extern uchar MODEM_synth_alm();


/*
 * Constants for general uses
************************************
 */
const uchar Bit_Mask[8] =
{
    0x01,
    0x02,
    0x04,
    0x08,
    0x10,
    0x20,
    0x40,
    0x80
};


/*
    Tables for translating BER values from releases before V2.5
to
    releases including and after 2.5. (and back)
*/
const uchar Old_BER_To_New[] =
    { BER_10E7, BER_10E6, BER_10E5, BER_10E4, BER_10E3, BER_OFF
```

D_CONST.C ©P-COM, Inc., 1994

```
};
const uchar New_BER_To_Old[] = { 5, 4, 3, 2, 1, 0, 0 };

/*
 * Constants used in radio.c ************************************
 */
const uchar ports_to_lines[] =
{
    4,
    8,
    2,
    1,
};
const uchar Radio_NV_Attr[] =
{
    URELAYS_ATTR,
    LN_RATE_ATTR,
    TWO_BYTE_ATTR,      /* flag indicating to save both bytes of
next attr*/
    NW_ID_ATTR,
    EXT_ALM_MAP_ATTR,
    EXT_ALM_SEN_ATTR,
    FEC_ATTR,
    VOLUME_ATTR,
    EAST_IVOL_ATTR,
    WEST_IVOL_ATTR,
    EAST_OVOL_ATTR,
    WEST_OVOL_ATTR,
    TWO_BYTE_ATTR,      /* flag indicating to save both bytes of
next attr*/
    RELAY1_CNFG_ATTR,
    TWO_BYTE_ATTR,      /* flag indicating to save both bytes of
next attr*/
    RELAY2_CNFG_ATTR,
    TWO_BYTE_ATTR,      /* flag indicating to save both bytes of
next attr*/
    RELAY3_CNFG_ATTR,
    TWO_BYTE_ATTR,      /* flag indicating to save both bytes of
next attr*/
    RELAY4_CNFG_ATTR,
    TWO_BYTE_ATTR,      /* flag indicating to save both bytes of
next attr*/
    RELAY5_CNFG_ATTR,
    NO_MORE_ATTR
};

/*
    The following two tables contain absolute EEPOT values to set
    the orderwire TLP to calibrated dBm levels.
```

D_CONST.C

©P-COM, Inc., 1994

```
*/
const uchar TLP_Input[] =
{
    0x5b, 0x58, 0x56, 0x53, 0x50, 0x4d, 0x49, 0x45,  /* -14 dBm
to +1 dBm */
    0x41, 0x3c, 0x37, 0x31, 0x2c, 0x26, 0x20, 0x1b
};

const uchar TLP_Output[] =
{
    0x1b, 0x20, 0x26, 0x2c, 0x32, 0x38, 0x3d, 0x42,  /* -11 dBm
to +4 dBm */
    0x46, 0x4a, 0x4e, 0x52, 0x55, 0x58, 0x5a, 0x5d
};

/*
 * Constants used by alarm.c
***************************************
 */
const ALARM_CNFG Alarm_Cnfg[] =   /* Alarm information table */
{
    {                          /* IDU ALARM */
        COLLECTIVE,
        NULL_ALM,
        FALSE,
        NULL,
    },
    {                          /* ODU ALARM */
        COLLECTIVE,
        NULL_ALM,
        FALSE,
        NULL,
    },
    {                          /* CABLE ALARM */
        COLLECTIVE,
        NULL_ALM,
        FALSE,
        NULL,
    },
    {                          /* BER ALARM */
        INDIVIDUAL,
        IDU_ALM,
        TRUE,
        LINK_chk_ber,
    },
    {                          /* REMOTE ALARM */
        COLLECTIVE,
        NULL_ALM,
        FALSE,
```

D_CONST.C

©P-COM, Inc., 1994

```
        NULL,
    },
    {                               /* Line Loss detected ALARM */
        INDIVIDUAL,
        IDU_ALM,
        TRUE,
        LINE_chk_los,
    },
    {                               /* Line AIS detected ALARM */
        INDIVIDUAL,
        IDU_ALM,
        TRUE,
        LINE_chk_ais,
    },
    {                               /* Cable Open detected ALARM */
        INDIVIDUAL,
        CABLE_ALM,
        FALSE,
        ALARM_chk_cable_open,
    },
    {                               /* Cable Short detected ALARM */
        INDIVIDUAL,
        CABLE_ALM,
        FALSE,
        ALARM_chk_cable_short,

    },
    {                               /* A2D alarms */
        INDIVIDUAL,
        IDU_ALM,
        FALSE,
        A2D_chk_alm,
    },
    {                               /* RF modem synthesizer lock
detected */
        INDIVIDUAL,
        IDU_ALM,
        FALSE,
        MODEM_synth_alm,
    },
    {                               /* Peer link communication
failure */
        INDIVIDUAL,
        RMT_ALM,
        TRUE,
        REMOTE_chk_peer_alm,
    },
    {                               /* External Inputs alarm */
        INDIVIDUAL,
```

D_CONST.C ©P-COM, Inc., 1994

```
        IDU_ALM,
        TRUE,
        RADIO_chk_ext_alms,
    },
    {                               /* Remote reported ALARM */
        INDIVIDUAL,
        RMT_ALM,
        FALSE,
        REMOTE_chk_alm,
    },
    {                               /* Loopback in progress alarm */
        INDIVIDUAL,
        IDU_ALM,
        TRUE,
        LINK_chk_lpbk_alm,
    },
    {                               /* telemetry communication
failure */
        INDIVIDUAL,
        ODU_ALM,
        TRUE,
        ODU_chk_telem_alm,
    },
    {                               /* AIS injection ALARM */
        INDIVIDUAL,
        IDU_ALM,
        TRUE,
        LINK_chk_ais_inj,
    },
    {                               /* ODU muted */
        INDIVIDUAL,
        ODU_ALM,
        TRUE,
        ODU_chk_mute_alm,
    },
    {                               /* ODU config mismatch */
        INDIVIDUAL,
        ODU_ALM,
        TRUE,
        ODU_chk_cnfg_alm,
    },
    {                               /* ODU Tx failure */
        INDIVIDUAL,
        ODU_ALM,
        FALSE,
        ODU_chk_tx_alm,
    },
    {                               /* ODU Rx failure */
        INDIVIDUAL,
```

D_CONST.C

©P-COM, Inc., 1994

```
        ODU_ALM,
        FALSE,
        ODU_chk_rx_alm,
    },
    {                               /* ODU synthesizer failure */
        INDIVIDUAL,
        ODU_ALM,
        FALSE,
        ODU_chk_synth_alm,
    },
    {                               /* ODU MISC. failure */
        INDIVIDUAL,
        ODU_ALM,
        FALSE,
        ODU_chk_misc_alm,
    },
    {                               /* Clock Recovery Alarm */
        INDIVIDUAL,
        IDU_ALM,
        TRUE,
        A2D_chk_clk_recov_alm,
    },
};
const uchar Alarm_NV_Attr[] =
{
    RELAY_ATTR,
    ALM_ABLE_ATTR,
    NO_MORE_ATTR
};

/*
 * Constants for used in timer.c
*************************************
 */
const TIMER_CNFG Timer_Cnfg[] =    /* parts reference table */
{
    {                               /* WDT */
        NULL_OBJ,
        0,
        0,
    },
    {                               /* read statistics Timer */
        SPM_OBJ,
        SECONDS_5,
        SECONDS_25MS,
    },
    {                               /* A2D Timer */
        A2D_OBJ,
        SECONDS_2,
```

©P-COM, Inc., 1994

```
        SECONDS_25MS,
    },
    {                               /* Calculate BER Timer */
        LINK_OBJ,
        SECONDS_5,
        SECONDS_1,
    },
    {                               /* Alarm test Timer */
        ALARM_OBJ,
        SECONDS_3,
        HALF_SECOND,
    },
    {                               /* Blink Timer */
        FCP_OBJ,
        SECONDS_4,
        SECONDS_1,
    },
    {                               /* AFC compensation Timer */
        LINK_OBJ,
        SECONDS_30,
        SECONDS_20,
    },
    {                               /* NOVRAM timer */
        NULL_OBJ,
        0,
        0,
    },
    {                               /* KEYPAD Timer */
        FCP_OBJ,
        SECONDS_1,
        FOURTH_SECOND,
    },
    {                               /* Telemetry check timer */
        ODU_OBJ,
        SECONDS_6,
        SECONDS_3,
    },
    {                               /* Update ODU timer */
        ODU_OBJ,
        SECONDS_1,
        SECONDS_1,
    },
    {                               /* Update PEER radio timer */
        REMOTE_OBJ,
        SECONDS_4,
        (SECONDS_1+SECONDS_100MS),
    },
    {                               /* Peer link check timer */
        REMOTE_OBJ,
```

D_CONST.C ©P-COM, Inc., 1994

```
        SECONDS_8,
        SECONDS_4,
    },
    {                               /* User has logged out */
        FCP_OBJ,
        MINUTE_5,
        MINUTE_5,
    },
    {                               /* KEYPAD remote request Timeout
*/
        FCP_OBJ,
        0,
        0,
    },
    {                               /* check synthesizer for lock */
        SPM_OBJ,
        SECONDS_2,
        SECONDS_2,
    },
    {                               /* EOW buzzer timer */
        NULL_OBJ,
        0,
        0,
    },
    {                               /* KEYPAD Pseudo-Random Loopback
Timeout */
        FCP_OBJ,
        0,
        0,
    },
    {                               /* EOW call button timer */
        FCP_OBJ,
        SECONDS_5,
        SECONDS_50MS,
    },
};


/*
 * Constants for object.c ************************************
 */
const OBJECT_CNFG Objects[] =      /* objects table */
{
    {                               /* Radio Object */
        RADIO_handler,
        TRUE,
        0,
        {{R20_RADIO_NV,PAGE_1},}
    },
```

D_CONST.C

©P-COM, Inc., 1994

```
    {                               /* Communication link object */
        MSG_handler,
        TRUE,
        NUM_LINKS,
        {{R20_COMM_NV,PAGE_1},}
    },
    {                               /* SPM object */
        SPM_handler,
        TRUE,
        0,
        {{R20_SPM_NV,PAGE_1},}
    },
    {                               /* Alarm Object */
        ALARM_handler,
        TRUE,
        NUM_ALARMS,
        {{R20_ALARM_NV,PAGE_1},}
    },
    {                               /* Alalog voltages to Digital
values */
        A2D_handler,
        TRUE,
        NUM_A2D_VALUES,
        {{R20_A2D_NV,PAGE_2},}
    },
    {                               /* Radio Link */
        LINK_handler,
        TRUE,
        0,
        {{R20_LINK_NV,PAGE_1},}
    },
    {                               /* E1 or T1 Line */
        LINE_handler,
        TRUE,
        MAX_LINES,
        {{R20_LINE_NV,PAGE_1},}
    },
    {                               /* Front control panel */
        FCP_handler,
        FALSE,                          /* init done in main */
        0,
        {{R20_FCP_NV,PAGE_2},}
    },
    {                               /* ODU object */
        ODU_handler,
        TRUE,
        0,                              /* local and remote */
        {{R20_ODU_NV,PAGE_2},}
    },
```

D_CONST.C ©P-COM, Inc., 1994

```
    {                               /* Remote Radio object */
        REMOTE_handler,
        TRUE,
        0,
        {{0,0},}
    },
    {                               /* Memory Object */
        DIAG_handler,
        FALSE,
        0,
        {{R20_DIAG_NV,PAGE_1},}
    },
    {                               /* Timer object */
        TIMER_handler,
        TRUE,
        NUM_TIMERS,
        {{0,0},}
    },
};

/*
 * Constants for novram uses ***********************************
 */
const uchar  Releases[NUM_SUPPORT_RELS] =    /* supported rel
table */
{
    FW_REL_20,
};

const uchar Diag_NV_Attr[] =
{
    NO_MORE_ATTR
};

/*
 * Constants for link.c ************************************
 */
const uchar Link_NV_Attr[] =
{
    AFC_ABLE_ATTR,
    LINK_ID_ATTR,
    POWER_ATTR,
    CHANNEL_ATTR,
    TX_MUTE_ATTR,
    AIS_EXP_ATTR,
    NO_MORE_ATTR
};
const uint Link_Ids[] =
{
```

D_CONST.C

©P-COM, Inc., 1994

```
    0x06B7, 0x06BB, 0x06D7, 0x06EB, 0x075B, 0x076B, 0x0977,
0x09AF,
    0x09D7, 0x0A6F, 0x0A77, 0x0AB7, 0x0ABB, 0x0ACF, 0x0AD7,
0x0ADB,
    0x0ADD, 0x0AE7, 0x0AEB, 0x0AED, 0x0AF3, 0x0B37, 0x0B3D,
0x0B57,
    0x0B5D, 0x0B67, 0x0B73, 0x0B75, 0x0B79, 0x0B9D, 0x0BA7,
0x0BAD,
    0x0BB3, 0x0BB5, 0x0BB9, 0x0BC7, 0x0BCD, 0x0C6F, 0x0C77,
0x0CAF,
    0x0CB7, 0x0CBB, 0x0CCF, 0x0CD7, 0x0CDB, 0x0CDD, 0x0CEB,
0x0CED,
    0x0D37, 0x0D3B, 0x0D57, 0x0D5B, 0x0D67, 0x0D73, 0x0D75,
0x0D79,
    0x0D97, 0x0D9B, 0x0DA7, 0x0DAB, 0x0DB3, 0x0DB5, 0x0DB9,
0x0DC7,
    0x0DCB, 0x0DD3, 0x0DD5, 0x0DD9, 0x0DE3, 0x0E37, 0x0E3B,
0x0E57,
    0x0E5B, 0x0E5D, 0x0E67, 0x0E6B, 0x0E6D, 0x0E75, 0x0E9B,
0x0EA7,
    0x0EAB, 0x0EAD, 0x0EB3, 0x0EB5, 0x0EB9, 0x0EC7, 0x0ECB,
0x0ECD,
    0x0ED3, 0x0ED5, 0x0ED9, 0x0EE3, 0x0EE5, 0x0EE9, 0x12EB,
0x16E5,
    0x1A97, 0x1AB3, 0x1B2D, 0x1B47
};

/*
 * Constants for odu.c ************************************
 */
const uchar Odu_NV_Attr[] =
{
    NO_MORE_ATTR
};

/*
 * Constants for message uses
************************************
 */
const uchar Msg_NV_Attr[] =
{
    BAUD_RATE_ATTR,
    PORT_ABLE_ATTR,
    NO_MORE_ATTR
};

/*
 * numbers calculated Time * Rate    * BER   = count
 *                    1sec * 2560000 * 1*E-4 = 256
```

D_CONST.C

©P-COM, Inc., 1994

```
 * error counts calculated based on 100ms intervals starting with
 * the 10-3 @ 1 interval then 10-4 @ 10 intervals and so on.
 * The values at 10-3 and 10-4 have been reduced to their
statistical
 * probabilities. This is because the hardware doesn't allow more
than 1
 * error per frame to be counted and a frame is larger than 1000
bits.
 * If not for this the table could be reduced to one row.
 */
const uint Ber_Tbl[LN_TYPES * NUM_RATES * 2][NUM_BER_GRPS+1] =
{
  /*  OFF 1*E-3   1*E-4   1*E-5   1*E-6   1*E-7
   */
    { 0,  144,    120,     85,     26,      4},        /* E1 1x2 NO
FEC */
    { 0,  288,    240,    170,     51,      8},        /* E1 2x2 NO
FEC */
    { 0,  577,    481,    341,    103,     15},        /* E1 2x4 NO
FEC */
    { 0,    0,      0,      0,      0,      0},        /* E1 2x8 NO
FEC */
    { 0,  115,     12,     12,      3,      2},        /* E1 1x2
FEC */
    { 0,    0,      0,      0,      0,      0},        /* E1 2x2
FEC */
    { 0,    0,      0,      0,      0,      0},        /* E1 2x4
FEC */
    { 0,    0,      0,      0,      0,      0},        /* E1 2x8
FEC */
    { 0, 2050,    205,     20,      2,      0},        /* T1 1x2 NO
FEC */
    { 0, 4100,    410,     41,      4,      0},        /* T1 2x2 NO
FEC */
    { 0, 8200,    820,     82,      8,      1},        /* T1 2x4 NO
FEC */
    { 0,    0,      0,      0,      0,      0},        /* T1 2x8 NO
FEC */
    { 0,  115,     12,     12,      3,      2},        /* T1 1x2
FEC */
    { 0,    0,      0,      0,      0,      0},        /* T1 2x2
FEC */
    { 0,    0,      0,      0,      0,      0},        /* T1 2x4
FEC */
    { 0,    0,      0,      0,      0,      0},        /* T1 2x8
FEC */
};
const uint Ber_Intervals[NUM_BER_GRPS+1] =
{
```

D_CONST.C

©P-COM, Inc., 1994

```
    0,      /* OFF (place holder in table)              */
    1,      /* 1*E-3 divide by 1 =  100ms               */
    5,      /* 1*E-4 divide by 2 =  500ms   or .5sec    */
    33,     /* 1*E-5 divide by 3 =  3300ms  or 3.3sec   */
    100,    /* 1*E-6 divide by 10 = 10000ms or 10sec    */
    150,    /* 1*E-7 divide by 66 = 15000ms or 15 sec   */
};

/*
 * Constants for a2d.c ************************************
 */
const   A2D_CNFG A2D_Cnfg[NUM_A2D_VALUES] =   /* A2D information
table */
{
    {                           /* 0 TxClk_AV */
        FALSE,
        VOLT_1_5,   VOLT_3_5,
        2,
    },
    {                           /* 1 RxClk_AV */
        TRUE,
        VOLT_1_5,   VOLT_3_5,
        2,
    },
    {                           /* 2 RxEye_AV */
        FALSE,
        0,          VOLT_5_0,
        0,
    },
    {                           /* 3 TxBBAND_AV */
        TRUE,
        VOLT_0_6,   VOLT_1_2,
        2,
    },
    {                           /* 4 RxBBAND_AV */
        TRUE,
        VOLT_0_25,   VOLT_5_0,
        2,
    },
    {                           /* 5 RHO_AV */
        FALSE,
        0,          VOLT_5_0,
        0,
    },
    {                           /* 6 TxODW_AV */
        FALSE,
        0,          VOLT_5_0,
        0,
    },
```

D_CONST.C

©P-COM, Inc., 1994

```
    {                                   /* 7 RxODW_AV */
        FALSE,
        0,          VOLT_5_0,
        0,
    },
    {                                   /* 8 Mod_AV */
        FALSE,
        0,          VOLT_5_0,
        0,
    },
    {                                   /* 9 RCV_AV */
        FALSE,
        0,          VOLT_5_0,
        0,
    },
    {                                   /* 10 spare */
        FALSE,
        0,          VOLT_5_0,
        0,
    },
    {                                   /* 11 spare */
        FALSE,
        0,          VOLT_5_0,
        0,
    },
    {                                   /* 12 spare */
        FALSE,
        0,          VOLT_5_0,
        0,
    },
    {                                   /* 13 AGC */
        FALSE,
        0,          VOLT_5_0,
        0,
    },
    {                                   /* 14 temp-1 */
        FALSE,
        0,          VOLT_5_0,
        0,
    },
    {                                   /* 15 temp-2 */
        FALSE,
        0,          VOLT_5_0,
        0,
    },
    {                                   /* 16 LN1VTRING */
        TRUE,
        VOLT_1_0,   VOLT_5_0,
        2,
```

D_CONST.C ©P-COM, Inc., 1994

```
    },
    {                                   /* 17 LN1VTTIP */
        TRUE,
        VOLT_1_0,    VOLT_5_0,
        2,
    },
    {                                   /* 18 LN2VTRING */
        TRUE,
        VOLT_1_0,    VOLT_5_0,
        2,
    },
    {                                   /* 19 LN2VTTIP */
        TRUE,
        VOLT_1_0,    VOLT_5_0,
        2,
    },
    {                                   /* 20 LN3VTRING */
        TRUE,
        VOLT_1_0,    VOLT_5_0,
        2,
    },
    {                                   /* 21 LN3VTTIP */
        TRUE,
        VOLT_1_0,    VOLT_5_0,
        2,
    },
    {                                   /* 22 LN4VTRING */
        TRUE,
        VOLT_1_0,    VOLT_5_0,
        2,
    },
    {                                   /* 23 LN4VTTIP */
        TRUE,
        VOLT_1_0,    VOLT_5_0,
        2,
    },
    {                                   /* 24 PSM Temp */
        FALSE,
        0,           VOLT_5_0,
        0,
    },
    {                                   /* 25 PSM Positive 12 */
        TRUE,
        VOLT_1_5,    VOLT_2_5,
        10,
    },
    {                                   /* 26 PSM negative 12 */
        TRUE,
        VOLT_1_5,    VOLT_2_5,
```

D_CONST.C ©P-COM, Inc., 1994

```
        5,
    },
    {                                   /* 27 PSM negitive 48 */
        FALSE,
        0,          VOLT_5_0,
        0,
    },
    {                                   /* 28 spare */
        FALSE,
        0,          VOLT_5_0,
        0,
    },
    {                                   /* 29 spare */
        FALSE,
        0,          VOLT_5_0,
        0,
    },
    {                                   /* 30 spare */
        FALSE,
        0,          VOLT_5_0,
        0,
    },
    {                                   /* 31 spare */
        FALSE,
        0,          VOLT_5_0,
        0,
    },
    {                                   /* 32 AGC monitor */
        FALSE,
        0,          VOLT_5_0,
        2,
    },
    {                                   /* 33 ModeAv */
        TRUE,
        VOLT_0_5,   VOLT_3_0,
        2,
    },
    {                                   /* 34 spare */
        FALSE,
        0,          VOLT_5_0,
        0,
    },
    {                                   /* 35 spare */
        FALSE,
        0,          VOLT_5_0,
        0,
    },
    {                                   /* 36 spare */
        FALSE,
```

D_CONST.C

©P-COM, Inc., 1994

```
        0,            VOLT_5_0,
        0,
    },
    {                               /* 37 spare */
        FALSE,
        0,            VOLT_5_0,
        0,
    },
    {                               /* 38 spare */
        FALSE,
        0,            VOLT_5_0,
        0,
    },
    {                               /* 39 spare */
        FALSE,
        0,            VOLT_5_0,
        0,
    },
};

const uchar A2d_NV_Attr[] =
{
    A2D_HI_ALM_ATTR,
    A2D_LO_ALM_ATTR,
    A2D_CLR_OFFSET_ATTR,
    NO_MORE_ATTR
};


/*
 * Constants for line.c *************************************
 */
const uchar  Line_NV_Attr[] =
{
    LN_ENABLE_ATTR,
    NO_MORE_ATTR
};

const uchar  Line_NV_Attr26[] =
{
    LN_ENABLE_ATTR,
    99,
    NO_MORE_ATTR
};
```

DIAG.H ©P-COM, Inc., 1994

```
/*************************************************************
 *
 * Description: This file contains the defines for the diag
object
 *
 * $Id: diag.h 2.1 1993/12/29 10:38:24 MIKEE Exp $
 *
 * $Log: diag.h $
 * Revision 2.1  1993/12/29  10:38:24  MIKEE
 * covertion
 *
 *
 *    Rev 1.0   18 Sep 1993 13:51:40   mikee
 * Initial revision.
 *************************************************************/

#ifndef _DIAG_H
#define _DIAG_H

/*
 * Offsets into messages
 */
#define MEM_ADR1       0
#define MEM_ADR2       1
#define MEM_LEN        2
#define MEM_VAL        3

#define MEM_TST_STEP   0x1000

#define TRACE_SIZE      400

extern uchar DIAG_dest_selftest();
extern uchar DIAG_nondest_selftest();
extern void  DIAG_clr_trace();
extern void  DIAG_trace_onoff(uchar);
extern void  DIAG_trace(uchar);
extern void  DIAG_mem_test();
extern void  DIAG_state(uchar);

#endif /* _DIAG_H */
```

©P-COM, Inc., 1994

```
/***************************************************************
 *
 * Description: This header contains function prototypes for
 *              the DTMF routines.
 *
 * $Header: P:/sw/spm/rcs/dtmf.h 2.2 1994/01/19 16:05:18 JEFFC
Exp $
 *
 * $Log: dtmf.h $
 * Revision 2.2  1994/01/19  16:05:18  JEFFC
 * Initial check-in.
 *
 *
 **************************************************************/

#ifndef _DTMF_H
#define _DTMF_H

/*
    Function Prototypes:
*/
void DTMF_interrupt(void);
void DTMF_init(void);
void DTMF_send(uint num);
uchar DTMF_receive(uint *digits);

#endif /* _DTMF_H */
```

FACT.H ©P-COM, Inc., 1994

```
/*****************************************************************
 *
 * Description: This file contains the defines for the
 *              factory object
 *
 * $Id: fact.h 2.4 1994/03/14 12:07:57 JEFFC Exp $
 *
 * $Log: fact.h $
 * Revision 2.4  1994/03/14  12:07:57  JEFFC
 * Decryption option number.
 *
 * Revision 2.3  1994/01/31  14:02:20  JEFFC
 * Added new options for Link Manager.
 *
 * Revision 2.2  1994/01/19  11:30:31  JEFFC
 * Added Orderwire option
 *
 * Revision 2.1  1993/12/29  10:38:25  MIKEE
 * Conversion
 *
 *    Rev 1.1   17 Nov 1993 10:23:16   mikee
 * made bit-rate selection an option
 *
 *    Rev 1.0   01 Nov 1993 12:22:42   mikee
 * Initial revision.
 *
 *****************************************************************/

#ifndef _FACT_H
#define _FACT_H

/*
 * Attribute numbers
 */
#define FIRST_INST_ATTR      0
#define FIRST_OPT_ATTR       64

#define OPTION_CODES         SPECIAL_ATTRS
#define INSTALL_CODES        SPECIAL_ATTRS + 1
#define SERIAL_NUM           SPECIAL_ATTRS + 2
#define OPTION_ABLE          SPECIAL_ATTRS + 3
#define DECRYPT_OPTION       SPECIAL_ATTRS + 4

/*
 * Installed hardware defines
 */
#define BASIC_ENH_INST       0
#define FRONT_BACK_INST      1
#define IN_VOLT1_INST        2
#define IN_VOLT2_INST        3
```

©P-COM, Inc., 1994

```
#define IN_BALANCE_INST      4
#define EOW_INST             5
#define EOW_DD_INST          6
#define ALM_IO_INST          7
#define DATA_CHAN_INST       8
#define NMS_TYPE1_INST       9
#define NMS_TYPE2_INST       10
#define NMS_TYPE3_INST       11
#define NMS_TYPE4_INST       12
#define SW_DNLD_INST         13
#define LPBK_TEST_INST       14
#define PROTECT_INST         15
#define FSK_2OR4_INST        16

/*
 * Enabled option defines
 */
#define EOW_OPT              0
#define BIT_RATE_OPT         1
#define FEC_OPT              2
#define DATA_CH_OPT          3
#define NMS_TYPE1_OPT        4
#define NMS_TYPE2_OPT        5
#define NMS_TYPE3_OPT        6
#define NMS_TYPE4_OPT        7
#define LKMGR_BASIC_OPT      8
#define LKMGR_MAINT_OPT      9

extern uchar    FACT_handler();
extern uchar    FACT_is_option();
extern uchar    FACT_is_installed();
extern void     FACT_install();
extern uchar    FACT_process_attr_cmd();

#endif /* _FACT_H */
```

FCP.H

©P-COM, Inc., 1994

```
/*****************************************************************
 *
 * Description: This file contains the defines for the Front
 *              Control Panel (FCP)
 *
 * $Id: fcp.h 2.2 1994/01/19 13:40:38 JEFFC Exp $
 *
 * $Log: fcp.h $
 * Revision 2.2  1994/01/19  13:40:38  JEFFC
 * Contrast changes
 *
 * Revision 2.1  1993/12/29  10:38:25  MIKEE
 * covertion
 *
 *
 *    Rev 1.1   01 Nov 1993 12:20:34   mikee
 * password, remote mode
 *
 *    Rev 1.0   18 Sep 1993 13:55:24   mikee
 * Initial revision.
 ****************************************************************/

#ifndef _FCP_H
#define _FCP_H

/*
 * FCP attributes
 */
#define KEY_DROPS_ATTR      0
#define CALL_ATTR           1
#define PW_ENABLE_ATTR      2
#define PW_NUMBER_ATTR      3
#define USER_IN_ATTR        4
#define NUM_FCP_ATTRS       5


#define CONTRAST_ATTR   SPECIAL_ATTRS
#define ONLINE_LED_ATTR (SPECIAL_ATTRS+1)
#define IDU_LED_ATTR    SPECIAL_ATTRS+2
#define ODU_LED_ATTR    SPECIAL_ATTRS+3
#define CABLE_LED_ATTR  SPECIAL_ATTRS+4
#define RMT_LED_ATTR    SPECIAL_ATTRS+5
#define RMT_MODE_ATTR   SPECIAL_ATTRS+6


#define NUM_LINES           2
#define CHAR_PER_LINE       16
#define NUM_DSP_CHARS       (NUM_LINES * CHAR_PER_LINE)

#define NUM_LEDS        5
```

FCP.H

©P-COM, Inc., 1994

```
#define LED_OFF          0
#define RED_LED          2
#define YELLOW_LED       2
#define GREEN_LED        1
#define BLINK_MASK       0x80

/*
 * LCD Commands
 */
#define LCD_CLEAR_DSP    0x01
#define LCD_SETUP        0x38    /* 8-bits and 2 lines */
#define LCD_DSP_CNTL     0x08    /* control the display features
*/
#define LCD_DSP_ON       0x04    /*     display on bit */
#define LCD_DSP_OFF      0x00    /*     display off bit */
#define LCD_CURSOR_ON    0x02    /*     cursor on bit */
#define LCD_CURSOR_OFF   0x00    /*     cursor off bit */
#define LCD_BLINK_ON     0x01    /*     blink on bit */
#define LCD_BLINK_OFF    0x00    /*     blink off bit */
#define LCD_ENTRY_MODE   0x04    /* control the display on/off */
#define LCD_CURSOR_INC   0x02    /*     cursor increment bit */

#define LCD_CURSOR_DEC   0x00    /*     cursor decrement bit */

#define LCD_DSP_SHIFT    0x01    /*     display shift bit */
#define LCD_DSP_NOSHIFT  0x00    /*     display no shift bit */
#define LCD_LINE1        0x80    /* set DD Ram address line 1*/
#define LCD_LINE2        0xC0    /* set DD Ram address line 2*/

#define LCD_LINE1_END    (LCD_LINE1 + CHAR_PER_LINE)
#define LCD_LINE2_END    (LCD_LINE2 + CHAR_PER_LINE)

#define RMT_BLINK_CNT    3

typedef struct
{
    uchar   changed;
    char    dsp_char;
} DSP_BUFF;


extern uchar     FCP_handler();
extern uchar     FCP_init();
extern void      FCP_set_led();
extern uchar     FCP_get_led();
extern void      FCP_read_key();
extern void      FCP_reset_dsp();
extern void      FCP_set_dsp_cntl();
extern uchar     FCP_dsp_str();
extern void      FCP_updt_dsp();
```

FCP.H

©P-COM, Inc., 1994

```
extern void      FCP_move_cursor();
extern void      FCP_clr_to_eol();
extern uchar     FCP_process_attr_cmd();
extern void      FCP_flush_keys();
extern void      FCP_dsp_save();
extern void      FCP_dsp_restore();
extern void      FCP_user_out();
extern uchar     FCP_call_button();

#endif /* _FCP_H */
```

©P-COM, Inc., 1994

```
/**************************************************************
 *
 * Description: This file contains the defines for the Keypad
 *              User interface
 *
 * $Id: kpad_ui.h 2.3 1994/03/14 11:41:41 JEFFC Exp $
 *
 * $Log: kpad_ui.h $
 * Revision 2.3  1994/03/14  11:41:41  JEFFC
 * Added some loopback definitions
 *
 * Revision 2.2  1994/01/19  14:06:16  JEFFC
 * Added several new menu commands (T/R Addr, Orderwire, etc.)
 *
 * Revision 2.1  1993/12/29  10:38:26  MIKEE
 * Conversion to RCS
 *
 *    Rev 1.3   17 Nov 1993 10:24:00   mikee
 * part of driver change
 *
 *    Rev 1.2   01 Nov 1993 12:22:56   mikee
 * remote mode, EOW
 *
 *    Rev 1.1   04 Oct 1993 16:33:16   mikee
 * keypad ui improvements before 1st ship
 *
 *    Rev 1.0   18 Sep 1993 13:55:26   mikee
 * Initial revision.
 **************************************************************/

#ifndef _KPAD_UI_H
#define _KPAD_UI_H

/*
 * Key defines
 */
#define KP_BUFF_SIZE     6
#define NUM_KEYS         16
#define UP_KEY           13
#define DOWN_KEY         14
#define LEFT_KEY         11
#define RIGHT_KEY        15
#define ENTER_KEY        12
#define BER_KEY          2
#define AGC_KEY          1

/*
 * Key states
 */
#define ST_GET_CMD       0
```

```
#define ST_GET_NUM       1
#define ST_RSP_WAIT      2
#define ST_REQ_WAIT      3
#define ST_SCROLL_DSP    4
#define ST_MENU          5
#define ST_VERIFY        6
#define ST_ERRCNT_DSP    7

/*
 * Display number format types
 */
#define BRACKET_OFF      0x80
#define FTYPE_DEC        0
#define FTYPE_VOLT       1
#define FTYPE_HEX        2
#define FTYPE_BOOL       3
#define FTYPE_ONOFF      4
#define FTYPE_BER        5
#define FTYPE_PW         6
#define FTYPE_FW_REL     7
#define FTYPE_IN_TLP     8
#define FTYPE_OUT_TLP    9
#define FTYPE_LNTST      10

/*
 * Status area defines
 */
#define STATUS_LOC       (LCD_LINE1_END - 5)
#define STAT_CLEAR       0
#define STAT_OK          1
#define STAT_FAIL        2
#define STAT_CFAIL       3

/*
 * Key defines
 */
#define KP_FREQ_CMD      1
#define KP_LINK_CMD      2
#define KP_POWER_CMD     3
#define KP_AGC_CMD       4
#define KP_ALARM_CMD     5
#define KP_LPBK_CMD      6
#define KP_BER_CMD       7
#define KP_MENU_CMD      8
#define KP_LN_AIS_CMD    9
#define KP_LN_LOS_CMD    10
#define KP_LN_ABLE_CMD   11
#define KP_FR_AIS_CMD    12
#define KP_HIST_CLR_CMD  13
#define KP_ALM_HIST_CMD  14
```

```
#define KP_RMT_ALM_CMD  15
#define KP_RMT_HIST_CMD 16
#define KP_MUTE_CMD     17
#define KP_RMT_CLR_CMD  18
#define KP_RMT_MODE_CMD 19
#define KP_BAND_CMD     20
#define KP_VOL_CMD      21
#define KP_EOW_IN_TLP_CMD 22
#define KP_EOW_OUT_TLP_CMD 23
#define KP_PW_CMD       24
#define KP_T_R_ADDR_CMD 25
#define KP_FEC_CMD      26
#define KP_IDU_FW_CMD   27
#define KP_ODU_FW_CMD   28
#define KP_FEC_BYPASS_CMD 29

#define KP_IDU_LPBK     0
#define KP_ODU_LPBK     1
#define KP_LNTST_LPBK   2
#define KP_LN_LPBK      3

#define NON_LN_LPBKS    3

#define CAT_ALARM       0
#define CAT_MISC        1
#define CAT_LINK        2
#define CAT_LINE        3
#define CAT_EOW         4
#define CAT_FEC         5

#define MAX_CATEGORIES  10

#define CAT_L1_MAP      200

#define NUM_DSP_ALMS    17

typedef struct
{
    BOOL_CB key_procs[NUM_KEYS];
} STATE_ROW;

typedef struct
{
    uchar       enabled;
    uchar       key_cnt;
    uint        old_val;
    uchar       volt1;
} NUM_INFO;

typedef struct
```

```
{
    uchar       step_size;
    uchar       fmt_type;
    uchar       cur_cmd;
    uint        min_num;
    uint        max_num;
    uint        cur_num;
    BFUNC       ud_proc;
    IFUNC       lr_proc;
} SCROLL_INFO;

typedef struct
{
    BOOL_CB cmd_proc;
    uchar   cmd_str_num;
} COMMAND;

typedef struct
{
    uchar   cat_str_num;
    uchar   num_cmds;
    COMMAND *cmd_ptr;
} CATEGORY;

typedef struct
{
    uchar   inst_num;
    uchar   str_num;
} ALM_DSP;

extern void     KPAD_init();
extern void     KPAD_process_key();
extern void     KPAD_resp_msg();
extern void     KPAD_dsp_state_num();
extern void     KPAD_dsp_pcom();
extern void     KPAD_resp_msg();
extern void     KPAD_req_timeout();
extern uchar    KPAD_tx_msg(uchar, void *, void *);
extern void     KPAD_pr_lpbk_timeout();

#endif /* _KPAD_UI_H */
```

```
/***********************************************************
 *
 * Description: THIS FILE DEFINES THE MEMORY MAP FOR ALL OF THE
 *              LCAs
 *
 * $Id: lca_map.h 2.3 1994/01/23 22:37:51 JEFFC Exp $
 *
 * $Log: lca_map.h $
 * Revision 2.3  1994/01/23  22:37:51  JEFFC
 * Added service channel read pointer.
 *
 * Revision 2.2  1994/01/19  14:09:11  JEFFC
 * New registers for pseudo-random loopback, cross-connect, etc.)
 *
 * Revision 2.1  1993/12/29  10:38:26  MIKEE
 * conversion
 *
 *    Rev 1.2   01 Nov 1993 12:23:26   mikee
 * EOW
 *
 *    Rev 1.1   04 Oct 1993 12:46:00   mikee
 * fixed bugs
 *
 *    Rev 1.0   18 Sep 1993 13:55:26   mikee
 * Initial revision.
 ***********************************************************/

#ifndef _LCA_MAP_H
#define _LCA_MAP_H

#include "spm_map.h"

#define LCA1_TXSTAT0    LCA1_SEL+0x00   /* tx status register 0
*/
    struct txstat0
    {
        unsigned ver        :4;
        unsigned id         :4;
    };
#define   LCA1_TXSTAT0_PTR     ((struct txstat0 *)(LCA1_TXSTAT0))
#define LCA1_TXSTAT0_REG     (uchar *)(LCA1_TXSTAT0)


#define LCA1_TXSTAT1     LCA1_SEL+0x01   /* tx status register 1
*/
    struct txstat1
    {
        unsigned bpv0       :1;
        unsigned bpv1       :1;
        unsigned bpv2       :1;
```

```
        unsigned bpv3         :1;
        unsigned prfaildet    :1;
        unsigned runlendet    :1;
        unsigned spare1       :1;
        unsigned spare2       :1;
    };
#define   LCA1_TXSTAT1_PTR      ((struct txstat1 *)(LCA1_TXSTAT1))
#define LCA1_TXSTAT1_REG       (uchar *)(LCA1_TXSTAT1)
#define LN_BPV(x)              ((*LCA1_TXSTAT1_REG & Bit_Mask[x]) ==
SET)


#define LCA1_TXSTAT2      LCA1_SEL+0x02   /* tx status register 2
*/
    struct txstat2
    {
        unsigned fiofull0    :1;
        unsigned fifoempty0  :1;
        unsigned fiofull1    :1;
        unsigned fifoempty1  :1;
        unsigned fiofull2    :1;
        unsigned fifoempty2  :1;
        unsigned fiofull3    :1;
        unsigned fifoempty3  :1;
    };
#define   LCA1_TXSTAT2_PTR      ((struct txstat2 *)(LCA1_TXSTAT2))
#define LCA1_TXSTAT2_REG        (uchar *)(LCA1_TXSTAT2)
#define LN_FIFOFULL(x)          ((*LCA1_TXSTAT2_REG &
Bit_Mask[x*2+1]) == SET)
#define LN_FIFOEMPTY(x)         ((*LCA1_TXSTAT2_REG & Bit_Mask[x *
2]) == SET)


#define LCA1_TXCMD0      LCA1_SEL+0x03  /* tx cpmmand register #0
*/
    typedef struct
    {
        unsigned frctxais0   :1;
        unsigned fifoen0     :1;
        unsigned frctxais1   :1;
        unsigned fifoen1     :1;
        unsigned frctxais2   :1;
        unsigned fifoen2     :1;
        unsigned frctxais3   :1;
        unsigned fifoen3     :1;
    } LCA1_TXCMD0_OL;
#define LCA1_TXCMD0_REG        (uchar *)(LCA1_TXCMD0)
#define LCA1_FORCE_AIS(i,x)        i |= Bit_Mask[x*2+1]
#define LCA1_CLEAR_AIS(i,x)        i &= ~(Bit_Mask[x*2+1])
#define LCA1_GET_AIS(i,x)          ((i & Bit_Mask[x*2+1]) > 0)
```

```
#define LCA1_FIFOENABLE(i,x)     i |= Bit_Mask[x * 2]
#define LCA1_FIFODISABLE(i,x)    i &= ~(Bit_Mask[x * 2])


#define LCA1_TXCMD1      LCA1_SEL+0x04   /* tx cpmmand register #1
*/
    typedef struct
    {
        unsigned txfrccw        :1;
        unsigned txdatainvert   :1;
        unsigned txrnddatfill   :1;
        unsigned txclrallstat   :1;
        unsigned txclrfcn       :1;
        unsigned txdatasrc      :1;
        unsigned spare3         :1;
        unsigned spare4         :1;
    } LCA1_TXCMD1_OL;
#define LCA1_TXCMD1_REG      (uchar *)(LCA1_TXCMD1)


#define LCA1_FRMERRCNT  LCA1_SEL+0x05   /* frame processor error
count */
    struct frmerrcnt
    {
        unsigned spare77    :5;
        unsigned frmslip    :1;
        unsigned frmlock    :1;
        unsigned sigcntovr  :1;
    };
#define   LCA1_FRMERRCNT_PTR  ((struct frmerrcnt
*)(LCA1_FRMERRCNT))


#define LCA1_SIGERRCNT  LCA1_SEL+0x06   /* signature reader error
count */
#define   LCA1_SIGERRCNT_REG  ((uchar *)(LCA1_SIGERRCNT))


#define LCA1_RXCMD0      LCA1_SEL+0x07  /* rx command register #0
*/
    typedef struct
    {
        unsigned rxfrmdatinv    :1;
        unsigned rxdatainvert   :1;
        unsigned rxclrallstat   :1;
        unsigned rxclrfcn       :1;
        unsigned errinj         :2;
        unsigned olp            :1;
        unsigned spare5         :1;
    } LCA1_RXCMD0_OL;
```

```
#define LCA1_RXCMD0_REG      (uchar *)(LCA1_RXCMD0)


#define LCA1_SRVCHNREG  LCA1_SEL+0x08  /* Service channel
register */
    typedef struct
    {
        unsigned mleadforce     :1;
        unsigned mleadmask      :1;
        unsigned mleadstat      :1;
        unsigned eleadforce     :1;
        unsigned eleadmask      :1;
        unsigned eleadstat      :1;
        unsigned rxfrcodwmw     :1;
        unsigned splt_brdg      :1;
    } LCA1_SRVCHN_OL;
#define LCA1_SRVCHN_REG  (uchar *)(LCA1_SRVCHNREG)
#define   LCA1_SRVCHN_PTR  ((LCA1_SRVCHN_OL *)(LCA1_SRVCHNREG))


#define LCA1_GENCMD0     LCA1_SEL+0x09  /* general command
register #0 */
    typedef struct
    {
        unsigned prgenclk       :1;
        unsigned fifohfmask     :1;
        unsigned fifohfforce    :1;
        unsigned prrdsel        :2;
        unsigned prrdsrc        :1;
        unsigned prgenenbl      :1;
        unsigned prlp           :1;
    } LCA1_GENCMD0_OL;
#define LCA1_GENCMD0_REG     (uchar *)(LCA1_GENCMD0)

#define LCA1_GENCMD1     LCA1_SEL+0x0a  /* general command
register #1 */
    typedef struct
    {
        unsigned mode           :3;
        unsigned rhosel         :3;
        unsigned scrmasyn_frm   :1;
        unsigned fecenbl        :1;
    } LCA1_GENCMD1_OL;
#define LCA1_GENCMD1_REG     (uchar *)(LCA1_GENCMD1)
#define LCA1_MODE_E1_BASE    4

#define LCA1_GENCMD2     LCA1_SEL+0x0b  /* general command
register #2 */
    typedef struct
    {
```

```
        unsigned odwlcasel      :1;
        unsigned peerlcasel     :1;
        unsigned nmslcasel      :1;
        unsigned auxlcasel      :1;
        unsigned rxfrmthrs      :3;
        unsigned bndsel         :1;
    } LCA1_GENCMD2_OL;
#define LCA1_GENCMD2_REG     (uchar *)(LCA1_GENCMD2)
#define LCA1_REACQ_NEVER    0
#define LCA1_REACQ_AFTER10  7


#define LCA1_FRMBYTELOW LCA1_SEL+0x0c   /* low frame byte */
#define   LCA1_FRMBYTELOW_REG  ((uchar *)(LCA1_FRMBYTELOW))


#define LCA1_FRMBYTEHIGH LCA1_SEL+0x0d   /* high frame byte */
#define   LCA1_FRMBYTEHIGH_REG ((uchar *)(LCA1_FRMBYTEHIGH))

#define LCA1_GENCMD3 LCA1_SEL+0x0e  /* general command register
#2 */
    typedef struct
    {
        unsigned rxch0 : 2;
        unsigned rxch1 : 2;
        unsigned rxch2 : 2;
        unsigned rxch3 : 2;
    } LCA1_GENCMD3_OL;
#define LCA1_GENCMD3_REG     (uchar *)(LCA1_GENCMD3)

/*
    LCA 2 (FEC):
*/

#define LCA2_VERSION    LCA2_SEL+0x00   /* FEC version number */
    struct lca2_ver
    {
        unsigned ver         :4;
        unsigned id          :4;
    };
#define   LCA2_VERSION_PTR     ((struct lca2_ver
*)(LCA2_VERSION))
#define LCA2_VERSION_REG     (uchar *)(LCA2_VERSION)

#define LCA2_STATUS    LCA2_SEL+0x01   /* FEC status register */
    struct lca2_status
    {
        unsigned spare : 4;
        unsigned runlendet: 1;
        unsigned rxfrmloss : 1;
```

```
        unsigned spare2 : 1;
    };
#define   LCA2_STATUS_PTR      ((struct lca2_status
*)(LCA2_STATUS))
#define LCA2_STATUS_REG      (uchar *)(LCA2_STATUS)

#define LCA2_DECERR     LCA2_SEL+0x02   /* FEC decoder error
counter */
#define LCA2_DECERR_REG      (uchar *)(LCA2_DECERR)

#define LCA2_CONTROL    LCA2_SEL+0x03   /* FEC control register
*/
    typedef struct lca2_control
    {
        unsigned decprog : 1;
        unsigned encprog : 1;
        unsigned mskfrmloss : 1;
        unsigned unused1 : 1;
        unsigned txouten : 1;
        unsigned runlenen : 1;
        unsigned bypass : 1;
        unsigned format : 1;
    } LCA2_CONTROL_OL;
#define   LCA2_CONTROL_PTR      ((LCA2_CONTROL_OL
*)(LCA2_CONTROL))
#define LCA2_CONTROL_REG      (uchar *)(LCA2_CONTROL)

#endif /* LCA_MAP */
```

©P-COM, Inc., 1994

```
/*************************************************************
 *
 * Description: This file contains the defines for the Line
object
 *
 * $Id: line.h 2.3 1994/03/14 11:44:03 JEFFC Exp $
 *
 * $Log: line.h $
 * Revision 2.3  1994/03/14  11:44:03  JEFFC
 * Added a line test loopback definition.
 *
 * Revision 2.2  1994/01/19  14:11:29  JEFFC
 * Added cross-connect attribute
 *
 * Revision 2.1  1993/12/29  10:38:26  MIKEE
 * Conversion
 *
 *    Rev 1.1   01 Nov 1993 12:23:46   mikee
 * cleanup of link loopback
 *
 *    Rev 1.0   18 Sep 1993 13:55:26   mikee
 * Initial revision.
 *************************************************************/

#ifndef _LINE_H
#define _LINE_H

#define LN_ENABLE_ATTR      0
#define LN_AIS_ATTR         1
#define LN_LOS_ATTR         2
#define LN_AIS_HIST_ATTR    3
#define LN_LOS_HIST_ATTR    4
#define LN_PCM_BPV_ATTR     5
#define LN_FIFO_FULL_ATTR   6
#define LN_FIFO_EMPTY_ATTR  7
#define LN_AIS_ENABLE_ATTR  8
#define LN_CUR_LPBK_ATTR    9

#define NUM_LINE_ATTRS      10

#define MAX_LINES           4

#define LN_TAOS_ATTR        SPECIAL_ATTRS
#define LN_LLP_ATTR         (SPECIAL_ATTRS + 1)
#define LN_RLP_ATTR         (SPECIAL_ATTRS + 2)
#define LN_RESET_ATTR       (SPECIAL_ATTRS + 3)
#define LN_FR_AIS_ATTR      (SPECIAL_ATTRS + 4)
#define LN_LKLP_ATTR        (SPECIAL_ATTRS + 5)

/*
```

©P-COM, Inc., 1994

```
 * Link loop backs
 */
#define LN_NO_LOOP          0
#define LN_LOCAL_LPBK       1
#define LN_RMT_LPBK         2
#define LN_LINK_LPBK        3
#define LN_LNTEST_LPBK      4

extern uchar     LINE_handler(uchar,uchar,uchar *);
extern void      LINE_reset();
extern uchar     LINE_chk_ais();
extern uchar     LINE_chk_los();
extern void      LINE_read_stats();
extern uchar     LINE_set_lpbk();
extern uchar     LINE_process_attr_cmd();
extern uchar     LINE_chk_lpbk();

#endif /* _LINE_H */
```

LINK.H ©P-COM, Inc., 1994

```
/****************************************************************
 *
 * Description: This file contains the defines for the Link
object
 *
 * $Id: link.h 2.2 1994/01/19 14:12:53 JEFFC Exp $
 *
 * $Log: link.h $
 * Revision 2.2  1994/01/19  14:12:53  JEFFC
 * BER changes
 *
 * Revision 2.1  1993/12/29  10:38:27  MIKEE
 * Conversion
 *
 *    Rev 1.2   17 Nov 1993 10:24:38   mikee
 * fixed voltage display bug
 *
 *    Rev 1.1   01 Nov 1993 12:24:24   mikee
 * default channel now 30
 *
 *    Rev 1.0   18 Sep 1993 13:55:28   mikee
 * Initial revision.
 ***************************************************************/

#ifndef _LINK_H
#define _LINK_H

#define AFC_ABLE_ATTR        0
#define CUR_LPBK_ATTR        1
#define POWER_ATTR           2
#define CHANNEL_ATTR         3
#define RUN_LEN_VI_ATTR      4
#define LK_NOT_USED1               5    /* free */
#define FRAME_SLP_ATTR       6
#define SIG_READ_CNT_ATTR    7
#define AFC_COMP_ATTR        8
#define TX_MUTE_ATTR         9
#define AIS_EXP_ATTR         10          /* what exponent to
set AIS */
#define BER_ATTR             11
#define EFSEC_ATTR           12          /* error free seconds
*/
#define SESEC_ATTR           13          /* Severely errored
seconds */
#define ESEC_ATTR            14          /* errored seconds */

#define DMIN_ATTR            15          /* degraded minutes
*/
#define UNAVAIL_CNT_ATTR     16          /* seconds
unavailable */
```

LINK.H ©P-COM, Inc., 1994

```
#define UNAVAIL_ATTR          17          /* unavailable flag
*/
#define AIS_INJECTED_ATTR     18          /* is ais being
injected */

#define NUM_LINK_ATTRS        19

#define LINK_ID_ATTR          SPECIAL_ATTRS

#define MIN_X_PWR             5
#define MAX_X_PWR             255
#define STEP_X_PWR            5
#define MIN_LINK_ID           1
#define MAX_LINK_ID           100
#define MIN_CHANNEL           1
#define MAX_CHANNEL           80
#define MAX_4E1_CHANNEL       40
#define DEFAULT_CHANNEL       30
#define DEFAULT_POWER         230        /* 4.5 volts */
#define DEFAULT_LINK_ID       1

/*
 * Link loop backs
 */
#define LK_NO_LOOP            0
#define LK_BBAND_LPBK         1
#define LK_CLK_LPBK           2
#define LK_RFIDU_LPBK         3
#define LK_LCA_LPBK           4
#define LK_ODU_LPBK           5

/*
 * BER groups
 */
#define BER_OFF               0
#define BER_10E3              1
#define BER_10E4              2
#define BER_10E5              3
#define BER_10E6              4
#define BER_10E7              5
#define BER_LT_10E7           6

#define UNAVAIL_TRIG          10
#define SEC_PER_MIN           60
#define DEG_MIN_TRIG          6      /* 10% of 60 seconds */

extern uchar     LINK_handler(uchar,uchar,uchar *);
extern void      LINK_read_stats();
extern uchar     LINK_process_attr_cmd();
extern uchar     LINK_chk_ber();
```

LINK.H

©P-COM, Inc., 1994

```
extern uchar    LINK_set_lpbk();
extern uchar    LINK_chk_lpbk_alm();
extern uchar    LINK_chk_ais_inj();
extern void     LINK_calc_ber(uint);
extern void     LINK_set_id();

#endif /* _LINK_H */
```

MESSAGE.C ©P-COM, Inc., 1994

```
/*************************************************************
 *
 * Description: This file contains the functions that handle
 *              messages, both transmite and receive.
 *
 * $Id: message.c 2.2 1994/01/19 15:50:39 JEFFC Exp $
 *
 * $Log: message.c $
 * Revision 2.2  1994/01/19  15:50:39  JEFFC
 * Changed prototype for MSG_init().
 *
 * Revision 2.1  1993/12/29  10:38:42  MIKEE
 * Conversion
 *
 *    Rev 1.0   17 Nov 1993 10:08:22   mikee
 * Initial revision.
 *
 *************************************************************/

#include "sysdefs.h"
#include "message.h"
#include "object.h"
#include "novram.h"

/*
 * External Functions
 */
extern void       Wdt_Tickle();
extern void       UTIL_clr_mem(void *,uint);
extern void       UTIL_copy_mem(uchar *, uchar *,uchar);
extern void       UTIL_cbuff_init(CBUFF *);
extern reentrant uchar UTIL_add_cbuff(CBUFF *, uchar);
extern reentrant uchar UTIL_get_cbuff(CBUFF *, uchar *);
extern reentrant void     COMM_setup_port(MSG_LINK *);
extern reentrant void     COMM_send_char(MSG_LINK *,uchar);
extern void       COMM_init();
extern void       COMM_chk_int(MSG_LINK *,uchar *, uchar *);
extern uchar      COMM_get_char(MSG_LINK *, uchar *);
extern uchar      COMM_calc_rsp_link(uint, uchar);
extern uchar      COMM_tx_ready(MSG_LINK *);
extern void       COMM_send_cleanup(MSG_LINK *);

/*
 * Internal Functions
 */
static uchar      msg_init(NV_ADR_BLK  *);
static void       reset_chan(CHANNEL *);

/*
 * External Data
```

©P-COM, Inc., 1994

```
 */
extern CONST uchar      Msg_NV_Attr[];
extern const DRV_CB     Comm_Drivers[NUM_DRIVES][NUM_EVENTS];

/*
 * Internal Data
 */
static MSG_LINK Links[NUM_LINKS];
static QUE      Queues[NUM_QUEUES];
static uchar    rsp_mem[MAX_MSG_DATA];
static uint     Msg_Attr[NUM_LINKS][NUM_MSG_ATTRS];

/****************************************************************
 *
 * Name: msg_init
 *
 * Description: This function sets up the message engine
 *
 ****************************************************************/
uchar msg_init(adr_ptr)

NV_ADR_BLK  *adr_ptr;
{
    uchar       i;

    for (i = 0; i < NUM_LINKS; i++)
    {
        UTIL_clr_mem(&Msg_Attr[i][0],(NUM_MSG_ATTRS *
sizeof(uint)));
        UTIL_clr_mem(&Links[i], sizeof(MSG_LINK));
        Links[i].baud_rate = BAUD_1200;
        Links[i].enabled = TRUE;
        UTIL_cbuff_init(&Links[i].rx_q.c_buff);
        UTIL_cbuff_init(&Links[i].tx_q.c_buff);
    }

    NOVRAM_restore_attrs(COMM_OBJ, adr_ptr, (uchar *)Msg_NV_Attr,
        MSG_process_attr_cmd, NUM_LINKS);

    /*
     * initialize the comm ports
     */
    COMM_init();

    for (i = 0; i < NUM_QUEUES; i++)
       Queues[i].q_state = EMPTY_QS;
    return FALSE;
}

/****************************************************************
```

MESSAGE.C

©P-COM, Inc., 1994

```
 *
 * Name: MSG_handler
 *
 * Description: This routine handles message in the queues
 *
 *************************************************************/
uchar MSG_handler(object, event, cdata_ptr)

uchar   object;
uchar   event;
uchar   *cdata_ptr;
{
    /*
     * switch on the event
     */
    switch(event)
    {
        case INIT_EVENT:
            return msg_init((NV_ADR_BLK  *)cdata_ptr);
            break;
        case SAVE_NV_EVENT:
            if (NOVRAM_save_attrs(object,(NV_ADR_BLK *)cdata_ptr,
                    (uchar *)Msg_NV_Attr,
                    MSG_process_attr_cmd, NUM_LINKS) == FALSE)
                return(FALSE);
            break;
        case MSG_EVENT:
            MSG_process_attr_msg(MSG_process_attr_cmd,
cdata_ptr);
            break;
    }
    return(TRUE);
}

/**************************************************************
 *
 * Name: MSG_process_msgs
 *
 * Description: This routine handles message in the queues
 *
 *************************************************************/
void MSG_process_msgs()
{
    uchar       i;
    QUE         *q_ptr;
    CHANNEL     *chan_ptr;

    /*
     * See if there are any messages on the queue
     */
```

©P-COM, Inc., 1994

```
    for (i = 0, q_ptr = Queues; i < NUM_QUEUES; i++, q_ptr++)
    {
        /*
         * Any message received ?
         */
        if (q_ptr->q_state == RX_READY_QS)
        {
            Wdt_Tickle();
            /*
             * Setup and call the port's driver to handle the
message
             */
            chan_ptr = &Links[q_ptr->link_num].rx_q;
            chan_ptr->q_ptr = q_ptr;
            chan_ptr->packet_len = q_ptr->len;
            chan_ptr->char_pointer = q_ptr->msg;

            Comm_Drivers[Links[q_ptr->link_num].driver][RX_MSG](
                RX_MSG, &Links[q_ptr->link_num], NULL);

            q_ptr->q_state = EMPTY_QS;
        }

        /*
         * See if there are any messages that need the transmit
process
         * kicked off.
         */
        else if (q_ptr->q_state == TX_READY_QS)
        {
            Wdt_Tickle();
            /*
             * check if the link is disabled, if so dump the
message
             */
            if (Links[q_ptr->link_num].enabled != TRUE)
            {
                q_ptr->q_state = EMPTY_QS;
                continue;
            }

            /*
             * If not busy call the port's driver to transmit the
message
             */
            chan_ptr = &Links[q_ptr->link_num].tx_q;
            if (chan_ptr->state == IDLE_STATE)
            {
                q_ptr->q_state = LOADING_QS;
                chan_ptr->q_ptr = q_ptr;
```

©P-COM, Inc., 1994

```
                chan_ptr->packet_len = q_ptr->len;
                chan_ptr->char_pointer = q_ptr->msg;

Comm_Drivers[Links[q_ptr->link_num].driver][TX_MSG](
                    TX_MSG,&Links[q_ptr->link_num], NULL);
            }
        }
    }
}

/***************************************************************
 *
 * Name: MSG_process_interrupt
 *
 * Description: This function processes an UART interrupt
 *
 ***************************************************************/
void MSG_process_interrupt(link_num)

uchar    link_num;
{
    CHANNEL      *chan_ptr;
    MSG_LINK     *lk_ptr;
    uchar        rx, tx;
    uchar        out_char;

    lk_ptr = &Links[link_num];

    /*
     * See if it is a transmit or receive interrupt or both
     * if link is disabled then just return (must read to clear)
     */
    COMM_chk_int(lk_ptr, &rx, &tx);
    if (lk_ptr->enabled != TRUE)
        return;

    if (rx == TRUE)
    {
        /*
         * This is the recieve interrupt first we must check to
see
         * if the character is corrupted. If it is do some clean
up
         * and move on if not see if the character fits into the
packet
         */
        if (COMM_get_char(lk_ptr, &out_char) == FALSE)
        {
            reset_chan(&lk_ptr->rx_q);
```

MESSAGE.C

©P-COM, Inc., 1994

```
            Msg_Attr[lk_ptr->link_num] [BAD_CHARS_ATTR]++;

            /*
             * Check to see if this link is trashing us. If
             * so then disable for 1 second and reset the it.
             * We do this by counting errors up and non-errors
down
             */
            if ((++Msg_Attr[lk_ptr->link_num] [CONSEC_ERR_ATTR])
                > MAX_COMM_ERRS)
            {
                lk_ptr->enabled = FORCED_OFF;
                COMM_setup_port(lk_ptr);
            }
        }
        else
        {
            /*
             * Call the dirver for this port to handle the input
char
             */
            if (UTIL_add_cbuff(&lk_ptr->rx_q.c_buff, out_char) ==
FALSE)
                Msg_Attr[lk_ptr->link_num] [DROP_CHAR_ATTR]++;

            if (Msg_Attr[lk_ptr->link_num] [CONSEC_ERR_ATTR] != 0)
                Msg_Attr[lk_ptr->link_num] [CONSEC_ERR_ATTR]--;
        }
    }

    if (tx == TRUE)
    {
        /*
         * Call the dirver for this port to continue data
transmission
         */
        if (UTIL_get_cbuff(&lk_ptr->tx_q.c_buff, &out_char) ==
TRUE)
            COMM_send_char(lk_ptr, out_char);
        else
            COMM_send_cleanup(lk_ptr);
    }
}

/****************************************************************
 *
 * Name: MSG_process_attr_cmd
 *
 * Description: This function handles a command attribute pair
 *
```

```
 **************************************************************/
reentrant uchar MSG_process_attr_cmd(opcode, attr_num,
attr_val_adr, inst)

uchar   opcode;
uchar   attr_num;
uint    *attr_val_adr;
uchar   inst;
{
    uchar       status;
    MSG_LINK    *lk_ptr;

    status = NO_ERR;

    /*
     * divided into no special handling and special handling
     * groups. If an error is found we stop processing
attributes.
     */
    if (attr_num >= SPECIAL_ATTRS)
    {
        lk_ptr = &Links[inst];

        switch(attr_num)
        {
            case RESET_LK_ATTR:
                if (opcode == RESET_CMD)
                {
                    COMM_setup_port(lk_ptr);
                    reset_chan(&lk_ptr->rx_q);
                    reset_chan(&lk_ptr->tx_q);
                }
                else
                    status = BAD_CMD_ATTR;
                break;
            case BAUD_RATE_ATTR:
                if (opcode == GET_CMD)
                    *attr_val_adr = lk_ptr->baud_rate;
                else if (opcode == SET_CMD)
                {
                    lk_ptr->baud_rate = *attr_val_adr;
                    COMM_setup_port(lk_ptr);
                }
                else
                    status = BAD_CMD_ATTR;
                break;
            case PORT_ABLE_ATTR:
                if (opcode == GET_CMD)
                    *attr_val_adr = lk_ptr->enabled;
                else if (opcode == SET_CMD)
```

```
                {
                    if ((lk_ptr->enabled = *attr_val_adr) ==
TRUE)
                    {
                        reset_chan(&lk_ptr->rx_q);
                        reset_chan(&lk_ptr->tx_q);
                    }
                    COMM_setup_port(lk_ptr);
                }
                else
                    status = BAD_CMD_ATTR;
                break;
            default:
                status = UNKNOWN_ATTR;
                break;
        }
    }
    else
    {
        /*
         * If GET_CMD then just load the information into the
buffer
         * otherwise have the general attribute function handle
it
         */
        if (opcode == GET_CMD)
            *attr_val_adr = Msg_Attr[inst][attr_num];
        else
            status = OBJ_process_attr(opcode, attr_val_adr,
                &Msg_Attr[inst][attr_num]);
    }

    NOVRAM_chk_updt_needed(opcode, attr_num, status, (uchar
*)Msg_NV_Attr);

    return(status);
}

/****************************************************************
 *
 * Name: MSG_init_link
 *
 * Description: This function initializes the given link.
 *
 ****************************************************************/
void MSG_init_link(link_num, uart_address, driver)

uchar   link_num;
uchar   *uart_address;
uchar   driver;
```

```
{
    MSG_LINK     *lk_ptr;

    lk_ptr = &Links[link_num];
    lk_ptr->uart = uart_address;
    lk_ptr->link_num = link_num;
    lk_ptr->driver = driver;

    COMM_setup_port(lk_ptr);
}

/***************************************************************
 *
 * Name: MSG_put_on_tx_queue
 *
 * Description: This function places the given message on the
specified
 *              transmit queue
 *
 **************************************************************/
void MSG_put_on_tx_queue(link_num, msg_ptr, msg_len)

uchar   link_num;
uchar   *msg_ptr;
uchar   msg_len;
{
    uchar       *dst_ptr;
    QUE         *q_ptr;

   /*
    * Need to find a free buffer for the new message
    */
    if ((q_ptr = MSG_allocate_q(link_num)) != NULL)
    {
        dst_ptr = q_ptr->msg;
        UTIL_copy_mem(dst_ptr, msg_ptr, msg_len);
        q_ptr->len = msg_len;
        q_ptr->q_state = TX_READY_QS;
    }
}

/***************************************************************
 *
 * Name: MSG_allocate_q
 *
 * Description: This function finds a free queue buffer and
returns
 *              it pointer or NULL if ther is none
 *
 **************************************************************/
```

©P-COM, Inc., 1994

```
reentrant QUE *MSG_allocate_q(link_num)

uchar   link_num;
{
    uchar       i;
    QUE         *q_ptr;

    for (i = 0, q_ptr = Queues; i < NUM_QUEUES; i++, q_ptr++)
    {
        if (q_ptr->q_state == EMPTY_QS)
        {
            /*
             * This resouce can be allocated from 3 interrupt
handlers
             * plus the main loop. So to avoid contention we will
disable
             * interrupts recheck if it is available and then
claim it.
             * It is done this way to minimize the time they are
disabled.
             */
            INTERRUPTS_OFF;
            if (q_ptr->q_state == EMPTY_QS)
            {
                q_ptr->q_state = LOADING_QS;
                q_ptr->link_num = link_num;

                INTERRUPTS_ON;
                return(q_ptr);
            }
            else
                INTERRUPTS_ON;
        }
    }

    /*
     * This should not happen if it does flush the
     * queue and record then event. return the first buffer.
     */
    for (i = 0, q_ptr = Queues; i < NUM_QUEUES; i++, q_ptr++)
    {
        if (q_ptr->q_state == LOADING_QS)
        {
            /*
             * free the links that are in the middle of sending
             * save this link it is mostly the stuck link.
             */
            reset_chan(&Links[q_ptr->link_num].rx_q);
            reset_chan(&Links[q_ptr->link_num].tx_q);
            Msg_Attr[q_ptr->link_num][Q_OVERFLW_ATTR]++;
```

```
        }

        q_ptr->q_state = EMPTY_QS;
    }
    Queues[0].q_state = LOADING_QS;

    Queues[0].link_num = link_num;
    return(Queues);
}

/***************************************************************
 *
 * Name: MSG_deallocate_q
 *
 * Description: This function free for use a queue buffer
 *
 ***************************************************************/
reentrant void MSG_deallocate_q(ch_ptr)

CHANNEL *ch_ptr;
{
    INTERRUPTS_OFF;
    if (ch_ptr->q_ptr != NULL)
    {
        ch_ptr->q_ptr->q_state = EMPTY_QS;
        ch_ptr->q_ptr = NULL;
    }
    INTERRUPTS_ON;
}

/***************************************************************
 *
 * Name: MSG_get_rsp_mem
 *
 * Description: This function returns a pointer to response
 *              memory to be used to build a response.
 *
 ***************************************************************/
uchar   *MSG_get_rsp_mem()

{
    return(rsp_mem);
}

/***************************************************************
 *
 * Name: MSG_chk_links
 *
 * Description: This function checks the links for good
functioning.
```

```
 *              It is part of the code that turn run away ports
 *              off and then truns them back on to see if they
are
 *              doing better.
 *
 ***************************************************************/
void MSG_chk_links()
{
    uchar       i;
    MSG_LINK    *lk_ptr;

    lk_ptr = &Links[0];

    /*
     * check if any links are down because of trashing us. if so
     * being them back up to see if they are better
     */
    for (i = 0; i < NUM_LINKS; i++, lk_ptr++)
    {
        if (lk_ptr->enabled == FORCED_OFF)
        {
            Msg_Attr[i][CONSEC_ERR_ATTR] = 0;
            lk_ptr->enabled = TRUE;
            reset_chan(&lk_ptr->tx_q);
            reset_chan(&lk_ptr->rx_q);
            COMM_setup_port(lk_ptr);
        }
    }
}

/****************************************************************
 *
 * Name: MSG_bld_msg
 *
 * Description: This function builds a message. It does the setup
 *              then calls the driver for the port the message is
 *              to be sent out.
 *
 ***************************************************************/
uchar MSG_bld_msg(dir, nw_adr, link_num, opcode, object,
data_ptr, data_len)

uchar   dir;
uint    nw_adr;
uchar   link_num;
uchar   opcode;
uchar   object;
uchar   *data_ptr;
uchar   data_len;
{
```

©P-COM, Inc., 1994

```
    QUE          *q_ptr;
    MSG_LINK     *lk_ptr;
    HEADER       head;

    lk_ptr = &Links[link_num];

   /*
    * Need to find a free buffer for the new message
    */
    if ((q_ptr = MSG_allocate_q(link_num)) != NULL)
    {
        /*
         * Pass the standard header information to the port's
         * driver so that it can build the right kind of message
         * for the given port
         */
        head.nw_adr = nw_adr;
        head.opcode = opcode;
        head.object = object;
        head.data_ptr = data_ptr;
        head.data_len = data_len;

        Comm_Drivers[lk_ptr->driver] [BLD_MSG] (
            BLD_MSG, &head, q_ptr);

        if (dir == RX)
           q_ptr->q_state = RX_READY_QS;
        else
           q_ptr->q_state = TX_READY_QS;
        return(TRUE);
   }
   else
   {
        /*
         * Can't do anything other then log then event
         */
        Msg_Attr[link_num] [Q_OVERFLW_ATTR]++;
        return(FALSE);
   }
}

/***************************************************************
 *
 * Name: MSG_process_attr_msg
 *
 * Description: This routine handles request messages. The
message
 *              must be it the standart object request message
form.
 *
```

```
 *************************************************************/
void MSG_process_attr_msg(attr_func, data_ptr)

ATTR_CB attr_func;
void    *data_ptr;
{
    uchar       attr_num, inst, i;
    uint        attr_val;
    uchar       status;
    uchar       *rsp_ptr, *cur_ptr;
    MSG_LINK    *lk_ptr;
    uchar       link_num;
    HEADER      *head_ptr;

    head_ptr = (HEADER *)data_ptr;
    NOVRAM_updt_needed(RESET_CMD);
    rsp_ptr = cur_ptr = MSG_get_rsp_mem();  /* get pointer to msg
buffer */

    /*
     * Check instance number, if there is one. If the special
code
     * DO_ALL_INST is returned then send all instances of one
attribute
     */
    if ((status = OBJ_chk_inst(head_ptr, &inst)) != DO_ALL_INST)
    {
        /*
         * process each attribute one at a time. If it requires
response data
         * then fill into the response buffer.
         * Attributes are divided into no special handling and
special handling
         * groups. If an error is found we stop processing
attributes.
         */
        while (((attr_num = OBJ_read_nxt_attr(head_ptr,
&attr_val))
            != NO_MORE_ATTR) && (status == NO_ERR))
        {
            status = attr_func(head_ptr->opcode, attr_num,
&attr_val, inst);

            if (head_ptr->opcode == GET_CMD)
                OBJ_load_attr(&cur_ptr, attr_num, attr_val);
        }
    }
    else
    {
        /*
```

```
         * Process the attribute for each instance. If it is a
GET command
         * then put the attribute number in the message followed
by all
         * of the values.
         */
        if ((attr_num = OBJ_read_nxt_attr(head_ptr, &attr_val))
            != NO_MORE_ATTR)
        {
            if (head_ptr->opcode == GET_CMD)
                *cur_ptr++ = attr_num;
            for (i = 0; i < inst; i++)
            {
                if ((status = attr_func(head_ptr->opcode,
attr_num,
                        &attr_val, i)) != NO_ERR)
                    break;

                if (head_ptr->opcode == GET_CMD)
                {
                    *cur_ptr++ = ((attr_val>> 8) & 0x00ff);
                    *cur_ptr++ = (attr_val & 0x00ff);
                }
            }
        }
        else
            status = BAD_CMD_ATTR;
    }

    /*
     * Check to see if we need to do a novram update
     */
    if (NOVRAM_updt_needed(GET_CMD) == TRUE)
    {
        if (head_ptr->object != COMM_OBJ)
        {
            if (OBJ_save_novram(head_ptr->object) == FALSE)
                status = NOV_UPDT_FAIL;
        }
        else
        {
            /*
             * call directly so that we don't have to support
             * re-enterent code.
             */
            if (NOVRAM_save_attrs(COMM_OBJ,
OBJ_get_nv_adr(COMM_OBJ),
                    (uchar *)Msg_NV_Attr,
                    MSG_process_attr_cmd, NUM_LINKS) == FALSE)
                status = NOV_UPDT_FAIL;
```

```
        }
    }

    /*
     * Send the response. setup and call the driver for the port
to
     * be responded to.
     */
    link_num = COMM_calc_rsp_link(head_ptr->nw_adr,
head_ptr->link_adr);
    lk_ptr = &Links[link_num];
    head_ptr->data_ptr = rsp_ptr;
    head_ptr->data_len = (uchar)(cur_ptr - rsp_ptr);

    Comm_Drivers[lk_ptr->driver][SEND_RSP_MSG](
        SEND_RSP_MSG, head_ptr, &status);
}

/**************************************************************
 *
 * Name: reset_chan
 *
 * Description: This routine resets a message channel (one
direction)
 *
 **************************************************************/
reentrant void reset_chan(chan_ptr)

CHANNEL *chan_ptr;
{
    MSG_deallocate_q(chan_ptr);
    chan_ptr->state = IDLE_STATE;
}

/**************************************************************
 *
 * Name: MSG_process_chars
 *
 * Description: This routine handles input character from the
ports
 *              loading transmit characters.
 *
 **************************************************************/
void MSG_process_chars()
{
    uchar       i;
    uchar       data;
    MSG_LINK    *lk_ptr;

    /*
```

```
     * Check each link to see if has received characters to
process or
     * if has characters to send
     */
    for (i = 0, lk_ptr = Links; i < NUM_LINKS; i++, lk_ptr++)
    {
        if (UTIL_get_cbuff(&lk_ptr->rx_q.c_buff, &data) == TRUE)
        {
            Comm_Drivers[lk_ptr->driver][RX_BYTE](
                RX_BYTE, lk_ptr, &data);
        }

        Comm_Drivers[lk_ptr->driver][TX_BYTE](
            TX_BYTE, lk_ptr, NULL);

        /*
         * Just incase the transmiter is off and we still have
chars
         * in the buffer to send (can happen because of
interrupts).
         * This will start the process back up
         */
        if (lk_ptr->tx_q.busy == FALSE)
        {
            if (UTIL_get_cbuff(&lk_ptr->tx_q.c_buff, &data) ==
TRUE)
                COMM_send_char(lk_ptr, data);
        }
    }
}
```

MODEM.C

©P-COM, Inc., 1994

```
/****************************************************************
 *
 * Description: This file contains the functions used to support
 *              the Front Control Panel
 *
 * $Id: modem.c 2.1 1993/12/29 10:38:38 MIKEE Exp $
 *
 * $Log: modem.c $
 * Revision 2.1  1993/12/29  10:38:38  MIKEE
 * covertion
 *
 *
 *    Rev 1.2   07 Oct 1993 06:25:18   mikee
 * mode status byte sense swap
 *
 *    Rev 1.1   05 Oct 1993 17:59:32   mikee
 * swap sense of modem status
 *
 *    Rev 1.0   18 Sep 1993 14:03:54   mikee
 * Initial revision.
 ****************************************************************/

#include <sysdefs.h>
#include <80c196.h>
#include <object.h>
#include <message.h>
#include <spm.h>
#include <radio.h>
#include <link.h>
#include <modem.h>

/*
 * External Functions
 */

/*
 * Internal Functions
 */

/*
 * External Data
 */

/*
 * Internal Data
 */
register uchar    md_cmd_image;
register uchar    md_stat_image;
MD_CMD_OL    *const md_cmd_ptr = (MD_CMD_OL*) &md_cmd_image;
MD_STATUS    *const md_stat_ptr = (MD_STATUS*) &md_stat_image;
```

```
const ulong modem_synth_vals[2] =
{
    0x0001803D,0x00081312
};

/*************************************************************
 *
 * Name: MODEM_init
 *
 * Description: This function initializes the RF modem board
 *
 *************************************************************/
uchar MODEM_init()

{

    md_cmd_image = 0;

    /*
     * Load the synthesizer based on line rate
     */
    SPM_modem_send(modem_synth_vals[SYNTH_15BIT],
        (ulong)SYNTH_15MSB_MASK, MD_LATCH3);
    SPM_modem_send(modem_synth_vals[SYNTH_18BIT],
        (ulong)SYNTH_18MSB_MASK, MD_LATCH3);

    return(TRUE);
}

/*************************************************************
 *
 * Name: MODEM_lpbk
 *
 * Description: This function sets, clears, or gets the RF modem
 *              loopback
 *
 *************************************************************/
uchar MODEM_lpbk(opcode, attr_val_adr)

uchar   opcode;
uint    *attr_val_adr;
{
    uchar   status;

    status = NO_ERR;
    if (opcode == GET_CMD)
        *attr_val_adr = md_cmd_ptr->iduloop;
    else if (opcode == SET_CMD)
    {
```

```
        if (LINK_set_lpbk(LK_RFIDU_LPBK, *attr_val_adr))
        {
            md_cmd_ptr->iduloop = *attr_val_adr;
            SPM_modem_send((ulong)md_cmd_image,
(ulong)MD_CMD_MSB_MASK,
                MD_LATCH1);
        }
        else
            status = CMD_FAILED;
    }
    else
        status = BAD_CMD_ATTR;

    return(status);
}

/**************************************************************
 *
 * Name: MODEM_mute
 *
 * Description: This function sets, clears, or gets the RF modem
 *              mute flag
 *
 **************************************************************/
uchar MODEM_mute(opcode, attr_val_adr)

uchar   opcode;
uint    *attr_val_adr;
{
    uchar   status;

    status = NO_ERR;
    if (opcode == GET_CMD)
        *attr_val_adr = md_cmd_ptr->idumute;
    else if (opcode == SET_CMD)
    {
        md_cmd_ptr->idumute = *attr_val_adr;
        SPM_modem_send((ulong)md_cmd_image,
(ulong)MD_CMD_MSB_MASK, MD_LATCH1);
    }
    else
        status = BAD_CMD_ATTR;

    return(status);
}

/**************************************************************
 *
 * Name: MODEM_av_select
 *
```

```
 * Description: This function sets, clears, or gets the RF modem
 *              AV selection field
 *
 *************************************************************/
uchar MODEM_av_select(selection)

uchar   selection;
{
    if (selection < MAX_MODEM_AV_SEL)
    {
        md_cmd_ptr->av_select = selection;
        SPM_modem_send((ulong)md_cmd_image,
(ulong)MD_CMD_MSB_MASK, MD_LATCH1);
        return(TRUE);
    }

    return(FALSE);
}

/**************************************************************
 *
 * Name: MODEM_set_rate
 *
 * Description: This function sets the RF modem's rate
 *
 *************************************************************/
void MODEM_set_rate()

{
    uint    attr_val;

    RADIO_process_attr_cmd(GET_CMD, LN_RATE_ATTR, &attr_val, 0);
    md_cmd_ptr->brsel = attr_val;
    SPM_modem_send((ulong)md_cmd_image, (ulong)MD_CMD_MSB_MASK,
MD_LATCH1);
}

/**************************************************************
 *
 * Name: MODEM_test
 *
 * Description: This function tests the RF modem board
 *
 *************************************************************/
uchar MODEM_test()

{
    uchar   data;

    /*
```

```
     * shift a 16 bit value into the command register and then
     * read the first 8 bits from the status register.
     * The data will come back inverted
     */
    SPM_modem_send((ulong)MD_TEST_STR, (ulong)TEST_MSB_MASK,
TEST_LATCH);
    data = ~(SPM_modem_read(TEST_LATCH));

    if (data != MD_TEST_VAL)
        return(FALSE);
    return(TRUE);
}

/***************************************************************
 *
 * Name: MODEM_get_status
 *
 * Description: This function returns the RF modem board's status
 *
 ***************************************************************/
MD_STATUS *MODEM_get_status()

{
    md_stat_image = SPM_modem_read(MD_LATCH2);

    return(md_stat_ptr);
}

/***************************************************************
 *
 * Name: MODEM_synth_alm
 *
 * Description: This function check for a synthesizer alarm
 *
 ***************************************************************/
uchar MODEM_synth_alm()
{
    MD_STATUS   *stat_ptr;

    /*
     * read the status register
     */
    stat_ptr = MODEM_get_status();
    if (stat_ptr->lock1 == SET)
        return(TRUE);
    else
        return(FALSE);
}
```

NOVRAM.C ©P-COM, Inc., 1994

```
/***************************************************************
 *
 * Description: This file contains the functions that handle
 *              the novram
 *
 * $Id: novram.c 2.2 1994/01/19 15:53:00 JEFFC Exp $
 *
 * $Log: novram.c $
 * Revision 2.2  1994/01/19  15:53:00  JEFFC
 * Added function to return the FW release which last saved
novram.
 *
 * Revision 2.1  1993/12/29  10:38:43  MIKEE
 * covertion
 *
 *
 *    Rev 1.1   17 Nov 1993 10:05:02   mikee
 * moved back to IDU dir and made fix for reentrant code
 *
 *    Rev 1.0   18 Sep 1993 14:14:24   mikee
 * Initial revision.
 **************************************************************/

#include "sysdefs.h"
#include "sys_time.h"
#include "object.h"
#include "message.h"
#include "novram.h"

/*
 * External Functions
 */
extern void     SYS_e2clk(uchar);        /* defined in spm.c for
IDU code */
extern void     SYS_e2data(uchar);
extern uchar    SYS_e2rcv_ack();
extern uchar    SYS_get_e2data();
extern void     Wdt_Tickle();
extern uchar    init_done();

/*
 * Internal Functions
 */
static void send_ack(void);
static void send_byte(uchar);

/*
 * External Data
 */
extern CONST uchar  Releases[NUM_SUPPORT_RELS];
```

```
/*
 * Internal Data
 */
static      uchar   Rel_Index;
static      uchar   Good_Nov;
static      uchar   FW_Release;
REGISTER    uchar   Opt_Page;
REGISTER    uchar   Opt_Adr;
REGISTER    uchar   Opt_Cnt;
static      uchar   Opt_Buff[BYTES_PER_WRITE];
static      uchar   Updt_Needed;

/***************************************************************
 *
 * Name: NOVRAM_init()
 *
 * Description: Initializes novram functions
 *
 ***************************************************************/
uchar NOVRAM_init()
{
    uchar   mast_flag;
    uchar   i;

    Rel_Index = NUM_SUPPORT_RELS - 1;

    /*
     * Read the Master novram flag and check if there is any good
data
     * in novram to read
     */
    Good_Nov = FALSE;
    if (NOVRAM_read(&mast_flag, NV_MASTER_LOC, 1, PAGE_1) !=
FALSE)
    {
        if ((mast_flag == NV_UP_TO_DATE) ||
            (mast_flag == NV_UPDT_IN_PROG))
            Good_Nov = TRUE;
        else
            OBJ_clr_novram();
    }

    if (Good_Nov == FALSE)
        return(0);

    /*
     * Read the release of firmware used to save the novram then
     * find the index into the object's starting address table.
     */
    if (NOVRAM_read(&FW_Release, NV_FW_REL_LOC, 1, PAGE_1) !=
```

©P-COM, Inc., 1994

```
FALSE)
    {
        for (i = 0; i < NUM_SUPPORT_RELS; i++)
            if (FW_Release > Releases[i])
                break;

        if (i < NUM_SUPPORT_RELS)
            Rel_Index = i;
    }
    else
        return(0);

    return(FW_Release);
}

/*************************************************************
 *
 * Name:         NOVRAM_get_version()
 *
 * Description: This function returns the last version of
 *              firmware that wrote into NOVRAM.
 *
 *************************************************************/
uchar NOVRAM_get_version()
{
    return FW_Release;
}

/*************************************************************
 *
 * Name: NOVRAM_write
 *
 * Description: This function writes a string of bytes to a 24c04
 *              EEPROM. Returns TRUE or FALSE
 *
 *************************************************************/

uchar NOVRAM_write(source, e2_addr, length, sheet)

uchar *source;      /* pointer to start of data to transmit */
uchar e2_addr;      /* starting eeprom address to write to */
uchar length;       /* number of bytes to write to eeprom */
                    /* if dummy write, length must be >0 */
uchar sheet;        /* 0 or 1. if dummy write then 2 or 3 */
{
     uchar command, index;
     uint x;

    SYS_e2data(SET);
```

```
     while(length)
     {
          command = (0xa0 | ((sheet<<1) & 0x02));
        /*
           * First we poll eeprom to see if internal write cycle
is in progress.
           * If it is, wait until it's finished.  If the device
is bad, the
           * watchdog will eventually bite us.
           *
           */
        TIMER_set(NOVRAM_TIMER, SECONDS_50MS);
          do
        {
            SYS_e2clk(SET);        /* Generate a start bit */
            SYS_e2data(CLR);
            SYS_e2clk(CLR);

               send_byte(command);

            Wdt_Tickle();
          }
          while(!TIMER_expired(NOVRAM_TIMER) &&
!SYS_e2rcv_ack());

          if (TIMER_expired(NOVRAM_TIMER))
            return(FALSE);

        /*
           * Now we can initiate start of transmission
           */
        SYS_e2data(SET);   /* Generate a start bit */
        SYS_e2clk(SET);
        SYS_e2data(CLR);
        SYS_e2clk(CLR);

          /*
           * Send device identifier, device address,
           * sheet, and write command byte
           */
          send_byte(command);
          if (!SYS_e2rcv_ack())
            return(FALSE);

          /*
           * send storage address
           */
        send_byte(e2_addr);
          if (!SYS_e2rcv_ack())
            return(FALSE);
```

```
            /*
             * if bit one of sheet is set, this is a dummy write
             */
            if (sheet & 0x02)
              break;

            /*
             * Now the chip is set up so
             * send 1 to 16 data bytes at a time
             *
             * Loop will stop if we reach 16 bytes,
             *      or if we reach the end of a page
             *      or if we run out of data
             */
            for (index = 0; index < 16; index++)
            {
                 send_byte(*(source++));
                 if (!SYS_e2rcv_ack())
                  return (FALSE);
                 e2_addr++;

              if (!--length)
                  break;

              if ((e2_addr & 0x0f) == 0)
                  break ;
            }

            /*
             * Now the data has been sent, so
             * send the stop bit
             */
          SYS_e2data(CLR);
          SYS_e2clk(SET);
          SYS_e2data(SET);

      }
      return(TRUE);
}

/***************************************************************
 *
 * Name: NOVRAM_read
 *
 * Description: This function reads a variable number of bytes
 *              from a 24c04 EEPROM.
 *              Returns TRUE or FALSE
 *
 ***************************************************************/
uchar NOVRAM_read(destination, e2_addr, length, sheet)
```

```
uchar *destination;      /* pointer to destination of bytes being
read */
uchar e2_addr;           /* eeprom address to read from */
uchar length;            /* number of bytes to read */
uchar sheet;             /* sheet 0 or 1 */
{

     uchar byte, command;
     char tidbit;


    /*
      * First, do a dummy write to get the eeprom's attention
      */
     sheet |= 0x02;
     if (NOVRAM_write(destination, e2_addr, 1, sheet) == FALSE)
          return (FALSE);

     /*
      * Issue a start bit
      */
    SYS_e2data(SET);
    SYS_e2clk(SET);
    SYS_e2data(CLR);
    SYS_e2clk(CLR);

     /*
      * send device identifier, device address,
      * sheet, and write command byte
      */
     command = (0xa1 | ((sheet<<1) & 0x02));

     send_byte(command);
     if (!SYS_e2rcv_ack())
        return(FALSE);

     /*
      * read the number of bytes
      * requested in length
      */
     while(length--) {

          byte = 0;
          for (tidbit = 7; tidbit >= 0; tidbit--)
        {
               SYS_e2data(SET);
               SYS_e2clk(SET);
               byte |= (SYS_get_e2data() << tidbit);
               SYS_e2clk(CLR);
          }
```

```
            *(destination++) = byte;
            if (length)
              send_ack();
      }

      /*
       * send stop bit
       */
      SYS_e2data(CLR);
      SYS_e2clk(SET);
      SYS_e2data(SET);
      return(TRUE);
}

/**************************************************************
 *
 * Name: send_ack
 *
 * Description: This routine sends an acknowledgement to the
24c04
 *
 **************************************************************/
void send_ack()
{
      SYS_e2data(CLR);
      SYS_e2clk(SET);
      SYS_e2clk(SET);
      SYS_e2clk(CLR);
}

/**************************************************************
 *
 * Name: send_byte
 *
 * Description: This routine send a byte to a 24c04 EEPROM
 *
 **************************************************************/
void send_byte(fodder)

uchar fodder;
{
      uchar trmtbit;
      signed char tidbit;

      for (tidbit = 7; tidbit >= 0; tidbit--)
     {
            trmtbit = fodder>>tidbit;

            SYS_e2data(trmtbit & 0x01);
            SYS_e2clk(SET);
```

©P-COM, Inc., 1994

```
            SYS_e2clk(SET);
            SYS_e2clk(CLR);
        }
}

/************************************************************
 *
 * Name: NOVRAM_test()
 *
 * Description: This routine test novram memory
 *
 ************************************************************/
uchar NOVRAM_test(level)

uchar   level;
{
    uchar   page, tst_char;

    /*
     * If this is a destinctive test then read and write
     * otherwise just read the value that was left there on
power-up
     */
    for (page = PAGE_1; page <= PAGE_2; page++)
    {
        if (level == DESTRUCTIVE)
        {
            tst_char = MEM_PATTERN2;
            if (NOVRAM_write(&tst_char, NV_TEST_LOC, 1, page) ==
FALSE)
                return(FALSE);
            tst_char = 0;
        }

        if (NOVRAM_read(&tst_char, NV_TEST_LOC, 1, page) ==
FALSE)
            return(FALSE);
        if (tst_char != MEM_PATTERN2)
            return(FALSE);
    }
    return(TRUE);
}

/************************************************************
 *
 * Name: NOVRAM_save_attrs()
 *
 * Description: This routine saves the given attributes starting
 *              at the novram location passed
 *
```

```
 ***************************************************************/
uchar NOVRAM_save_attrs(object, adr_ptr, attrs_ptr, attr_func,
num_inst)

uchar       object;
NV_ADR_BLK  *adr_ptr;
uchar       *attrs_ptr;
ATTR_CB     attr_func;
uchar       num_inst;
{
    uint    attr_val;
    uchar   attr_num, *attr_list;
    uchar   data_val, nv_adr, inst, len;

    /*
     * Mark the object being updated
     */
    nv_adr = adr_ptr->nv_start_adr;
    data_val = NV_UPDT_IN_PROG;
    if (NOVRAM_write(&data_val, nv_adr++, 1,
adr_ptr->nv_start_pg) == FALSE)
        return(FALSE);

    /*
     * Save each attribute
     */
    NOVRAM_opt_init(nv_adr, adr_ptr->nv_start_pg);
    for (inst = 0; inst < num_inst; inst++)
    {
        attr_list = attrs_ptr;
        while ((attr_num = *attr_list++) != NO_MORE_ATTR)
        {
            /*
             * Most values saved in novram are only a byte. The
few that are
             * two byte values are have a marker before them in
the list
             */
            if (attr_num == TWO_BYTE_ATTR)
            {
                attr_num = *attr_list++;
                len = 2;
            }
            else
                len = 1;

            if (CALL_ATTR_FUNC(attr_func, object,
                GET_CMD, attr_num, &attr_val, inst) != NO_ERR)
                return(FALSE);
```

```
            if (len == 1)
            {
                data_val = (uchar)attr_val;
                if (NOVRAM_opt_write(&data_val, 1) == FALSE)
                    return(FALSE);
            }
            else
            {
                if (NOVRAM_opt_write((uchar *)&attr_val, 2) ==
FALSE)

                    return(FALSE);
            }
        }
    }

    if (NOVRAM_opt_flush() == FALSE)
        return(FALSE);

    /*
     * Mark the update is complete
     */
    data_val = NV_UP_TO_DATE;
    if (NOVRAM_write(&data_val, adr_ptr->nv_start_adr, 1,
            adr_ptr->nv_start_pg) == FALSE)
        return(FALSE);

    return(TRUE);
}

/****************************************************************
 *
 * Name: NOVRAM_restore_attrs()
 *
 * Description: This routine restores the given attributes
starting
 *              at the novram location passed
 *
 ****************************************************************/
uchar NOVRAM_restore_attrs(object, adr_ptr, attrs_ptr, attr_func,
num_inst)

uchar       object;
NV_ADR_BLK  *adr_ptr;
uchar       *attrs_ptr;
ATTR_CB     attr_func;
uchar       num_inst;
{
    uint    attr_val;
    uchar   attr_num, *attr_list;
    uchar   data_val, nv_adr, inst;
```

```
    if (Good_Nov == FALSE)
        return(FALSE);

    nv_adr = adr_ptr->nv_start_adr;

    /*
     * Read the flag and make sure the data is good
     */
    if (NOVRAM_read(&data_val, nv_adr++, 1, adr_ptr->nv_start_pg)
== FALSE)
        return(FALSE);
    if (data_val != NV_UP_TO_DATE)
        return(FALSE);

    for (inst = 0; inst < num_inst; inst++)
    {
        attr_list = attrs_ptr;
        while ((attr_num = *attr_list++) != NO_MORE_ATTR)
        {
            /*
             * Most values saved in novram are only a byte. The
few that are
             * two byte values are have a marker before them in
the list
             */
            if (attr_num == TWO_BYTE_ATTR)
            {
                attr_num = *attr_list++;
                if (NOVRAM_read((uchar *)&attr_val, nv_adr, 2,
                        adr_ptr->nv_start_pg) == FALSE)
                    return(FALSE);
                nv_adr += 2;
            }
            else
            {
                if (NOVRAM_read(&data_val, nv_adr++, 1,
                        adr_ptr->nv_start_pg) == FALSE)
                    return(FALSE);
                attr_val = data_val;
            }

            if (CALL_ATTR_FUNC(attr_func, object,
                SET_CMD, attr_num, &attr_val, inst) != NO_ERR)
                return(FALSE);
        }
    }
    return(TRUE);
}

/***************************************************************
```

©P-COM, Inc., 1994

```
 *
 * Name: NOVRAM_get_rel_idx()
 *
 * Description: Function returns the index of the release table
 *              for the current novram data
 *
 ************************************************************/
uchar NOVRAM_get_rel_idx()
{
    return(Rel_Index);
}

/************************************************************
 *
 * Name: NOVRAM_opt_init
 *
 * Description: This function sets up for the optimize write
 *              function.
 *
 ************************************************************/

void NOVRAM_opt_init(e2_addr, page)

uchar e2_addr;      /* starting eeprom address to write to */
uchar page;         /* 0 or 1. if dummy write then 2 or 3 */
{
    Opt_Cnt = 0;
    Opt_Adr = e2_addr;
    Opt_Page = page;
}

/************************************************************
 *
 * Name: NOVRAM_opt_write
 *
 * Description: This function loads values into the optimize
 *              buffer, when it is full it writes the buffer to
 *              novram. Do it this way saves on EEPROM setup time
 *
 ************************************************************/
uchar NOVRAM_opt_write(data_ptr, len)

uchar       *data_ptr;
uchar       len;
{
    uint    i;

    /*
     * Place each byte of data in the buffer, if it fills write
it to
```

```
     * novram.
     */
    for (i = 0; i < len; i++)
    {
        Opt_Buff[Opt_Cnt++] = *data_ptr++;
        if (Opt_Cnt >= BYTES_PER_WRITE)
        {
            if (NOVRAM_write(Opt_Buff, Opt_Adr, BYTES_PER_WRITE,
Opt_Page)
                    == FALSE)
                return(FALSE);
            Opt_Cnt = 0;
            Opt_Adr += BYTES_PER_WRITE;
        }
    }
    return(TRUE);
}

/***************************************************************
 *
 * Name: NOVRAM_opt_flush
 *
 * Description: This function writes any remaining bytes in the
 *              optimize buffer to novram.
 *
 ***************************************************************/
uchar NOVRAM_opt_flush()

{
    /*
     * if there is anything in the buffer write it
     */
    if (Opt_Cnt > 0)
    {
        if (NOVRAM_write(Opt_Buff, Opt_Adr, Opt_Cnt, Opt_Page) ==
FALSE)
            return(FALSE);
    }
    return(TRUE);
}

/***************************************************************
 *
 * Name: NOVRAM_updt_needed
 *
 * Description: This function sets or gets the local global that
 *              indicates if a novram update is needed
 *
 ***************************************************************/
uchar NOVRAM_updt_needed(opcode)
```

```
uchar   opcode;
{
    /*
     * If Get then return the flag otherwise this is a request
     * to reset the flag
     */
    if (opcode != GET_CMD)
        Updt_Needed = FALSE;

    return(Updt_Needed);
}

/**************************************************************
 *
 * Name: NOVRAM_chk_updt_needed
 *
 * Description: This routine checks a given attribute to see if
 *              a novram update is needed. if so it sets a local
 *              global
 *
 **************************************************************/
reentrant void NOVRAM_chk_updt_needed(opcode, attr_num, status,
attr_list)

uchar       opcode;
uchar       attr_num;
uchar       status;
uchar       *attr_list;
{
    /*
     * First check if we need to check.
     * Don't update during initialization.
     */
    if ((Updt_Needed == TRUE) || (status != NO_ERR) ||
(init_done() == FALSE)
            || (opcode == GET_CMD) || (opcode == RESET_CMD))
        return;

    /*
     * Check if the attribute is in the novram list
     */
    while (*attr_list != NO_MORE_ATTR)
    {
        if (*attr_list++ == attr_num)
        {
            Updt_Needed = TRUE;
            return;
        }
    }
}
```

OBJECT.C ©P-COM, Inc., 1994

```
/**************************************************************
 *
 * Description: This file contains the functions that handle
 *              diagnostic messages.
 *
 * $Id: object.c 2.2 1994/01/19 15:54:39 JEFFC Exp $
 *
 * $Log: object.c $
 * Revision 2.2  1994/01/19  15:54:39  JEFFC
 * Added support for novram translation when firmware gets
upgraded.
 *
 * Revision 2.1  1993/12/29  10:38:44  MIKEE
 * Conversion
 *
 *    Rev 1.0   17 Nov 1993 10:14:04   mikee
 * Initial revision.
 *
 **************************************************************/

#include "sysdefs.h"
#include "message.h"
#include "object.h"
#include "novram.h"

/*
 * External Functions
 */
void    DIAG_state(uchar);
uchar   FACT_handler();

/*
 * Internal Functions
 */
static uchar get_inst(HEADER *);

/*
 * External Data
 */
extern CONST OBJECT_CNFG Objects[NUM_OBJECTS];

/*
 * Internal Data
 */

/**************************************************************
 *
 * Name: OBJ_init
 *
 * Description: This routine calls all objects and lets them
```

```
handle
 *              there own init.
 *
 **************************************************************/
uchar OBJ_init()
{
    uchar   rel_index;
    uchar   i;
    uchar novram_translated = 0;

    /*
     * Call each object with the INIT_EVENT
     */
    rel_index = NOVRAM_get_rel_idx();
    for (i = 0; i < NUM_OBJECTS; i++)
    {
        DIAG_state(i);

        if (Objects[i].call_init == TRUE)
        {
            if(Objects[i].cb_func(i, INIT_EVENT,
                (uchar *)&Objects[i].rel_nv_start[rel_index]))
            {
                novram_translated++;
            }
        }
    }
    return novram_translated;
}

/***************************************************************
 *
 * Name: OBJ_call_handler
 *
 * Description: This function calls the given objects handler
 *
 **************************************************************/
void OBJ_call_handler(obj_num, event, cdata_ptr)

uchar   obj_num;
uchar   event;
uchar   *cdata_ptr;
{
    /*
     *
     */
    if (obj_num < NUM_OBJECTS)
    {
        Objects[obj_num].cb_func(obj_num, event, cdata_ptr);
    }
```

```
    else if (obj_num == FACTORY_OBJ)
        FACT_handler(obj_num, event, cdata_ptr);
}

/****************************************************************
 *
 * Name: OBJ_process_attr
 *
 * Description: This routine handles request messages
 *
 ****************************************************************/
uchar OBJ_process_attr(opcode, val_adr, attr_adr)

uchar   opcode;
uint    *val_adr;
uint    *attr_adr;
{

    switch(opcode)
    {
        case SET_CMD:
            *attr_adr = *val_adr;
            break;
        case GET_CMD:
            *val_adr = *attr_adr;
            break;
        case INC_CMD:
            (*attr_adr)++;
            break;
        case DEC_CMD:
            if (*attr_adr > 0)
                (*attr_adr)--;
            break;
        case RESET_CMD:
            return(BAD_CMD_ATTR);
    }

    return(NO_ERR);
}

/****************************************************************
 *
 * Name: OBJ_save_novram
 *
 * Description: This routine saves the novram of each object
 *
 ****************************************************************/
uchar OBJ_save_novram(obj_num)

uint   obj_num;
```

```
{
    uchar   i, data_val;

    /*
     * If the object is the NULL_OBJ the all objects should be
saved
     * else just save the one indicated.
     * Save one object at a time, then update firmware release.
     */
    if (obj_num == NULL_OBJ)
    {
        data_val = NV_UPDT_IN_PROG;
        if (NOVRAM_write(&data_val, NV_MASTER_LOC, 1, PAGE_1) ==
FALSE)
            return(FALSE);

        /*
         * Save one object at a time, then update firmware
release
         */
        for (i = 0; i < NUM_OBJECTS; i++)
        {
            /*
             * Call the each object with its starting address
information
             * for the latest support release.
             */
            if (Objects[i].cb_func(i, SAVE_NV_EVENT,
                    (uchar
*)&Objects[i].rel_nv_start[NUM_SUPPORT_RELS - 1])
                    == FALSE)
                return(FALSE);
        }

        data_val = NV_UP_TO_DATE;
        if (NOVRAM_write(&data_val, NV_MASTER_LOC, 1, PAGE_1) ==
FALSE)
            return(FALSE);
    }
    else
    {
        /*
         * Call the object with its starting address information
         * for the latest support release.
         */
        if (Objects[obj_num].cb_func(obj_num, SAVE_NV_EVENT,
                (uchar *)
&Objects[obj_num].rel_nv_start[NUM_SUPPORT_RELS - 1])
                == FALSE)
            return(FALSE);
```

```
    }

    return(TRUE);
}

/**************************************************************
 *
 * Name: OBJ_get_max_inst
 *
 * Description: This function returns the max instance number
 *              of the given object
 *
 **************************************************************/
uchar OBJ_get_max_inst(obj_num)

uchar   obj_num;
{
    return(Objects[obj_num].max_inst);
}

/**************************************************************
 *
 * Name: OBJ_get_nv_adr
 *
 * Description: This function returns an objects novram address
 *              block
 *
 **************************************************************/
NV_ADR_BLK *OBJ_get_nv_adr(obj_num)

uchar   obj_num;
{
    return(&Objects[obj_num].rel_nv_start[NOVRAM_get_rel_idx()]);

}

/**************************************************************
 *
 * Name: OBJ_clr_novram
 *
 * Description: This routine clears each object novram flag
 *
 **************************************************************/
void OBJ_clr_novram()

{
    uchar   i, data_val;
    NV_ADR_BLK  *adr_ptr;

    /*
```

```
     * mark each object's flag as not valid
     */
    for (i = 0; i < NUM_OBJECTS; i++)
    {
        /*
         * Call the each object with its starting address
information
         * for the latest support release.
         */
        data_val = NV_NOT_VALID;
        adr_ptr = &Objects[i].rel_nv_start[NUM_SUPPORT_RELS - 1];
        NOVRAM_write(&data_val, adr_ptr->nv_start_adr, 1,
adr_ptr->nv_start_pg);
    }

    /*
     * Novram is now ready for updates
     * update the release and master flag
     */
    data_val = FW_RELEASE;
    if (NOVRAM_write(&data_val, NV_FW_REL_LOC, 1,PAGE_1) == TRUE)
    {
        data_val = NV_UP_TO_DATE;
        NOVRAM_write(&data_val, NV_MASTER_LOC, 1, PAGE_1);
    }
}

/****************************************************************
 *
 * Name: get_inst
 *
 * Description: This function reads the instance number from the
 *              object reauest message
 *
 ****************************************************************/
uchar get_inst(head_ptr)

HEADER  *head_ptr;
{
    uchar inst_num;

    /*
     * Read the instance number form the message and update the
     * data length and pointer. But first check that the message
     * is long enough to hold a instance number.
     */
    if (head_ptr->data_len != 0)
    {
        inst_num = *head_ptr->data_ptr++;
        head_ptr->data_len--;
```

```
        return(inst_num);
    }

    /*
     * value to cause failure on range check
     */
    return(0xff);
}

/****************************************************************
 *
 * Name: OBJ_chk_inst
 *
 * Description: This function check an object request message
 *              for an instance number if one is required
 *
 ****************************************************************/
uchar OBJ_chk_inst(head_ptr, inst_adr)

HEADER  *head_ptr;
uchar   *inst_adr;
{
    uchar max_inst;

    /*
     * If this is an object that has multi-instances then check
the
     * given instance number for a valid range. If the instance
number
     * the do all flag (DO_ALL_INST) then return the maximum
value
     * and
     */
    if (head_ptr->object < NUM_OBJECTS)
    {
        if ((max_inst = Objects[head_ptr->object].max_inst) != 0)
        {
            if ((*inst_adr = get_inst(head_ptr)) == DO_ALL_INST)
            {
                *inst_adr = max_inst;
                return(DO_ALL_INST);
            }
            else if (*inst_adr >= max_inst)
                return(BAD_INST_NUM);
        }
    }
    else if (head_ptr->object != FACTORY_OBJ)
        return(UNKNOWN_OBJ);

    return(NO_ERR);
```

```
}

/*************************************************************
 *
 * Name: OBJ_read_nxt_attr
 *
 * Description: This function reads the next attribute # from a
 *              message. if the message is a set then the value
 *              is also read and written to the provided location
 *
 *************************************************************/
uchar OBJ_read_nxt_attr(head_ptr, val_adr)

HEADER  *head_ptr;
uint    *val_adr;
{
    uchar   read_cnt;
    uchar   attr_num;
    uint    attr_val;

    /*
     * Read the attribute number then if its a set read the value
     */
    if (head_ptr->data_len == 0)
        return(NO_MORE_ATTR);

    attr_num = *head_ptr->data_ptr++;
    read_cnt = 1;

    if ((head_ptr->opcode == SET_CMD) || (head_ptr->opcode ==
HERE_CMD))
    {
        attr_val = *head_ptr->data_ptr++;
        attr_val = ((attr_val << 8) & 0xff00) |
*head_ptr->data_ptr++;
        *val_adr = attr_val;
        read_cnt += 2;
    }

    if (read_cnt > head_ptr->data_len)
        return(NO_MORE_ATTR);
    else
        head_ptr->data_len -= read_cnt;
    return(attr_num);
}

/*************************************************************
 *
 * Name: OBJ_load_attr
 *
```

©P-COM, Inc., 1994

```
 * Description: This function adds an attribute number/value pair
 *              into a message
 *
 ***************************************************************/
void OBJ_load_attr(msg_ptr_adr, attr_num, attr_val)

uchar    **msg_ptr_adr;
uchar    attr_num;
uint     attr_val;
{
    uchar    *msg_ptr;

    /*
     * Load the number followed by the MSB and LSB of the value
     */
    msg_ptr = *msg_ptr_adr;
    *msg_ptr++ = attr_num;

    *msg_ptr++ = ((attr_val>> 8) & 0x00ff);
    *msg_ptr++ = (attr_val & 0x00ff);

    *msg_ptr_adr = msg_ptr;
}
```

OCM.H ©P-COM, Inc., 1994

```
/****************************************************************
 *
 * Description: This file contains the defines for the OCM object
 *
 * $Id: ocm.h 2.1 1993/12/29 10:38:27 MIKEE Exp $
 *
 * $Log: ocm.h $
 * Revision 2.1  1993/12/29  10:38:27  MIKEE
 * covertion
 *
 *
 *    Rev 1.0   01 Nov 1993 12:25:24   mikee
 * Initial revision.
 *
 ****************************************************************/

#ifndef _OCM_H
#define _OCM_H

#define OCM_MUTE_ATTR       0
#define OCM_POWER_ATTR      1
#define OCM_CHAN_ATTR       2
#define OCM_RATE_ATTR       3
#define OCM_AFC_ATTR        4

#endif /* _OCM_H */
```

©P-COM, Inc., 1994

```
#define     BM_SYNTH_PREALM 3

/*
 * defines for major alarm bit map
 */
#define     BM_TX_ALM        0
#define     BM_RX_ALM        1
#define     BM_SYNTH_ALM     2
#define     BM_MISC_ALM      3


extern uchar     ODU_handler(uchar,uchar,uchar *);
extern uchar     ODU_chk_alarms();
extern uchar     ODU_process_attr_cmd();
extern uchar     ODU_chk_telem_alm();
extern uchar     ODU_chk_mute_alm();
extern uchar     ODU_chk_cnfg_alm();
extern uchar     ODU_chk_tx_alm();
extern uchar     ODU_chk_rx_alm();
extern uchar     ODU_chk_synth_alm();
extern uchar     ODU_chk_lpbk();
extern uchar     ODU_chk_misc_alm();
extern uchar     ODU_chk_synth_prealarm();

#endif /* _ODU_H */
```

ODU.H ©P-COM, Inc., 1994

```
/***************************************************************
 *
 * Description: This file contains the defines for the ODU object
 *
 * $Id: odu.h 2.3 1994/03/14 11:49:10 JEFFC Exp $
 *
 * $Log: odu.h $
 * Revision 2.3  1994/03/14  11:49:10  JEFFC
 * rel 2.7
 *
 * Revision 2.2  1994/01/19  14:14:43  JEFFC
 * Added external synth pre-alarm
 *
 * Revision 2.1  1993/12/29  10:38:27  MIKEE
 * covertion
 *
 *
 *    Rev 1.1   01 Nov 1993 12:25:36   mikee
 * new alarms
 *
 *    Rev 1.0   18 Sep 1993 13:55:28   mikee
 * Initial revision.
 **************************************************************/

#ifndef _ODU_H
#define _ODU_H

#define ODU_FW_REV_ATTR      0
#define PLO_ID_ATTR          1
#define RCVR_LEVEL_ATTR      2
#define TEMPERATURE_ATTR     3
#define MINOR_ALM_ATTR       4
#define MAJOR_ALM_ATTR       5
#define TELEM_ALM_ATTR       6
/*
#define ODU_TYPE_ATTR        7

#define NUM_ODU_ATTRS        8
*/

#define NUM_ODU_ATTRS        7

#define DUMP_ATTR            SPECIAL_ATTRS

/*
 * defines for minor alarm bit map
 */
#define    BM_MUTE_ALM     0
#define    BM_TELEM_ALM    1
#define    BM_CNFG_ALM     2
```

RADIO.C ©P-COM, Inc., 1994

```
/****************************************************************
 *
 * Description: This file contains the global radio defines
 *
 * $Id: radio.h 2.3 1994/01/31 14:02:51 JEFFC Exp $
 *
 * $Log: radio.h $
 * Revision 2.3  1994/01/31  14:02:51  JEFFC
 * Added new novram options for Link Manager.
 *
 * Revision 2.2  1994/01/19  14:18:32  JEFFC
 * TLP changes, orderwire changes
 *
 * Revision 2.1  1993/12/29  10:38:28  MIKEE
 * covertion
 *
 *
 *    Rev 1.2   01 Nov 1993 12:26:04   mikee
 * EOW, serial #
 *
 *    Rev 1.1   04 Oct 1993 16:46:50   mikee
 * added new state code
 *
 *    Rev 1.0   18 Sep 1993 13:55:30   mikee
 * Initial revision.
 ***************************************************************/

#ifndef _RADIO_H
#define _RADIO_H

#define URELAYS_ATTR        0
#define LN_TYPE_ATTR        1
#define HW_LINES_ATTR       2
#define NW_ID_ATTR          3
#define FW_REL_ATTR         4
#define EXT_ALM_MAP_ATTR    5          /* ext inputs to alarm on
*/
#define EXT_ALM_SEN_ATTR    6          /* ext inputs alarm sense
*/
#define LINK_MGR1_ATTR      7          /* set if basic link mgr
enabled */
#define RATE_LINES_ATTR     8
#define RELAY1_CNFG_ATTR    9
#define RELAY2_CNFG_ATTR    10
#define RELAY3_CNFG_ATTR    11
#define RELAY4_CNFG_ATTR    12
#define RELAY5_CNFG_ATTR    13
#define LINK_MGR2_ATTR      14         /* set if maint. link mgr
enabled */
#define SERIAL_HI_ATTR      15
```

RADIO.C

©P-COM, Inc., 1994

```
#define SERIAL_LO_ATTR        16
#define NUM_RADIO_ATTRS       17


#define LN_RATE_ATTR          SPECIAL_ATTRS   /* user configurable
line rate */
                                              /* 0- 1 line, 1- 2
lines, */
                                              /* 2- 4 lines,
3-1x6/1x8  */
#define RELAYS_ATTR           SPECIAL_ATTRS+1
#define NOVRAM_ATTR           SPECIAL_ATTRS+2 /* save config */
#define WARM_REBOOT_ATTR      SPECIAL_ATTRS+3
#define ND_SELFTEST_ATTR      SPECIAL_ATTRS+4
#define EXT_INPUTS_ATTR       SPECIAL_ATTRS+5
#define TRACE_ONOFF_ATTR      SPECIAL_ATTRS+6
#define VOLUME_ATTR           (SPECIAL_ATTRS + 7)
#define HSET_CTRL_ATTR        (SPECIAL_ATTRS + 8)
#define EAST_IVOL_ATTR        (SPECIAL_ATTRS + 9)
#define WEST_IVOL_ATTR        (SPECIAL_ATTRS + 10)
#define EAST_OVOL_ATTR        (SPECIAL_ATTRS + 11)
#define WEST_OVOL_ATTR        (SPECIAL_ATTRS + 12)
#define LTIME_MSW_ATTR        (SPECIAL_ATTRS + 13)
#define LTIME_LSW_ATTR        (SPECIAL_ATTRS + 14)
#define FEC_ATTR              (SPECIAL_ATTRS + 15)
#define FEC_BYPASS_ATTR       (SPECIAL_ATTRS + 16)

#define DTMF_TEST_ATTR        (0xf0)   /* !!! remove this when done
testing */
#define TEMP_EAST_IVOL_ATTR (0xf1)   /* !!! remove this when done
testing */
#define TEMP_WEST_IVOL_ATTR (0xf2)   /* !!! remove this when done
testing */
#define TEMP_EAST_OVOL_ATTR (0xf3)   /* !!! remove this when done
testing */
#define TEMP_WEST_OVOL_ATTR (0xf4)   /* !!! remove this when done
testing */

#define MAX_RADIO_ADR   4095

/*
    Orderwire TLP defines
    These defines are the indices into the TLP_Input and
TLP_Output
    arrays which contain the value for 0 dBm.
*/
#define IN_TLP_0_INDEX  14
#define OUT_TLP_0_INDEX 11

#define NUM_TLP_ENTRIES 16
```

RADIO.C

©P-COM, Inc., 1994

```
/*
 * Relay defines
 */
#define N_OPEN          OPEN
#define N_CLOSED        CLOSED
#define RLY_ALARM       0
#define RLY_USER        1
#define RLY_RMT_XI      2
#define RLY_EOW         3

/*
 * States, start at 20 because objects are the first ones
 */
#define PROG_LCA        20
#define MEM_TEST        21
#define EEPROM_TEST     22
#define MODEM_TEST      23
#define RUNNING         24
#define TEST_LCA        25

extern uchar    RADIO_handler(uchar,uchar,uchar *);
extern uchar    RADIO_process_attr_cmd();
extern uchar    RADIO_chk_ext_alms();
extern void     RADIO_dsp_relays(uint);
extern void     RADIO_eow_ring(uchar);

#endif /* _RADIO_H */
```

```
/****************************************************************
 *
 * Description: This file contains the defines for the Remote
 *              radio object
 *
 * $Id: remote.h 2.3 1994/01/31 14:01:52 JEFFC Exp $
 *
 * $Log: remote.h $
 * Revision 2.3  1994/01/31  14:01:52  JEFFC
 * Made attribute naming more consistent.
 *
 * Revision 2.2  1994/01/19  14:20:06  JEFFC
 * Added new attributes
 *
 * Revision 2.1  1993/12/29  10:38:28  MIKEE
 * covertion
 *
 *
 *    Rev 1.1   01 Nov 1993 12:26:26   mikee
 * new alarm attrs
 *
 *    Rev 1.0   18 Sep 1993 13:55:30   mikee
 * Initial revision.
 ***************************************************************/

#ifndef _REMOTE_H
#define _REMOTE_H

#define PEER_ALM_ATTR        0
#define RMT_ALM_ATTR         1
#define RMT_LPBK_ATTR        2    /* LINK LOOPBACK BIT MAP */
#define RMT_EXT_INPUTS_ATTR 3
#define RMT_FW_VERSION_ATTR 4
#define NUM_RMT_ATTRS        5

extern uchar     REMOTE_handler();
extern uchar     REMOTE_process_attr_cmd();
extern uchar     REMOTE_chk_peer_alm();

#endif /* _REMOTE_H */
```

©P-COM, Inc., 1994

```
/****************************************************************
 *
 * Description: This file contains the functions used to support
 *              the Remote radio object
 *
 * $Id: remote.c 2.4 1994/03/14 11:44:40 JEFFC Exp $
 *
 * $Log: remote.c $
 * Revision 2.4  1994/03/14  11:44:40  JEFFC
 * Changed loopback routine to know about pseudo-random loopback
mode.
 *
 * Revision 2.3  1994/01/31  14:00:48  JEFFC
 * Initialized remote firmware release to 2.4 (last rel before
this
 * attribute was added).
 *
 * Revision 2.2  1994/01/19  15:43:41  JEFFC
 * Added new attibutes to be exchanged for firmware release and
external
 * inputs. Changed REMOTE_init() function prototype.
 *
 * Revision 2.1  1993/12/29  10:38:40  MIKEE
 * Conversion
 *
 *    Rev 1.3   17 Dec 1993 06:42:52   mikee
 * fix for link loopback in 4x2 mode
 *
 *    Rev 1.2   01 Nov 1993 11:42:36   mikee
 * update message change
 *
 *    Rev 1.1   04 Oct 1993 12:49:52   mikee
 * removed a2d transfer for now
 *
 *    Rev 1.0   18 Sep 1993 14:03:56   mikee
 * Initial revision.
 ****************************************************************/

#include "sysdefs.h"
#include "sys_msg.h"
#include "sys_time.h"
#include "object.h"
#include "radio.h"
#include "remote.h"
#include "alarm.h"
#include "a2d.h"
#include "odu.h"
#include "novram.h"
#include "line.h"
#include "spm.h"
```

REMOTE.C ©P-COM, Inc., 1994

```
/*
 * External Functions
 */
extern void     UTIL_clr_mem();
extern void     BITMAP_set();
extern uchar    BITMAP_get();

/*
 * Internal Functions
 */
static uchar    rmt_init();
static void     store_rmt_data();
static void     chk_peer_link();
static void     update_rmt();

/*
 * External Data
 */

/*
 * Internal Data
 */
static uint     Rmt_Attr[NUM_RMT_ATTRS];
static uchar    Heard_from_rmt;

/**************************************************************
 *
 * Name: REMOTE_handler()
 *
 * Description: This routine handles the Remote's object events
 *
 **************************************************************/
uchar REMOTE_handler(object, event, cdata_ptr)

uchar   object;
uchar   event;
uchar   *cdata_ptr;
{
    /*
     * switch on the event
     */
    switch(event)
    {
        case INIT_EVENT:
            return rmt_init(cdata_ptr);
            break;
        case TIMER_EVENT:
            if (((uint)cdata_ptr) == CHK_PEER_TIMER)
            {
                MSG_chk_links();        /* pigback the timeout */
```

```
                chk_peer_link();
            }
            else
                update_rmt();
            break;
        case MSG_EVENT:
            if (((HEADER *)cdata_ptr)->opcode == HERE_CMD)
            {
                store_rmt_data(cdata_ptr);
            }
            else

MSG_process_attr_msg((ATTR_CB)REMOTE_process_attr_cmd,
                (HEADER *)cdata_ptr);
            break;
    }
    return(TRUE);
}

/****************************************************************
 *
 * Name: rmt_init
 *
 * Description: This routine sets up the Remote data base
 *
 ****************************************************************/
uchar rmt_init(adr_ptr)

NV_ADR_BLK  *adr_ptr;
{
    UTIL_clr_mem(Rmt_Attr, (NUM_RMT_ATTRS * sizeof(uint)));
    /*
        Releases prior to 2.5 don't send us their versions. If
our peer
        doesn't send its version, assume it is pre-2.5.
    */
    Rmt_Attr[RMT_FW_VERSION_ATTR] = FW_REL_24;

    Heard_from_rmt = FALSE;
    return FALSE;
}

/****************************************************************
 *
 * Name: REMOTE_process_attr_cmd
 *
 * Description: This function handles a command attribute pair
 *
 ****************************************************************/
uchar REMOTE_process_attr_cmd(opcode, attr_num, attr_val_adr,
```

```
inst)

uchar   opcode;
uchar   attr_num;
uint    *attr_val_adr;
uchar   inst;
{
    uchar   status;
    uchar   i;

    status = NO_ERR;

    /*
     * Attributes are divided into no special handling and
special handling
     * groups. If an error is found we stop processing
attributes.
     */
    if (attr_num >= SPECIAL_ATTRS)
    {
        switch(attr_num)
        {
            default:
                status = UNKNOWN_ATTR;
                break;
        }
    }
    else
    {
        /*
         * If GET_CMD then just load the information into the
buffer
         * otherwise have the general attribute function handle
it
         */
        if (opcode == GET_CMD)
            *attr_val_adr = Rmt_Attr[attr_num];
        else if (opcode == SET_CMD)
            status = OBJ_process_attr(opcode, attr_val_adr,
                &Rmt_Attr[attr_num]);
        else
            status = BAD_CMD_ATTR;
    }

    return(status);
}

/*****************************************************************
 *
 * Name: store_rmt_data
```

©P-COM, Inc., 1994

```
 *
 * Description: Save the information send over from the remote
IDU
 *
 ***************************************************************/
void store_rmt_data(head_ptr)
HEADER  *head_ptr;
{
    uint    attr_val;
    uchar   attr_num, status;
    uint    num_lines;
    uchar   i;

    /*
     * First check that the bands do not match. If they do we
     * are in loopback mode and we should dump the data
     */
    ODU_process_attr_cmd(GET_CMD, PLO_ID_ATTR, &attr_val, 0);
    if (attr_val == *head_ptr->data_ptr++)
        return;

    /*
     * Read each attribute from the message
     */
    status = NO_ERR;
    head_ptr->data_len--;
    while (((attr_num = OBJ_read_nxt_attr(head_ptr, &attr_val))
        != NO_MORE_ATTR) && (status == NO_ERR))
    {
        status = REMOTE_process_attr_cmd(SET_CMD, attr_num,
&attr_val, 0);
    }

    /*
     * Check if there has been a change in the link loopback
status
     */
    RADIO_process_attr_cmd(GET_CMD, RATE_LINES_ATTR, &num_lines,
0);
    for (i = 0; i < num_lines; i++)
    {
        attr_val = BITMAP_get(&Rmt_Attr[RMT_LPBK_ATTR], i);
        LINE_process_attr_cmd(SET_CMD, LN_LLP_ATTR, &attr_val,
i);
    }

    Heard_from_rmt = TRUE;
}

/***************************************************************
```

```
 *
 * Name: chk_peer_link
 *
 * Description: Checks that the link to the Remote radio is OK
 *
 *************************************************************/
void chk_peer_link()
{
    uint    attr_val, num_lines;
    uchar   i;

    /*
     * If we have not heard from the ODU then signal an error
     * else clear it
     */
    if (Heard_from_rmt == FALSE)
    {
        /*
         * If this is the first detection of the peer alarm
         * clear any remote loopbacks they may be set
         */
        if (Rmt_Attr[PEER_ALM_ATTR] != TRUE)
        {
            RADIO_process_attr_cmd(GET_CMD, RATE_LINES_ATTR,
&num_lines, 0);
            for (i = 0; i < num_lines; i++)
            {
                attr_val = OFF;
                LINE_process_attr_cmd(SET_CMD, LN_LLP_ATTR,
&attr_val, i);
            }
        }
        Rmt_Attr[PEER_ALM_ATTR] = TRUE;
    }
    else
    {
        Rmt_Attr[PEER_ALM_ATTR] = FALSE;
        Heard_from_rmt = FALSE;
    }
}

/**************************************************************
 *
 * Name: update_rmt
 *
 * Description: Send a message to the Remote with our vital
 *              information
 *
 *************************************************************/
void update_rmt()
```

©P-COM, Inc., 1994

```
{
    uchar   *msg_ptr, *cur_ptr;
    uint    alarm, num_lines;
    uint    lp_map, attr_val;
    uint pseudo_random;
    uchar   i;

    /*
     * Gather and send the information to the remote radio.
     * send even if there is an alarm comm may be working one way
     */
    cur_ptr = msg_ptr = MSG_get_rsp_mem();

    /*
     * send the band first so that loopbacked messages can be
detected
     * and dumped
     */
    ODU_process_attr_cmd(GET_CMD, PLO_ID_ATTR, &attr_val, 0);
    *cur_ptr++ = attr_val;

    /*
     * Sum up the radio's alarms and send to the other side
     */
    alarm = NO_ALARM;
    ALARM_process_attr_cmd(GET_CMD, STATE_ATTR, &attr_val,
IDU_ALM);
    alarm |= attr_val;
    ALARM_process_attr_cmd(GET_CMD, STATE_ATTR, &attr_val,
ODU_ALM);
    alarm |= attr_val;
    ALARM_process_attr_cmd(GET_CMD, STATE_ATTR, &attr_val,
CABLE_ALM);
    alarm |= attr_val;
    OBJ_load_attr(&cur_ptr, RMT_ALM_ATTR, alarm);

    /*
     * See if there are any link loopbacks to tell the other side
about.
     * If not, check to see if pseudo-random is on on the
specified line.
     */
    lp_map = 0;
    RADIO_process_attr_cmd(GET_CMD, RATE_LINES_ATTR, &num_lines,
0);
    SPM_process_attr_cmd(GET_CMD, PRND_LPBK_ATTR, &pseudo_random,
0);
    for (i = 0; i < num_lines; i++)
    {
        LINE_process_attr_cmd(GET_CMD, LN_LKLP_ATTR, &attr_val,
```

```
i);
        if((attr_val == TRUE) || (pseudo_random == (i+1)))
            BITMAP_set(&lp_map, i);
    }
    OBJ_load_attr(&cur_ptr, RMT_LPBK_ATTR, lp_map);

    /*
        Send the Remote External Inputs.
    */
    RADIO_process_attr_cmd(GET_CMD, EXT_INPUTS_ATTR, &attr_val,
0);
    OBJ_load_attr(&cur_ptr, RMT_EXT_INPUTS_ATTR, attr_val);

    /*
        Send the Local IDU's firmware version.
    */
    OBJ_load_attr(&cur_ptr, RMT_FW_VERSION_ATTR,
(uint)FW_RELEASE);

    MSG_bld_msg(TX, INTER_LK_ADR, PEER_LINK, HERE_CMD,
REMOTE_OBJ,
        msg_ptr, (uint)(cur_ptr - msg_ptr));
}

/***************************************************************
 *
 * Name: REMOTE_chk_peer_alm
 *
 * Description: Check if there is a peer link alarm
 *
 ***************************************************************/
uchar REMOTE_chk_peer_alm()
{
    return(Rmt_Attr[PEER_ALM_ATTR]);
}

/***************************************************************
 *
 * Name: REMOTE_chk_alm
 *
 * Description: Check if there is a remote alarm
 *
 ***************************************************************/
uchar REMOTE_chk_alm()
{
    if (Rmt_Attr[RMT_ALM_ATTR] == NO_ALARM)
        return(FALSE);
    else
        return(TRUE);
}
```

©P-COM, Inc., 1994

```
/****************************************************************
 *
 * Description: This file contains functions that handle the
 *              Signal Processing Module (SPM).
 *
 * $Id: spm.c 2.5 1994/03/14 11:37:48 JEFFC Exp $
 *
 * $Log: spm.c $
 * Revision 2.5  1994/03/14  11:37:48  JEFFC
 * Changes for NMS type, pseudo-random.
 *
 * Revision 2.4  1994/01/31  14:00:06  JEFFC
 * Fixed EOW handset volume.
 *
 * Revision 2.3  1994/01/23  22:40:03  JEFFC
 * Added function to return EOW signal sense.
 *
 * Revision 2.2  1994/01/19  15:47:18  JEFFC
 * Added FEC, EOW, synth lock checking, DTMF routines. Changed
EEPOT
 * programming because of marginal timing allowances.
 *
 * Revision 2.1  1993/12/29  10:38:41  MIKEE
 * Conversion to RCS
 *
 *    Rev 1.4   17 Nov 1993 09:52:44   mikee
 * new default tx, rx filter values and fixes to bit rate switch
code
 *
 *    Rev 1.3   01 Nov 1993 11:43:06   mikee
 * new filter default values, EOW, link ID fix
 *
 *    Rev 1.2   05 Oct 1993 18:00:22   mikee
 * swap sense of modem status
 *
 *    Rev 1.1   04 Oct 1993 12:48:56   mikee
 * fixed bugs
 *
 *    Rev 1.0   18 Sep 1993 14:03:58   mikee
 * Initial revision.
 ****************************************************************/

#include "sysdefs.h"
#include "80c196.h"
#include "spm_map.h"
#include "lca_map.h"
#include "message.h"
#include "sys_time.h"
#include "sys_msg.h"
#include "object.h"
```

SPM.C

©P-COM, Inc., 1994

```
#include "sys_nov.h"
#include "radio.h"
#include "spm.h"
#include "fcp.h"
#include "modem.h"
#include "link.h"
#include "line.h"
#include "diag.h"
/*#include "dtmf.h"*/
#include "fact.h"

/*
 * External Functions
 */
extern void     UTIL_clr_mem();
extern void     LINK_read_stats();
extern void     LINE_read_stats();
extern uchar    init_done();
extern uchar    restart();
extern void     Wdt_Tickle();
extern void     fatal_failure();

/*
 * Internal Functions
 */
static uchar    spm_init();
static void     init_lca();
static void     lca_program();
static void     lca_load();
static void     lca_reset();
static uchar    set_filter_abs();
static uchar    set_filter_rel();
static void     read_stats();
static void     check_synth_lock();
static void     txcmd1_funcs();
static void check_nms_type(void);

/*
 * External Data
 */

/*
 * Internal Data
 */
static const uchar rate_to_lines[] =
{
    1,
    2,
    4,
    8,
```

©P-COM, Inc., 1994

```
};
static const uchar tx_tuner_vals[LN_TYPES][NUM_RATES] =
{
    {0x28,0x0c, 0x02, 0x00},
    {0x28,0x0c, 0x02, 0x00},
};

static const uchar rx_tuner_vals[LN_TYPES][NUM_RATES] =
{
    {0x28,0x0c, 0x02, 0x00},
    {0x28,0x0c, 0x02, 0x00},
};
static const uchar Spm_NV_Attr[] =
{
    TX_1FILT_ATTR,
    TX_2FILT_ATTR,
    TX_4FILT_ATTR,
    TX_8FILT_ATTR,
    RX_1FILT_ATTR,
    RX_2FILT_ATTR,
    RX_4FILT_ATTR,
    RX_8FILT_ATTR,
    ODU_PWRON_ATTR,
    NO_MORE_ATTR
};
PORT0_OL     *const port0_ptr = (PORT0_OL*) &ioport0;
register uchar        port1_image;
PORT1_OL     *const port1_ptr = (PORT1_OL*) &port1_image;
register uchar        port2_image;
PORT2_OL     *const port2_ptr = (PORT2_OL*) &port2_image;
register uchar        hsi_image;
HSI_OL       *const hsi_ptr = (HSI_OL*) &hsi_image;
register uchar        telem_wr_image;
TELEM_WR_OL *const telem_wr_ptr = (TELEM_WR_OL*) &telem_wr_image;
register uchar        dnld_wr_image;
DNLD_WR_OL   *const dnld_wr_ptr = (DNLD_WR_OL*) &dnld_wr_image;
register uchar        misc_out_image;
MISC_OUT_OL *const misc_out_ptr = (MISC_OUT_OL*) &misc_out_image;

register uchar        l1_txcmd0_image;
LCA1_TXCMD0_OL *const l1_txcmd0_ptr = (LCA1_TXCMD0_OL*)
&l1_txcmd0_image;
register uchar        l1_txcmd1_image;
LCA1_TXCMD1_OL *const l1_txcmd1_ptr = (LCA1_TXCMD1_OL*)
&l1_txcmd1_image;
register uchar        l1_rxcmd0_image;
LCA1_RXCMD0_OL *const l1_rxcmd0_ptr = (LCA1_RXCMD0_OL*)
&l1_rxcmd0_image;
register uchar        l1_srvchn_image;
LCA1_SRVCHN_OL *const l1_srvchn_ptr = (LCA1_SRVCHN_OL*)
```

©P-COM, Inc., 1994

```
&l1_srvchn_image;
register uchar       l1_gencmd0_image;
LCA1_GENCMD0_OL *const l1_gencmd0_ptr = (LCA1_GENCMD0_OL*)
&l1_gencmd0_image;
register uchar       l1_gencmd1_image;
LCA1_GENCMD1_OL *const l1_gencmd1_ptr = (LCA1_GENCMD1_OL*)
&l1_gencmd1_image;
register uchar       l1_gencmd2_image;
LCA1_GENCMD2_OL *const l1_gencmd2_ptr = (LCA1_GENCMD2_OL*)
&l1_gencmd2_image;
register uchar       l1_gencmd3_image;
LCA1_GENCMD3_OL *const l1_gencmd3_ptr = (LCA1_GENCMD3_OL*)
&l1_gencmd3_image;
register uchar       l1_frmbytelow_image;
uchar *const l1_frmbytelow_ptr = (uchar *) &l1_frmbytelow_image;
register uchar       l1_frmbytehigh_image;
uchar *const l1_frmbytehigh_ptr = (uchar *)
&l1_frmbytehigh_image;

register uchar       l2_control_image;
LCA2_CONTROL_OL *const l2_control_ptr = (LCA2_CONTROL_OL*)
&l2_control_image;

register uchar       exp0_sel_image;
EXP0_SEL_OL     *const exp0_sel_ptr = (EXP0_SEL_OL*)
&exp0_sel_image;
register uchar   ln_wr_image[MAX_LINES];
LN_WR_OL         *const  ln_wr_ptr = (LN_WR_OL*) &ln_wr_image[0];

static uint     Spm_Attr[NUM_SPM_ATTRS];
static uchar    Tx_filter;
static uchar    Rx_filter;
static uchar    First_stat_read;
static uchar    Odu_Lpbk;
static uint     Ber_err_cnt;
static uint     Ber_call_cnt;
static uchar    PR_Lpbk_channel;
static uchar    EW_vol[4];

/***************************************************************
 *
 * Name: SPM_handler()
 *
 * Description: This routine handles the SPM board object events
 *
 ***************************************************************/
uchar SPM_handler(object, event, cdata_ptr)

uchar   object;
uchar   event;
```

©P-COM, Inc., 1994

```
uchar   *cdata_ptr;
{
    HEADER  *head_ptr;

    /*
     * switch on the event
     */
    switch(event)
    {
        case INIT_EVENT:
            return spm_init(cdata_ptr);
            break;
        case SAVE_NV_EVENT:
            return(NOVRAM_save_attrs(object, (NV_ADR_BLK
*)cdata_ptr,
                (uchar *)Spm_NV_Attr,
                (ATTR_CB)SPM_process_attr_cmd, 1));
            break;
        case TIMER_EVENT:
            if (((uint) cdata_ptr) == READ_STATS)
                read_stats();
            else if (((uint) cdata_ptr) ==
CHECK_SYNTH_LOCK_TIMER)
                check_synth_lock();
            break;
        case MSG_EVENT:
            MSG_process_attr_msg((ATTR_CB)SPM_process_attr_cmd,
                (HEADER *)cdata_ptr);
            break;
    }
    return(TRUE);
}

/***************************************************************
 *
 * Name: spm_init()
 *
 * Description: This routine sets up the SPM board
 *
 ***************************************************************/
uchar spm_init(adr_ptr)

NV_ADR_BLK  *adr_ptr;
{
    uchar   i;
    uint    attr_val;

    /*
     * init 80c196 registers
     */
```

```
    hsi_mode = 0x06;              /* 3 negative trans detect 1
positive */
                                  /* hsi inputs */
    if(FACT_is_option(EOW_OPT))
     ioc0 = 0x05;                    /* enable HSI.0 and HSI.1 */
    else
     ioc0 = 0x01;                    /* enable HSI.0 only */

     ioc1 = 0x21;                    /* configure use of pwm,
external interrupt */
                                  /* pin, TXD pin disable
everything else */
     ioc2 = 0x00;

    int_mask = (EXT_INT + SER_PORT_INT + SOFT_TIME_INT +
HSI0_PIN_INT);

    INTERRUPTS_ON;                       /* enable all interrupts
*/

    UTIL_clr_mem(Spm_Attr, (NUM_SPM_ATTRS * sizeof(uint)));
    Spm_Attr[LAST_START_ATTR] = restart();

    /*
     * Initialize the LCAs, program each, then reset them all
     */
    dnld_wr_ptr->lca1_prog = CLR;
    dnld_wr_ptr->lca2_prog = CLR;
    dnld_wr_ptr->lca3_prog = CLR;
    dnld_wr_ptr->lca_rstn = SET;
    dnld_wr_ptr->lcam = LCA_SE_MODE;
    *DNLD_WR_REG = dnld_wr_image;
    lca_program();
    lca_load(TRUE);

    /*
     * Do a read back test on LCAs
     */
    DIAG_state(TEST_LCA);
    if (*LCA1_GENCMD0_REG != l1_gencmd0_image)
        fatal_failure();

    /*
     * Set to defaults tx and rx filters selects, baseband
loopback,
     * rate, and odu power control
     */
    misc_out_ptr->txfilt_csn = SET;
    misc_out_ptr->rxfilt_csn = SET;
    misc_out_ptr->bband_lpbk = CLR;
```

```
    misc_out_ptr->clk_lpbk = CLR;
    misc_out_ptr->txextref = CLR;
    misc_out_ptr->odu_pwron = SET;
    *MISC_OUT_REG = misc_out_image;

    /*
     * setup some
     */
    port1_ptr->regle1 = HIGH;
    port1_ptr->regle2 = HIGH;
    port1_ptr->regle3 = HIGH;
    ioport1 = port1_image;

    /*
     * Set default tuner filter values
     */
    for (i = 0; i < NUM_RATES; i++)
    {
        RADIO_process_attr_cmd(GET_CMD, LN_TYPE_ATTR, &attr_val,
0);
        Spm_Attr[RX_1FILT_ATTR + i] = rx_tuner_vals[attr_val][i];
        Spm_Attr[TX_1FILT_ATTR + i] = tx_tuner_vals[attr_val][i];
    }

    /*
        Go check the for the various data channel options and NMS
options.
    */
    check_nms_type();

    /*
     * Now see if there is anything saved in novram
     */
    if (NOVRAM_restore_attrs(SPM_OBJ, adr_ptr, (uchar
*)Spm_NV_Attr,
        (ATTR_CB)SPM_process_attr_cmd, 1) == FALSE)
    {
    }

    MODEM_init();
    RADIO_process_attr_cmd(GET_CMD, LN_RATE_ATTR, &attr_val, 0);
    SPM_ln_rate(attr_val);
    First_stat_read = TRUE;
    Odu_Lpbk = OFF;
    PR_Lpbk_channel = 0;

    return FALSE;
}

/***************************************************************
```

```
 *
 * Name:        check_nms_type
 *
 * Description: This procedure checks the configured NMS type
 *              and enables or disables channels from the
 *              main MUX depending on what it finds.
 *
 ***************************************************************/
static void check_nms_type(void)
{
    uchar nms_type;
    uint value = 0;

    /*
        Check to see if the Data Channel is enabled. If not,
disable
        it at the MUX.
    */
    if(FACT_is_option(DATA_CH_OPT))
        l1_gencmd2_ptr->auxlcasel = 0;
    else l1_gencmd2_ptr->auxlcasel = 1;

    /*
        Check the NMS type (from NOVRAM) to determine how to
configure
        the NMS UART, and even the MUX.
    */
    nms_type = (FACT_is_option(NMS_TYPE1_OPT) << 3)
             | (FACT_is_option(NMS_TYPE2_OPT) << 2)
             | (FACT_is_option(NMS_TYPE3_OPT) << 1)
             | (FACT_is_option(NMS_TYPE4_OPT));
    switch(nms_type)
        {
        /*
            Type 0: NMS not used.
                    Disable the channel and the NMS UART.
        */
        case 0:     /* NMS not used */
            l1_gencmd2_ptr->nmslcasel = 1;
            MSG_process_attr_cmd(SET_CMD, PORT_ABLE_ATTR, &value,
NMS_PORT1);
            break;

        /*
            Type 1: Use NMS port as a second data channel.
                    Disable the NMS UART.
        */
        case 1:
            l1_gencmd2_ptr->nmslcasel = 0;
            MSG_process_attr_cmd(SET_CMD, PORT_ABLE_ATTR, &value,
```

```
NMS_PORT1);
              break;

          /*
              Type 2: Use NMS port with the P-COM protocol.
                      No action required (this is the default
case).
          */
          case 2:
              l1_gencmd2_ptr->nmslcasel = 0;
              value = 1;
              MSG_process_attr_cmd(SET_CMD, PORT_ABLE_ATTR, &value,
NMS_PORT1);
              break;
          }

     *LCA1_GENCMD2_REG = l1_gencmd2_image;
}

/***************************************************************
 *
 * Name: SPM_process_attr_cmd
 *
 * Description: This function handles a command attribute pair
 *
 ***************************************************************/
uchar SPM_process_attr_cmd(opcode, attr_num, attr_val_adr, inst)

uchar    opcode;
uchar    attr_num;
uint     *attr_val_adr;
uchar    inst;
{
    uchar    status;
    uint     value;
    uchar    line;
    uint num_lines;

    status = NO_ERR;

    /*
     * Attributes are divided into no special handling and
special handling
     * groups. If an error is found we stop processing
attributes.
     */
    if (attr_num >= SPECIAL_ATTRS)
    {
        switch(attr_num)
        {
```

```
            case RESET_LCAS_ATTR:
                if (opcode == RESET_CMD)
                    lca_reset();
                else
                    status = BAD_CMD_ATTR;
                break;
            case REPROG_LCA_ATTR:
                if (opcode == RESET_CMD)
                {
                    lca_program();
                    lca_load(FALSE);
                }
                else
                    status = BAD_CMD_ATTR;
                break;
            case RELOAD_LCA_ATTR:
                if (opcode == RESET_CMD)
                    lca_load(FALSE);
                else
                    status = BAD_CMD_ATTR;
                break;
            case TX_FILT_ATTR:
            case RX_FILT_ATTR:
                switch(opcode)
                {
                    case SET_CMD:
                        status = set_filter_abs(attr_num,
*attr_val_adr);
                        break;
                    case GET_CMD:
                        if (attr_num == RX_FILT_ATTR)
                            *attr_val_adr = Rx_filter;
                        else
                            *attr_val_adr = Tx_filter;
                        break;
                    case INC_CMD:
                        status = set_filter_rel(attr_num, UP,
                            FILT_STEP_VAL);
                        break;
                    case DEC_CMD:
                        status = set_filter_rel(attr_num, DOWN,
                            FILT_STEP_VAL);
                        break;
                    default:
                        status = BAD_CMD_ATTR;
                }
                break;
            case BBAND_LPBK_ATTR:
                if (opcode == GET_CMD)
                    *attr_val_adr = misc_out_ptr->bband_lpbk;
```

```
                else if (opcode == SET_CMD)
                {
                    if (LINK_set_lpbk(LK_BBAND_LPBK,
*attr_val_adr))
                    {
                        misc_out_ptr->bband_lpbk = *attr_val_adr;
                        *MISC_OUT_REG = misc_out_image;
                    }
                    else
                        status = CMD_FAILED;
                }
                else
                    status = BAD_CMD_ATTR;
                break;
            case CLK_LPBK_ATTR:
                if (opcode == GET_CMD)
                    *attr_val_adr = misc_out_ptr->clk_lpbk;
                else if (opcode == SET_CMD)
                {
                    if (LINK_set_lpbk(LK_CLK_LPBK,
*attr_val_adr))
                    {
                        misc_out_ptr->clk_lpbk = *attr_val_adr;
                        *MISC_OUT_REG = misc_out_image;
                    }
                    else
                        status = CMD_FAILED;
                }
                else
                    status = BAD_CMD_ATTR;
                break;
            case ODU_PWRON_ATTR:
                if (opcode == GET_CMD)
                    *attr_val_adr = misc_out_ptr->odu_pwron;
                else if (opcode == SET_CMD)
                {
                    misc_out_ptr->odu_pwron = *attr_val_adr;
                    *MISC_OUT_REG = misc_out_image;
                }
                else
                    status = BAD_CMD_ATTR;
                break;
            case RFIDU_LPBK_ATTR:
                status = MODEM_lpbk(opcode, attr_val_adr);
                break;
            case RFIDU_MUTE_ATTR:
                status = MODEM_mute(opcode, attr_val_adr);
                break;
            case D_SELFTEST_ATTR:
                if (opcode == SET_CMD)
```

```
                    status = DIAG_dest_selftest();
                else
                    status = BAD_CMD_ATTR;
                break;
            case TX_RDATFIL_ATTR:
            case TX_DATINVT_ATTR:
            case TX_FRC_CW_ATTR:
                txcmd1_funcs(opcode, attr_num, attr_val_adr);
                break;
            case RX_ERR_INJ_ATTR:
            case RX_DATINVT_ATTR:
            case RX_FRMINVT_ATTR:
                SPM_rxcmd0_funcs(opcode, attr_num, attr_val_adr);
                break;
            case FRC_RX_MW_ATTR:
                if(opcode == GET_CMD)
                    *attr_val_adr = l1_srvchn_ptr->rxfrcodwmw;
                else if(opcode == SET_CMD)
                    {
                    l1_srvchn_ptr->rxfrcodwmw = (*attr_val_adr ?
1 : 0);
                    *LCA1_SRVCHN_REG = l1_srvchn_image;
                    }
                else status = BAD_CMD_ATTR;
                break;
            case PRND_LPBK_ATTR:
                if(opcode == GET_CMD)
                    *attr_val_adr = PR_Lpbk_channel;
                else if(opcode == SET_CMD)
                    {
                    /*
                        If we are turning off loopback on the old
channel,
                        turn off line loopback for that channel
first.
                    */
                    if(PR_Lpbk_channel && (PR_Lpbk_channel !=
*attr_val_adr))
                        {
                        line = PR_Lpbk_channel - 1;
                        PR_Lpbk_channel = 0;
                        value = LN_LINK_LPBK;
                        LINE_process_attr_cmd(SET_CMD,
LN_CUR_LPBK_ATTR,
                            &value, line);
                        value = OFF;
                        status = LINE_process_attr_cmd(SET_CMD,
LN_LKLP_ATTR,
                            &value, line);
                        if(status != NO_ERR)
```

©P-COM, Inc., 1994

```
                    break;
                }

            RADIO_process_attr_cmd(GET_CMD,
RATE_LINES_ATTR,
                &num_lines, 0);
            if(*attr_val_adr > 0 && *attr_val_adr <=
num_lines)
                {
                /*
                    Turn on line loopback on the new
channel.
                */
                line = *attr_val_adr - 1;
                value = ON;
                status = LINE_process_attr_cmd(SET_CMD,
LN_LKLP_ATTR,
                    &value, line);
                if(status != NO_ERR)
                    break;
                value = LN_LNTEST_LPBK;
                LINE_process_attr_cmd(SET_CMD,
LN_CUR_LPBK_ATTR,
                    &value, line);

                l1_gencmd0_ptr->prgenenbl = 1;
                l1_gencmd0_ptr->prgenclk = 0;
                l1_gencmd0_ptr->fifohfmask = 0;
                l1_gencmd0_ptr->fifohfforce = 0;
                l1_gencmd0_ptr->prrdsel = line;
                l1_gencmd0_ptr->prrdsrc = 0;
                l1_gencmd0_ptr->prlp = 0;
                *LCA1_GENCMD0_REG = l1_gencmd0_image;
                PR_Lpbk_channel = *attr_val_adr;
                }
            else if(*attr_val_adr == 0)
                {
                l1_gencmd0_ptr->prgenenbl = 0;
                *LCA1_GENCMD0_REG = l1_gencmd0_image;
                PR_Lpbk_channel = *attr_val_adr;
                }
            else status = VAL_OO_RANGE;
            }
        else status = BAD_CMD_ATTR;
        break;
    case LCA_LPBK_ATTR:
        if (opcode == GET_CMD)
            *attr_val_adr = l1_rxcmd0_ptr->olp;
        else if (opcode == SET_CMD)
        {
```

```
                    if (LINK_set_lpbk(LK_LCA_LPBK,
*attr_val_adr))
                    {
                        l1_rxcmd0_ptr->olp = *attr_val_adr;
                        *LCA1_RXCMD0_REG = l1_rxcmd0_image;
                    }
                    else
                        status = CMD_FAILED;
                }
                else
                    status = BAD_CMD_ATTR;
                break;
            case ODU_LPBK_ATTR:
                if (opcode == GET_CMD)
                    *attr_val_adr = Odu_Lpbk;
                else if (opcode == SET_CMD)
                {
                    if (LINK_set_lpbk(LK_ODU_LPBK,
*attr_val_adr))
                    {
                        /*
                         * Set the receive inversion bit if
needed
                         */
                        SPM_rxcmd0_funcs(SET_CMD,
RX_DATINVT_ATTR, attr_val_adr);
                        Odu_Lpbk = *attr_val_adr;
                    }
                    else
                        status = CMD_FAILED;
                }
                else
                    status = BAD_CMD_ATTR;
                break;
            default:
                status = UNKNOWN_ATTR;
                break;
        }
    }
    else
    {
        /*
         * If GET_CMD then just load the information into the
buffer
         * otherwise have the general attribute function handle
it
         */
        if (opcode == GET_CMD)
            *attr_val_adr = Spm_Attr[attr_num];
        else if (opcode == SET_CMD)
```

```
            status = OBJ_process_attr(opcode, attr_val_adr,
                &Spm_Attr[attr_num]);
        else
            status = BAD_CMD_ATTR;
    }

    NOVRAM_chk_updt_needed(opcode, attr_num, status, (uchar
*)Spm_NV_Attr);

    return(status);
}

/***************************************************************
 *
 * Name: txcmd1_funcs
 *
 * Description: This routine sets some of the transmit functions
 *
 ***************************************************************/
void txcmd1_funcs(opcode, attr_num, attr_val_adr)

uchar   opcode;
uchar   attr_num;
uint    *attr_val_adr;
{
    if (opcode == SET_CMD)
    {
        switch (attr_num)
        {
            case TX_RDATFIL_ATTR:
                l1_txcmd1_ptr->txrnddatfill = *attr_val_adr;
                break;
            case TX_DATINVT_ATTR:
                l1_txcmd1_ptr->txdatainvert = *attr_val_adr;
                break;
            case TX_FRC_CW_ATTR:
                l1_txcmd1_ptr->txfrccw = *attr_val_adr;
                break;
        }
        *LCA1_TXCMD1_REG = l1_txcmd1_image;
    }
    else
    {
        switch (attr_num)
        {
            case TX_RDATFIL_ATTR:
                *attr_val_adr = l1_txcmd1_ptr->txrnddatfill;
                break;
            case TX_DATINVT_ATTR:
                *attr_val_adr = l1_txcmd1_ptr->txdatainvert;
```

©P-COM, Inc., 1994

```
                break;
            case TX_FRC_CW_ATTR:
                *attr_val_adr = l1_txcmd1_ptr->txfrccw;
                break;
        }
    }
}

/*************************************************************
 *
 * Name: SPM_rxcmd0_funcs
 *
 * Description: This routine sets some of the receive functions
 *
 *************************************************************/
void SPM_rxcmd0_funcs(opcode, attr_num, attr_val_adr)

uchar   opcode;
uchar   attr_num;
uint    *attr_val_adr;
{
    if (opcode == SET_CMD)
    {
        switch (attr_num)
        {
            case RX_ERR_INJ_ATTR:
                l1_rxcmd0_ptr->errinj = *attr_val_adr;
                break;
            case RX_DATINVT_ATTR:
                l1_rxcmd0_ptr->rxdatainvert = *attr_val_adr;
                break;
            case RX_FRMINVT_ATTR:
                l1_rxcmd0_ptr->rxfrmdatinv = *attr_val_adr;
                break;
        }
        *LCA1_RXCMD0_REG = l1_rxcmd0_image;
    }
    else
    {
        switch (attr_num)
        {
            case RX_ERR_INJ_ATTR:
                *attr_val_adr = l1_rxcmd0_ptr->errinj;
                break;
            case RX_DATINVT_ATTR:
                *attr_val_adr = l1_rxcmd0_ptr->rxdatainvert;
                break;
            case RX_FRMINVT_ATTR:
                *attr_val_adr = l1_rxcmd0_ptr->rxfrmdatinv;
                break;
```

```
        }
    }
}

/***************************************************************
 *
 * Name: SPM_set_relay
 *
 * Description: This function turns the relays on and off
 *
 ***************************************************************/
void SPM_set_relay(relay_num, value)

uchar   relay_num;
uchar   value;
{
    /*
     * Turn the relay closed or open
     */
    if (value == CLOSED)
    {
        if ((telem_wr_ptr->relays & Bit_Mask[relay_num]) == 0)
            telem_wr_ptr->relays |= Bit_Mask[relay_num];
    }
    else
    {
        if ((telem_wr_ptr->relays & Bit_Mask[relay_num]) != 0)
            telem_wr_ptr->relays &= (~Bit_Mask[relay_num]);
    }
    *TELEM_WR_REG = telem_wr_image;
}

/***************************************************************
 *
 * Name: SPM_get_relays
 *
 * Description: This function returns the relays
 *
 ***************************************************************/
uchar SPM_get_relays()

{
    return(telem_wr_ptr->relays);
}

/***************************************************************
 *
 * Name: SPM_avsel(select)
 *
 * Description: This function set the analog select port
```

```
 *
 ****************************************************************/
void SPM_avsel(select)

uchar select;
{

    telem_wr_ptr->avsel = select;
    *TELEM_WR_REG = telem_wr_image;
}

/****************************************************************
 *
 * Name: set_filter_abs(tx_rx, value)
 *
 * Description: This function sets TX and RX filter tuner to the
 *              given value (0-99).
 *
 ****************************************************************/
uchar set_filter_abs(tx_rx, value)

uchar tx_rx;
uchar value;
{
    uchar i;

    /*
     * A 100 step EEPOT is used for tuning
     */
    if (value >= MAX_EEPOT_STEP)
        return(VAL_OO_RANGE);

    /*
     * Select the EEPOT, set the direction down, step to the
bottom, then
     * go up til we get to the given value.
     */
    if (tx_rx == RX_FILT_ATTR)
        misc_out_ptr->rxfilt_csn = LOW;
    else
        misc_out_ptr->txfilt_csn = LOW;
    *MISC_OUT_REG = misc_out_image;

    /*
     * Set the EEPOT direction down
     */
    port2_ptr->e2_ud_sdi = LOW;
    ioport2 = port2_image;
    US_WAIT(3);
```

```
    /*
     * The EEPOT takes one step each time its held low for 1us
then it
     * must be high for 3us before the next time.
     */
    for (i = 0; i < MAX_EEPOT_STEP; i++)
    {
        port2_ptr->e2_s_clk = LOW;
        ioport2 = port2_image;
        US_WAIT(1);
        port2_ptr->e2_s_clk = HIGH;
        ioport2 = port2_image;
        US_WAIT(3);
    }

    /*
     * Set the EEPOT direction up
     */
    port2_ptr->e2_ud_sdi = HIGH;
    ioport2 = port2_image;
    US_WAIT(3);

    /*
     * The EEPOT takes one step each time its held low for 1us
then it
     * must be high for 3us before the next time.
     */
    for (i = 0; i < value; i++)
    {
        port2_ptr->e2_s_clk = LOW;
        ioport2 = port2_image;
        US_WAIT(1);
        port2_ptr->e2_s_clk = HIGH;
        ioport2 = port2_image;
        US_WAIT(3);
    }

    if (tx_rx == RX_FILT_ATTR)
    {
        misc_out_ptr->rxfilt_csn = HIGH;
        Rx_filter = value;
    }
    else
    {
        misc_out_ptr->txfilt_csn = HIGH;
        Tx_filter = value;
    }
    *MISC_OUT_REG = misc_out_image;

    return(NO_ERR);
```

```
}

/************************************************************
 *
 * Name: set_filter_rel(tx_rx, direction, amount)
 *
 * Description: This function moves TX and RX filter tuner in the
 *              given direction by the relative amount
 *
 ************************************************************/
uchar set_filter_rel(tx_rx, direction, amount)

uchar tx_rx;
uchar direction;
uchar amount;
{
    uchar tmp_filter;
    uchar i;

    /*
     * A 100 step EEPOT is used for tuning
     */
    if ((amount < 1) || (amount >= MAX_EEPOT_STEP))
        return(VAL_OO_RANGE);

    /*
     * Select the EEPOT, set the direction, step the given amount
     */
    if (tx_rx == RX_FILT_ATTR)
    {
        misc_out_ptr->rxfilt_csn = LOW;
        tmp_filter = Rx_filter;
    }
    else
    {
        misc_out_ptr->txfilt_csn = LOW;
        tmp_filter = Tx_filter;
    }
    *MISC_OUT_REG = misc_out_image;

    /*
     * Set the EEPOT direction up or down
     */
    if (direction == DOWN)
    {
        port2_ptr->e2_ud_sdi = LOW;
        if (amount > tmp_filter)
        {
            amount = tmp_filter;
            tmp_filter = 0;
```

```
        }
        else
            tmp_filter -= amount;
    }
    else
    {
        port2_ptr->e2_ud_sdi = HIGH;
        if ((amount + tmp_filter) >= MAX_EEPOT_STEP)
        {
            amount = MAX_EEPOT_STEP - tmp_filter - 1;
            tmp_filter = MAX_EEPOT_STEP - 1;
        }
        else
            tmp_filter += amount;
    }

    ioport2 = port2_image;
    US_WAIT(3);

    /*
     * The EEPOT takes one step each time its held low for 1us
then it
     * must be high for 3us before the next time.
     */
    for (i = 0; i < amount; i++)
    {
        port2_ptr->e2_s_clk = LOW;
        ioport2 = port2_image;
        US_WAIT(1);
        port2_ptr->e2_s_clk = HIGH;
        ioport2 = port2_image;
        US_WAIT(3);
    }

    if (tx_rx == RX_FILT_ATTR)
    {
        misc_out_ptr->rxfilt_csn = HIGH;
        Rx_filter = tmp_filter;
    }
    else
    {
        misc_out_ptr->txfilt_csn = HIGH;
        Tx_filter = tmp_filter;
    }
    *MISC_OUT_REG = misc_out_image;

    return(NO_ERR);
}

/*****************************************************************
```

```
 *
 * Name: init_lca
 *
 * Description: This routine sets up the given lca
 *
 ***************************************************************/
void init_lca(lca_num)

uchar   lca_num;
{
    uchar   i;

    /*
     * Need to set the progam bit high wait 500us and check
     * to see if it is done. If the init bit is low that
indicates
     * a program failure. If not done wait 500us more and then if
not
     * done it is a failure.
     * Keep retrying forever what else could we do
     */
    i = 0;
    while(TRUE)
    {
        dnld_wr_image |= Bit_Mask[lca_num];
        *DNLD_WR_REG = dnld_wr_image;

        MS_WAIT(250);
        MS_WAIT(250);
        if ((LCA_ERROR(lca_num) == FALSE) && (LCA_DONE(lca_num)
== TRUE))
            return;

        /*
         * Try again
         */
        Wdt_Tickle();
        dnld_wr_image &= (~Bit_Mask[lca_num]);
        *DNLD_WR_REG = dnld_wr_image;

        if (++i == 5)                                   /* tell user
*/
            FCP_set_led(IDU_LED_ATTR, RED_LED);
    }
}

/****************************************************************
 *
 * Name: SYS_e2rcv_ack()
 *
```

©P-COM, Inc., 1994

```
 * Description: This function returns the EEPROM results field
 *
 ***************************************************************/
uchar SYS_e2rcv_ack()
{
    uchar   result ;

   /*
    * New version returns result
    * Returns TRUE if ACK and FALSE otherwise
    */
    SYS_e2data(SET);
    SYS_e2clk(SET);
    SYS_e2clk(SET);
    result = EE_RESULTS();
    SYS_e2clk(CLR);

    return(result);
}

/***************************************************************
 *
 * Name: SYS_e2clk
 *
 * Description: This routine sets/clears the EEPROM clock bit
 *
 ***************************************************************/
void SYS_e2clk(flag)

uchar flag;
{
   port2_ptr->e2_s_clk = flag;
   ioport2 = port2_image;
}

/***************************************************************
 *
 * Name: SYS_e2data
 *
 * Description: This routine write a bit to EEPROM
 *
 ***************************************************************/
void SYS_e2data(bit_data)

uchar bit_data;
{
   port1_ptr->e2_dta = bit_data;
   ioport1 = port1_image;
}
```

©P-COM, Inc., 1994

```
/****************************************************************
 *
 * Name: SYS_e2data
 *
 * Description: This routine write a bit to EEPROM
 *
 ****************************************************************/
uchar SYS_get_e2data()

{
   return(EE_DATA_BIT());
}

/****************************************************************
 *
 * Name: lca_program()
 *
 * Description: This routine programs the lca's on the SPM board
 *
 ****************************************************************/
void lca_program()
{
    /*
     * program each, then reset them all
     */
    DIAG_state(PROG_LCA);

    init_lca(MMUX_LCA);
/* ??? use radio attributes
    if (RADIO_option_on(FEC_OPT))
        init_lca(FEC_LCA);
    if (RADIO_option_on(SDATA_OPT))
        init_lca(SDATA_LCA);
*/

    lca_reset();
}

/****************************************************************
 *
 * Name: lca_reset()
 *
 * Description: This routine resets the lca's on the SPM board
 *
 ****************************************************************/
void lca_reset()
{
    /*
     * reset them all
     */
```

©P-COM, Inc., 1994

```
    dnld_wr_ptr->lca_rstn = CLR;
    *DNLD_WR_REG = dnld_wr_image;
    dnld_wr_ptr->lca_rstn = SET;
    *DNLD_WR_REG = dnld_wr_image;
}

/*************************************************************
 *
 * Name: lca_load(init_flag)
 *
 * Description: This routine leads the registers of the lca's
 *              on the SPM board
 *
 *************************************************************/
void lca_load(init_flag)

uchar   init_flag;
{
    /*
     * Initialize the LCA registers to their default values
     */
    if (init_flag == TRUE)
    {
        l1_txcmd0_image = 0;
        l1_txcmd1_image = 0;
        l1_txcmd1_ptr->txrnddatfill = SET;
        l1_rxcmd0_image = 0;
        l1_rxcmd0_ptr->rxfrmdatinv = SET;
        l1_srvchn_image = 0;
        l1_srvchn_ptr->eleadmask = CLR;
        l1_srvchn_ptr->mleadmask = SET;
        l1_gencmd0_image = 0;
        l1_gencmd1_image = 0;
        l1_gencmd1_ptr->scrmasyn_frm = SET;
        l1_gencmd2_image = 0;
        l1_gencmd2_ptr->rxfrmthrs = LCA1_REACQ_AFTER10;
        l1_frmbytelow_image = 0;
        l1_frmbytehigh_image = 0;
    }

    *LCA1_TXCMD0_REG = l1_txcmd0_image;
    *LCA1_TXCMD1_REG = l1_txcmd1_image;
    *LCA1_RXCMD0_REG = l1_rxcmd0_image;
    *LCA1_SRVCHN_REG = l1_srvchn_image;
    *LCA1_GENCMD0_REG = l1_gencmd0_image;
    *LCA1_GENCMD1_REG = l1_gencmd1_image;
    *LCA1_GENCMD2_REG = l1_gencmd2_image;
    *LCA1_FRMBYTELOW_REG = l1_frmbytelow_image;
    *LCA1_FRMBYTEHIGH_REG = l1_frmbytehigh_image;
```

©P-COM, Inc., 1994

```
    Spm_Attr[LCA1_REL_ATTR] = *LCA1_TXSTAT0_REG;
}

/************************************************************
 *
 * Name: SPM_ln_rate(value)
 *
 * Description: This function set the link rate given # of lines
 *
 ***********************************************************/
uint SPM_ln_rate(value)

uchar   value;
{
    uint    attr_val, attr_val2;
    uint    new_num, old_num;
    uchar   i, start_ln, end_ln;

    /*
     * Set the rate unless this is a request for the current
setting
     */
    if (value != GET_LN_RATE)
    {
        /*
         * check that the hardware can support the given line
rate
         */
        RADIO_process_attr_cmd(GET_CMD, HW_LINES_ATTR, &attr_val,
0);
        new_num = rate_to_lines[value];
        if (new_num > attr_val)
            return(misc_out_ptr->rate);


        misc_out_ptr->rate = value;
        *MISC_OUT_REG = misc_out_image;

        set_filter_abs(RX_FILT_ATTR,
            Spm_Attr[RX_1FILT_ATTR + value]);
        set_filter_abs(TX_FILT_ATTR,
            Spm_Attr[TX_1FILT_ATTR + value]);

        RADIO_process_attr_cmd(GET_CMD, LN_TYPE_ATTR, &attr_val,
0);
        if (attr_val == E1_LINE)
            l1_gencmd1_ptr->mode = LCA1_MODE_E1_BASE + value;
        else
            l1_gencmd1_ptr->mode = value;
        *LCA1_GENCMD1_REG = l1_gencmd1_image;
```

©P-COM, Inc., 1994

```
        /*
         * Set the new number of active lines then activate the
newly
         * available ones or deactive the newly unavailable ones
         */
        RADIO_process_attr_cmd(GET_CMD, RATE_LINES_ATTR,
&old_num, 0);
        RADIO_process_attr_cmd(SET_CMD, RATE_LINES_ATTR,
&new_num, 0);
        if (init_done() == TRUE)
        {
            if (new_num > old_num)
            {
                start_ln = old_num;
                end_ln = new_num;
                attr_val = TRUE;
                attr_val2 = FALSE;
            }
            else
            {
                start_ln = new_num;
                end_ln = old_num;
                attr_val = FALSE;
                attr_val2 = TRUE;
            }
            for (i = start_ln; i < end_ln; i++)
            {
                LINE_process_attr_cmd(SET_CMD, LN_ENABLE_ATTR,
&attr_val, i);
                LINE_process_attr_cmd(SET_CMD, LN_FR_AIS_ATTR,
&attr_val2, i);

                /*
                 * Force novram update for line object
                 */
                LINE_handler(LINE_OBJ, SAVE_NV_EVENT,
                    (uchar *)OBJ_get_nv_adr(LINE_OBJ));
            }
        }

        /*
         * Reset LCA tx and rx functions
         */
        l1_txcmd1_ptr->txclrfcn = SET;
        *LCA1_TXCMD1_REG = l1_txcmd1_image;
        l1_txcmd1_ptr->txclrfcn = CLR;
        *LCA1_TXCMD1_REG = l1_txcmd1_image;
        l1_rxcmd0_ptr->rxclrfcn = SET;
        *LCA1_RXCMD0_REG = l1_rxcmd0_image;
        l1_rxcmd0_ptr->rxclrfcn = CLR;
```

```
        *LCA1_RXCMD0_REG = l1_rxcmd0_image;

        MODEM_set_rate();
    }

    return(misc_out_ptr->rate);
}

/****************************************************************
 *
 * Name: SPM_em_lead_force
 *
 * Description: This routine handles request to modify the state
 *              of the E and M leads
 *
 ****************************************************************/
void SPM_em_lead_force(lead, flag)

uchar   lead;
uchar   flag;
{
    /*
     * Turn on/off the lead force bits to force the E&M leads on
or off.
     */
    if (lead == E_LEAD)
        l1_srvchn_ptr->eleadforce = flag;
    else
        l1_srvchn_ptr->mleadforce = flag;

    *LCA1_SRVCHN_REG = l1_srvchn_image;
}

/****************************************************************
 *
 * Name: SPM_em_lead_sense
 *
 * Description: This routine reads the sense of the E and M
leads.
 *
 ****************************************************************/
uchar SPM_em_lead_sense(lead)

uchar   lead;
{
    /*
        Read the specified sense bit.
    */
    if (lead == E_LEAD)
        return (LCA1_SRVCHN_PTR->eleadstat ? 1 : 0);
```

```
    else
        return (LCA1_SRVCHN_PTR->mleadstat ? 1 : 0);
}

/*************************************************************
 *
 * Name: read_stats
 *
 * Description: This function reads the boards stats
 *
 *************************************************************/
void read_stats()

{
    uchar   read1, read2, read3;

    /*
     * Clear the stats on first pass
     */
    if (First_stat_read == TRUE)
    {
        l1_rxcmd0_ptr->rxclrallstat = SET;
        *LCA1_RXCMD0_REG = l1_rxcmd0_image;
        l1_rxcmd0_ptr->rxclrallstat = CLR;
        *LCA1_RXCMD0_REG = l1_rxcmd0_image;
        l1_txcmd1_ptr->txclrallstat = SET;
        *LCA1_TXCMD1_REG = l1_txcmd1_image;
        l1_txcmd1_ptr->txclrallstat = CLR;
        *LCA1_TXCMD1_REG = l1_txcmd1_image;

        Ber_err_cnt = 0;
        Ber_call_cnt = 0;
        Spm_Attr[PR_ERR_CNT_ATTR] = 0;
        First_stat_read = FALSE;
    }
    else
    {
        LINE_read_stats();
        LINK_read_stats();

        /*
         * Read counter 3 times and pick the common value. This
         * is case of value changing during the read.
         * Code is this way to mimimize time between read and
clear
         */
        INTERRUPTS_OFF;

        read1 = *LCA1_SIGERRCNT_REG;
        read2 = *LCA1_SIGERRCNT_REG;
```

```
        read3 = *LCA1_SIGERRCNT_REG;

        /*
            Read the Pseudo-Random Loopback error bit. If it is
set,
            increment the error counter.
        */
        if(LCA1_TXSTAT1_PTR->prfaildet)
            Spm_Attr[PR_ERR_CNT_ATTR]++;

        /*
         * Reset LCA stats
         */
        l1_rxcmd0_ptr->rxclrallstat = SET;
        *LCA1_RXCMD0_REG = l1_rxcmd0_image;
        l1_rxcmd0_ptr->rxclrallstat = CLR;
        *LCA1_RXCMD0_REG = l1_rxcmd0_image;
        l1_txcmd1_ptr->txclrallstat = SET;
        *LCA1_TXCMD1_REG = l1_txcmd1_image;
        l1_txcmd1_ptr->txclrallstat = CLR;
        *LCA1_TXCMD1_REG = l1_txcmd1_image;

        INTERRUPTS_ON;

        /*
         * If 1 = 3 use 1 else if 2 = 3 use 3 else 2 is most
likely the
         * bad value so use 3.
         */
        if (read1 == read2)
            Ber_err_cnt += read1;
        else
            Ber_err_cnt += read3;
        /*
         * This routine is called every 25ms. Every 4th time
(100ms)
         * call the functions to calculate the BER
         */
        if (++Ber_call_cnt >= 4)
        {
            LINK_calc_ber(Ber_err_cnt);
            Ber_err_cnt = 0;
            Ber_call_cnt = 0;
        }
    }
}

/*****************************************************************
 *
 * Name: check_synth_lock
```

©P-COM, Inc., 1994

```
 *
 * Description: This routine checks to see if the synthesizer
 *              is locked; if not, it reprograms it.
 *
 **************************************************************/
static void check_synth_lock()
{
    if(MODEM_synth_alm())
        MODEM_init();
}

/**************************************************************
 *
 * Name: SPM_modem_send
 *
 * Description: This routine sends data to the RF modem board
 *
 **************************************************************/
void SPM_modem_send(data, msb_mask, latch)

ulong   data;
ulong   msb_mask;
uchar   latch;
{
    uchar   i;
    uchar   bit;

    /*
     * First the data must be inverted then start shifting and
clocking it.
     * data also must go out MSB first so the msb_mask parameter
indicates
     * the bit that first goes out.
     */
    data = ~data;

    while (msb_mask != 0)
    {
        /*
         * put the data out
         */
        bit = ((data & msb_mask) != 0);
        port2_ptr->e2_ud_sdi = bit;
        ioport2 = port2_image;

        /*
         * clock the data out
         */
        port2_ptr->e2_s_clk = HIGH;
        ioport2 = port2_image;
```

```
        msb_mask = (msb_mask >> 1);

        port2_ptr->e2_s_clk = LOW;
        ioport2 = port2_image;
    }

    /*
     * Now throw the latch to trigger read
     */
    port1_image &= latch;        /* Low */
    ioport1 = port1_image;

    port1_image |= ~latch;       /* High */
    ioport1 = port1_image;

    port2_ptr->e2_s_clk = HIGH;     /* leave the clock HIGH when
done */
    ioport2 = port2_image;
}

/***************************************************************
 *
 * Name: SPM_modem_read
 *
 * Description: This function read the RF modem's status register
 *
 ***************************************************************/
uchar SPM_modem_read(latch)

uchar   latch;
{
    uchar   i;
    uchar   data;

    /*
     * Throw the latch to trigger data read
     */
    port1_image |= ~latch;              /* high */
    ioport1 = port1_image;
    port1_image &= latch;               /* low */
    ioport1 = port1_image;
    port2_ptr->e2_s_clk = HIGH;
    ioport2 = port2_image;

    /*
     * Clock and shift data out
     */
    for (i = 0; i < MD_CMD_LEN; i++)
    {
        data = (data << 1);
```

```
        data = (data | port0_ptr->sdo);

        port2_ptr->e2_s_clk = LOW;
        ioport2 = port2_image;
        port2_ptr->e2_s_clk = HIGH;
        ioport2 = port2_image;
    }

    Spm_Attr[MODEM_STAT_ATTR] = data;

    return(data);

}

/*************************************************************
 *
 * Name: SPM_ln_fifo_able
 *
 * Description: This routine enable/disable the line fifo
 *
 *************************************************************/
void SPM_ln_fifo_able(line_num, flag)

uchar   line_num;
uchar   flag;
{
    if (flag == TRUE)
        LCA1_FIFOENABLE(l1_txcmd0_image, line_num);
    else
        LCA1_FIFODISABLE(l1_txcmd0_image, line_num);

    *LCA1_TXCMD0_REG = l1_txcmd0_image;
}


/*************************************************************
 *
 * Name: SPM_set_link_id
 *
 * Description: This routine sets the link id in the mux lca
 *
 *************************************************************/
void SPM_set_link_id(link_id)

uint    link_id;
{
    uchar   old_low, old_high;

    old_low = l1_frmbytelow_image;
    old_high = l1_frmbytehigh_image;
```

©P-COM, Inc., 1994

```
    l1_frmbytelow_image = (link_id & 0x00ff);
    l1_frmbytehigh_image = (link_id >> 8) & 0x00ff;
    *LCA1_FRMBYTELOW_REG = l1_frmbytelow_image;
    *LCA1_FRMBYTEHIGH_REG = l1_frmbytehigh_image;

    /*
     * If the link id has changing reset the tx and rx sides to
cause
     * them to unlock. This is to fix a hardware bug
     */
    if ((old_low != l1_frmbytelow_image) || (old_high !=
l1_frmbytehigh_image))
    {
        /*
         * Reset LCA tx and rx functions
         */
        l1_txcmd1_ptr->txclrfcn = SET;
        *LCA1_TXCMD1_REG = l1_txcmd1_image;
        l1_txcmd1_ptr->txclrfcn = CLR;
        *LCA1_TXCMD1_REG = l1_txcmd1_image;
        l1_rxcmd0_ptr->rxclrfcn = SET;
        *LCA1_RXCMD0_REG = l1_rxcmd0_image;
        l1_rxcmd0_ptr->rxclrfcn = CLR;
        *LCA1_RXCMD0_REG = l1_rxcmd0_image;
    }
}

/*****************************************************************
 *
 * Name: SPM_ln_ais
 *
 * Description: This routine forces ais on the given line
 *
 *****************************************************************/
uint SPM_ln_ais(cmd, line_num, flag)

uchar   cmd;
uchar   line_num;
uchar   flag;
{
    if (cmd == SET_CMD)
    {
        if (flag == LCA1_GET_AIS(l1_txcmd0_image, line_num))
            return(flag);

        if (flag == TRUE)
            LCA1_FORCE_AIS(l1_txcmd0_image, line_num);
        else
            LCA1_CLEAR_AIS(l1_txcmd0_image, line_num);
```

©P-COM, Inc., 1994

```
        *LCA1_TXCMD0_REG = l1_txcmd0_image;
    }

    return(LCA1_GET_AIS(l1_txcmd0_image, line_num));
}

/***************************************************************
 *
 * Name: SPM_orderwire_init()
 *
 * Description: This routine sets up the orderwire board
 *
 ***************************************************************/
void SPM_orderwire_init()

{
    /*
     * Initialize the orderwire card
     */
    exp0_sel_ptr->epot0N = SET;
    exp0_sel_ptr->epot1N = SET;
    exp0_sel_ptr->epot2N = SET;
    exp0_sel_ptr->epot3N = SET;
    exp0_sel_ptr->hseten = CLR;
    exp0_sel_ptr->buzzer = CLR;
    exp0_sel_ptr->codecen = SET;
    exp0_sel_ptr->phnbrdg = CLR;
    *EXP0_SEL_REG = exp0_sel_image;

    SPM_prog_handset(HSET_CTRL, HSET_STANDARD_A);

    /*
        Initialize the DTMF chip and routines.
    */
/*
    DTMF_init();
*/
}

/***************************************************************
 *
 * Name: SPM_prog_handset
 *
 * Description: This routine sends command to the handset
interface
 *              chip.
 *
 ***************************************************************/
void SPM_prog_handset(cmd_type, data)
```

©P-COM, Inc., 1994

```
uchar   cmd_type;
uchar   data;
{
    uchar   i;
    uchar   bit;

    /*
     * set data enable high
     */
    exp0_sel_ptr->hseten = SET;
    *EXP0_SEL_REG = exp0_sel_image;
    US_WAIT(1);

    /*
     * Send out the data followed by the command type.
     *
     */
    if(cmd_type == HSET_VOL)
        data <<= 1;
    data |= cmd_type;
    for (i = 0; i < HSET_DATA_LEN+1; i++)
    {
        /*
         * put the data out
         */
        bit = ((data & Bit_Mask[i]) != 0);
        port2_ptr->e2_ud_sdi = bit;
        ioport2 = port2_image;
        US_WAIT(1);

        /*
         * clock the data out
         */
        port2_ptr->e2_s_clk = LOW;
        ioport2 = port2_image;
        US_WAIT(1);

        port2_ptr->e2_s_clk = HIGH;
        ioport2 = port2_image;
        US_WAIT(1);
    }

    /*
     * Now throw the latch to trigger read
     */
    exp0_sel_ptr->hseten = CLR;
    *EXP0_SEL_REG = exp0_sel_image;
}

/****************************************************************
```

SPM.C ©P-COM, Inc., 1994

```
 *
 * Name: SPM_set_tlp_abs(eepot_num, value)
 *
 * Description: This function sets the orderwire TLP EEPOT to the
 *              given value (0-100).
 *
 ************************************************************/
void SPM_set_tlp_abs(eepot_num, value)

uchar eepot_num;
uchar value;
{
    uchar i;
    uchar installed;

    /*
     * Select the EEPOT, set the direction down, step to the
bottom, then
     * go up til we get to the given value.
     */
    exp0_sel_image &= ~Bit_Mask[eepot_num];
    *EXP0_SEL_REG = exp0_sel_image;

    /*
     * Set the EEPOT direction down
     */
    port2_ptr->e2_ud_sdi = LOW;
    ioport2 = port2_image;
    US_WAIT(3);

    /*
     * The EEPOT takes one step each time its held low for 1us
then it
     * must be high for 3us before the next time.
     */
    for (i = 0; i < MAX_EEPOT_STEP; i++)
    {
        port2_ptr->e2_s_clk = LOW;
        ioport2 = port2_image;
        US_WAIT(1);
        port2_ptr->e2_s_clk = HIGH;
        ioport2 = port2_image;
        US_WAIT(3);
    }

    /*
     * Set the EEPOT direction up
     */
    port2_ptr->e2_ud_sdi = HIGH;
    ioport2 = port2_image;
```

```
    US_WAIT(3);

    /*
     * The EEPOT takes one step each time its held low for 1us
then it
     * must be high for 3us before the next time.
     */
    for (i = 0; i < value; i++)
    {
        port2_ptr->e2_s_clk = LOW;
        ioport2 = port2_image;
        US_WAIT(1);
        port2_ptr->e2_s_clk = HIGH;
        ioport2 = port2_image;
        US_WAIT(3);
    }

    exp0_sel_image |= Bit_Mask[eepot_num];
    *EXP0_SEL_REG = exp0_sel_image;
}

/*****************************************************************
 *
 * Name: SPM_set_tlp_rel(attr_num, direction, amount)
 *
 * Description: This function moves the orderwire TLP in the
 *              given direction by the relative amount.
 *
 *****************************************************************/
void SPM_set_tlp_rel(eepot_num, direction, amount)

uchar eepot_num;
uchar direction;
uchar amount;
{
    uchar i;

    /*
     * Select the EEPOT, set the direction, step the given amount
     */
    exp0_sel_image &= ~Bit_Mask[eepot_num];
    *EXP0_SEL_REG = exp0_sel_image;

    /*
     * Set the EEPOT direction up or down
     */
    if (direction == DOWN)
        port2_ptr->e2_ud_sdi = LOW;
    else
        port2_ptr->e2_ud_sdi = HIGH;
```

```
    ioport2 = port2_image;
    US_WAIT(3);

    /*
     * The EEPOT takes one step each time its held low for 1us
then it
     * must be high for 3us before the next time.
     */
    for (i = 0; i < amount; i++)
    {
        port2_ptr->e2_s_clk = LOW;
        ioport2 = port2_image;
        US_WAIT(1);
        port2_ptr->e2_s_clk = HIGH;
        ioport2 = port2_image;
        US_WAIT(3);
    }

    exp0_sel_image |= Bit_Mask[eepot_num];
    *EXP0_SEL_REG = exp0_sel_image;
}

/****************************************************************
 *
 * Name: SPM_buzzer
 *
 * Description: This routine rings or stops ringing the buzzer
 *
 ****************************************************************/
void SPM_buzzer(flag)

uchar   flag;
{
    exp0_sel_ptr->buzzer = flag;
    *EXP0_SEL_REG = exp0_sel_image;
}

/****************************************************************
 *
 * Name:        SPM_fec_enable
 *
 * Description: This routine enables or disables FEC.
 *
 ****************************************************************/
void SPM_fec_enable(uchar flag)
{
    if(flag)
        {
        *(uchar *)(LCA2_SEL + 4) = 0x85;
        *(uchar *)(LCA2_SEL + 5) = 0x0A;
```

©P-COM, Inc., 1994

```
        *(uchar *)(LCA2_SEL + 6) = 0x0A;
        *(uchar *)(LCA2_SEL + 7) = 0x96;
        *(uchar *)(LCA2_SEL + 8) = 0xA0;
        *(uchar *)(LCA2_SEL + 9) = 0x0C;
        12_control_ptr->encprog = 1;
        *LCA2_CONTROL_REG = 12_control_image;
        US_WAIT(10);
        12_control_ptr->encprog = 0;
        *LCA2_CONTROL_REG = 12_control_image;

        *(uchar *)(LCA2_SEL + 4) = 0x85;
        *(uchar *)(LCA2_SEL + 5) = 0x0A;
        *(uchar *)(LCA2_SEL + 6) = 0x0A;
        *(uchar *)(LCA2_SEL + 7) = 0x96;
        *(uchar *)(LCA2_SEL + 8) = 0xA0;
        *(uchar *)(LCA2_SEL + 9) = 0x0E;
        12_control_ptr->decprog = 1;
        *LCA2_CONTROL_REG = 12_control_image;
        US_WAIT(10);
        12_control_ptr->decprog = 0;
        12_control_ptr->bypass = 0;
        12_control_ptr->format = 1;     /* European !!!*/
        12_control_ptr->txouten = 1;
        *LCA2_CONTROL_REG = 12_control_image;
        }
    else
        {
        12_control_ptr->txouten = 0;
        *LCA2_CONTROL_REG = 12_control_image;
        }
}

/****************************************************************
 *
 * Name:        SPM_fec_bypass
 *
 * Description: This routine enables or disables FEC bypass mode.
 *
 ***************************************************************/
void SPM_fec_bypass(uchar flag)
{
    if(flag)
        {
        *(uchar *)(LCA2_SEL + 4) = 0x85;
        *(uchar *)(LCA2_SEL + 5) = 0x02;
        *(uchar *)(LCA2_SEL + 6) = 0x02;
        *(uchar *)(LCA2_SEL + 7) = 0x96;
        *(uchar *)(LCA2_SEL + 8) = 0x98;
        *(uchar *)(LCA2_SEL + 9) = 0x1C;
        12_control_ptr->encprog = 1;
```

©P-COM, Inc., 1994

```
        *LCA2_CONTROL_REG = l2_control_image;
        US_WAIT(10);
        l2_control_ptr->encprog = 0;
        *LCA2_CONTROL_REG = l2_control_image;

        *(uchar *)(LCA2_SEL + 4) = 0x85;
        *(uchar *)(LCA2_SEL + 5) = 0x02;
        *(uchar *)(LCA2_SEL + 6) = 0x02;
        *(uchar *)(LCA2_SEL + 7) = 0x96;
        *(uchar *)(LCA2_SEL + 8) = 0x98;
        *(uchar *)(LCA2_SEL + 9) = 0x1C;
        l2_control_ptr->decprog = 1;
        *LCA2_CONTROL_REG = l2_control_image;
        US_WAIT(10);
        l2_control_ptr->decprog = 0;
        l2_control_ptr->bypass = 1;
        *LCA2_CONTROL_REG = l2_control_image;
        }
    else
        {
        SPM_fec_enable(TRUE);
        }
}
```

SPM.MAP.H ©P-COM, Inc., 1994

```
/*****************************************************************
 *
 * Description: THIS FILE DEFINES THE MEMORY MAP FOR ALL
READ/WRITE
 *              ADDRESSES IN THE SYSTEM
 *
 * $Id: spm_map.h 2.2 1994/01/19 14:23:53 JEFFC Exp $
 *
 * $Log: spm_map.h $
 * Revision 2.2  1994/01/19  14:23:53  JEFFC
 * Removed obsolete macros
 *
 * Revision 2.1  1993/12/29  10:38:28  MIKEE
 * conversion
 *
 *    Rev 1.2   01 Nov 1993 12:27:32   mikee
 * EOW
 *
 *    Rev 1.1   04 Oct 1993 12:44:34   mikee
 * fixed bugs
 *
 *    Rev 1.0   18 Sep 1993 13:55:32   mikee
 * Initial revision.
 ****************************************************************/

#ifndef _SPM_MAP_H
#define _SPM_MAP_H


#define EPROM       0x0000      /* EPROM address boot at 2080h */
#define FLASH       0x0000      /* Flash prom memory */
#define SRAM        0xa000      /* start of static RAM */
#define SRAM_END    0xEFFF      /* static ram end */
#define IO_BS       0xF000      /* Base I/O address */

#define TELEM_RD    IO_BS+0x0   /* user alarm input, provided
with relays */
#define TELEM_WR    IO_BS+0x0   /* relays bit 0-4, relay0 is bit
0 */
                                /* bits 5-7 is analog multiplexor
input select */
                                /* see alalog PORT0 */
    typedef struct
    {
        unsigned relays :5;
        unsigned avsel  :3;
    } TELEM_WR_OL;
#define   EXTERNAL_INPUTS          (uchar *)(TELEM_RD)
#define TELEM_WR_REG       (uchar *)(TELEM_WR)
#define RELAY1      0x01
```

SPM.MAP.H ©P-COM, Inc., 1994

```
#define RELAY2       0x02
#define RELAY3       0x04
#define RELAY4       0x08
#define RELAY5       0x10

#define DNLD_RD      IO_BS+0x1   /* LCA download status */
    struct dnld_rd
    {
        unsigned lca1_done  :1;
        unsigned lca1_init  :1;
        unsigned lca2_done  :1;
        unsigned lca2_init  :1;
        unsigned lca3_done  :1;
        unsigned lca3_init  :1;
        unsigned spare1     :1;
        unsigned spare2     :1;
    };
#define DNLD_RD_PTR         ((struct dnld_rd *)(DNLD_RD))
#define DNLD_RD_REG         ((uchar *)(DNLD_RD))
#define LCA_DONE(x)         ((*DNLD_RD_REG & Bit_Mask[x * 2]) ==
1)
#define LCA_ERROR(x)        ((*DNLD_RD_REG & Bit_Mask[x * 2 + 1])
== 0)

#define DNLD_WR      IO_BS+0x1   /* LCA download control */
    typedef struct
    {
        unsigned lca1_prog  :1;
        unsigned lca2_prog  :1;
        unsigned lca3_prog  :1;
        unsigned lca_rstn   :1;
        unsigned lcam       :3;
        unsigned spare3     :1;
    }DNLD_WR_OL;
#define DNLD_WR_REG         (uchar *)(DNLD_WR)
#define MMUX_LCA            0
#define FEC_LCA             1
#define SDATA_LCA           2
#define LCA_SE_MODE         0x00
#define LCA_PP_MODE         0x05
#define LCA_DC_MODE         0x07


#define LINE_STAT    IO_BS+0x2   /* E1/T1 Line interfaces */
    struct ln_stat
    {
        unsigned ln1_ais    :1;
        unsigned ln1_los    :1;
        unsigned ln2_ais    :1;
        unsigned ln2_los    :1;
```

```
        unsigned ln3_ais      :1;
        unsigned ln3_los      :1;
        unsigned ln4_ais      :1;
        unsigned ln4_los      :1;
    };
#define LINE_STAT_REG     (uchar *)(LINE_STAT)
#define LN_AIS(x)         ((*LINE_STAT_REG & Bit_Mask[x * 2]) !=
0)
#define LN_LOS(x)         ((*LINE_STAT_REG & Bit_Mask[x * 2 + 1])
!= 0)
#define MAX_LINES         4

#define MISC_OUT    IO_BS+0x2   /* LCA download Control */
    typedef struct
    {
        unsigned txfilt_csn :1;
        unsigned rxfilt_csn :1;
        unsigned bband_lpbk :1;
        unsigned clk_lpbk   :1;
        unsigned txextref   :1;
        unsigned rate       :2;
        unsigned odu_pwron  :1;
    } MISC_OUT_OL;
#define MISC_OUT_REG        (uchar *)(MISC_OUT)


#define IN_RD0      IO_BS+0x3   /* Miscellaneous Inputs */
    struct in_rd0
    {
        unsigned scc_intn   :5;
        unsigned wdoN       :1;
        unsigned pfoN       :1;
        unsigned spare4     :1;
    };
#define IN_RD0_PTR          ((struct in_rd0 *)(IN_RD0))

#define UART_INTERRUPT_MASK     0x1f
#define   PEER_INTERRUPT          0x01
#define   NMS_PORT1_INTERRUPT      0x02
#define   NMS_PORT2_INTERRUPT      0x04
#define   MAINTENANCE_INTERRUPT    0x08
#define   PROTECTION_INTERRUPT     0x10

#define POWERON_RESTART         (IN_RD0_PTR->pfoN == CLR)
#define WDT_RESTART             (IN_RD0_PTR->wdoN == CLR)

#define IN_RD1      IO_BS+0x4   /* more Miscellaneous Inputs */
    struct in_rd1
    {
        unsigned ports      :2; /* stuffed ports 1-3, 2-2, 4-0,
```

SPM.MAP.H

©P-COM, Inc., 1994

```
rev-1 */
        unsigned fec         :1; /* No FEC - 1, FEC - 0 */
        unsigned e1_t1       :1; /* E1 - 0, T1 - 1 */
        unsigned afc_freq    :1; /* worthless */
        unsigned afc_hi      :1; /* worthless */
        unsigned cbl_shortN  :1;
        unsigned cbl_openN   :1;
    };
#define IN_RD1_PTR           ((struct in_rd1 *)(IN_RD1))
#define CABLE_OPEN()         (IN_RD1_PTR->cbl_openN == CLR)
#define CABLE_SHORT()        (IN_RD1_PTR->cbl_shortN == CLR)
#define E1_LINE              0
#define T1_LINE              1

#define LN1_WR        IO_BS+0x4   /* E1/T1 line 1 controls */
#define LN2_WR        IO_BS+0x5   /* E1/T1 line 2 controls */
#define LN3_WR        IO_BS+0x6   /* E1/T1 line 3 controls */
#define LN4_WR        IO_BS+0x7   /* E1/T1 line 4 controls */
    typedef struct
    {
        unsigned ln_rcode   :1;
        unsigned ln_taos    :1;
        unsigned ln_llp     :1;
        unsigned ln_rlp     :1;
        unsigned ln_len     :3;
        unsigned ln_frstn   :1;
    } LN_WR_OL;
#define LN_WR_REG            ((uchar *)(LN1_WR))
#define B8ZS_HDB3            0
#define AMI                  1
#define PCM_LN_LEN           0x00
#define LN_LEN_133           0x03
#define LN_LEN_266           0x04
#define LN_LEN_399           0x05
#define LN_LEN_533           0x06
#define LN_LEN_655           0x07


#define WDT_RD        IO_BS+0x7                /* Fake read to pulse
WDT */
#define WDT_RD_REG           (uchar*)(WDT_RD)
extern  register uchar       Dog_Food;
#define WDT_TICKLE()         Dog_Food = *WDT_RD_REG

#define   SCC_CS1        IO_BS+0x200 /*ADDRESS SELECT FOR PERR
LINK UART*/
#define   SCC_CS2        IO_BS+0x240     /*ADDRESS SELECT FOR NMS
PORT1 UART*/
#define   SCC_CS3        IO_BS+0x280     /*ADDRESS SELECT FOR
NMS_PORT2 UART*/
```

SPM.MAP.H

©P-COM, Inc., 1994

```
#define   SCC_CS4        IO_BS+0x2C0      /*ADDRESS SELECT FOR
Maintenance PORT UART*/
#define   SCC_CS5        IO_BS+0x300      /*ADDRESS SELECT FOR
Protection link UART*/

#define   PEER_UART            (unsigned char *)(SCC_CS1)
#define   NMS1_UART            (unsigned char *)(SCC_CS2)
#define   NMS2_UART            (unsigned char *)(SCC_CS3)
#define   MAINTENANCE_UART     (unsigned char *)(SCC_CS4)
#define   PROTECTION_UART      (unsigned char *)(SCC_CS5)
    /*
     *    THE FOLLOWING DEFINE THE REGISTER LOCATIONS FOR THE
SCC2691
     */
#define   MR1        0X00 /*MODE REGISTER 1*/
#define   MR2        0x00 /*Mode register 2*/
#define   SR         0X01 /*CLOCK SELECT & STATUS REGISTER*/
#define   CR         0X02 /*COMMAND REGISTER*/
#define   THR        0X03 /*TRANSMIT HOLDING REGISTER*/
#define   RHR        0X03 /*RECIEVE HOLDING REGISTER*/
#define   ACR             0X04 /*AUXILIARY CONTROL REGISTER*/
#define   IMR             0X05 /*INTERRUPT STATUS AND MASK
REGISTER*/
#define   CTU             0X06 /*COUNTER TIMER UPPER*/
#define   CTL             0X07 /*COUNTER TIMER LOWER*/


#define LCA1_SEL     IO_BS+0x400 /* LCA 1 Select */
#define LCA2_SEL     IO_BS+0x480 /* LCA 2 Select */
#define LCA3_SEL     IO_BS+0x500 /* LCA 3 Select */
#define FP0_SEL      IO_BS+0x600 /* Front panel Select 0 */
#define FP1_SEL      IO_BS+0x700 /* front panel select 1 */
#define EXP0_SEL     IO_BS+0x800 /* expansion (orderwire) select 0
*/
    typedef struct
    {
        unsigned epot0N     :1;
        unsigned epot1N     :1;
        unsigned epot2N     :1;
        unsigned epot3N     :1;
        unsigned hseten     :1;
        unsigned buzzer     :1;
        unsigned codecen    :1;
        unsigned phnbrdg    :1;
    } EXP0_SEL_OL;
#define EXP0_SEL_REG        ((uchar *)(EXP0_SEL))

#define EXP1_SEL     IO_BS+0x900 /* expansion (orderwire) select 1
*/
```

©P-COM, Inc., 1994

```
#endif /* SPM_MAP */
```

STRS.H

©P-COM, Inc., 1994

```
/****************************************************************
 *
 * Description: This file contains the defines for the Front
 *              Control Panel (FCP)
 *
 * $Id: strs.h 2.2 1994/01/19 14:25:01 JEFFC Exp $
 *
 * $Log: strs.h $
 * Revision 2.2  1994/01/19  14:25:01  JEFFC
 * Added new strings for orderwire, pseudo-random loopback, T/R
Addr, etc.
 *
 * Revision 2.1  1993/12/29  10:38:29  MIKEE
 * covertion
 *
 *
 *    Rev 1.2   01 Nov 1993 12:27:50   mikee
 * chnages for rel 2.0
 *
 *    Rev 1.1   04 Oct 1993 16:34:20   mikee
 * keypad ui cleanup
 *
 *    Rev 1.0   18 Sep 1993 13:55:32   mikee
 * Initial revision.
 ****************************************************************/

#ifndef _STRS_H
#define _STRS_H

/*
 * LCD Strings
 */
#define PCOM_STR        0
#define CHAN_STR        1
#define LINK_ID_STR     2
#define AGC_STR         3
#define XPOWER_STR      4
#define OK_STR          5
#define FAILED_STR      6
#define SELECT_STR      7
#define TRUE_STR        8
#define FALSE_STR       9
#define ALARMS_STR      10
#define LPBKS_STR       11
#define NOT_IMP_STR     12
#define IDU_STR         13
#define ODU_STR         14
#define CABLE_STR       15
#define BER_STR         16
#define REMOTE_STR      17
```

STRS.H

©P-COM, Inc., 1994

```
#define LN_LOSS_STR      18
#define LN_AIS_STR       19
#define C_OPEN_STR       20
#define C_SHORT_STR      21
#define PASSWORD_STR     22
#define HS_VOL_STR       23
#define PEER_STR         24
#define EOW_STR          25
#define EXT_IN_STR       26
#define LPBK_STR         27
#define LOGOUT_STR       28
#define RCV_MUTE_STR     29
#define LINK_STR         30
#define ON_STR           31
#define OFF_STR          32
#define EXP_STR          33
#define MISC_STR         34
#define TELEM_STR        35
#define LINE_STR         36
#define GENERAL_STR      37
#define ALARM_STR        38
#define AIS_STR          39
#define LOS_STR          40
#define ENABLED_STR      41
#define TRANS_STR        42
#define FR_AIS_STR       43
#define CLR_HIST_STR     44
#define HISTORY_STR      45
#define REMOTE_MD_STR    46
#define WARN1_STR        47
#define WARN2_STR        48
#define TX_MUTE_STR      49
#define RMT_MODE_STR     50
#define ODU_BAND_STR     51
#define EI_TLP_STR       52
#define WI_TLP_STR       53
#define EO_TLP_STR       54
#define WO_TLP_STR       55
#define COM_FAIL_STR     56
#define CONFIG_STR       57
#define DIS_RMT_STR      58
#define T_R_ADDR_STR     59
#define FEC_STR          60
#define IDU_FW_STR       61
#define ODU_FW_STR       62
#define CLK_RECOV_STR    63
#define BYPASS_STR       64
#define TEST_LINE_STR    65
#define ERROR_CNT_STR    66
#define SYNTH_WARN_STR   67
```

STRS.H

©P-COM, Inc., 1994

```
#define NUM_STRINGS      68  /* NOTE: Keep up to date */
extern char *const Strings[NUM_STRINGS];
#endif /* _STRS_H */
```

SYS_NOV.H

©P-COM, Inc., 1994

```
/***************************************************************
 *
 * Description: This file contains the defines for novram
functions
 *
 * $Id: sys_nov.h 2.1 1993/12/29 10:38:29 MIKEE Exp $
 *
 * $Log: sys_nov.h $
 * Revision 2.1  1993/12/29  10:38:29  MIKEE
 * covertion
 *
 *
 *    Rev 1.2   01 Nov 1993 12:19:42   mikee
 * re-order, and factory object
 *
 *    Rev 1.1   04 Oct 1993 12:45:20   mikee
 * moved around object's starting locations
 *
 *    Rev 1.0   18 Sep 1993 13:55:34   mikee
 * Initial revision.
 ***************************************************************/

#ifndef _SYS_NOV_H
#define _SYS_NOV_H

#include <novram.h>


/*
 * Page 1 object locations for rel 2.0
 */
#define R20_RADIO_NV        0x18    /* 30 bytes */
#define R20_SPM_NV          0x36    /* 30 bytes */
#define R20_DIAG_NV         0x54    /*  4 bytes */
#define R20_ALARM_NV        0x58    /* 77 bytes */
#define R20_LINK_NV         0xa5    /* 21 bytes */
#define R20_LINE_NV         0xba    /* 26 bytes */
#define R20_COMM_NV         0xd4    /* 26 bytes */
                                    /* 17 bytes free */

/*
 * Page 2 object locations for rel 2.0
 */
#define R20_FCP_NV          0x18    /* 16 bytes */
#define R20_ODU_NV          0x28    /* 4 bytes */
#define R20_A2D_NV          0x2c    /* 160 bytes */
                                    /* 51 bytes free */

#endif /* _SYS_NOV_H */
```

©P-COM, Inc., 1994

```
/****************************************************************
 *
 * Description: This file contains the global defines for the IDU
 *
 * $Id: sysdefs.h 2.4 1994/03/14 11:38:43 JEFFC Exp $
 *
 * $Log: sysdefs.h $
 * Revision 2.4  1994/03/14  11:38:43  JEFFC
 * Release 2.7
 *
 * Revision 2.3  1994/01/31  14:01:27  JEFFC
 * Release 2.6
 *
 * Revision 2.2  1994/01/19  14:42:57  JEFFC
 * New release 2.5
 *
 * Revision 2.1  1993/12/29  10:38:30  MIKEE
 * conversion
 *
 *    Rev 1.7   17 Dec 1993 06:42:24   mikee
 * bug fix release 2.4
 *
 *    Rev 1.6   08 Dec 1993 12:38:22   mikee
 * new release to fix mem bug (2.3)
 *
 *    Rev 1.5   19 Nov 1993 06:29:36   mikee
 * new rel 2.2
 *
 *    Rev 1.4   17 Nov 1993 10:22:32   mikee
 * support for cir-buff util and new release 2.1
 *
 *    Rev 1.3   01 Nov 1993 12:26:54   mikee
 * new release 2.0
 *
 *    Rev 1.2   19 Oct 1993 16:01:52   mikee
 * new release to fix some bug rel 1.2
 *
 *    Rev 1.1   07 Oct 1993 06:24:04   mikee
 * modem status byte sense swap, new rel 1.1
 *
 *    Rev 1.0   18 Sep 1993 13:55:34   mikee
 * Initial revision.
 ****************************************************************/

#ifndef _SYSDEFS_H
#define _SYSDEFS_H

#define FW_REL_20       0x20
#define FW_REL_21       0x21
#define FW_REL_22       0x22
```

SYSDEFS.H

©P-COM, Inc., 1994

```
#define FW_REL_23       0x23
#define FW_REL_24       0x24
#define FW_REL_25       0x25
#define FW_REL_26       0x26
#define FW_REL_27       0x27
#define FW_RELEASE      FW_REL_27
#define   NUM_SUPPORT_RELS    1       /* support novram releases
*/

/*
 * GENERAL PURPOSE DEFINES FOR MAIN PROGRAM
 */
typedef unsigned char uchar;
typedef unsigned int  uint;
typedef unsigned long ulong;
typedef void    (*CB)();
typedef uchar   (*BOOL_CB)();
typedef uint    (*IFUNC)();
typedef uchar   (*BFUNC)();
typedef uchar   (*ATTR_CB)(uchar,uchar,uint*,uchar);
typedef uchar   (*OBJ_CB)(uchar,uchar,uchar *);
typedef uchar   (*DRV_CB)(uchar, void *, void *);

#define TRUE             1
#define FALSE            0
#define NULL             0X00
#define EOF                  0xffff
#define ON              0x01
#define OFF             0X00
#define UP               0x01
#define DOWN            0x02
#define CLR             0
#define SET             1
#define RX              0
#define TX              1
#define LOW             0
#define HIGH            1
#define NON_DESTRUCTIVE 0
#define DESTRUCTIVE     1
#define CLOSED          0x01
#define OPEN            0X00


#define PERF_DBG        OFF   /* performance debug option enabled
if on */
#define REGISTER        register
#define RAM
#define INTERRUPTS_OFF  asm di
#define INTERRUPTS_ON   asm ei
#define CALL_ATTR_FUNC(f,o,p1,p2,p3,p4)   f(p1, p2, p3, p4)
```

SYSDEFS.H ©P-COM, Inc., 1994

```
#define CONST              const
#define TRACE_IT(x)        DIAG_trace(x)

/*
 * character defines
 */
#define DLE_CHAR           0x10
#define SYNC_CHAR          0x16
#define THREE_CHAR         0x33

/*
 * Genral system defines
 */
#define LN_TYPES           2
#define NUM_RATES          4
#define NUM_RELAYS         5
#define NUM_BER_GRPS       5
#define NUM_LINKS          7      /* NUM OF comm PORTS IN THE
SYSTEM*/
#define NUM_QUEUES         12     /* number of buffers in pool */
#define VOLT_FACTOR        51

#define MEM_PATTERN1      0xaa
#define MEM_PATTERN2      0x55

#define CIR_BUFF_SIZE        30
typedef struct
{
    uchar   buff[CIR_BUFF_SIZE];
    uchar   *in_ptr;
    uchar   *out_ptr;
} CBUFF;

extern const uchar Bit_Mask[8];
extern void DIAG_trace(uchar);

#endif /* _SYSDEFS_H */
```

TIMER.H ©P-COM, Inc., 1994

```
/***************************************************************
 *
 * Description: This file contains the defines for the timer
engine
 *
 * $Id: timer.h 2.2 1994/01/19 15:02:09 JEFFC Exp $
 *
 * $Log: timer.h $
 * Revision 2.2  1994/01/19  15:02:09  JEFFC
 * Changed function prototype for TIMER_init()
 *
 * Revision 2.1  1993/12/29  10:38:30  MIKEE
 * conversion
 *
 *    Rev 1.0   17 Nov 1993 10:29:28   mikee
 * Initial revision.
 *
 ***************************************************************/

#ifndef _TIMER_H
#define _TIMER_H

#define MAX_TIMERS              20

/*
 * Timer attributes
 */
#define INIT_TIME_ATTR          0
#define REPEAT_TIME_ATTR        1
#define NUM_TIMER_ATTRS         2

#define CUR_TIME_ATTR           SPECIAL_ATTRS
#define TRIG_FLAG_ATTR          SPECIAL_ATTRS+1


typedef struct
{
    uchar   object;
    uint    init_tout;
    uint    repeat_tout;
} TIMER_CNFG;

typedef struct
{
    uint    trigger_time;
    uchar   trigger_flag;
} TIMER;

extern uchar    TIMER_init();
extern void     TIMER_checker();
```

TIMER.H

©P-COM, Inc., 1994

```
extern uchar     TIMER_handler(uchar,uchar,uchar *);
extern void      TIMER_set(uchar, uint);
extern uchar     TIMER_expired(uchar);
extern void      TIMER_cancel(uchar);

#endif    /* _TIMER_H  */
```

```
/***************************************************************
 *
 * Description: This file contains the functions that handle
 *              diagnostic messages.
 *
 * $Id: a2d.c 2.4 1994/03/14 11:45:30 JEFFC Exp $
 *
 * $Log: a2d.c $
 * Revision 2.4  1994/03/14  11:45:30  JEFFC
 * Changed Rx BaseBand and Rx Clock alarms to be disabled if
 * there is a cable alarm.
 *
 * Revision 2.3  1994/01/31  13:57:19  JEFFC
 * Made alarm enable flag more consistent.
 *
 * Revision 2.2  1994/01/19  15:19:06  JEFFC
 * Added Clock Recovery Alarm
 *
 * Revision 2.1  1993/12/29  10:38:31  MIKEE
 * conversion
 *
 *    Rev 1.5   19 Nov 1993 09:24:50   mikee
 * removed cable agcmon as an alarm source
 *
 *    Rev 1.4   19 Nov 1993 06:28:00   mikee
 * fixed to cable agcmon false alarm bug
 *
 *    Rev 1.3   01 Nov 1993 11:33:40   mikee
 * changed some ranges, and 1 offset now used instead of 2 ranges
for clear
 *
 *    Rev 1.2   19 Oct 1993 15:06:24   mikee
 * change range of TxBBand
 *
 *    Rev 1.1   04 Oct 1993 12:51:32   mikee
 * fixed false alarm bug
 *
 *    Rev 1.0   18 Sep 1993 14:03:46   mikee
 * Initial revision.
 **************************************************************/

#include "sysdefs.h"
#include "80c196.h"
#include "spm_map.h"
#include "object.h"
#include "message.h"
#include "sys_nov.h"
#include "radio.h"
#include "a2d.h"
#include "modem.h"
```

©P-COM, Inc., 1994

```
#include "spm.h"
#include "alarm.h"
#include "line.h"
#include "link.h"

/*
 * External Functions
 */
extern void UTIL_clr_mem();
extern void SPM_avsel();

/*
 * Internal Functions
 */
static uchar    a2d_init();
static void     a2d_timeout();
static void     calc_alarm();

/*
 * External Data
 */
extern const A2D_CNFG   A2D_Cnfg[NUM_A2D_VALUES];
extern const uchar      A2d_NV_Attr[];

/*
 * Internal Data
 */
static uchar Cur_mux_port;
static uchar Cur_mux_chan;
static uchar ClkRecoveryAlarm;

static uint A2D_Attr[NUM_A2D_VALUES][NUM_A2D_ATTRS];

/**************************************************************
 *
 * Name: A2D_handler
 *
 * Description: This function handles the a2d timeouts
 *
 **************************************************************/
uchar A2D_handler(object, event, cdata_ptr)

uchar  object;
uchar  event;
uchar  *cdata_ptr;
{
    /*
     * switch on the event
     */
    switch(event)
```

```
    {
        case INIT_EVENT:
            return a2d_init(cdata_ptr);
            break;
        case SAVE_NV_EVENT:
            if (NOVRAM_save_attrs(object,(NV_ADR_BLK *)cdata_ptr,
                    (uchar *)A2d_NV_Attr,
(ATTR_CB)A2D_process_attr_cmd,
                    NUM_A2D_VALUES) == FALSE)
                return(FALSE);
            break;
        case TIMER_EVENT:
            a2d_timeout();
            break;
        case MSG_EVENT:
            MSG_process_attr_msg((ATTR_CB)A2D_process_attr_cmd,
                (HEADER *)cdata_ptr);
            break;
    }
    return(TRUE);
}

/*************************************************************
 *
 * Name: a2d_init
 *
 * Description: This function inits the a2d data base
 *
 *************************************************************/
uchar a2d_init(adr_ptr)

NV_ADR_BLK  *adr_ptr;
{
    uchar   i;
    uint    *attrs_ptr;

    /*
     * Setup default limits
     */
    for (i = 0; i < NUM_A2D_VALUES; i++)
    {
        attrs_ptr = &A2D_Attr[i][0];
        attrs_ptr[A2D_READING_ATTR] = 0;
        attrs_ptr[A2D_ALARM_ATTR] = FALSE;
        attrs_ptr[A2D_HI_ALM_ATTR] = A2D_Cnfg[i].a2d_hi_alm;
        attrs_ptr[A2D_LO_ALM_ATTR] = A2D_Cnfg[i].a2d_lo_alm;
        attrs_ptr[A2D_CLR_OFFSET_ATTR] =
A2D_Cnfg[i].a2d_clr_offset;
    }
```

©P-COM, Inc., 1994

```
    /*
     * Now see if there is anything saved in novram
     */
    NOVRAM_restore_attrs(A2D_OBJ, adr_ptr, (uchar *)A2d_NV_Attr,
            (ATTR_CB)A2D_process_attr_cmd, NUM_A2D_VALUES);

    /*
     * Kickoff A2D conversion
     */
    Cur_mux_port = 0;
    Cur_mux_chan = 0;
    SPM_avsel(Cur_mux_port);
    ad_command = Cur_mux_chan | START_A2D_CONVERSION;

    return FALSE;
}

/**************************************************************
 *
 * Name: a2d_timeout
 *
 * Description: This function reads the current results of the
 *              A2D converter and starts the next one
 *
 **************************************************************/
void a2d_timeout()

{
    uchar   read_inst;

    if (A2D_DONE())
    {
        read_inst = Cur_mux_chan * A2D_PER_MUX + Cur_mux_port;

        /*
         * We are using 5 of the a2d input ports on port0 of the
chip
         * and multiplexing 8 signals on to each. The call to
SPM_avsel
         * sets which of the eight and the ad_command is given
which of
         * the five.
         */
        if (++Cur_mux_port >= A2D_PER_MUX)
        {
            Cur_mux_port = 0;
            if (++Cur_mux_chan >= NUM_A2D_MUXS)
                Cur_mux_chan = 0;
        }
```

```
        /*
         * If this is the RF mode's values some special handling
is needed
         */
        if (Cur_mux_chan == AVMUX4)
            MODEM_av_select(Cur_mux_port);
        SPM_avsel(Cur_mux_port);

        /*
         * Read after select to waste time before starting the
convertion
         */
        A2D_Attr[read_inst][A2D_READING_ATTR] = ad_result_hi;

        ad_command = Cur_mux_chan | START_A2D_CONVERSION;
    }
}

/***************************************************************
 *
 * Name: A2D_process_attr_cmd
 *
 * Description: This function handles a command attribute pair
 *
 **************************************************************/
uchar A2D_process_attr_cmd(opcode, attr_num, attr_val_adr, inst)

uchar   opcode;
uchar   attr_num;
uint    *attr_val_adr;
uchar   inst;
{
    uchar   status;

    status = NO_ERR;

    /*
     * Attributes are divided into no special handling and
special handling
     * groups. If an error is found we stop processing
attributes.
     */
    if (attr_num >= SPECIAL_ATTRS)
    {
        switch(attr_num)
        {
        }
    }
    else
    {
```

©P-COM, Inc., 1994

```
        /*
         * If GET_CMD then just load the information into the
buffer
         * otherwise have the general attribute function handle
it
         */
        if (opcode == GET_CMD)
            *attr_val_adr = A2D_Attr[inst][attr_num];
        else if (opcode == SET_CMD)
            status = OBJ_process_attr(opcode, attr_val_adr,
                &A2D_Attr[inst][attr_num]);
        else
            status = BAD_CMD_ATTR;
    }

    NOVRAM_chk_updt_needed(opcode, attr_num, status, (uchar
*)A2d_NV_Attr);

    return(status);
}

/************************************************************
 *
 * Name: A2D_chk_alm
 *
 * Description: This function checks the current a2d readings
 *              for alarm conditions
 *
 ************************************************************/
uchar A2D_chk_alm()

{
    uint    num_lines, able_flag;
    uchar   i;
    uint loopback;
    uint cable_alarm;

    /*
     * First calculate the alarms. go only up to the line values
     * stop there so that only active lines are tested, then get
the
     * rest of them.
     */
    for (i = 0; i < LINE_A2D_VALUES; i++)
        calc_alarm(i);

    /*
     * Don't check values of disabled lines
     */
    RADIO_process_attr_cmd(GET_CMD, HW_LINES_ATTR, &num_lines,
```

©P-COM, Inc., 1994

```
0);
    for (i = 0; i < num_lines; i++)
    {
        LINE_process_attr_cmd(GET_CMD, LN_ENABLE_ATTR,
&able_flag, i);
        if (able_flag)
        {
            calc_alarm(LINE_A2D_VALUES + (i * 2));          /*
LN1VTRING */
            calc_alarm(LINE_A2D_VALUES + (i * 2) + 1);      /*
LN1VTTIP  */
        }
        else
        {
            A2D_Attr[LINE_A2D_VALUES + (i * 2)][A2D_ALARM_ATTR] =
NO_ALARM;
            A2D_Attr[LINE_A2D_VALUES + (i * 2)+1][A2D_ALARM_ATTR]
= NO_ALARM;
        }
    }

    /*
     * Check the rest
     */
    for (i = REMAIN_A2D_VALUES; i < NUM_A2D_VALUES; i++)
        calc_alarm(i);

    /*
        If the SPM is not in IDU loopback and there is a cable
alarm,
        then ignore the Rx BaseBand and Rx Clock PLL alarms.
    */
    LINK_process_attr_cmd(GET_CMD, CUR_LPBK_ATTR, &loopback, 0);
    ALARM_process_attr_cmd(GET_CMD, STATE_ATTR, &cable_alarm,
CABLE_ALM);
    if(cable_alarm && (loopback != LK_RFIDU_LPBK))
        {
        A2D_Attr[RXCLK_AV][A2D_ALARM_ATTR] = NO_ALARM;
        A2D_Attr[RXBBAND_AV][A2D_ALARM_ATTR] = NO_ALARM;
        }

    /*
     * if RxBBand is not good RxClk should not be alarmed
     */
    if(A2D_Attr[RXBBAND_AV][A2D_READING_ATTR] < VOLT_0_25)
        A2D_Attr[RXCLK_AV][A2D_ALARM_ATTR] = NO_ALARM;

    /*
        If we are in Baseband or IDU or Clock Recovery Loopback,
        and RXCLK_AV is in alarm, then we have a real hard alarm.
```

```
        If RXCLK_AV is in alarm, but we're NOT in one of these
        loopbacks, then we just report a (blinking) Clk Recovery
alarm.
    */
    ClkRecoveryAlarm = OFF;
    if(A2D_Attr[RXCLK_AV][A2D_ALARM_ATTR] != NO_ALARM)
        {
        if((loopback != LK_BBAND_LPBK) && (loopback !=
LK_CLK_LPBK) &&
            (loopback != LK_RFIDU_LPBK))
            {
            A2D_Attr[RXCLK_AV][A2D_ALARM_ATTR] = NO_ALARM;
            ClkRecoveryAlarm = ON;
            }
        }

    /*
     * Check for any in alarm and update history
     */
    for (i = 0; i < NUM_A2D_VALUES; i++)
    {
        if (A2D_Attr[i][A2D_ALARM_ATTR] == ALARM_ON)
        {
            A2D_Attr[i][A2D_ALM_HIST_ATTR] = TRUE;
            A2D_Attr[i][A2D_VAL_HIST_ATTR] =
A2D_Attr[i][A2D_READING_ATTR];

            return(TRUE);
        }
    }
    return(FALSE);
}

/*************************************************************
 *
 * Name: calc_alarm
 *
 * Description: This function checks an a2d readings
 *              for alarm conditions
 *
 *************************************************************/
void calc_alarm(a2d_num)

uchar   a2d_num;
{
    uint    *attrs_ptr;

    if (A2D_Cnfg[a2d_num].a2d_chk_alm == TRUE)
    {
        /*
```

```
         * If not in alarm check to see if the value is outside
of the
         * limits. If in alarm check to see if the value is
inside the
         * limits.
         */
        attrs_ptr = &A2D_Attr[a2d_num][0];
        if (attrs_ptr[A2D_ALARM_ATTR] == NO_ALARM)
        {
            if ((attrs_ptr[A2D_READING_ATTR] >
attrs_ptr[A2D_HI_ALM_ATTR])||
                (attrs_ptr[A2D_READING_ATTR] <
attrs_ptr[A2D_LO_ALM_ATTR]))
            {
                attrs_ptr[A2D_ALARM_ATTR] = ALARM_ON;
            }
        }
        else
        {
            if ((attrs_ptr[A2D_READING_ATTR] <
                (attrs_ptr[A2D_HI_ALM_ATTR] -
attrs_ptr[A2D_CLR_OFFSET_ATTR]))
                && (attrs_ptr[A2D_READING_ATTR] >=
                (attrs_ptr[A2D_LO_ALM_ATTR] +
attrs_ptr[A2D_CLR_OFFSET_ATTR])))
            {
                attrs_ptr[A2D_ALARM_ATTR] = NO_ALARM;
            }
        }
    }
}

/***************************************************************
 *
 * Name: A2D_chk_clk_recov_alm
 *
 * Description: This function checks for the clock recovery
 *              alarm.
 *
 ***************************************************************/
uchar A2D_chk_clk_recov_alm(void)
{
    return ClkRecoveryAlarm;
}
```

ALARM.C ©P-COM, Inc., 1994

```
/****************************************************************
 *
 * Description: This file contains functions for handling the
 *              alarm objects (ALARM_OBJ and ALARMS_OBJ)
 *
 * $Id: alarm.c 2.2 1994/01/19 15:21:11 JEFFC Exp $
 *
 * $Log: alarm.c $
 * Revision 2.2  1994/01/19  15:21:11  JEFFC
 * Changed prototype of ALARM_init()
 *
 * Revision 2.1  1993/12/29  10:38:32  MIKEE
 * conversion
 *
 *    Rev 1.3   01 Nov 1993 11:40:36   mikee
 * new odu alarms and remote alarms
 *
 *    Rev 1.2   19 Oct 1993 14:57:42   mikee
 * led should blink when there is a cable alarm not go off
 *
 *    Rev 1.1   04 Oct 1993 16:35:26   mikee
 * final cleanup
 *
 *    Rev 1.0   18 Sep 1993 14:03:48   mikee
 * Initial revision.
 ****************************************************************/

#include "sysdefs.h"
#include "object.h"
#include "message.h"
#include "sys_nov.h"
#include "spm_map.h"
#include "alarm.h"
#include "radio.h"
#include "line.h"
#include "link.h"
#include "fcp.h"
#include "a2d.h"
#include "spm.h"
#include "modem.h"
#include "remote.h"
#include "odu.h"

/*
 * External Functions
 */
extern void     UTIL_clr_mem();
extern uchar    ODU_chk_alarms();

/*
```

©P-COM, Inc., 1994

```
 * Internal Functions
 */
static uchar    alarm_init();
static void     check_alarms();
static void     updt_led();

/*
 * External Data
 */
extern const ALARM_CNFG Alarm_Cnfg[NUM_ALARMS];
extern const uchar      Alarm_NV_Attr[];

/*
 * Internal Data
 */
static uint     Alarm_Attr[MAX_ALARMS][NUM_ALARM_ATTRS];

/***************************************************************
 *
 * Name: ALARM_handler()
 *
 * Description: This routine handles the alarm object events
 *
 ***************************************************************/
uchar ALARM_handler(object, event, cdata_ptr)

uchar   object;
uchar   event;
uchar   *cdata_ptr;
{
    /*
     * switch on the event
     */
    switch(event)
    {
        case INIT_EVENT:
            return alarm_init(cdata_ptr);
            break;
        case SAVE_NV_EVENT:
            if (NOVRAM_save_attrs(object, (NV_ADR_BLK
*)cdata_ptr,
                        (uchar *)Alarm_NV_Attr,
                        (ATTR_CB)ALARM_process_attr_cmd, MAX_ALARMS)
== FALSE)
                return(FALSE);
            break;
        case TIMER_EVENT:
            check_alarms();
            break;
        case MSG_EVENT:
```

```
            MSG_process_attr_msg((ATTR_CB)ALARM_process_attr_cmd,
                (HEADER *)cdata_ptr);
            break;
    }
    return(TRUE);
}

/**************************************************************
 *
 * Name: ALARM_process_attr_cmd
 *
 * Description: This function handles a command attribute pair
 *
 *************************************************************/
uchar ALARM_process_attr_cmd(opcode, attr_num, attr_val_adr,
inst)

uchar   opcode;
uchar   attr_num;
uint    *attr_val_adr;
uchar   inst;
{
    uchar   status;

    status = NO_ERR;

    /*
     * Attributes are divided into no special handling and
special handling
     * groups. If an error is found we stop processing
attributes.
     */
    if (attr_num >= SPECIAL_ATTRS)
    {
        switch(attr_num)
        {
            default:
                status = BAD_CMD_ATTR;
                break;
        }
    }
    else
    {
        /*
         * If GET_CMD then just load the information into the
buffer
         * otherwise have the general attribute function handle
it
         */
        if (opcode == GET_CMD)
```

```
            *attr_val_adr = Alarm_Attr[inst][attr_num];
        else if (opcode == SET_CMD)
           status = OBJ_process_attr(opcode, attr_val_adr,
                &Alarm_Attr[inst][attr_num]);
        else
            status = BAD_CMD_ATTR;
    }

    NOVRAM_chk_updt_needed(opcode, attr_num, status, (uchar
*)Alarm_NV_Attr);

    return(status);
}

/***************************************************************
 *
 * Name: alarm_init()
 *
 * Description: This routine sets up the alarm data base
 *
 ***************************************************************/
uchar alarm_init(adr_ptr)

NV_ADR_BLK  *adr_ptr;
{
    uchar   i;

    /*
     * Clear all alarm information
     */
    UTIL_clr_mem(&Alarm_Attr[0][0],
        (NUM_ALARMS * NUM_ALARM_ATTRS * sizeof(uint)));

    for (i = 0; i < NUM_ALARMS; i++)
        Alarm_Attr[i][ALM_ABLE_ATTR] = TRUE;

    /*
     * Set the default alarm relays
     * The IDU alarm is done 1 by 1 because it execludes the BER
alarm
     */
    Alarm_Attr[LN_LOS_ALM][RELAY_ATTR] = RELAY2;
    Alarm_Attr[LN_AIS_ALM][RELAY_ATTR] = RELAY2;
    Alarm_Attr[A2D_ALM][RELAY_ATTR] = RELAY2;
    Alarm_Attr[SYNTH_ALM][RELAY_ATTR] = RELAY2;
    Alarm_Attr[EXT_INPUT_ALM][RELAY_ATTR] = RELAY2;
    Alarm_Attr[LOOPBACK_ALM][RELAY_ATTR] = RELAY2;
    Alarm_Attr[AIS_INJ_ALM][RELAY_ATTR] = RELAY2;
    Alarm_Attr[ODU_ALM][RELAY_ATTR] = RELAY3;
    Alarm_Attr[CABLE_ALM][RELAY_ATTR] = RELAY4;
```

©P-COM, Inc., 1994

```
    Alarm_Attr[RMT_ALM][RELAY_ATTR] = RELAY5;

    /*
     * Now see if there is anything saved in novram
     */
    NOVRAM_restore_attrs(ALARM_OBJ, adr_ptr, (uchar
*)Alarm_NV_Attr,
            (ATTR_CB)ALARM_process_attr_cmd, MAX_ALARMS);
    return FALSE;
}

/**************************************************************
 *
 * Name: check_alarms()
 *
 * Description: This routine checks for new alarms and cleared
 *              alarms.
 *
 **************************************************************/
void check_alarms()
{
    uchar       i;
    ALARM_CNFG  *cnfg_ptr;
    uint        attr_val;

    /*
     * Check individual alarm conditions
     */
    cnfg_ptr = (ALARM_CNFG *)Alarm_Cnfg;
    for (i = 0; i < NUM_ALARMS; i++, cnfg_ptr++)
    {
        if (cnfg_ptr->alm_type != COLLECTIVE)
        {
            if (cnfg_ptr->chk_func() == TRUE)
                Alarm_Attr[i][STATE_ATTR] = ALARM_ON;
            else
                Alarm_Attr[i][STATE_ATTR] = NO_ALARM;
        }
    }

    /*
     * NOTE: do all check above this point
     *
     * clear all the collective alarms and disabled ones
     */
    for (i = 0; i < NUM_ALARMS; i++)
    {
        if ((Alarm_Cnfg[i].alm_type == COLLECTIVE) ||
                (Alarm_Attr[i][ALM_ABLE_ATTR] == FALSE))
            Alarm_Attr[i][STATE_ATTR] = NO_ALARM;
```

ALARM.C

©P-COM, Inc., 1994

```
    }

    /*
     * Now feed all the individual alarms into the collective
alarms
     */
    cnfg_ptr = (ALARM_CNFG *)Alarm_Cnfg;
    for (i = 0; i < NUM_ALARMS; i++, cnfg_ptr++)
    {
        if ((cnfg_ptr->alm_type == INDIVIDUAL) &&
            (cnfg_ptr->alm_feeds != NULL_ALM) &&
            (Alarm_Attr[i][STATE_ATTR] != NO_ALARM))
        {
            if (Alarm_Attr[cnfg_ptr->alm_feeds][ALM_ABLE_ATTR])
            {
                if (cnfg_ptr->blink_flag == TRUE)
                    Alarm_Attr[cnfg_ptr->alm_feeds][STATE_ATTR]
|= ALM_BLINKING;
                else
                    Alarm_Attr[cnfg_ptr->alm_feeds][STATE_ATTR]
|= ALARM_ON;
            }
        }
    }

    /*
     * Check to see if the ODU led should be blink because of
either
     * an ODU and LINK loopback
     */
    if (ODU_chk_lpbk() == TRUE)
        Alarm_Attr[ODU_ALM][STATE_ATTR] |= ALM_BLINKING;

    /*
     * update alarm history (blinking state is not saved)
     */
    for (i = 0; i < NUM_ALARMS; i++)
    {
       if ((Alarm_Attr[i][STATE_ATTR] & ALARM_ON) != 0)
           Alarm_Attr[i][ALM_HIST_ATTR] = ALARM_ON;
    }

    /*
     * Update the states based on some special cases
     *     IDU - real alarm over-rides blinking alarms
     *     ODU - cable alarm nullifies it, real alarm overides
blink
     *     CABLE -
     *     REMOTE - Blinking if cable alarm, blinking overrides
alarms
```

```
     */
    if ((Alarm_Attr[IDU_ALM][STATE_ATTR] & ALARM_ON) != 0)
       Alarm_Attr[IDU_ALM][STATE_ATTR] = ALARM_ON;

    if (Alarm_Attr[CABLE_ALM][STATE_ATTR] != NO_ALARM)
       Alarm_Attr[ODU_ALM][STATE_ATTR] = NO_ALARM;
    if ((Alarm_Attr[ODU_ALM][STATE_ATTR] & ALARM_ON) != 0)
       Alarm_Attr[ODU_ALM][STATE_ATTR] = ALARM_ON;

    if (Alarm_Attr[CABLE_ALM][STATE_ATTR] != NO_ALARM)
       Alarm_Attr[RMT_ALM][STATE_ATTR] = ALM_BLINKING;


    /*
     * Update the front panel LEDs. If there is a cable alarm
then
     * the ODU LED should be off
     */
    updt_led(IDU_LED_ATTR, Alarm_Attr[IDU_ALM][STATE_ATTR]);
    updt_led(CABLE_LED_ATTR, Alarm_Attr[CABLE_ALM][STATE_ATTR]);
    updt_led(RMT_LED_ATTR, Alarm_Attr[RMT_ALM][STATE_ATTR]);

    if (Alarm_Attr[CABLE_ALM][STATE_ATTR] != NO_ALARM)
    {
        FCP_set_led(ODU_LED_ATTR, LED_OFF);
    }
    else
    {
        updt_led(ODU_LED_ATTR, Alarm_Attr[ODU_ALM][STATE_ATTR]);
    }

    ALARM_updt_relays();
}

/*************************************************************
 *
 * Name: updt_led
 *
 * Description: This routine updates the leds based on the
current
 *                alarm states.
 *
 ************************************************************/
void updt_led(led_num, alarm_state)

uchar   led_num;
uchar   alarm_state;
{
    uchar   new_led;
```

©P-COM, Inc., 1994

```
    /*
     * Check the alarms that affect the leds and update them
     */
    if (alarm_state == NO_ALARM)
        new_led = GREEN_LED;
    else if (alarm_state == ALARM_ON)
        new_led = RED_LED;
    else
        new_led =  (RED_LED | BLINK_MASK);

    if (new_led != FCP_get_led(led_num))
        FCP_set_led(led_num, new_led);
}

/*************************************************************
 *
 * Name: ALARM_updt_relays
 *
 * Description: This routine updates the relays based on the
current
 *              alarm states and the user defined values.
 *
 *************************************************************/
void ALARM_updt_relays()
{
    uint    alm_relays;
    uchar   i;

    /*
     * Check the alarms that affect the relays and update them
     */
    alm_relays = 0;
    for (i = 0; i < NUM_ALARMS; i++)
    {
        if (Alarm_Attr[i][RELAY_ATTR] != FALSE)
            if (Alarm_Attr[i][STATE_ATTR])
                alm_relays |= Alarm_Attr[i][RELAY_ATTR];
    }

    RADIO_dsp_relays(alm_relays);
}

/*************************************************************
 *
 * Name: ALARM_chk_cable_open
 *
 * Description: Check if there is a cable open
 *
 *************************************************************/
uchar ALARM_chk_cable_open()
```

What is claimed is:

1. A microwave radio system comprising:

an indoor unit;

an outdoor unit; and a cable connecting the indoor unit to the outdoor unit, wherein:

the indoor unit is capable of transmitting to the outdoor unit a first digital value representing a power level to be used by the outdoor unit in transmitting a signal; and the outdoor unit comprises:

a nonvolatile memory suitable for receiving and storing the first digital value;

a digital-to-analog converter;

circuitry for addressing the nonvolatile memory and for providing a second digital value which depends on the first digital value, to the digital-to-analog converter, the digital-to-analog converter converting the second digital value to an analog control voltage;

an amplifier which controls an output power of a signal transmitted from the outdoor unit; and structure for applying the analog control voltage to the amplifier thereby to control the output power as a function of the first digital value.

2. The microwave radio system of claim 1, wherein the circuitry for addressing the nonvolatile memory and for providing the second digital value, comprises a microprocessor coupled to the nonvolatile memory and to the digital-to-analog converter.

3. The microwave radio system of claim 2, wherein the outdoor unit further comprising a temperature monitor coupled to the microprocessor, and the second digital value depends on the first digital value and on a signal value from the temperature monitor.

4. The microwave radio system of claim 3, wherein the temperature monitor further comprises a temperature-to-voltage converter and an analog-to-digital converter.

5. The microwave radio system of claim 1, wherein the first digital value is equal to the second digital value.

6. The microwave radio system of claim 1, further comprising a remote radio capable of transmitting the first digital value to the indoor unit via a telemetry channel of a microwave link between the remote radio and the outdoor unit.

7. The microwave radio system of claim 1, further comprising a network of microwave radios interconnected by microwave links, wherein a microwave radio in the network is capable of transmitting the first digital value to the indoor unit via a path containing two or more of the microwave links.

8. A method for controlling operation of an RF assembly of a microwave transmitter, comprising:

transmitting a telemetry signal from a remote radio to the RF assembly through a microwave link;

transmitting the telemetry signal from the RF assembly to an indoor unit;

extracting from the telemetry signal a command to change an operating parameter of the RF assembly, wherein in response the command, the indoor unit transmits a digital value from the indoor unit to the RF assembly;

storing the digital value in a nonvolatile memory located in the RF assembly; and using the digital value as an operating parameter for the RF assembly.

9. The method of claim 8, wherein using the digital value further comprises generating a microwave signal having output power indicated by the digital value.

10. The method of claim 8, wherein using the digital value further comprises using a microprocessor in the RF assembly to execute a program stored in the RF assembly, wherein the digital value is a parameter of the program.

11. The method of claim 8, further comprising transmitting the telemetry signal across a network of microwave radios interconnected by microwave links.

* * * * *